United States Patent [19]

Swenson

[11] 4,413,317

[45] Nov. 1, 1983

[54] MULTIPROCESSOR SYSTEM WITH CACHE/DISK SUBSYSTEM WITH STATUS ROUTING FOR PLURAL DISK DRIVES

[75] Inventor: Robert E. Swenson, Mendota Heights, Minn.

[73] Assignee: Sperry Corporation, New York, N.Y.

[21] Appl. No.: 207,092

[22] Filed: Nov. 14, 1980

[51] Int. Cl.³ ...................... G06F 13/00; G06F 13/04; G06F 15/16

[52] U.S. Cl. .................................................... 364/200

[58] Field of Search ... 364/200 MS File, 900 MS File

[56] References Cited

U.S. PATENT DOCUMENTS

| | | | |
|---|---|---|---|
| 3,693,161 | 9/1972 | Price et al. | 364/200 |
| 4,047,157 | 9/1977 | Jenkins | 364/200 |
| 4,191,997 | 3/1980 | Luiz | 364/200 |
| 4,207,609 | 6/1980 | Luiz et al. | 364/200 |
| 4,208,715 | 6/1980 | Kumahara et al. | 364/200 |
| 4,280,176 | 7/1981 | Tan | 364/200 |
| 4,310,882 | 1/1982 | Hunter et al. | 364/200 |

*Primary Examiner*—James D. Thomas
*Assistant Examiner*—Archie E. Williams
*Attorney, Agent, or Firm*—Griffin, Branigan & Butler

[57] ABSTRACT

In a data processing system having plural disk devices connected to first and second storage control units, and plural processors connected to the storage control units by connection paths, a table is provided having entries defining the connection paths between each storage control unit and each processor. The storage control units may queue commands from the processors in a command queue for later execution. Either storage control unit may utilize a queued command to issue a seek signal to a disk device and report status to the processor which issued the command. When a disk device completes a seek it issues an interrupt signal which may be sampled by either storage control unit to report further status. In order to report status to the processor which issued the command, a storage control unit searches the table defining the connection paths between the storage control units and the processors and applies the status to the first available connection path that it finds. If one storage control unit, upon searching the table, finds that there is no connection path between itself and the processor which issued the command, it returns to an idle condition so that the other storage control unit may respond to the interrupt signal, search the table, and apply the status indication to the host processor which issued the command.

11 Claims, 104 Drawing Figures

FIG. 14A

| 0 1 | 2 | CD 3 | 4 5 6 7 | SPEC OP 8 9 10 11 12 13 14 15 | ALU 16 17 18 | CA 19 | 20 21 22 23 | CK 24 25 26 27 28 29 30 31 |
|---|---|---|---|---|---|---|---|---|
| 00 = FMT 0 | BIT 2=0→BBUS LOW=CK | 10=FC | 00 | REFER TO SPECIFICATION FOR OP-CODE LISTING | | 10=FC | 00=NULL | ▷ WHEN BIT 2=0 |
| | | 11 | 01=GA | | 0D=A+B | 11=FB | 01=GA | |
| | | 12=EC | 02=GB | | | 12=EC | 02=GB | |
| | | 13=CT | 03=GC | | 1D=A$B | 13=CT | 03=GC | LOW ORDER BYTES OF B-BUS ARE LOADED WITH CK |
| | | 14=RW | 04=GD | | | 14=RW | 04=GD | |
| | | 15=PS | 05=GE | | 2D=A/B | 15 | 05=GE | |
| | | 16=RB | 06=GF | | | 16=RB | 06=GF | |
| | | 17=BC | 07=GG | | 3D=A·B | 17=BC | 07=GG | |
| | BIT 2=1→B BUS HIGH=CK | 18=WC | 08=PC | | | 18=WC | 08=LK | ▷ WHEN BIT 2=1 |
| | | 19=CC | 09=IX | | 4D=A&B | 19=CC | 09=IX | |
| | | 1A | 0A=HH | | | 1A=BW | 0A=HH | |
| | | 1B=RC | 0B=HL | | 5D=A-B | 1B=RC | 0B=HL | |
| | | 1C=OR | 0C | | | 1C=FR | 0C | HIGH ORDER BYTES OF B-BUS ARE LOADED WITH CK |
| | | 1D=BX | 0D=DC | | 6D=A(B | 1D=BX | 0D=DC | |
| | | 1E=WH | 0E=DS | | | 1E=WH | 0E=DS | |
| | | 1F=WL | 0F=OP | | 7D=A)B | 1F=WL | 0F=OP | |

| 0 1 | 2 | CD 3 4 | CD 5 6 7 | BRANCH 8 9 10 11 12 13 14 15 | ALU 16 17 18 | CA 19 20 | CA 21 22 23 | CB 24 25 26 | DISPL. 27 28 29 30 31 |
|---|---|---|---|---|---|---|---|---|---|
| 01 = FMT I | BIT 2 = 0 → + DISPLACEMENT | 10=FC | 00 | FOR BRANCH CONDITION REFER TO TABLE | D=A+B | 10=FC | 00=NULL | 0=NULL | ▷ WHEN BIT 2 = 0 DISPLACEMENT IS ADDED TO PC-COUNT |
| | | 11 | 01=GA | | | 11=FB | 01=GA | | |
| | | 12=EC | 02=GB | | D=A $ B | 12=EC | 02=GB | 1=GA | |
| | | 13=CT | 03=GC | C F 0 1 0 1 2 3 | | 13=CT | 03=GC | | |
| | | 14=RW | 04=GD | SELECT ONE OF 16 BRANCH BUS BITS | D=A / B | 14=RW | 04=GD | 2=GB | |
| | | 15=PS | 05=GE | | | 15 | 05=GE | | |
| | | 16=RB | 06=GF | SELECTS BRANCH GROUP OR BRANCH REG. NUMBER | D=A · B | 16=RB | 06=GF | 3=GC | |
| | | 17=BC | 07=GG | | | 17=BC | 07=GG | | |
| | BIT 2 = 1 → − DISPLACEMENT | 18=WC | 08=PC | | D=A &B | 18=WC | 08=LK | 4=GD | ▷ WHEN BIT 2 = 1 DISPLACEMENT IS SUBTRACTED FROM PC - COUNT |
| | | 19=CC | 09=IX | =0→BRANCH REG. =1→BRANCH GROUP | | 19=CC | 09=IX | | |
| | | 1A | 0A=HH | | D=A− B | 1A=BW | 0A=HH | 5=GE | |
| | | 1B=RC | 0B=HL | | | 1B=RC | 0B=HL | | |
| | | 1C=OR | 0C | =0→SELECT BIT = 0 =1→SELECT BIT = 1 | D=A ( B | 1C=FR | 0C | 6=GF | |
| | | 1D=BX | 0D=DC | | | 1D=BX | 0D=DC | | |
| | | 1E=WH | 0E=DS | | D=A ) B | 1E=WH | 0E=DS | 7=GG | |
| | | 1F=WL | 0F=OP | | | 1F=WL | 0F=OP | | |

FIG.14B

+ ADD
$ EXOR
/ OR
· AND

& ADD WITH CARRY OUT
− SUBTRACT WITH CARRY OUT
( ADD WITH CARRY IN/OUT
) SUBTRACT WITH CARRY IN/OUT

FIG. 14C

| 0 1 | 2 | CD 3 4 5 | CD 6 7 | LOAD/SPEC OP 8 9 10 11 \| 12 13 14 15 | CK 16 17 18 19 \| 20 21 22 23 \| 24 25 26 27 \| 28 29 30 31 |
|---|---|---|---|---|---|
| 10 = FMT2 | BIT 2 = 0 SPEC OP | 10=FC | 00 | ▷ WHEN BIT 2=0 SPECIAL OP-CODE REFER TO TABLE | ▷ WHEN BIT 2=0 CD = CK |
| | | 11 | 01=GA | | |
| | | 12=EC | 02=GB | | |
| | | 13=CT | 03=GC | ▷ WHEN BIT 2=1 LOAD CONDITION | ▷ WHEN BIT 2=1 AND LOAD CONDITION IS SATISFIED CD = CK |
| | | 14=RW | 04=GD | | |
| | | 15=PS | 05=GE | | |
| | BIT 2=1 LOAD CONDITION | 16=RB | 06=GF | C \| F \| 0 1 \| 0 1 2 3 | |
| | | 17=BC | 07=GG | 0 1 2 3: SELECTS ONE OF 16 BRANCH BUS BITS | |
| | | 18=WC | 08=PC | | |
| | | 19=CC | 09=IX | 0 1: SELECTS BRANCH GROUP OR BRANCH REG. NUMBER | |
| | | 1A= | 0A=HH | | |
| | | 1B=RC | 0B=HL | | |
| | | 1C=OR | 0C | F: = Ø→BRANCH REG. = 1→BRANCH GRP. | |
| | | 1D=BX | 0D=DC | | |
| | | 1E=WH | 0E=DS | C: = Ø→SELECT BIT = Ø = 1→SELECT BIT = 1 | |
| | | 1F=WL | 0F=OP | | |

FIG. 14D

| 0 1 | 2 | CD 3 \| 4 | CD 5 6 7 | SPEC OP 8 9 10 11 \| 12 13 14 15 | ALU 16 17 18 | CA 19 \| 20 | CA 21 22 23 | CK 24 25 26 27 \| 28 29 30 31 |
|---|---|---|---|---|---|---|---|---|
| 11 = FMT 3 | BIT 2 = 0 B BUS = CK | 30=DF | 20 | REFER TO SPECIFICATION FOR OP-CODE LISTING | 0D=A+B | 30=DF | 20=NULL | ▷ WHEN BIT 2 = 0<br>LOW ORDER BYTES OF B-BUS ARE LOADED WITH CK |
| | | 31 | 21=GA | | | 31=DE | 21=GA | |
| | | 32 | 22=GB | | 1D=A $ B | 32=EE | 22=GB | |
| | | 33=TC | 23=GC | | | 33=TC | 23=GC | |
| | | 34=RH | 24=GD | | 2D=A/B | 34=RH | 24=GD | |
| | | 35=RL | 25=GE | | | 35=RL | 25=GE | |
| | | 36=AC | 26=GF | | 3D=A·B | 36=AC | 26=GF | |
| | BIT 2 = 1 B BUS HIGH = CK | 37=RS | 27=GG | | | 37=RS | 27=GG | |
| | | 38 | 28 | | 4D=A&B | 38=R1 | 28 | ▷ WHEN BIT 2 = 1<br>HIGH ORDER BYTES OF B-BUS ARE LOADED WITH CK |
| | | 39 | 29 | | | 39=R2 | 29=CA | |
| | | 3A | 2A | | 5D=A−B | 3A=R3 | 2A=C1 | |
| | | 3B | 2B | | | 3B=CE | 2B | |
| | | 3C=IC | 2C | | 6D=A(B | 3C=IC | 2C | |
| | | 3D | 2D | | | 3D=BA | 2D=ET | |
| | | 3E | 2E | | 7D=A)B | 3E=ER | 2E=ES | |
| | | 3F | 2F=ST | | | 3F=IH | 2F=ST | |

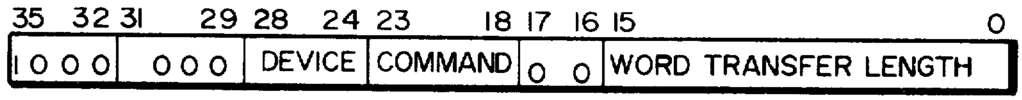
FIG. 15A
FIG. 15B
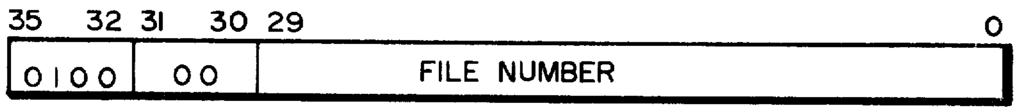
FIG. 15C
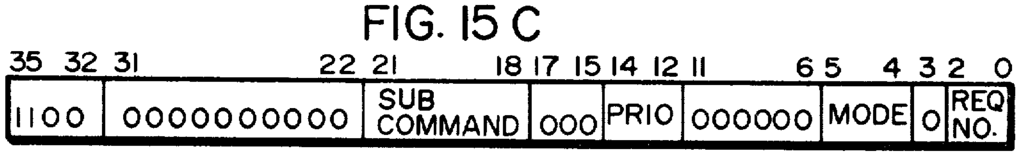
FIG. 15D
CACHE COMMANDS
FIG. 16
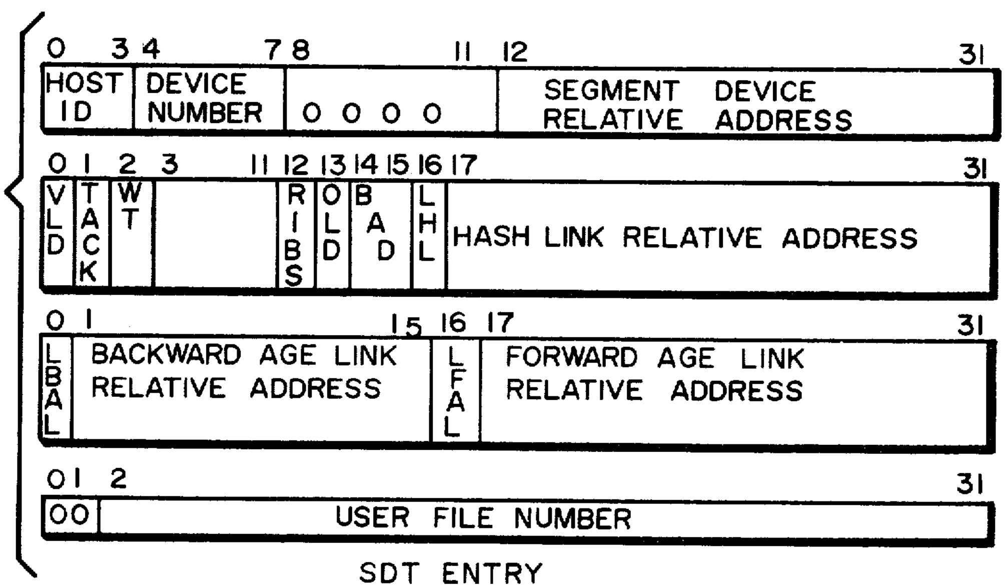
SDT ENTRY
FIG. 17
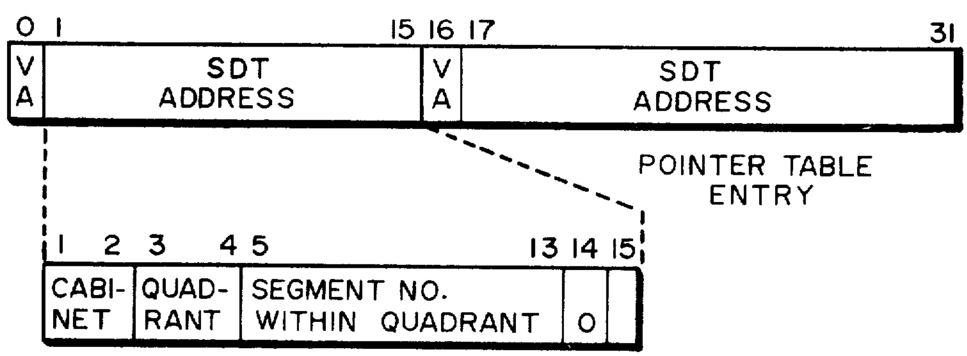

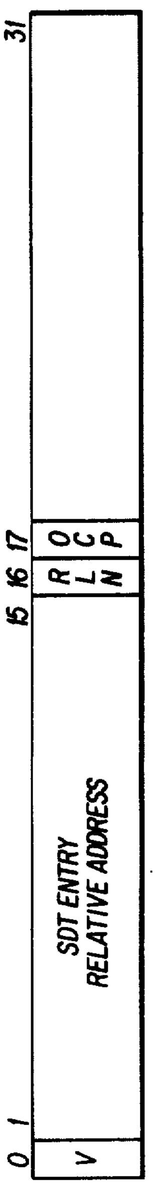
FIG. 18 ROLL TABLE ENTRY
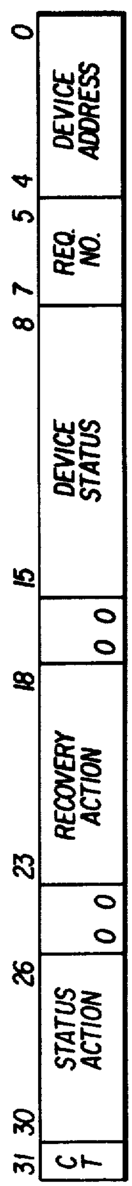
FIG. 18A
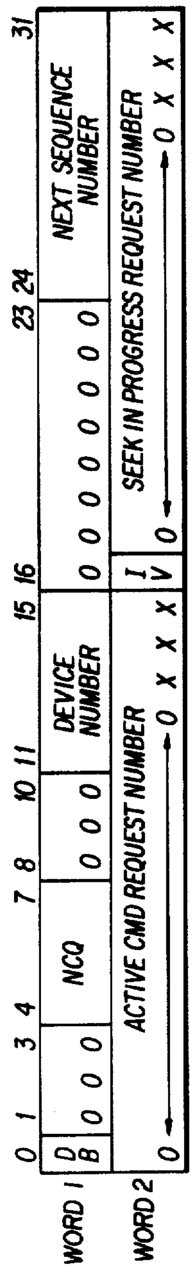
FIG. 19A COMMAND QUEUE HEADER
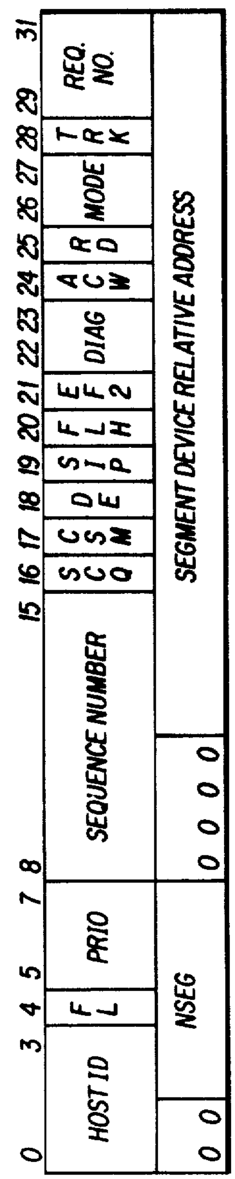
FIG. 19B COMMAND QUEUE ENTRY

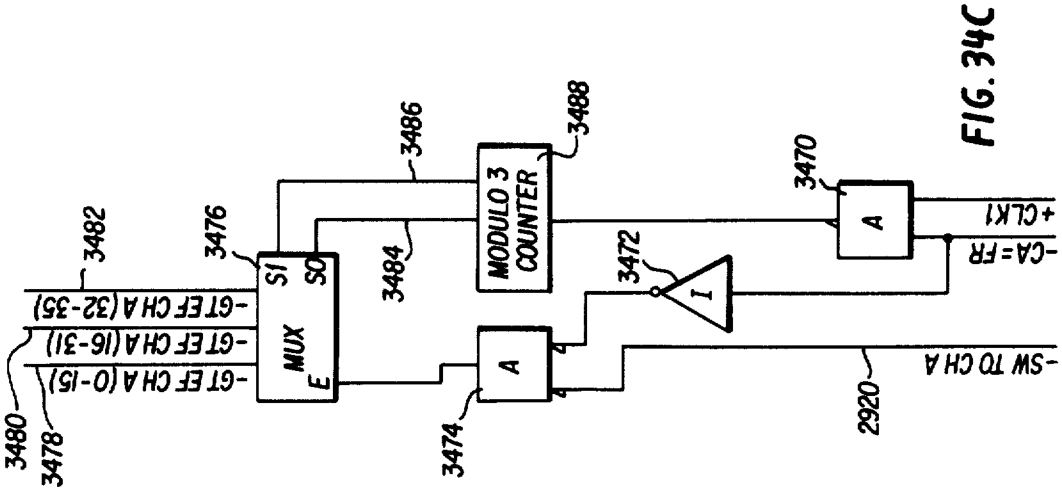
FIG. 34C
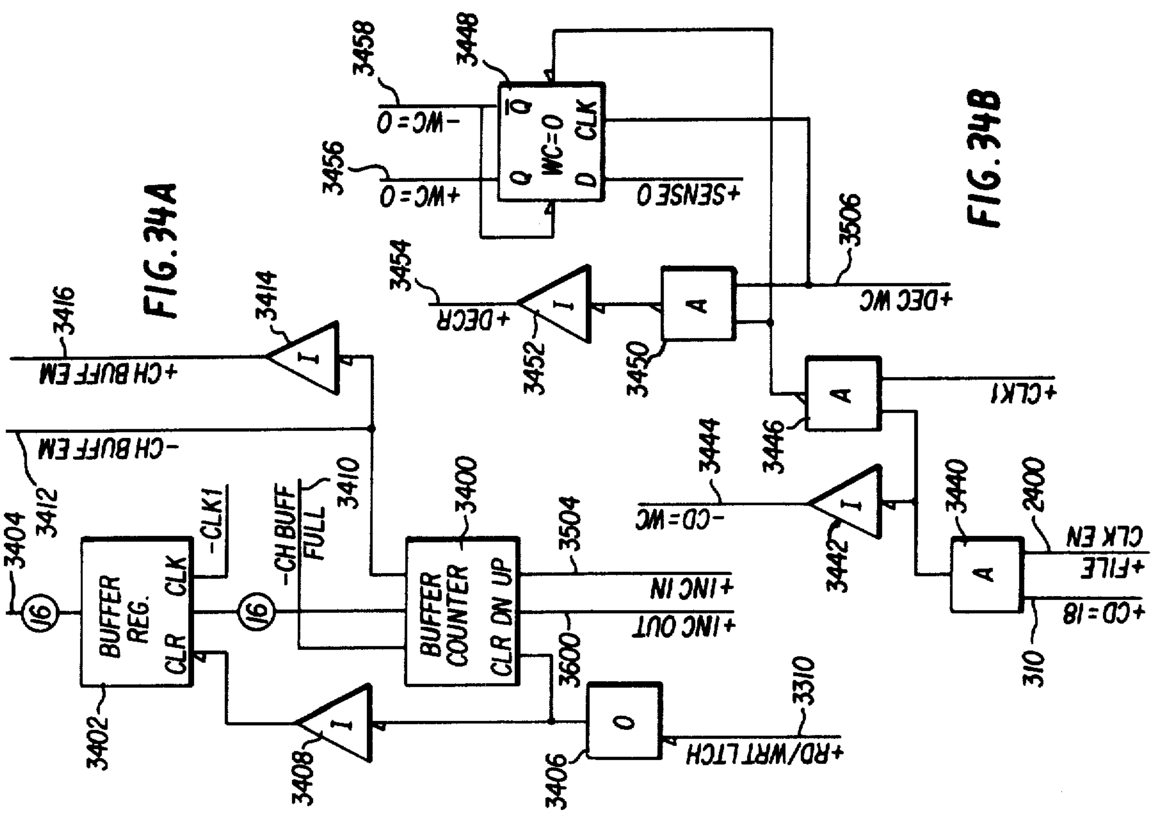
FIG. 34A
FIG. 34B

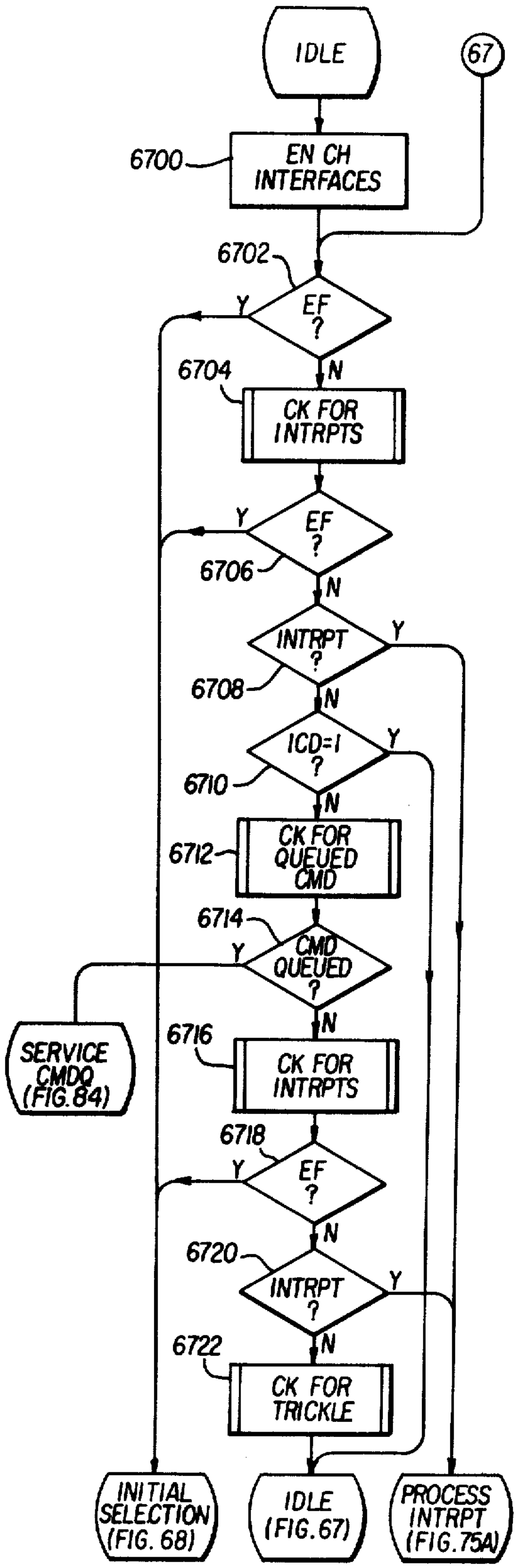
FIG. 67
FIG. 71
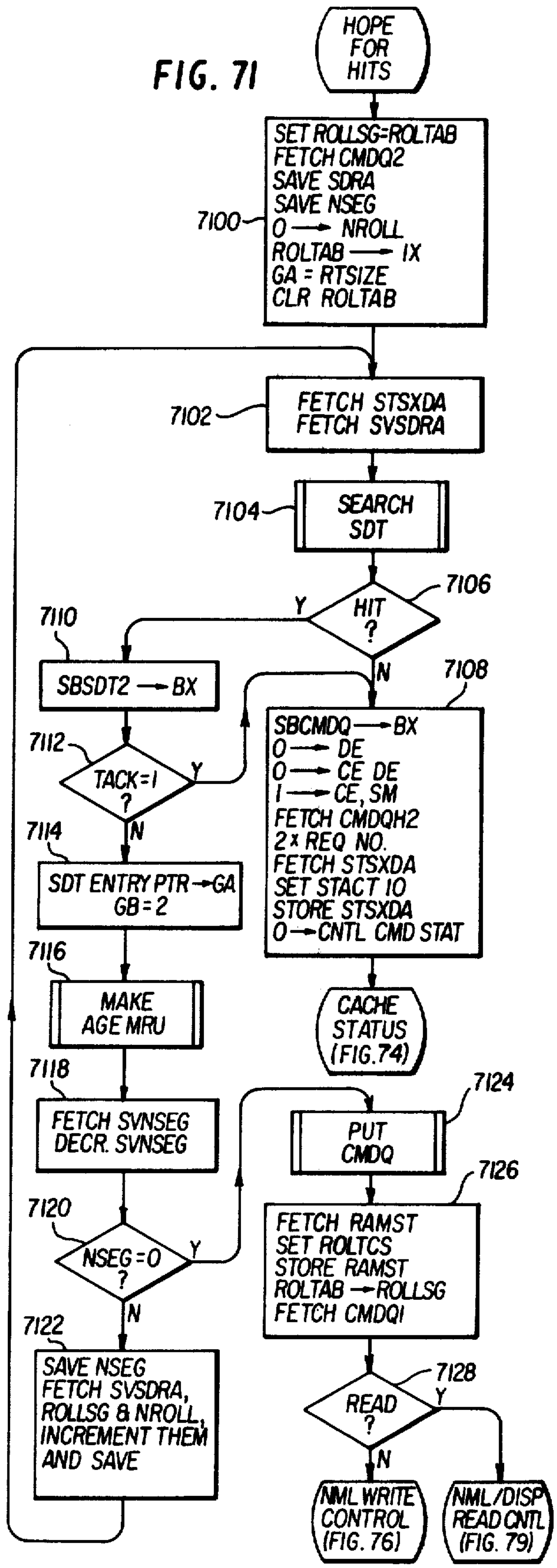

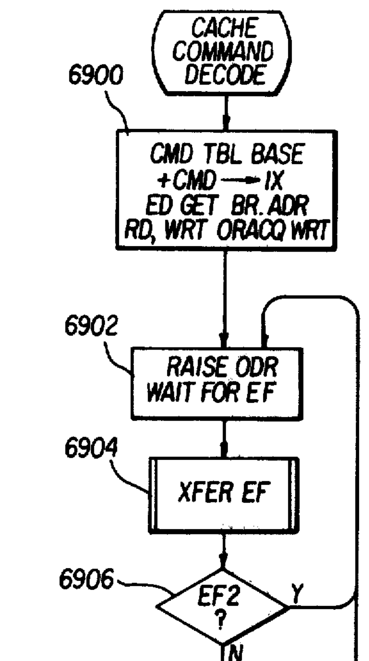
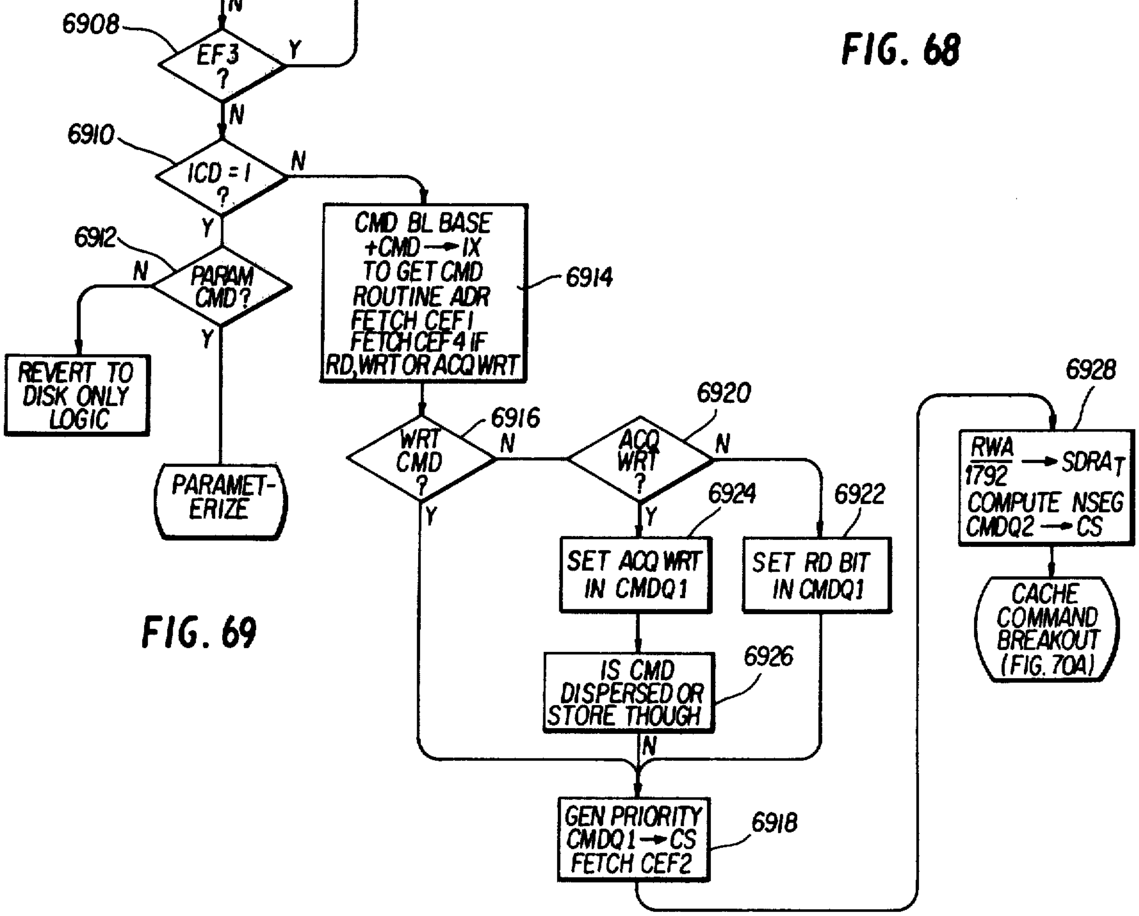
FIG. 69
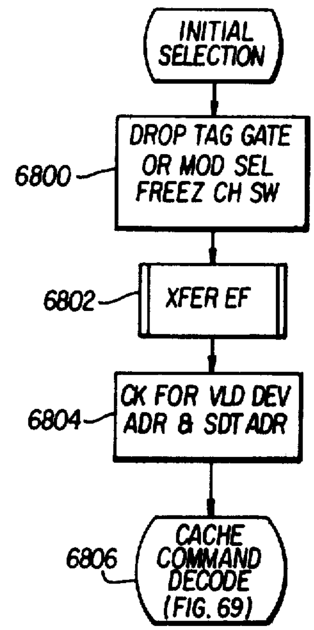
FIG. 68

MULTIPROCESSOR SYSTEM WITH CACHE/DISK SUBSYSTEM WITH STATUS ROUTING FOR PLURAL DISK DRIVES

RELATED APPLICATIONS

This application relates to the concurrently filed application of Robert E. Swenson, Ser. No. 207,097 entitled Cache Disk Subsystem Trickle, the disclosure of which is incorporated herein by reference.

BACKGROUND OF THE INVENTION

The present invention relates to a data processing system of the type having a plurality of host processors connected through first and second storage control units to a plurality of disk devices, the system being provided with a command queue store for storing host processor commands which have been sent to the storage control units for execution at the disk devices. Both storage control units have access to the command queue for the purpose of executing commands queued therein. More particularly, the present invention relates to a system as described above wherein plural connection paths may exist between some of the host processors and the storage control units and/or there may be no connection paths between at least one of the host processors and one of the storage control units. The present invention provides a host identification table which defines the connection paths between each storage control unit and the host processor and this table is accessed to determine an available connection path over which status may be reported to a host processor.

In a system wherein a processor issues commands directing the transfer of data between the processors and disk devices, and storage control units are interposed between the processors and the disk devices, it is common practice to report back to a processor the status of the storage control unit with respect to execution of a command issued by the processor. The routing of status from a storage control unit to a processor becomes more complex when processor commands are queued for later execution by either storage control unit and more than one connection path exists between the storage control unit and the processor or there are no connection paths between at least one of the storage control units and at least one of the processors. Where a storage control unit begins processing an interrupt from a disk device and there is no connection path between that storage control unit and a processor to which status must be reported, it is desirable for the first storage control unit to relinquish control so that the second storage control unit may report the status.

SUMMARY OF THE INVENTION

An object of the present invention is to provide a novel method and apparatus for reporting status in a system wherein plural host processors are connected by diverse paths to first and second storage control units, said method and apparatus permitting the reporting of status with respect to a given processor command to the host processor which issued the command by either of the storage control units and over any connection path extending between either storage control unit and the processor which issued the command.

An object of the present invention is to provide a method and apparatus for reporting status to a host processor from a storage control unit over any available path extending between the host processor and the storage control unit even though that path may not be the path over which the command to which the status relates was issued by the host processor.

An object of the present invention is to provide a method of and apparatus for reporting seek complete status from a disk device to a host processor which issued a command, said status being reported through either of two storage control units and to a host processor over any available connection path extending between the host processor and the storage control unit managing the status reporting.

A further object of the invention is to provide a novel method and apparatus for reporting the status of execution of a command from a host processor at different stages of execution of said command, the status reported at different stages of execution being transmitted to the host processor over the same or different connection paths extending between the host processor and the system which executes the command.

In accordance with the principles of the present invention, plural host processors are connected by diverse connection paths to first and second storage control units which execute the commands to accomplish data transfers between the host processors and a plurality of disk devices which are controlled by the storage control units. A command queue store is provided for storing commands which cannot be completely executed immediately upon receipt of the command by a storage control unit and when such a command is stored a channel end with status modifier status is reported by the storage control unit to the host processor which issued the command, this status being transmitted by way of the same connection path over which the command was received. Subsequently, either storage control unit may utilize a queued command to issue a seek to a disk device specified in the command. After the seek is issued, the storage control unit reports device end status to the host processor which originally issued the command. The storage control unit issuing the seek uses a host identification field, generated for a host processor command and stored therewith in the command queue store, to access a host identification table. This table contains values which define the connection paths between the storage control units and the host processors. The device end status is reported over a connection path defined by the table, to the host processor which issued the command. When the disk device completes the seek operation it generates an interrupt signal which may be applied to both storage control units. Either storage control unit may accept the interrupt, access the host identification table using the host identification generated for the command, and transmit status to the host processor over a connection path defined by the table entry. If one storage control unit accepts the interrupt but finds that it has no connection path back to the host processor which issued the command, it relinquishes control and returns to an idle condition so that the other storage control unit may process the interrupt and report status.

Other objects of the invention and its mode of operation will become apparent upon consideration of the following description and the accompanying drawings.

BRIEF DESCRIPTION OF THE DRAWINGS

FIGS. 14A-14D illustrate the formats of four types of control words utilized in a storage control unit;

FIGS. 15A, 15C and 15D illustrate the formats of four command words supplied to a storage control unit from a channel;

FIG. 16 illustrates the format of four words comprising a single entry in a segment descriptor table;

FIG. 17 illustrates the format of a word comprising a pointer table entry;

FIG. 18 illustrates the format of a roll table entry;

FIG. 18A illustrates the format of a status word;

FIG. 19A illustrates the format of two words comprising a command queue header;

FIG. 19B illustrates the format of the two words comprising a command queue entry;

FIGS. 21-30 illustrate some of the detailed logic for the microprocessor shown in FIGS. 3 and 4;

FIGS. 31-33 and 34A-34C illustrate the logic circuits of the channel interface shown in FIG. 5;

FIGS. 67-92 are flow diagrams illustrating the operations performed by the following routines and subroutines:

FIG. 67—MAIN IDLE LOOP

FIG. 68—INITIAL SELECTION

FIG. 69—CACHE COMMAND DECODE

FIG. 71—HOPE FOR HITS

FIG. 77—ACQUIRE WRITE

FIGS. 81A-81D—MAKE AGE SPECULATIVE ROLL IN

FIG. 83—STORE THRU

FIG. 84—SERVICE COMMAND QUEUE

FIG. 85—STORE THRU NORMAL WRITE CONTROL

FIG. 86—WRITE BAD ECC

FIG. 87—HOST TO BUFFER TRANSFER

FIG. 88—BUFFER TO HOST TRANSFER

FIG. 89—CACHE TO BUFFER/BUFFER TO CACHE TRANSFER

FIG. 90—FIND COMMAND QUEUE ENTRY

FIGS. 91A and 91B—CACHE SEEK

FIG. 92—READ GATE TURN ON

CONVENTIONS EMPLOYED

Figure 1:
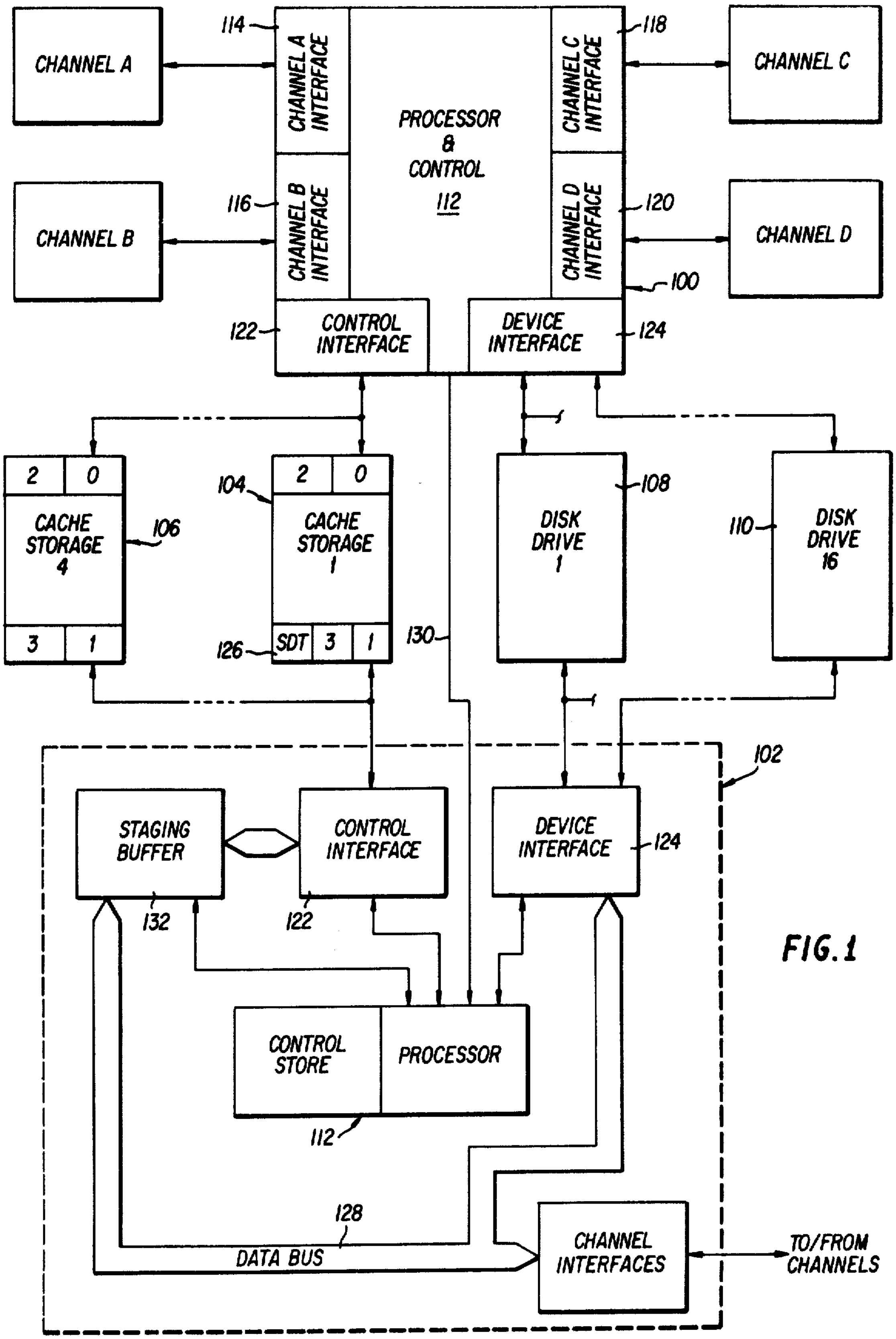
FIG. 1 is a block diagram of a cache/disk subsystem including two storage control units connected between plural cache storage units, plural disk drives and plural channels.

Throughout the drawings, the first digit of a three digit reference numeral or the first two digits of a four digit reference numeral indicates the figure where the referenced element is located. The first digit or first two digits of a reference numeral applied to an input lead to a figure indicate the figure where the lead originates.

In the detailed logic circuits the input and output leads are provided with names preceded by a plus (+) or minus (−) indicating the voltage level when the signal is true. An open arrow on an input lead to a logic element indicates the voltage level (low) which must be present on the lead in order for the logic element to produce a true output. The absence of an arrow indicates that the voltage level must be high. Obviously, reverse logic may be employed depending upon the particular logic elements utilized in implementing the invention.

OVERVIEW

As illustrated in FIG. 1, a Cache-Disk Subsystem constructed in accordance with the principles of the present invention comprises first and second Storage Control Units 100 and 102, a plurality of Cache Storage Units 104 and 106, and a plurality of device drive units illustrated as disk drives 108 and 110.

The Storage Control Units 100 and 102 are identical but are illustrated differently in FIG. 1 to show various aspects of the devices. With reference to Storage Control Unit (SCU) 100, each SCU may service up to four channels designated channel A-channel D. The SCU 100 includes four channel interfaces, designated Channel Interface A-Channel Interface D for interfacing channels A-D to a processor and control circuit 112 within the SCU. Each SCU is provided with a control interface 122 for interfacing the cache storage units 104, 106 to the processor and control circuits 112. A device interface 124 interfaces the processor and control circuits 112 to the disk drives 108, 110.

Each Cache Storage Unit (CSU) may be provided with four ports designated port 0-port 3. As illustrated in FIG. 1, SCU 100 is connected to port 0 of each CSU and SCU 102 is connected to port 1 of each CSU with ports 2 and 3 being unused.

A typical Cache-Disk Subsystem includes from 1 to 4 CSU's each with a capacity of 4 megabytes of cache storage. As illustrated in FIG. 1, CSU 104 is provided with a Segment Descriptor Table (SDT) 126 capable of storing up to 256 kilobytes of information relating to the data stored in cache storage. If all of the CSUs 104, 106, are shared, then a single SDT in one CSU stores the information relating to the segments of data stored in all of the CSUs. However, if the cache memory is partitioned into two or more groups of CSUs, then there must be an SDT for each group. For example, if SCU 100 is connected only to CSU 104 and SCU 102 is connected to CSU 106 then both SCU's 104 and 106 must contain an SDT.

The device interface 124 is illustrated as servicing two banks of disk drives, each bank including eight disk drives. Additional banks of disk drives may be employed if desired. The disk drives of one bank need not necessarily be the same type as the disk drives of the second bank. However, it is not possible to intermix disk drives of different types in a single bank. In the following description, it is assumed that the two types of disk drives are the models 8450 and 8470 marketed by IS-S—Sperry Univac, but it will be evident that other types of disk drives may be utilized.

The lower portion of FIG. 1 symbolically illustrates the flow of data between the channels, the CSUs and the disk drives. Generally speaking, when a channel wishes to read or write on a disk it issues a command which, among other things, specifies the operation to be performed, the address of the disk drive containing the data to be involved in the transfer, the number of words to be transferred, and the disk relative word address where transfer is to begin. Briefly, when the channel is granted access to the SCU, the command is sent from the channel interface to the processor in the SCU. The processor accesses the SDT 126 through the control interface 122 for the purpose of determining if the segment containing the addresses involved in the transfer is presently contained in the cache memory. If the addresses to be involved in the transfer are present in one of the segments in cache memory (a hit) the processor 112 causes the segment to be read from cache memory into a staging buffer 132. If the command from the channels specifies a read operation the data is transferred from the CSU through the control interface 122 to a Staging Buffer 132 and from the Staging Buffer over Bus 128 and the channel interface to the channel. On the other hand, if the command specifies a write operation the processor directs the data from the channel interface to the Staging Buffer 130 and then from the Staging Buffer through the control interface 122 to the CSU.

If, at the time the processor 112 examines the SDT 126, it determines that the segment containing the required addresses is not resident in cache storage (a miss) the processor acts through device interface 124 to access the disk drive containing the required locations. The segment containing the required locations is then read from the disk drive through interface 124 to the Staging Buffer 130 and then through the control interface 122 to the CSU. From this point the operation is the same as if the segment containing the required addresses was resident in CSU.

Although greatly simplified for purposes of illustration, the foregoing explanation clearly illustrates that the cache storage is transparent to the user. That is, his program is written as though the commands were addressing the disk drives directly and the user is unaware of the operation of cache memory.

Figure 2:
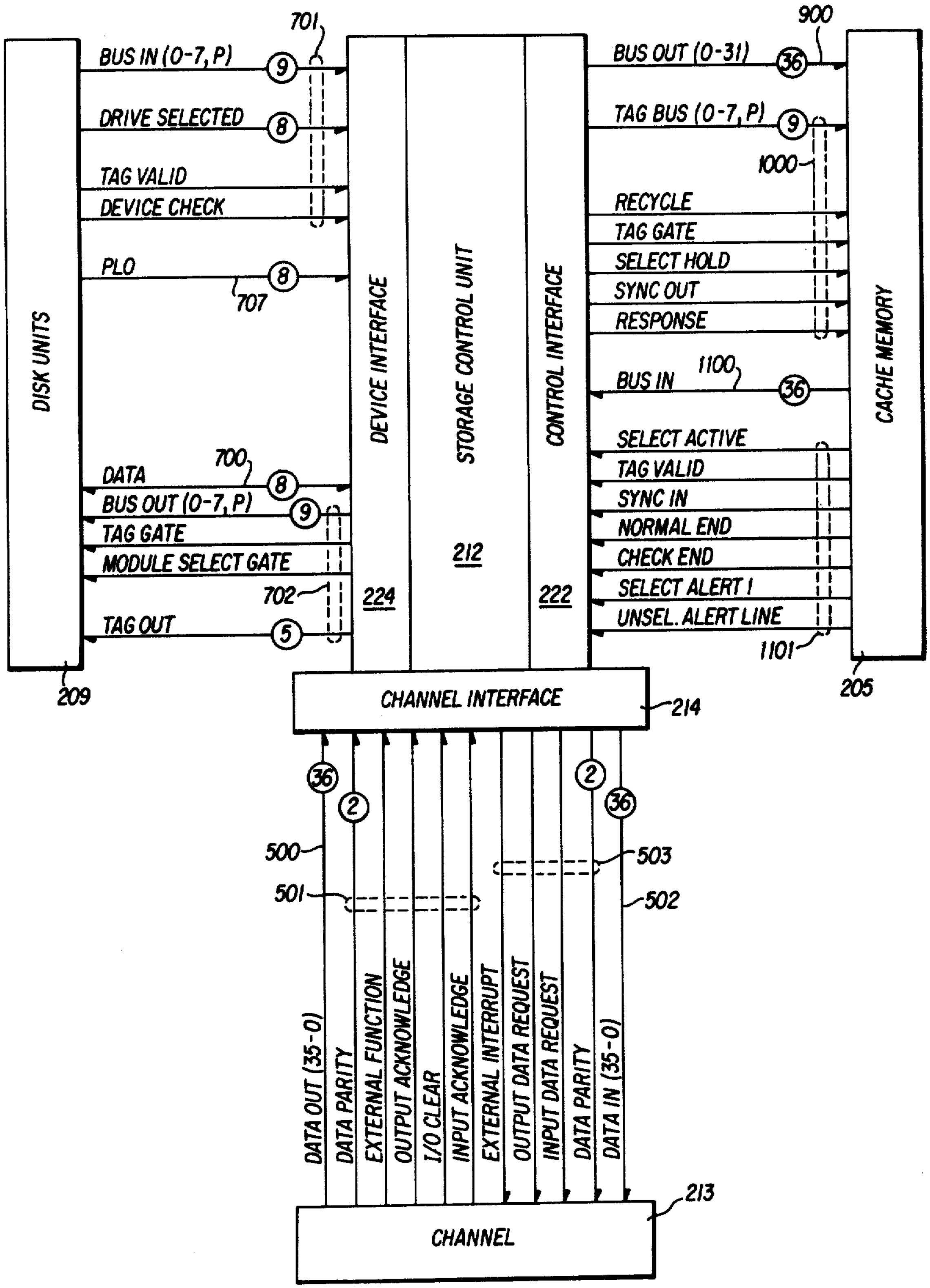
FIG. 2 illustrates the signals flowing over the interfaces between a single storage control unit, a single channel, a single cache storage unit and a single string of disk drives.

FIG. 2 illustrates the various data buses and control leads interconnecting a single SCU 212 with a single channel 213, a single bank of disk drives 209 and a single CSU 205. The SCU is illustrated in greater detail in FIGS. 3–10 and the CSU in FIGS. 11–13. The disk drives are not shown.

Figure 5:
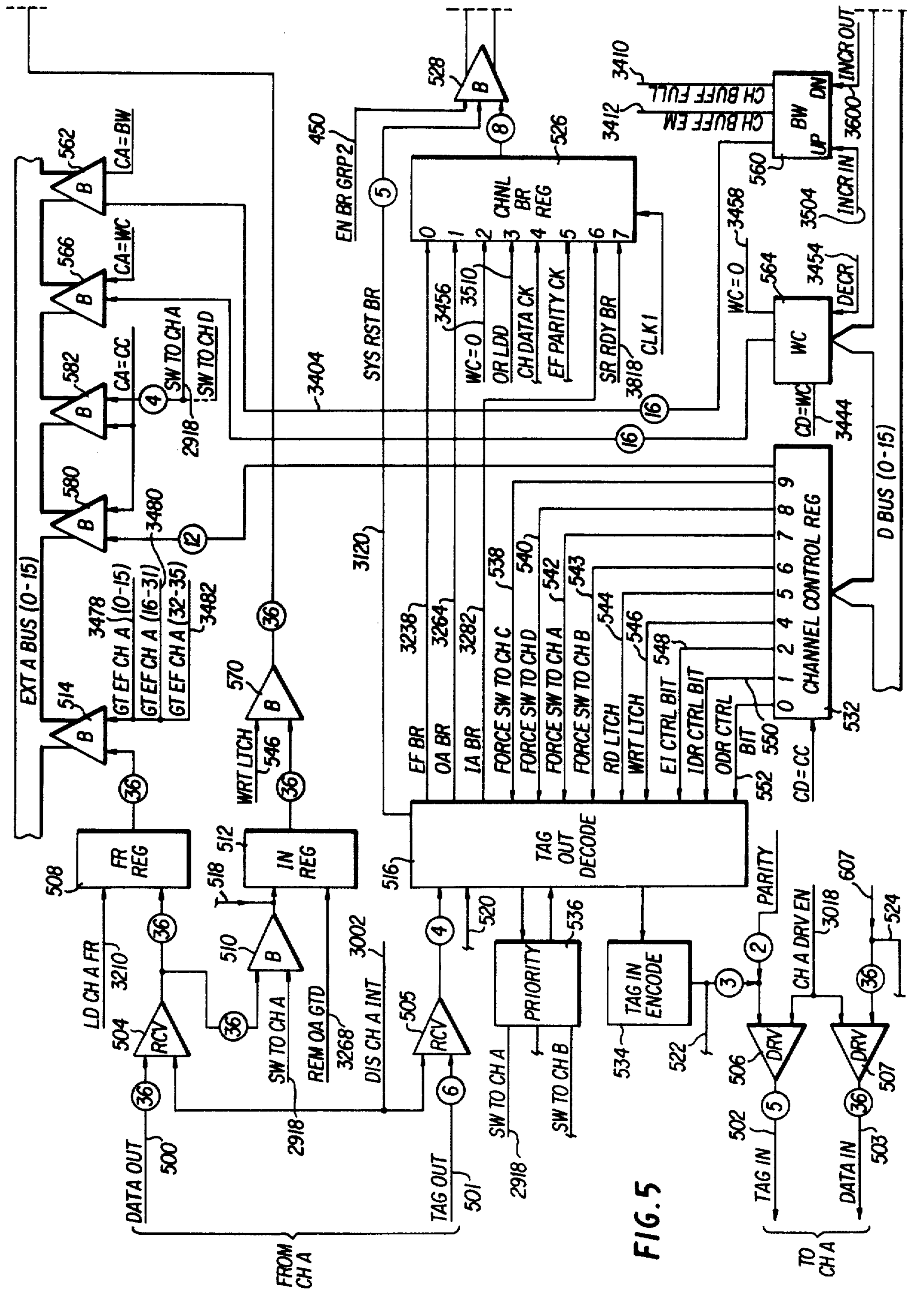

The interconnections between channel 213 and the channel interface 214 include a DATA OUT BUS 500, a TAG OUT BUS 501, a DATA BUS in 502, and TAG IN BUS 503. In FIG. 5, the DATA OUT BUS 500 is connected to a set of 36 receivers 504 in the SCU while the TAG OUT BUS 501 is connected to a set of 6 receivers 505. A set of 5 drivers 506 in the SCU develop the TAG signals which are applied to the channel 213 over the TAG IN BUS 502. A set of 36 drivers 507 produce the DATA IN signals which are applied over BUS 503 to channel 213. The use of these signals is subsequently described in greater detail.

Figure 7A:
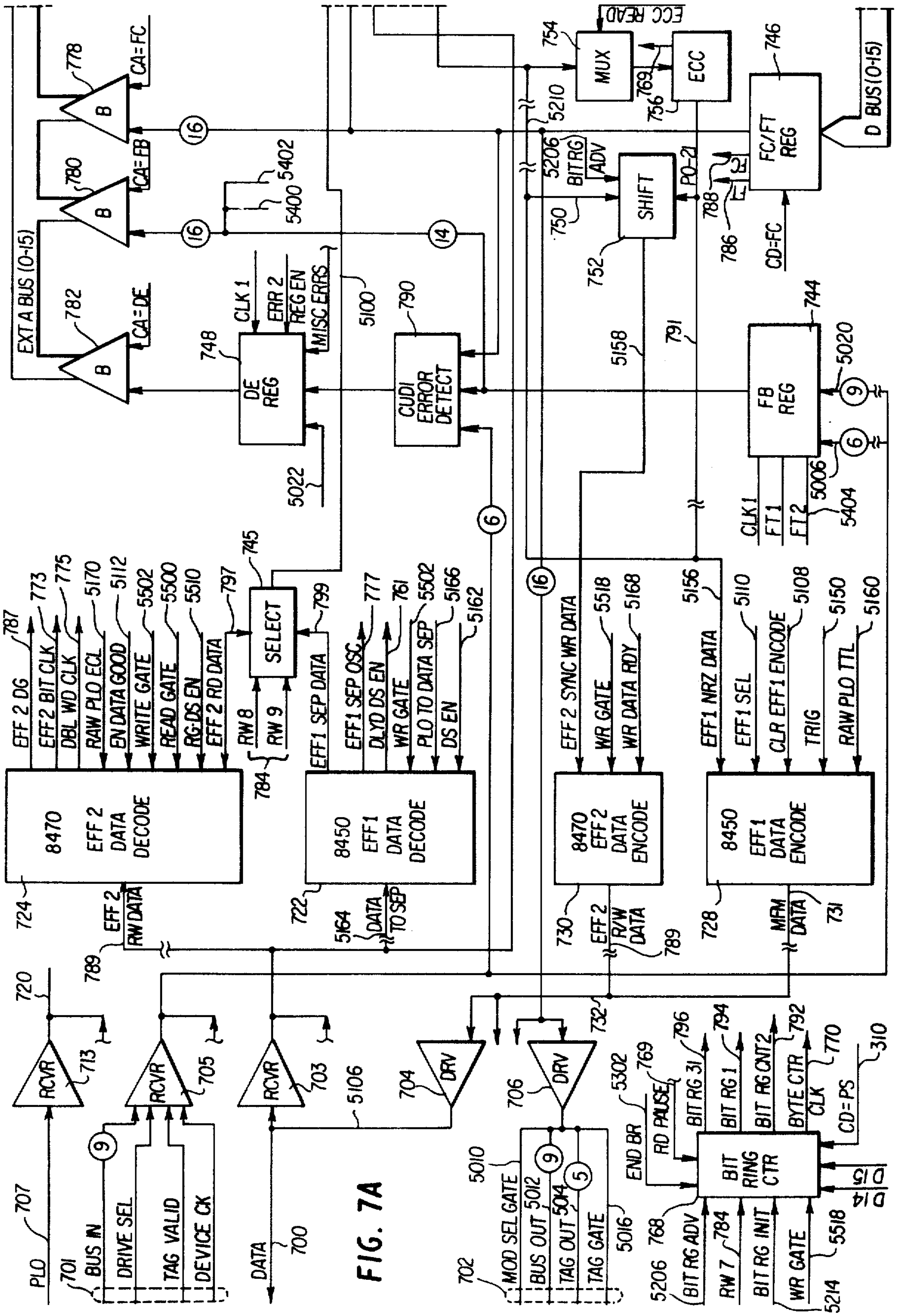

The interconnections between the device interface 224 and the disk drives include a bidirectional DATA BUS 700, a control unit device interface in (CUDI IN) BUS 701 and a CUDI OUT BUS 702. The bidirectional DATA BUS 700 includes one pair of leads for each disk drive in a bank for the serial bidirectional transfer of data signals between the SCU and the drive. In FIG. 7A, the bus 700 is connected to receivers 703 and drivers 704. The CUDI IN BUS 701 is connected to a set of receivers 705 while the CUDI OUT BUS is connected to a set of drivers 706.

The connections between the control interface 222 and the CSU 205 includes a BUS OUT 900, a CONTROL BUS OUT 1000, a BUS IN 1100, and a CONTROL BUS IN 1101. BUS OUT 900 receives signals from two sets of drivers 901 and 902 and applies these signals to a set of drivers 1104. BUS IN 1100 receives signals from a set of drivers 1102 and applies these signals to a set of receivers 801. CONTROL BUS OUT 1000 receives signals from a set of drivers 1008 and applies these signals to two sets of receivers 1103 and 1105. CONTROL BUS IN receives signals from a set of drivers 1106 and applies these signals to a receiver 1002 and a set of receivers 1003.

Figure 9:
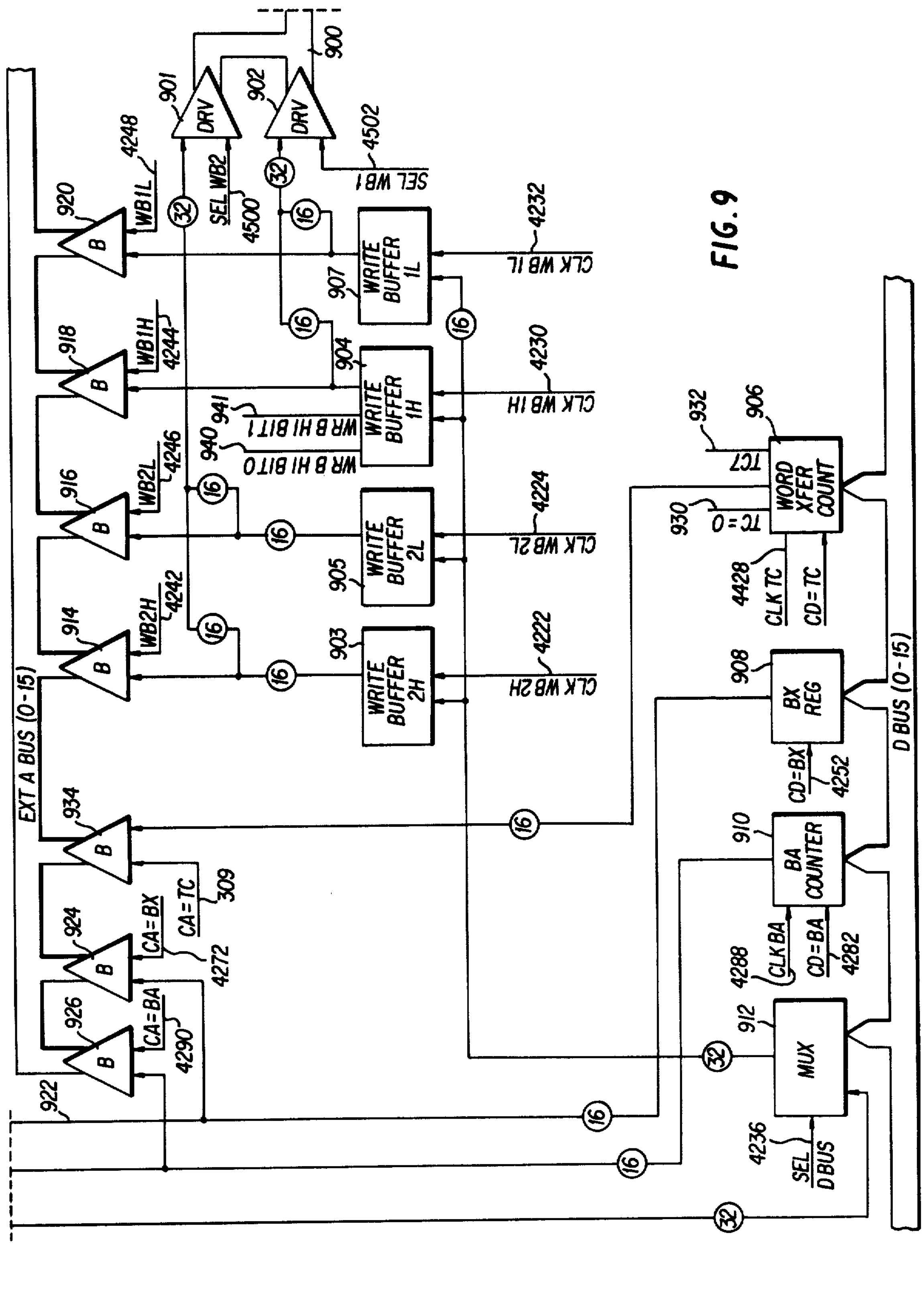
Figure 10:
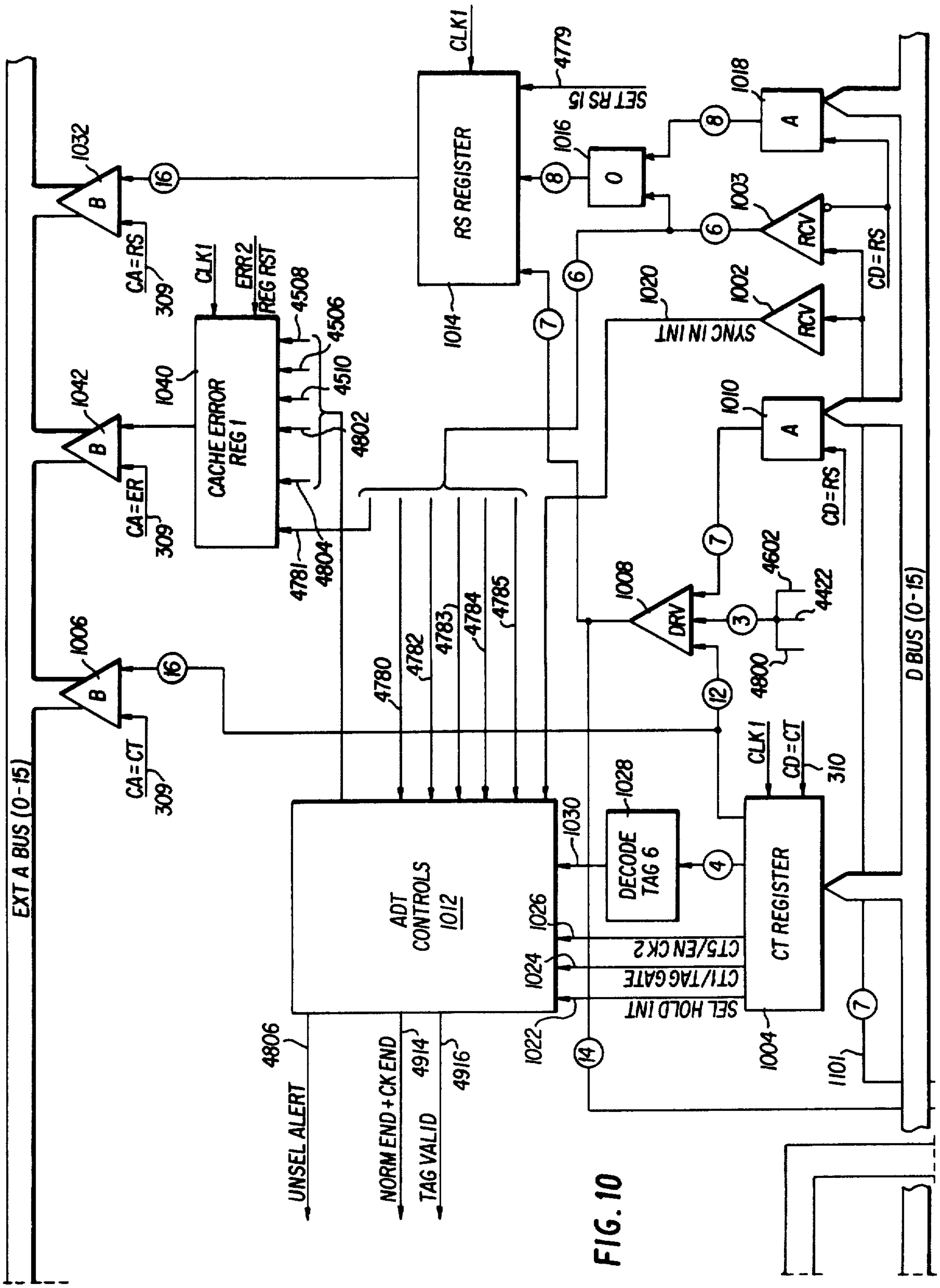
Figure 11:
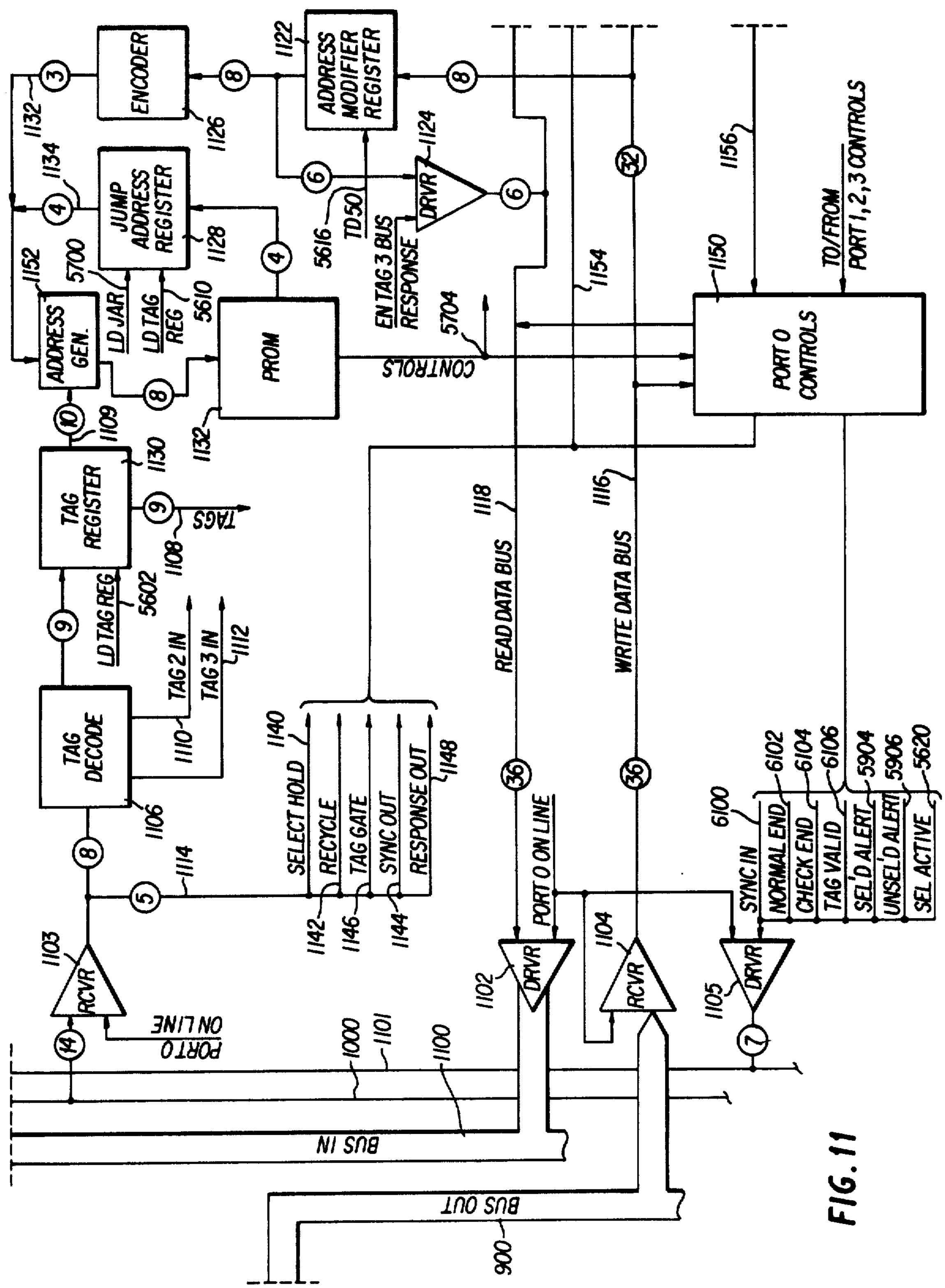
FIGS. 11-13 comprise a block diagram of a single cache storage unit.
Figure 20:
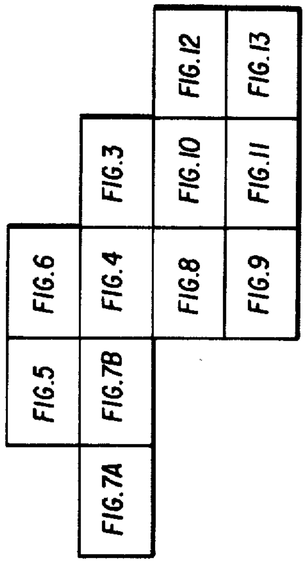
FIG. 20 illustrates how FIGS. 3-13 may be arranged to form a block diagram of a single storage control unit connected to a single cache storage unit.

FIGS. 3–13, when arranged as shown in FIG. 20, comprise a block diagram of an SCU like SCU 100 connected to a single CSU like CSU 104. FIGS. 3–10 comprise a block diagram of the SCU while FIG. 11 shows a single memory port through which an SDT 1200 or a cache store 1300 may be accessed.

Referring now to the SCU of FIGS. 3–10, the SCU has a plurality of buses including a 32-bit BD BUS (FIGS. 3, 4, 6, 7B and 8) and a plurality of 16-bit buses designated the A BUS (FIG. 4), the B BUS (FIG. 4), the BRANCH BUS (FIGS. 4, 5, 6 and 7B), the D BUS and the Extended A BUS (EXT A BUS). In most instances the D BUS extends along the bottom of each figure while the EXT A BUS extends along the top. Within the SCU, bit 0 of a bus is the high order bit.

CONTROL WORD FORMAT AND MICROPROCESSOR OPERATION

Figure 3:
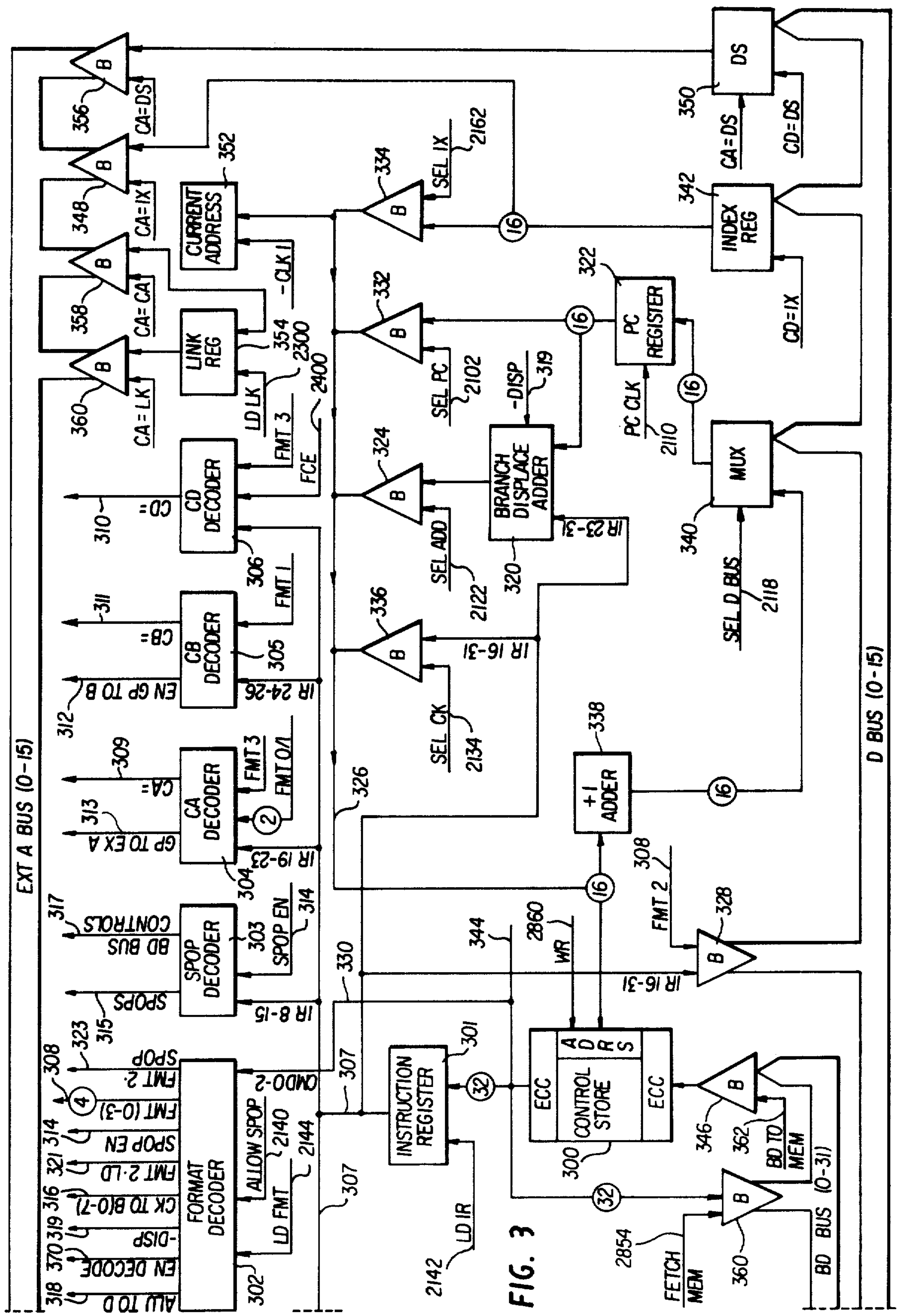
FIGS. 3-10 comprise a block diagram of a single storage control unit.
Figure 4:
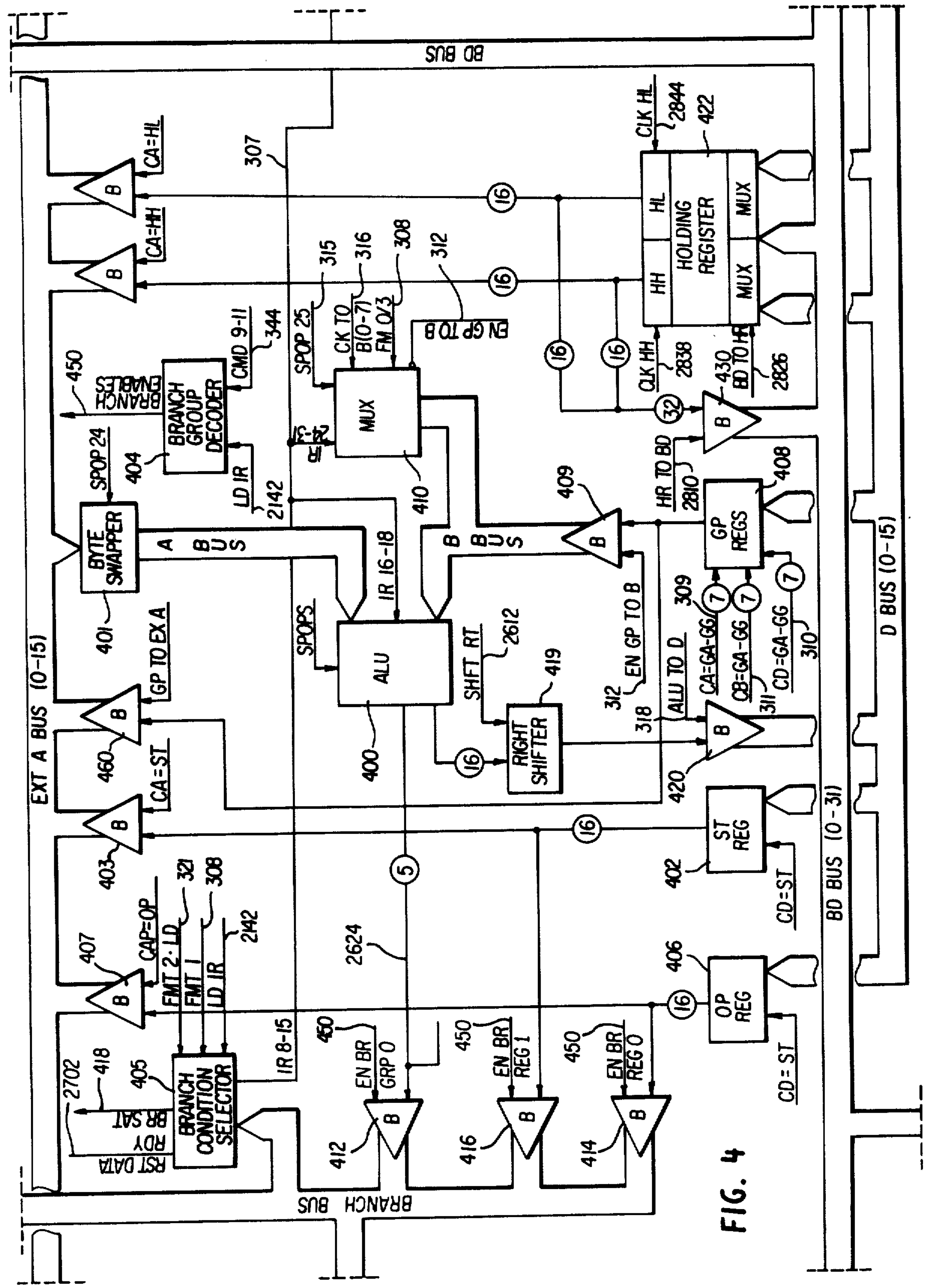

The processor and control circuits 112 (FIG. 1) are shown in block form in FIGS. 3 and 4 and include a Control Store 300 and an arithmetic logic unit (ALU) 400. The EXT A BUS is a source bus for supplying an operand through a byte swapper 401 and over the A BUS to one set of inputs of ALU 400. Various registers and counters throughout the SCU each have their outputs connected through a set of gated buffers to the EXT A BUS so that upon application of an addressing signal to a particular set of gated buffers the contents of the associated register are placed on the EXT A BUS. For example, an ST register 402 is a 16 bit register having its outputs connected to a set of 16 gated buffers 403. When the gated buffers 403 receive the addressing signal CA=ST the contents of the ST register 402 are gated onto the EXT A BUS from which they pass through the byte swapper 401 to the ALU 400. Any data on the EXT A BUS is passed through byte swapper 401 unchanged unless the signal SPOP 24 is true in which case the high order byte (8 bits) is interchanged with the low order byte as the data passes through the byte swapper 401. The output of the ALU 400 is applied to the D BUS which serves as the destination bus.

The addressing signals which are supplied to the gated buffers connected to the A BUS are derived by decoding control words stored in the control store 300. The control store 300 is initially loaded from a floppy disk or other suitable means (not shown) and is provided with error detection and correction circuitry (ECC) of conventional design at both its data input and output for detecting double errors and detecting and correcting single bit errors in a word. The control store is 40 bits wide but stores control and data words 32 bits in length. When a word is applied to the input of the control store the ECC circuitry generates an 8-bit code which is stored with the word. Upon read-out of a word, it is checked for errors and the 8-bit correction code stripped therefrom. The remaining 32 bits are applied to an Instruction Register (IR) 301. A control word is entered into IR 301 only upon occurrence of the signal LOAD IR on lead 2142. Signals representing a control word contained in IR 301 are distributed over a BUS 307 to a format decoder 302, a special operation (SPOP) decoder 303, a CA decoder 304, a CB decoder 305, a CD decoder 306, and a branch condition selector 405.

A control word may have one of four formats as illustrated in FIGS. 14A–14D. Bits 0 and 1 of a control word define its format. Therefore IR bits 0 and 1 are applied to a format decoder 302 which produces one of the four signals FMT0–FMT3 identifying the format of the control word. Actually, because of timing considerations, bits 0–2 of a control word are applied directly to decoder 302 over leads 330 at the same time they are loaded into the IR register. However, it is convenient to refer to these bits as IR0–IR2. The signals FMT0–FMT3 are distributed throughout the SCU for various control functions. The format decoder includes three latches which are loaded only if enabled by the signal LOAD FORMAT on lead 2144 as subsequently described. The format decoder also conditionally produces other control signals as subsequently described.

Bits 19–23 of format 0, format 1, and format 3 control words define a source address (CA) which designates the address of a register whose contents are to be gated onto the EXT A BUS. For formats 0 and 1 bits 19–23 define one set of registers and for format 3 bits 19–23 define a second set of (diagnostic) registers. Bits 19–23 of the instruction register are applied to the CA decoder 304 together with FMT0, FMT1 and FMT3 signals. CA decoder 304 has a plurality of output leads 309 and for formats 0, 1, and 3 one of the leads 309 is energized depending upon the value (other than 0) in bits 19–23 of the instruction register. Assume for example that bits 19–23 of a control word have the hexadecimal value 0F. If the control word is a format 0 or format 1 control word then the CA decoder 304 produces on one of the leads 309 the signal CA=OP. In FIG. 4, the signal CA=OP enables a set of gated buffers 407 to gate the contents of an operations register (OP) 406 onto the EXT A BUS.

If the format decoder 302 produces the signal FMT3 it is applied to the CA decoder 304 and acts as an additional higher order bit of an address. Thus, if the CA field of a format 3 control word contains the hexadecimal address 0F, the CA decoder 304 responds to the CA field and the format 3 signal to activate that one of the leads 309 corresponding to address 2F. As shown in FIG. 14D, address 2F is the address of the ST register 402 thus, the CA decoder produces the signals CA=ST on lead 309 which is applied to the set of gated buffers 403 to gate contents of the ST register onto the EXT A BUS.

The CA decoder 304 also produces the signal GP TO EXT A on lead 313 if any one of seven general purpose registers 408 is addressed. This signal occurs when CA has a value from 01 to 07 and is applied to a set of gated buffers 460 to gate the contents of the selected GP register onto the EXT A BUS.

For all formats bits 3–7 of a control word define the destination (CD) of an operand on the D BUS. Bit positions IR 3–7 are applied to the CD decoder 306 together with the signals FMT3 and FILE CLOCK ENABLE. The CD decoder 306 produces an output signal on a single one of a plurality of output leads 310 indicating the address of the register which is to accept the operand from the D BUS. The CD decoder treats the format 3 signal in the same manner as the CA decoder 304. For example, if the CD field of a format 0, format 1, or format 2 control word has the value 0F then decoder 306 produces on a lead 310 the signal CD=OP which is applied to the OP register 406 to gate the operand on the D BUS into the register. On the other hand, if the CD field has the value 0F and the control word is a format 3 control word then the CD decoder 306 produces the signal CD=ST on a lead 310 and this signal is applied to the ST register 402 to gate the operand from the D BUS into the register.

Bits 24–36 of a format 1 control word define the address CB of one of seven general purpose registers GA–GG which may serve as the source of an operand to be applied to the B BUS input of ALU 400. Bits 24–26 of the instruction register are applied to the CB decoder 305 together with the signal FMT1. If bits 24–26 have a value other than 0, and the signal FMT1 is true the CB decoder 305 produces on one of seven leads 311 an addressing signal CB=GA–CB=GG. The resulting signal is applied to the general purpose (GP) registers 408 to read out the contents of the selected register. If FMT1 is true and any of bits IR24–26 is true, the CB decoder 305 also produces the signal ENABLE GP TO B. This signal is applied over lead 312 to a set of gated buffers 409 to gate the contents of the selected GP register onto the B BUS.

It should be noted that if the CA and CB fields of a format 1 control word are equal and have a value less than 8 then the addressed GP register may serve not only as the source of an operand applied to ALU 400 but also as the destination for the result produced by ALU 400. For format 0, 1 and 3 control words a register may serve as a source and a destination if CA=CD. Furthermore, it should be noted that if any of the address fields CA, CB, or CD is zero then the field selects no register.

Bits 8-15 of a format 0 or format 3 control word define a special operation (SPOP) field specifying one of 256 possible special operations. In addition, bits 8-15 of a format 2 control word define a special operation if bit 2 of the control word is zero or false. Bits 0-2 from the instruction register are applied to format decoder 302 to together with the signal ALLOW SPOP produced as subsequently described. When the signal ALLOW SPOP is true it permits format decoder 302 to produce the signal ENABLE SPOP on lead 314 if bits 0 and 1 of the control word define format 0 or format 3, or produce the signal FMT2 SPOP on lead 323 if bits 0 and 1 define format 2 and bit 2 of the control word is false.

The signal ENABLE SPOP on lead 314 is applied to the SPOP decoder 303 together with IR 8-15. The SPOP decoder decodes bits 8-15 and produces on one of a plurality of leads 315 a signal indicating the particular special operation which is to be performed. Although there are 256 possible special operations, only certain of these operations are necessary for an understanding of the present invention and these are listed in Table I.

TABLE I

SPOP CODES

| HEXADECIMAL CODE VALUE | SPECIAL OPERATION |
|---|---|
| 11 | HR TO STAGING BUFFER VIA BX REGISTER |
| 12 | DR TO STAGING BUFFER VIA BX REGISTER |
| 13 | SR TO STAGING BUFFER VIA BX REGISTER |
| 14 | FETCH INTO HR FROM STAGING BUFFER VIA BX REGISTER |
| 15 | FETCH INTO DR FROM STAGING BUFFER VIA BX REGISTER |
| 16 | FETCH INTO SR FROM STAGING BUFFER VIA BX REGISTER |
| 21 | SHIFT RIGHT ONE BIT WITH EXTENSION SHIFT IN |
| 22 | SHIFT RIGHT ONE BIT WITH ZERO SHIFT IN |
| 24 | BYTE SWAP THE A-BUS ENTRY |
| 25 | SET DEFAULT CK BYTE TO 'FF' |
| 29 | RESET SHIFT EXTENSION |
| 2A | RESET STATUS REGISTER |
| 2B | RESET CARRY SAVE |
| 2C | SET CARRY SAVE |
| 2D | RESET D-BUS NOT ZERO SAVE |
| 2E | SET D-BUS NOT ZERO SAVE IF D-BUS IS NOT ZERO |
| 2F | RESET ILXEQ BRANCH |
| 30-3F | SET ST0-STF |
| 40-4F | RESET ST0-STF |
| 56 | SET DUAL PORT COMMUNICATION CONDITION IN TWIN SCU |
| 57 | RESET DUAL PORT COMMUNICATION CONDITION IN TWIN SCU |
| 80 | NO OPERATION |
| 81 | SET ALLOW INDEX BRANCH |
| 82 | RESET ALLOW INDEX & INDEX BRANCH |
| 83 | RESET CACHE/ADT BRANCHES |
| 84 | RESET DATA READY, AM FOUND, DATA SEARCH, SR BRANCHES |
| 85 | INITIALIZE BYTE COUNT AT SYNC BYTE |
| 86 | INITIALIZE BYTE COUNT |
| 8F | ALLOW DISABLE OF CHANNEL C |
| 90 | RESET INHIB |
| 97 | ENABLE CHANNEL D INTERFACE |
| 98 | LOAD BUFFER ADDRESS |
| 99 | DISABLE CHANNEL INTERFACES |
| 9A | ENABLE CHANNEL A INTERFACE |
| 9B | ALLOW DISABLE OF CHANNEL B |
| 9C | ALLOW DISABLE OF CHANNEL A |
| 9D | UNFREEZE CHANNEL SWITCH |
| 9E | FREEZE CHANNEL SWITCH |
| 9F | RESET EF BRANCH |
| A0 | RESET WRITE BUFFER REGISTERS (WH AND WL) |
| A1 | RESET READ BUFFER REGISTERS (RH AND RL) |
| AF | ALTERNATE REGISTER SELECT (FULL CYCLE) |
| E0 | HR TO CONTROL STORE VIA CK FIELD |
| E1 | CONTROL STORE TO HR VIA CK FIELD |
| E2 | DR TO HR REGISTER |
| E3 | DR TO SR REGISTER |
| E4 | SR TO HR REGISTER |
| E5 | SR TO DR REGISTER |
| E6 | HR TO DR REGISTER |
| E7 | HR TO SR REGISTER |
| E9 | HR TO CONTROL-STORE VIA IX REGISTER |
| EA | DR TO CONTROL-STORE VIA IX REGISTER |
| EB | SR TO CONTROL-STORE VIA IX REGISTER |
| ED | CONTROL-STORE TO HR VIA IX |
| EE | CONTROL-STORE TO DR VIA IX |

TABLE I-continued

| SPOP CODES | |
|---|---|
| HEXADECIMAL CODE VALUE | SPECIAL OPERATION |
| EF | CONTROL-STORE TO SR VIA IX |

Figure 21:
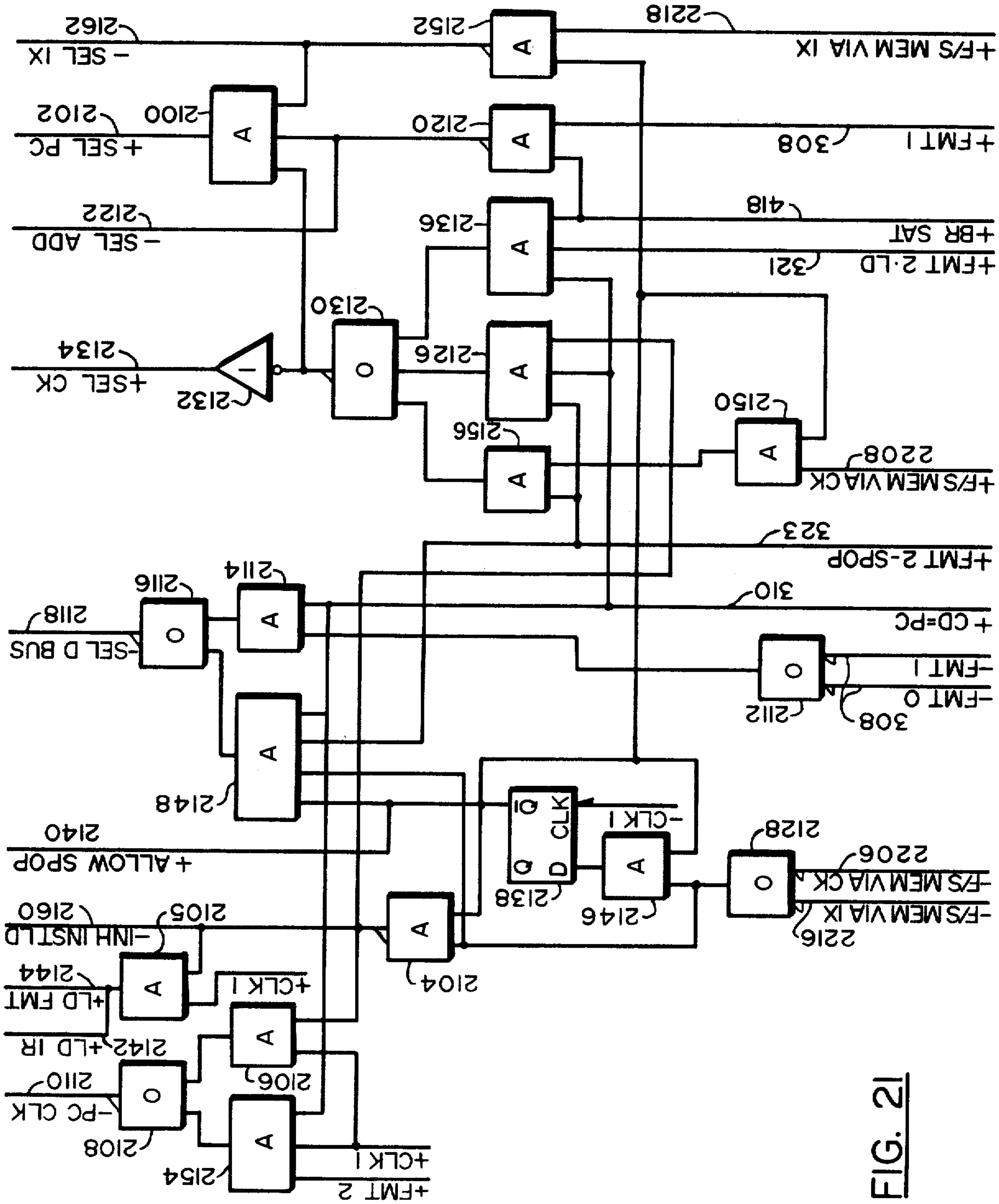

In addition to providing the SPOP signals, the SPOP decoder 303 produces various control signals on leads 317 for controlling the transfer of data over the BD BUS. As will be evident when the circuit of FIG. 21 is described, the BD BUS control signals select an operand source and an operand destination for the BD BUS and, if the destination is control store 300, generates signals to store the operand.

Bits 24–31 of a format 0 or format 3 control word define an 8 bit constant CK which may be utilized as an operand. Bits IR 24–31 are applied to a multiplexer (MUX) 410 and gated from the MUX to either the high order bits (0–7) or the low order bits (8–15) of the B BUS. If bit 2 of the control word is false then CK is placed on the low order positions (8–15) of the B BUS and if bit 2 is a 1 then CK is placed on the high order positions (0–7). Format decoder 302 receives the signals IR0–IR2 and if bit 2 is true in a format 0 or a format 3 control word it generates the signal CK to B (0–7) on lead 316 to gate CK onto the high order bit positions of the B BUS. The bit positions of the B BUS which do not receive CK do receive from MUX 410 either the value FF (all ones) or 00 (all zeros) as subsequently described with reference to FIG. 25.

Bits 8–15 of a format 1 control word define a branch condition which, if met, causes a branch operation. The branch condition field is divided into subfields as illustrated in FIG. 14B. Bits 12–15 select one of 16 bits on the branch bus for testing. Bit 9 specifies either a branch register or a branch group for testing. Bits 10 and 11 identify either the group branch number or the branch register number. Bit 8 specifies whether the condition to be tested is for a zero bit or a one bit.

As an insturction is read from the control store 300 into IR 301, bits 9–11 of the control word are applied over bus 244 to a branch group decoder 404 while IR bits 8–15 are applied to the branch condition selector 405 and bits 0 and 1 are applied to format decoder 302. The signal LOAD IR gates the control word into decoder 404. When bits 0 and 1 specify a format 1 control word the format decoder produces the signal FMT 1 which is applied as an enabling signal to the branch selector 405. The branch group decoder decodes bits 9–11 and produces a signal on one of fine leads 450. These signals are ENABLE BRANCH GROUP 0 which is applied to a set of gated buffers 412, ENABLE BRANCH GROUP 1 which is applied to a set of gated buffers 763, ENABLE BRANCH GROUP 2 which is applied to a set of gated buffers 528, ENABLE BRANCH REGISTER 0 which is applied to a set of gated buffers 414 or ENABLE BRANCH REGISTER 1 which is applied to a set of gated buffers 416. The buffers 412 gate onto the branch bus a combination of signals representing various conditions within the processor. The buffers 763 gate onto the branch bus signals representing various conditions in the device interface. Buffers 528 gate onto the BRANCH BUS signals representing conditions in the channel interface and buffers 414 and 416 gate onto the branch bus signals representing the contents of the OP register and ST register, respectively. The value gated onto the branch bus is applied to the Branch Condition Selector 405 where a particular bit position, specified by IR 12–15 is checked for the condition specified by IR 8. Table II summarizes the various branch conditions which may be tested for. These conditions may also be treated for using a format 2 control word with bit 2=1 to conditionally load a register.

TABLE II

| BRANCH/LOAD CONDITIONS | |
|---|---|
| Hexadecimal Code Value | |
| 10–1F | BRANCH FOR OP REGISTER BITS 0–F |
| 20 | INLINE ROUTINE ACTIVE (ST0) |
| 21 | 8470 DRIVE SELECTED - EFF2 (ST1) |
| 22 | TRACE ACTIVE (ST2) |
| 23 | 8450 DRIVE SELECTED - EFF1 (ST3) |
| 24–2F | BRANCH FOR ST REGISTER BITS 4–F |
| — | |
| 40 | FLOPPY DISK DATA READY |
| 41 | CARRY SAVE |
| 42 | D-BUS ≠ ZERO |
| 43 | SHIFT EXTEND |
| — | |
| 45 | CARRY |
| 46 | D-BUS = 0 |
| 47 | INLINE MODE — CE PANEL SWITCH NOT IN NORMAL MODE |
| 48 | INLINE EXECUTE |
| 49 | CHECK 1 ERROR |
| 4A | CHECK 2 ERROR |
| 4B | DUAL PORT COMMUNICATION (SET BY TWIN SCU'S EXECUTION OF SP SDPCOM) (RESET BY TWIN SCU'S EXECUTION OF SP RDPCOM) |
| 4C | SELECTIVE RESET (INTERNAL RESET) |
| 4D | STACK OVERFLOW |
| 4E | STACK UNDERFLOW |

TABLE II-continued

| Hexadecimal Code Value | BRANCH/LOAD CONDITIONS |
|---|---|
| 50 | ECC P0H1=0, POLO=0, P1=PO, P2=PO, AND P3=PO |
| 51 | BC REGISTER EQUALS THE BYTE COUNTER |
| 52 | CACHE TRANSFER COUNT = 0 |
| 53 | RETRY BYTE COUNTER (WHICH STARTS COUNT AT VALUE IN RB REG) EQUALS COUNT LOADED IN RW BITS 10-15 |
| 54 | DATA READY (WRITE—PFDR IS EMPTY, READ—DR IS FULL) |
| 55 | SELECTED INDEX (WHEN ALLOWED BY SPOP ENINDEX) |
| 56 | INDEX OR DATA READY |
| — | |
| 58 | NO DATA GOOD (BR GOES AWAY WHEN DATA GOOD OCCURS) |
| 59 | TAG VALID ON CUCI INTERFACE |
| 5A | NORMAL/CHECK END |
| 5B | TAG VALID ON CUDI INTERFACE |
| 5C | ADDRESS MARK FOUND |
| 5D | SEPARATED DATA DETECTED DURING SEP DATA SEARCH (RW6) |
| 5E | UNSELECTED ALERT1 |
| 60 | EXTERNAL FUNCTION |
| 61 | OUTPUT KNOWLEDGE |
| 62 | CHANNEL WORD COUNT = 0 |
| 63 | CHANNEL OUTPUT REGISTER EMPTY |
| 64 | CHANNEL BUS OUT PARITY CHECK |
| 65 | CHANNEL BUS OUT PARITY CHECK (FUNCTION WORD) |
| 66 | INPUT ACKNOWLEDGE |
| 67 | DURING WRITE—SR CAN BE UNLOADED VIA BD BUS DURING READ—SR CAN BE LOADED VIA BD BUS |
| 68 | SYSTEM RESET (I/0 CLEAR) |

Figure 27:
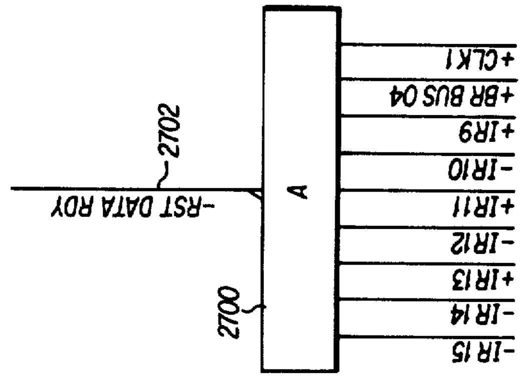

The Branch Condition Selector includes an AND (FIG. 27) which senses for branch condition 54 during transfers between a disk drive and the SCU. An AND 2700 senses bit 4 of the Branch Bus when IR 9-15 specify selection of a Device Branch Register 709, bit 4 for testing. This bit is set when a complete word has been assembled during a read operation, or when the SCU has a word ready for transfer during a write operation. AND 2700 produces the signal −RST DATA RDY to terminate the branch condition.

Bits 16-18 of format 0, format 1, and format 3 control words define one of eight arithmetic operations, these operations being defined at the bottom of FIG. 14A, From the IR 301 bits IR16-18 are applied to ALU 400 which performs the desired operation on the operands placed on the A and/or B BUS. The result of the operation is applied from the ALU 400 through right shifter 419 to a set of gated buffers 420. Format decoder 302 diodes bits 0 and 1 and produces the signal ALU to D on lead 318 for format 0, format 1, or format 3 control words. The signal ALU to D is applied to the gated buffers 420 to gate the output of the ALU onto the D BUS.

Bits 27-31 of a format 1 control word define a displacement value which is added to, or subtracted from the contents of a program counter if the branch condition specified by the branch field is met. Bit 2 of the control word defines whether the displacement value is to be added or substracted from the contents of the program counter. Format decoder 302 decodes IR0-2 and if these bits represent a format 1 control word and bit 2 is a 1, the decoder produces the signal −DISPLACEMENT on lead 319. This signal is applied to a branch displacement adder 320 which receives the output of bits 27-31 of the instruction register 301. The contents of program counter 322 are applied to a second set of inputs of the branch displacement adder 320 and when the signal −DISPLACEMENT is true the value is subtracted from the output of the program counter. If the signal −DISPLACEMENT is false then the displacement value is added to the value from the program counter. The output of the branch displacement adder 320 is applied to a set of gated buffers 324 and gated through the buffers to the address bus 326 for the control store if the branch condition is met.

Bits 16-31 of a format 2 control word define a constant CK. If bit 2 of the control word is zero then CK is unconditionally loaded into the register specified by the CD field. On the other hand, if bit 2 is a 1 then CK is loaded into the register specified by the CD field only if the load condition specified by bits 8-15 is met. The load condition is tested by the branch condition selector 405 in the same manner that format 1 control words are tested for a branch condition. Therefore, bits 9-11 of the control word are applied to branch group decoder 404 and bits IR8-15 are applied to branch condition selector 405. Bits IR0-2 are applied to format decoder 302 and if these bits specify a format 2 control word with bit 2 true, the decoder generates the signal FMT 2 on a lead 308 and the signal FMT2·LOAD on the lead 321. FMT2·LOAD is applied to branch condition selector 405 to enable it to test for the selected condition. FMT2·LOAD is also used as described with reference to FIG. 24 to generate the signal FILE CLOCK ENABLE to enable to CD decoder to select the destination register if the load condition is met. In any event the constant CK from bits 16-31 of the instruction register is applied to a set of gated buffers 328 which are further enabled by the FMT 2 signal to place CK on the D BUS.

Generally speaking, a control word is read out of the control store 300 during CK 1 and loaded in*o the IR Register 301. Decoding of the control word and development of a resultant from the ALU 400 takes place during the interval between clock pulses. At the next CLK 1 the result on the D Bus is entered into the selected destination register and the next control word is read from the Control Store 300 into the IR register.

CONTROL STORE ADDRESSING

As illustrated in FIG. 3, the control store 300 may be addressed by an address gated onto Address Bus 326 from one of four sets of gated buffers 324, 332, 334, or 336. Sequential addresses in control store 300 are selected utilizing the program counter comprising a register 322 and a +1 adder 338. During normal sequential selection of addresses AND 2100 (FIG. 21) is enabled so that the signal +SELECT PC on lead 2102 is true. This signal is applied to gate buffers 332 to gate the contents of the PC register to the addressing inputs of the control store to select a desired address which is then read out of the control store at the next CLK 1.

At the same time, the address on the address bus is also passed through the +1 adder 338 where it is incremented, and then applied through MUX 340 to the PC Register where it is latched therein at CLK 1. Shortly after CLK 1, the instruction decoding circuits previously described generate the signals which cause +SELECT PC to again be generated to place the next address on address bus 326. The addressing signals are allowed to settle until the next CLK 1 when the contents of the selected address are again sampled.

Instead of returning an incremented address to the PC register, the PC register may be loaded with an entirely different address. If a format 0 or format 1 control word is being executed OR 2112 produces an output signal to enabe an AND 2114. If the CD field of the control word specifies the program counter as the destination the signal +CD=PC passes through AND 2114 and OR 2116 to produce the signal −SELECT D BUS on lead 2118. This signal is applied to MUX 340 so that the value on the D BUS is gated through the MUX to PC register 322. At the next following CLOCK 1 the signal PC CLOCK on lead 2110 loads the value into the PC register. If the signal +SELECT PC on lead 2102 is true the contents of the PC register are made available to the ADDRESS BUS 326 to select the next address. However, for format 1 control words the signal +SELECT PC will be false if the branch condition tested for is satisfied. Under these conditions the signals BRANCH SATISFIED on lead 418 and FORMAT 1 on lead 308 enable AND 2120 and its output blocks AND 2100 so that the signal +SELECT PC is false and the signal −SELECT ADDER is true. The output of the PC register 322 is applied to the branch displacement adder 320 where the displacement value from bits 27–31 of the instruction register is either added or subtracted therefrom depending upon whether bit 2 of the control word is true or false. If bit 2 is true the format decoder 302 produces the signal −DISPLACEMENT to cause a subtraction operation to take place in the displacement adder 320. The signal −SELECT ADDER is applied over lead 2122 to the gated buffers 324. This enables the resulting output from the adder 320 to be placed on the ADDRESS BUS 326. The value entered into the PC register from the D BUS remains therein as the next instruction to be executed.

On a format 1 control word where the branch condition is met and the CD field does not specify the program counter, the output of the displacement adder 320 is utilized to address the control store and is then incremented in adder 338 and returned through MUX 340 to the PC register as the anticipated next instruction.

If a format 2 control word having CD=PC, bit 2 false, and the SPOP code is one other than a memory fetch/store, the 16-bit constant field of the control word is utilized as the next control store address. Bits 0–2 from the instruction register cause format decoder 302 to produce the signal FMT2·SPOP. This signal is applied to an AND 2126. This signal CD=PC enables a second input of AND 2126. Since it is assumed that this instruction does not involve a memory fetch/store, the output of OR 2128 blocks AND 2104 and the false output of AND 2104 enables AND 2126. The output of AND 2126 passes through OR 2130 and inverter 2132 to become the signal +SELECT CK on lead 2134. This signal is applied to gate buffers 336 so that immediately after the instruction is decoded the value from the constant field is placed on the memory address bus 326. At the end of the instruction cycle at the next CLK 1 pulse, the contents of the address specified by the address on bus 326 are read from control store 300. Also, the value CK is passed through adder 338 and MUX 340 so that it is clocked into the PC register at the trailing edge of CLOCK 1. Thus, the next instruction executed is CK +1.

The PC register 322 may also be loaded with the value in the CK field of a format 2 control word if bit 2 is set, the CD field specifies PC, and the branch condition is satisfied. Bits 0–2 are applied to the format decoder 302 which produces the signal FORMAT 2·LOAD on lead 321. This signal is applied to one input of AND 2136. If the branch condition is met the branch condition selector 405 produces the signal BRANCH SATISIFIED on lead 418 to enable the second input of AND 2136. This AND is further enabled when the CD decoder 306 produces the signal CD=PC. The output of AND 2136 then passes through OR 2130 and inverter 2132 to become the signal +SELECT CK which is applied to gated buffers 336. The CK value on ADDRESS BUS 326 addresses the control store 300, is incremented in adder 338 and passed through MUX 340 so that on the trailing edge of the next CLOCK 1, CK +1 in entered into the PC register 322.

All of the foregoing method of addressing control store 300 require only a single cycle for execution. That is, the instruction is completely executed in the interval between the trailing edges of two consecutive clock pulses. In each of the addressing methods described above the AND 2104 remains blocked thereby enabling AND 2106 and making the signal −INHIBIT INSTRUCTION LOAD false. CLK 1 pulses thus pass through AND 2105 to generate +LOAD FMT which enables the loading of the IR register 301 and the format decoder 302. The false output of AND 2104 also enables AND 2106 so that CLK 1 pulses pass through AND 2106 and OR 2108 to become the PC CLOCK signals which enable the loading of the PC register.

Some instruction require two cycles for execution. A format 2 control word with bit 2=0 requires two execution cycles if the SPOP field defines one of the special operations E0 or E1. These operations control the transfer of data (fetch or store) between an address in control store 300 and a holding register 422, the address in the control store being defined by the CK field of the control word.

During the CLOCK 1 interval in which a format 2 control word specifying SPOP E0 or E1 is read from the control store, the output of OR 2128 will be false and the latch 2138 will be in its normal or reset state. Thus, the signal +ALLOW SPOP is true and this signal is applied over lead 2140 to condition format decoder 302. The output of OR 2128 blocks AND 2104 so that a CLK 1 pulse is passed through AND 2106 to generate the signal +LOAD IR on lead 2142 and +LOAD FORMAT on lead 2144. These signals are applied to instruction register 301 and format decoder 302 in order to lead these registers in the same manner as for single cycle instructions.

Bits 0, 2, and 8–14 of the command are taken directly from the control store output over a bus 344 to an AND 2200. If the control word read from the control store and loaded into the instruction register is a format 2 control word with bit 2=0 and the value E0 or E1 is in the SPOP field, AND 2200 produces a low level output to a latch 2202. At the end of CLK 1 which loads the instruction into the instruction register, the signal +LOAD IR on lead 2142 goes false and passes through an inverter 2204 to reset latch 2202 and make the signals −F/S MEMORY VIA CK and +F/S MEMORY VIA CK true.

The signal −F/S MEMORY VIA CK is applied over lead 2206 and through OR 2128 to enable AND 2104. The output of AND 2104 goes false in preparation for inhibiting the loading of the format decoder and instruction register the next time the memory is addressed. The output of OR 2128 is also applied through an AND 2146 to the input of latch 2138. However, the latch is not set until the trailing edge of the next CLK 1 pulse. Meanwhile, the output of latch 2138 enables ANDS 2148, 2150, and 2152. A second input to AND 2148 is enabled by the output of OR 2128. Also, at this time the format decoder 302 is producing the signal +FORMAT 2·SPOP on lead 323. The signal on lead 323 is connected to one input of ANDs 2148, 2152, and 2126. Finally, since the signal +F/S MEMORY VIA CK is true AND 2150 produces an output signal to enable AND 2156. The operation of the addressing circuits at this point depends upon whether the CD field of the control word specifies the address of the PC register.

Assumes first that CD≠PC. AND 2156 generates an output signal through OR 2130 and inverter 2132 to produce the signal +SELECT CK. This gates the constant field from the instruction register onto the memory ADDRESS BUS 326 as the address of the next instruction. The PC register 322, which contains the address of the prior instruction +1, does not change because the true output of AND 2104 blocks AND 2106 and prevents the generation of −PC CLOCK which would otherwise load the register.

Assume now that the CD field of the control word has the value CD=PC. The CD decoder 306 produces the signal +CD=PC on lead 310 and this signal enables ANDs 2126, 2148 and 2154. AND 2156 is fully conditioned and produces an output signal through OR 2130 and inverter 2132 to generate the signal +SELECT CK which is applied to gated buffers 336 to gate the constant field from the control word onto the Address Bus 326.

All inputs to AND 2148 are enabled so it produces an output through OR 2116 to generate the signal −SELECT D BUS on lead 2118. This enables the MUX 340 to receive an operand from the D Bus. The format decoder 302 is producing the signal FMT2 so the CK field of the control word in the instruction register is passed through gated buffers 328 onto the D Bus from whence it passes through MUX 340 to the PC Register 322. Upon occurrence of (CLK) 1 all imputs to AND 2154 are enabled and its output enables OR 2108 to produce the signal −PC CLOCK which gates the CK field from the instruction register into the PC register.

Thus, when CD=PC the PC register is loaded with CK and when CD is not equal to PC the PC register is loaded with the address of the prior instruction plus 1. Regardless of the operation of the addressing circuits, the CK placed on the Memory Address Bus 326 is utilized at the next clock 1 to address control store 300 for the purpose of fetching/storing the specified address. If the word is read from the control store it is not entered into the instruction register 301. The output of AND 2104 inhibits AND 2105 and prevents the loading of either the instruction register or the format decoder. Thus, the instruction register and format decoder retain the information from the control word read from the control store during the prior cycle. Also, since the signal LOAD IR is not generated the latch 2200 is not clocked and remains set for a second cycle. In addition, CLK 1 sets latch 2138 so that during the second cycle of the instruction the signal +ALLOW SPOP is false to prohibit a second decoding of the special operation.

In summary, the control word is read from the control store at a first clock 1. Between the first clock 1 and the next succeeding clock 1 CK is placed on the memory address bus and the special operation is decoded to set up the source and address gating on the BD Bus. At the next clock 1 the memory is addressed at address CK and the operand is tranferred over the BD Bus between the control store and the holding register. During the second cycle of the instruction nothing takes place except the setting up of the address in the PC Register on the Memory Address Bus 326 for the purpose of addressing the next control word at the third clock pulse.

Format 0 and format 3 control words and format 2 control words having bit 2=0 require two cycles for execution if the SPOP field designates one of the special operations E9–EF. These operations call for a fetch or store from the control store at an address specified by an Index Register (IX) 342. When the control word is read from the control store and entered into IR 301 it is also applied over bus 344 to a decoder 2210 and an AND 2212. Decoder 2210 decodes bits 0–2 of the control word and produces an output signal to inhibit AND 2212 if the control word has format 1 or if it has format 2 with bit 2=1. Under all other conditions the outputs from decoder 2210 enable three inputs of AND 2212. AND 2212 receives bits 8–12 of the control word and if the SPOP field of the control word contains one of the values E9–EF all of these inputs further enable AND 2212. Thus, for a format 0 or format 3 control word, or for a format 2 control word with bit 2=0, the output of AND 2212 is true. This output enables the resetting of latch 2214. The actual resetting of the latch takes place immediately after the control word is loaded into instruction register 301, when +LOAD IR goes false. The signal +LOAD IR is passed through inverter 2204 to clock the latch.

When the latch 2214 is reset it produces the signals −F/S MEMORY VIA IX on lead 2216 and +F/S MEMORY VIA IX on lead 2218. In FIG. 21, −F/S MEMORY VIA IX is applied to OR 2128 while the signal +F/S MEMORY VIA IX is applied to AND 2152. The output of OR 2128 together with the output of latch 2138 enables AND 2104 so that upon occurrence of the next clock pulse no signal will be generated to load IR or the format decoder.

Since the latch 2138 is in the reset condition at this time, the signal +F/S MEMORY VIA IX passes through AND 2152 to generate the signal −SELECT IX. This signal is applied over lead 2162 to the set of gated buffers 334 to place the contents of IR 342 on the Memory Address Bus 326. Meanwhile, the instruction loaded into IR 301 is decoded and the SPOP decoder 303 produces the necessary control signals for transferring the anticipated data between the control store 300 and one of the registers connected to the BD bus. The control store is accessed at the next CLK 1 pulse and the data transfer accomplished. At the next succeeding clock pulse latches 2138 and 2214 are cleared.

Regardless of which type of F/S MEMORY VIA IX control word is being executed, the PC register 322 is loaded from adder 338 with the address of the previous control word plus one at the same time the F/S MEMORY VIA IX control word is accessed. However, the control of the PC register varies depending upon the format of the F/S MEMORY VIA IX control word and whether or not the CD field of the control word specifies the PC register.

Considering first format 0 where CD≠PC, the contents of PC register 322 do not change during the two cycles required to execute the control word. The output of AND 2104 blocks AND 2106 thereby preventing generation of the signal −PC CLOCK which would load the PC register with a new value. During the first cycle of execution of the instruction the signal −SELECT IX which gates the contents of the index register onto the Memory Address Bus 326 inhibits AND 2100 thus making the signal +SELECT PC false and inhibiting the output of the PC register to the memory address bus. However, when the latch 2138 is set at the beginning of the second cycle of execution its output blocks AND 2152. This in turn terminates the signals SELECT IX and enables AND 2100 to produce +SELECT PC which gates the contents of the PC register onto the memory address bus as the address of the next instruction.

For a format 0 control word wherein the SPOP field specifies an F/S MEMORY VIA IX, and CD−PC, the signal −SELECT D BUS on lead 2118 is true throughout both cycles of execution. The signal +CD=PC enables one input of AND 2114 while the signal −FMT0, acting through OR 2112, enables a second input of the AND. AND 2114 thus enables OR 2116 to produce the signal −SELECT D BUS which enables MUX 340 to pass the contents of the D Bus to PC Register 322. However, the PC register is not loaded until the end of the second execution cycle of the instruction. At the end of the first instruction cycle the output of AND 2104 is still true and blocks AND 2106 so that the signal −PC CLOCK cannot be generated to load the PC register. However, by the end of the second execution cycle the output of AND 2104 is false and a CLK 1 pulse passes through the AND 2106 and OR 2108 to gate into the PC register whatever value happens to be on the D Bus. The signal −SELECT IX gates the contents of the IR 342 onto the memory address bus during the first cycle of execution but the output of latch 2138 drives −SELECT IX false so that AND 2100 produces the signal +SELECT PC to select the contents of the PC register as the address placed on the Memory Address Bus 326 during the second cycle of execution.

For a F/S MEMORY VIA IX format 2 control word wherein CD=PC, the output of AND 2152 generates the signal −SELECT IX to place the contents of IR 342 on the memory address bus during the first execution cycle. Also, during this cycle all inputs to AND 2148 are true thereby causing OR 2116 to produce the signal −SELECT D BUS. As shown in FIG. 2, the CK field of the instruction word is gated through gated buffers 328 onto the D bus by the FMT2 signal, and the value on the D bus is gated through MUX 340 by the signal −SELECT D BUS. At the end of the first execution cycle a CLK 1 pulse passes through AND 2154 and OR 2108 to generate the signal −PC CLOCK on lead 2110. This signal loads the Pc register 322 with the value from the CK field of the control word. During the second execution cycle of the control word, the signal −SELECT IX is false so AND 2100 is enabled to generate the signal +SELECT PC. This signal gates the contents of the PC register through gated buffers 332 onto the memory address bus to select the address of the next following control word.

The microprocessor circuits of FIG. 3 also include a push-down data stack (DS) 350, a current address (CA) register 352 and a link register (LR) 354. IX 342, DS 350, CA 352 and LR 354 have their outputs connected to the EXT A bus through sets of gated buffers 348, 356, 358 and 360, respectively.

A value on the D bus is entered on the top of the data stack when field CD of a control word specifies the address DS. The top operand in the stack is placed on the EXT A bus when the CA field of a control word specifies the DS register. In this case the signal CA−DS pops the top operand from the stack and also gates the operand through gated buffers 356 to the EXT A bus.

Figures 22, 23, 24, 25:
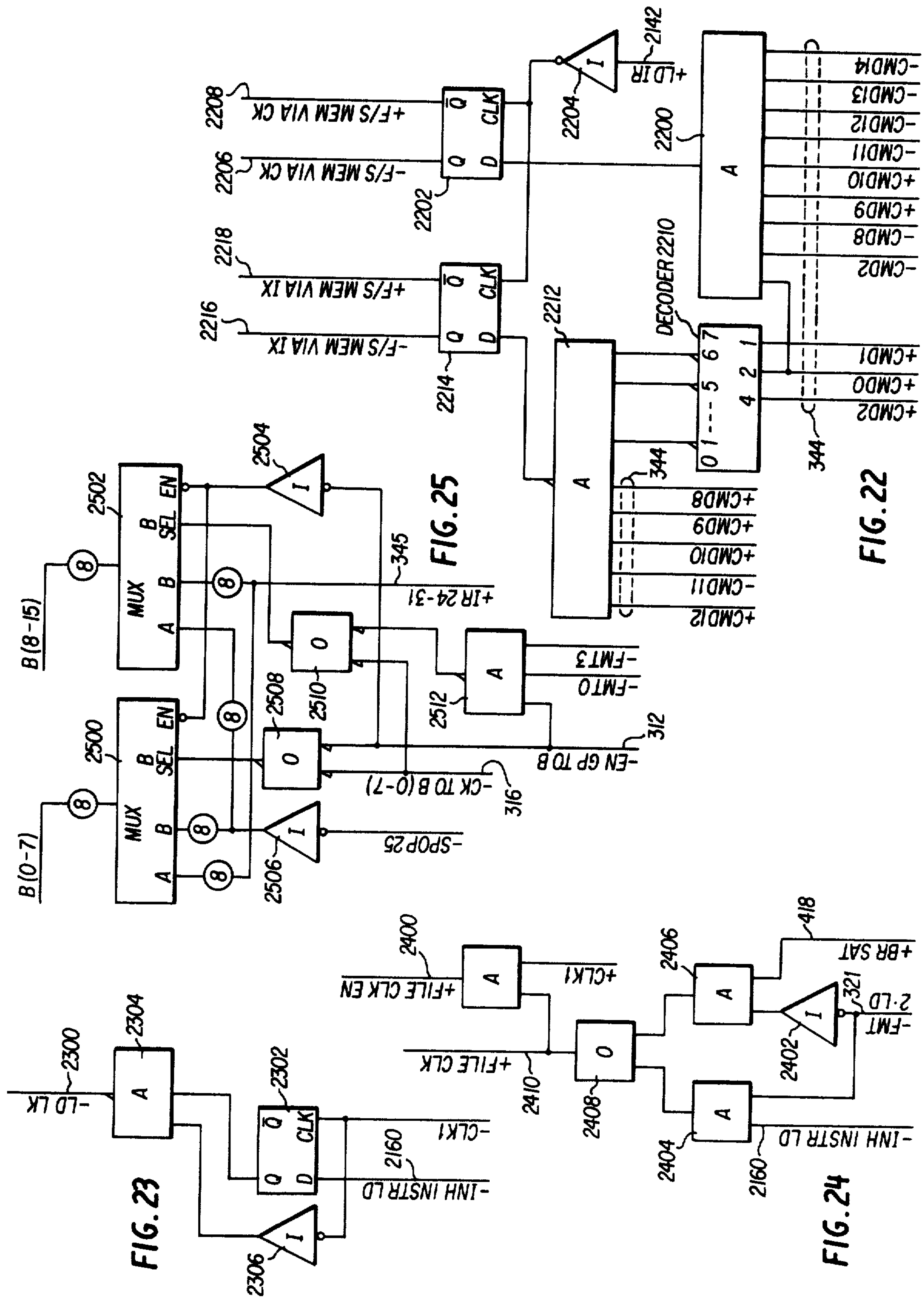

CA 352 is loaded at each CLK 1 with the value present on the Memory Address Bus 326. Thus, the current address register contains during any given cycle the address present on the memory address bus during the previous cycle. In addition to being connected to the EXT A bus through gated buffers 358, the contents of CA 352 are applied to LR 354. The contents of CA are entered into LR upon occurrence of the signal LOAD LINK on lead 2300. As shown in FIG. 23, the signal −INHIBIT INSTRUCTION LOAD is applied to the D input of a latch 2302 which in turn has its output connected to one input of an AND 2304. The latch is clocked by −CLK 1 which is also passed through an inverter 2306 to a second input of AND 2304. Normally the signal −INHIBIT INSTRUCTION LOAD is false and the latch 2302 is reset thereby blocking AND 2304. However, any time a two-cycle instruction is executed as previously described, the latch 2302 is set to enable AND 2304 which then passes the CLK 1 pulse to generate the signal −LOAD LINK. This stores the current address in the link register for a program return at some later time. A control word may be executed to address the link register, pass it unchanged through the ALU 400, and return it to the PC register 322 over the D bus via MUX 340.

FIG. 25 shows the details of the MUX 410. The MUX 410 comprises two 2X8 multiplexers 2500 and 2502. MUX 2500 has its outpus connected to the high order bits 0-7 of the B bus while the outputs of MUX 2502 are connected to the low order bits 8-15 of the B bus. The signal −ENABLE GP TO B is passed through an inverter 2504 and applied to the enabling inputs of both MUXs. Therefore, the MUXs are enabled during the execution of format 0, format 2 or format 3 control words, and during the execution of format 1 control words if the CB field contains all zeroes so that no GP register 408 is selected.

Bits 24-31 of the instruction register are applied over bus 345 to the A inputs of MUX 2500 and the B inputs of MUX 2502. The signal −SPOP 25 is passed through an inverter 2506 and applied to the B inputs of MUX 2500 and the A inputs of MUX 2502.

The A inputs of the MUXs are normally selected for gating to the outputs. A high level signal at the B select input selects the operand at the B input of the multiplexer for application to its output. The B select input of MUX 2500 is connected to the output of an OR 2508 which receives the signals −CK TO B (0-7) and −ENABLE GP TO B. The B select input of MUX 2502 is connected to the output of an OR 2510 which receives the signals −CK TO B (0-7) and the output of an AND 2512. AND 2512 produces a true output only when −FMT0, −FMT3, and −ENABLE GP TO B are all false.

Consider for example the operation of the multiplexer during the execution of a format 0 control word with bit 2 equal 1. Under these conditions the format decoder 302 produces the signals −FMT0 and −CK TO B (0-7). The latter signal passes through ORs 2508 and 2510 to inhibit the B selection of both MUXs. Thus, the value CK from IR 24-31 is gated through the A inputs of MUX 2500 to the eight high order positions of the B Bus. At the same time, a value of all zeros or all ones is placed on the eight low order positions of the B Bus. If the control word specifies SPOP 25 the signal −SPOP 25 passes through inverter 2506 to apply all ones through MUX 2502 to the B Bus. If SPOP 25 is not specifed by the control word then the output of inverter 2506 causes all zeroes to be applied to the eight low order positions of the B Bus.

If bit 2 of a format 0 control word is a zero, then the constant value from the control word is entered on the eight low order bit positions of the B Bus and the high order bit positions are loaded with zeros or one depending upon whether the SPOP field does or does not contain SPOP 25. In this case all inputs to ORs 2508 and 2510 are false and the outputs enable the B select inputs of MUXs 2500 and 2502. The constant CK from 24-31 word passes over bus 345 and through MUX 2502 to the B Bus low order positions. At the same time, the output of inverter 2506 passes all ones or all zeros through MUX 2500 to the high order bit positions of the B Bus depending upon whether the SPOP field does or does not specify SPOP 25.

The operation of the multiplexer circuit for format 3 control words is exactly the same as that for format 0.

In resonse to format 2 control words, or format 1 control words where CB=0, the signals −CK TO B (0-7) and −ENABLE GP TO B are both false so that the B input of MUX 2500 and the A inputs of MUX 2502 are selected. This permits the placing of all zeros or all ones on all positions of the B Bus depending upon whether or not the control word calls for SPOP 25.

ALU

Figure 26:
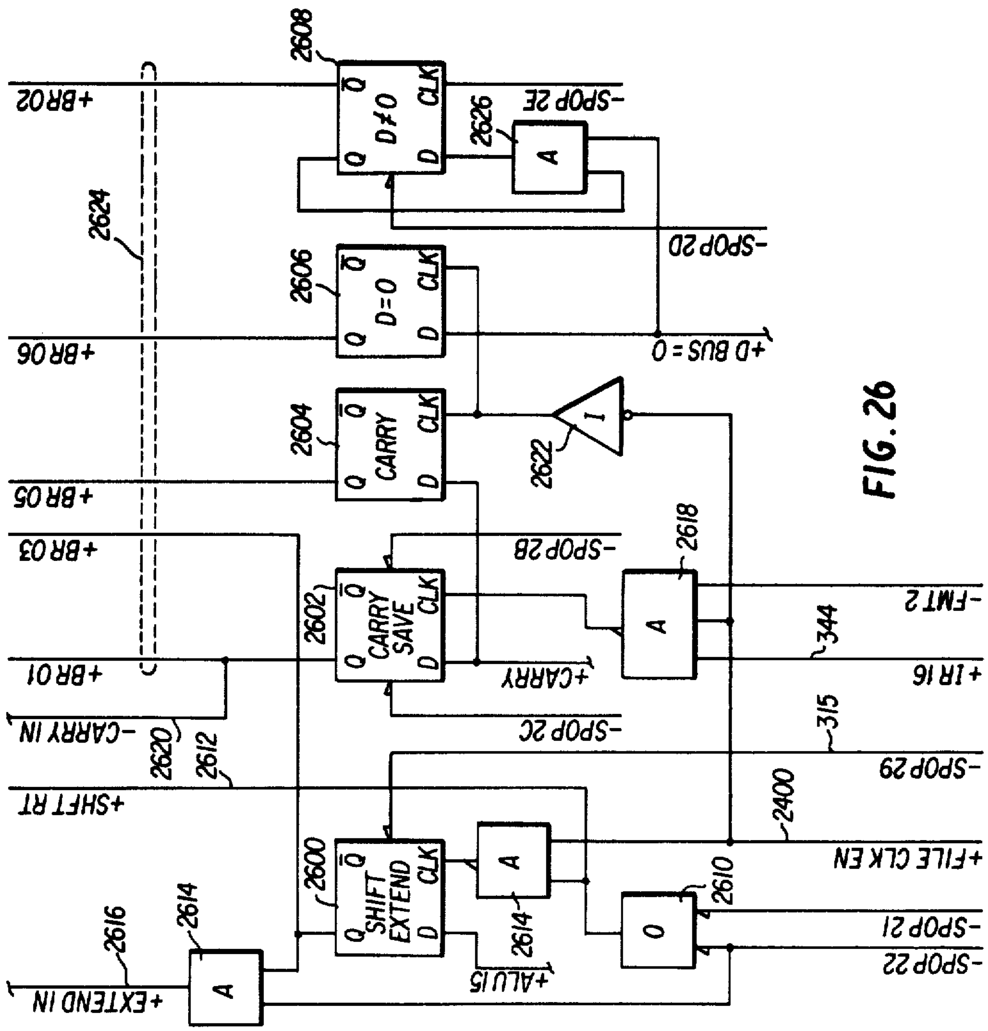

The ALU 400 contains conventional circuits (not shown) for performing binary addition, subtraction or logicl operations on 16-bit operands applied to it over the A and/or B Buses. In addition, the ALU 400 includes five latches as shown in FIG. 26. These latches include a Shift Extend Latch 2600, A Carry Save Latch 2602, a Carry Latch 2604, a D=0 Latch 2606 and a D≠0 Latch 2608. An OR 2610 receives the signals −-SPOP 21 and −SPOP 22 from SPOP decoder 303 and produces the signal −SHIFT RIGHT on lead 2612 if the control word being executed specifies a right shift (see Table I) with either extension shift in or zero shift in. The signal +SHIFT RIGHT is applied to the right shifter 419 to right shift the result obtained from ALU 400 one bit position as the result passes through the shifter to the D Bus.

The output of OR 2610 is applied to an AND 2614 which also receives the signal +FILE CLOCK ENABLE. Thus, for SPOP 21 and SPOP 22, the latch 2600 is clocked at clock 1 time if +FILE CLOCK ENABLE IS true. The latch 2600 is set if +ALU 15 is true and is reset if +ALU 15 is false. This signal represents the output of the low order of the ALU.

When latch 2600 is set it enables one input of AND 2614. The other input is controlled by the signal −SPOP 22. If −SPOP 22 is true it inhibits AND 2614 so that the signal −EXTEND IN on lead 2616 is false. This signal is applied to the high order stage of the ALU to enter a zero therein. On the other hand, if −SPOP 22 is false the output of latch 2600 passes through AND 2614 to apply a one to the high order position of the ALU.

When the SPOP decoder 303 produces the signal −SPOP 29, the signal is applied to the reset input of latch 2600 to immediately reset the latch.

The Carry Save latch 2602 receives at its data input the signal −CARRY which represents the carry output from the arithemetic circuits of the ALU 400. The Carry Save latch 2602 is clocked by the output of an AND 2618 which receives the signals −FILE CLOCK ENABLE, +IR 16 and −FMT 2. Thus, the Carry Save latch is clocked during the execution of each format 0, format 1 or format 3 control word if the ALU field calls for addition or substraction with carry in/out or subtrction with carry out.The output of latch 2602 is the signal −CARRY IN which is applied to the carry input of the arithemetic circuits in ALU 400. The latch 2602 may also be set or reset from the SPOP field of a control word. The signal SPOP 2B resets the latch while the signal −SPOP 2C sets it.

Carry latch 2604 is clocked by the signal +FILE CLOCK ENABLE which is passed through an inverter 2622 before being applied to the latch. The data input of the carry latch receives the signal +CARRY. The Carry latch is utilized as an overflow indicator and its output is connected as one of the leads in a cable 2624 to one of the gated buffers 412 so that when the signal ENABLE BRANCH GROUP 0 occurs the output of the Carry Latch 2604 is gated onto big position 5 of the Branch bus. At the same time, the outputs of latches 2600, 2602, 2606 and 2608 are also gated onto the Branch Bus. A detector circuit (not shown) monitors the D Bus and produces at its output the signal +D BUS=0 anytime the value on the D Bus is 0, The signal +D BUS=0 is applied to the data input of latch 2606 and to one input of an AND 2626. Latch 2606 is clocked by the output of inverter 2622 upon occurrence of the signal +FILE CLOCK ENABLE. The output of latch 2606 is applied to bit position 6 of the Branch bus through one of the gated buffers 412.

the D≠0 latch 2608 is set by the signal −SPOP 2D. The set output of the latch is connected to AND 2626 so as long as the latch is set the signal D BUS=0 is applied to the data input of the latch. The latch is clocked by the signal −SPOP 2E. If the contents of the D Bus are 0 at the time −SPOP 2E occurs, the latch remains set. However, if the contents of the D Bus are not 0 then the latch is reset when −SPOP 2E occurs. This generates the signal +BRO2 which is applied over bus 2624 and one of gated buffers 412 to bit position 02 of the Branch Bus.

BD BUS CONTROLS

Figure 28:
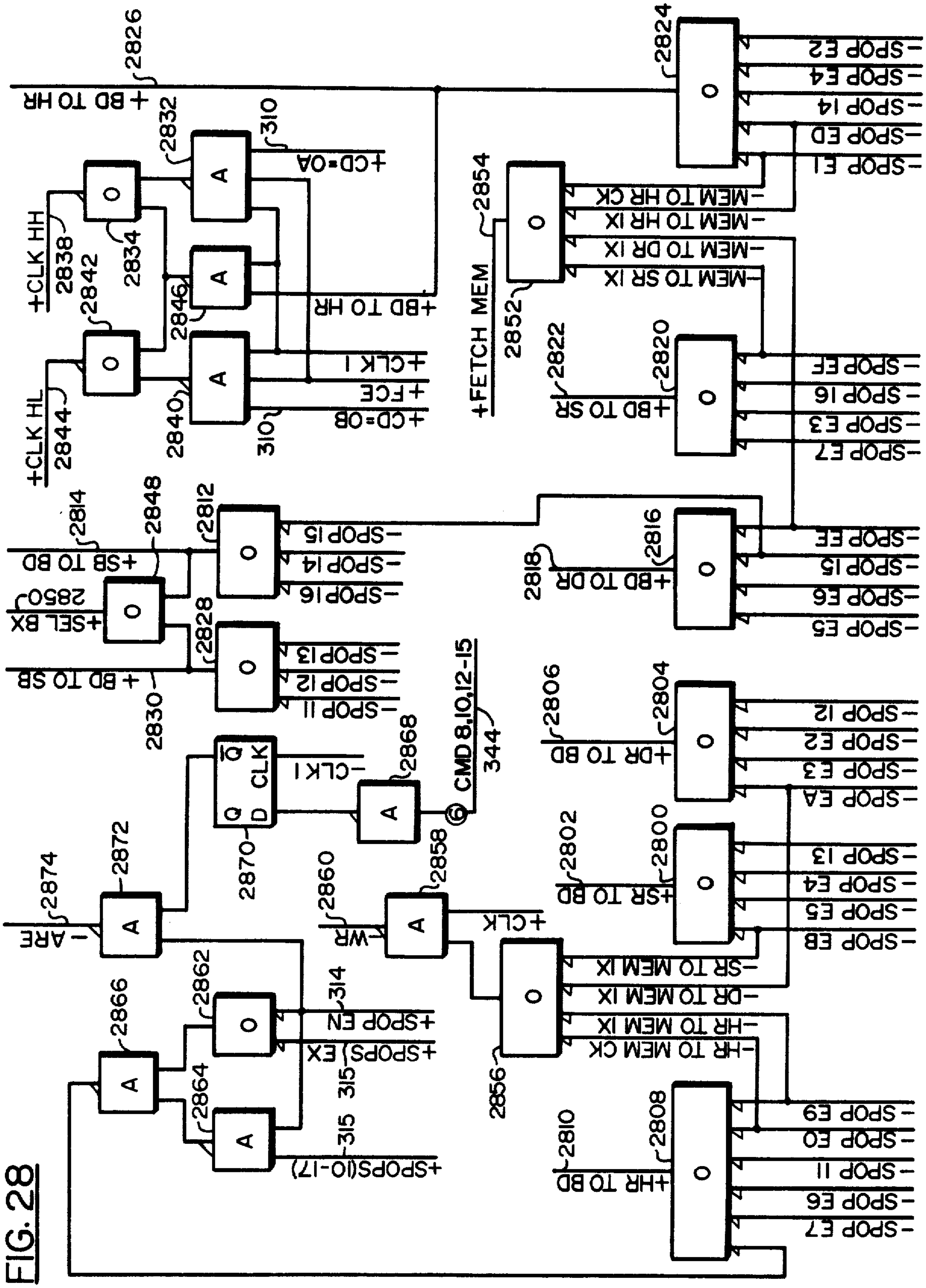

The BD bus controls shown in FIG. 28 operate under the control of SPOP codes 11-16 and EO-EF to select one source and one destination for an operand to be transferred over the BD Bus. The source may be either of two shift registers 602 or 604, a Staging Buffer (SB) 800, the Control Store 300, a Holding Register (HR) 422 or a Data Register (DR) 710. The destination may be D (actually a PFDR register 712), HR 422, Control Store 300, Staging Buffer 800 or Shift Register 602 (SR 1).

All of the SPOP signals applied to FIG. 28 are BD bus control signals derived from SPOP decoder 303. Referring to Table I, it is seen that SPOPS EB, E5, E4 and 13 all require that an SR be the source of the data placed on the BD Bus. Therefore, the signals −SPOP EP, −SPOP E5, −SPOP E4 and −SPOP 13 are all applied to an OR 2800 to generate the signal +SR TO BD. This signal is applied to the circuits of FIG. 38 where, as subsequently described, it causes the generation of one of the signals −SR1 TO BD or −SR2 TO BD. These signals are applied to two sets of gated buffers 600 and 601 so that either the contents of SR1 or SR2 may be placed on the BD Bus.

Figure 7B:
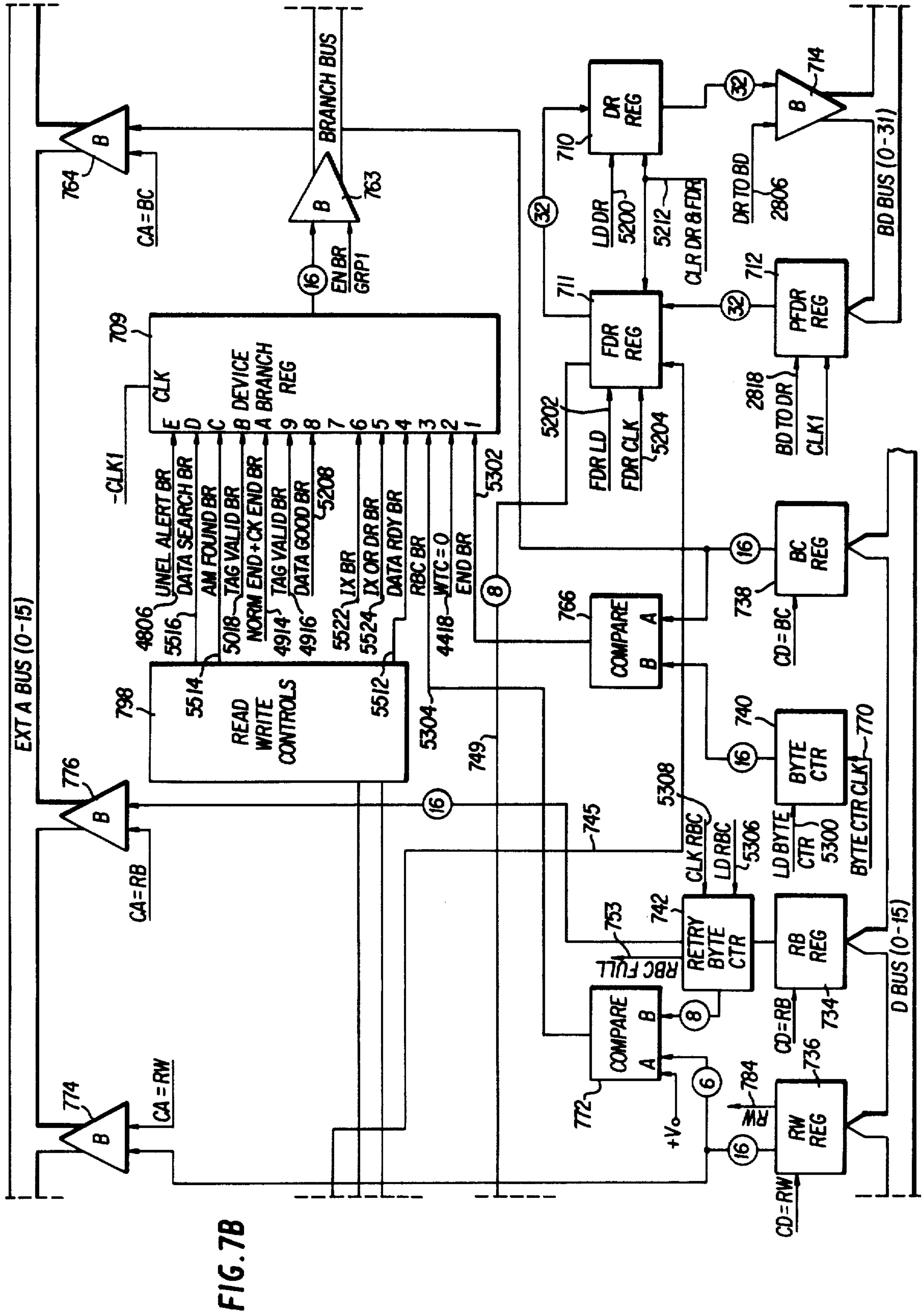

An OR 2804 receives the signals −SPOP EA, −SPOP E3, −SPOP E2 and −SPOP 12 and if one of these signals is true the OR produces the signal +DR TO BD which is applied over lead 2806 to a set of gated buffers 714 (FIG. 7B). This gates the contents of the DR Register 710 onto the BD Bus.

OR 2808 controls the gating of the contents of HR 422 onto the BD Bus. OR 2808 receives the signals −SPOP EO, −SPOP E6, −SPOP E7, −SPOP E9 and −SPOP 11 and if one of these signals is true the OR produces the signal +HR TO BD on lead 2810. This lead is connected to the set of gated buffers 430 to gate the contents of HR 422 onto the BD bus.

SPOPs 14, 15 and 16 all require SB 800 as the source of data for the BD Bus. The signals −SPOP 14, −SPOP 15 and −SPOP 16 are applied to an OR 2812 to generate the signal +SB TO BD on lead 2814. This lead is connected to a set of gated buffers 802 to gate a word read from SB 800 onto the BD Bus.

ORs 2816, 2820, 2824 and 2828 generate the control signals for gating the contents of the BD Bus into a particular register. OR 2816 receives the signals −SPOP E5, −SPOP E6, −SPOP E and −SPOP 15 and if one of these signals is true OR 2816 produces the signal +BD TO DR on lead 2818. This signal is applied to PFDR 712 (FIG. 7B) where the contents of the BD Bus are gated into the register upon occurrence of CLK 1.

OR 2820 generates the signal +BD TO SR if one of the signals −SPOP E3, −SPOP E7, +SPOP EF or −SPOP 16 is true. The signal +BD TO SR is applied to SR1 (FIG. 6) where, upon occurrence of the signal SR CLOCK the valueon the BD Bus is gated into SR1.

OR 2824 received the signals −SPOP E1, −SPOP E2, −SPOP E4, −SPOP ED and −SPOP 14 and if one of these signals is true the OR produces the signal +BD TO HR on lead 2826. this signal is applied to a multiplexer (FIG. 4) on the input of HR 422 to select the BD Bus as an input to the HR.

The HR is functionally divided into two 16-bit registers designated HH and HL and the controls for loading these registers are also shown in FIG. 28. HH may be loaded from the D Bus when the CD field of a control word contains the value 0A. The CD decoder produces the signal +CD=OA which is applied to an AND 2832. This AND is further enabled by +CLK 1 and +FILE CLOCK ENABLE and if all of its inputs are true AND 2832 produces a low level output signal through OR 2834 to drive CLK HH false. This signal is applied to HH. The signal +CLK HH goes true when +CLK 1 goes false and latches a value on the D Bus into the HH register.

An AND 2840 receives the signals +CD=OB, +FILE CLOCK ENABLE and +CLK 1 and has its output connected to an OR 2842. When all inputs to AND 2840 are true it produces a low level output signal to OR 2842 thus causing the OR to produce a low level output signal on lead 2844. When +CLK 1 terminates, OR 2842 drives +CLK HL true. In FIG. 4, +CLK HL is applied to HL to latch a value on the D Bus into the register.

When OR 2824 produces the signal +BD to HR it enables one input of an AND 2846. This AND also receives +CLK 1 and has its output connected to both ORs 2834 and 2842. Thus during CLK 1 both signals +CLK HL and +CLK HH are false and at the end of CLK 1 the signals go true to load both HH and HL. Since the signal +BD TO HR also causes the multiplexer at the input of the holding register to select the BD Bus as the input, the 32-bit value on the BD Bus is loaded into HR with the high order 16 bits going into HH and the low order 16 bits going into HL.

OR 2828 controls the gating of data from the BD Bus into SB 800. OR 2828 receives the signals MINUS SPOP 11, −SPOP 12 and −SPOP 13 and produces the signal +BD TO SB on lead 2830. Lead 2830 is connected to a set of gated buffers 804 which, when enabled, permit the contents of the BD Bus to be applied to SB 800.

The outputs of ORs 2812 and 2828 are applied to an OR 2848 to produce the signal +SELECT BX on lead 2850 if the staging buffer is to serve as either the source or destination of a word on the BD Bus. The signal +SELECT BX is applied to a multiplexer 806 in order to select the source of the address to which the word on the BD Bus is to be written or, from which a word is to be read out onto the BD Bus.

An OR 2852 receives the signals −SPOP E1, −SPOP ED, −SPOP EFand −SPOP EE and if one of these signals is true it indicates that Control Store 300 is the source for placing a word on the BD Bus. If any of its inputs is true OR 2852 produces the signal +FETCH MEMORY on lead 2854. This signal is applied to set of gated buffers 360 in order to gate a word read out of control store 300 onto the BD Bus.

Insofar as the present invention is concerned, any data placed on the BD Bus is applied to the control store 300. That is, the lead 362 may be assumed to be connected to a source of enabling voltage which permanently enables the gated buffers 346. However, data may be written into the control storage 300 only if a control word specifies one of the special operations SPOP E0, SPOP EA, SPOP EB or SPOP E9. The signals −SPOP E0, −SPOP EA, −SPOP EB and −SPOP E9 are applied to an OR 2856 having its output connected to an AND 2858. The AND is tested at clock 1 time and, if one of the inputs to OR 2856 is true AND 2858 produces the signal −WR or Lead 2860. This signal is applied with the address on the Memory Address Bus 326 to the addressing circuits of control store 300 in order to write into the specified address. In the absence of the signal −WR, an address on Memory Address Bus 326 causes the reading of a word from the specified address in control store 300.

If a control word does not call for a special operation or, if the special operation called for is not one of the special operations 10–17 or E0–EF then, by default, the contents of the HR register 422 are placed on the BD Bus. As previously explained, format decoder 302 produces the signal +SPOP ENABLE on lead 314 only when bits 8–15 of the control word specify an SPOP. These conditions are format 2 with bit 2=0, format 0 and format 3. The signal +SPOP ENABLE is applied to an OR 2862 and an AND 2864. If +SPOP ENABLE is false, the outputs of OR 2862 and AND 2864 enable the inputs of AND 2866 which produces an output signal that passes through OR 2808 to generate +HR TO BD thereby conditioning gated buffers 430 to pass the contents of HR onto the BD Bus.

If the signal +SPOP ENABLE is true then the generation of +HR TO BD is contingent upon the absence of a code in bits 8–15 of the control word specifying one of the special operations 10–17 or E0–EF. If bits 8–15 represent one of the values 10–17, SPOP decoder 303 produces the signal +SPOPS (10–17) on one of the leads 315 and this signal enables AND 2864 which in turn blocks AND 2866. In like manner, if bits 8–15 of the control word specify one of the special operations E0–EF then the SPOP decoder 303 produces the signal +SPOPS EX on another of the leads 315. With both inputs to OR 2862 at the high level it produces a low level output signal to block AND 2866. When AND 2866 is blocked under either of these conditions it cannot cause or 2808 to generate +HR TO BD.

The circuits of FIG. 28 also include and AND 2868, a latch 2870 and an AND 2872 which are not involved in BD Bus contol. AND 2868 receives the signals CMD 8, 10 and 12–15 over Bus 344 from the output of the control store and, if these bits have the AF, the output of AND 2868 conditions latch 2870 so that at the end of CLK 1 the latch is reset. The reset output is connected to AND 2872 and, if upon decoding of the control word SPOP decoder 303 generates the signal +SPOP ENABLE, AND 2872 produces the signal −ALTERNATE REGISTER ENABLE (ARE) on lead 2874. As subsequently explained with reference to FIGS. 8 and 9, there are two read buffers and two write buffers each split into an upper half and a lower half. The CD field of a control word is capable of specifying only one of the write buffers or one of the read buffers on any given cycle. The signal −ARE is utilized in FIGS. 42A–42D to select which of the read or which of the write registers is actually utilized during execution of a control word, and select either the BX Register 908 or the Alternate Buffer (AB) counter 910 as the source of the address for addressing SB 800.

CHANNEL INTERFACE

Figure 6:
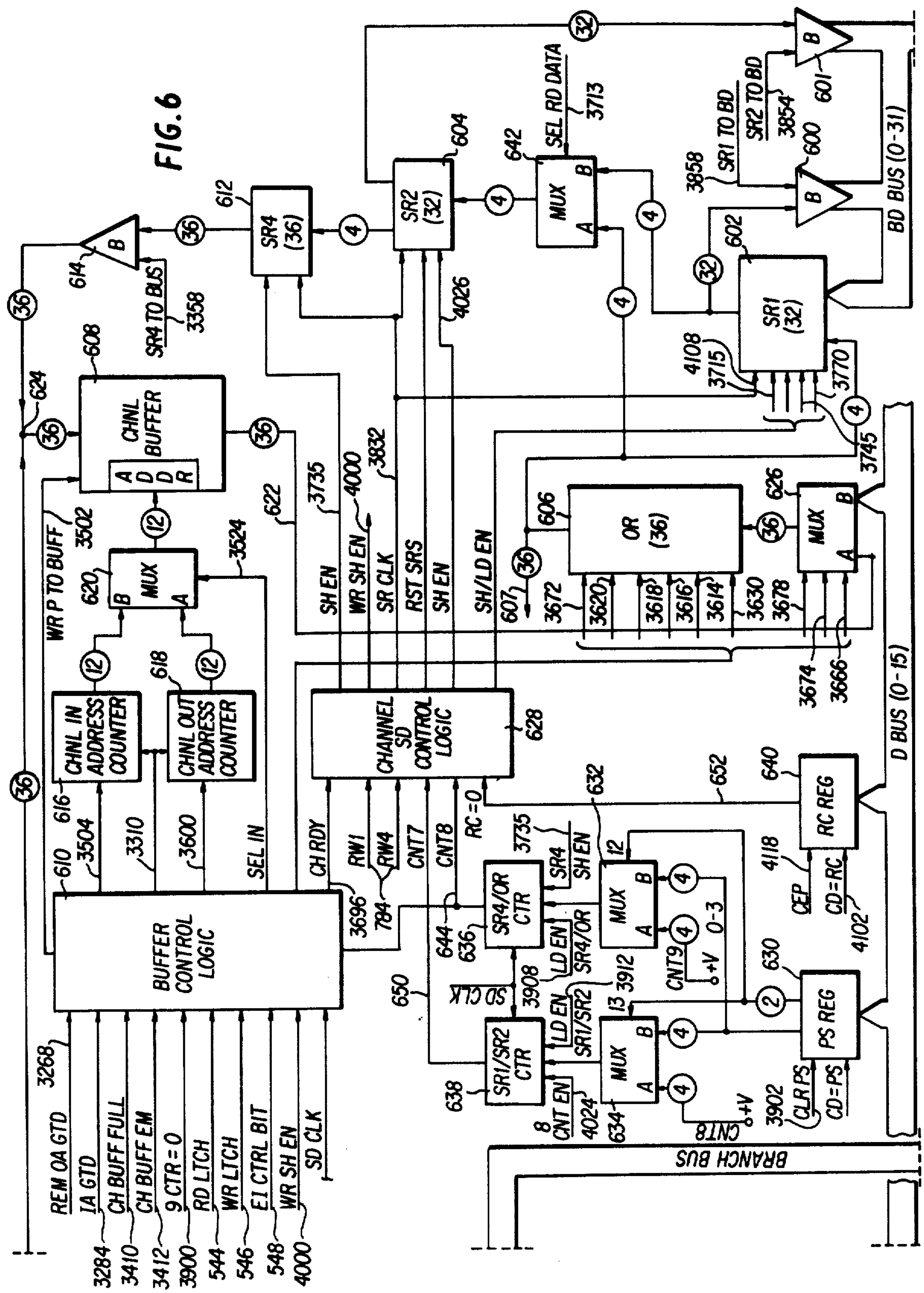

FIGS. 5 and 6 comprise a register level block diagram of the channel interface circuits 114, 116, 118 and 120. Each channel is provided with two sets of receivers 504 and 505 and two sets of drivers 506 and 507. Receivers 504 receive 36-bit output words from a channel over a bus 500 while receivers 505 receive output control signals from the channel over a plurality of leads 501. Drivers 507 provide 36-bit input words to the channel over a bus 503 while drivers 506 provide control signals to the channel over a plurality of leads 502. The receivers 504 have their outputs connected to a 36-bit Function Register (FR) 508 and through a set of gated buffers 510 to a 36-bit input register (IN) 512. The output of FR 508 is connected through a set of gated buffers 514 to the EXT A bus. The receivers 505 have their outputs connected to an input tag decoder 516 to supply control signals (tags) to the SCU from the channel.

FIG. 5 shows only the receivers and drivers for channel A. Channels B, C and D are each provided with sets of receivers 504 and 505, sets of drivers 506 and 507, a Function Register 508 and a set of gated buffers 510. The gated buffers 510 for each of these channels are connected in parallel to the Input Register 512 as indicated by lead 518. The receivers 505 of channels B, C and D are connected to the tag out decoder 516 as indicated by the lead 520. Lead 522 symbolically represents the tag in lines to drivers 506 for channels B, C and D while cable 524 represents the data in bus to the drivers 507 for these channels.

Words supplied to the SCU over Data Out Bus 500 may represent command function words, secondary function words, or output data words, depending on the usage of the associated tag control signals Output Data Request, External Function and Output Acknowledge. A word on Data Out Bus 500 comprises nine 4-bit bytes with bit 0 being the lowest order bit.

The SCU transmits input data to a channel through a set of drivers 507 and over a Data In Bus 503. The input data may represent status words or input data words depending on the associated usage of External Interrupt and Input Data Request control signals.

The Tag Out Bus 501 includes six tag lines for transmitting parity, External Function, Output Acknowledge, Input Acknowledge and I/O Clear signals to the SCU. Two of the tag lines are for transmitting parity bits. Each parity bit represents the odd parity of one-half of the word simultaneously transmitted to the SCU over the Data Out Bus 500.

The External Function (EF) tag is a control pulse sent to the SCU to indicate that the channel is presenting a function word on the data out bus. A forced external function occurs if the EF pulse is activated while the Output Data Request signal is inactive. Words transmitted as forced external functions are interpreted by the SCU to be command words. Function word transmitted to the SCU while the Output Data Request signal is active are interpreted by the SCU to be secondary function words. This type of word is sent to the SCU following a command function word that specifies an appropriate command code. The SCU microprogram activates the Output Data Request signal to request a secondary function word only when required for execution of a command. The number and format of secondary function words depends upon the associated command. Decoding of forced external (command) function words and secondary function words is performed by the microprogram of the SCU stored in control store 300.

The Output Acknowledge (OA) tag is a control pulse sent by the channel to the SCU to indicate that the channel is presenting an output data word on the Data Out Bus 500.

The Input Acknowledge (IA) tag is a pulse sent by the channel to the SCU to indicate that a word on the Data In Bus 503 has been accepted by the channel. IA is sent in response to an External Interrupt signal to indicate acceptance of a status word and is sent in response to an Input Data Request to indicate acceptance of an input data word.

The Input/Output Clear (I/O CLR) tag is a control signal sent by the channel to the SCU to indicate that a subsystem reset should be performed for the channel that issued the I/O CLR. The reset occurs as soon as the SCU is deselected from the other channel interfaces. The SCU performs the reset by clearing internal error conditions, clearing interrupts for appropriate unbusy drives, and returning to the normal microprogram idle loop.

The Tag In Bus 502 includes five lines for transmitting parity, external interrupt, output data request, and input data request signals to the channel. Two of the lines transmit parity bits, each parity bit being the odd parity for one-half of the word simultaneously transmitted over the Data In Bus 503.

The Input Data Request (IDR) tag is a control signal sent by the SCU to the channel to indicate that the SCU is presenting an input data word on Data In Bus 503.

The Output Data Request (ODR) tag is a control signal which is transmitted from the SCU to the channel to indicate that the SCU is ready to receive a word on the Data Out Bus 500. The channel must return an EF signal with the word if the SCU is waiting for a secondary function word and must return an OA signal if the SCU is waiting for an output data word.

The External Interrupt (EI) tag is a control signal sent by the SCU to the channel to indicate that the SCU is presenting a status word on the Data In Bus 503.

Generally, speaking, Tag Out Decoder 516 responds to EF, OA, IA and I/O CLR tags to generate corresponding branch signals. The EF, OA and IA branch signals are entered into a Channel Branch Register 526 and are gated onto the branch bus through a set of gated buffers 528 when the Branch Group Decoder 404 of the processor generates the signal ENABLE BRANCH GROUP 2 on lead 450. The Tag Out Decoder 516 responds to the I/O CLR signal by generating a system reset branch on lead 530 as subsequently described, this signal being applied directly to one of the gated buffers 528 so that it is gated onto bit position 8 of the Branch Bus at the same time the contents of the Channel Branch Register 526 are gated onto bit positions 0–7.

A 12-bit Channel Control (CC) Register 532 is connected to the D Bus and is loaded with channel control information under microporgram control. Each individual bit position of the CC Register 532 represents a specific control signal. Bit positions 0–2 and 4–9 of the CC register are connected to the Tag Out Decoder 516 and the decoder responds to these signals and the tag out from receivers 505 to control a Tag In Encoder 534. Encoder 534 generates the signals EI, ODR and IDR which are sent back to the channel through drivers 506 and the Tag In Bus 502.

A priority circuit 536 receives signals from the Tag Out Decoder 516 and produces no more than one of four priority signals at a time. These signals are identified as SWITCH TO CHANNEL A - SWITCH TO CHANNEL D and when active one of the signals conditions the channel interface circuits for communication between the corresponding channel and the SCU.

Figures 29, 30, 31:
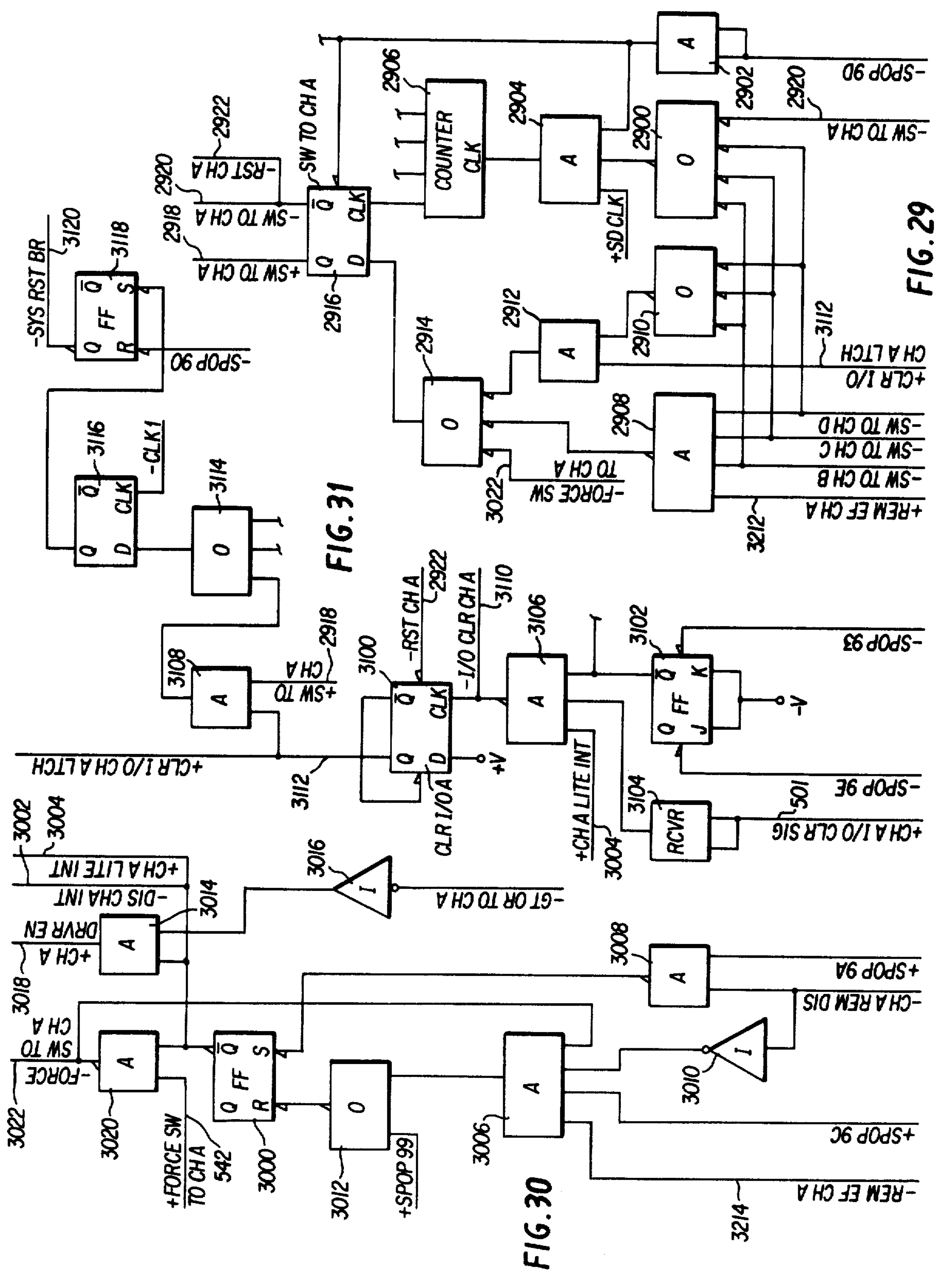

The priority circuit 536 does not actually make a determination of priority between channels. When no channel is active the priority circuit sequentially polls channels A–D looking for a channel which desires access to the SCU. Referring to FIG. 29, the priority circuit 536 includes an OR 2900, two ANDS 2902 and 2904 and a modulo 4 counter 2906. In addition, for each of the four channels the priority circuit 536 includes two ANDs 2908 and 2912, two ORs 2910 and 2914, and a latch 2916. Only the ANDs 2908 and 2912, ORs 2910 and 2914 and latch 2916 for channel A are shown in FIG. 29, it being understood that similar circuits are provided for channels B, C and D. A particular channel is active or "switched to" when its latch 2916 is set.

Assuming that all channels are inactive, the signals −SWITCH TO CHANNEL B, −SWITCH TO CHANNEL C and −SWITCH TO CHANNEL D are all false to enable three inputs of AND 2908 and block OR 2910 and three inputs of OR 2900. The signal −SWITCH TO CHANNEL A is false to block a fourth input to OR 2900. The output of OR 2900 enables one input of AND 2904. The output of AND 2902 is normally true to enable a second input of AND 2904. AND 2904 thus passes SD CLK pulses to successively step the counter 2906. The counter 2906 is a shift register counter having each stage connected to the clock input of a latch 2916 for one of the channels. Thus, as the counter is stepped it successively clocks the latches 2916 for channels A, B, C and D testing for one which is generating an EF signal.

When the microprocessor within the SCU completes a task it enters a program idle loop and during execution of this loop looks for another task to perform. The idle loop includes four format 2 control words having bit 2 and the constant field all zeros. The four control words have in their special operations field the values 9A, 92, 96 and 97, respectively. As each of these control words is executed it sets a flip-flop enabling the interface for an associated channel. For example, the control word having SPOP 9A sets a flip-flop 3000 thus driving the signal −DISABLE CHANNEL A INTERFACE on lead 3002 false and the signal +CHANNEL A LITE INTERFACE on lead 3004 true. During the execution of the succeeding three control words the flips-flop corresponding to flip-flop 3000 but associated with channels B, C and D are set thus enabling these channel interfaces.

A channel may contend for access to the SCU by placing an external function word on the Data Out Bus 500 and an EF tag on the TAG Out Bus 501. Considering channel A, the EF tag from Tag Out Bus 501 is applied to an AND 3200 which corresponds to one of the set of receivers 505. AND 3200 is enabled by the signal −DISABLE CHANNEL A INTERFACE which is false when the flip-flop 3000 is set. The output of AND 3200 enables an AND 3202 and this AND is further enabled by +CHANNEL A LITE INTERFACE on lead 3004 when the flip-flop 3000 is set. The output of AND 3202 is applied to an EF Sync Latch 3204 and an AND 3206. The output of AND 3202 is latched into latch 3204 by +SD CLOCK. The output of latch 3204 enables AND 3206 which produces an output to enable a Remote EF Latch 3208. The output from AND 3206 is latched into latch 3208 by +SD CLK. When the latch 3208 is set it produces the signals +REMOTE EF CHANNEL A and +LOAD CHANNEL A FUNCTION REGISTER on leads 3210 and 3212 and the signal −REMOTE EF CHANNEL A on lead 3214. The signal +LOAD CHANNEL A FUNCTION REGISTER is applied to the Function Register 508 to load the external function word from the Data Out Bus 500 into the function register.

The signal +REMOTE EF CHANNEL A is applied to AND 2908 and, since under the assumed conditions all flip-flops 2916 are reset, AND 2908 is conditioned to produce an output signal through OR 2914 to the input of latch 2916. An operation similar to that just described may occur for one or more of channels A, B C and/or D. However, the latches 2916 for all channels are sequentially polled by counter 2906 and the first latch polled by the counter and found to have its D input enabled is the only one set. This latch in turn produces an output signal to inhibit setting of the latches 2916 for the other channels and also inhibit the stepping of counter 2906. For example, if the latch 2916 for channel B happened to be the one set, then the signal −SWITCH TO CHANNEL B would inhibit AND 2908 for channels A, C and D and would pass through the ORs 2910 to inhibit the ANDs 2912 for channels A, C and D. In addition, the signal −SWITCH TO CHANNEL B passes through OR 2900 to inhibit the AND 2904 and block further stepping of the counter 2906. Since the counter 2906 is not cleared, it begins the next polling operation at the next channel in sequence after the one selected.

Once a latch 2916 is set, it is reset only by executing a control word having SPOP 9D. The signal −SPOP 9D drives the output of AND 2902 false to reset the latches 2916 for all channels. At the same time, the output of AND 2902 inhibits AND 2904 and thus inhibits the stepping of counter 2906.

At the time latch 2916 is set, the signal +SWITCH TO CHANNEL A passes AND 3228, AND 3222 and OR 3224 to the EF Branch Latch 3226. At the end of the next CLK 1 the latch is set and it produces the signal +EF BRANCH on lead 3238. At the following CLK 1 this signal is gated into stage 0 of the Channel Branch Register 526. Subsequent to the four control words mentioned above the idle loop executes one or more format 2 control words with bit 2 set and bits 8-15 having the value EO. These control words cause the contents of the Channel Branch Register 526 to be read out to the Branch Condition Selector 405 where bit 0 is checked to determine if it has been set in response to an EF signal from one of the channels. If an EF signal has been received from any channel, a branch is taken to an initial selection routine, the first instruction address of the routine being in the CK field of the control word. The initial selection routine sets flip-flop 3102 to prevent the selected interface from being cleared by the channel, and branches to a subroutine to transfer the command from Function Register 508 to three of the General Purposes Registers 408.

Once its latch 2916 is set, communication is established between the channel and the SCU. The latch produces the signals +SWITCH TO CHANNEL A, −SWITCH TO CHANNEL A and RESET CHANNEL A.

In FIG. 31, the signal −RESET CHANNEL A resets a Clear I/O A Latch 3100. For each channel there is provided a latch 3100, a JK flip-flop 3102, a receiver 3104, an AND 3106 and an AND 3108. The flip-flop 3102 is set by SPOP 9E in a control word and is reset by an SPOP 93. As long as the flip-flop is reset it conditions one input of AND 3106. The AND is further enabled by the signal −CHANNEL A LITE as long as the Channel Enable Flip-Flop 3000 is set. The third input of AND 3106 is from receiver 3104. Receiver 3104 is one of the receivers in the set of receivers 505 and receives the signal +CHANNEL A I/O CLR from the channel. The positive-going output of AND 3106 clocks the latch 3100. Since the latch 3100 is reset when the latch 2916 is set, and since flip-flop 3102 is set during the initial selection routine, it normally remains set until the program executes a control word with SPOP 93 to reset flip-flop 3102. When the flip-flop 3102 is reset, a Channel A/IO CLR signal received from the channel over lead 501 resets the latch 3100.

The output of AND 3106 is the signal −I/O CLR CHANNEL A. This signal is applied over lead 3110 to the reset input of the EF Sync Latch 3204, and through an OR 3220 to the reset input of the remote EF Latch 3208.

The output of latch 3100 is the signal +CLR I/O CHANNEL A LATCH. When the latch 3100 is set, this signal is applied over lead 3112 to AND 2912. If none of the interfaces B, C or D is active, the output of OR 2910 is enabling AND 2912 so the signal on lead 3112 passes through AND 2912 and OR 2914 to the latch 2916. Furthermore, if channel A is not selected all inputs to OR 2900 are true and SD clock pulses passing through AND 2904 step counter 2906 as previously described. When the counter reaches the count corresponding to channel A the output of OR 2914 is gated into the latch to thereby switch to channel A.

In FIG. 31, the output of latch 3100 also enables 3108 which receives the signal +SWITCH TO CHANNEL A. The output of AND 3108 passes through an OR 3114 to reset a latch 3116. The output of latch 3116 is applied to a flip-flop 3118 to set the flip-flop and generate the signal −SYSTEM RESET BRANCH. This signal is applied over lead 3120 to one of the gated buffers 528 where it is gated onto bit position 8 of the Branch Bus when control word is executed to enable branch group 2. The flip-flop 3118 may be subsequently reset by executing a control word having SPOP 90.

Flip-flops 3102 and 3118, OR 3114 and latch 3116 are common to all four channel interfaces. The remaining elements of FIG. 31 are specific to the channel A interface, and the interfaces for channels B, C and D all have similar circuits each having an output connected to the OR 3114. The output of flip-flop 3102 is connected to an AND like AND 3106 in each of the circuits for channels B, C and D.

The latch 2916 may also be set if OR 2914 receives the signal −FORCE SWITCH TO CHANNEL A. When the control word in the microprogram idle loop sets flip-flop 3000 the output of the flip-flop enables an AND 3020. This AND also receives the signal +FORCE SWITCH TO CHANNEL A which is true when the microprogram sets bit 9 of Channel Control Register 532. With both inputs enabled AND 3002 produces the signal −FORCE SWITCH TO CHANNEL A on lead 3022. This signal passes through OR 2914 to the D input of the latch 2916 and is latched into the latch when the counter 2906 eventually clocks the latch.

The signal −FORCE SWITCH TO CHANNEL A is also applied to one input of an AND 3006. The signal −CHANNEL A REMOTE DISABLE is obtained from a remote switch and is true only when the switch is set in order to disable channel A. Thus, CHANNEL A REMOTE DISABLE normally enables AND 3008 and passes through inverter 3010 to disable AND 3006. AND 3006 has two further inputs which receive the signals −REMOTE EF CHANNEL A and +SPOP 9C. The output of AND 3006 is connected to an OR 3012 which also receives the signal +SPOP 99. The output of OR 3012 is connected to the reset input of flip-flop 3000. Normally, flip-flop 3000 is set by +SPOP 9A when a control word is executed during the microprogram idle loop when the microprogram is polling the channels for further work. The flip-flop 3000 is normally reset when a control word having SPOP 99 is executed thus driving the output of OR 3012 true. The signal SPOP 99 is applied simultaneously to the reset inputs of flip-flops 3000 for channels A, B, C and D.

The signal +SPOP 9C is normally false and diables AND 3006 so that the operation of the remote disable switch does not automatically reset flip-flop 3000. However, if the remote disable switch is set to generate the signal −CHANNEL A REMOTE DISABLE then the flip-flop is reset when a control word having SPOP 9C is subsequently executed. The signal +SPOP 9C then passes through AND 3006 and OR 3012 to reset flip-flop 3000.

When flip-flop 3000 is set it enables an AND 3014. The signal −GATE OR TO CHANNEL A is passed through an inverter 3016 to enable AND 3014 when the Output Register (OR) 606 is loaded as subsequently described and ready for transfer of data over the Data In Bus 503. AND 3014 produces the signal +CHANNEL A DRIVERS ENABLE on lead 3018 and this signal is applied to tag drivers 506 and Data In Bus drivers 507 to enable tags and data to be placed on buses 502 and 503.

Figure 32:
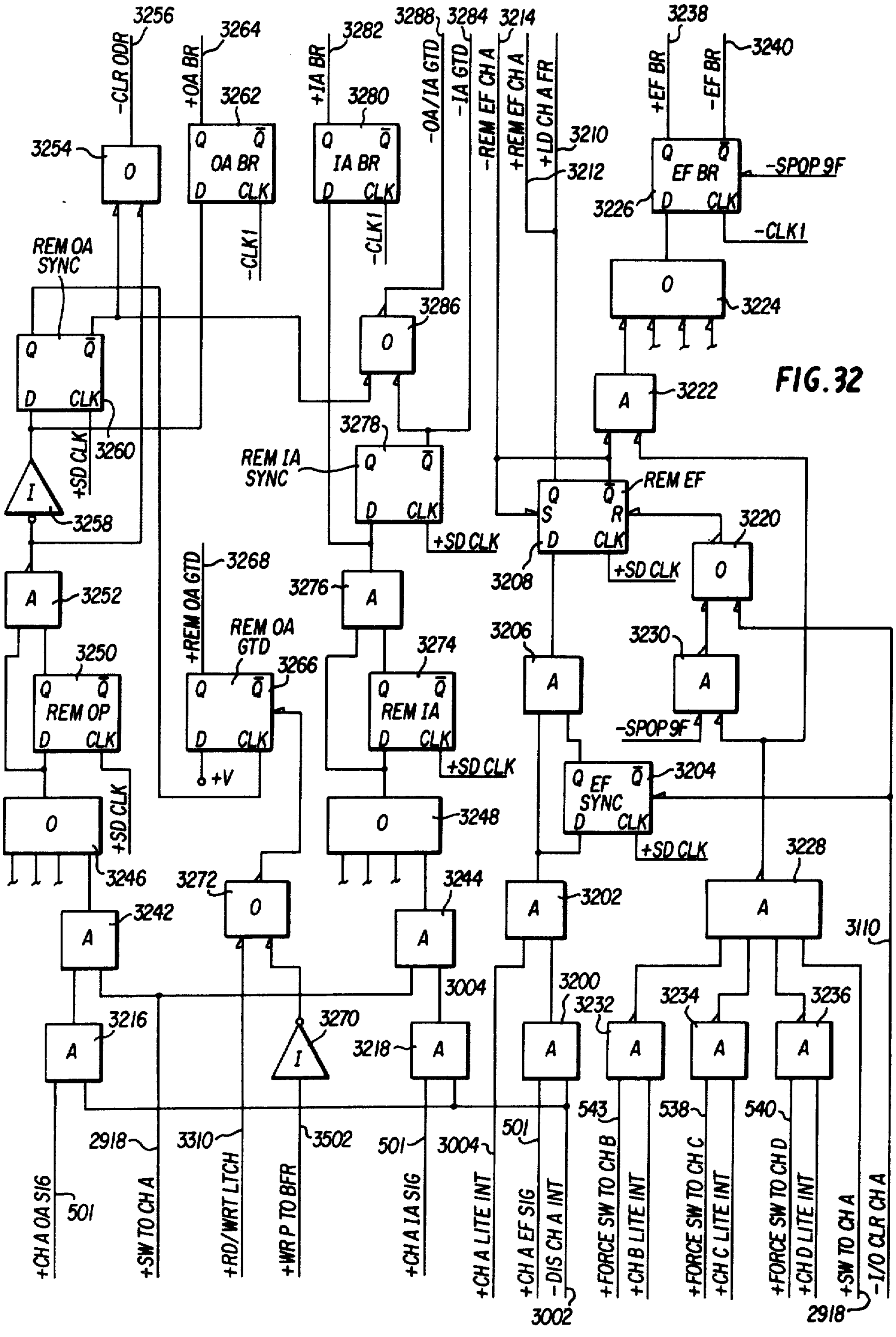

FIG. 32 shows the circuits which receive the EF, OA and IA tag signals from a channel and, if the channel has or is granted priority, generates the signals OA BRANCH, IA BRANCH and EF BRANCH. These latter signals are applied to the Channel Branch Register 526. The circuits for receiving the EF tag and setting the remote EF latch 3208 have previously been explained with reference to the priority control circuits, except for the enabling of AND 3228 and the resetting of the Remote EF Latch 3208. The AND 3228 has its output connected to an AND 3230 and an input of AND 3222. AND 3228 receives the signal +SWITCH TO CHANNEL A as described above, and the outputs from three ANDs 3232, 3234 and 3236. The output of AND 3232 is true to block AND 3228 if channel B is active and bit 6 of the Channel Control Register 532 is set to generate the signal +FORCE SWITCH TO CHANNEL B. In like manner, the outputs of ANDs 3234 and 3236 are true if channel C or D is active and the Channel Control Register 532 has bit 9 or 8 set. Assuming channels B, C and D are inactive and channel A is made active by setting latch 2916, the signal +SWITCH TO CHANNEL A passes through AND 3228, AND 3222 enabled by the output of latch 3208, and OR 3224 to set EF Branch Latch 3226. At the same time, the output of AND 3228 passes through AND 3320 and OR 3220 to reset the Remote EF Latch 3208.

When a control word having SPOP 9F is executed, it resets the Remote EF Latch 3208 for all channels. For channel A the signal −SPOP 9F passes through AND 3230 and OR 3220 to reset the latch 3208.

There is a single EF Branch Latch 3226 and a single OR 3224 which serve all four channels. The undesignated input leads to OR 3224 indicate connections from the ANDs 3222 associated with channels B, C and D.

Two ANDs 3216 and 3218 receive the OA and IA signals, respectively, from channel A. Thus, ANDs 3216 and 3218 comprise a portion of the set of receivers 505. ANDs 3216 and 3218 are enabled when flip-flop 3000 is set to drive −DISABLE CHANNEL A INTERFACE false. The outputs of ANDs 3216 and 3218 are applied to two ANDs 3242 and 3244, respectively. These ANDs receive the signal +SWITCH TO CHANNEL A which is true when channel A has priority. The outputs of ANDs 3242 and 3244 are connected to inputs of two ORs 3246 and 3248, respectively. OR 3246 has additional inputs connected to the ANDs 3242 (not shown) for channels B, C and D while OR 3248 has additional inputs connected to the ANDs 3244 for these channels.

The output of OR 3246 is connected to a latch 3250 and one input of an AND 3252 having its other input connected to the output of latch 3250.

If channel A has priority and an OA signal is received from channel A, the OA signal passes through AND 3216, AND 3242 and OR 3246 to latch 3250. At the next +SD CLK pulse the output of OR 3246 is latched into the latch. When latch 3250 is set AND 3252 is enabled and its output passes through OR 3254 to produce the signal −CLR ODR on lead 3256. This latter signal is applied to FIG. 33 where it resets the ODR Latch 3300. Normally the ODR latch is set in order to request data from a channel. When the channel places the requested data on the Data Out Bus 500 it places the OA tag on bus 501. The OA tag then clears the ODR latch by generating the signal −CLR ODR as just described.

The output of AND 3252 is inverted at 3258 and applied to the remote OA Sync Latch 3260 and the OA Branch Latch 3262. At the next CLK 1, the output of inverter 3258 is latched into latch 3262 which produces the signal +OA BRANCH on lead 3264. This signal is applied to bit position 1 of the Channel Branch Register 526 and is gated therein by CLK 1. The microprogram may then sample the register to determine when the channel has a new data word ready for acceptance by the SCU.

When the output of inverter 3258 goes true it is latched into the latch 3260 at the next SD CLK. At this time the reset output of latch 3260 enables OR 3254 so that the signal −CLR ODR remains true. The set output of latch 3260 clocks a Remote OA Gated Latch 3266 thereby enabling this latch to be set since its D input is tied to a logic 1 voltage. The output of latch 3266 is the signal +REMOTE OA GATED which is applied over a lead 3268 to the buffer control logic circuits of FIG. 35. As subsequently explained, the signal +REMOTE OA GATED causes the buffer control logic circuits to produce a signal +WRITE PULSE TO BUFFER on lead 3502. This causes the data word which accompanied the OA signal to be written into a channel buffer memory 608. In addition, +WRITE PULSE TO BUFFER is applied through an inverter 3270 and an OR 3272 to the reset input of latch 3266. OR 3272 also receives the signal +READ/WRITE LATCH as subsequently described and when this signal goes false the output of OR 3272 resets latch 3266.

When the SCU wishes to send a data word to a channel it loads the word into Output Register (OR) 606, applies the output of the register to Data In Bus 503 through drivers 507, and generates the tag IDR which is applied to the Tag In Bus 502 through drivers 506. When the channel accepts the data word it places the tag IA on the Tag In Bus 501. In FIG. 32, the signal +CHANNEL A IA SIGNAL passes through AND 3218, AND 3244 and OR 3248 and is applied to the Remote IA Latch 3274 and an AND 3276. OR 3248 is provided with additional inputs for receiving the IA Tag signals from channels B, C and D if one of these channels should be active. The output of OR 3248 is latched into latch 3274 at the next SD CLK. When the latch is set, AND 3276 produces a true output to the Remote IA Sync Latch 3278 and the IA Branch Latch 3280. At the trailing edge of the next CLK 1 the output of AND 3276 sets latch 3280 and it produces the signal +IA BRANCH on lead 3282. This signal is applied to bit position 6 of the Channel Branch Register 526. The microprogram tests the register to determine when it may place another word on bus 503.

The output of AND 3276 is latched into latch 3278 by SD CLK. When latch 3278 is set it produces the signal −IA GATED on lead 3284. This signal is applied to FIG. 33 where it resets the IDR Latch 3302 thereby terminating the IDR tag on bus 502.

The reset outputs of latches 3260 and 3278 are connected to an OR 3286 such that when either latch is set the OR produces the signal −OA/IA GATED on lead 3288. This signal is applied to FIG. 33 where it resets a counter for purposes subsequently described.

Figure 33:
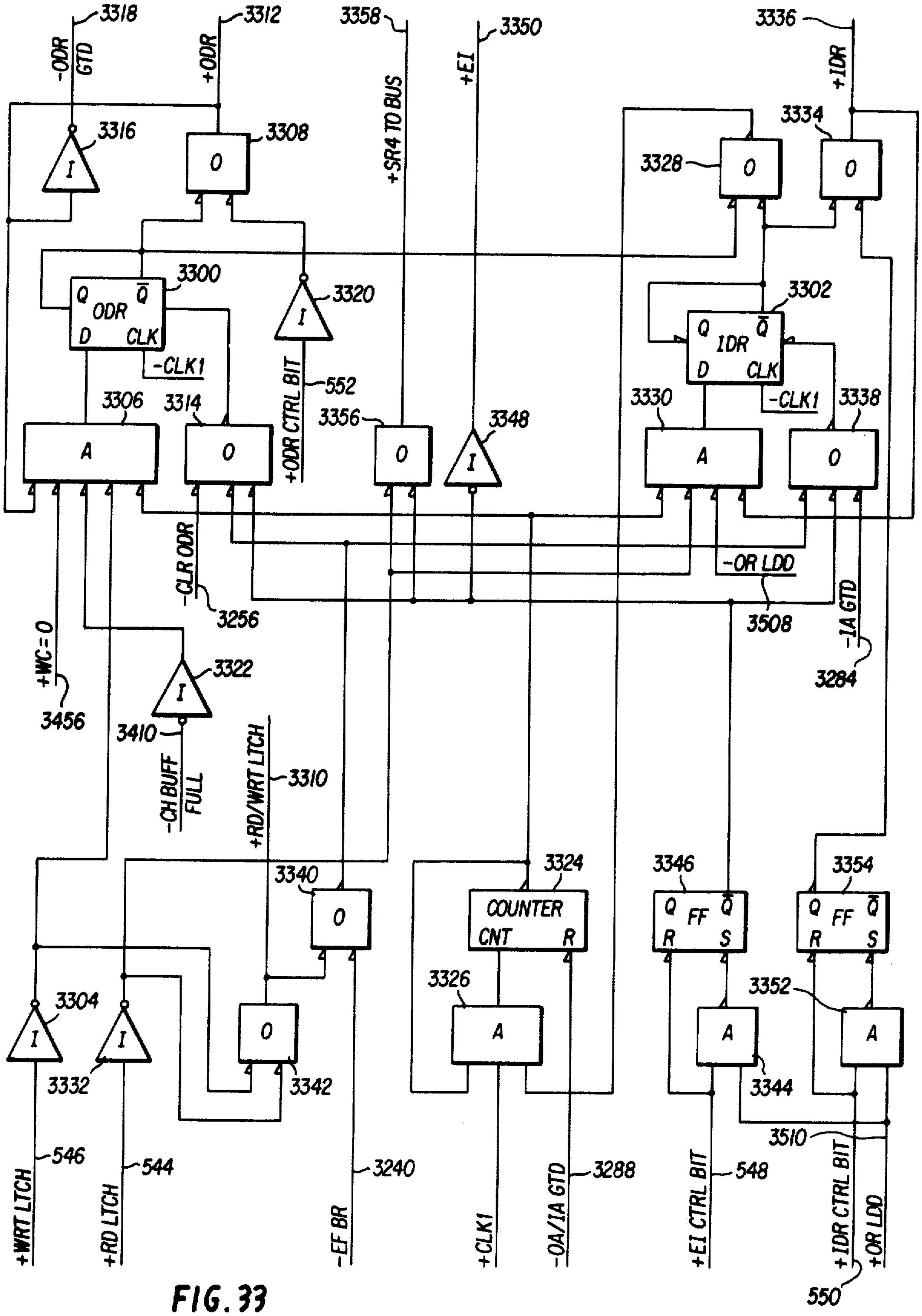

FIG. 33 shows the circuits for controlling the ODR Latch 3300 and the IDR Latch 3302. The IDR latch is set under microprogram control by setting bit 4 of the Channel Control Register 532. When this bit is set it produces the signal +WRITE LATCH. In FIG. 33 +WRITE LATCH is applied through an inverter 3304 and an AND 3306 to the D input of latch 3300. The output of AND 3306 is latched into latch 3300 by CLK 1. The latch produces an output signal which passes through an OR 3308 to generate the signal +ODR on lead 3312. This signal is applied through one of the drivers 506 to the Tag In Bus 502 from whence it passes to the channel to inform the channel that a data word is on Data In Bus 503 ready for sampling.

The signal +ODR is applied to one input of AND 3306 to inhibit the AND and prevent further input signals to the latch by a single input signal. The signal +ODR is also passed through an inverter 3316 to become the signal −ODR GATED on lead 3318. This signal is applied to FIG. 35 to control the circuits which gate the contents of the Output Register 606 onto the Data In Bus 503.

The ODR tag may also be generated on lead 3312 if the Channel Control Register 532 is loaded by the microprogram with a word which sets bit 0. When bit 0 is set the signal +ODR CONTROL BIT on lead 552 is true. This signal is passed through an inverter 3320 and OR 3308 to become the signal +ODR on lead 3312.

Certain conditions must exist before the ODR Latch 3300 may be set by the signal +WRITE LATCH on lead 546. The latch 3300 must be reset so that the signal +ODR is false. Furthermore, another output data request should not be made if the Channel Buffer 608 is full. A count of the number of words in the channel buffer 608 is maintained by a Buffer Word Counter 560. The details of this counter are shown in FIG. 34A.

The Buffer Word Counter 560 includes a 16-bit up-down counter 3400 having its output connected to a 16-bit Buffer Register 3402. The output of Buffer Register 3402 is connected through a set of gated buffers 562 to the EXT A Bus. The counter 3400 and the register 3402 are both cleared when the signal +READ/-WRITE LATCH on lead 3310 goes false. The signal is passed through an OR 3406 having its output connected to the clear input of counter 3400, and through an inverter 3408 to the clear input of the register 3402. Each time a data word is written into the Buffer Memory 608, the buffer control logic circuits of FIG. 35 generate the signal +INCREMENT IN on lead 3504. This signal is applied to counter 3400 to increment the count therein. Each time a word is read from the Channel Buffer 608 the buffer control logic circuits of FIG. 36 generate the signal +INCREMENT OUT on lead 3600. This signal is applied to counter 3400 to decrement the count therein. When counter 3400 has a full count it generates the signal −CH BUFF FULL on lead 3410. On the other hand, if the count in the counter is 0 the counter produces the signal −CH BUFF EMPTY on lead 3412. This latter signal is inverted by an inverter 3414 to simultaneously generate the signal +CH BUFF EMPTY on lead 3416. When the counter 3400 indicates that the buffer memory is full, the signal on lead 3410 is passed through an inverter 3322 to inhibit AND 3306 and prevent the setting of the ODR Latch 3300.

Another condition under which the latch 3300 should not be set is when the number of words to be transferred in response to a command have already been transferred. When a command requiring a transfer of data between a channel and the SCU is decoded, a Word Count Register (WC) 564 is loaded from the D Bus with a value indicating the number of words to be transferred. WC 564 is a 16-bit counter/register having its output connected through a set of gated buffers 566 to the EXT A Bus.

The controls associated with the WC 564 are shown in FIG. 34B. An AND 3440 is enabled by the output of the CD decoder 306 when the decoder detects a control word where the CD field has a value of 18. The AND 3440 also receives the signal +FILE CLOCK ENABLE on lead 2400. The output of AND 3440 is passed through an inverter 3442 to generate the signal −CD=WC which is applied to the WC 564 to load it from the D Bus with a value representing the number of words to be transferred in response to a command.

The output of AND 3440 is applied to an AND 3446 which is further conditioned by +CLK 1. The output of AND 3446 is applied to the reset input of a latch 3448 to reset the latch at the time the WC 564 is loaded.

When +CLK 1 goes false, the output of AND 3446 enables an AND 3450. Each time another word is transferred from the channel to the SCU the OA tag causes the buffer control logic circuits of FIG. 35 to produce the signal +DECREMENT WC on lead 3506. This signal is passed through AND 3450 and an inverter 3452 to become the signal +DECREMENT on lead 3454. This signal is applied to WC 564 to decrement the count therein each time a word is transferred from the chnnel to the SCU. When the count in WC 564 reaches 0 it produces the signal +SENSE 0 which is applied to the D input of the latch 3448. This latch is clocked by each +DECREMENT WC pulse on lead 3560. When the count in the WC 564 reaches 0 the signal +SENSE 0 sets the latch 3448 thereby generating the signals +WC=0 and −WC=0. In FIG. 33, +WC=0 inhibits AND 3306 thereby preventing further output data requests. The signal +WC=0 is also applied to stage 2 of the Channel Branch Register 526 to set this stage at CLK 1.

The final condition for limiting the setting of the ODR latch 3300 is the desired maximum data transfer rate between the Channel Buffer 608 and the channel. The Channel Buffer 608 is capable of transferring data at a 2 megabyte rate. However, a counter 3324 is provided for adjusting this rate. The counter includes plug wiring whereby a field engineer may select its modulus. The output of counter 3324 is connected to one input of an AND 3326 which also receives +CLK 1. The reset outputs of latches 3300 and 3302 are connected to inputs of an OR 3328 and the output of OR 3328 is connected to a third input of AND 3326. When a channel returns an OA or an IA tag in response to an output data request or an input data request from the SCU, the circuits of FIG. 32 produce the signal −OA/IA GATED on lead 3328 to reset counter 3324. The counter then begins counting CLK 1 pulses until it reaches its selected modulus. When the counting modulus is reached the counter produces an output signal to inhibit AND 3326 and enable ANDs 3306 and 3330 so that another output data request or input data request may be made. This limits the frequency at which these requests may be made. As soon as one of the latches 3300 or 3302 is set its output passes through OR 3328 to inhibit AND 3326 and prevent further counting by the counter.

The IDR Latch 3302 generates the IDR tag which is transmitted to a channel with each data word being transferred from the SCU to the channel. The IDR latch 3302 is set only when the microprogram sets bit 5 of the Channel Control Register 532. The register generates the signal +READ LATCH on lead 544 and this signal is passed through an inverter 3332 and AND 3330 to the D input of the IDR Latch 3302. At CLK 1 the output of AND 3330 is latched into latch 3302. The $(\overline{Q})$ output of latch 3302 is passed through an OR 3334 to generate +IDR on lead 3336. The lead 3336 is connected through one of the drivers 501 to the Tag In Bus 502. The output of OR 3334 is also fed to AND 3330 to inhibit the AND and prevent further inputs to the IDR Latch.

There are three conditions which must be met before the IDR Latch may be set. First, the latch must be reset so that the output of OR 3334 may enable AND 3330. Secondly, a predetermined amount of time must have elapsed since the last IDR otherwise the output of counter 3324 inhibits AND 3330. The third condition for setting the IDR latch 3302 is that the signal −OR LOADED must be true. This signal is generated in FIG. 35 by a latch 3544 which is set when the Output Register 606 has been loaded with data ready for transfer to a channel.

As previously explained, latch 3300 is reset when a channel responds with an OA tag thereby generating the signal −ODR on lead 3526. In like manner, the IDR latch 3302 is reset when a channel responds with an IA tag so that the signal −IA GATED on lead 3284 passes through OR 3338 to reset the latch.

Both latches 3300 and 3302 are reset if the circuits of FIG. 32 generate the signal −EF BRANCH. This signal is applied through an OR 3340 and the ORs 3314 and 3338 to the reset inputs of latches 3300 and 3302.

Latches 3300 and 3302 are also both reset if the microprogram clears bits 4 and 5 of the Channel Control Register 532 so that +WRITE LATCH and +READ LATCH are both false. In FIG. 33, the outputs of inverters 3304 and 3332 block an OR 3342 thereby generating a signal through OR 3340 and ORs 3314 and 3338 to reset the latches.

Figure 35:
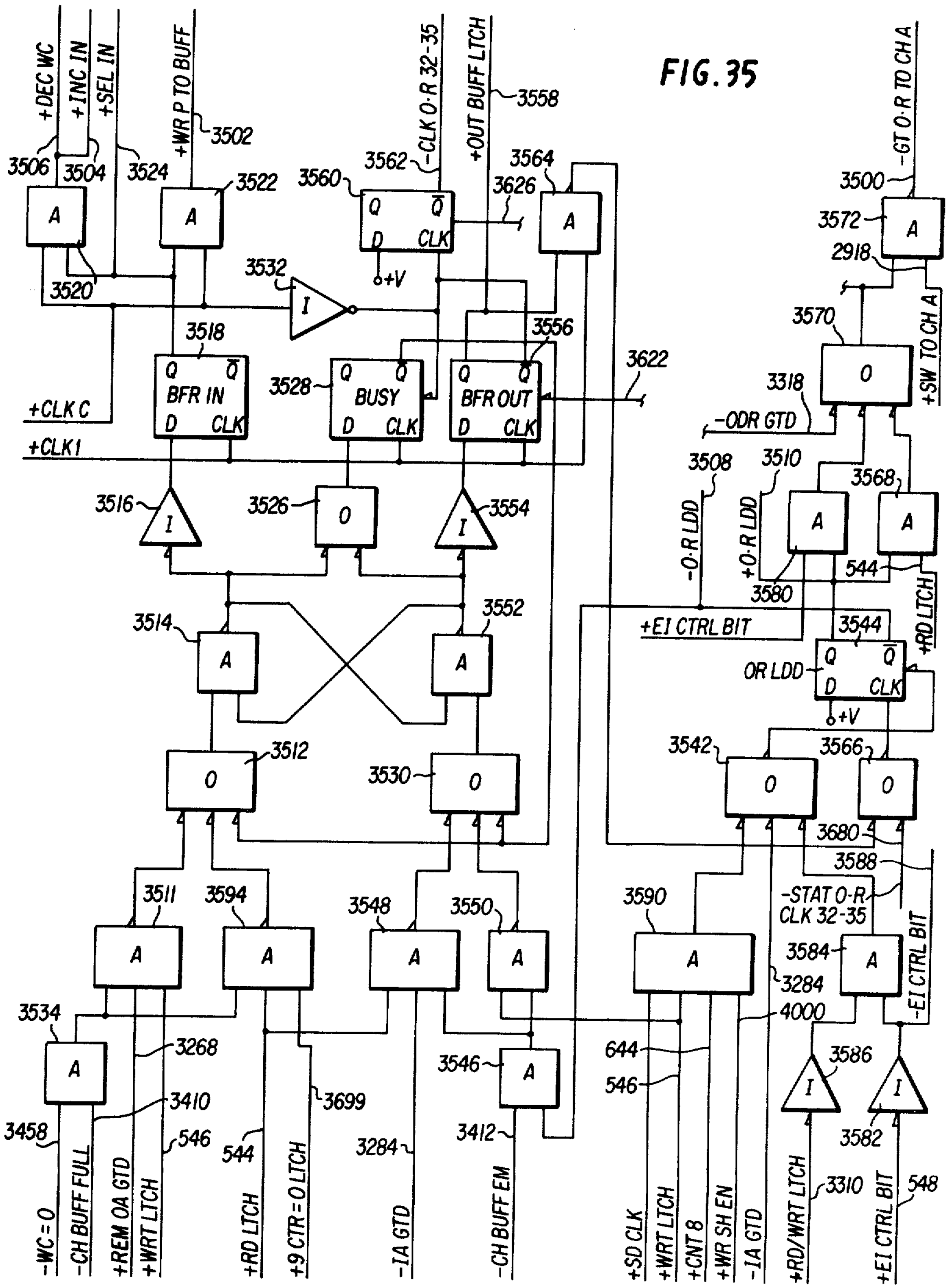
FIGS. 35 and 36 illustrate details of the buffer control logic circuits.

The latches 3300 and 3302 are also reset when the SCU generates an external interrrupt to report status. The status to be reported to the channel by the SCU is loaded into the Output Register 606 and presented on the Data In Bus 503. In FIG. 35, the OR Loaded Latch 3544 is set as subsequently described to generate the signal +OR LOADED. Next, bit 2 of the Channel Control Register 532 is set by the micoprogram to generate the signal +EI CONTROL BIT. In FIG. 33, +OR LOADED and +EI CONTROL BIT are applied to an AND 3344 thereby enabling the AND to produce an output signal to set a flip-flop 3346. The QA (Q) output of this flip-flop is connected to ORs 3314 and 3338 so that when the flip-flop is set it resets latches 3300 and 3302.

The output of flip-flop 3346 also passes through an inverter 3348 to become the signal +EI on lead 3350. The lead 3350 is connected to one of the drivers 506 in order to apply the EI tag to Tag In Bus 502.

The flip-flop 3346 has its reset input connected to stage 2 of the Channel Control Register 532 so that the flip-flop is reset when the microprogram resets bit 2 of the Channel Control Register.

The SCU also places the IDR tag on the Tag In Bus 502 when the Output Register is loaded and the microprogram sets bit 1 of the Channel Control Register. The signal+IDR CONTROL BIT from stage 1 of the Channel Control Register is applied to an AND 3352. This AND is further enabled by the signal +OR LOADED on lead 3510 from latch 3544 when the Output Register 606 is loaded with a word which is ready for transfer to the channel. When both inputs to AND 3352 are true the AND produces an output signal to set a flip-flop 3354. When this flip-flop is set it produces an output signal which passes through OR 3334 to become the signal +IDR which is applied to the Tag In Bus 502. The flip-flop 3354 is reset when +OR LOADED goes false.

The contents of Shift Register 612 are loaded into the Channel Buffer 608 when an EI tag is generated or when bit 5 of the Channel Control Register 532 is set in order to set up a read transfer. The output of the flip-flop 3346 is connected to an OR 3356 so that when the flip-flop is set the OR produces the signal +SR 4 TO BUS on lead 3358. This signal is applied to a set of gated buffers 614 in order to gate the contents of Shift Register 612 to the channel buffer 608. When the program sets bit 5 of the Channel Control Register the signal +READ LATCH on lead 544 passes through inverter 3332 and OR 3356 to generate the signal +SR4 TO BUS.

Since external function words are 36 bits in length and are transferred to the processor of the SCU from the Function Register 508 over the 16-bit EXT A Bus, it is necessary to sample the contents of the Function Register three times in order to accomplish the transfer of one external function word. In FIG. 34C, the signal +CA=FR, generated when the CA decoder 304 decodes a control word having a CA address equal to 1C, is applied to an AND 3470 and passed through an inverter 3472 and applied to an AND 3474. When channel A is selected the signal −SWITCH TO CHANNEL A on lead 2920 is true and enables AND 3474. The output of AND 3474 enables a multiplexer 3476 in order to generate an output signal on one of three output leads depending upon the level of signals applied to its selection inputs over leads 3484 and 3486. At each CLK 1, if +CA =FR is true, AND 3470 produces an output signal to increment the count in a modulo-3 counter 3488. By executing three successive control words having CA=FR, the modulo 3 counter is advanced three times thereby causing MUX 3476 to successively produce the signals −GATE EF CHANNEL A (0–15), −GATE EF CHANNEL A (16–31) and −GATE EF CHANNEL A (32–35) on leads 3478, 3480 and 3482. These signals are applied to the set of gated buffers 514 to successively gate three portions of the contents of the FR Register onto the EXT A Bus.

BUFFER CONTROL LOGIC

A 4K word buffer 608 is provided in the channel interface section of the SCU to absorb irregularities in the rate of data transfer between a channel and the SCU. This buffer is used for both read and write data word transfers, but is not used for the tranfer of external function words or status words.

Figure 36:
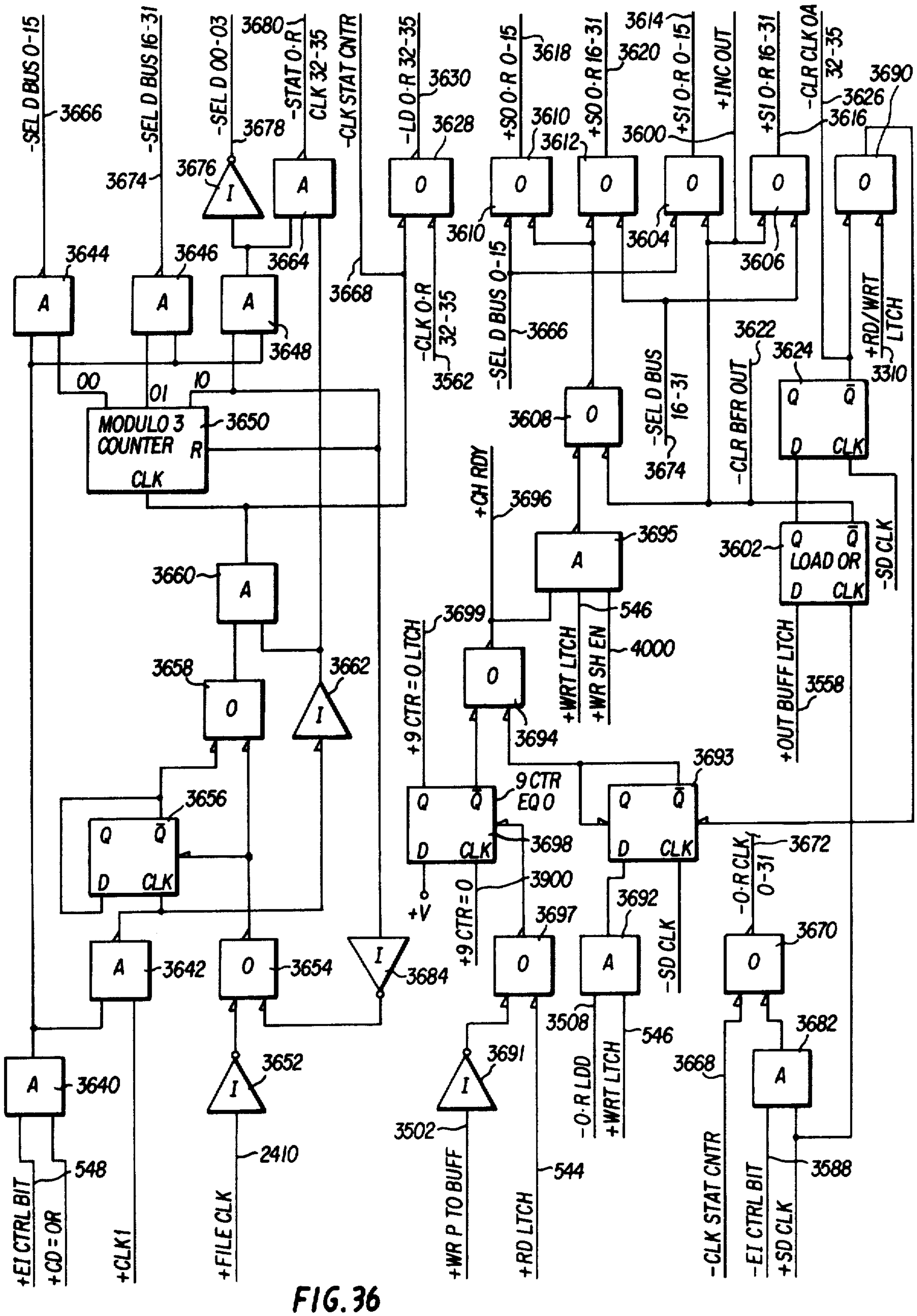
Figure 37:
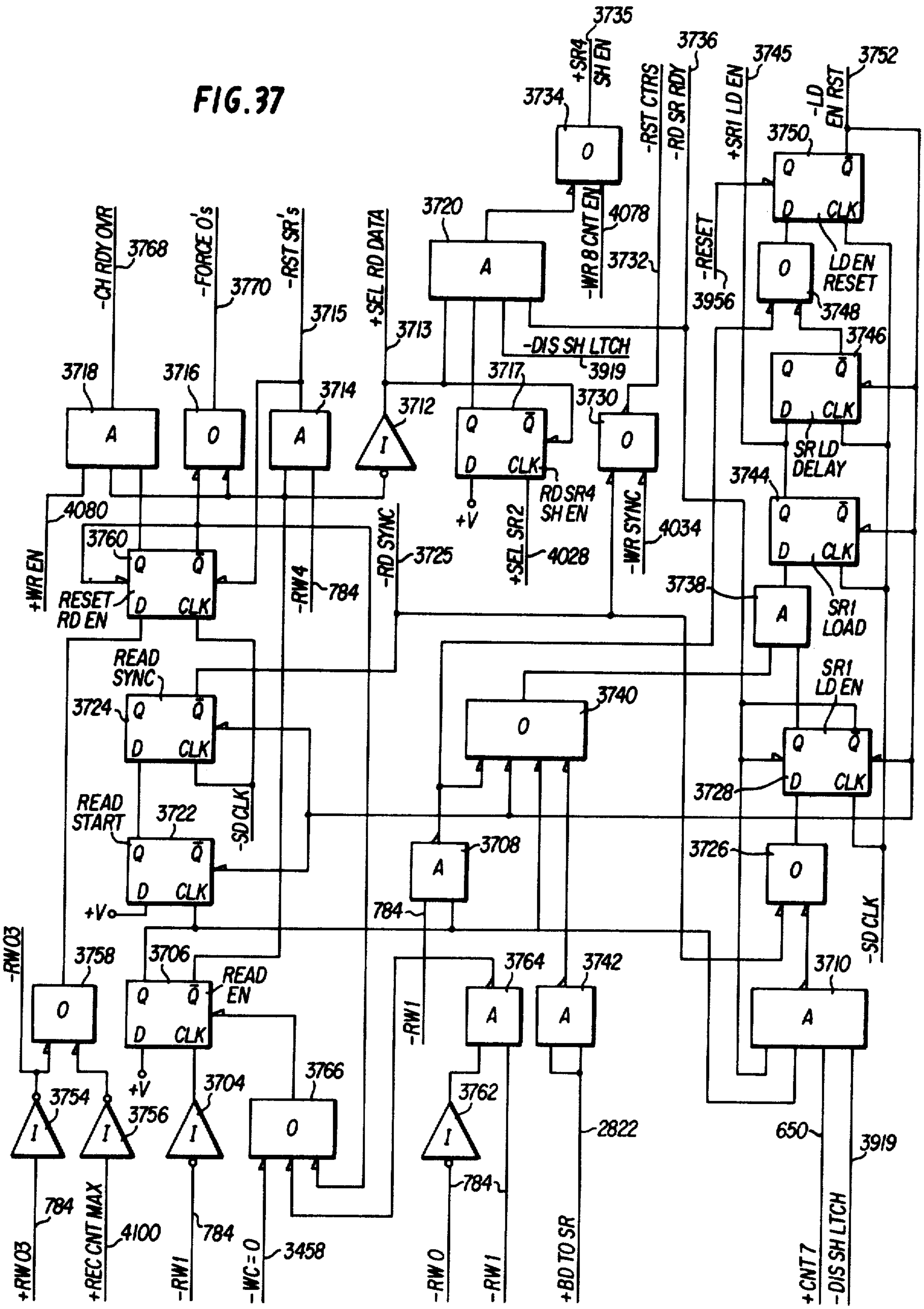
FIGS. 37, 38, 38A, 39-41 and 42A-42E illustrate details of the channel serializer/deserializer control circuit shown in block form in FIG. 6.

The addressing of Channel Buffer 608 is controlled by the Buffer Control Logic 610, the details of the logic being shown in FIGS. 35–37. The buffer control logic controls the incrementing of a Channel In Address Counter 616 and a Channel Out Address Counter 618. These counters are 12-bit counters having their outputs connected to two sets of inputs of a multiplexer 620. The multiplexer is responsive to a signal SELECT IN from the Buffer Control Logic 610 to select either the counter 616 or the counter 618 as a source of an address for addressing the Channel Buffer 608. An address applied to the Channel Buffer 608 reads the contents of the address out of the buffer unless the Buffer Control Logic 610 also produces the signal+WRITE PULSE TO BUFFER which enables the selected address to be written into over the 36-bit bus 624.

Channel To Buffer Transfer

Assume that a command has been decoded which has caused the program to set up the channel interface and the Channel Control Register 532 for a transfer of data from the channel to the SCU (a write operation). Each time the channel places a data word on the Data Out Bus 500 it places an OA tag on Tag Out Bus 501. As previously explained, the tag out decode circuits of FIG. 32 sense the OA signal and generate the signal +REM OA GTD on lead 3268. In FIG. 5 this signal enables the data word to be loaded into the Input Register 512. Bit 4 of the Channel Control Register 532 has been set so the contents of the Input Register 512 are gated through gated buffers 570 by the signals +WRITE LATCH. From buffers 570 the input data word is applied to the channel buffer 608.

In FIG. 35, the signal +REM OA GTD passes through an AND 3511, OR 3512, AND 3514 and inverter 3516 to the input of an Input Buffer Latch 3518. At CLK 1 the output of inverter 3516 is latched into the latch. When latch 3518 is set it enables two ANDs 3520 and 3522 both of which receive CLK C pulses. The output of AND 3522 is the signal +WRITE PULSE TO BUFFER which is applied to the Channel Buffer 608 to cause the data word to be written into the buffer at the address selected by MUX 620. This signal is also applied to FIG. 32 where it resets the Remote OA Gated Latch 3266. When the latch 3518 is set it produces the signal +SELECT IN on lead 3524 and this signal is applied to MUX 620 to select the address in the Channel In Address Counter 616 as the address into which the data word is written.

The AND 3520 produces the signals +INCREMENT IN and +DECREMENT WORD COUNT on leads 3504 and 3506. The use of +DECRECMENT WORD COUNT is explained above. At the end of Clock C after latch 3518 is set, the output of AND 3520 goes false thereby producing the positive-going signal +INCREMENT IN on lead 3504. This signal is applied to the clocking input of the Channel In Address Counter 616 to increment the count therein prior to receipt of the next data word.

At the same time the Input Buffer Latch 3518 is set, the output of AND 3514 also passes through an OR 3526 to set a Busy Latch 3528. The QB output of latch 3528 is connected back to OR 3512 and to a further OR 3530 to freeze the input to latches 3518, 3528 and 3556. The Clock C pulse which generates +WRITE PULSE TO BUFFER passes through an inverter 3532 to reset the Busy Latch 3528.

A +REMOTE OA GATED signal on lead 3268 may set the Input Buffer Latch 3518 only if certain conditions exist. Bit 4 of the Channel Control Register 532 must be set so that the signal +WRITE LATCH on lead 546 is true to enable AND 3511. In addition, the count in Word Counter 564 must not be zero and the channel buffer must not be full so that both inputs to AND 3534 are false thereby enabling AND 3511.

Buffer To Channel Transfer

For transfers of data words from channel buffer 608 to a channel (read), the data words are read out one at a time from the channel buffer over a bus 622, through a MUX 626, Output Register 606, bus 607 and the drivers 507 to the Data In Bus 503. At the same time, an IDR tag is placed on the Tag In Bus 502. When the channel accepts the data word it generates an IA tag and the tag out decode circuits of FIG. 32 generate the signal −IA GATED. In FIG. 35, this signal passes through an OR 3542 to reset an OR Loaded Latch 3544. This latch is set when the Output Register 606 is loaded with a word ready for transfer to the channel. The reset output of latch 354 is connected to an AND 3546 which in turn has its output connected to two ANDs 3548 and 3550. If the channel buffer 608 is not empty, the signal on lead 3412 is false and the output of latch 3544 passes through AND 3546 to enable AND 3548. Bit 5 of the Channel Control Register must be preset by the program in order to control a buffer to channel transfer. Therefore, the signal +READ LATCH on lead 544 enables a second input of AND 3548. When the signal −IA GATED on lead 3284 goes false, AND 3548 produces a signal which passes through OR 3530, AND 3552 and inverter 3554 to the D input of an Output Buffer Latch 3556, and through OR 3526 to set the Busy Latch 3528. At CLK 1 the output of inverter 3554 sets the Output Buffer Latch thereby causing several operations to take place.

The QB output of latch 3556 is connected to the clock input of a latch 3560 and immediately sets this latch. Latch 3560 produces the signal −CLOCK OR 32–35 on lead 3562. This signal is applied to the OR register and gates bits 32–35 of the word read out of the channel buffer into the OR Register 606.

When the Buffer Out Latch 3556 is set it produces the signal +OUT BUFFER LATCH on lead 3558. This signal is applied to the D input of a Load OR Latch 3602 which is latched at +SD CLK. The QB output of latch 3602 is connected to ORs 3604 and 3606 and through an OR 3608 to ORs 3610 and 3612. When latch 3602 is set ORs 3604, 3606, 3610 and 3612 produce the signals +S1 OR 0-15, +S1 OR 16-31, +S0 OR 0-15 and +S0 OR 16-31 on leads 3614, 3616, 3618 and 3620. These leads are connected to the Output Register 606 and enable stages 0-31 of the register to be loaded from the channel buffer through MUX 626.

When the Buffer Out Latch 3556 is set it enables AND 3564 which also receives +CLK 1. The output of AND 3564 passes through an OR 3566 to set the OR Loaded Latch 3544 at the trailing edge of CLK 1. The output of latch 3544 acts through AND 3546 to block ANDs 3548 and 3550. In addition, when latch 3544 is set its output enables an AND 3568. This AND receives +READ LATCH which is true because for the operation being considered bit 5 of the Channel Control Register 532 must be set. The output of AND 3568 passes through an OR 3570 to a plurality of ANDs 3572 only one of which is shown in FIG. 35. There is an AND 3572 for each channel and the AND has one input which is enabled when the channel is active. When the output of OR 3570 goes true AND 3572 produces the signal −GATE OR TO CHANNEL A on lead 3500. In FIG. 30 this signal passes through an AND 3014 to generate the CHANNEL A DRIVER ENABLE signal which enables the drivers 506 and 507 to place the data word on the Data In Bus 503 and the IDR tag on the Tag In Bus 502.

As the latch 3602 is set it produces the signal −CLR BUFFER OUT on lead 3622 to reset latch 3556. The positive-going QB output of latch 3556 sets latch 3560 thereby producing −CLK OR 32-35. This signal passes through OR 3628 to generate −LOAD OR 32-35. This signal enables the loading of stages 32-35 of the Output Register.

When latch 3602 is set it also enables a latch 3624 so that at the end of the SD clock which sets latch 3602 the latch 3624 is set. The reset output of latch 3624 is the signal −CLR CLOCK OR 32-35 on lead 3626. This lead is connected to the reset input of latch 3560 thereby terminating −CLOCK OR 32-35.

When the Buffer Out Latch 3556 is reset by the signal on lead 3622, the D input to the Load OR Latch 3602 goes false. At the next following SD clock, latch 3602 is reset and at this time produces the signal +INCREMENT OUT on lead 3600. This signal is applied to the Channel Out Address Counter 618 to increment the count in the counter in order to prepare for selecting the next word out from the buffer. The INCREMENT OUT signal on lead 3600 is also applied to the BW Counter 560 to decrement the count of the number of words left in the channel buffer.

At the time the OR Loaded Latch 3544 is set, the signal on lead 3510 sets bit 3 of the Channel Branch Register to inform the program that another data word is ready for transfer. Upon sensing this condition the program sets stage 1 of the Channel Control Register 532 in order to generate another IDR tag which is placed on bus 502.

When the SCU wishes to report status to a channel the microprogram sets bit 2 of the Channel Control Register 532 to generate the signal +EI CONTROL BIT on the lead 548. The status word is loaded into the OR Register 606 through a 36-bit wide MUX 626 from the D Bus. Since the status word comprises 36 bits and the D Bus is only 16 bits wide, it is necessary for the processor to execute three control words wherein CD=OR in order to load the Output Register 606. Output Register 606 is divided into three sections which are separately loaded.

The signal +EI CONTROL BIT from the Channel Control Register 552 and the signal +CD=OR from the CD decoder 306 are applied to an AND 3640 having its output connected to an AND 3642 and three further ANDs 3644, 3646 and 3648. A modulo 3 counter 3650 has outputs connected to the ANDs 3644, 3646 and 3848 to successively enable these ANDs as the counter is incremented.

The signal +FILE CLOCK on lead 2410 is passed through an inverter 3652 and an OR 3654 to the reset input of a latch 3656 and one input of an OR 3658. The output of OR 3658 enables one input of an AND 3660.

The AND 3642 receives +CLOCK 1 and has its output connected to the clock input of latch 3656 and through an inverter 3662 to a second input of AND 3660 and an input of a further AND 3664.

Initially the counter 3650 contains a count of zero thereby enabling AND 3644. With +EI CONTROL BIT and +CD=OR both true, AND 3640 produces a signal which passes through AND 3644 to generate the signal −SELECT D BUS 0-15 on lead 3666. This signal is applied to MUX 626 to gate the contents of the D Bus (0-15) through the MUX to Output Register 606 positions 0-15. The signal −SELECT D BUS 0-15 on lead 3666 is also applied to ORs 3610 and 3604 to generate the signals +SO OR 0-15 and +S1 OR 0-15. These latter signals enable one section of the Output Register 606 to load the output of MUX 626.

If the control word being executed is one which permits the generation of +FILE CLOCK in FIG. 24, the signal +FILE CLOCK, acting through inverter 3652, OR 3654 and OR 3658 enables AND 3660. At +CLK 1 the output of AND 3642 passes through inverter 3662 to drive the output of AND 3660 true. The output of AND 3660 is the signal −CLOCK STATUS COUNTER on lead 3668. This signal is passed through an OR 3670 to generate −OR CLOCK 0-31 on lead 3672. This lead is connected to the Output Register 606 and clocks stages 0-31 of the register so that the output of MUX 626 is loaded into bit positions 0-15. The output of AND 3360 also passes through 3628 to generate −LOAD OR 32-35 which clocks stages 32-35 of the Output Register. At the same time, the output of AND 3660 increments counter 3650 so that AND 3646 is enabled.

When the second control word having CD=OR is executed the output of AND 3640 passes through AND 3646 to generate the signal −SELECT D BUS 16-31 on lead 3674. This signal is applied to MUX 626 to gate the contents of the D Bus (0-15) through the MUX to Output Register stages 16-31. The signal on lead 3674 is applied to ORs 3612 and 3606 to generate the signals +S0 OR 16-31 and +S1 OR 16-31. These signals are in turn applied to the Output Register 606 thereby enabling stages 16-31 to receive the output of MUX 626. At +CLK 1 the output of AND 3660 again generates −CLOCK STATUS COUNTER on lead 3668, the signal passing through OR 3670 to generate a signal on lead 3672 to clock the output of bit positions 16-31 of MUX 626 into bit positions 16-31 of Output Register 606. At the same time, the output signal from AND 3660 steps the counter 3650 thereby enabling AND 3648.

When the third control word having CD=OR is executed, the output of AND 3640 passes through AND 3648 to an inverter 3676 and the AND 3664. Inverter 3676 produces the signal −SELECT D00-03 on lead 3678 and this signal is applied to MUX 626 to gate the contents of D Bus (0-3) through positions 32-35 of the MUX to the Output Register. The output of AND 3660 generates the clocking signals for the Output Register as described above. The output of AND 3660 passes through OR 3628 to generate −LOAD OR 32-35 on lead 3630. This signal enables the loading of the output of the MUX into bit positions 32-35 of the Output Register.

At the end of clock 1, the output of AND 3642 goes false and through inverter 3662 blocks AND 3664 thereby making −STATUS OR CLOCK 32-35 false. In FIG. 35, this drives the output of OR 3566 false and latch 3544 is set. The output of latch 3544 enables AND 3580 which also receives the signal +EI CONTROL BIT from the Channel Control Register. The output of AND 3580 passes through OR 3570 to the ANDs 3572 to thereby control the gating of the status word from the Output Register 606 to the Data In Bus 503. Also, when latch 3544 is set the signal +OR LOADED on lead 3510 enables AND 3344 to set flip-flop 3346 to thereby generate the EI tag which is placed on the Tag In Bus 502.

The latch 3544 was initially reset when bit 2 of the Channel Control Register was set to initiate the external interrupt. The signal +EI CONTROL BIT on lead 548 passed through an inverter 3582 to enable one input of an AND 3584. Bits 4 and 5 of the Channel Control Register are false so the signal +RD/WRT LATCH on lead 3310 is false and the output of inverter 3586 enables a second input of AND 3584. The AND produces an output signal through OR 3542 to reset the OR Loaded Latch 3544 at the beginning of the external interrupt. The output of inverter 3582 is the signal −EI CONTROL BIT which is applied over lead 3588 to AND 3682. This inhibits the AND and prevents SD CLK pulses from clocking bit positions 0-31 of the Output Register while it is being loaded with the status word.

Channel Buffer To BD Bus Transfers

Data may also be read from the Channel Buffer 608 to the Output Register 606 from whence it may be passed on to the BD Bus. As subsequently explained, the signals +COUNT 8 and +WRITE SHIFT ENABLE are both true when a channel buffer to BD Bus transfer (write operation) is to take place. These signals are applied to AND 3590 together with +WRITE LATCH and +SD CLK. When all input conditions are true AND 3590 produces an output signal through OR 3542 to reset the OR Loaded Latch 3544. The output of the Latch 3544 passes through AND 3546 (enabled if the channel buffer is not empty) to an AND 3550. The AND 3550 is enabled at this time by +WRITE LATCH. The output of AND 3550 passes through OR 3530 and AND 3552 and then through inverter 3554 and OR 3526 to the Buffer Out Latch 3556 and the Busy Latch 3528. The latches are set at the next CLK 1. From this point on the operation of Buffer Out Latch 3556, Busy Latch 3528, latch 3560, Load OR Latch 3602, latch 3624 and the OR Loaded Latch 3544 is the same as for a buffer to channel data transfer as described above. However, since the write latch of the Channel Control Register 532 is set and the read latch and EI control latches of the register are reset, ANDs 3510 and 3578 are both blocked so that the output of the OR Loaded Latch 3544 cannot gate the word loaded into the Output Register 606 onto the Data In Bus.

When the OR Loaded Latch 3544 is reset, the signal −OR LOADED on lead 3508 goes false and passes through an AND 3692 (now enabled by +WRITE LATCH) to a latch 3693. At the trailing edge of the next SD CLK latch 3693 is set. The output of this latch is connected through an OR 3694 to an AND 3695. The output of OR 3694 is the signal +CHANNEL READY on lead 3696. As long as latch 3693 is set the signal +CHANNEL READY is false and disables the channel serializer/deserializer control logic circuits 628 as subsequently described. Also, during this interval the output of OR 3694 disables AND 3695.

The latch 3693 remains set until latch 3624 is set. At this time the output of latch 3624 passes through OR 3690 to reset latch 3693. This causes +CHANNEL READY to go true to enable AND 3695 and the channel serializer/deserializer circuits 628. It might be noted that during a write operation the signal +READ LATCH on lead 544 is false and passes through OR 3697 to hold latch 3698 reset. This insures that the output of OR 3694 is controlled only by latch 3693.

Once the Output Register 606 is loaded, its contents are entered into a Shift Register 602 (SR1) or a Shift Register 604 (SR2). SR1 is a 32-bit register which may be parallel loaded with 32 bits from the BD Bus or loaded 4 bits at a time as Output Register 606 is left shifted toward the high order position 0. SR1 is left shifted each time the Output Register is shifted so that the signals from the Output Register are entered into its low order positions (28-31). In like manner, the contents of Output Register 606 may be shifted into SR2 four bits at a time. The control of SR1 and SR2 is subsequently explained with reference to the channel serializer/deserializer control logic 628. However, in FIG. 36 when the signal +CHANNEL READY on lead 3696 goes true it enables AND 3695 which produces an output through OR 3608 to enable ORs 3610 and 3612 and the signals +SO OR 0-15 and +SO OR 16-31. These signals control the Output Register 606 for left shifting. As long as these signals are true each +SD CLK passing through AND 3682 and OR 3676 clocks bit positions 0-31 of the output register with each clock pulse causing a left shift of 4 bit positions.

BD Bus to Channel Buffer Transfer

Data words may also be entered into the Channel Buffer 608 from the BD Bus. The data is loaded 32 bits at a time into SR1 which is shifted 4 bits at a time into stages 28-31 of a further 32-bit shift register SR2. The data is shifted through SR2 4 bits at a time with stages 0-3 being shifted into a 36-bit shift register SR4 at each shift. Thus, it takes nine shifts of SR4 to completely load a 36-bit word into the shift register. As subsequently described, a counter counts the number of shifts and when SR4 is fully loaded a Channel SD Control Logic Circuit 628 produces the signal +9 COUNTER=0 on lead 3900. This signal sets latch 3698 thereby generating the signal +9 COUNTER=0 LATCH on lead 3699. The QB output of latch 3698 is applied to OR 3694 and drives the signal +CHANNEL READY false.

The signal +9 COUNTER=0 LATCH is applied to an AND 3594 which is enabled because the signal +READ LATCH from the Channel Control Register 532 must be true. If the channel buffer is not full and if there are still words to be transferred so that the count in WC Register 564 is not zero, the output of AND 3534 enables AND 3594. When all inputs are true AND 3594 produces an output signal through OR 3512 and AND 3514. The output of AND 3514 passes through inverter 3516 to set the Buffer In Latch 3518, and through OR 3526 to set the Bush Latch 3528. When the Buffer In Latch is set it generates +SELECT IN on lead 3524 to cause the multiplexer 620 to select the output of the Channel In Address Counter 616 for addressing the channel buffer. At +CLK C, the output of inverter 3532 resets the Busy Latch while AND 3522 produces the signal +WRITE PULSE TO BUFFER which enables the contents of SR4 to be written into the Channel Buffer 608. In FIG. 33, the signal READ LATCH passes through inverter 3332 and OR 3356 to generate the signal +SR4 TO BUS which enables the gated buffers 614 thereby passing the contents of SR 4 to the Channel Buffer.

The signal +WRITE P TO BUFFER is also passed through an inverter 3691 and the OR 3697 to reset latch 3698 thereby making +CHANNEL READY true. At the end of CLK C the output of AND 3520 produces the signals +INCREMENT IN and +DECREMENT WORD COUNT to decrement the count in Word Count Register 564 and increment the Address Channel In Address Counter 616.

SERIALIZER/DESERIALIZER CONTROL LOGIC

The SD logic controls the conversion of 36- bit output words from the Channel Buffer 608 into 32-bit words for application to the BD Bus, or the conversion of 32-bit words from the BD Bus into 36-bit words for entry into the Channel Buffer 608. In addition to the shift registers SR1, SR2 and SR4 and the channel SD conrol logic 628 previously mentioned, the circuits for accomplishing these conversions include a PS Register 630, two multiplexers 632 and 634, an SR4/OR counter 636, an SR1/SR2 counter 638 and a Record Count Register 640. In addition, a Read/Write Control Register (RW) 736 is set under program control and provides control signals to the SD logic controls.

The PS Register 630 is a 10-bit register having its inputs connected to bits 0–7, 12 and 13 of the D Bus. The PS Register is loaded at CLK 1 by the signal CD=PS derived from the CD decoder 306. The register is cleared by the signal CLR PS on lead 3702 as subsequently described. The purpose of the PS Register is to preset certain values into the counters 636 and 638 under program control. Bit positions 0–3 of the PS Register are connected to a set of inputs of MUX 632 while positions 4–7 are connected to a set of inputs of MUX 634. Bit 12 of the PS Register controls MUX 632 while bit 13 controls MUX 634. If bit 12 is true then the output from positions 0–3 of the PS Register are gated through MUX 632 to the counter 636. In like manner, if bit 13 is true then the value in positions 4–7 of the PS Register are gated through MUX 634 to the counter 638.

MUX 632 has a second set of inputs which are permanently wired to fixed voltages representing the binary value 7. When bit 12 of the PS Register 630 is false the value 7 is passed through MUX 632 to the counter 636. In like manner, MUX 634 has a set of inputs wired to fixed voltages representing the binary value 8. When bit 13 of the PS Register is false this value is applied through MUX 634 to the counter 638.

Counters 636 and 638 are modulo-16 counters. They are preset to some fixed value and are counted up to produce an output signal at maximum count. Counter 636 is normally preset to 7 and produces an output after 8 SD CLK pulses. Counter 638 is normally preset to 8 and produces an output after 7 SD CLK pulses. When either of the counters reaches its maximum count it enables its input so that it may again be preset. Counter 636 is enabled to count SD CLK pulses when +SR4 SHIFT EN is true while counter 638 is enabled to count when the signal +8 COUNT ENABLE is true.

The counters 636 and 638 control the shifting of SR1, SR2, SR4 and the Output Register 606 through the Channel SD Control Logic 628. Generally speaking, on a transfer from the BD Bus to the Channel Buffer 608 (read operation), there must be eight 4-bits shifts of SR1 and SR2 for each BD Bus to SR1 transfer. After every ninth shift of SR1 and SR2 the SR4 register is full and the control logic 628 produces the signal 9 COUNTER=0 to cause the contents of SR4 to be written into the Channel Buffer 608 as previously described.

On write operations, that is transfers from the Channel Buffer 608 to the BD Bus, 36-bit words are entered into the Output Register 606 and shifted 4 bits at a time into SR2. After eight shifts SR2 is full and is ready to be transferred onto the BD Bus. The next 32 bits are loaded into SR1. This sequence repeats with 36-bit words being loaded into the Output Register 606 and alternate sets of 32 bits being shifted from the register 606 to SR2 and SR1.

Counter 636 keeps track of the shifts for SR4 and the Output Register 606 while counter 638 keeps track of the shifts for SR1 and SR2, and the counters control the SD logic 628 accordingly. The SD control logic circuits 628 are illustrated in FIGS. 37–40. Prior to initiating either a read or a write operation, the microprogram control must have set the appropriate read or write bit in the Channel Control Register 532 and loaded a preset value into the PS Register 630. In the following discussion it is assumed that the counters are preset to the values prewired to multiplexer 632 and 634 and a transfer is being made between the Staging Buffer 800 and the Channel Buffer 608. The microprogram control then sets either stage 1 or stage 4 of the Read/Write Control Register 736 which controls the shifting transfers between the BD Bus and the Channel Buffer 608. If bit 1 of the RW is set, it specifies a read operation and if bit 4 is set, it specifies a write operation.

BD BUS TO BUFFER TRANSFERS

FIG. 37, when RW1 (Read) is set it produces −RW through inverter 3704 to set a Read Enable Latch 3706. When the latch is set its QB output passes through inverter 3712 to generate +SELECT READ DATA on lead 3713. This signal is applied to MUX 642 to enble the MUX to pass the output of SR1 to SR2. The QB output of latch 3706 also passes through OR 3716 to generate the signal −FORCE ZEROS on lead 3770. This signal inhibits a set of gates (not shown) through which the output of the Output Register 606 would normally be shifted into SR1.

When the Read Enable Latch 3706 is set it immediately sets a Read Start Latch 3722. The output of latch 3722 is applied to the D input of a Read Sync Latch 3724 which is clocked by −SD CLOCK. When the Read Sync Latch 3724 is set it produces the signal −READ SYNC on lead 3725. This signal is applied through an OR 4002 to reset the write control latches 4004, 4006 and 4008 and an SR Select Flip-Flop 4010. In addition, the output of OR 4002 passes over lead 4012 to reset an SR to BD Select Flip-Flop 3820.

Figure 39:
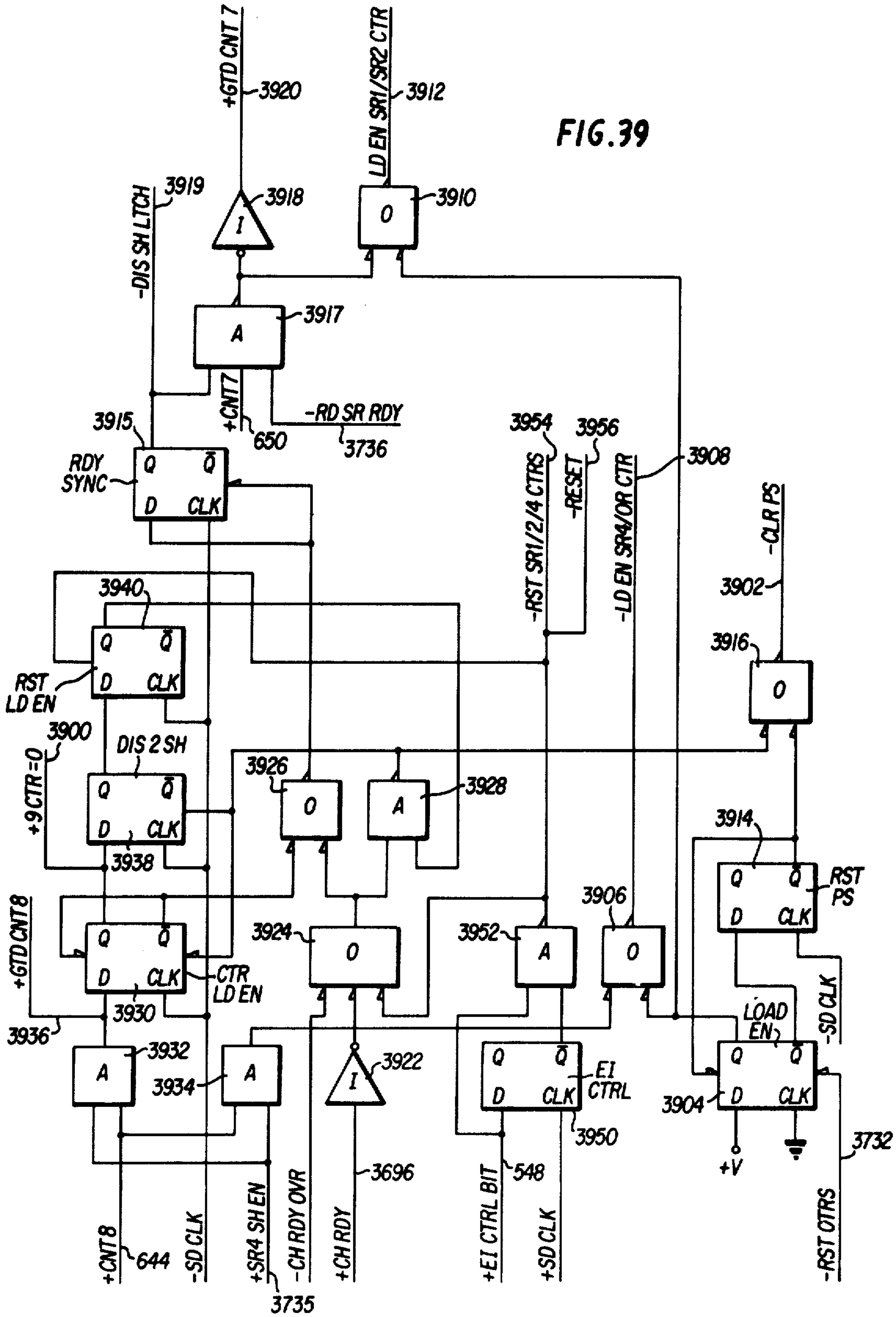

When the Read Synch Latch 3724 is set its QB output passes through an OR 3730 to generate the signal −RESET CONTERS on lead 3732. In FIG. 39 this signal resets a Load Enable Latch 3904. When the latch 3904 is reset its QA output passes through OR 3906 to generate the signal −LOAD ENABLE SR4/OR COUNTER on lead 3908, and passes through an OR 3910 to generate the signal −LOAD ENABLE SR1/SR2 COUNTER on lead 3912. Under the assumed conditions, these signals enable the loading of the counters 636 and 638 with the values 9 and 8 prewired through MUXs 632 and 634.

The QB output of latch 3904 is connected to the data input of the PS Reset Latch 3914. At the trailing edge of SD CLK latch 3914 is set. The QB output of latch 3914 sets latch 3904 and also passes through OR 3916 to generate −CLR PS. This signal clears the PS register.

At the time the Read Sync Latch 3724 is set its QB output passes through OR 3726 to the D input of an SR1 Load Enable Latch 3728. At the trailing edge of the next SD CLK the latch is set thereby producing the signal −READ SR READY on lead 3736. This signal inhibits AND 3720 but in FIG. 38 it passes through inverter 3814 to clock and set a Read Shift Register Ready Latch 3812. When this latch is set its QB output passes through OR 3816 to generate on lead 3818 the signal +SR READY BRANCH which is applied to the Channel Branch Register 526 in order to request a branch operation. At this point the SD logic circuits wait until the branch request is honored.

Figures 38, 38A:
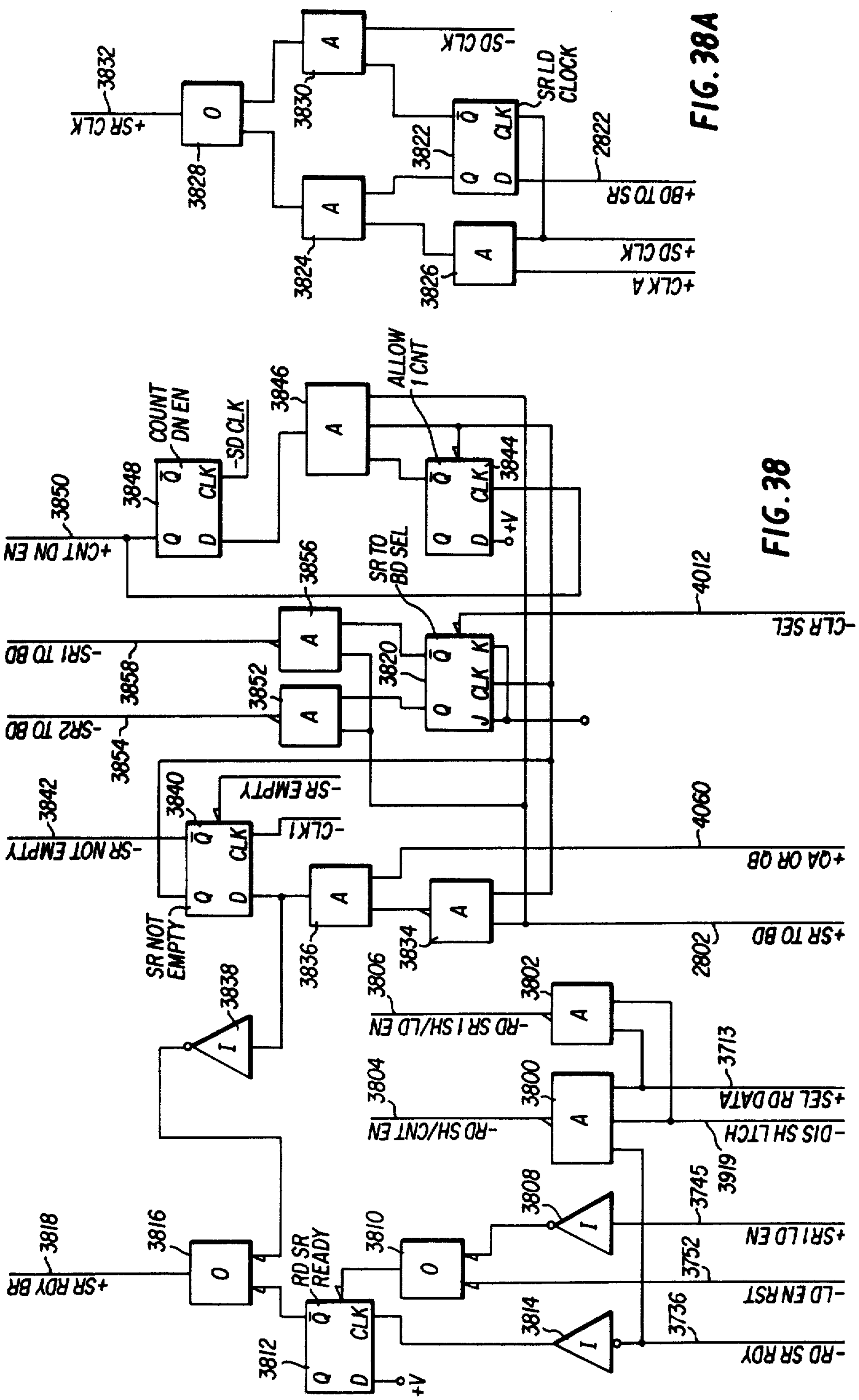

After the microprogram tests for and senses the SR READY BRANCH it executes an instruction to transfer a word over the BD Bus to SR1. When the control word is decoded it produces the signal +BD TO SR on lead 2822 and this signal passes through AND 3742, OR 3740 and AND 3738 to the D input of an SR1 Load Latch 3744. At the next trailing edge of the next SD CLK the latch 3744 is set thereby generating the signal +SR1 LOAD ENABLE on lead 3745. This signal is applied to SR1 to enable SR1 to be loaded with the data on the BD Bus. The data is clocked into SR1 by the circuit of FIG. 38A. In FIG. 38A the signal BD TO SR is applied to a latch 3822 and sets the latch at +SD CLOCK. The QA output of latch 3822 is connected to an AND 3824 having its other input connected to the output of an AND 3826. AND 3826 receives the signals +CLK A and +SD CLK. The output of AND 3824 is passed through OR 3828 to become the signal +SR CLOCK. This signal is applied to the clocking inputs of SR1, SR2 and SR4. Thus, during the control word cycle which gates BD to SR1, the shift registers are clocked once during the latter portion of CLK A. Subsequent to the BD to SR transfer cycle the latch 3822 is reset and SD CLK pulses are gated through AND 3830 and OR 3828 to become the SR CLOCK pulses for clocking the shifting of SR1, SR2 and SR4.

When latch 3744 is set, the signal on lead 3745 is applied through an inverter 3808 and OR 3810 to reset the latch 3812 thereby terminating the +SR READY BRANCH signal.

The output of latch 3744 enables an SR Load Delay Latch 3746 which is set at the trailing edge of the next SD CLK. When latch 3746 is set it produces a signal through OR 3748 to enable a Load Enable Reset Latch 3750. The latch 3750 is set at the trailing edge of SD CLK and produces the signal −LOAD ENABLE RESET on lead 3752. When −LOAD ENABLE RESET goes true it resets latches 3728, 3744, 3746, 3722, 3724 and 3812.

The signal +CHANNEL READY on lead 3696 is normally true except when the buffer control logic 610 is busy responding to the SD control logic. This signal is passed through an inverter 3922 and an OR 3924 to an OR 3926 and an AND 3928. As subsequently explained, latch 3930 is reset hence OR 3926 produces a false output which sets a Ready Sync Latch 3915 at termination of SD CLK. When latch 3915 is set it enables AND 3917 and drives the signal −DISABLE SHIFT LATCH false on lead 3919. In FIG. 37, "DISABLE SHIFT LATCH is applied to one input of AND 3710 while in FIG. 40 it is applied to one input of AND 4014 and in FIG. 38 it is applied to two ANDs 3800 and 3802. Since +SELECT READ DATA is true throughout the read operation, when the signal −DISABLE SHIFT LATCH is false AND 3802 produces the signal −READ SR1 SHIFT/LOAD ENABLE on lead 3806. This signal passes through an OR 4016 to become the signal +SR SHIFT ENABLE on lead 4018. This signal is applied to SR1 to enable the shifting upon occurrence of each SR CLK pulse on lead 3832.

Figure 40:
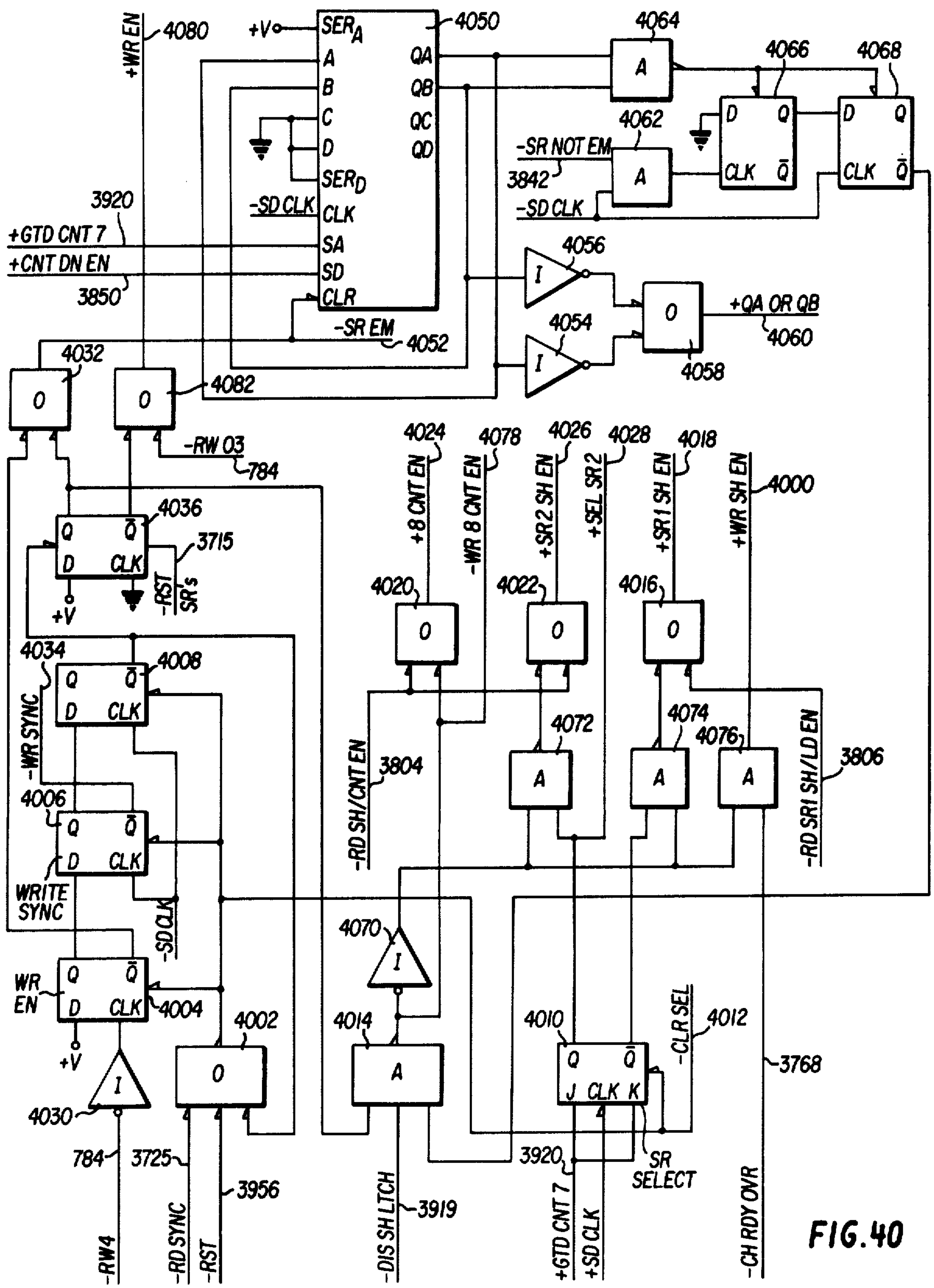

At the time latch 3728 is reset, the signal −RD SR RDY goes false. In FIG. 38 this enables AND 3800 which produces −RD SH/CNT ENABLE on lead 3804. In FIG. 40 this signal passes through OR 4020 to generate +8 COUNTER ENABLE and +SR2 SHIFT ENABLE. In FIG. 6, +8 COUNTER ENABLE allows counter 638 to respond to SD CLK and begin counting toward 15 from its preset value of 9. Also in FIG. 6, +SR2 SHIFT ENABLE allows SR2 to begin shifting in response to SR CLK.

When the counter 638 has counted 8 SD CLK pulses, the first word from the BD Bus has been shifted through SR1 to SR2. When the counter 638 reaches a count of 15 (it was originally preset to 8) it generates the signal +COUNT 7. This signal is applied over lead 650 to AND 3710. Since −DISABLE SHIFT LATCH is false the +COUNT 7 signal passes through AND 3710 and OR 3726 to the D input of latch 3728. This results in the generation of −READ SR READY on lead 3736 which in turn sets the latch 3812 to generate another SR READY BRANCH request to load another word into SR1. During interval the SD logic is waiting for the program to recognize the request and provide another word to SR1, −RD SR RDY blocks AND 3804 to prevent incrementing of the counters and the shifting of SR1 and SR2.

In FIG. 39, the signal +COUNT 7 passes through AND 3917 and OR 3910 to generate −LOAD ENABLE SR1/SR2 COUNTER to again enable the presetting of counter 638 to a count of 8. The output of AND 3917 also passes through inverter 3918 to become the signal +GATED COUNT 7 on lead 3920.

In FIG. 40, +GATED COUNT 7 sets the SR Select Latch 4010 thereby producing +SELECT SR2 on lead 4028. In FIG. 37, +SELECT SR2 sets latch 3717 which enables AND 3720. After the SR RDY BRANCH is recognized by the program and the next BD to SR signal is generated to load SR1 again, the SR1 Load Enable Latch 3728 is reset and at this time AND 3720 produces an output signal through OR 3734 to generate the signal +SR4 SHIFT ENABLE. This signal is applied to the counter 636 to enable the counter to count SD CLK pulses, and applied to SR4 (FIG. 6) to enable its shifting in response to SR CLK pulses.

After another eight SD CLK pulses have been counted by the counter 638 it again produces the signal +COUNT 7 which causes another SR READY BRANCH as described above to request that another word be loaded into SR1. At this time the first word is in the lowest 28 bit positions of SR4 and the second word is in SR2. When the program generates BD to SR to load the third word into SR1, counters 636 and 638 are enabled to count SR CLK and SR1, SR2 and SR4 are enabled to shift at each SR CLK. After the first shift, SR4 is full, containing the first word transferred as well as the first four bits of the second word. Also, counter 636 contains a count of 8 and generates +COUNT 8 on lead 644. In FIG. 39, this signal is applied to two ANDs 3932 and 3934. These ANDs are further enabled by the signal +SR 4 SHIFT ENABLE. The output of AND 3934 passes through OR 3906 to generate the signal −LOAD ENABLE SR4/OR COUNTER on lead 3908.

The output of AND 3932 enables a latch 3930 which is set at the trailing edge of the SD CLK which advances the counter 636 to a count of 9. When latch 3930 is set its QB output passes through OR 3936 to reset the Ready Sync Latch 3915 and and make −DISABLE SHIFT LATCH true. This signal blocks ANDs 3710, 3720 and 4014, thereby disabling the shifting of SR1, SR2 and SR4 and inhibiting the counting by counters 636 and 638.

At the same time, the QA output of latch 3930 is the signal +9 COUNTER=0, which is applied over lead 3900 to the latch 3698 in the buffer control logic circuits to thereby initiate the writing of the word in the SR4 register into the Channel Buffer 608 as described above.

The QA output of latch 3930 is connected to the D input of latch 3938 and the QA output of this latch is connected to the D input of latch 3940. Therefore, when latch 3930 is set the latches 3938 and 3940 are set at the trailing edges of succeeding SD clocks. When latch 3940 is set its QA output enables AND 3928. When the signal +CHANNEL READY goes true, after the first word has been stored in the Channel Buffer 608, the second input of AND 3928 is enabled and it produces an output signal through OR 3916 to again clear the Preset Register 630. At the same time, the output of AND 3928 resets latches 3930 and 3938. The signal +CHANNEL READY now passes through inverter 3922, OR 3924 and OR 3926 to reset the latch 3915. The signal −DISABLE SHIFT LATCH goes false thereby permitting counters 636 and 638 to resume counting, and permitting SR1, SR2 and SR4 to resume shifting.

The above described operation is repeated with SR1 being loaded after each 8 shifts and SR4 being loaded into Channel Buffer 608 after each nine shifts. The Read Enable Latch 3706 is reset to terminate a read transfer. This may occur when the number of words to be transferred to/from the Channel Buffer 608 from/to the channel have been transferred. When the word count in WC 564 has been decremented to 0 it produces the signal −WC=0 which passes through OR 3766 to reset latch 3706. The latch may also be reset when the desired number of 36-bit words have been transferred to/from the Channel Buffer 608 to the BD Bus. This occurs when the RC register has been incremented to its maximum count.

Figure 41:
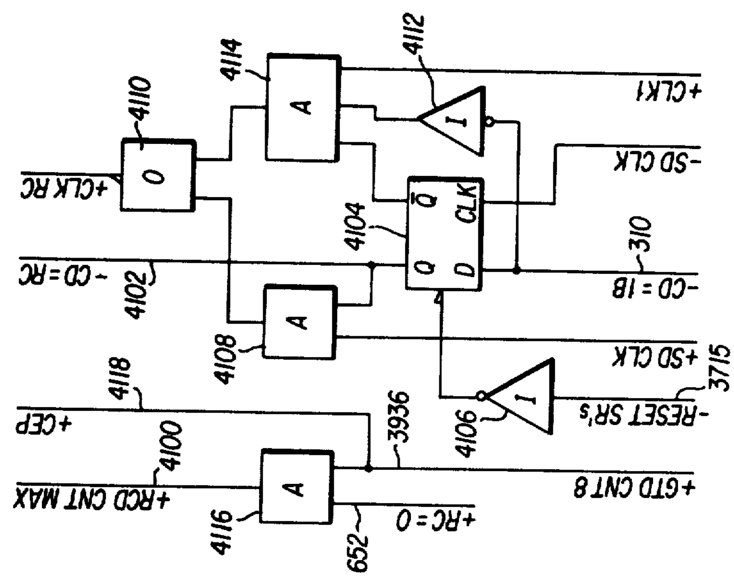

FIG. 41 shows the controls for the RC Register 640. This register is initially loaded with the complement of the count of the number of 36-bit words to be transferred between the Channel Buffer 608 and the Staging Buffer 800. A latch 4104 controls loading of the RC Register from the D Bus. When a control word is decoded and CD=1B, the latch 4104 is reset at the trailing edge of SD clock. The signal −CD=1B is passed through an inverter 4112 to an AND 4114 which is also enabled when the latch 4104 is reset. At +CLK 1, AND 4114 produces an output signal through OR 4110 to clock the value on the D Bus into the RC Register. The signal −CD=RC on lead 4102 enables the input gating to the register. When setting up a staging buffer to/from channel buffer transfer, at the time RW1 or RW4 is set, the signal −RESET SRs on lead 3715 goes false as previously described. The signal is passed through an inverter 4106 to set latch 4104. This drives the signal −CD=RC false and enables AND 4108 which passes +SD CLK pulses through OR 4110 to clock the RC register. Since the signal on lead 4102 is false the register is not parallel loaded from the D Bus so a zero value is entered therein.

The purpose of the RC register is to count or keep track of the number of 36-bit words remaining to be transferred. Each time a word is transferred over the BD Bus the count in the RC register is tested for zero. The signal +GATED COUNT 8 is applied to an AND 4116 which also receives the signal +RC=0 representing the carry out of the register. The output of AND 4116 is the signal +RECORD COUNT MAX on lead 4100 which is applied to FIG. 37 to set the latch 3760 and initiate a reset operation. The signal +GATED COUNT 8 also becomes the signal +CEP on lead 4118 and this signal is applied to the RC register as a carry enable pulse.

In FIG. 37, +RECORD COUNT MAX passes through inverter 3756 and OR 3758 to the D input of latch 3760. At the next SD CLK the latch is set and its QB output is applied through OR 3766 to reset the Read Enable Latch 3706 and terminate a read operation. If a write operation is in progress, +WR ENABLE is enabling one input of AND 3718. A second input is enabled because latch 3706 is reset. When latch 3760 is set it produces an output through AND 3718 to generate −CHANNEL READY OVERRIDE. In FIG. 40 this signal blocks and 4076 to drive +WR SHIFT EN false. In FIG. 35, +WR SHIFT EN blocks AND 3590. As will be evident when the channel buffer to BD bus transfer is described, it is this signal which the SD logic generates in order to request another word from the channel buffer.

The Read Enable Latch 3706 may also be reset under program control by setting stage 0 of RW 736. In FIG. 37 this causes the output of inverter 3762 to go true. If RW 1 is not set to define a read operation, the output of inverter 3762 passes through AND 3764 and OR 3766 to reset latch 3706.

BUFFER TO BD BUS TRANSFERS

For channel buffer to BD Bus transfers, the microprogram must first set bit 4 of the Channel Control Register 532. In addition, bit 4 of the RW Register 736 must be set in order to initiate the shifting of SR1 and SR2. In Fig. 40, the signal −RW4 is passed through an inverter 4030 to clock and set a latch 4004. When latch 4004 is set its QB output passes through an OR 4032 to make −SR EMPTY false. The QA output of latch 4004 is applied to the D input of Write Sync Latch 4006 which is set at the trailing edge of the next SD CLK. When latch 4006 is set it generates the signal −WRITE SYNC on lead 4034. In FIG. 37, this signal passes through OR 3730 to generate signals for resetting the counters 636 and 638 and clearing the PS Register 630, as described above with reference to the BD Bus to channel buffer transfer.

At the trailing edge of the SD CLK following the setting of latch 4006 its output sets latch 4008. The output of latch 4008 immediately sets a latch 4036 and, through OR 4002, resets latches 4004, 4006 and 4008.

When latch 4004 is reset and latch 4036 is set, the false output of OR 4032 clears shift counter 4050 and generates the signal −SR EMPTY on lead 4052. In Fig. 38, −SR EMPTY resets an SR Empty Latch 3840 making the signal −SR NOT EMPTY false. At the same time, the QA output of latch 3840 clocks flip-flop 3820 and resets a latch 3844.

The signal −SR NOT EMPTY is applied to an AND 4062. At the trailing edge of the next SD CLK, AND 4062 clocks and resets a latch 4066. The output of latch 4066 is connected to the D input of a latch 4068 which is reset at the trailing edge of the next SD CLK. When latch 4068 is reset its QB output enables one input of AND 4014. This AND is already enabled by −DISABLE SHIFT LATCHES and the QA output of latch 4036. AND 4014 produces an output signal which passes through inverter 4070 to enable ANDs 4072, 4074 and 4076, and passes through OR 4020 to generate +8 COUNT ENABLE. The output of AND 4014 is the signal −WRITE 8 COUNT ENABLE which is applied over lead 4078 and through OR 3734 to generate +SR4 SHIFT ENABLE on lead 3735.

The signal +SR4 SHIFT ENABLE enables counter 636 to begin counting SD CLK pulses. The signal +8 COUNT ENABLE is applied over lead 4024 to counter 638 to enable this counter to begin counting SD CLK pulses. AND 4072 is blocked by latch 4010 but the QB output of the latch enables AND 4074 so that the signal from inverter 4070 passes through AND 4074 and OR 4016 to generate +SR1 SHIFT ENABLE which is applied to SR1 to enable it to be shifted by each SR CLK. The AND 4076 is enabled because −CHANNEL READY OVERRIDE is false hence the output of inverter 4070 passes through the AND 4076 to generate +WRITE SHIFT ENABLE on lead 4000. This signal is applied to AND 3695 from whence it passes through OR 3608 and ORS 3618 and 3620 to enable the loading of stages 0–31 of the Output Register. In FIG. 35 +WRITE SHIFT ENABLE conditions one input of AND 3590 which is blocked at this time because +COUNT 8 is false.

The counters 636 and 638 count SD CLK until counter 638 reaches a count of 15 and produces the signal +COUNT 7 on lead 650. The signals −READ SR READY and −DISABLE SHIFT LATCH are both false so +COUNT 7 passes through OR 3910 to generate −LD EN SR1/SR2 CTR which resets counter 636 to a count of 8 at the next SD CLK and passes through inverter 3918 to generate +GATED COUNT 7 on led 3920. In FIG. 40, +GATED COUNT 7 enables flip-flip 4010 to be set at the next SD CLK. The QA output of the flip-flop passes through AND 4072 and OR 4022 to generate +SR2 SHIFT ENABLE on lead 4026. The signal conditions SR2 for shifting in response to SR CLK. At the same time, +GATED COUNT 7 is applied to shift register counter 4050 to shift a binary 1 into stage A at the trailing edge of SD CLK. The output of this stage is connected through inverter 4054 to OR 4058 which produces the signal +QA OR QB on lead 4060. In FIG. 38, +QA OR QB is applied to AND 3836. The second input of AND 3836 is enabled because +SR TO BD is false thereby making the output of AND 3834 false. Thus, +QA OR QB enables latch 3840 which is set by the next CLK 1 pulse. The QA output of latch 3840 enables ANDs 3834 and 3846 both of which are blocked at this time because +SR TO BD is false.

At the SD CLK after counter 638 produces +COUNT 7, counter 636 produces the signal +COUNT 8 on lead 644. In FIG. 39, +COUNT 8 sets latch 3930 to in turn reset latch 3915. The signal also passes through AND 3934 and OR 3906 tro produce −LD EN SR4/OR CTR which again sets counter 636 to a count of 7. In FIG. 35, +COUNT 8 passes through AND 3590 and OR 3542 to reset the OR Loaded Latch 3544. The circuits of FIGS. 35 and 36 then go through an operation to read one word from the Channel Buffer 608 and enter it into the Output Register 606. During the interval the OR Loaded Latch 3544 is set, it produces an output which passes through AND 3692 to enable latch 3693 to be set. The QB output of the latch 3693 acts through OR 3694 to drive +CHANNEL READY false. In FIG. 39, +CHANNEL READY is inverted at 3922. All inputs to OR 3924 are now false and it produces a low level signal through OR 3926 to hold the reset on the Ready Sync Lach 3915. This holds −DISABLE SHIFT LATCH on lead 3919 false to block AND 3917. In FIG. 40, −DISABLE SHIFT LATCH blocks AND 4014 thereby blocking the incrementing of counters 636 and 638 and disabling the shifting of the shift registers. At this point the first word to be transferred is in the Output Register 606.

As soon as the Output Register 606 is loaded with the first word, +CHANNEL READY (FIG. 36) goes true as previously described and in FIG. 39 this signal acts through inverter 3922 and ORs 3924 and 3926 to again set the Ready Sync Latch 3915. This drives −DISABLE SHIFT LATCHES on lead 3919 false to again enable AND 4014. AND 4014 again enables the generation of the signals which control the application of SD CLK to counters 636 and 638 and the application of SR CLK tothe Output Register and Shift Register. At each of the next eight SR CLK pulses four bits of the first data word are shifted into SR2. Counters 636 and 638 are incremented at each shift by SD CLK. After seven shifts counter 638 again produces +COUNT 7. In FIG. 39, +COUNT 7 again generates +GATED COUNT 7 and −LD EN SR1/SR2 counter. The signal −LD EN SR1/SR2 again causes the presetting of counter 636 as before. However, in FIG. 40 +GATED COUNT 7 triggers and resets flip-flop 4010. The QA output of the flip-flop terminates the +SR2 SHIFT ENABLE signal on lead 4026 to halt the shifting of SR2. The QB output of flip-flop 4010 passes through AND 4074 and OR 4016 to generate +SR1 SHIFT ENABLE. This signal enables SR1 to be shifted and to receive four bits of data from the Output Register 606 at each shift.

The signal +GATED COUNT 7 is also applied to Shift Register Counter 4050 to shift the contents thereof one position and load a logic 1 into stage A. Assuming for the moment that the microprogram has not yet executed a control word to transfer the contents of SR2 to the BD Bus, this causes both stages A and B of counter 4050 to be set. The outputs from these stages enable AND 4064 which then produces an output signal to set latches 4066 and 4068. The resulting output from latch 4068 blocks AND 4014. The false output of AND 4014 drives +8 COUNT ENABLE, +WRITE 8 COUNT ENABLE, +SR2 SHIFT ENABLE, +SR1 ENABLE and +WRITE ENABLE false to halt the counting of counters 636 and 638 and the shifting of SR1 and SR2. The false output of AND 4014 also blocks and 4076 to drive +WRITE SHIFT ENABLE false thereby preventing the shifting of the Output Register and blocking AND 3590 to prevent a request for another word to be loaded into the Output Register.

The counter 4050 serves two purposes. When stages A and B are both set it halts the shifting and counting operations as described above when one of the registers SR1 and SR2 is full and the other is at least partially full so that they cannot accept another complete word from the Output Register 606. The second purpose is to inform the program that one of the shift registers SR1 or SR2 is loaded and ready for transfer over the BD Bus. The signal QA or QB passes through AND 3836, inverter 3838 and OR 3816 to generate +SR READY BRANCH which is loaded into stage 7 of Channel Branch Register 526.

The counter 4050 in essence keeps tract of the number of shift registers, SR1 and SR2 that contain data. If one register contains data then stage A is set. If both registers contain data then stages A and B are both set. The counter 4050 is incremented at each +GATED COUNT 7 as described above. It is decremented, i.e., one stage reset, each time the program executes a control word to read the contents of SR1 or SR2 onto the BD Bus. In FIG. 38 +SR TO BD passes through an AND 3846 to a latch 3848 which is set at the trailing edge of SD CLK. Latch 3848 produces the signal +COUNT DOWN ENABLE which is applied to counter 4050. The signal enables the counter to shift down at SD CLK thus entering a logic 0 into stage B and transferring the contents of stage B to stage A. The QA output of latch 3848 clocks and sets latch 3844 thereby disabling AND 3846 and preventing more than one shift of counter 4050.

After the microprogram initiates a write operation it loads a general purpose register 408 with some value to initiate a waiting period of 3.2 microseconds and begins testing for an SR READY BRANCH. When it detects that an SR READY BRANCH has set stage 7 of the Channel Branch Register 526, it executes a control word in order to transfer the contents of SR1 or SR2 over the BD Bus. This control word causes the SPOP decoder circuits of FIG. 28 to produce the signal +SR TO BD on lead 2802.In FIG. 38, this signal passes through AND 3852 to generate −SR TO BD. This signal is applied over lead 3854 to the gated buffers 601 to gate the contents of SR2 onto the BD Bus.

The signal +SR TO BD enables AND 3834 which blocks AND 3836. This applies a low level signal to latch 3840 which is reset at the next CLK 1. The output of latch 3840 triggers and resets flip-flop 3820 so that the next time +SR TO BD occurs it passes through AND 3856 to generate −SR1 TO BD which gates the contents of SR1 through Gated Buffers 600 onto the BD Bus.

When latch 3840 is reset its QB output enables AND 4062 to reset latch 4066 which then enables the resetting of latch 4068 by the next SD CLK. When the QB output of latch 4068 goes true it enables AND 4014. This permits a resumption of the counting by counters 636 and 638 and the shifting of SR1 and theOutput Register. Since the counters were both suspended with a count of 7, the first SD CLK causes counter 636 to produce +COUNT 8 to request that the second data word be loaded into the Output Register. When shifting and counting are resumed after the second data word has been loaded into the Output Register, the second data word is shifted into SR1 behind the four bits of the first data word.

In summnary, 36-bit data words are loaded into the Output Register and shifted four bits at a time into SR1 or SR2. After each eight shifts the flip-flop 4010 changes state so that for eight shifts SR2 is shifted and loaded from the Output Register and for the next 8 shifts SR1 is shifted and loaded. After each eight shifts counter 4050 is incremented and halts all operations if it contains a count of 2 indicating both SR1 and SR2 contain data. The counter 4050 requests an SR READY BRANCH as long as either SR1 or SR2 contains data. The microprogram senses for an SR READY BRANCH condition and when it is detected the microprogram executes an instruction to transfer the contents of SR1 or SR2 over the BD Bus. The control word causes +SR TOBD to be generated to sample the contents of SR1 or SR2, and through latch 3840 changes the state of flip-flop 3820 so that the next +SR TO BD samples the contents of the other.

CONTROL INTERFACE

Figure 8:
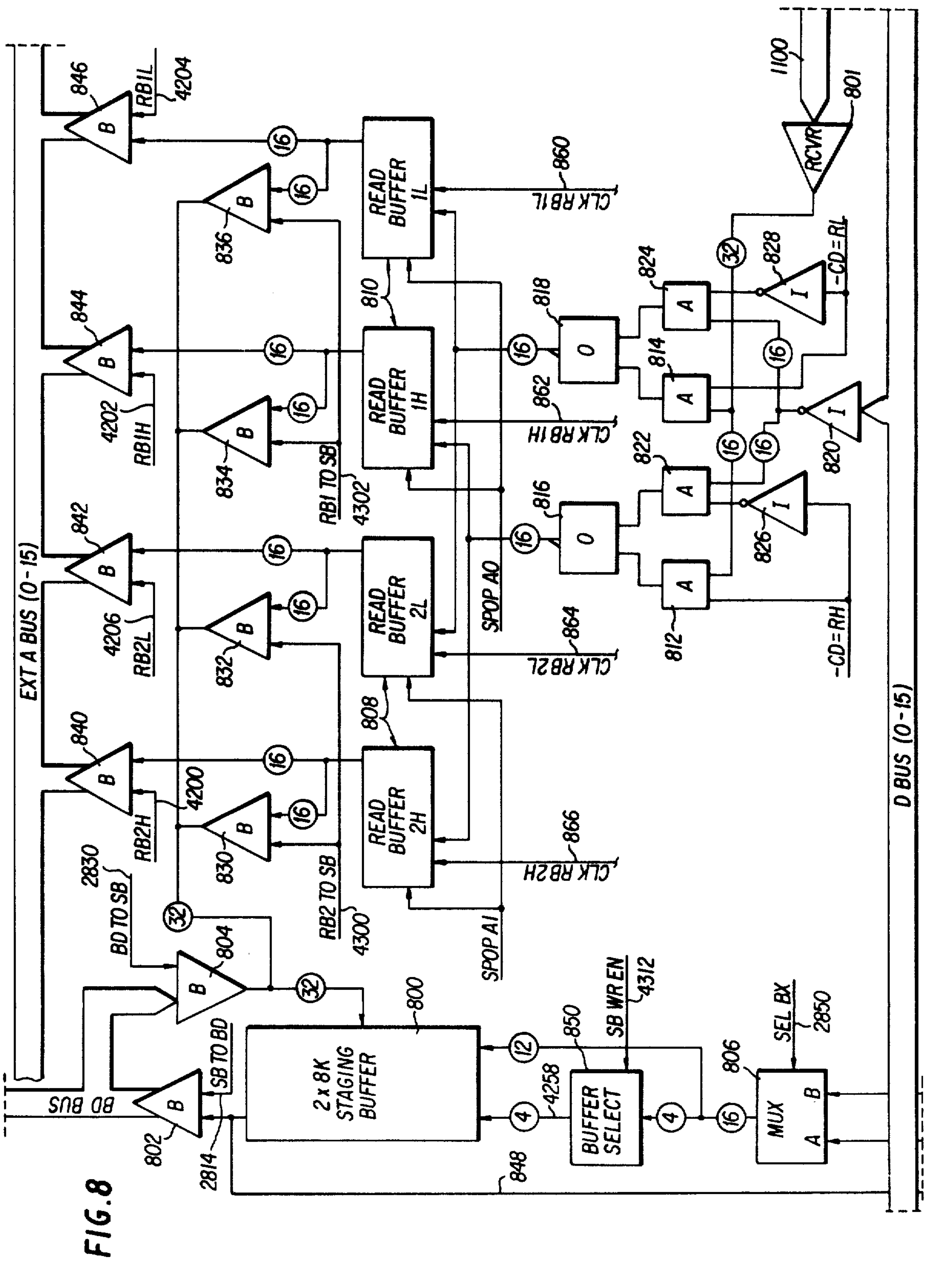

FIGS. 8–10 illustrate in block form the elements comprising the control interface 222 which interfaces the CSUs 104,106 to the SCU. The control interface includes a Staging Buffer (SB) 800, two ReadBuffer Registers 808 and 810, two Write Buffer Registers 903, 904, 905 and 907, a Word Transfer Counter (TC) 906, a Buffer Index (BX) Register 908, and a Buffer Alternate (BA) Counter 910, a Control Tag (CT) Register 1004 and a Response (RS) Register 1014.

The SB 800 comprises a pair of eight kilobyte buffer areas which are utilized for data movement between disc and cache. These buffer areas permit continuous staging or destaging of data using up to a 2.5 megabyte per second disk transfer rate when two SCU's are alternately bursting to cache while simultaneously transferring from two disk drives. In addition to the buffer areas, SB 800 also includes RAM for the storage of certain values.

Read Buffer Registers 808 and 810 serve as input registers to SB 800 from the CSU. Register 810 is divided into two 16-bit sections designated Read Buffer 1 Low (RB 1L) and Read Buffer 1 High (RB 1H) while the Register 808 is divided into two 16-bit sections designated Read Buffer 2 Low (RB 2L) and Read Buffer 2 High (RB 2H). Both sections of Read Buffer 1 may be cleared by executing a control word having SPOP =A0. In like manner, both sections of Read Buffer 2 may be cleared by executing a control word having SPOP =A1.

Data from the CSU is applied over Bus In 1100 and a set of 32 receivers 801 to a first set of sixteen ANDs 812 and a second set of sixteen ANDs 814. As long as the CD field of a control word does not equal RH or RL, the signals −CD=RH and -31 CD=RL are both false and enable ANDs 812 and 814 so that a 32-bit word on bus 1100 may pass through the ANDs and two sets of ORs 816 and 818 to the Read Buffers 808 and 810. The outputs of ORs 818 are connected in parallel to RB 1L and RB 2L while the outputs of ORs 816 are connected in parallel to RB 1H and RB 2H. Data from ORs 816 and 818 is clocked into the read buffer registers by the signals CLK RB 2H, CLK RB 2L, CLK RB 1H and CLK RB 1L. These signals are derived from a circuit similar to that shown in FIG. 42A. The circuit of FIG. 42A derives the clocking signals for the write buffer registers subsequently described. A similar circuit (not shown) receives the signals −CLK RB 2, −CD=RH, −CD=RL and −CLK RB 1 to generate the clocking signals for the read buffer registers. When data is being transferred from the CSU to the SB 800 either RB 1H and RB 1L or RB 2H and RB 2L are clocked in order to load a 32-bit word into one of the read buffer registers.

Sixteen-bit data words may also be entered into Buffer Registers 808 and 810 from the D Bus. From the D Bus the data is passed through a set of inverters 820 to two sets of ANDs 822 and 824. If the CD field of a control word specifies the address of RH then the signal −CD=RH is passed through an inverter 826 to enable ANDs 822 to thereby pass the value on the D Bus through ANDs 822 and ORs 816 to RB 2H and RB 1H. The word is clocked into one or the other of these registers depending upon the state of the signal ALTERNATE REGISTER ENABLE as subsequently explained with reference to FIG. 42A.

If the CD field of a control word specifies the address of RL then the signal −CD=RL is passed through an inverter 828 to enable ANDs 824. A data word on the D Bus may then pass through inverters 820, ANDs 824, and ORs 818 to RB 2L and RB 1L. Again, the word is clocked into one or the other of the registers depending upon the state of the signal ARE.

The outputs of RB 2H and RB 2L are connected to two sets of gated buffers 830 and 832 which are gated by the signal RB2 TO SB on lead 4300. In like manner, the outputs from RB 1H and RB 2L are connected to two sets of gated buffers 834 and 836 with these gated buffers receiving the gating signal RB1 TO SB on lead 4302.

Figure 43:
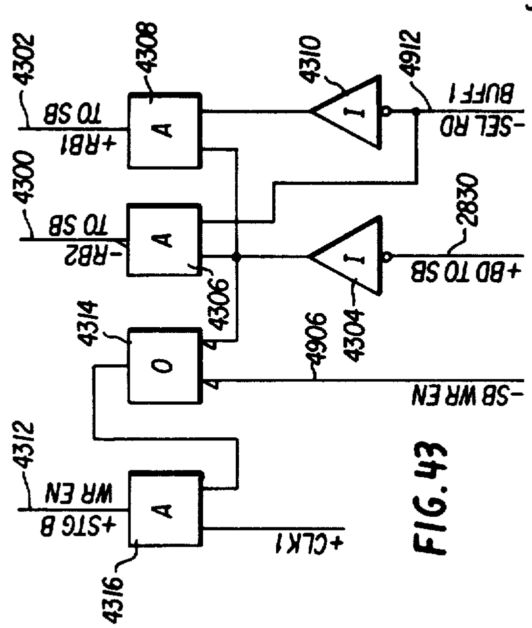

Referring to FIG. 43, during CSU to SB transfers the signal +BD TO SB is false, so the output of inverter 4304 enables ANDs 4306 and 4308. The signal −SELECT READ BUFFER 1 is applied to AND 4306 and through an inverter 4310 to AND 4308. When the signal −SELECT READ BUFFER 1 is true AND 4308 produces the signal +RB1 TO SB on lead 4302 to gate the contents of RB 1H and RB 1L to the SB 800. On the other hand, when −SELECT READ BUFFER 1 is false AND 4306 produces the signal −RB2 TO SB on lead 4300 to gate the contents of RB 2H and RB 2L into SB 800.

Four sets of gated buffers 840, 842, 844 and 846 are provided for gating the contents of RB 2H, RB 2L, RB 1H and RB 1L onto the EXT A Bus. The gated buffers 840, 842, 844 and 846 are controlled by the signals +RB 2H, +RB 2L, +RB 1H and +RB 1L derived in FIG. 42B, In FIG. 42B, the signal −CA=RL is derived from the CA decoder 304 and is true whenever the CA field of a control word has a value corresponding to RL. This signal is applied to two ANDs 4208 and 4210. When the CA decoder decodes a control word wherein CA=RH, the signal −CA=RH is true and it enables two ANDs 4212 and 4214. The signal −ARE is applied to ANDs 4212 and 4210, and is passed through an inverter 4216 and applied to ANDs 4208 and 4214.

During a write operation data may be read from staging buffer 800 and passed through a write buffer register to bus out 900 from whence it may pass to the CSU. The data read from the SB 800 is passed over bus 848 and through a MUX 912 and applied to write buffers 902 and 904. Like the read buffer registers previously described, the write buffer registers 902 and 904 are each logically divided into two 16-bit registers which may be selectively loaded upon receipt of a clocking pulse.

Figure 42A:
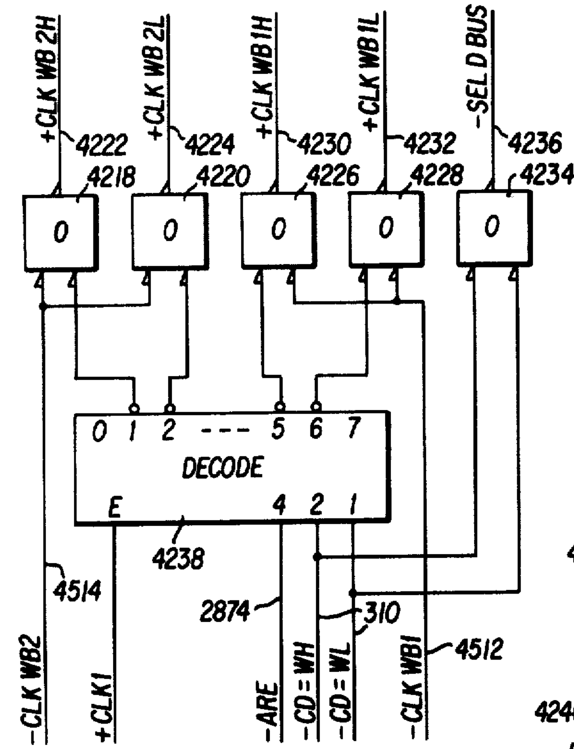

In FIG. 42A, when the signal −CLOCK WB2 is true, it passes through two ORs 4218 and 4220 to generate the signals +CLK WB 2H and +CLK WB 2L on ledads 4222 and 4224. The signal +CLK WB 2H gates the 16 high order bits from MUX 912 into WB 2H while the signal +CLK WB 2L gates the 16 low order bits from MUX 912 into WB 2L.

The signal −CLK WB1 is passed through two ORs 4226 and 4228 to generate the signals +CLK WB 1H and +CLK WB 1L on leads 4230 and 4232. +CLK WB 1H gates the 16 high order bits from MUX 912 into WB 1H while the signal +CLK WB 1L gates the 16 low order bits from MUX 912 into WB 1L. As will be evident from the description of the ADT controls, the signals −CLK WB2 and −CLK WB1 cannot simultaneously be true. Therefore, the output of MUX 912 may be loaded into either one or the other of the write buffer registers.

During transfers from SB 800 to the CSU, the signals −CD=WH and −CD=WL are both false. In FIG. 42A, these signals are applied to an OR 4234 thus making the signal −SELECT D BUS at the output of OR 4234 false. The signal −SELECT D BUS is applied over lead 4236 to the MUX 912 and when the signal is false it selects the output of SB 800 as the input to the write buffer registers.

It is also possible to load a 16-bit value from the D Bus into one of the write buffer registers. The CD field of the control word must specify either WH or WL so that one of the signals −CD =WL and −CD=WH is true. In FIG. 42A, the true signal passes through OR 4234 to make −SELECT D BUS true. When −SELECT D BUS is true it enables MUX 912 to pass the contents of the D Bus through to the write buffers registers. A decoder 4238 is enabled by +CLK 1 and decodes the signals −CD=WH, −CD=WL and −ARE to produce one of four output signals to ANDs 4218, 4220, 4226 or 4228. For example, if the control word specifies CD=WL and SPOP is not equal to AF the signals −ARE and −CD=WH are false so that decoder 4238 produces an output signal through OR 4228 to clock WB 1L. On the other hand, if the control word specifies CD=WL and SPOP=AF then the decoder would produce an output signal through OR 4220 to clock the output of MUX 912 into WB 2L.

The contents of WB 2H, WB 2L, WB 1H or WB 1L may be selectively gated through a set of gated buffers 914, 916, 918 or 920 to the EXT A Bus. The selection signals are generated by a decoder 4240 shown in FIG. 42C. The decoder decodes the signals −ARE, −CA=WL and −CA=WH to produce one of the signals −WB 2H, −WB 1H, −WB 2L or −WB 1L. These signals are applied to the gated buffers 914, 916, 918 and 920 to selectively gate the contents of one of the write buffer registers onto the EXT A bus.

A 32-bit word in WB 2 or WB 1 may be gated to the cache memory cover Bus Out 900. The 32-bit output of WB 2 is connected to a set of drivers 901 while the 32-bit output of write buffer 1 is connected to a set of drivers 902. The signal +SELECT WB1 is applied to drivers 902 to gate the contents of WB 1 onto the bus 900 while the signal +SELECT WB2 is applied to drivers 901 to gate the contents of Write Buffer Register 902 onto bus out. The signals +SELECT WB2 and +SELECT WB1 are mutually exclusive and are generated by the circuits of FIG. 45B as subsequently described.

Figure 42E:
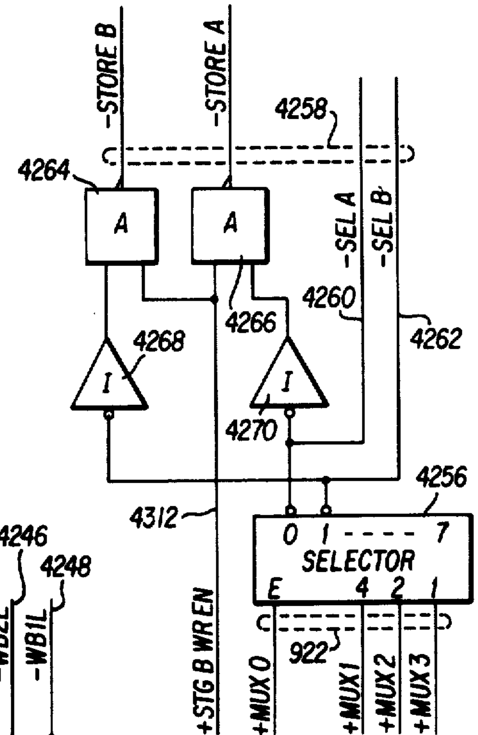
Figure 42C:
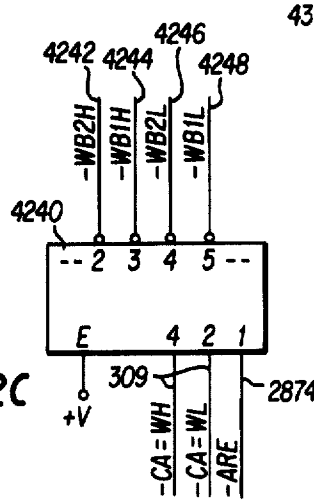
Figure 42B:
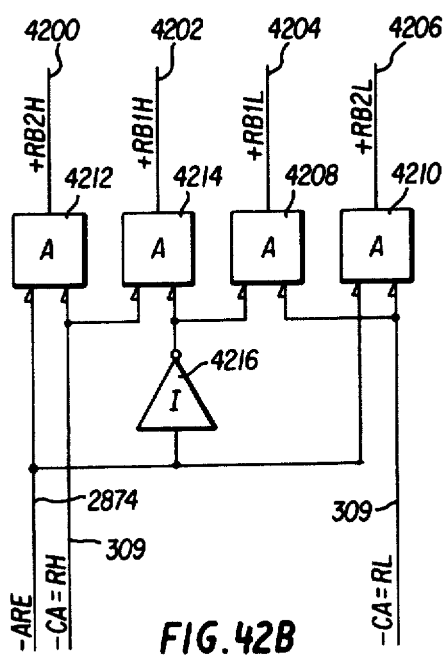

The BX Register 908 and the BA counter 910 are utilized to address the staging buffer 800. The BX Register 908 is a 16-bit register having its inputs connected to the D Bus. The contents of the D Bus are gated into BX by the signal −CD=BX on lead 4252. This signal is generated in FIG. 42D by the AND 4254. If the signal −ARE is false and the decoder 306 is producing the signal +CD=1D, then at CLK 1 AND 4254 produces −CD=BX to gate a value on the D Bus into BX 908. The contents of BX are applied to one set of inputs of a MUX 806. On transfers over the BD Bus involving the Staging Buffer 800, the BD bus controls of FIG. 28 generate the signal +SELECT BX to gate an address from BX 908 through MUX 806 to the staging Buffer 800 and a buffer select circuit 850. The 12 low order bits from MUX 806 are applied directly to staging buffer 800 to select an address. The four high orders are applied to the buffer select circuit 850, the details of which are shown in FIG. 42E. In FIG. 42E, the high order bit position of MUX 806 must be false in order to enable a selector 4256. Bit positions 1 and 2 must also be zeroes. If bit position 3 is a zero then staging buffer area A is selected and if bit position 3 is a 1 then staging buffer are B is selected. The signals −SELECT A and −SELECT B on leads 4260 and 4262 are applied to the staging buffer 800 as chip enables to enable the selection of an address in buffer area A or buffer area B, respectively. If the address is selected for the purpose of writing into the staging buffer rather than reading therefrom, then the signal +STAGING BUFFER WRITE ENABLE on lead 4312 must also be true. This signal is applied to two ANDs 4264 and 4266. AND 4264 has a second input connected through an inverter 4268 to the "one" output of selector 4256. AND 4266 has a second input connected through an inverter 4270 to the "zero" output of selectror 4256. The output of AND 4264 is the signal −STORE B which is applied to the staging buffer 800 in order to write into staging area B of the buffer. The output of AND 4266 is the signal −STORE A which is applied to the staging buffer 800 in order to enable the writing into staging area A of the buffer.

The output of Bx Register 908 is connected through a set of gated buffers 924 to the EXT A Bus. This enables the contents of the BX Register to be read out over the EXT A Bus, incremented in the ALU 400, and the incremented address returned to the BX Register over the D Bus. The signal CA=BX for gating the contents of the BX Register onto the extended A Bus is generated in FIG. 42D by an AND 4274. The signal −ARE is passed through an inverter 4276 and applied to one input of AND 4274 while the second input receives the signal −CA=1D on lead 309. If the CA field of acontrol word has the value 1D and if −ARE is false AND 4274 produces the signal −CA=BX to gate the contents of the BX Register onto the EXT A Bus.

The contents of BA counter 910 may also be utilized to address staging buffer 800. The BA counter 910 may be loaded with a value from the D Bus by executing a control word wherein CD=1D and SPOP=AF to generate −ARE. Under these conditions both inputs of an AND 4278 (FIG. 42D) are enabled and the AND produces an output signal through inverter 4280 to generate the register selection signal −CD=BA on lead 4282. This signal is applied to the BA counter to enable the parallel loading of the counter from the D Bus. The output of AND 4278 also enables an AND 4284 and upon occurrence of +CLK 1 AND 4284 produces an output signal through OR 4286 to clock the value on the D Bus into the counter.

Figure 42D:
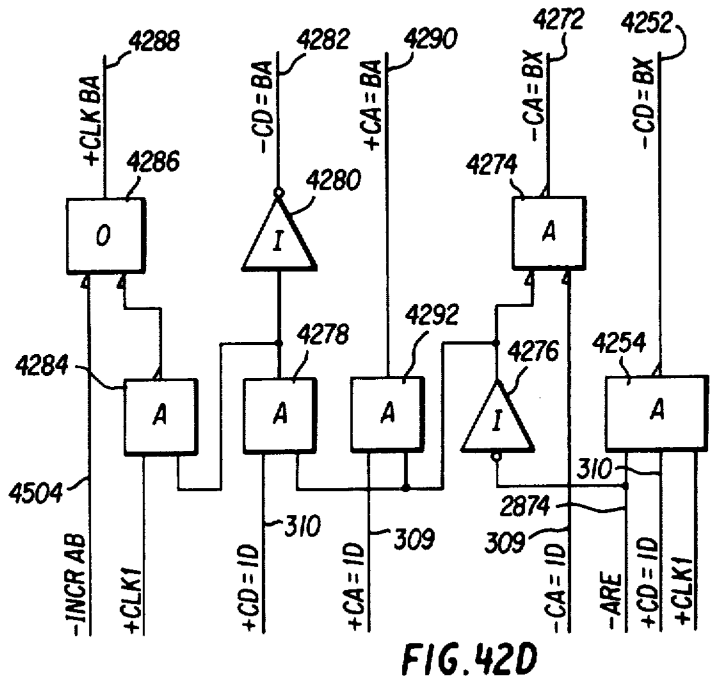
Figure 45B:
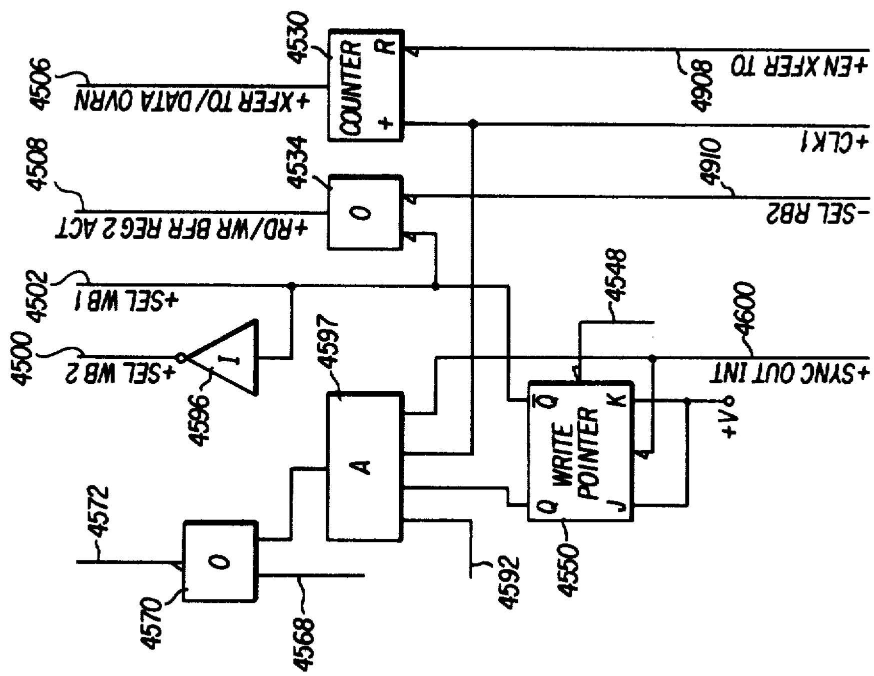
FIGS. 43, 44, 45A, 45B, 46, 47A, 47B, 48 and 49 illustrate the logic of the ADT controls shown in block form in FIG. 10.
Figure 45A:
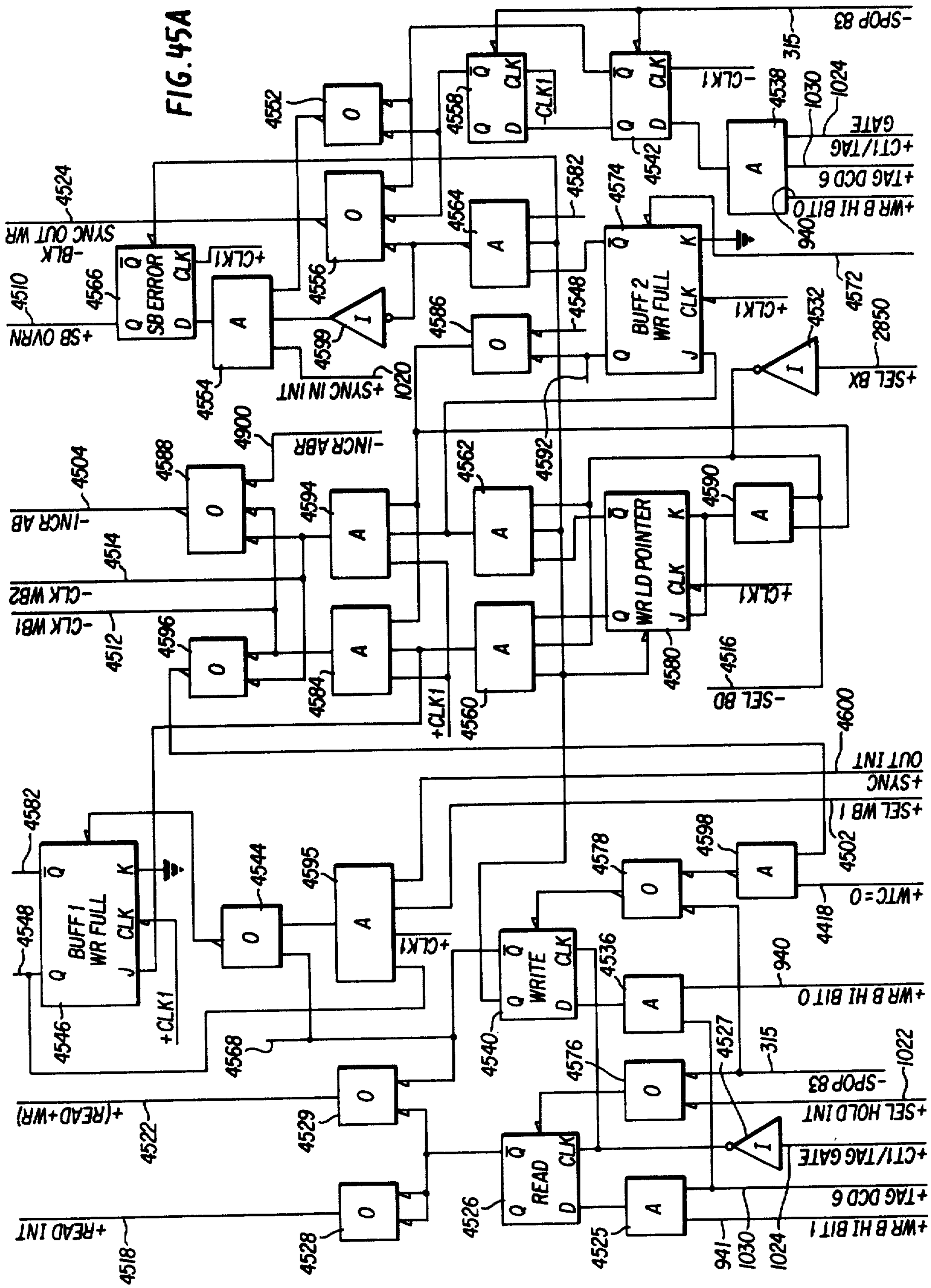

Once the counter 910 has been loaded from the D Bus, its contents may be incremented by 1 when the ADT controls of FIG. 45A generate the signal −INCREMENT AB on lead 4504. In FIG. 42D, the signal passes through OR 4286 to become the signal +CLK BA on lead 4288, this latter signal being applied to counter 910 to increment the count therein.

The contents of the BA counter 910 are applied to MUX 806 in order to address the staging buffer 800, the addressing taking place in substantially the same manner as for addressing with the BX Register 908. The only difference is that the signal +SELECT BX is false in order that the A inputs of MUX 806 may be gated through to its outputs.

The contents of the BA counter 910 are applied to a set of gated buffers 926 having their outputs connected to the EXT A Bus. Gated buffers 926 are enabled when the signal +CA=BA on lead 4290 is true. In FIG. 42D, an AND 4292 is connected to the output of inverter 4276 and also receives at a second input the signal +CA=1D. Thus, AND 4292 produces the signal +CA=BA when a control word is executed wherein CA=1D and SPOP=AF.

The word transfer counter (TC) 906 is a 16-bit counter register which keeps track of the number of words to be transferred to/from the staging buffer 800. TC is normally loaded with a value which is the complement of the number of words to be transferred to/-from the staging buffer. The count is then incremented until TC=0.

Figure 44:
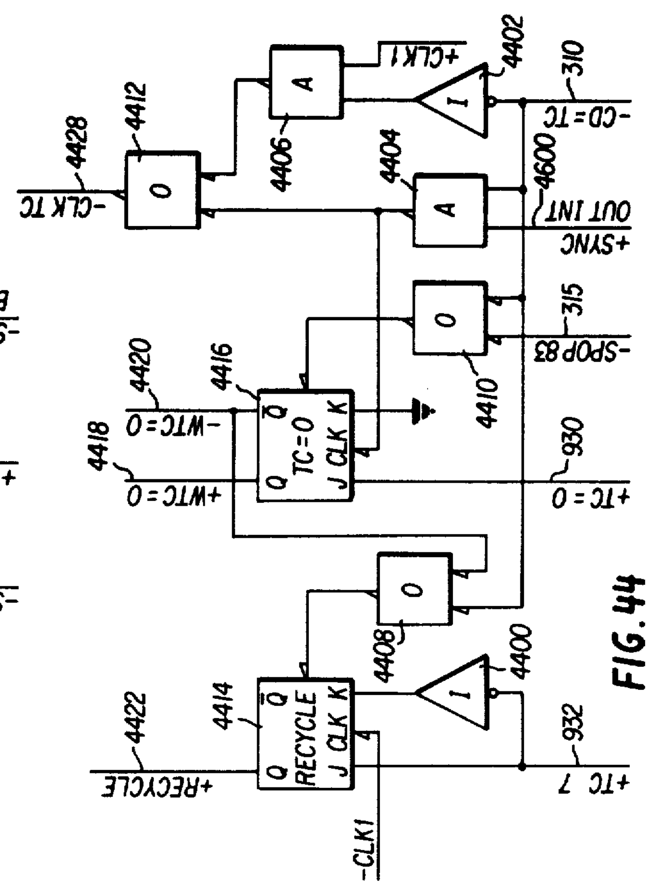

The controls for TC 906 are shown in FIG. 44 and include two inverters 4400 and 4402, two ANDs 4404 and 4406, a plurality of ORs 4408, 4410 and 4412, and two JK flip-flops 4414 and 4416. When a control word having CD=TC is executed, the signal −CD=TC passes through ORs 4408 and 4410 to reset flip-flops 4414 and 4416. At the same time, −CD=TC passes through inverter 4402 and enables AND 4406. At CLK 1 AND 4406 produces an output signal to OR 4412 which in turn produces the signal −CLK TC on lead 4428. The signal +CD=TC is also applied to the parallel-enabling input of TC hence when −CLK TC goes true a value on the D Bus is entered into TC. When −CD=TC is false, the signal −CLK TC increments the count in TC. This occurs when +SYNC OUT INT enables AND 4404 is subsequently described.

In addition to being reset when the TC register is loaded from the D Bus, flip-flop 4416 is also reset when a control word is executed wherein SPOP=83. The signal −SPOP 83 passes through OR 4410 to the reset input of the flip-flop. The flip-flop may be set only when the contents of the TC Register equal 0. The register produces the signal +TC=0 on lead 930 which is connected to the J input of the flip-flop. The flip-flop is clocked by the output of AND 4404 when +SYNC OUT INT on lead 4600 is true and the signal −CD=TC is false.

When latch 4416 is set the QB output acts through OR 4408 to reset the Recycle Latch 4414. This latch is clocked by −CLK 1 and the state of the latch is determined by the contents of the TC 906. If TC contains a value greater than 7 it produces the signal +TC 7 on lead 932. This signal is applied to the J input of latch 4414 and through inverter 4400 to the K input of the latch. As long as +TC 7 is true the signal on lead 932 is clocked into the latch at each CLK 1 and maintains it in a set condition whereby it generates the signal +RECYCLE on lead 4422. As soon as the contents of TC represent a value of 7 or less, the signal +TC 7 goes false and at the next CLK 1 the latch 4414 is reset. The recycle signal is sent to the CSU which terminates the transfer operation after 7 more words are transferred.

The contents of TC 906 are also applied to a set of gated buffers 934. These buffers receive the signal CA=TC from decoder 304 when a control word is executed wherein CA=TC. When CA=TC the contents of the TC Register are gated through buffers 934 to the EXT A Bus.

The Control Tag (CT) Register 1004 is the register into which control tags are entered for transmission to the CSU over the Tag Out Bus 1000. The CT Register is an 18-bit register for holding 16 bits plus two parity bits. The 16 data bit positions are connected through a set of gated buffers 1006 to the EXT A Bus. The CT Register may be loaded from the D Bus by a control word wherein CD=CT.

Referring for the moment to FIG. 2, the bus 1000 includes 14 leads. Nine of these leads comprise the tag bus and the remaining five leads carry the signals RECYCLE, TAG GATE, SELECT HOLD, SYNC OUT and RESPONSE. In the CT Register, tag bus bits 0–7 and P are stored in positions 8–15 and the low order parity position. Bit 0 stores the SELECT HOLD signal, CT 1 stores the TAG GATE and CT 2 stores the RESPONSE signal. Bit 5 of the CT Register stores an ENABLE CHECK 2 signal which is not applied to the bus 1000. Bit positions 3, 4, 6 and 7 are not used. In addition, bit positions 8–11 must be zero so that tag bus bits 0–3 will be zero.

Figure 47A:
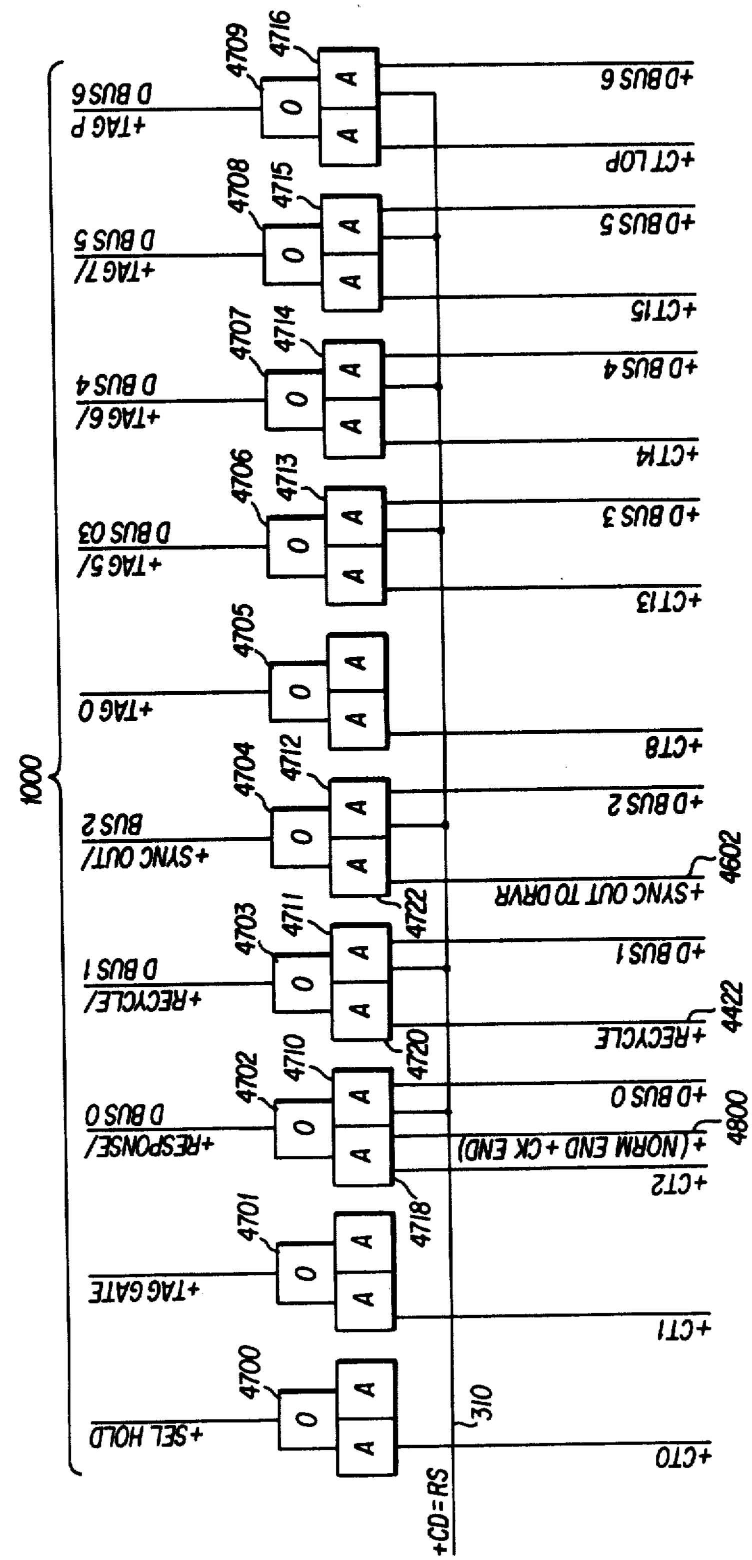

Output signals from CT 1004 are applied to bus 1000 through a set of 14 drivers 1008. Seven of these drivers also receive inputs from a set of seven ANDs 1010. Referring to FIG. 47A, the ANDs 1010 are individually illustrated as ANDs 4710–4716 while ten of the drivers 1008 are illustrated as ORs 4700–4709. The four drivers not shown may be like driver 4705 but each receives one of the signals +CT 9– +CT 12. The outputs from ORs 4705–4709 and the four drivers not shown represent tag bus bits 0–7 and their parity which are applied over the bus 1000 to the CSU controls. The outputs of ORs 4700–4702 are the tag control signals +SELECT HOLD, +TAG GATE and +RESPONSE which are applied over the bus 1000 to the CSU controls. It should be noted that with the exception of CT 2 there is no gating of the contents of the CT register onto bus 1000. However, the output from CT 2 is applied to an AND 4718 which also receives the signal +(NORMAL END +CHECK END) on lead 4800 from the ADT control circuit 1012 as subsequently described.

The control tags RECYCLE and SYNC OUT are not derived from the CT Register. The signal +RECYCLE is generated in FIG. 44 as previously described and applied over lead 4422, AND 4720 and OR 4703 to the bus 1000. The signal +SYNC OUT TO DRIVER is generated by the ADT control circuit 1012 as subsequently described and is applied through AND 4722 and OR 4704 to the bus 1000.

The ANDs 4710–4716 are connected to bit positions 0–6 of the D Bus. These ANDs are all enabled by +CD=RS on lead 310 when a control word specifies the Response Register 1014 as a destination. This enables control tags to be placed on bus 1000 directly from the D Bus.

Figure 47B:
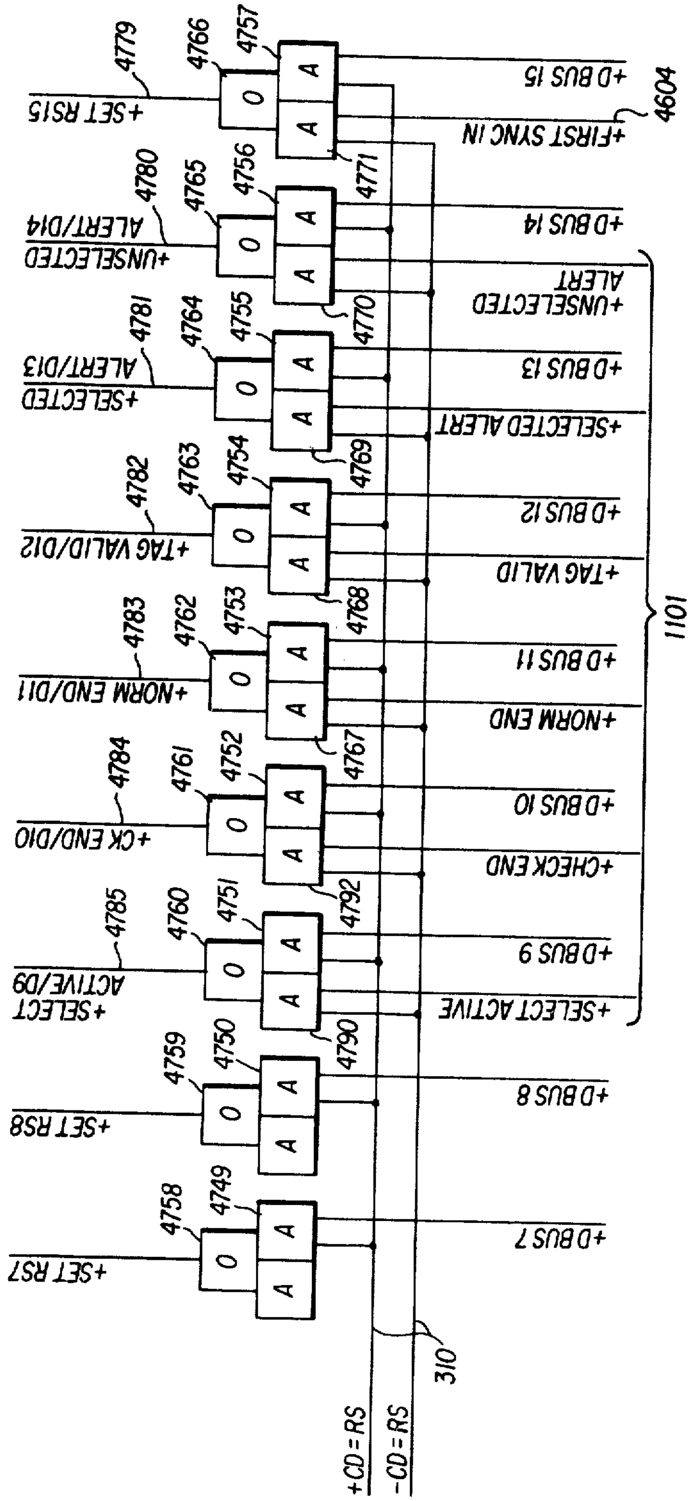

The Response (RS) Register 1014 is a 16-bit register which receives and stores control signals transmitted to the SCU over the bus 1101 from the CSU. The bus 1101 is connected to a set of six receivers 1003 having their outputs connected through a set of ORs 1016 to the RS Register. RS may also be loaded from the D Bus through a set of ANDs 1018 also having their output connected to ORs 1016. In FIG. 47B, receivers 1003 are individually illustrated as ANDs 4765–4770 while ORs 1016 are individually illustrated as ORs 4758–4766 and ANDs 1018 are individually illustrated as ANDs 4749–4756. The signals +SELECT ACTIVE, +CHECK END, +NORMAL END, +TAG VALID, +SELECTED ALERT and +UNSELECTED ALERT from the control bus 1101 are applied to ANDs 4765–4770, respectively. These ANDs are further enabled by −CDd=RS anytime the SCU is not executing a control word wherein CD=RS. The outputs from ANDs 4765–4770 pass through ORs 4760–4765 to set stages 9–14, respectively of the RS Register.

Bits 0–6 of the RS Register are connected to certain of the drivers 1008 and more particularly to the ORs 4702–4704 and 4706–4709 in FIG. 47A. When a control word is executed having CD=RS, the signal +CD =RS enables ANDs 47610–4716 in FIG. 47dA and ANDs 4749–4757 in FIG. 47B to gate the contents of the D Bus into the RS Register. The register is loaded at CLK 1.

The signal SYNC IN on bus 1101 is applied to a receiver 1002 to generate the signal +SYNC IN INT on lead 1020. Ths signal is applied to the ADT controls of FIG. 46 where, as subsequently described, it causes generation of the signal +FIRST SYNC IN on lead 4604. In FIG. 47B, this signal is applied to AND 4771 and if −CD=RS is false the signal passes through AND 4771 and OR 4766 to set stage 15 of the RS Register.

The RS Register is connected through a set of gated buffers 1032 to the EXT A Bus. The buffers 1032 are enabled by the signal CA=RS to gate RS onto the EXT A Bus when the CA field of a control word has the valve 37.

The outputs from receivers 1003, or more particularly the outputs of ORs 4760–4765 are appliedover leads 4780–4785 to the ADT controls 1012. Certain outputs of the CT register are also applied directly to the ADT controls 1012. These include the signal SELECT HOLD INT derived from CO, CT 1/TAG GATE derived from CT 1, and CT 5/ENABLE CHECK 2 derived from CT 5. In addition, the outputs from CT 12-CT 15 are applied to a TAG decode circuit 1028 which produces an output signal to the ADT controls 1012 when CT 12-CT 115 contain the hexadeciumal valuer 6.

SCU/CSU INTERFACE SIGNALS

The automatic data transfer (ADT) controls 1012 control the transfer of information from the SCU to the CSU over BUS OUT 900, and the transfer of information from the CSU to the SCU over Bus in 1100. These transfers are controlled by various control signals entered into the CT Register 1004 from the D Bus and by other control signals received from the CSU ovewr the control bus 1101. The various signals transmitted between the CSU are briefly defined here, the details of their use being subsequently described.

BUS OUT

BUS OUT 900 is a 36-bit bus for transmitting four bytes, each byte comprisingb 8 data bits plus a parity bit. Bit 0 is the most significant bit. BUS OUT 900 may transmit either data or command, address and tag modifier information. When the signal SYNC OUT is active, the signals on BUS OUT define data. When the signal TAG GATE is active the signals on BUS OUT define command, address and tag modifier information. Data or information signals are placed on BUS OUT at least 100 ns before TAG GATE or SYNC OUT becomes active and remain valid at least 150 ns after Tag Gate goes false or 100 ns after SYNC OUT goes false.

TAG BUS

The tag bus transmits tag command information from the SCU to the CSU. It comprises 8 bits plus parity and is contained within the control bus 1000. Bits 0–3 on the tag bus must be zeros. Bits 4–7 comprise a hexadecimal value defining one of 16 possible commands or tags. Only those tags necessary for an understanding of the present invention are summarized below. The signal TAG GATE is transmitted over bus 1000 with the TAG command information to inform the CSU that a tag is present on the bus. The signals on tag bus are stable at least 100 ns before TAG GATE goes true and remain stable at least 150 ns after TAG GATE goes false.

TAG GATE

The signal TAG GATE is transmitted over bus 1000 to the CSU to indicate that the information on BUS OUT 900 or the tag bus is valid. TAG GATE remains active until a signal TAG VALID is received from the CSU. If TAG GATE rises during a read or write data transfer portion of an extended operation, the data transfer is terminated and TAG O is placed on the tag bus. The signal NORMAL END should be raised on bus 1101 by the CSU with status 2 being placed on BUS IN 1100.

SELECT HOLD

This signal is used in conjunction with tag 3 and the proper address on BUS OUT 900 to initially select a CSU. The selection remains in effect as long as SELECT HOLD is active and terminates when SELECT HOLD goes false. SELECT HOLD must be active at least 100 ns before TAG GATE becomes active.

SYNC OUT

The SCU places this signal on bus 1000 to acknowledge to the CSU that it has received read data from the CSU over BUS IN 1100, or to inform the CSU that valid write data is present on BUS OUT 900. This signal is used only for extended data transfer operations.

RESPONSE

The SCU generates this signal on bus 1000 to acknowledge receipt of NORMAL END or CHECK END from the CSU on extended operations only.

RECYCLE

The SCU places this signal on bus 1000 on read/write data transfers involving more than seven words (an extended operation). The signal is made active before data transfer begins and goes inactive when there are exactly seven words left to be transferred. Wne the SCU detects that RECYCLE has become inactive, the SCU generates NORMAL END/CHECK END after the last word is transferred.

BUS IN

Bus IN 1100 is a 36-bit bus for the parallel transmission of four bytes of data, each byte comprising 8 data bits plus a parity bit. Bit O is the most significant bit. The SCU places data on Bus IN and, after a lapse of at least 100 ns, generates the signal SYNC IN on control bus 1101 to tell the SCU that Bus IN contains read data.

During NORMAL END, Bus IN presents various types of information depending upon which tag decode is being executed. During CHECK END, Bus IN presents error conditions that have been detected by the CSU. For immediate operations (transfers involving less than seven words), during NORMAL END or CHECK END, the signals on Bus IN must be stable by the time TAG VALID goes active and must remain stable until after TAG GATE is terminated. For extended operations, the signals on Bus IN must be stable by the time NORMAL END or CHECK END is generated and must remain stable as long as either NORMAL END or CHECK END is active.

TAG VALID

The CSU transmits this signal over control bus 1101 to inform the SCU that it has properly received BUS OUT and TAG BUS, and that Bus IN is valid. In response to TAG VALID, the SCU drops TAG GATE. In response to the fall of TAG GATE the CSU drops TAG VALID.

SELECT ACTIVE

A CSU generates SELECT ACTIVE as a result of being selected by the SCU. Once selection of the CSU has been made, SELECT ACTIVE remains active as long as the SCU keeps SELECT HOLD active.

SYNC IN

On write operations, the CSU places this signal on bus 1101 to request that another word be placed on BUS OUT by the SCU. On read operations, the CSU generates SYNI IN to inform the SCU that valid data is present on Bus IN. The signal SYNI IN is used only for extended data transfer operations.

NORMAL END

The CSU transmits this signal over bus 1101 to the SCU to inform the SCU that an operation has been completed with expected results. On immediate operations, NORMAL END goes active with or before TAG VALID and remains active until TAG GATE drops. On extended operations, NORMAL END goes active only after the last word of data is transferred and goes inactive whe the SCU issues the signal RESPONSE. For extended operations only, status 2 information is present on BUS IN during NORMAL END. NORMAL END is mutually exclusive with CHECK END.

CHECK END

This signal is sent by the CSU over the bus 1101 to the SCU to inform it that an abnormal condition has been detected by the CSU and is being presented on BUS IN with proper parity. CHECK END status on BUS IN must be valid when CHECK END rises and should not change until the SCU generates the signal RESPONSE on extended operations or until TAG GATE drops on immediate operations. The signal RESPONSE is used to reset CHECK END status in the CSU.

SELECTED ALERT 1

This signal is sent by the CSU over the bus 1101 to the SCU to inform the SCU that a hardware error has been detected. SELECT ACTIVE must be true before SELECTED ALERT 1 is activated. During selection SELECTED ALERT 1 can be generated anytime an error is detected.

UNSELECTED ALERT 1

The CSU generates this signal on bus 1101 to inform the SCU that it has detected an unsafe condition such as high temperature, refresh loss, air loss or power supply unsafe. These conditions cause UNSELECTED ALERT 1 to be generated even though the CSU is not selected.

TAG COMMANDS

When the SCU places a tag command on the tag bus, it may place certain modifiers on BUS OUT 900. From bus 1000 the TAG command is passed through a set of receivers 1103 and applied to a tag decoder 1106 located in a port control circuit of the CSU. The CSU control circuits respond to the decoded tag command and the BUS OUT modifiers if any, and may, under certain circumstances, generate a response which is transmitted back to the SCU. The following paragraphs define the various decoded tag commands and the required responses which are placed on BUS IN by the CSU.

TAG 0 is active only when TAG GATE is raised by the SCU to stop a data transfer during an extended operation.

TAG 2 is a polling command used by the SCU to poll each attached CSU for service requests. Each CSU that has an active service request raises the BUS IN bit that corresponds to its address. Selection is not required for TAG 2 execution.

During normal operation, when the SCU is not transferring data, it resorts to an idle program loop. During execution of this program loop the SCU polls the CSU in order to determine if there is a service request. If there is, then the SCU selects the CSU. Normal polling is repeatedly done during the idle loop. The SCU accomplishes this by generating TAG 2 with no modifiers on BUS OUT. Each CSU that has an active service request condition places its address on BUS IN.

The only service request condition of interest with respect to the present invention is the one called "RELEASED". Because of the dual port feature of the CSU, it is possible for two SCUs to try to select the CSU at the same time. Only one SCU can control a CSU at a time. It is the responsibility of the CSU to present a service request condition called RELEASED to the SCU which is denied access. This situation occurs if SCU 1 reserves port 1 and SCU 2 receives the signal NOT AVAILABLE when it tries to make a reservation through port 2. Port 2 of the CSU remembers that SCU 2 tried to reserve or select it when it was already reserved or selected by the other SCU. When port 1 is released, port 2 responds to SCU 2's poll with a "released" service request. The SCU then selects the SCU by issuing a SELECTION command.

TAG 3 is the selection command. Selection of the CSU is accomplished by issuing TAG 3 with an address on bits 0–2 of BUS OUT. Bits 3–31 must be 0. The SDTs are assigned decimal addresses 0–3 and the cache stores are assigned decimal addresses 4–7. BUS OUT bits 0–2 are decoded in the CSUs to select one of the SDTs or one of the cache stores. The CSU responds to the SCU by placing the address of the CSU (SDT or cache store) on BUS IN bits 0–2, the complement of this address on bits 5–7 and odd parity for BUS IN bits 0–7. Odd parity is also maintained for the other three bytes on BUS IN.

The SCU issues TAG 4 to sense various status conditions in the CSU. BUS OUT bit 6 is used as a command modifier for TAG 4. The CSU responds to TAG 4 by activating various bits on BUS IN corresponding to the CSU status. BUS IN bit 0 is made true to indicate to the SCU that it has the port reserved to it. This status remains active until a RELEASE command is issued by the interface. The CSU activates BUS IN bit 1 as a service request when a reservation is released from another interface if the current interface had previously received NOT AVAILABLE status as a result of the reservation. This status remains active until cleared by TAG 10, BUS OUT 7 (reset interrupt) from the SCU. The CSU activates BUS IN bit 2 to indicate that another interface has selected, but has not reserved, the CSU. While the CSU is holding this status active and has been reserved, it will not execute TAGS 6 and 10. The status disappears when the operation in progress on the other interface is terminted.

The CSU activates BUS IN bit 6 to indicate to the SCU that the CSU has been seleted or reserved by another interface. Until deselected or released by the interface that reserved it, the CSU will not execute any TAG 6 or TAG 10 commands from any interface receiving NOT AVAILABLE status. The CSU activates BUS IN bit 7 to indicate to the SCU that a data transfer is in progress.

TAG 6 is the read/write control tag. Execution of TAG 6 causes the value contained on BUS OUT bits 4–7 to be set into a modulo 16 counter in the CSU. This counter is used in conjunction with RECYCLE and, on cache transfers, the counter must initially be set so that it will be 0 when the transfer is completed. In addition, BUS OUT bits 9–31 specify the data transfer starting address. BUS OUT bit 0 is set to inform the CSU that an extended write data transfer is going to be executed, the starting address in the cache memory being specified by bits 9–31. The SCU sets BUS OUT bit 1 to inform the CSU that an extended read data transfer is going to be executed starting with the cache memory address specified by bits 9–31.

TAG 6 indicates that an extended operation is beginning hence NORMAL END is not to be presented until the end of the operation.

TAG 10 is used in conjunction with one of six BUS OUT bit command modifiers to execute various control commands on the CSU. BUS OUT bit 0 causes a reservation. After a TAG 3 selection has been performed by a particular SCU, TAG 3 BUS OUT 0 reserves the cache or SDT to that SCU. During the reservation the CSU is permitted to execute TAG 6 and TAG 10 commands only from the reserving SCU. The reservation remains in effect until a RELEASE command is issued by the reserving SCU.

TAG 10 with BUS OUT 1 true defines a RELEASE command. After TAG 3 selection and a reservation have been performed by an SCU, this command releases the CSU from the reservation to that SCU.

TAG 10 with BUS OUT 7 true defines the reset interrupt command. It is issued by an SCU to clear all service requests in a CSU and a clear UNSELECTED ALERT 1.

For the duration of TAG 10, the CSU is obligated to present status 2 information on BUS IN. BUS IN bit 0 indicates reserved status. This bit is activated by the CSU as a result of the reserved (TAG 10, BUS OUT 0) command. The status remains active until a RELEASE command is issued by the SCU.

BUS IN bit 1 indicates released status. It is generated by the CSU as an interrupt when a reservation is released from another interface if the current interface had previously received NOT AVAILABLE status as a result of the reservation. The status remains active until cleared by TAG 10, BUS OUT 7 (reset interrupt).

BUS IN 6 indicates NOT AVAILABLE status. It indicates to the SCU that the CSU has been selected or reserved by another interface. Until deselected or released by the interface that reserved it, the CSU will not execute any commands under TAG 6 or TAG 10 from any interface receiving NOT AVAILABLE status.

ADT CONTROLS

A read operation is one in which data is read from the CSU into one of the areas of staging buffer 800. A write operation is one in which data is transferred from an area of the staging buffer to the CSU. Prior to a read or write operation the CSU must be selected and reserved by the microprogram as subsequently described. The following description of the ADT controls 1012 assumes that the selection and reservation have already been accomplished.

READ

In order to initiate a read operation, the microprogram loads into write buffers 904 and 907 (WB 1) a tag modifier word wherein bit 1 is true, bits 9–31 specify the data transfer starting address and bits 4–7 contain a value which is entered into a modulo 16 counter in the CSU. The microprogram then loads stages 8–15 of the CT register with a value corresponding to TAG 6. Stage CT 0 remains set, having been set during execution of the TAG 3 SELECTION command.

Figure 46:
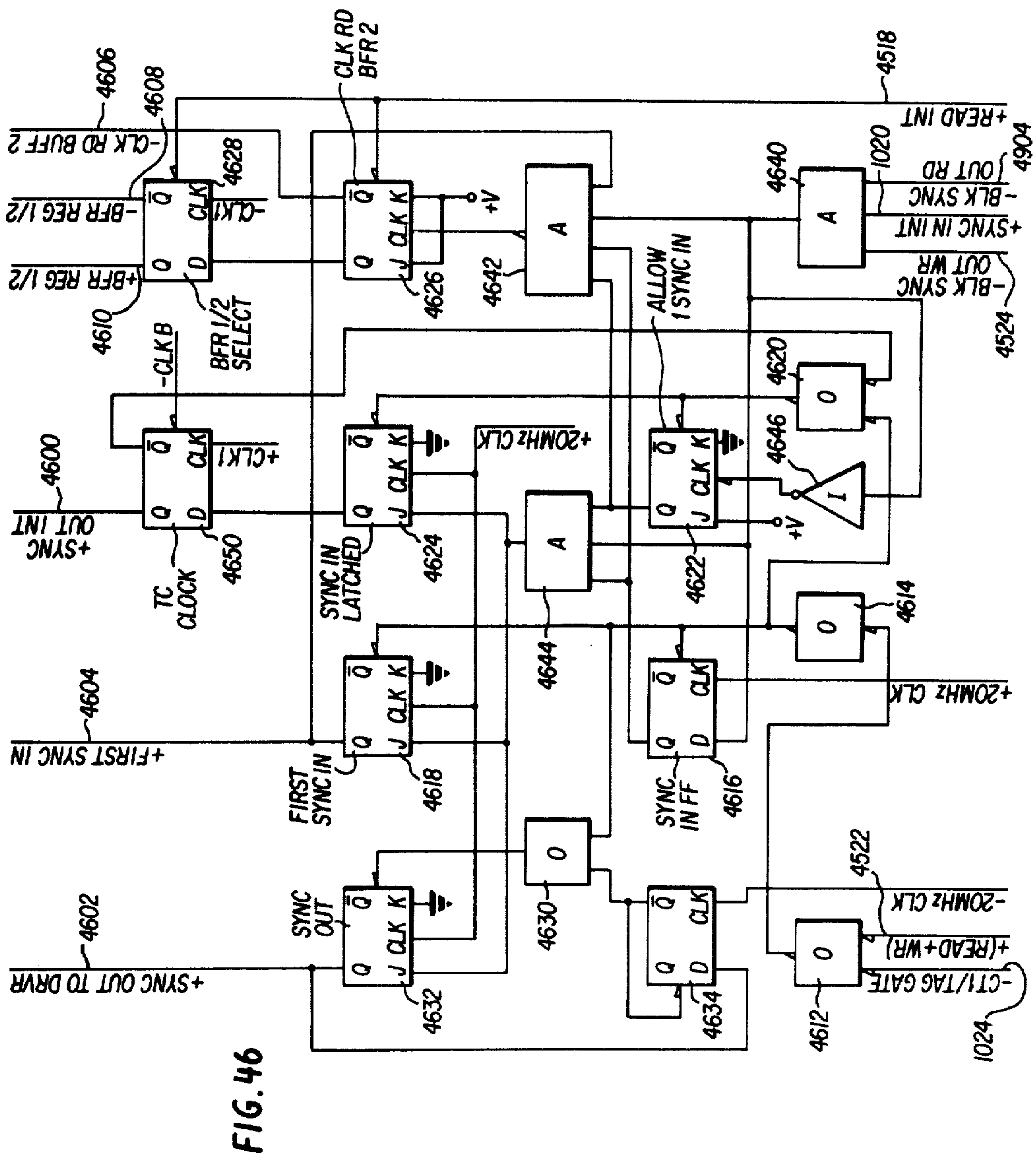

The tag decoder 1028 recognizes TAG 6 in the CT register and generates the signal +TAG DECODE 6 on lead 1030. In FIG. 45A, this signal enables one input of an AND 4525. The other input of this AND is enabled because bit 1 of write buffer 904 has been set. The output of AND 4525 enables a read latch 4526 but the latch is not set at this time. The clocking input of latch 4526 is high at this time because stage 1 of the CT register has not been set. The microprogram then executes an instruction to take the logical OR of the contents of the CT register and the value 4000 (Hex) with the result being returned to the CT register. This leaves the contents of the CT register unchanged except for bit 1 which is now set to produce CT 1/TAG GATE. In FIG. 46, −CT 1/TAG GATE passes through OR 4612 and OR 4614 to reset latches 4616 and 4618. The output of OR 4614 also passes through OR 4620 to reset latches 4622 and 4624.

In FIG. 47A, the setting of stage CT 1 causes OR 4701 to produce the signal TAG GATE which is sent over bus 1000 to the CSU. The SCU microprogram then enters a time out loop and checks for the return of TAG VALID from the CSU by ANDing the value 0008 with the contents of RS 1014 and checking the result on the D Bus. The microprogram then checks to see if an extended operation is being performed and, if so, checks to see if the CSU has returned CHECK END. The program then executes an ADT reset (SPOP 83). These operations are described below in connection with the write operation.

Figure 49:
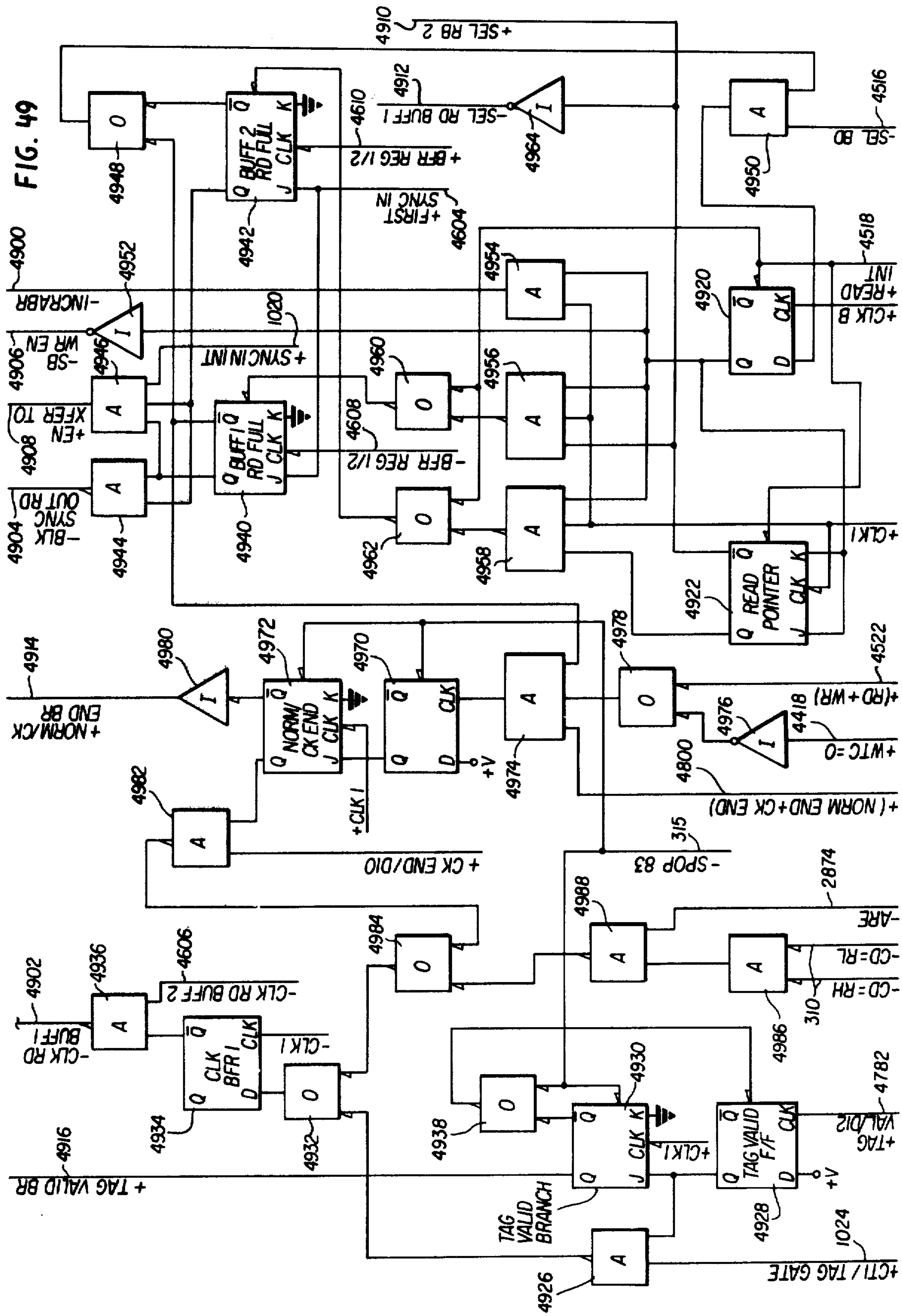

At the time the microprogram sets CT 1 the signal +CT 1/TAG GATE enables one input of an AND 4926. When the CSU responds with TAG VALID on bus 1101, it passes through AND 4768 and OR 4763 to become the signal +TAG VALID/D12 on lead 4782. This signal sets stage 12 of RS 1014. In FIG. 49, when this signal goes true it clocks and sets latch 4928. At the end of the next CLK 1 the output of latch 4928 sets latch 4930 thereby generating the signal +TAG VALID BRANCH on lead 4916. This signal is applied to the Device Branch Register 709 to set stage 9 of the register at the next following CLK 1.

When +TAG VALID/D12 sets latch 4928 the output of the latch passes through AND 4926 and OR 4932 to the D input of latch 4934. At the trailing edge of clock 1, latch 4934 is set thereby blocking AND 4936 so that the signal −CLOCK READ BUFFER 1 is false.

When latch 4930 is set its QB output passes through an OR 4938 to reset latch 4928. Latch 4930 is then reset by the next CLK 1. When latch 4928 is reset it blocks AND 4926 and at the next CLK 1 latch 4934 is reset. At this time both inputs to the AND 4936 are enabled and it produces the signal −CLOCK READ BUFFER 1 on lead 4902. This signal is applied to a circuit like that shown in FIG. 42 to generate the signals CLOCK RB 1L and CLOCK RB 1H. In FIG. 8 these signals are applied over leads 860 and 862 to RB 1H and RB 1L to clock into the buffer the data word on BUS IN. The circuit is from BUS IN 1100 through receivers 801, ANDs 812 and 814, and ORs 816 and 818 to RB 1H and RB 1L.

When the microprogram ANDs the contents of RS with the value 0008 to check for the return of a TAG VALID signal from the CSU, and after it has executed the ADT reset, it drops TAG GATE. This is accomplished by ANDing the contents of CT with the value BFFF and returning the result to CT. This resets CT 1 thereby making +CT 1/TAG GATE false. In FIG. 45A, +CT 1/TAG GATE passes through inverter 4527 to clock and set a Read Latch 4526.

When read latch 4526 is set its reset output passes through OR 4528 to generate +READ INITIATE and through OR 4529 to generate +(READ +WRITE). In FIG. 46, when +READ INITIATE goes true it terminates the overriding reset to flip-flop 4626 and latch 4628. In FIG. 49, +READ INITIATE terminates the overriding reset to latch 4920 and flip-flop 4922. The signal +(READ +WRITE) on lead 4522 is applied to OR 4612 and an AND 4810 but has no effect at this time.

During a read operation the data words received from the CSU are alternately loaded into the first and second read buffers 810 and 808. Each time the CSU places a data word on BUS IN 1100 it places the signal SYNC IN on control bus 1101. SYNC IN passes through receiver 1002 to become +SYNC IN INT which is applied over lead 1020 to an AND 4640. The signals −BLOCK SYNC OUT WRITE and −BLOCK SYNC OUT READ are both false so +SYNC IN INT passes through and 4640 to enable ANDs 4642 and 4644. The output of AND 4640 also passes through an inverter 4646 to clock and set flip-flop 4622. In addition, the output of AND 4640 is applied to the D input of latch 4616 which is set by the next following +20 MHZ CLK. All inputs to AND 4644 are thus enabled and it produces an output signal to flip-flops 4618, 4624 and 4632. At the trailing edge of 20 MHZ CLK, all three flip-flops are set.

When flip-flop 4618 is set it produces +FIRST SYNC IN on led 4604. This signal passes through AND 4771 and OR 4766 to set stage 15 of RS 1014. +FIRST SYNC IN is also applied to an AND 4810 to test for an unexpected end response from the CSU when a tage command is placed on the control bus 1101 to start a read operation. In FIG. 49, +FIRST SYNC IN is applied to the J inputs to two JK flip-flops 4940 and 4942.

When flip-flop 4632 is set the signal +SYNC OUT TO DRIVER on lead 4602 is applied through AND 4722 and OR 4704 to generate +SYNC OUT on the control bus 1000 to inform the CSU that the data word has been accepted. The output of latch 4632 is also applied to the D input of latch 4634 and at the next following 20 MHZ CLK latch 4634 is set. The output of latch 4634 passes through OR 4630 to reset latch 4632. AT the next 20 MHZ CLK latch 4634 is set by the false output from flip-flop 4632.

Flip-flop 4618 has its QA output connected to AND 4642. Three of the inputs to AND 4642 are enabled so when flip-flop 4618 is set the AND produces an output signal to clock flip-flop 4626. The flip-flop 4626 is alternately set and reset as a result of succeeding SYNC IN signals from CSU and alternately clocks read buffers 808 and 810 so that data words on BUS IN are alternately loaded first into one register and then the other. When flip-flop 4626 is set it produces the signal −CLOCK READ BUFFER 2 on lead 4606. This signal is applied to a circuit like that shown in FIG. 42A to simultaneously generate the signals CLOCK RB 2H and CLOCK RB 2L which are applied over leads 864 and 866 to the Read Buffer Register 808. The signal on lead 4606 is also connected to AND 4936 to inhibit the generation of −CLOCK READ BUFFER 1 when read buffer 2 is being loaded. On the other hand, when flip-flop 4626 is reset so that read buffer 2 is not clocked, the signal −CLOCK READ BUFFER 2 enables AND 4936 to generate −CLOCK READ BUFFER 1. In FIG. 42A, −CLOCK READ BUFFER generates CLOCK RB 1H and CLOCK RB 1L are applied over leads 860 and 862 to the clocking inputs of Read Buffer Register 810.

The QA output of flip-flop 4626 is connected to the D input of a latch 4628 so that the latch is set at the trailing edge of the first CLK 1 after flip-flop 4626 is set and is reset at the trailing edge of each CLK 1 after flip-flop 4626 is reset. The QB and QA outputs of latch 4628 are connected by leads 4608 and 4610 to the clocking inputs of two flip-flops 4940 and 4942, respectively. The signal +FIRST SYNC IN on lead 4604 is applied to the J input of each of these flip-flops. Thus, as succeeding SYNC IN signals are presented to the SCU by the CSU, the flip-flops 4940 and 4942 are alternately clocked and set as read buffers 1 and 2 are alternately loaded. The flip-flops are alternately reset as subsequently described. The QA outputs of flip-flops 4940 and 4942 are connected to an AND 4944 which produces the signal −BLOCK SYNC OUT READ on led 4904 when both of the flip-flops are set. This means that both read buffers are full and cannot accept another data word from the CSU. When −BLOCK SYNC OUT READ is true it blocks AND 4640 and prevents a further SYNC IN from the CSU from passing through AND 4640 to activate the circuits of FIG. 46.

The QA outputs of flip-flops 4940 and 4942 are also connected to an AND 4946. This AND receives the signal +SYNC IN INT on led 1020 whenever the CSU places SYNC IN on bus 1101. If both flip-flops 4940 and 4942 are set, indicating that read buffers 1 and 2 are both full, and +SYNC IN INT goes true indicating that the CSU has yet another word ready on BUS IN, AND 4946 produces the signal +ENABLE TRANSFER TIME OUT on lead 4908 to indicate a data overrun. In FIG. 45B, +ENABLE TRANSFER TIME OUT is applied to the reset input of a modulo 16 counter 4530. Normally this counter counts CLK 1 pulses and is reset when +ENABLE TRANSFER TIME OUT on lead 4908 is false. However, if the signal on lead 4908 goes true and remains so for 3.2 microseconds the counter produces the signal +TRANSFER TIME OUT/-DATA OVERRUN on led 4506. This signal is applied to stage 15 of the Cache Error Register 1040 and is stored therein at CLK 1.

The reset outputs of flip-flops 4940 and 4942 are connected to an OR 4948 which in turn has its output connected to one input of an AND 4950. As long as the SCU is not executing a control word requiring the transfer of data to or from the staging buffer 800 over the BD Bus, the signal +SELECT BX on lead 2850 is false. In FIG. 45A, this signal passes through an inverter 4532 and is applied over lead 4516 to AND 4950. The output of AND 4950 is connected to the D input of latch 4920 and when the output of AND 4950 is true the latch is set at the trailing edge of CLK B.

The QA output of latch 4920 is connected to inverter 4952 and one input of ANDs 4954, 4956 and 4958. The output of inverter 4952 is the signal −SB WR ENABLE which passes over lead 4906 and through OR 4314 to AND 4316. As long as latch 4920 is set each CLK 1 pulse passes through AND 4316 to generate the signal +STAGING BUFFER WRITE ENABLE on lead 4312. As previously explained, this signal is applied to the buffer select circuits 850 (details in FIG. 42E) to generate the signal STORE A AND STORE B to cause writing into the staging buffer 800.

When latch 4920 is set each CLK 1 passes through AND 4954 to generate −INCRABR on lead 4900. This signal is applied to FIG. 42D where it passes through OR 4286 to generate the signal +CLOCK BA on lead 4288. This increments the count in the BA counter in order to select the next staging buffer address.

The Q output of latch 4920 is also connected to the J and K inputs of a flip-flop 4922 which points to which of the read buffer registers is the next one to be read out to the Staging Buffer 800. Flip-flop 4922 is clocked by +CLK 1. As long as latch 4920 is set each CLK 1 pulse changes the state of flip-flop 4922. The QA output of the flip-flop is connected to AND 4958 while the QB output is connected to AND 4956. These ANDs further receive +CLK 1. The inputs to ANDs 4956 and 4958 are such that as long as latch 4920 is set one CLK 1 pulse passes through one of the ANDs and the next succeeding clock pulse passes through the other. AND 4956 is connected through an OR 4960 to the reset input of flip-flop 4940 while the output of AND 4958 is connected through an OR 4962 to the reset input of flip-flop 4942. Thus, as long as latch 4920 is set the flip-flops 4940 and 4942 are alternately reset at succeeding CLK 1 times.

When flip-flop 4922 is in the reset condition its output passes through an inverter 4964 to generate the signal −SELECT READ BUFFER 1 on lead 4912. In FIG. 43, −SELECT READ BUFFER 1 passes through inverter 4310 and AND 4308 to generate +READ BUFFER 1 TO SB on lead 4302. This signal is applied to the gated buffers 834 and 836 to gate the contents of read buffer 1 into the Staging Buffer 800. On the other hand, when flip-flop 4922 is set the signal −SELECT READ BUFFER 1 on lead 4912 is false and passes through AND 4306 to generate −RB2 TO SB on lead 4300. This signal is applied to gated buffers 830 and 832 to gate the contents of read buffer 2 to the staging buffer. In addition, when the flip-flop 4922 is set its QB output generates −SELECT RB2 on lead 4910. In FIG. 45B, this signal passes through an OR 4534 to generate +RD/WR BUFFER REGISTER 2 ACTIVE on lead 4508. This lead is connected to stage 15 of the Cache Error Register 1040 which is set at the following CLK 1.

Each SYNC IN pulse from the CSU advances the transfer count in TC 906. From bus 1101 SYNC IN passes through receiver 1002 to generate +SYNC IN INT which is applied to AND 4640. The output of AND 4640 sets latch 4616 and flip-flop 4622 thereby permitting the output of AND 4640 to pass through AND 4644 to the J input of flip-flop 4624. The flip-flop is set by the next 20 MHZ CLK and its output enables latch 4650 which is set at the next CLK 1. Latch 4650 produces +SYNC OUT INT which is applied to AND 4404. The output of AND 4404 passes through OR 4412 to generate −CLK TC on lead 4428. This signal is applied to the word transfer counter 906 to increment the count therein.

In summary, after the read transfer is set up, the CSU supplies data words words one at a time over BUS IN, placing SYNC IN on control bus 1101 with each word. The SCU accepts the words and responds with SYNC OUT on control bus 1000. The data words are alternately entered into read buffer 1 and read buffer 2 as determined by the state of flip-flop 4626 which changes state in response to each SYNC IN. Latch 4628 changes state each time flip-flop 4626 does, and the state of latch 4628 controls flip-flops 4940 and 4942 which indicate whether read buffer 1 or read buffer 2, respectively is full. If either is full the read pointer flip-flop is triggered at CLK 1 to alternately transfer the contents of read buffer 1 and read buffer 2 to the staging buffer. At each SYNC IN latch 4650 produces a signal to increment the complement of the word transfer count in TC 906. When the count reaches a count of seven the SCU terminates the RECYCLE signal to the SCU and after seven more transfers the CSU stops sending data words to the SCU. At this time the CSU produces either CHECK END or NORMAL END. These signals are passed through ANDs 4792 and 4767 (FIG. 47B), ORs 4761 and 4762 to generate +CK END/D 10 and +NORMAL END/D 11, respectively.

Figure 48:
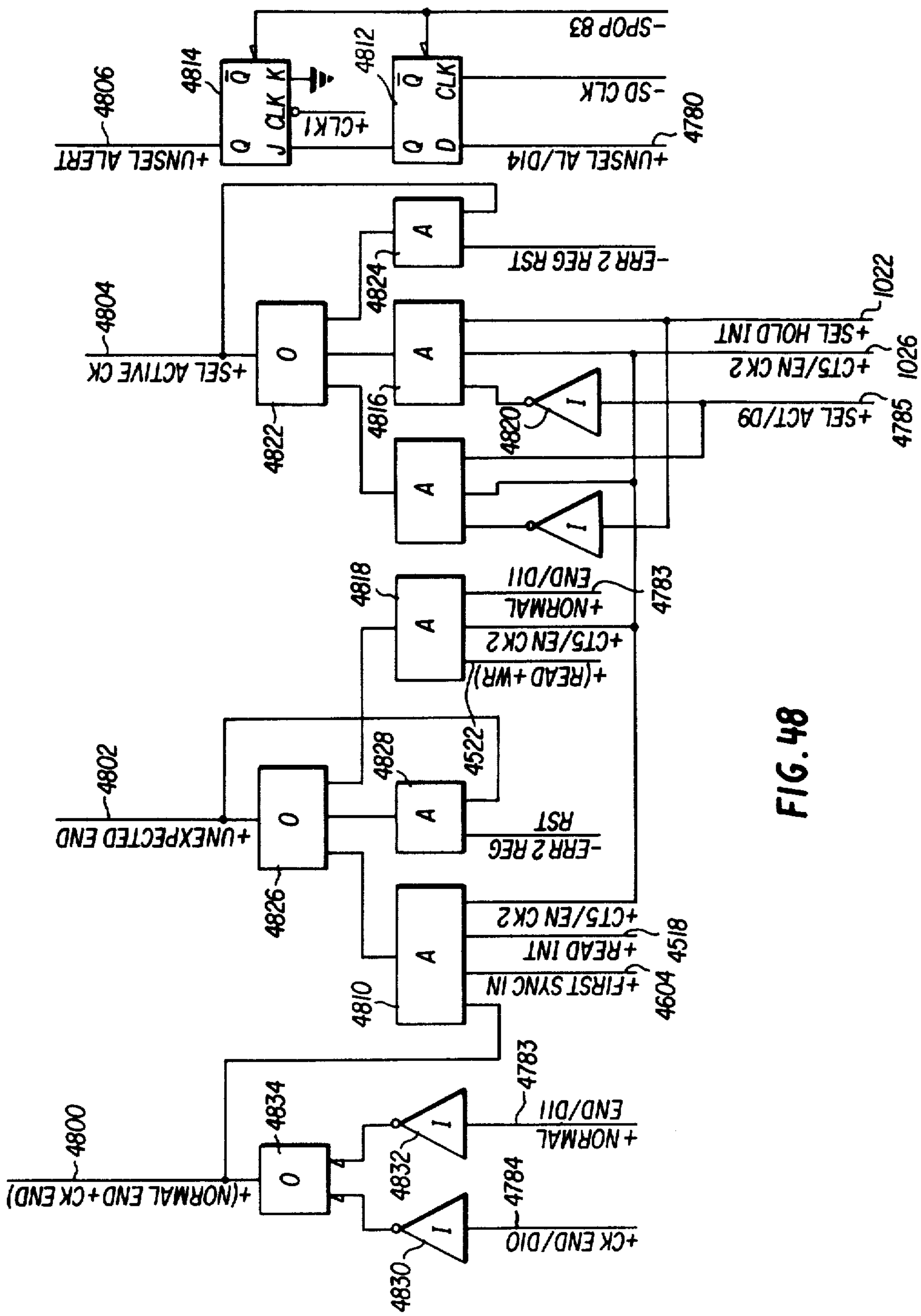

In FIG. 48, these signals are applied through inverters 4830 and 4832 to an OR 4834 to generate +(NORMAL END OR CHECK END) on lead 4800. This signal enables AND 4974. The AND 4974 is further enabled by +WTC=0 which should now be true and which passes through inverter 4976 and OR 4978 to AND 4974. Write Buffer Register 1 should also be empty so that the QB output of flip-flop 4940 enables the third input of AND 4970. The output of AND 4974 sets latch 4970 to enable the J input of flip-flop 4972. The flip-flop is set by the next CLK 1 and, through inverter 4980, generates +NORMAL END/CHECK END BRANCH. This signal sets stage A of the Device Branch Register 709.

The QA output of flip-flop 4972 enables one input of AND 4982. If the CSU has returned CHECK END, the signal CHECK END/D 10 passes through OR 4984 and OR 4932 to latch 4934. The latch is set at the next CLK 1 and clocks read buffer 2 to load therein status 2 information which the CSU has placed on BUS IN at the time it generated CHECK END.

WRITE

A write operation is initiated in substantially the same manner as a read operation. However, bit 0 rather that bit 1 on BUS OUT must be true. Therefore, write buffer 1 is loaded with a word which sets bit 0 to generate the signal +WRITE BUFFER HIGH BIT 0 on lead 940. At the same time, bits 4–7 are set with the value to be entered into the modulo 16 counter of the CSU and bits 9–31 are loaded with the data transfer starting address.

In FIG. 45A, +WRITE BUFFER HIGH BIT 0 is applied to two ANDs 4536 and 4538. These ANDs also receive the signal +TAG DECODE 6 which is true because the CT register has been loaded by the microprogram with a value representing TAG 6. The output of AND 4536 is connected to the data input of a latch 4540 while the output of AND 4538 is connected to the data input of a latch 4542.

The latch 4540 is initially in the reset condition and its QB output passes through an OR 4544 to hold a flip-flop 4546 in the reset condition. The QA output of flip-flop 4546 is false and is applied over lead 4548 to FIG. 45B where it holds a flip-flop 4550 reset. The QB output of flip-flop 4550 is the signal +SELECT WRITE BUFFER 1 which is applied over lead 4502 to the drivers 902 to place the contents of write buffer 1 on BUS OUT.

The microprogram then sets CT 1 to place TAG GATE on bus 1000. This informs the CSU that the command, address and tag modifier information are available on BUS OUT.

When CT 1 is set the signal +CT 1/TAG GATE goes true and passes through AND 4538 to the latch 4542. At the trailing edge of the next CLK 1 latch 4542 is set. The QB output of the latch passes through OR 4552 to block AND 4554. The QB output of the latch also passes through OR 4556 and over lead 4524 to FIG. 46 where it blocks AND 4640. The QA output of latch 4542 is applied to the data input of a latch 4558 so at the end of the next CLK 1 after latch 4542 is set latch 4558 is set. The QB output of latch 4558 also passes through ORs 4552 and 4556 to block ANDs 4554 and 4640. The purpose of latches 4542 and 4558 is to block the first SYNC OUT on startup of the write operation.

When CT 1 is set the signal +CT 1/TAG GATE enables AND 4926. Also, −CT 1/TAG GATE passes through OR 4612 and OR 4614 to reset latch 4616 and flip-flop 4618. The output of OR 4614 also acts through OR 4630 to reset flip-flop 4632 and in turn latch 4634, and acts through OR 4620 to cause the resetting of flip-flops 4622 and 4624 as described with reference to the read operation.

After the CSU recognizes the TAG GATE and accepts the information on BUS OUT it generates the TAG VALID signal on bus 1101. In FIG. 47B, TAG VALID passes through AND 4768 and OR 4763 to become +TAG VALID/D12 on lead 4782. This signal sets latch 4928 thereby causing the setting of flip-flop 4930 and latch 4934 as described above with respect to the read operation. In addition, +TAG VALID/D12 sets stage 12 of the RS Register 1014.

As with the read operation, after the TAG GATE is raised the microprogram enters a loop wherein the value 0008 is repeatedly compared with the contents of the RS register in ALU 400 and the result repeatedly checked to determine when the TAG VALID signal is returned by the CSU.

When TAG VALID is detected the microprogram branches to an instruction which checks the state of stage 13 of the Status Register 402. Since the write operation is an extended operation this bit has previously been set by the microprogram. Next, the microprogram compares the contents of RS to the value 0020 to see if the CSU has returned CHECK END. Since CHECK END should not be returned at this time the microprogram executes a format 2 control word with SPOP 83 to reset the ADT branch.

In FIG. 49 the signal −SPOP 83 resets flip-flop 4930 and passes through OR 4938 to reset latch 4928. It also resets latch 4970 and flip-flop 4972. In FIG. 48 −SPOP 83 resets latch 4812 and flip-flop 4814 and in FIG. 44 it passes through OR 4410 to reset flip-flop 4416. In FIG. 45A, −SPOP 83 passes through ORs 4576 and 4578 to reset latches 4526 and 4540. After executing the ADT BRANCH RESET the microprogram takes the logical AND of the contents of CT and the value BFFF and returns the result to CT thereby resetting stage 1 of the register and dropping the TAG GATE. After the ADT BRANCH RESET is completed the microprogram ANDs BFFF with the contents of CT and returns the result to CT. This resets CT 1 to terminate the TAG GATE. At this time +CT 1/TAG GATE, now false, passes through inverter 4527 to set the Write Latch 4540. The QA output of latch 4540 enables one input of ANDs 4560, 4562 and 4564 and terminates the overriding reset signal to latch 4566. When the QB output of latch 4540 goes false it causes OR 4544 to terminate the reset to flip-flop 4546. Also, when latch 4540 is set the low level signal on lead 4568 causes the output of OR 4570 (FIG. 45B) to go false thereby terminating the reset to flip-flop 4574 (FIG. 45A).

After the control word is executed to drop TAG GATE, an instruction is executed to take the Exclusive OR of the contents of CT with the value 0400 and the result is loaded back into CT. The effect of this is to set CT 5 to enable a check of the response made by the CSU in response to TAG GATE. When CT 5 is set it generates the signal +CT 5/ENABLE CHECK 2 on lead 1026 and in FIG. 48 this signal is applied to ANDs 4816 and 4818. AND 4816 is enabled at this time by the signal +SELECT HOLD INT, this signal having gone true when CT 0 was set during the routine for selecting the CSU. If the selection routine properly selected the CSU, the CSU returned the signal SELECT ACTIVE which is true as long as the SCU keeps SELECT HOLD active. In FIG. 47B SELECT ACTIVE passes through AND 4790 and OR 4760 to generate the signal +SELECT ACTIVE/D9 on lead 4785. In FIG. 48 this signal passes through inverter 4820 to a third input of AND 4816. Therefore, if the CSU is not properly selected at the time the SCU sets CT 5, AND 4816 produces an output signal through OR 4822 to generate the signal +SELECT ACTIVE CHECK. This signal is applied over lead 4804 to stage 3 of the Cache Error Register 1040. The output of OR 4822 is fed back to an AND 4824 which is enabled by the signal −ERROR 2 REGISTER RESET at all times except when the Cache Error Register 1040 is being reset. The output of AND 4842 passes through OR 4822 to hold +SELECT ACTIVE CHECK true.

AND 4818 checks to see if the signal NORMAL END was illegally returned by the CSU is response to TAG 6. The signal +(READ + WRITE) is derived from OR 4529 and goes true when the write latch 4540 is set. If the CSU illegally returns NORMAL END it passes through AND 4767 and OR 4762 to become the signal +NORMAL END/D11 on lead 4783. In FIG. 48 the signal passes through AND 4818 and OR 4826 to generate the signal +UNEXPECTED END on lead 4802. This signal is applied to stage 12 of the Cache Error Register 1040. The output of OR 4826 is fed back through AND 4828 to hold +UNEXPECTED END true until the Cache Error Register is reset.

Assuming that an UNEXPECTED END has not occurred, the microprogram loads the value 2000 into register GB and the value 1 into register GD. The microprogram then repeatedly executes two control words. The first of these control words subtracts GD from GB and makes a test for a NORMAL or CHECK END. The second of the signals checks to see if the result of subtracting GD from GB produces a zero value on the D Bus. These instructions form a time out loop of approximately 3 milliseconds during which the data should be transferred from the staging buffer to the CSU. Under normal conditions the transfer will be completed and the CSU will generate either NORMAL END or CHECK END before the value in GB is decremented to 0. If by chance the transfer should not be completed before 6B is decremented to 0 then the microprogram branches to a subroutine to save status and analyze the error.

If the CSU should return CHECK END then the status 2 information placed on BUS IN by the CSU is loaded into Read Buffer Register 1 and flip-flop 4872 is set to generate +NORMAL/CHECK END. This operation is the same as that described above for a read operation.

Returning now to the actual circuits controlling the transfer of data from the Staging Buffer 800 to the CSU, when the TAG GATE signal is terminated to set Write Latch 4540, the output of the latch enables AND 4560. The signal +SELECT BX on lead 2850 is false so the output of inverter 4532 enables the second input of the AND 4560. The third input is enabled by the QA output of the Write Load Pointer Flip-Flop 4580 since this flip-flop has been held in the set position while latch 4540 was reset. The output of AND 4560 enables one input of AND 4584. A second input of this AND is enabled by the output of OR 4586 since the Buffer 2 Write Full Flip-Flop 4574 is presently reset. AND 4584 also receives +CLK 1 so on the first CLK 1 after latch 4540 is set, AND 4584 produces the signal −CLOCK WRITE BUFFER 1 on lead 4512. This signal is applied to FIG. 42A where it generates +CLOCK WRITE BUFFER 1H and +CLOCK WRITE BUFFER 1L which are applied over leads 4230 and 4232 to Write Buffer 1 thereby loading into the buffer one word from the Staging Buffer 800.

When the output of AND 4584 goes true it passes through OR 4588 to generate the signal −INCREMENT AB on lead 4504. In FIG. 42D this signal passes through OR 4286 to generate +CLOCK BA on lead 4288. This increments the address in the BA counter 910.

The output of AND 4560 is also applied to a Buffer 1 Write Full Flip-Flop 4546 which is clocked by the trailing edge of CLK 1. When flip-flop 4546 is set its QA output enables one input of AND 4590 and, over lead 4548 removes the reset signal to, flip-flop 4550 (FIG. 45B).

At the same time flip-flop 4546 is set, latch 4558 is reset. With latches 4542 and 4558 both reset the signal −BLOCK SYNC OUT WRITE produced by OR 4556 goes false. In FIG. 46, when −BLOCK SYNC OUT WRITE goes false AND 4640 is enabled because the CSU is producing +SYNC IN INT at this time. The output of AND 4640 passes through inverter 4646 to clock and set flip-flop 4622. The output of AND 4640 also enables AND 4644 and the D input of latch 4616. At +20 MHZ CLK latch 4616 is set thereby making all the inputs to AND 4644 true. The AND produces an output signal to set flip-flops 4632 and 4624 at the trailing edge of +20 MHZ CLK.

When flip-flop 4624 is set it enables latch 4650 which is set at the next following CLK 1. The latch produces the signal +SYNC OUT INT on lead 4600 which passes through AND 4404 to clock flip-flop 4416 and test if the transfer count has been reducced to 0. The output of AND 4404 also passes through OR 4412 to generate −CLK TC to decrement (increment the complement of) the transfer count in counter 906.

The latch 4650 remains set for about 100 ns before it is reset by −CLK B. However, during the interval that it is set its QB output passes through OR 4620 to reset flip-flops 4622 and 4624.

When flip-flop 4632 is set it generates +SYNC OUT TO DRIVER on lead 4602. This signal passes through AND 4722 (FIG. 47A) and OR 4704 to generate SYNC OUT which is applied over bus 1000 to the CSU. This informs the CSU that a word is present on BUS OUT. At this time the flip-flop 4550 is still in a reset state thus generating +SELECT WB1 on lead 4502. This signal enables the drivers 902 so that the output of the Write Buffer Register 1 is gated onto BUS OUT.

In FIG. 45A, the signals +SELECT WRITE BUFFER 1 and +SYNC OUT INT enable AND 4595 and at CLK 1 the AND produces and output signal through OR 4544 to reset the Write Buffer 1 Full Flip-Flop 4546.

The flip-flop 4632 remains set for the interval between two 20 MHZ CLK. The QA output of this flip-flop is fed back to the D input of latch 4634 which is clocked by −20 MHZ CLK. When the latch 4634 is set its QB output passes through OR 4630 to reset the Sync Out flip-flop 4632.

In FIG. 9, Write Buffer Registers 1 and 2 are alternately loaded from the staging buffer 800. In FIG. 45A, the signal +SELECT BX is false when the staging buffer is not engaged in a transfer over the BD Bus. Thus, the output of inverter 4532 enables one input of AND 4590. If either of the flip-flops 4546 or 4574 is reset indicating that Write Buffer Register 1 or Write Buffer Register 2, respectively, is not full, the output of OR 4586 enables a second input of AND 4590. The output of the AND is connected to the J and K inputs of the flip-flop 4580. Thus, on each CLK 1 this flip-flop changes state. When it is set it enables the loading of write buffer 1 as described above. When reset it enables the loading of write buffer 2. Thus, referring to the sequence described above, at the leading edge of the CLK 1 pulse which clocked write buffer 1, the CLK 1 pulse resets flip-flop 4580. At this point all three inputs to AND 4562 are enabled and it produces an output to AND 4594. At this time flip-flop 4574 is in the reset state to indicate Write Buffer Register 2 is empty. The QA output of the flip-flop passes through OR 4586 to enable AND 4594. At CLK 1 the AND produces the signal −CLOCK WRITE BUFFER 2 on lead 4514. In FIG. 42A, this signal passes through ORs 4218 and 4220 to generate +CLOCK WRITE BUFFER 2H and +CLOCK WRITE BUFFER 2L on leads 4222 and 4224. In FIG. 9, these signals clock into Write Buffer Register 2 a word from the staging buffer 800.

The output of AND 4594 also passes through OR 4588 to generate −INCREMENT AB which increments the address in the BA counter 910 as previously described.

The output of AND 4562 is connected to the J input of flip-flop 4574. At the trailing edge of CLK 1 the flip-flop is set to indicate that Write Buffer Register 2 is full. From the QA output of the flip-flop there is a connection over lead 4592 to an AND 4597 (FIG. 45B). This enables the AND but nothing happens at this point.

When the CSU has stored the word transmitted to it through Write Buffer Register 1, it issues SYNC IN to request the next word. In FIG. 46, SYNC IN causes the sequence of operation of flip-flops 4622, 4624, 4618, 4632 and 4650 as described above in order to decrement the word transfer count, test for whether the word transfer count has been decremented to 0, and generate +SYNC OUT INT on lead 4600 which in turn produces SYNC OUT on bus 1000 as described above. The signal +SYNC OUT INT clocks flip-flop 4550 thereby setting the flip-flop to indicate that writing is to take place from Write Buffer Register 2. The QB output of the flip-flop is connected through an inverter 4596 to generate +SELECT WRITE BUFFER 2 on lead 4500. This signal is applied to drivers 901 to place the contents of Write Buffer Register 2 on BUS OUT. With flip-flop 4550 set and +SYNC OUT INT true, all inputs to AND 4597 are enabled and it produces an output signal through OR 4570 to reset the buffer 2 write full flip-flop 4574.

It should be evident from the foregoing description that each CLK 1 pulse changes the state of the Write Buffer Load Pointer Flip-Flop 4580 so that the signals −CLOCK WB1 and −CLOCK WB2 are generated on alternate cycles. Thus, the data words being read from staging buffer 800 are alternately loaded into write buffer 1 and write buffer 2. The Write Pointer Flip-Flop 4550 changes state each time the SCU generates a SYNC OUT to inform the CSU that a data word is available on BUS OUT. This alternately enables drivers 901 and 902 so that the contents of write buffer 2 and write buffer 1 are alternately gated onto BUS OUT. At each data transfer the BA counter 910 is incremented to select the next staging buffer addressed to be read out of, and the Word Transfer Counter 906 is clocked to decrement by 1 the count therein. When the count in counter 906 is decremented to 7 a signal on lead 932 is applied to flip-flop 4414 to reset it at the next clock 1. This terminates the signal +RECYCLE hence the signal +RECYCLE/D BUS 1 goes false in FIG. 47A.

This terminates the recycle signal to the CSU which will in turn present either NORMAL END, or CHECK END after the last word is transferred.

When the word transfer count in counter 906 has been decremented to 0, the counter produces the signal +TC = 0 on lead 930. In FIG. 44 this signal causes flip-flop 4416 to be set when +SYNC OUT INT on lead 4600 passes through AND 4404 to clock the flip-flop.

After the last data word has been transferred the CSU generates either NORMAL END or CHECK END. If CHECK END is presented then the CSU presents on BUS IN indications of any error conditions that have been detected by the CSU. In FIG. 47B, the signal +NORMAL END passes through AND 4767 and OR 4762 to become the signal +NORMAL END/D11 on lead 4783. If CHECK END is presented it passes through AND 4792 and OR 4761 to become the signal +CHECK END/D10 on lead 4784. In FIG. 48, these signals are passed through two inverters 4830 and 4832 to an OR 4834 which produces +(NORMAL END+CHECK END) on lead 4800. In FIG. 49, this signal is apploed to one input of an AND 4974. The signal +WTC=0 is inverted at 4976 and passes through an OR 4978 to a second input of AND 4974. The third input of the AND is derived from the QB output of flip-flop 4940. This flip-flop is held reset throughout the write operation since +READ INT on lead 4518 is false and is applied to the reset input of flip-flop 4940 through OR 4960.

With all inputs enabled, AND 4974 clocks and sets latch 4970. The next following CLK 1 causes the output of latch 4970 to set flip-flop 4972. The QB output of this flip-flop passes through an inverter 4980 to generate +NORMAL/CHECK END BRANCH on lead 4914. This signal is applied to the Device Branch Register 709 and sets stage 10. The QA output of flip-flop 4972 is connected to an AND 4982. The signal +CHECK END/D10 is applied to a second input of this AND. Thus, if the CSU responds with CHECK END, AND 4982 produces an output signal which passes through OR 4984 and OR 4932 to enable the setting of latch 4934 at the next +CLK 1. The latch remains set for one cycle and is then reset and the resulting output from this latch passes through AND 4936 to clock read buffer 1 and load into it the status information present on BUS IN.

When +(NORMAL END+CHECK END) is produced on lead 4800 it is applied to FIG. 47A where it passes through AND 4718 and OR 4702 to generate +RESPONSE/D BUS 0 which is applied over bus 1000 to the CSU to acknowledge receipt of the NORMAL END or the CHECK END signal.

For the sake of simplicity the foregoing extended write operation has been explained as though the only data transfers taking place were between one staging area of staging buffer 800 and the CSU. In actual practice, it is also possible to enter data into the second staging area of the staging buffer 800 from the BD Bus concurrently with the extended write operation. The data on the BD Bus may come either from the channel through the channel buffer 608 or from one of the disk drives. On microprocessor cycles where a transfer is taking place over the BD Bus, the signal +BX on lead 2850 is true so that the resulting output of inverter 4532 (FIG. 45A) inhibits ANDs 4590, 4560 and 4562. The resulting output of AND 4590 prevents the clocking of the Write Load Pointer Flip-FLop 4580. Since ANDs 4560 and 4562 are inhibited the BA counter is not incremented and Write Buffer Registers 1 and 2 are not clocked thereby preventing the word read from the staging buffer from being entered into either of the write buffer registers. However, each SYNC OUT generated by the SCU changes the state of flip-flop 4550 (FIG. 45B) so that the contents of the write buffer registers may still be read out to the CSU as previously described, one of the flip-flops 4546 and 4574 (FIG. 45A) being reset as the contents of its corresponding register are placed on BUS OUT.

If both Write Buffer Register 1 and Write Buffer Register 2 are emptied, the outputs from flip-flops 4546 and 4574 enable AND 4564 and it produces an output signal that passes through OR 4556 to become the signal −BLOCK SYNC OUT WRITE on lead 4524. In FIG. 46 this blocks any further incoming SYNC IN signals from the CSU. The output of AND 4564 also passes through an inverter 4599 to enable AND 4554. A second input of the AND is enabled by the output of OR 4552 since both of the latches 4542 and 4558 are reset. If another SYNC IN should occur when both of the write buffer registers are empty it is a sign of a staging buffer override. The SYNC IN signal passes through receiver 1002 and is applied to AND 4554 (FIG. 45A) which produces an output signal so that the Staging Buffer Error Latch 4566 is set at the next +CLK 1. The latch 4566 produces the signal +STAGING BUFFER OVERRUN on lead 4510 which is connected to stage 13 of the Cache Error Register 1040.

If both write buffer registers are empty and the word transfer count has been decremented to 0, the extended write operation is terminated. With both buffers empty the flip-flops 4546 and 4574 are both reset. These QA outputs block OR 4586 which in turn blocks ANDs 4584 and 4594. The false outputs from ANDs 4584 and 4594 block OR 4596 whose output goes false to enable AND 4598. The AND is further enabled by +WTC=0 when the word transfer count reaches zero. The output of AND 4598 passes through OR 4578 to reset the Write Latch 4540.

DEVICE INTERFACE

As shown in FIG. 2, the interconnections between the SCU and one bank of disk drives includes a plurality of bidirectional data lines 700, a Control Unit Device Interface (CUDI) Input Bus 701, and CUDI Output Bus 702 and a plurality of PLO lines 707. These interconnections are illustrated again in FIG. 7A for a single disk drive.

A data line 700 comprises two bidirectional differential leads which are used to transfer data read from the selected disk storage drive to the SCU or write data from the SCU to the disk drive. There is a data line 700 for each disk drive.

The leads 707, designated PLO, transmit to the SCU a nominal 25.16 MHZ signal which is phase locked to the servo data on the disk pack of a selected drive. There is a PLO lead 707 for each disk drive.

CUDI Bus In 701 includes BUS IN (8 bits plus parity), 8 drive selected lines and two control lines designated TAG VALID and DEVICE CHECK. CUDI BUS IN is connected in parallel to all the disk drives in one bank.

The BUS IN lines are utilized for control purposes and reporting status as subsequently described. The eight drive selected lines are provided to inform the SCU that the correct disk drive has been selected.

When the SCU selects a drive the drive responds with a signal on one of the eight drive selected leads, correspond to the disk drive selected thus indicating the selected disc drive.

The TAG VALID line is used to indicate to the control unit that the information on the BUS IN lines is valid. As subsequently described, this signal is true if TAG OUT parity is correct, TAG GATE is true, MODULE SELECT is true and the BUS IN lines have settled.

The DEVICE CHECK line indicates an abnormal condition and goes true when a module is selected and an unsafe condition occurs in the disc drive.

The CUDI Out Bus 702 includes nine BUS OUT bits (8 bits plus parity), five TAG OUT (4 bits plus parity) and two control lines designated MODULE SELECT and TAG GATE. The CUDI OUT BUS is connected in parallel to all the disk drives in a bank.

The MODULE SELECT line enables a disk drive to be selected if the TAG OUT and BUS OUT lines so indicate. MODULE SELECT must be held true continuously while the drive is selected. When the signal goes false the drive is deselected.

The TAG GATE line is used to gate the BUS OUT and TAG OUT lines to the decoding circuits of the disk drive. TAG GATE is set true after the signals on BUS OUT and TAG OUT have had time to settle.

The four TAG OUT lines define 16 possible commands which may be given to the disk drives.

The BUS OUT lines transmit various information to the disc drives, the meanings of the signals on BUS OUT being determined by the signals on TAG OUT.

Table III defines the functions performed in response to the decoding of the four TAG OUT bits.

TABLE III

Device Interface Tag Decodes

| TAG DECODE | FUNCTION |
|---|---|
| 0 | NOT USED |
| 1 | SET SECTOR/SECTOR INTERRUPT |
| 2 | POLL DEVICE INTERRUPTS |
| 3 | MODULE ADDRESS |
| 4 | REQUEST STATUS |
| 5 | REQUEST ADDRESS |
| 6 | SET CYLINDER |
| 7 | SET HEAD |
| 8 | SET HOST ID |
| 9 | CONTROL 1 |
| 10 | CONTROL 2 |
| 11 | OPERATE |
| 12 | DIAGNOSTIC 1 |
| 13 | DIAGNOSTIC 2 |
| 14 | SET CAR HIGH |
| 15 | DIAGNOSTIC DATA |

The following summarizes the operation performed for each of the combination of TAG lines and BUS OUT lines sent to a disk drive. The BUS OUT lines are interpreted according to the 4-bit encoded TAG lines. The use of all of the tag decodes listed in Table III is not necessary for an understanding of the present invention and their operations are not included in the following summary.

TAG DECODE 1 (SET SECTOR/SECTOR INTERRUPT FEATURE)

This tag performs two functions which are dependent on the status of Bit 0. If Bus Out Bit 0 is false (0) this command loads the number of the desired sector into a Sector Address Register (SAR) in the selected drive and initiates a sector search operation. The Set Sector command resets any pending interrupt due to a Seek Complete condition. This command can only be decoded through the access that has established control.

| Bit | Bus Out |
|---|---|
| 0 | 0 |
| 1 | SAR 64 |
| 2 | SAR 32 |
| 3 | SAR 16 |
| 4 | SAR 8 |
| 5 | SAR 4 |
| 6 | SAR 2 |
| 7 | SAR 1 |

If the Bus Out Bit 0 is true (1) this command loads a Sector Interrupt Duration Register in the select disk drive with the value contained in Bus Out bits 4 through 7. The sector interrupt will stay true for a duration equal to the number of sectors specified by the binary value of Bus Out bits 4 through 7.

If a set Sector command is issued without a Set Interrupt Feature command, the sector interrupt is true for the duration of one sector.

| Bit | Bus Out |
|---|---|
| 0 | 1 |
| 1 | 0 |
| 2 | 0 |
| 3 | 0 |
| 4 | 8 |
| 5 | 4 |
| 6 | 2 |
| 7 | 1 |

TAG DECODE 2 (POLL DEVICE INTERRUPTS)

Any drive within the group selected by the Bus Out data with an interrupt true will respond with a true signal on the Bus In line corresponding to the drive's logical address. This command is decoded be each drive on line. The drive must be available, i.e. not reserved to the other SCU.

| Bit | Bus Out |
|---|---|
| 1 | Read Dual Port Status |
| 2 | Unconditional Reserve [The command should be raised only with Read Dual Port Status (Bus Out 1). The SCU that issues this command has immediate control of the drive. A previous short module select is required.] |
| 5 | Spare Drive [No previous mod select is required] |
| 6 | Drives 8-15 [No previous mod select is required] |
| 7 | Drives 0-7 [No previous mod select is required] |

TAG DECODE 3 (MODULE ADDRESS)

This command is decoded by each drive which is on line. The Bus Out lines contain the logical address of the drive that is module (mod) selected. No previous mod select is required for the drives to decode this command. The control unit establishes control of the drive by mod selecting the drive with this command.

| Bit | Bus Out |
|---|---|
| 1 | Long Select - When true the SCU unit establishes a Long Select operation, such that the other SCU will not see a Temporary Not |

-continued

| Bit | Bus Out |
|---|---|
| | Available status. When false the other control unit will see a Temporary Not Available status. |
| 3 | Logical Address Spare |
| 4 | Logical Address Bit 8 |
| 5 | Logical Address Bit 4 |
| 6 | Logical Address Bit 2 |
| 7 | Logical Address Bit 1 |

TAG DECODE 4 (REQUEST STATUS)

This command requests Status 1 information from the selected drive. This status will also be placed on the Bus In lines when Tag Decode 3 or Tag Decode 9 is received by the drive. This command can only be decoded through the access that has established control. If Tag Decode 3 is issued and the drive is not available, only Bus In bits 6 and 4 are enabled.

| Bit | Bus In |
|---|---|
| 0 | Index Error |
| 1 | Not used |
| 2 | Seek Incomplete Interrupt |
| 3 | Seek/FMT/RLSD Interrupt |
| 4 | On Line |
| 5 | Pack Change Interrupt |
| 6 | Busy |
| 7 | Record search in progress |

TAG DECODE 5 (REQUEST ADDRESS)

This command requests from the selected drive the contents of one of its five registers. This command can only be decoded through the access that has established control. The only BUS OUT condition which is of interest with respect to the present invention is where bit 0 is true to read the contents of the Host ID Register.

TAG DECODE 6 (SET CYLINDER)

This command loads the new cylinder address into the cylinder address register (CAR) of the selected module. This command can only be decoded through the access that has established control. CAR bits 256 and 512 are loaded under tag 14.

| Bit | Bus Out |
|---|---|
| 0 | CAR 128 |
| 1 | CAR 64 |
| 2 | CAR 32 |
| 3 | CAR 16 |
| 4 | CAR 8 |
| 5 | CAR 4 |
| 6 | CAR 2 |
| 7 | CAR 1 |

TAG DECODE 7 (SET HEAD)

This command loads the new head address into the head address register (HAR). Module selection is required. This command can only be decoded through the access that has established control.

| Bit | Bus Out |
|---|---|
| 0 | Fixed Heads 32 - 59 |
| 1 | Fixed Heads 0 - 31 |
| 2 | HAR 16 |
| 3 | HAR 8 |
| 4 | HAR 4 |
| 5 | HAR 2 |

-continued

| Bit | Bus Out |
|---|---|
| 6 | HAR 1 |

TAG DECODE 8 (SET HOST ID)

This command loads the host system ID into an 8-bit register in the disk drive.

TAG DECODE 9 (CONTROL 1)

This command enables the execution of the control operations listed below. Module selection is required. The Status 1 information on the Bus In lines is the same as that under Tag Decode 4. This command can only be decoded through the access that has established control.

| Bit | Bus Out |
|---|---|
| 3 | Seed Start - When true, the drive seeks to the address specified by the CAR register. |
| 4 | Recalibrate - When true the drive positions the heads to cylinder zero, sets the head address, cylinder address, and sector address registers to zero. Seek incomplete, and record search in progress status bits are reset. |
| 6 | Control Reset - When true the device check latch is reset if the condition which caused the unsafe is no longer present. |
| 7 | Reset Interrupt - When true the interrupt conditions in the drive including the Pack Change Interrupt are reset. The sector address register and Sector Duration Register are reset if a sector search is in progress. When the dual access feature is installed this command resets the release interrupt latch. |

TAG DECODE 10 (CONTROL 2)

This command enables the execution of the control operations listed below. Module selection is required. Status 3 is returned on the Bus In lines. This command can only be decoded through the access that has established control.

| Bit | Bus Out |
|---|---|
| 0 | Reserve - When true the reserve latch is set (dual-access feature only). |
| 1 | Release - When true the reserve latch is reset (dual-access feature only). |

TAG DECODE 11 (OPERATE)

This command enables the execution of the operations listed below. Module selection is required. The Bus Out lines may change state when Tag Gate is true, however, the Tag Out lines must not change until Tag Gate is false. This command can only be decoded through the access that has established control.

| Bit | Bus Out |
|---|---|
| 0 | Address Mark - This line is true when the SCU unit is writing an AM or searching for an AM. |
| 1 | Pad - This command, with Write Gate true, will initiate a Padding operation. This command will be rejected by the drive after sector 125. The SCU can verify whether the Pad command was accepted by verifying that Bus In Bit 2, Pad In Progress, was set. |
| 2 | Enables R/W DIAG/DSINIT - When true, along with Write Gate, forces Write Unsafe 1. If true along with Write Gate low it allows |

-continued

| Bit | Bus Out |
|---|---|
| | initiation of dual data separator timing. |
| 3 | Head Select - When true, the drive selects the head indicated by the head address register. |
| 4 | Head Advance - When true, the drive increments its head address register by one. |
| 5 | Write Gate - When true, the drive enables the write drivers. |
| 6 | Read Gate - When true, the drive enables the read drivers and inhibits Write Gate. |
| 7 | Store Sector Count - When true, the number of the sector in the sector counter is transferred to the sector address register. If the command occurs within 6.5 micro sec of the sector end, the drive will wait until the sector count has been incremented before executing this command and the incremented count will be transferred. |

TAG DECODE 14 (SET CAR HI)

This command loads CAR 512 and CAR 256 into the CAR register.

| Bit | Bus Out |
|---|---|
| 6 | CAR 512 |
| 7 | CAR 256 |

The following summarizes the functions that appear on the Bus In lines for each of the corresponding tag decodes discussed above. Mod select is required for the Bus In lines to be active for all decodes except the poll interrupt command of Tag Decode 2.

TAG DECODE 1 (SET SECTOR/SET SECTOR INTERRUPT)

The selected disk drive responds to the command placing on BUS IN either the contents of the Sector Address Register or the Sector Interrupt Duration Register, depending upon whether BUS OUT bit 0 is 0 or 1.

| Bit | Bus In | Bus In |
|---|---|---|
| 0 | 0 | 1 |
| 1 | SAR 64 | Not Used |
| 2 | SAR 32 | Not used |
| 3 | SAR 16 | Not used |
| 4 | SAR 8 | 8 |
| 5 | SAR 4 | 4 |
| 6 | SAR 2 | 2 |
| 7 | SAR 1 | 1 |

TAG DECODE 2 (DEVICE INTERRUPTS AND DUAL PORT STATUS)

In response to Tag Decode 2 with BUS OUT 1 false, BUS IN indicates the logical address of the drive or drives with active interrupts. The interrupt will be presented on the Bus In of the access with control. If neither access has control, the interrupt will be presented to both accesses. An interrupt is generated by the drive when any of the following conditions exist:

1. Seek Complete/Pad Complete/Released status condition is generated
2. Seek Incomplete status condition is generated.
3. The Sector Register and the Sector Counter compare after a Set Sector command (Sector Search Completed). This interrupt will occur once per revolution for a duration equal to that specified in the Sector Interrupt Duration Register until the Sector Search operation is reset by a Reset Interrupt command.

In response to Tag Decode 2 with BUS OUT 1 true, the selected disk drive responds with dual port status.

TAG DECODE 2 (BUS IN)

The responses by the disk drive to a Tag 2 command (see above) are as follows:

| Bit | Bus Out 1 | Bus Out 7 | Bus Out 6 |
|---|---|---|---|
| 0 | Not used | Mod 0 | Mod 8 |
| 1 | Temp Not Available | Mod 1 | Mod 9 |
| 2 | Dual Port Drive | Mod 2 | Mod A |
| 3 | Unconditional Reserve Feature | Mod 3 | Mod B |
| 4 | On Line | Mod 4 | Mod C |
| 5 | Not Used | Mod 5 | Mod D |
| 6 | Not Available | Mod 6 | Mod E |
| 7 | Not Used | Mod 7 | Mod F |

| Bit | Bus In |
|---|---|
| 0 | Not Used |
| 1 | Temporary Not Available - If the other control unit has control and is executing a Long Select operation, this status bit is false. If not available and the other control unit is not executing a Long Select, this bit is true. (Refer to 6.1.1 for the Long Select command). |
| 2 | Dual Port Drive - If the drive has the dual-access feature, this bit will be true. |
| 3 | Unconditional Reserve - Indicates that the drive supports the Unconditional Reserve function. |
| 4 | On Line - True when the access is enabled and a Start Sequence has completed with the heads at cylinder 0. Disabling the access will assert On Line false. |
| 6 | Not available - True when the access is On Line and control of the drive is established through the other access. Not Available is false when the access is not On Line or the control unit has established control of the drive. |

TAG DECODE 4 or 9 (STATUS 1)

| Bit | Bus In |
|---|---|
| 0 | Index Error - True when Index does not occur at the end of sector 127 or if a false index pulse occurs. Index Error status is reset automatically by the drive. Three consecutive index pulses with no index error detected is required before the error is reset. |
| 2 | Seek Incomplete - True when any of the following three conditions exist and the heads have been positioned at cylinder zero. 1. Failure to complete a Seek operation within 80 milliseconds after issuance of Seek Start. 2. Invalid Off Cylinder condition is detected. 3. Detection of either inner or outer guardband during a seek. |
| 3 | Seek Complete/Pad Complete/Released - True when the drive has successfully completed a Seek, Recalibrate, Pad command in the absence of a Sector Search operation. For a multiple access drive, this status is also true when the drive attains a NEUTRAL state after an attempted Module Selection in which a Long Select Not Available status was obtained. Seek Complete/Pad |

-continued

| Bit | Bus In |
|---|---|
| | Complete/Released status will generate an interrupt command. |
| 4 | On Line - True, when the access is enabled and a Start Sequence has completed with the heads at cylinder 0. Disabling the access will assert On Line false. |
| 6 | Busy - True when (1) the heads are in motion due to Seek operation, (2) a Sector Search is in progress and the desired sector has not been located, or (3) a Pad operation is in progress. |
| 7 | Record Search In Progress - This line is true when a Set Sector command has been given. It is reset by Reset Interrupt, or Recalibrate commands. |

TAG DECODE 3 (STATUS 1)

Status 1 at the access that has established control is described above. Status 1 at the access that has not established control is as follows:

| Bit | Bus Out |
|---|---|
| 4 | On Line - True when the access is enabled and a Start Sequence has completed with the heads at cylinder 0. Disabling the access will assert On Line false. |
| 6 | Busy - True when the access On Line and control has been established by the other access. The Busy status will not change if control is dropped during the Tag Decode 3 command. |

TAG DECODE 5 (REQUEST ADDRESS)

If Bus Out bit 0 is set to read the Host ID Register in the disk drive, the contents of the register are placed on BUS IN, bits 0–7.

TAG DECODE 6 (SET CYLINDER)

The response on BUS IN to the Set Cylinder command is defined by the Tag Decode and Bus Out.

| Bit | Bus In |
|---|---|
| 0 | CAR 128 |
| 1 | CAR 64 |
| 2 | CAR 32 |
| 3 | CAR 16 |
| 4 | CAR 8 |
| 5 | CAR 4 |
| 6 | CAR 2 |
| 7 | CAR 1 |

TAG DECODE 7 (SET HEAD)

The response on Bus In to the Set Head command is defined by the Tag Decode and Bus Out.

| Bit | Bus In |
|---|---|
| 0 | Fixed Heads 32-59 |
| 1 | Fixed Heads 0-31 |
| 2 | HAR 16 |
| 3 | HAR 8 |
| 4 | HAR 4 |
| 5 | HAR 2 |
| 6 | HAR 1 |

TAG DECODE 8 (HOST ID)

The response on Bus In to the Host ID command is defined by the tag decode and bus Out.

| Bit | Bus In |
|---|---|
| 4 | Host ID1 |
| 5 | Host ID2 |
| 6 | Host ID3 |
| 7 | Host ID4 |

TAG DECODE 9 (CONTROL 1)

When this tag is active the Bus In lines contain Status 1 information as defined above for Tag Decode 3.

TAG DECODE 10 (CONTROL 2)

When this tag is active Bus In lines contain Status 3 information.

| Bit | Bus In |
|---|---|
| 0 | Reserved - True when the Reserved latch is set. The Reserved latch is set by the Reserve command. Reserved status is reset by the Release command or by receipt of the Unconditional Reserve command from the other access. |
| 1 | Released - For a dual-access drive, this status is true when the drive attains a neutral state after an attempted Module Selection in which a Long Select Not Available status was obtained. This status is reset by the Reset Interrupt command. |
| 4 | On Line - True, when the access is enabled and a Start Sequence has completed with the heads at cylinder 0. Disabling the access will assert On Line false. |

TAG DECODE 11 (STATUS 2)

The following status is reported to the SCU over Bus In when Tag Decode 11 (Operate) is executed.

| Bit | Bus In |
|---|---|
| 0 | Index Error - True when Index does not occur at the end of sector 127. Index Error status is reset automatically by the drive. Three consecutive index pulses with no index error detected is required before the error is reset. A Recalibrate command will also reset the index error. |
| 2 | Padding in progress |
| 3 | Read Only - This line is true when the drive is in the Read Only mode. |
| 4 | Write Ready - This line is true when the heads are on cylinder and there is no access motion. |
| 5 | Index - This line is true once each revolution at pack index time. The pulse width is 3.17 micro sec. ±6%. |
| 7 | Write Current Sense - This line is true when any head in the drive is drawing current (writing). |

While the foregoing definition of the SCU/disk drive interface infers certain characteristics for the disk drives, it should be understood that the present invention is not limited to a specific form of disk drive. In fact, the present system may operate with anyone of several different types of disk drives. As illustrated in FIG. 7A, the device interface is provided with two data standardizers and decoders 722 and 724 for decoding data received from two different types of disk drives. In addition, the control interface of FIG. 7A is provided with two encoders 728 and 730 for encoding data into a format suitable for recording by one of two different types of disk drives. Although FIG. 7A illustrates data standardizers and decoders for use with models 8450 and 8470 manufactured by ISS - Sperry Univac, other data standardizers and decoders may be substituted. Encoder 730 and decoder 724 encode and decode ternary data while encoder 728 and decoder 722 encode and decode 3PM data.

The device interface circuits of FIGS. 7A and 7B also include a Device Branch Register 709, a Data Register (DR) 710, a File Data Register (FDR) 711, a Prefile Data Register (PEDR) 712, a Retry Byte Register (RB) 734, a Read/Write Control Register (RW) 736, a Byte Count Register (BC) 738, a byte counter 740, a retry byte counter 742, a File Bus Register (FB) 744, a Function Control/Function Tag Register (FC/FT) 746 and a Device Error Register 748.

DR 710 is a 32-bit register having its output connected through a set of gated buffers 714 to the BD Bus. The DR Register is loaded in parallel from the FDR Register 711 upon occurrence of the signal LOAD DR on lead 5200.

FDR 711 is a 32-bit shift register. It may be loaded in parallel from the output of PFDR 712 when the signal -FDR LOAD on lead 5202 is true at the same time the signal FDR CLOCK on lead 5204 goes true. When FDR LOAD is false then each FDR CLOCK shifts the contents of FDR one position toward the higher order stage 0. On read operations data from a selected disk drive passes through receiver 703 and is applied to the decoders and standardizers 722 and 724. As subsequently explained, stages 8 and 9 of RW 736 are loaded under microprogram control to identify the type of data expected from the disk drive. These bits are decoded and applied to selector 745 to select the output of the proper decoder. The data from selector 745 is applied to bit position 31 of FDR 711 and shifted until it reaches bit position 0. When a complete word of 32 bits has been assembled in the FDR 711 the contents of the register are read out through DR 710 and the gated buffers 714 to the BD Bus.

On write operations data is transferred from the BD BUS to the Data Bus 700. The data is entered one word at a time into PFDR 712 and is then transferred in parallel to FDR 711. The data is then shifted in the register toward bit position 0 and the contents of bit position 0 are read out over a bus 749 through circuitry (FIG. 52), a lead 750, an additional circuitry (FIG. 51B) to a shifter 752. As the data is shifted through FDR 711, bits 0–3 or 27–30 are selectively applied in parallel over bus 749 to a MUX 754 and gated through the MUX to an error correction code (ECC) generator 756. The ECC generator generates an ECC code of seven 8-bit bytes that is sent to the disk drive for recording at the end of a record during a write operation, and generates an ECC code for comparison with the ECC code read at the end of a record during a read operation.

From shifter 752 the data is applied over a lead 5158 to the encoder 730. In addition, the lead 5110 is connected through circuitry (FIG. 51B) and lead 5156 to the input of encoder 728. Depending upon which of the encoders is enabled, it produces output data which is applied over lead 762 and through driver 704 to the data bus 700 from whence it passes to the selected disk drive.

The Byte Count Register 738 is loaded by the microprogram prior to initiation of a read or write operation. The register is loaded with a count equal to the number of 8-bit bytes to be transferred. The output of BC 738 may be read out to the EXT A Bus through a set of gated buffers 764. In addition, the output of BC 738 is continuously applied to a comparator circuit 766. The comparator receives at a second set of inputs the output of the 16-stage byte counter 740. Because of timing considerations the byte counter 740 is initially loaded with a count of 2 in response to the signal LOAD BYTE COUNTER on lead 5300. A bit ring counter 768 (FIG. 7A) is advanced by a count of 1 as each bit is transferred and after each 8 bits are transferred it generates the signal BYTE COUNTER CLOCK on lead 770. This signal is applied to the byte counter 740 to advance the count therein. When the count in the counter 740 equals the count set in BC 738 the comparator 766 produces the signal END BRANCH. This signal is applied to stage 1 of the Device Branch Register 709 to inform the program that the transfer operation is complete.

The Read/Write Register 736 is loaded from the D Bus under microprogram control and the various stages of RW 736 control various operations as subsequently described. Briefly, RW 1 is set for a read data transfer to initiate the read data shifting through SR1 and SR2. RW 0 resets the read data transfer circuits when RW1 is off. RW 4 is the write shift enable bit which initiates write data shifting through SR1 and SR2. RW 5 is set to enable BYTE COUNTER FREEZE AT INDEX. RW 6 is the separated data search bit. RW 7 is the data separator enable bit. RW 8 and RW 9 are utilized to select either decoder 722 and encoder 728 or decoder 724 and encoder 730.

Stages A–F of RW 736 are complement loaded with an initial retry byte count. The outputs from these stages are connected to a comparator 772. All stages of RW 736 may be read out to the EXT A Bus through a set of gated buffers 774.

The Retry Byte Register 734 is complement loaded under microprogram control from the D Bus when CD=RB. It is a 16-bit register having its outputs connected to the 16-bit Retry Byte Counter 742. The counter 742 accepts the contents of the RB 734 upon occurrence of the signal LOAD RBC on lead 5306. The contents of the counter are incremented by 1 every 8 bits by the signal CLOCK RBC on lead 5308.

The 8 lower order bits of the retry byte counter are applied to comparator 772 where they are compared with bits A–F of RW 736. In this regard, the two high order A inputs to comparator 772 are tied to a logic 1 voltage while the outputs from RW 736 are applied to the 6 lower order positions. When the comparator 772 detects an equality at its input it generates a signal on lead 5304 to set stage 3 of the Device Branch Register 709. The retry byte counter is utilized in situations such as, for example, when an error occurs in reading gap information from the disk. It enables the SCU to get back to the proper position on the disk track in order to retry to read the gap information.

The File Bus Register 744 is a 15-bit register which receives and stores certain information received from the disk drives over CUDI BUS IN 701. BUS IN bits 0–7,P are entered into stages 0–8 of the FB Register. A 3-of-6 bit code, derived in response to a signal on the drive selected line and representing the address of a selected drive is entered into stages 10–15. The register is divided into two sections which are independently loadable. CUDI BUS IN is entered into stages 0–9 at CLK 1 if stage 1 of FC/FT 746 is set. The 3-of-6 bit code is entered into stages 10–15 at CLK 1 if FC/FT 2 is false.

The contents of FB 744 may be read out to the EXT A Bus through a set of gated buffers 780. Only stages 0-7 and 9-15 have their outputs connected to the gated buffers 780. The gated buffers 780 receive two additional signals over leads 5400 and 5402 which are gated onto bit positions 8 and 9 of the EXT A Bus. These signals indicate the selected bank of drives and the selected group of drives within the bank.

After the parity bit of CUDI BUS IN is entered into FB 744 it is applied to a CUDI Error Detector Circuit 790 which detects various errors at the interface. The detected errors generate signals which are applied to a Device Error Register 748 along with other miscellaneous error signals and the contents of the Device Error Register may be gated onto the EXT A Bus through a set of gated buffers 782.

The File Control/Function Tag (FC/FT) Register is an 18-bit register for storing 16 data bits and two parity bits. The data bits may be read out to the EXT A Bus through a set of gated buffers 778. Although all stages of the register may be loaded or cleared at the same time, it is convenient to think of the register as two separate registers FC and FT.

FT comprises the 8 high order bits of FC/FT. Bits 4-8 hold a hexadecimal code defining one of 16 tags or commands as described above. These stages are connected through drivers 706 to the Tag Out lines 5014 in CUDI Out Bus 702.

FT0, FT1 and FT2 are selectively set to generate the signals MODULE SELECT GATE, TAG GATE and ENABLE TAG VALID CHECK, respectively. The MODULE SELECT and TAG GATE signals are also applied through drivers 706 to the leads 5010 and 5012 in CUDI Out Bus 702.

FT3 is set when selection is being made from more than 16 drives. This signal, together with FT0-FT2, is utilized for gating purposes within the SCU.

The FC Register comprises bit 9-17 and is loaded with BUS OUT information. This information together with its parity is transmitted from the FC Register through drivers 706 to the Bus Out 5012.

The bit ring counter 768 comprises an 8-stage shift register together with an 8-count flip-flop and a 16-count flip-flop in order to provide a modulo 32 counter. This counter is advanced one step each time a bit of data is transferred over the interface. The counter may be preset to 16 if bit 14 of the D Bus is true, and a control word is executed wherein the DC field specifies the preset register. The CD decoder 306 produces CD=PS on lead 310 to gate bit 14 from the D Bus into the Counter. In like manner, bit 15 of the D Bus may be used to preset the bit ring counter to a count of 8. The signal WRITE GATE on lead 5518 controls the setting of the bit ring counter to 8 or 16, the setting of the counter in response to D 14 and D 15 being permitted if WRITE GATE is false and the bit ring counter reaches a count of one. D 14 and D 15 may also unconditionally set the 8-count or 16-count flip-flop in the counter as a cycle of the bit ring counter is initiated. The signal READ PAUSE on lead 769 is produced by the ECC circuits 756 and causes the reset of the 16-count flip-flop in the bit ring counter. The reset occurs when the counter reaches a count of 19. If RW 7 is set, it unconditionally clears both the 8-count and 16-count flip-flops. The signal END BRANCH on lead 5302 clears both the 8-count and 16-count flip-flops if WRITE GATE is true. The counter starts counting in response to the signal BIT RING INITIATE on lead 5214 and the count therein is advanced by one in response to each BIT RING ADVANCE pulse on lead 5206. These operations are described below.

Figure 50:
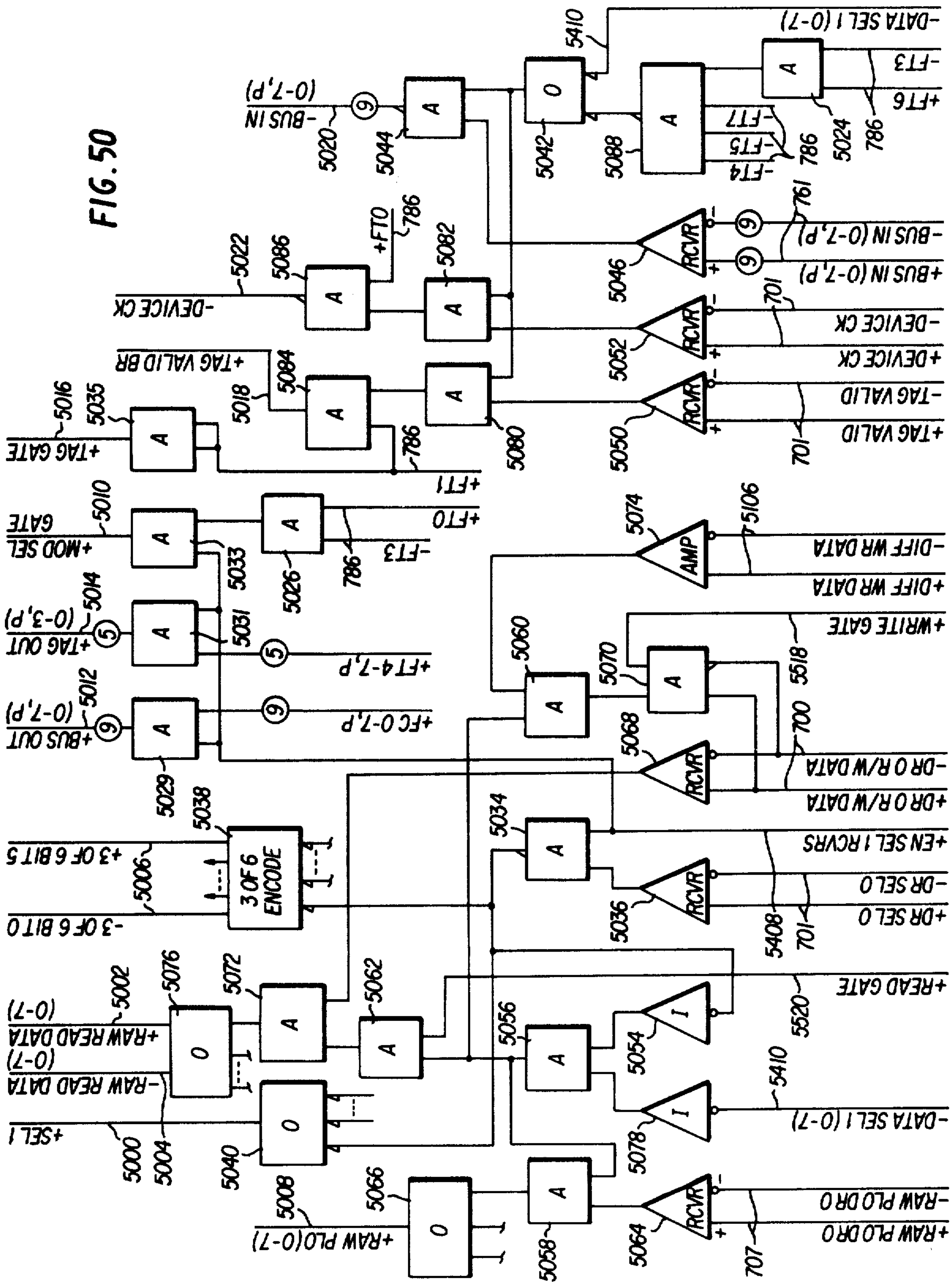

FIGS. 50-55 show the details of the logic circuits of the device interface 124. These figures show the complete logic for connecting the SCU to one disk drive unit. There may be a plurality of disk drive units in a bank, and a plurality of banks of disk drives may be connected to the SCU. Selection of a disk drive is made under control of the microprogram. Selection of one of the disk drives is initiated by ANDing the contents of FC/FT with the value 9000 to set FT0 and FT3 while clearing all stages of FC. In FIG. 50, −FT3 inhibits AND 5024 to prevent generation of TAG 2. It also inhibits AND 5026 thereby blocking AND 5033 and preventing the generation of +MODULE SELECT GATE.

Figure 54:
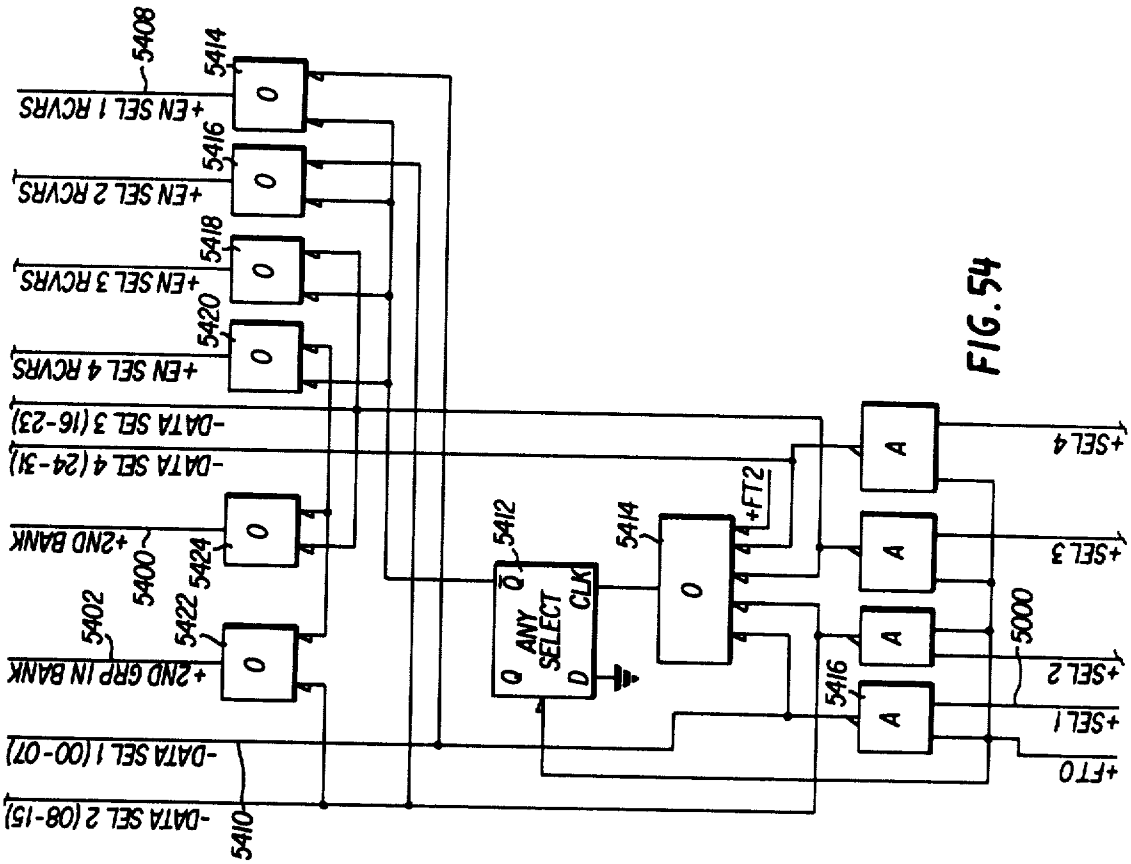
FIGS. 50, 51A and 51B, 52-54, 55A and 55B illustrate details of the logic in the device interface circuits shown in FIGS. 7A and 7B.

In FIG. 54, the signal FT0, when false, sets latch 5412. When +FT0 goes true it enables the latch to be reset. When the contents of FT and FC are ANDed with the value 9000, FT2 is reset. In FIG. 54 +FT2 (now false) passes through OR 5414 to reset latch 5412. The output of the latch passes through four ORs 5414, 5416, 5418 and 5420 to generate the signals +ENABLE SELECT 1 RECEIVERS− +ENABLE SELECT 4 RECEIVERS. These latter signals control the interfacing between the SCU and the four banks of disk drives.

+ENABLE SELECT 1 RECEIVERS is applied over lead 5408 to FIG. 50 where it enables ANDs 5029, 5031, 5033 and 5034.

The microprogram then executes a control word to OR the contents of FC/FT with the contents of GA. The GA Register has previously been loaded under microprogram control with the value 834X where X represents the address of the disk drive to be selected. In FIG. 50, the value 4X from the FC Register is passed through ANDs 5029 to Bus Out 5012 from whence it is applied to all of the disk drives in bank 1. Since BUS OUT bit 1 is true it establishes a long select operation at the disk drive addressed by BUS OUT bits 4-7.

When the contents of FT are ORed with GA, FT0 and FT3 remain unchanged. However, the operation sets FT6 and FT7 which correspond to the MODULE SELECT TAG 3. The contents of FT4-FT7 are passed through ANDs 5031 and the Tag Out bus 5014 to make the disk drive selection.

The microprogram loads Register GG with the value 1 and loads GF with a time out value equivalent to 1.25 microseconds. The program then ORs FC/FT with the value 4000 to set stage 1 of the FT Register, the other stages remaining unchanged. In FIG. 50, +FT1 passes through AND 5035 to generate the signal +TAG GATE which is applied to the disk drives to inform them that the information on Tag Out Bus 5014 is valid and may be acted on.

After TAG OUT is generated the microprogram repeats an instruction which subtracts the contents of GG from GF and tests the result for 0. This allows 1.25 microseconds for the selected disk drive to respond. The contents of GA and ANDed with a constant value and the result entered into GG in order to save tag bus bits 0-2.

The addressed disk drive unit responds by placing status 1 information (see above) on BUS IN and energizing its drive select line. In FIG. 50, the drive select line 701 for disk drive 0, bank 1, is shown. It is connected through a receiver 5036 to the AND 5034 which is presently enabled by +ENABLE SELECT 1 RECEIVERS. The output of AND 5034 is applied to a 3-of-6 encoder 5038 which generates a unique 3-bit code on three of the six leads 5006 this code corresponding to the selected disk drive. The encoded address on leads 5006 is applied through a plurality of ORs (not shown) to FB 744 and entered therein at CLK 1. It should be noted that the 3 of 6 encoder 5038 has seven additional inputs for receiving the drive selected signals from seven other disk drives associated with bank 1. The ORs which are not shown OR the 3-of-6 bit signals from the remaining banks for application to FB.

The output of AND 5034 also passes through an OR 5040 to generate the signal +SELECT 1. The OR 5040 is provided with seven additional inputs for receiving signals from the other seven disk drives of bank 1.

The signal +SELECT 1 is applied over lead 5000 to an AND 5416 and since this AND is presently enabled by +FT0 it produces the signal -DATA SELECT 1 (0–7) on lead 5410. In FIG. 50, this signal passes through OR 5042 to enable a set of nine ANDs 5044. The data placed on BUS IN by the selected disk drive passes through a set of nine receivers 5046 and the ANDs 5044 and is applied over bus 5020 to stages 0–8 of the FB 744.

The microprogram executes an instruction which ANDs the contents of FB with 00FF in order to save the BUS IN information in the lower half of Register GG. However, before this takes place the microprogram tests to see if stage 7 of the ST Register 402 is set thus requiring a test for check 2 errors. It a check is required, the contents of FC are ORed with the constant 2000 to enable a TAG VALID check. This operation sets FT2. In FIG. 50, when FT1 was set it enabled AND 5084. The selected disk drive returns +TAG VALID if the tag it received from the SCU was valid. This signal passes through a receiver 5050, an AND 5080 and the AND 5084 to produce +TAG VALID BRANCH on lead 5018. The setting of FT2 enables +TAG VALID BRANCH to be sampled in a circuit (not shown) to set stage B of Device Branch Register 709.

After the TAG VALID check is made the contents of FC and ANDed with the value 9FFF in order to reset FT1 and FT2. This blocks ANDs 5035 and 5084 thereby terminating the tag valid check and TAG GATE.

Once the tag valid check has been made, the module select routine loads the Program Count Register 322 with the top value in the data stack 350 and a return is made to the calling routine.

Any time after a disk drive is selected, it may generate of DEVICE CHECK signal indicating either an unsafe condition or bad parity on BUS OUT. The signal +DEVICE CHECK is passed through receiver 5052, AND 5082 and AND 5086, enabled because FT0 is set, to generate the signal −DEVICE CHECK on lead 5022. This signal is applied to stage 3 of the Device Error Register 748.

Once the module select routine is complete, data transfer over the interface may take place. Returning to the point in the module select routine where AND 5034 was enabled, the output of AND 5034 passes through inverter 5054 to AND 5056. When +DATA SELECT 1 (0–7) goes true it passes through inverter 5078 and AND 5056 to enable ANDs 5058, 5060 and 5062. The raw PLO signal from disk drive 0 of bank 1 is passed through receiver 5064 and AND 5058 to OR 5066. The OR 5066 has seven additional inputs for receiving the PLO signals from the other seven disk drives associated with bank 1. The output of OR 5066 is applied over lead 5008 to FIG. 51B where it is applied to one input of an OR 5172. This OR has three additional inputs for receiving outputs from ORs like 5066 but associated with drive banks 2, 3 and 4. Thus, depending upon which of the disk drives of the system is selected, the PLO signal from that disk drive is available at the output of OR 5172 and is utilized for clocking purposes as subsequently described.

The bidirectional data line 700 for drive 0, bank 1 is connected to receiver 5068 which has an output connected to AND 5072. During read operations the signal +READ GATE on lead 5520 is true. The output of AND 5062 enables AND 5072 so that read data from receiver 5068 passes through AND 5072 to an OR 5076. This OR has eight inputs for receiving read data from the eight disk drives associated with bank 1. OR 5076 produces the signal +RAW READ DATA (0–7) and its complement −RAW READ DATA (0–7) on leads 5002 and 5004. These leads are connected to the inputs of a differential amplifier 5174 in FIG. 51B. The output of this amplifier is connected to an OR 5176 which has three additional inputs for receiving raw read data from the disk drives in banks 2, 3 and 4.

Figure 51A:
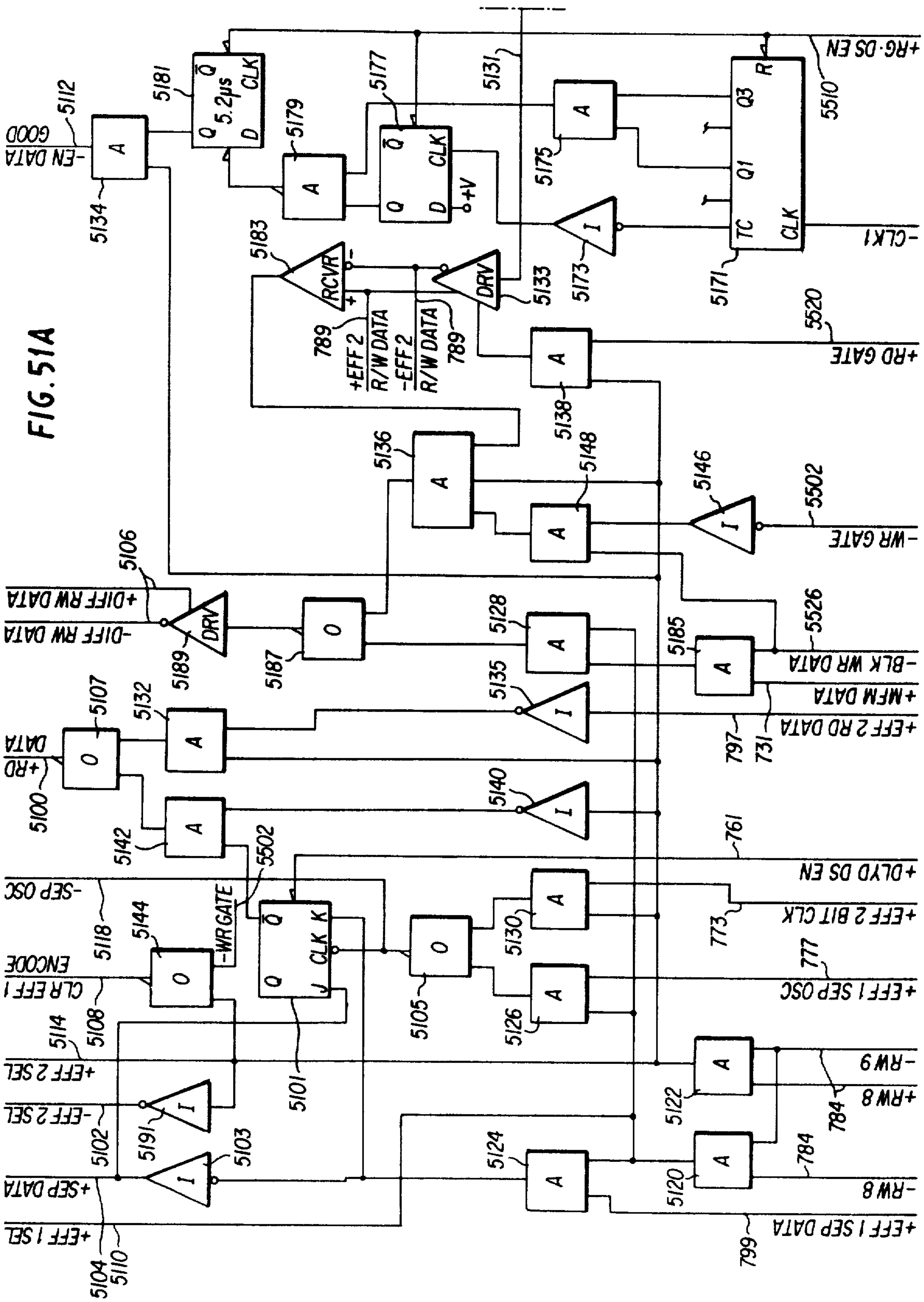
Figure 51B:
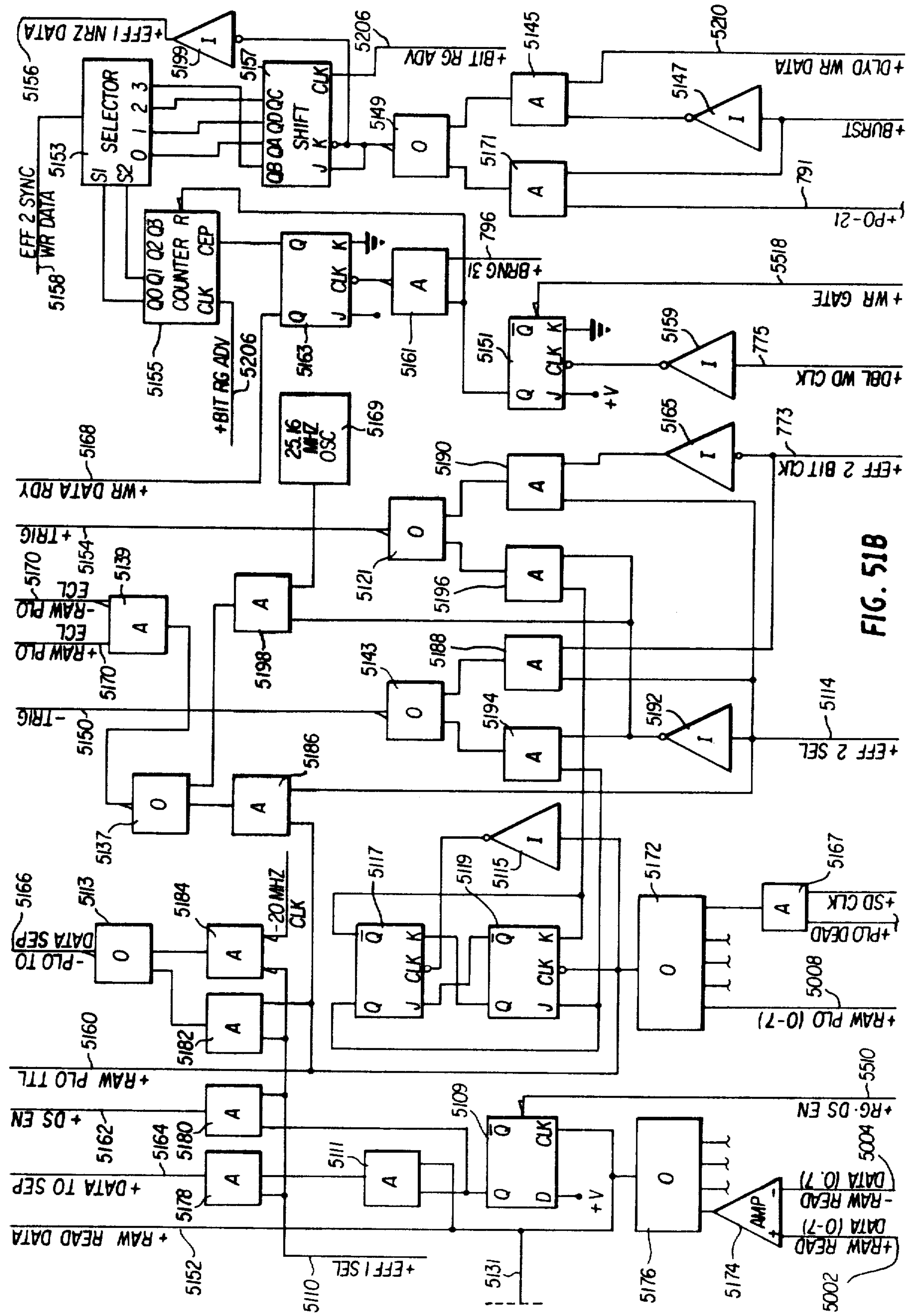

The paths of the READ DATA signals from the output of OR 5176 and the RAW PLO signal from the output of OR 5172 varies depending upon the type of disk drive selected. The selection is made under program control prior to initiation of the module select routine. The program loads stages 8 and 9 of the RW 736 depending upon whether the drive to be selected is a first (i.e. type 8450) or a second (i.e. type 8470) drive. In FIG. 51A, −RW8 and −RW9 are applied to two ANDs 5120 and 5122. If −RW8 and −RW9 are both false AND 5120 produces the output signal +EFF1 SELECT in order to enable the decoder 722 and encoder 728. The output of AND 5120 is the signal +EFF1 SELECT which is applied over lead 5110 to the encoder 728. In FIG. 51B +EFF1 SELECT enables ANDs 5178, 5180 and 5182 and blocks AND 5184. In FIG. 51A, the output of AND 5120 enables ANDs 5124, 5126 and 5128.

When −RW9 is false and −RW8 is true, the decoder 724 and encoder 730 are selected. In FIG. 51A, the AND 5122 produces the signal +EFF2 SELECT on lead 5114. In FIG. 51B, this signal enables ANDs 5186, 5188 and 5190. The signal also passes through an inverter 5192 to inhibit ANDs 5194, 5196 and 5198. In FIG. 51A, the output of AND 5122 enables ANDs 5130, 5132, 5134, 5136 and 5138, and passes through an inverter 5140 to block AND 5142. In addition, the output of AND 5122 passes through OR 5144 to generate the signal −CLR EFF1 ENCODER on lead 5108. This signal is applied to the encoder 728 to clear various shift registers contained therein.

Figure 55A:
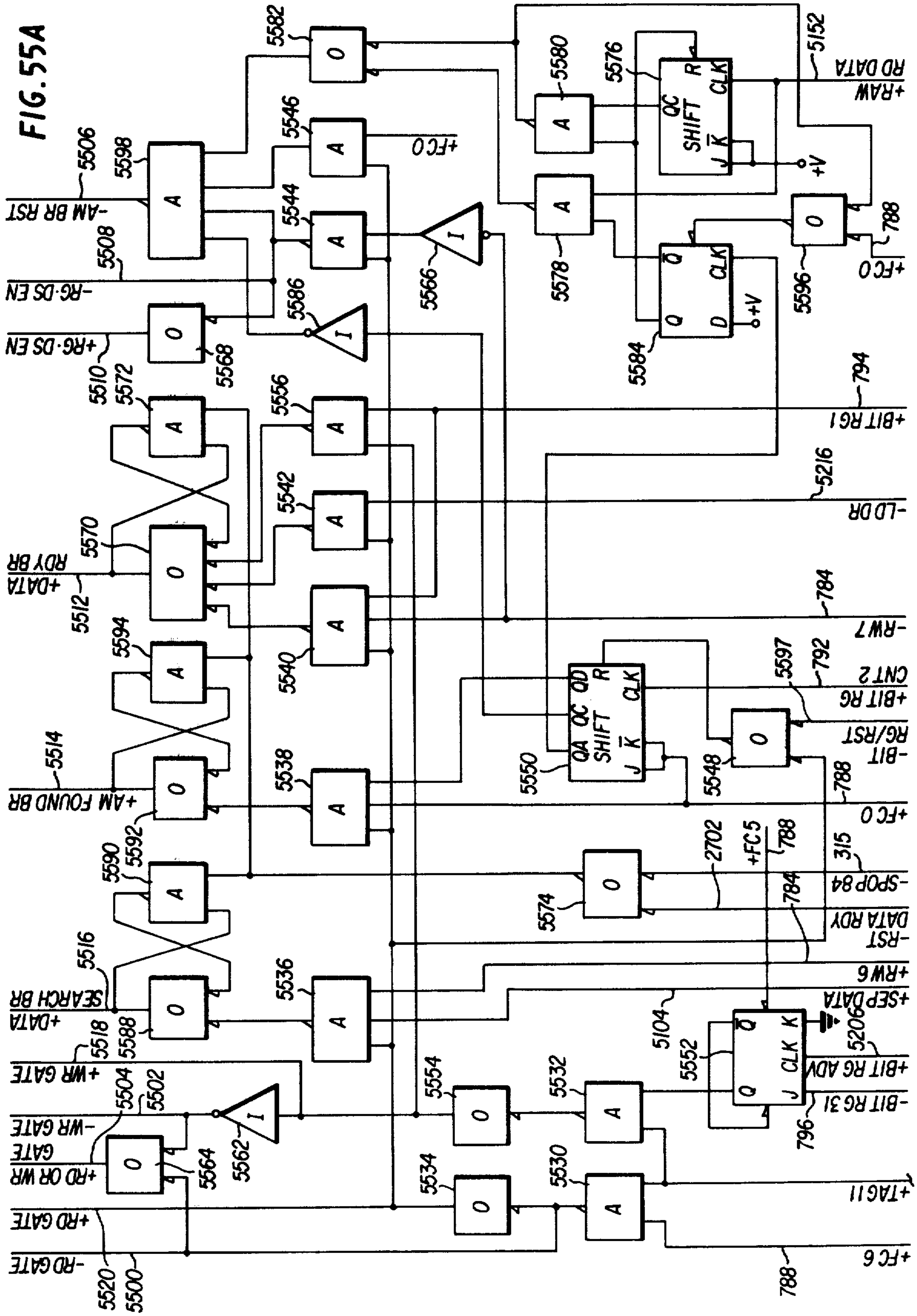

In order to read data from a disk the SCU must have TAG 11 stored in bit positions 4–7 of the FT Register and BUS OUT bit 6 in FC 746 must be set. Bits 4–7 of FT 746 are decoded by a circuit not shown to produce the signal +TAG 11. In FIG. 55A +TAG 11 is applied to two ANDs 5530 and 5532. +FC6 is applied to a second input of AND 5530 which generates the signal −READ GATE on lead 5500. This signal is applied to decoder 724 where it enables a shift register to be loaded with incoming read data.

The output of AND 5530 is inverted by an OR 5534 to produce the signal +READ GATE. In FIG. 55A, this signal enables ANDs 5536, 5538, 5540, 5542, 5544 and 5546. When +READ GATE is false it passes through an OR 5548 to reset a four stage shift register 5550. In FIG. 51A, +READ GATE enables an AND 5138. In FIG. 50 the signal enables AND 5062 to pass data from the disk drive into the SCU.

Figure 52:
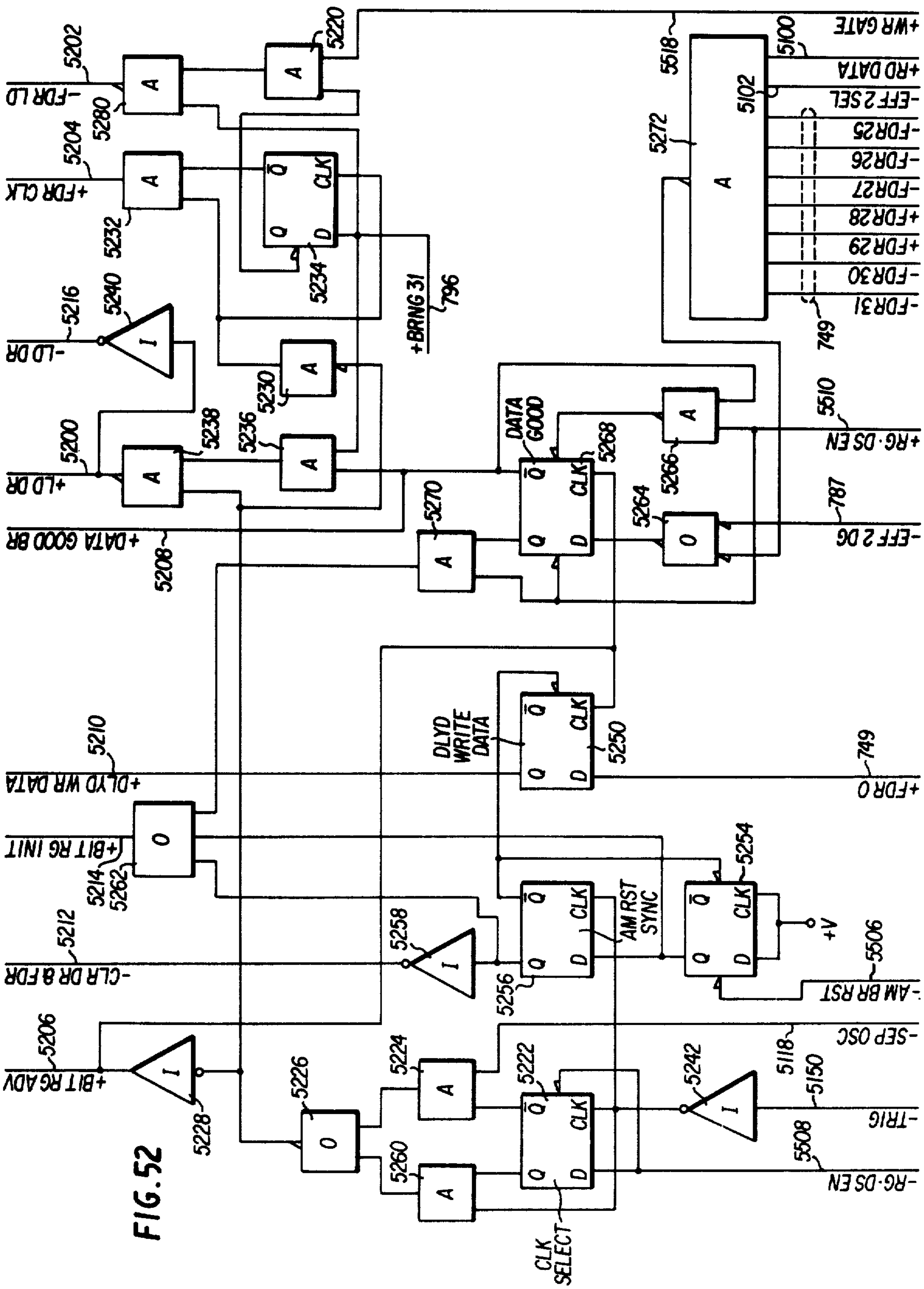
Figure 55B:
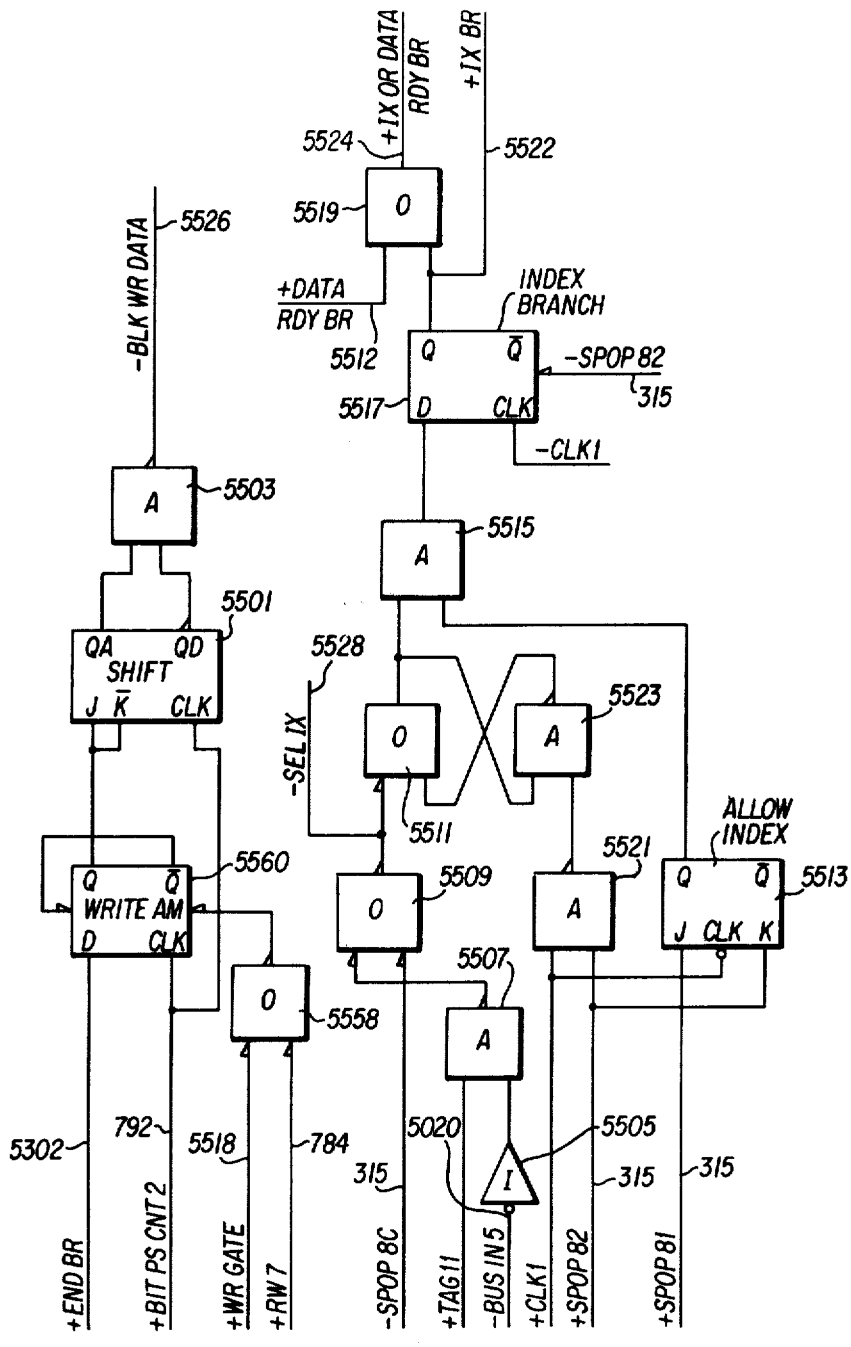

In order to perform a write operation which transfers data from the SCU to a selected disk drive, bits 4–7 of the FT Register must be loaded with TAG 11 and FC 5 must be set. In FIG. 55A, +FC5 removes the reset on flip-flop 5552. This flip-flop is clocked by the signal +BIT RING ADVANCE on lead 5206. The J input of the flip-flop receives the signal −BIT RING 31 on lead 796. The flip-flop is set by +BIT RING ADVANCE when the count in the bit ring counter is other than 31. The QA output of the flip-flop enables AND 5532 which is further enabled by +TAG 11. The output of AND 5532 is inverted by an OR 5554 to generate +WRITE GATE. In FIG. 55A, +WRITE GATE enables AND 5556. In FIG. 52, +WRITE GATE enables AND 5220. In FIG. 51B it removes the overriding reset to a flip-flop 5151. In FIG. 55B, +WRITE GATE, when false passes through an OR 5558 to the reset input of a latch 5560. In FIG. 7A, +WRITE GATE is applied to the encoder 730 for control purposes. Finally, in FIG. 50, +WRITE GATE enables AND 5070 to pass output data from encoders 728 and 730 to the bidirectional data line 700. The data from the encoders passes through amplifier 5074, AND 5060 (enabled by the output of AND 5056 during the selection routine) and AND 5070 to the bidirectional data line 700.

The output of OR 5554 is passed through an inverter 5562 to generate the signal −WRITE GATE on lead 5502. In FIG. 51A, the signal passes through an inverter 5146 to enable an AND 5148. The signal is also applied to OR 5144 in order to clear the EFF1 encoder when −WRITE GATE is false. In FIG. 7A, −WRITE GATE is applied to the data decoders 722 and 724 for control purposes.

In FIG. 55A, an OR 5564 receives the signals −READ GATE and −WRITE GATE so if either a read or a write operation is taking place the OR produces the signal +READ OR WRITE GATE on lead 5504. This signal is applied to an AND 5310 which also receives +FC7 on lead 788. AND 5310 produces an output through OR 5312 to reset a counter 5314 when FC7 is set in order to instruct the disk drive to store its sector count in its sector address register.

The path of data flow on a read operation from a type 8450 disk drive is from the data line 700 through receiver 5068, AND 5072, OR 5076, amplifier 5174 (FIG. 51B), OR 5176 and AND 5178 to the EFF1 data decoder 722. The decoded data appears on output lead 799 from decoder 722 and is applied to FIG. 51A where it passes through AND 5124 to the K input of a flip-flop 5101. The output of AND 5124 is also passed through an inverter 5103 and applied to the J input of the flip-flop. Concurrently with the outputting of data, the decoder 722 produces the clocking signal +EFF1 SEPARATION OSCILLATOR on lead 777. This signal passes through AND 5126 and OR 5105 to clock the flip-flop flop 5101. The resulting data output from flip-flop 5101 is passed through AND 5142 and an OR 5107 and over lead 5100 to stage 31 of FDR 711.

The foregoing data path assumes that the data separation and decoder 722 is enabled because RW 7 is set. In FIG. 55A, −RW7 passes through an inverter 5566, AND 5544 and OR 5568 to generate +RG·DS ENABLE on lead 5510. In FIG. 51B, this signal removes the reset to latch 5109 so that the latch is set at the first positive going data pulse. The QA output of latch 5109 enables AND 5111 so that the data may pass therethrough to the decoder 722.

When latch 5109 is set its output passes through AND 5180 to generate +DATA SEPARATOR ENABLE on lead 5162. This signal is applied to the decoder for control purposes. In addition, +DS ENABLE is clocked through two latches in the decoder by positive-going signals on lead 5164 and at the second pulse the decoder generates the signal +DELAYED DS ENABLE on lead 761. In FIG. 51A, this signal removes the reset from flip-flop 5101 so that the separated data from the decoder may pass through the flip-flop to FDR 711.

The clocking of the read data through decoder 722 and into the FDR Register 711 is obtained as follows. In FIG. 50, the RAW PLO signal from the selected drive passes through receiver 5064, AND 5058, OR 5066, OR 5172 (FIG. 51B), AND 5182 and OR 5113 to become the signal −PLO TO DATA SEPARATOR on lead 5166. This lead is connected to the decoder 722 and provides the clocking pulses for decoding the data.

The clocking of the data into FDR 711 is accomplished by the circuit of FIG. 52. When −RG·DS ENABLE goes true it resets a Clock Select Latch 5222 in order to enable one input of an AND 5224. The second input of AND 5224 is the signal −SEPARATION OSCILLATOR which is derived in FIG. 51A and is the same signal which clocks the data out of the decoder 722. Thus at each data pulse position AND 5224 produces an output signal through OR 5226 and inverter 5228 to generate the signal +BIT RING ADVANCE. This signal is applied over lead 5206 to the bit ring counter to advance the count therein. The output of OR 5226 is inverted at AND 5230 and is applied to AND 5232 and the clocking input of a latch 5234. Latch 5234 is clocked by +BIT RING 31 and has its QB output connected to AND 5232. The arrangement is such that the +BIT RING ADVANCE pulse which advances the bit ring counter from a count of 31 to a count of 0 sets latch 5234. It is reset at the leading edge of the +BIT RING ADVANCE pulse which advances the bit ring counter from a count of 0 to a count of 1. When the latch is set it enables AND 5232 so that +BIT RING ADVANCE pulses pass through AND 5232 to clock and shift FDR 711 as each pulse is received from the data decoder 722.

After each 32 bits have been entered into FDR 711 the contents of the register must be transferred to DR 710. The signal +BIT RING 31 is applied to an AND 5236. The second input of AND 5236 is enabled as subsequently described. The output of AND 5236 enables one input of an AND 5238 which also receives BIT RING ADVANCE pulses produced by OR 5226. Thus, when the BIT RING ADVANCE pulse occurs to advance the bit ring counter from a count of 31 to a count of 0, AND 5238 produces the signal +LOAD DR on lead 5200 if the data in FDR 711 is good. In FIG. 7B, this signal clocks the contents of FDR 711 in parallel into DR 710.

The output of AND 5238 is passed through an inverter 5240 to generate the signal −LOAD DR on lead 5216. In FIG. 55A, this signal passes through AND 5542 and OR 5570 to generate the signal +DATA READY BRANCH on lead 5512. This signal is applied to stage 4 of the Device Branch Register 709 to provide an indication to the program that an input word has been assembled and is present in DR 710 ready for transfer over the BD Bus.

The output of OR 5570 is also applied to one input of an AND 5572. The second input of AND 5572 is derived from an OR 5574 whose output is normally false. The output of AND 5572 is fed back to OR 5570 to prevent +DATA READY BRANCH from going false when the count in the bit ring counter is advanced from 31 to 0. The signal +DATA READY BRANCH is terminated when the program executes a control word to test for the data ready branch condition. The circuit of FIG. 27 generates the signal −RESET DATA READY which passes through OR 5574 to block AND 5572. The data ready branch may also be terminated by executing a control word having SPOP 84.

When the device interface is set up to read data from a tape 8470 disk drive, the path of the data is the same as described above until the data reaches the output of OR 5176 (FIG. 51B). From this point the data passes over lead 5131 to driver 5133 (FIG. 51A), now enabled by the output of AND 5138, and over the bidirectional pair of leads 789 to the data decoder 724. The decoded data appears at the output of decoder 724 as the signal +EFF 2 READ DATA on lead 797. In FIG. 51A this signal passes through inverter 5135, AND 5132 and OR 5107 to become the signal +READ DATA which is applied to bit position 31 of FDR 711.

The RAW PLO signal follows the path described above until it reches the output of OR 5172 (FIG. 51B). From OR 5172 the RAW PLO signal passes through AND 5186, OR 5137 and AND 5139 to become the signal +RAW PLO ECL. This signal is applied over leads 5170 to the decoder 724 to time the decoding of the data.

As the decoder 724 decodes the data it generates the sequence of pulses EFF 2 BIT CLOCK for clocking the data. In FIG. 51A, +EFF 2 BIT CLOCK passes through AND 5130 and OR 5105 to generate the signal −SEPARATION OSCILLATOR on lead 5118. The −SEPARATION OSCILLATOR pulses are applied to AND 5224 in order to generate the BIT RING ADVANCE pulses as previously described.

In FIG. 51B, +EFF 2 BIT CLOCK passes through AND 5188 and OR 5143 to generate −TRIGGER pulses on lead 5150. In FIG. 52 these signals are inverted at 5242 and clock latch 5122 but the latch remains reset as long as −RG·DS ENABLE is generated as previously described.

On a write operation to an 8450 disk drive, the data path is from the D Bus through PFDR 712 to FDR 711 which is shifted toward the higher order position. The output of bit position 0 of FDR 711 is the signal FDR0 on lead 749. In FIG. 52, +FDR0 is applied to the data input of a latch 5250. This latch is clocked by BIT RING ADVANCE pulses generated as subsequently described. Each time FDR 711 is left shifted the value of the bit is sampled by latch 5250 and the latch produces the signal +DELAYED WRITE DATA if the sampled bit is a 1. The signal +DELAYED WRITE DATA passes over lead 5210 to an AND 5145 (FIG. 51B) which is enabled by the output of inverter 5147 as long as the ECC circuit 756 is not bursting error correction data to the write circuits. The output of AND 5145 passes through OR 5149 and inverter 5199 to become the signal +EFF 1 NRZ DATA on lead 5156. This lead is connected to the data encoder 728 which encodes the data. The output of the encoder 728 is the encoded data signal MFN DATA on lead 731. In FIG. 51A +MFN DATA passes through AND 5185, AND 5128, OR 5187 and driver 5189 to become the signal −DIFFERENTIAL R/W DATA on leads 5106. The data signals are then applied to FIG. 50 where they pass through amplifier 5074, AND 5060 and AND 5070 to the bidirectional data line 700. From this point the write data is transmitted to the disk drive.

The PLO signal for clocking the data encoder 728 during a write operation is derived in the same manner as for a read operation until the PLO signal reaches the output of OR 5172. From this point the PLO signal is applied over lead 5160 as the signal RAW PLO TTL to clock the data encoder 728.

The path of data flow when writing to a type 8470 disk drive is from stage 0 of FDR 711 over lead 749 to the latch 5250. The latch is clocked by +BIT RING ADVANCE pulses to sync it with the operation of the encoder 730. From latch 5250 the data is fed over lead 5210 to AND 5145 (FIG. 51B). This AND is enabled by the output of inverter 5147 when the ECC Generator 756 is not enabled to burst ECC information to the encoder 730. The output of AND 5145 passes through OR 5149 to a Shift Register 5157.

When the ECC code is read out of ECC circuit 756, it is applied over lead 791 to AND 5171. The signal +BURST is made true by the ECC Generator. The ECC data passes from AND 5171 through OR 5149 to the Shift Register 5157.

The outputs from Shift Register 5157 are connected to inputs of a selector 5153. The selector selects one of the four outputs of Shift Register 5157 depending upon the count in the two low order stages of a modulo-16 counter 5155.

As long as +WRITE GATE on lead 5518 is false it holds flip-flop 5151 reset so that the output of the flip-flop holds counter 5155 and flip-flop 5163 reset. When the write operation begins +WRITE GATE goes true thereby enabling flip-flop 5151 to be set. The flip-flop is set after the disk drive locates the proper address for writing the data and sends to the SCU a code (hex 19) indicating that a data recording area follows. The decoder 724 recognizes this code and generates the signal +DOUBLE WORD CLOCK on lead 775. This signal passes through inverter 5159 to clock and clocks flip-flop 5151. The output of the flip-flop enables the counter 5155 to begin counting and also enables an AND 5161. When the Bit Ring Counter 768 reaches a count of 31 the signal +BIT RING 31 on lead 796 passes through AND 5161 to clock and set flip-flop 5163. The flip-flop 5163 generates the signal +WRITE DATA READY on lead 5168 and this signal is applied to the encoder 730 to enable it to accept the data.

The counter 5155 and the Shift Register 5157 are both advanced by each +BIT RING ADVANCE pulse on lead 5206. The counter controls the selector 5153 to successively sample the outputs of the shift register. The output of selector 5153 is the signal −EFF 2 SYNC WRITE DATA on lead 5158. This signal is applied to the encoder 730 which encodes the data for recording on the disk. The encoded data exits from encoder 730 as the signal EFF 2 R/W DATA. In FIG. 51A, this signal passes through a receiver 5183, AND 5136, OR 5187 and driver 5189 to generate −DIFFERENTIAL RW DATA on leads 5106. In FIG. 50, this signal passes through amplifier 5074, AND 5060 and AND 5070 to the data line 700 from whence it passes to the disk drive.

The clocking pulses for the write operation are derived from the PLO in the disk drive. The PLO signal follows the path previously described until it reaches the output of OR 5172 (FIG. 51B). The AND 5186 is enabled by +EFF2 SELECT at this time so the output of OR 5172 passes through AND 5186, OR 5137 and AND 5139 to generate +RAW PLO ECL. This signal is applied over lead 5170 to the decoder 724 which in turn produces +EFF2 BIT CLK on lead 773. In FIG. 51B, this signal passes through AND 5188 and OR 5143 to generate −TRIGGER on lead 5150. This signal is applied through inverter 5242 to the clocking input of the Clock Select Latch 5222. Since the signal −RG·DS ENABLE on lead 5508 is false, the output of inverter 5242 sets latch 5222. The TRIGGER pulses then pass through AND 5260, OR 5226 and inverter 5228 to generate the BIT RING ADVANCE pulses on lead 5206 to advance the Bit Ring Counter 768. The output of OR 5226 passes through AND 5230 to clock latch 5234 to enable AND 5232. Each time the bit ring counter is advanced the output of OR 5226, acting through AND 5230 causes AND 5232 to generate +FDR CLK which shifts FDR 711. When the bit ring counter reaches a count of 31 the signal +BIT RING 31 passes through AND 5280 to generate −FDR LOAD on lead 5202. This signal loads another word in parallel from PFDR 712 into FDR 711. At the same time, +BIT RING 31 sets latch 5234 to inhibit AND 5204. The latch 5234 remains set for one count of the bit ring counter.

Operation of the bit ring counter 768 is started by applying to it the signal +BIT RING INITIATE over lead 5214. In FIG. 52, this signal is generated by the output of an OR 5262 under varying circumstances. When the interface is programmed to read from the disk drive and RW 7 is set to enable the data separator, the OR 5568 (FIG. 55A) generates +RG·DS ENABLE on lead 5510. In FIG. 52, this signal enables one input of AND 5270. The signal −EFF2 DATA GOOD blocks one input of an OR 5264. Assuming for the moment that AND 5272 is blocked, its output blocks the second input of OR 5264 and the OR produces an output signal which enables the Data Good Latch 5268 to be set at the next +BIT RING ADVANCE pulse produced by inverter 5228. The QA output of the latch passes through AND 5270 and OR 5262 to generate +BIT RING INITIATE which initializes the bit ring counter and enables it to begin counting.

Since EFF2 is not selected, the signal −EFF2 SELECT on lead 5102 is false and enables one input of AND 5272. Since the bit ring counter is now advancing, information being read from the disk is being decoded and applied to FDR 711. The outputs of stages FDR 25–31 are connected to AND 5272. This AND also receives +READ DATA over lead 5100. This latter signal represents the next information bit to be entered into FDR 31 when FDR 711 is shifted. If +READ DATA and FDR 25–31 represent the hexadecimal value 19 it means that a sync byte has been located on the disk. At this time AND 5272 produces an output through OR 5264 to reset the Data Good Latch 5268 at the next BIT RING ADVANCE pulse. This blocks AND 5270 thereby terminating +BIT RING INITIATE. The QB output of latch 5268 is connected back to AND 5266 which is also enabled by +RG·DS ENABLE. The output of AND 5266 holds the latch 5268 reset even after the inputs to AND 5272 change.

Figure 53:
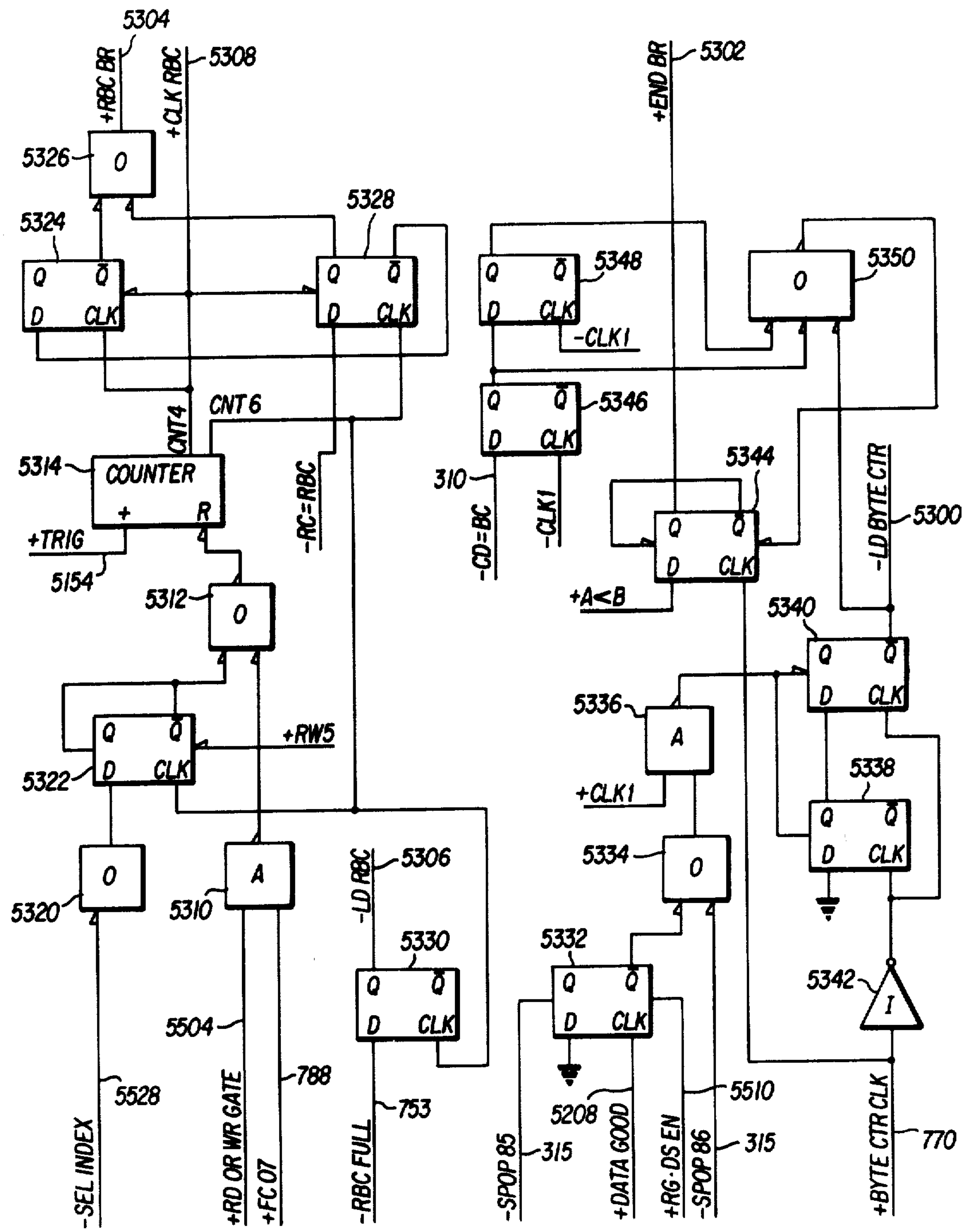

The QB output of latch 5268 is the signal +DATA GOOD BRANCH on lead 5208. In FIG. 7B, this signal sets stage 8 of the Device Branch Register 709 to inform the program. In FIG. 53, +DATA GOOD BRANCH clocks and resets latch 5332. This latch enables the loading of the byte counter 740 at detection of the sync byte.

The signal −SPOP 86 is false so when latch 5332 is set OR 5334 produces an output signal to block AND 5336. This removes the CLK 1 pulsing of latches 5338 and 5340 which has set these latches. The latches 5338 and 5340 are clocked by the trailing edge of +BYTE COUNTER CLOCK on lead 770. This signal is produced by the bit ring counter 768 when stage 7 of the shift register within the bit ring counter is reset. The first +BYTE COUNTER CLOCK after initialization of the bit ring counter resets latch 5338. The next following +BYTE COUNTER CLOCK resets latch 5340. The latches may be set again by executing a control word having SPOP 85 or SPOP 86. SPOP 85 sets latch 5332 which produces an output signal through OR 5334. When −SPOP 86 occurs it also passes through OR 5334. The output of OR 5334 enables AND 5336 so at the next CLK 1, AND 5336 produces an output signal to set both latches 5338 and 5340. At this time latch 5340 produces the signal −LOAD BYTE COUNTER on lead 5300 in order to reset the byte counter 740. The output of latch 5340 is also passed through OR 5350 to reset the End Branch Latch 5344. This latch is also reset when the Byte Counter Register 738 is loaded from the D Bus. The signal −CD=BC is applied to the D input of latch 5346. At the trailing edge of CLK 1 the latch is reset and its output passes through OR 5350 to reset latch 5344. The output of latch 5346 is connected to the D input of latch 5348 which is set at the trailing edge of the next CLK 1. The output of this latch also passes through OR 5350 to hold the End Branch Latch 5344 reset for a second cycle.

The End Branch Latch 5344 is set when the contents of the Byte Count Register 738 are less than the contents of the byte counter 740. Under this condition the signal +A<B enables the D input of latch 5344 and at the next +BYTE COUNTER CLOCK the latch is set. The latch produces the signal +END BRANCH on lead 5302 which sets stage 1 of the Device Branch Register 709 to inform the program that the data transfer is complete.

The bit ring counter is also initiated when an ADDRESS MARK BRANCH RESET occurs. In FIG. 52 the signal −ADDRESS MARK BRANCH RESET sets latch 5254 which produces an output signal through OR 5262 to generate +BIT RING INITIATE. The output of latch 5254 also enables latch 5256 which is clocked and set by the output of inverter 5242 when −TRIGGER occurs. The QA output of latch 5256 passes through OR 5262 to hold the +BIT RING INITIATE true. The QB output of latch 5256 resets latch 5254 and at the next following −TRIGGER latch 5256 is reset. The bit ring counter is now free to resume counting.

While latch 5256 is set it produces an output signal through inverter 5258 to generate −CLR DR AND FDR on lead 5212. This signal clears DR 710 and FDR 711.

Before a data transfer operation may begin a part of the setup of the interface includes a search for the address mark on the disk. The program sets stage 0 of FC 746 to initiate the address mark (AM) search. In FIG.

55A, +FC 0 enables AND 5538 and is applied to the JK inputs of Shift Register 5550. This shift register is reset by +BIT RING INITIATE on lead 5214 after being passed through an inverter (not shown) to generate −BIT RING RESET. In FIG. 55A this signal passes through OR 5548 to reset Shift Register 5550. When FC 0 is set a 1 is entered into the high order stage and the stages of the shift register shifted each time stage 2 in the Bit Ring Shift Counter 768 goes true. This occurs once each byte. When the first stage of the shift register is set its output clocks and sets a latch 5584. This latch has an output connected to an AND 5580. The second input of AND 5580 comes from stage C of a Shift Register 5576 which is clocked by +RAW READ DATA on lead 5152. Three RAW READ DATA pulses cause Shift Register 5576 to produce an output through AND 5580 and OR 5582 to enable one input of AND 5598. +READ GATE and +FC 0 enable the inputs to AND 5546 and it enables a second input of AND 5598. RW 7 is the DATA SEPARATOR ENABLE bit and if it is false the output of an inverter 5566 blocks AND 5544. Stage QC of Shift Register 5550 is not set so the output of inverter 5586 enables the fourth input to AND 5598 and it produces the signal −AM BRANCH RESET on lead 5506 to reset latch 5204 and initiate the Bit Ring Counter 768 as previously described.

At the time AND 5580 produces an output signal through OR 5582, it also passes through OR 5596 to reset latch 5584. This enables AND 5578 which then passes +RAW READ DATA through to OR 5582. The raw read data at this time is the address mark which comprises three bytes of all one's.

When the Shift Register 5550 is shifted to stage QC, the output of the shift register acts through inverter 5586 to block AND 5598. The next time Shift Register 5550 is shifted its output passes through AND 5538 and OR 5592 to generate +AM FOUND BRANCH. This signal is applied over lead 5514 to stage C of the Device Branch Register 709 to inform the program that the address mark has been found. The output of OR 5592 is fed back through AND 5594 having its output connected to an input of OR 5592. This holds +AM FOUND BRANCH true until the program executes a control word with SPOP 84. At this time the output of OR 5574 blocks AND 5594 and +AM FOUND BRANCH goes false.

FIG. 55B shows the index control circuits. If a type 8450 disk drive makes BUS IN BIT 5 true when FT 746 contains TAG 11, all inputs to AND 5507 are true and it produces an output through OR 5509 and OR 5511 to enable AND 5515. An index is allowed only if the program has executed a control word with SPOP 81 in order to set a flip-flop 5513. The output of flip-flop 5513 enables AND 5515 so that when the output of OR 5511 goes true it passes through AND 5515 to enable the Index Branch Latch 5517. The latch is set at the end of the next following CLK 1. The output of latch 5517 is the signal +IX BRANCH which is applied over lead 5522 to stage 6 of the Channel Branch Register 709. The output of latch 5517 also passes through OR 5519 to generate +IX OR DATA READY BRANCH on lead 5524. This signal sets stage 5 of the Channel Branch Register.

The index is cleared when the program executes a control word having SPOP 82. The signal +SPOP 82 is applied to AND 5521 and the flip-flop 5513. At the next +CLK 1 the output of AND 5521 blocks AND 5523 thereby blocking OR 5511. At the trailing edge of the clock pulse flip-flop 5513 is reset.

FIG. 55B also shows the circuits for blocking the output of write data when an address mark is being written. These circuits include an OR 5558 having its output connected to the reset input of a Write AM Latch 5560, a Shift Register 5501 which is loaded when latch 5560 is set, and an AND 5503 having inputs connected to the QA and QD outputs of the shift register 5501.

The latch 5560 is reset by the output of OR 5558 if +WRITE GATE is false or if RW 7 is set to enable the data separator. The latch receives +END BRANCH at its D input and is clocked each time stage 2 of the shift register in the Bit Ring Counter 768 goes true to generate +BIT RING COUNT 2 on lead 792. This signal is also applied to the clocking input of the shift register 5501. The shift register is shifted four times, each time loading stage QA and shifting the other stages to the right. After the first shift the output of QA enables AND 5503 which produces the signal −BLOCK WRITE DATA on lead 5526. In FIG. 51A, this signal blocks ANDs 5185 and 5148 thereby blocking the paths of write data from the encoders 728 and 730 to the data line 700. −BLOCK WRITE DATA is produced by AND 5503 throughout the interval that shift register 5501 is shifted a second and a third time. Thus, −BLOCK WRITE DATA is produced for an internval equal to three bytes which allows time for writing the address mark. On the fourth shift of shift register 5501 the QD output goes false thereby blocking AND 5503 and terminating −BLOCK WRITE DATA.

FIG. 53 shows the circuits for controlling the Retry Byte Counter 742. These circuits include a counter 5314 which is advanced by the signal +TRIGGER on lead 5154. The counter is a modulo-16 counter having stage 2 (count 4) connected to the clocking input of latch 5324. The outputs of stages 1 and 2 of the counter are combined to produce an output signal when the counter contains a count of 6 and this signal is applied to the clocking inputs of latches 5328, 5330 and 5322. The counter is reset when +READ OR WRITE GATE and +FC 7 are both true. These signals are applied to an AND 5310 having its output connected through OR 5312 to the reset input of the counter. The counter is also reset when it reaches a count of 6 if the signal −SELECT INDEX is true thereby causing OR 5320 to apply a high level signal to the D input of latch 5322. When the counter 5314 reaches a count of 6 it clocks and sets latch 5322 and the output of the latch acts through OR 5312 to reset the counter.

At count 4 the counter produces +CLOCK RETRY BYTE COUNTER on lead 5308. This signal is applied to the Retry Byte Counter 742 to increment the count therein. At count 6 the output of the counter clocks latch 5330 and if the Retry Byte Counter 742 is full so that the signal −RBC FULL on lead 753 is true, latch 5330 is reset thereby producing −LOAD RBC on lead 5306. This signal is applied to the retry byte counter to reload a count therein.

At count 6 the counter also clocks latch 5328. If the count in the retry byte counter is equal to the retry count in RW 736, comparator 772 produces the signal −RC=RBC which is applied to the D input of latch 5328. When the latch is clocked it is reset and produces an output through OR 5326 to generate +RBC BRANCH on lead 5304. This signal is applied to stage 3 of the Device Branch Register 709. The QB output of latch 5328 is applied to the D input of latch 5324 so if latch 5328 is set then the next time stage 2 of the counter 5314 goes true it clocks and sets latch 5324 which produces an output signal through OR 5326 to continue the RBC BRANCH signal.

The latch 5324 is reset and the latch 5328 set when the device interface is reset.

CACHE STORAGE UNIT

The system may comprise from one to four CSUs like the CSUs 104 and 106. Each CSU comprises four megabytes of RAM storage divided into four quadrants. Each CSU is provided with at least one port for connection with at least one SCU. Up to four control ports may be provided. At least one CSU in a system must include a segment descriptor table (SDT) and, if the CSUs are partitioned so that one or more of them is dedicated to a particular SCU, then at least one CSU in each partition must include an SDT.

Figure 12:
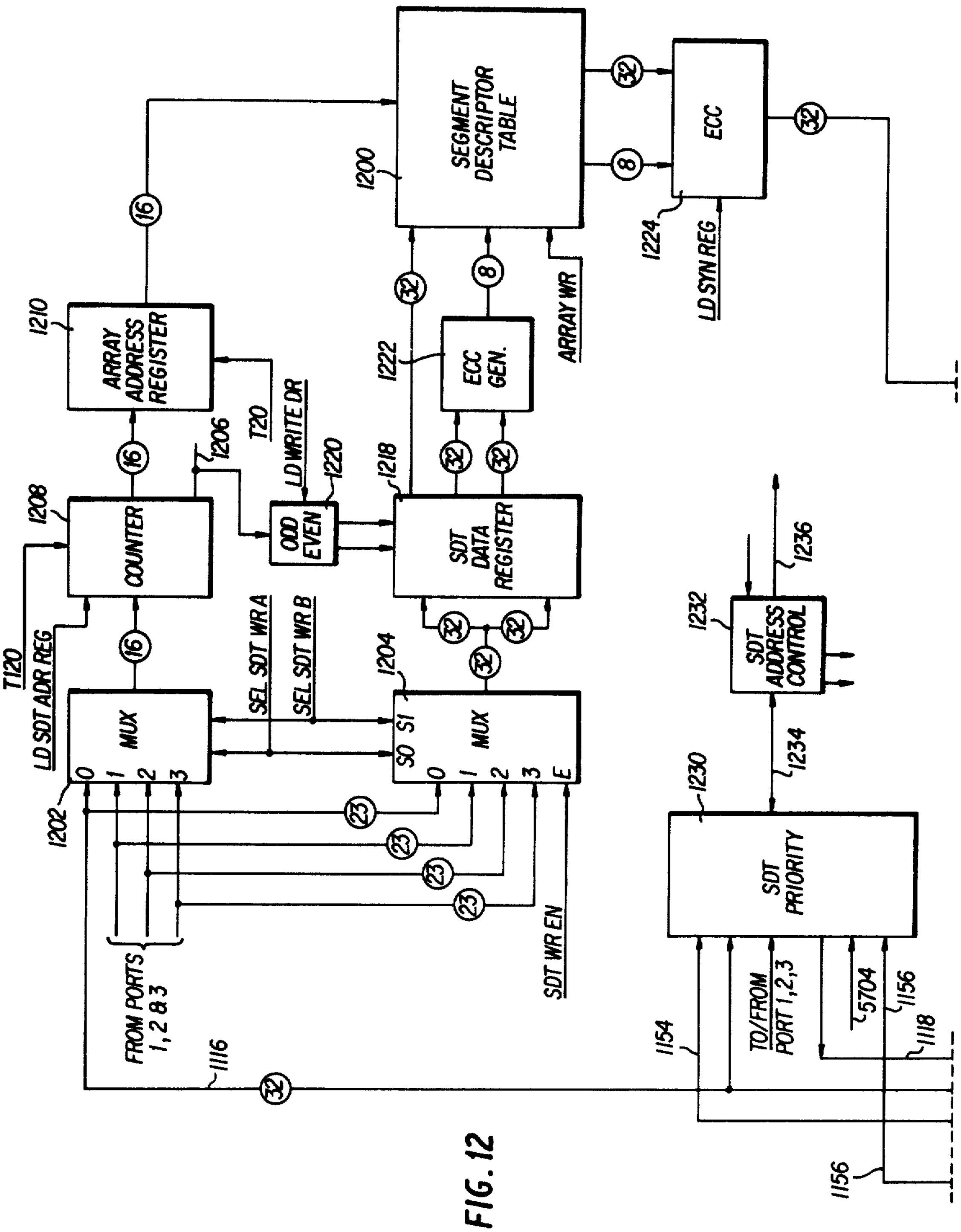
Figure 13:
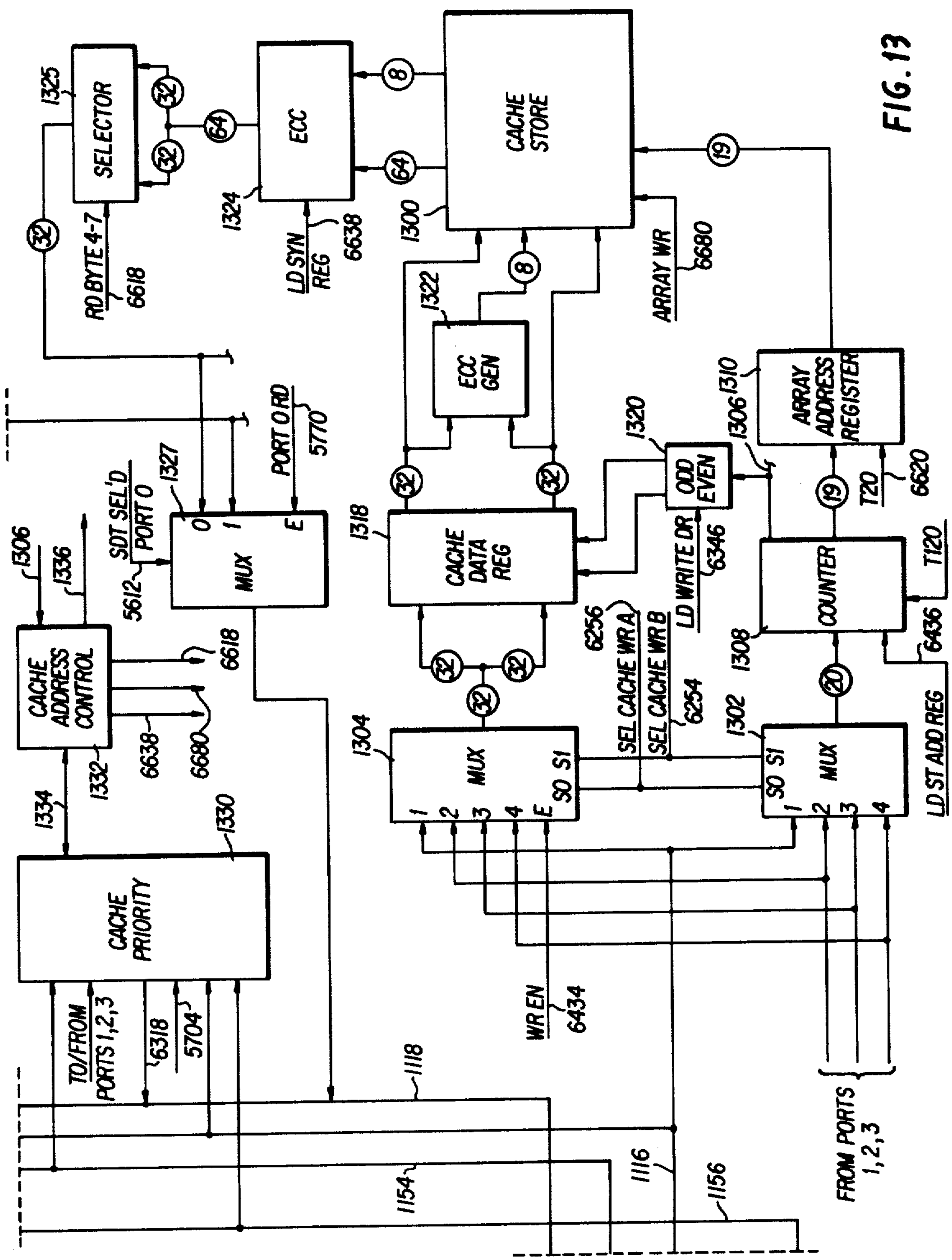

FIG. 11 illustrates in block form the major elements of Port Control 0 for a CSU. An additional port controls may be like the one shown. FIG. 12 illustrates the paths of flow for data and addresses to the memory 1200 which provides storage of the SDT and certain global variables. FIG. 13 illustrates the flow of data and addresses to a memory (cache) 1300. As indicated above, each CSU must include at least one port control like that shown in FIG. 11 and a cache store circuit like that shown in FIG. 13. A particular CSU may or may not have an SDT circuit like that shown in FIG. 12 depending upon whether or not it is utilized in conjunction with another CSU that does have an SDT in it.

Each CSU is provided with an SDT priority circuit 1230 for determining priority of access to the SDT 1200 by the various ports. In like manner, each CSU is provided with a cache priority circuit 1330 for determining the priority of access to the Cache Store 1300 by the ports. It is possible for the SDT in a CSU to be engaged through one port with one SCU at the same time the cache store 1300 is engaged through a second port with a second SCU.

The unit of data transfer between cache 1300 and an SCU is called a segment. A segment comprises an 8192 byte area in the Cache Store 1300 of which 8064 bytes (1792 words) contain valid data. The segments in cache store 1300 are linked together by the SDT 1200. The SDT contains 512 entries, one for each segment in cache 1300. Each SDT entry defines various information regarding its associated segment as subsequently described.

The path of data transfer from an SCU to the cache 1300 is from Bus Out 900, through receivers 1104, over Write Data Bus 1116 and through MUX 1304 to a Cache Data Register 1318. The cache 1300 is nine bytes (72 bits) wide while the data words transferred to the CSU from the SCU are 32 bits (plus parity) wide. The parity is checked on the write data bus and stripped from the incoming data word. A first data word is then entered into the four low order bytes of the Cache Data Register 1318 while the next word is entered into the four high order bytes of the register. The output of the Cache Data Register is applied to the cache 1300 and to an ECC Generator 1322 which generates an 8-bit error correction code. This correction code is entered into a cache storage location at the same time two words are entered into the location from the cache data register.

On data transfers from cache 1300 to an SCU, two words and the associated correction byte are read out of a location in the cache and entered into a register in an ECC Correction and Detection circuit 1324. The two words are checked for errors and if a single bit error exists it is corrected. The ECC byte is stripped from the data words and the data words applied to a selector 1325. A signal on lead 6618 alternately enables selector 1325 to pass the first and then the second word from ECC circuit 1324. Since the signal SDT SELECTED on lead 5612 should be false during a cache read, the data words are passed one at a time through MUX 1327 onto Read Data Bus 1118. From the read data bus the data words pass through drivers 1102 onto BUS IN from whence they are applied to the SCU.

Before a data transfer operation may take place, the starting address must be loaded into a counter 1308. From Bus Out 900 the address passes through receivers 1104 and over Write Data Bus 1116 to MUX 1302. The 20-bit address output of MUX 1302 is applied to the counter 1308. This starting address must be an even number which is divisible by 16.

From counter 1308 the high order 19 bits are loaded into an Array Address Register 1310 to address the cache 1300. The low order bit from counter 1308 is applied to a circuit 1320 and, if a write transfer is taking place, circuit 1320 produces output signals to control the loading of data words into the upper and lower halves of the register 1318. If a read transfer is taking place the low order bit from counter 1308 is applied to a cache address control circuit 1332 which produces the signals READ BYTES 4–7 and LOAD SYNDROME REGISTER. READ BYTES 4–7 is applied over lead 6618 to selector 1325 to select one and then the other of the two words read from cache. The two words read from cache are loaded into the ECC circuits 1324 by LOAD SYNDROME REGISTER, and are passed one at a time through selector 1325 to MUX 1327 as previously described.

The SDT circuits of FIG. 12 are almost identical to the cache circuits of FIG. 13. However, because the memory 1200 stores a single word at each addressable location, a selector like 1325 is not required. Also, only 32 bits at a time are transferred from the data register 1218 to the memory 1200.

Control signals received from the SCU over bus 1000 pass through receivers 1103 to a bus 1114 which distributes them to the port controls 1150 and the cache and SDT priority circuits 1330 and 1230. Tag commands from the SCU are applied to a tag decoder 1106 which produces one of several output signals depending upon the value of the tag being decoded. This signal is loaded into a Tag Register 1130 upon occurrence of the signal LOAD TAG REGISTER on lead 5602. The contents of the tag register, only one bit of which should be set, are applied through an address generator circuit 1152 to a PROM 1132.

PROM 1132 provides control signals to the port controls 1150 and the priority circuits 1230 and 1330, and controls responses by the port to various tags sent to the port by the SCU. Each tag decoded and entered into Tag Register 1130 addresses a specific control word in PROM 1132. This control word causes a check by circuits (not shown) for an error in the sequence in which tags have been received. Each of these control words may also include a 4-bit jump address. If no error has been detected in the sequence of tags, this jump address is loaded into a Jump Address Register 1128 and together with the tag signal from register 1130 selects a second address to read out a second control word from the PROM. In addition, modifiers from the SCU may be entered into an Address Modifier Register 1122 from Write Data Bus 1116 and this modifier docoded and combined with the output of the Tag Register 1130 and the Jump Address Register 1128 to generate an address for PROM 1132. The operation of the Address Generator 1152 and PROM 1132 and their control over the Port Controls 1150 may best be understood by considering the operation of the port in response to each tag received from an SCU.

In the following description it should be remembered that each CSU may have up to four port controls each including logic like that of FIGS. 57–61, and a single SDT priority circuit like the cache priority circuits of FIGS. 62–65. Also, each CSU has one addressing control circuit like that of FIG. 66 for controlling cache 1300 and another for controlling the SDT 1200.

TAG 2

Figure 56:
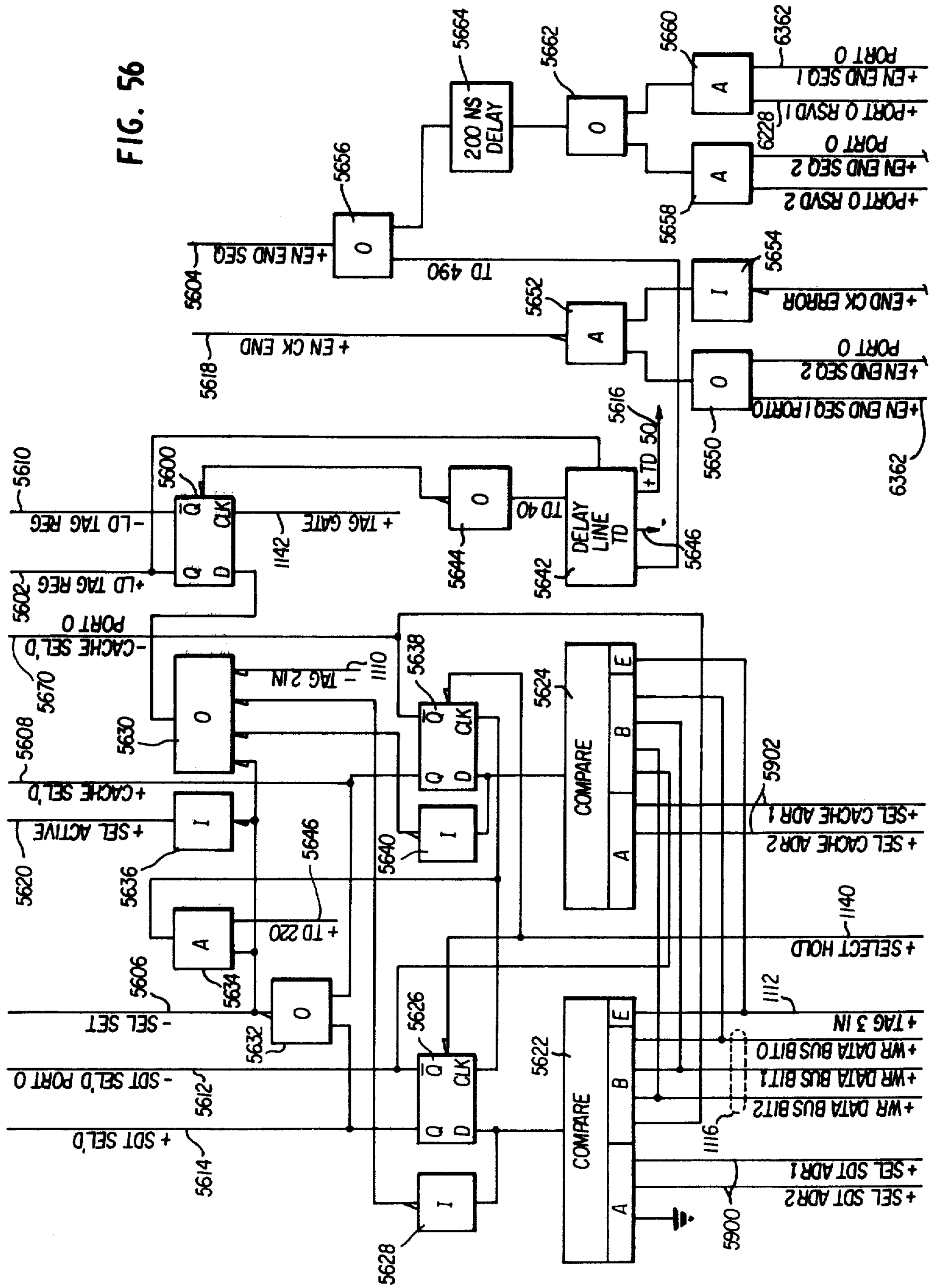
FIGS. 56-61 illustrate the logic for one control port for a cache storage unit.
Figure 57:
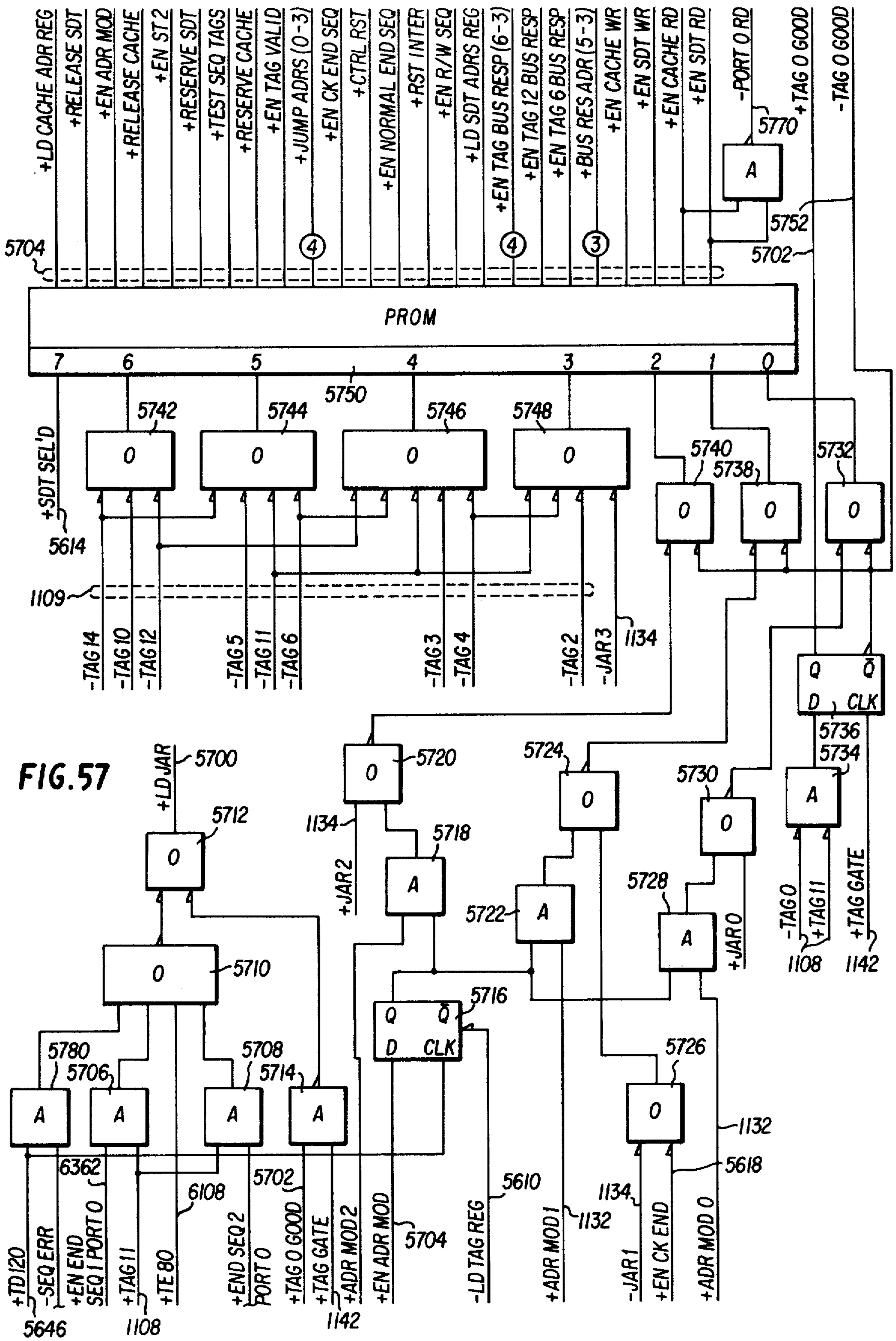

TAG 2 is the polling command the SCU issues to find out which CSUs have a waiting service request. When the Tag Decoder 1106 receives and decodes TAG 2, it generates −TAG 2 IN on lead 1110. In FIG. 56, this signal passes through OR 5630 to enable latch 5600. When the SCU generates TAG GATE to indicate that a valid tag is on Control Bus 1000, this signal clocks and sets latch 5600 to generate +LOAD TAG REGISTER and its complement. In FIG. 11, +LOAD TAG REGISTER loads the decoded tag into register 1130 and clears the Jump Address Register 1128. In FIG. 57, −LOAD TAG REGISTER resets a latch 5716.

Figure 59:
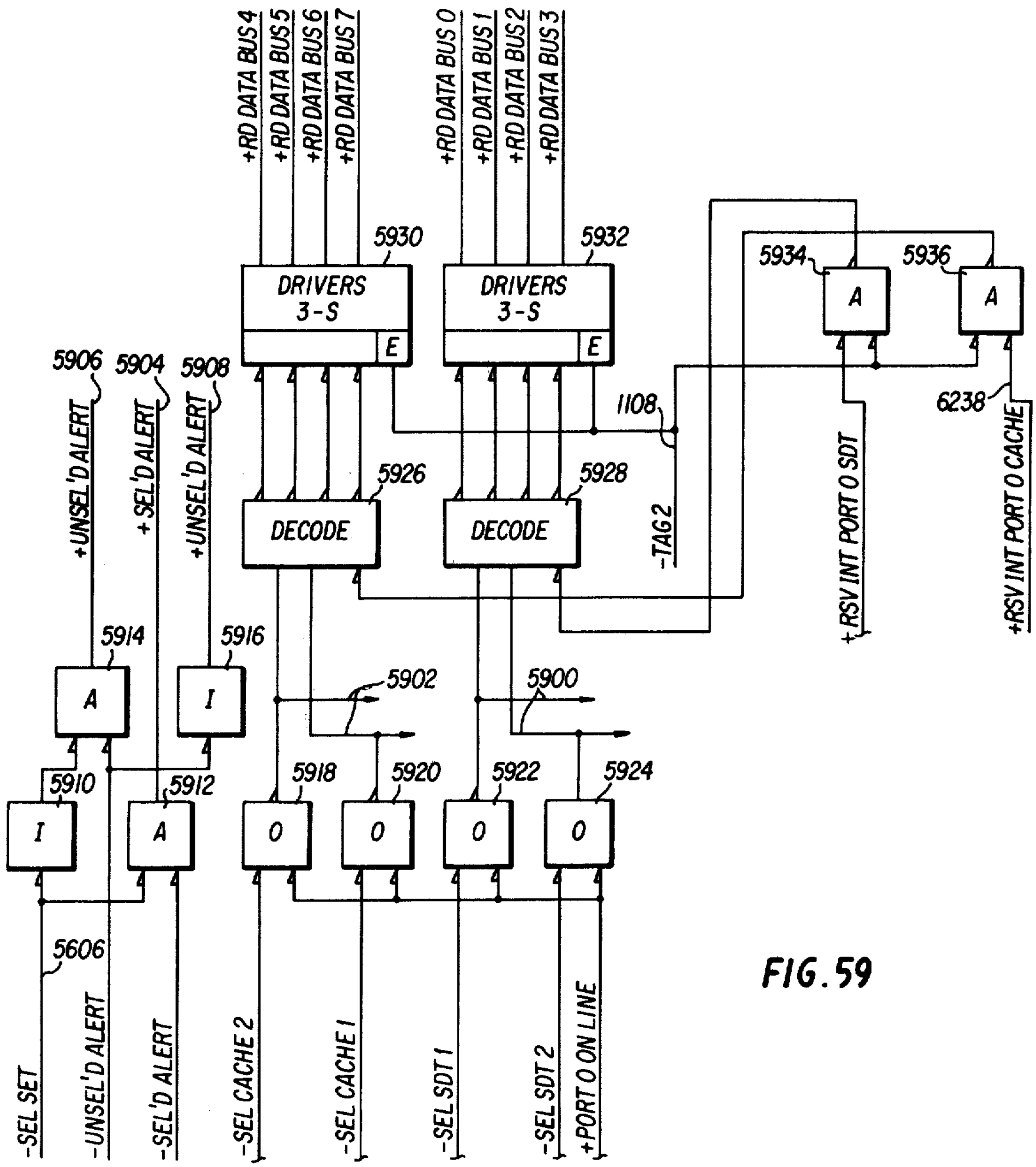

When the tag register is loaded it produces −TAG 2 on lead 1108. In FIG. 59, −TAG 2 enables two ANDs 5934 and 5936 and two sets of drivers 5930 and 5932. If the cache is making a service request, the signal +RESERVE INTERRUPT PORT 0 CACHE on lead 6238 is false. When −TAG 2 occurs it passes through AND 5936 to enable decoder 5926. This decoder has two inputs derived from two ORs 5918 and 5920. These ORs receive the signals −SELECT CACHE 2 and −SELECT CACHE 1. These signals represent the address assigned to the cache store of the CSU. The assignment is made at the time of system initialization. Depending upon the address assigned to the cache store for the CSU, neither one, both, or either one, of the signals −SELECT CACHE 1 and −SELECT CACHE 2 may be true. The outputs from ORs 5918 and 5920 are applied to decoder 5926 which generates an output signal on one of four output leads representing the decoded value of the signals applied to ORs 5918 and 5920. The cache address signals from decoder 5926 are passed through a set of three state drivers 5930 to bits 4–7 of the read data bus. From this bus the signals pass through drivers 1102 to Bus In 1100.

AND 5934, ORs 5922 and 5924, decoder 5928 and drivers 5932 act in the same way to generate on Read Data Bus Bits 0–3 the address assigned to the SDT of the CSU if the SDT is making a service request thereby making the signal on the input to AND 5934 false.

In FIG. 57, −TAG 2 passes through OR 5748 to address PROM 5750 (1132). This reads from PROM 5750 the word stored at hexadecimal address 08. The word stored at this location contains nothing except Jump Address B, and enables a fault test sequence by circuits not shown. Assuming that there is no sequence error, the signal −SEQUENCE ERROR is false and enables one input of AND 5780. At the time +LOAD TAG REGISTER was generated in FIG. 56, the signal was applied to a delay line 5642. After 40 nanoseconds the delay line produces an output signal through OR 5644 to reset latch 5600 and terminate +LOAD TAG REGISTER. The delay line 5642 has a tap every 10 nanoseconds, these taps being represented by the bundle of leads 5646. After 120 nanoseconds, the 40 nanoseconds pulse applied to the delay line is applied over one of the leads 5646 to AND 5780. Since there was no sequence error the delay line pulse passes through AND 5780, OR 5710 and OR 5712 to generate +LOAD JUMP ADDRESS REGISTER on lead 5700. This loads into the Jump Address Register 1128 the hexadecimal value B thereby setting stages 0, 1 and 3 of the Jump Address Register. In FIG. 57, −JAR 3 and −TAG 2 pass through OR 5748 to become bit 3 for again addressing the PROM 5750. −JAR 1 passes through OR 5726, OR 5724 and OR 5738 to become bit 1 of the new PROM address. +JAR 0 passes through OR 5730 and OR 5732 to become bit 0 of the new PROM address. All other inputs to the PROM addressing circuits are zero hence the PROM reads out the control signals stored at address OB. These signals include ENABLE NORMAL END SEQUENCE, ENABLE TAG VALID, and JUMP ADDRESS BITS 3 AND 2.

Figure 61:
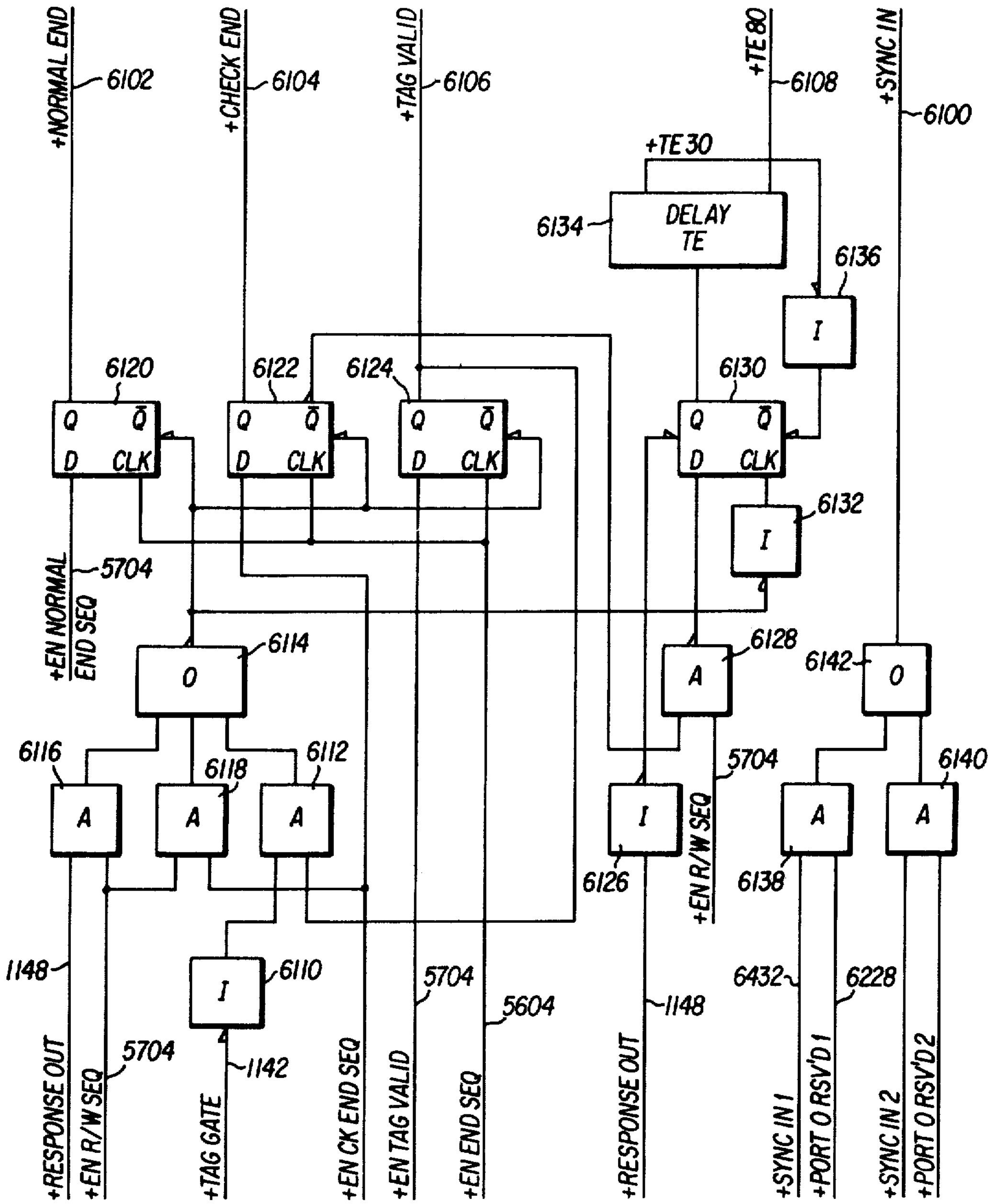

In FIG. 61, +ENABLE NORMAL END SEQUENCE is applied to the data input of latch 6120 while +ENABLE TAG VALID is applied to the data input of latch 6124. In FIG. 56, the pulse which was entered into delay line 5642 at the time the tag register was loaded emerges from the delay line 490 nanoseconds later. The pulse passes through OR 5656 to become +ENABLE END SEQUENCE on lead 5604. This signal is applied to the clocking inputs of latches 6120 and 6124 to set both latches. These latches produce +NORMAL END on lead 6102 and +TAG VALID on lead 6106. In FIG. 11, these signals are applied to drivers 1105 from whence they pass over the control bus 1101 to the SCU.

In response to +TAG VALID, the SCU drops +TAG GATE. In FIG. 61, +TAG GATE (now false) passes through inverter 6110, AND 6112 (enabled by the output of latch 6124) and OR 6114 to reset latches 6120 and 6124. The output of OR 6114 is also applied through inverter 6132 to clock a latch 6130. The AND 6128 is blocked at this time and is applying a high level signal to the data input of latch 6130. When the latch is clocked it is set and applies a pulse to a delay line 6134. 30ns later the delay line produces an output through inverter 6136 to reset latch 6130. The 30ns pulse in the delay line emerges from the delay line as the signal +TE 80 which begins 80 nanoseconds after 6130 is set. In FIG. 57, +TE 80 passes through OR 5710 and OR 5712 to generate +LOAD JAR on lead 5700. This signal loads the Jump Address Register with the jump address from the PROM and sets stages 2 and 3 only of the register. Again, −JAR 3 passes through OR 5748 to become bit 3 of another PROM address. At the same time +JAR 2 passes through OR 5720 and OR 5740 to become bit 2 of the latest PROM address. All other addressing inputs to the PROM are false so the PROM reads out the control word stored at address 0C. This address is completely empty and calls for no operation. This completes the response of the port to TAG 2.

TAG 3

TAG 3 is the selection command by which an SCU selects the CSU. The SCU issues TAG 3 with an address on bits 0-2 of BUS OUT. In addition, the SCU issues SELECT HOLD and TAG GATE. In FIG. 11, the tag is decoded by decoder 1106 to produce +TAG 3 IN on lead 1112. In FIG. 56 +TAG 3 IN enables two comparators 5622 and 5624. The address from BUS OUT is passed through receivers 1104 onto the Write Data Bus 1116 and applied to the B inputs of comparators 5622 and 5624.

Comparator 5622 receives the signals +SELECT SDT ADDRESS 2 and +SELECT SDT ADDRESS 1 at its A inputs. These signals are derived from ORs 5922 and 5924 as described above and represent the address assigned to the SDT of the CSU. The comparator 5624 receives the signals +SELECT CACHE ADDRESS 2 and +SELECT CACHE ADDRESS 1 from ORs 5918 and 5920 which generate the address assigned to the cache store of the CSU.

If the address on Write Data Bus Bits 0-2 is the same as the address assigned to the cache store of the CSU, comparator 5624 produces an output signal to the data input of latch 5638. The latch is not set at this time. The output of comparator 5624 passes through an inverter 5640 and an OR 5630 to the data input of latch 5600. When the SCU issues TAG GATE the signal +TAG GATE on lead 1142 clocks and sets latch 5600. The latch generates +LOAD TAG REGISTER on lead 5602 to load the Tag Register 1130 and initiate the delay line 5642 as described above. The latch 5600 also generates -LOAD TAG REGISTER on lead 5610 to reset the Jump Address Register 1128.

When the Tag Register 1106 is loaded it produces the signal -TAG 3 which is applied through OR 5746 to the bit 4 addressing input of PROM 5750. This causes the PROM to read out the control word stored at hexadecimal address 10. As before, this first control word tests for a sequence error. The control word also outputs jump address 4.

After latch 5600 is set there is a delay of 50ns before delay line 5642 produces the signal +TD 50 on lead 5616. This signal is applied to the Address Modifier Register 1122 to load therein the address on Write Data Bus 1116. Register 1122 generates signals representing the address on Bus 1116 and signals representing the complement of this address. These signals are applied to a set of drivers 1124.

The delay line 5642 produces the signal +TD 120 and in FIG. 57 this signal passes through AND 5780, OR 5710 and OR 5712 to generate +LOAD JAR on lead 5700. This loads the jump address from the control word into the jump address register 1128. In FIG. 57 +JAR 2 passes through OR 5720 and OR 5740 to become bit 2 of the second address for the PROM. -TAG 3 is still true and addressing the PROM. Therefore, PROM 5750 reads out the control word stored at address 14. The control word generates ENABLE NORMAL END SEQUENCE, ENABLE TAG VALID, ENABLE TAG 3 BUS RESPONSE, and JUMP ADDRESS 5.

The signal ENABLE TAG 3 BUS RESPONSE is applied to the drivers 1124 to gate the address in register 1122 onto bits 0-2 of the Read Data Bus 1118 and the complement of the address onto bits 5-7. From the read data bus the address and its complement are passed through drivers 1102 to the SCU.

The delay line 5642 then produces the signal +TD 220 on lead 5646, this signal being supplied to AND 5634. The other input of AND 5634 is enabled by the output of OR 5632 because both of the flip-flops 5626 and 5638 are still reset. +TD 220 passes through AND 5634 to clock latches 5626 and 5638. The comparator 5624 is still applying a high level signal to the data input of latch 5638 because the address on the write data bus is being compared and found equal to the address assigned to the cache store. When latch 5638 is clocked it is set to generate +CACHE SELECTED on lead 5608 and -CACHE SELECTED PORT 0 on lead 5670. In addition, the set output of latch 5638 passes through OR 5632 to generate -SELECT SET on lead 5606. The output of OR 5632 passes through inverter 5636 to generate +SELECT ACTIVE on lead 5620. In FIG. 1150, +SELECT ACTIVE is passed through one of the drivers 1105 and returned to the SCU over Control Bus 1101.

-SELECT SET on lead 5606 passes through an inverter 5910 to block AND 5914. -SELECT SET also enables AND 5912. Thus, AND 5912 is enabled as long as the port is selected and if circuits (not shown) detect a hardware error to generate the signal -SELECTED ALERT, this signal passes through AND 5912 and over lead 5906 to one of the drivers 1105 to apply a SELECTED ALERT signal to the SCU.

When latch 5638 is set the signal -CACHE SELECTED PORT 0 on lead 5670 is applied to the port controls 1150 for ports 1, 2 and 3. This enables ports 1, 2 and 3 to report to their SCUs that the cache is temporarily not available if the SCUs should issue TAG 4 to sense status.

The signals +ENABLE TAG VALID and +ENABLE NORMAL END SEQUENCE generated by the control word at the address being selected in PROM 5750 are applied to latches 6120 and 6124 to generate -NORMAL END and +TAG VALID in the same manner as for TAG 2 described above. In response to +TAG VALID the SCU drops TAG GATE and in FIG. 61 +TAG GATE (now false) passes through inverter 6110, AND 6112, OR 6114 and inverter 6132 to set latch 6130 and initiate delay line 6134 as described above with reference to TAG 2. The delay line 6134 produces the signal TE 80 on lead 6108 which passes through ORs 5710 and 5712 to generate +LOAD JAR on lead 5700. This loads into the Jump Address Register 1128 the jump address 5 being read from PROM 5750. This sets JAR 0 and JAR 2. JAR 0 passes through OR 5730 and OR 5732 to become bit 0 of the next address to be applied to PROM 5750. JAR 2 passes through OR 5720 and OR 5740 to become bit 2 of the address. -TAG 3 is still being generated by the Tag Address Register so address bit 4 is true. As a result, control word location 15 of the PROM is addressed. This location is empty and causes no operation. This completes the sequence of operations for TAG 3 where the cache is being selected.

The operation of the port control circuits in response to TAG 3 when selecting the SDT is essentially the same as that for selecting the cache store. The only difference is that latch 5626 rather than latch 5638 is set so that the signals +SDT SELECTED and -SDT SELECTED PORT 0 are generated rather than +CACHE SELECTED and -CACHE SELECTED PORT 0. The signal -SDT SELECTED PORT 0 is applied to the port controls 1150 for port 1, 2 and 3 where it passes through an OR corresponding to OR 6022 to set a latch corresponding to latch 6018. This enables ports 1, 2 and 3 to report that their SDTs are temporarily not available if the SCUs connected to these ports should issue TAG 4 to sense status. +SDT SELECTED is applied as the bit 7 addressing input of PROM 5750. Thus, the addressed locations for an SDT select operation are 90, 94 and 95 rather than 10, 14 and 15. The words stored in the two sets of addresses are identical.

When either of the latches 5626 or 5638 is set it remains set until the SCU drops SELECT HOLD. Only one +TD 220 pulse is generated in response to each TAG GATE hence the latches are clocked only once. When +SELECT HOLD on lead 1140 goes false it resets both latches. During the interval that latch 5626 is set its QB output is applied as an input to comparator 5624 thus insuring that latch 5638 cannot be set. In like manner, the QB output of latch 5638 is applied to an input of comparator 5622 to prevent the setting of latch 5626 when latch 5638 is set.

TAG 10

This tag is used in conjunction with BUS OUT bit command modifiers to execute various control commands on the CSU.

After a TAG 3 selection has been performed by a particular interface, TAG 10 will reserve the cache or SDT to that interface if BUS OUT BIT 0 is set. During the reservation the CSU will execute TAG 6 and TAG 10 commands only from the reserving interface. The reservation remains in effect until a RELEASE command is issued by the reserving interface.

After a TAG 3 selection and a reservation has been performed by an interface TAG 10 releases the CSU if BUS OUT BIT 1 is set.

TAG 10 with BUS OUT BIT 6 set causes a control reset in the CSU to reset the Check End Register, CSU unsafes, interface errors and selected alerts. TAG 10 with BUS OUT BIT 7 set clears any unselected alert and all service requests in the CSU.

When TAG 10 is issued by the SCU the Tag Decoder 1106 decodes the tag and applies a signal to the Tag Register 1130. Bus Out Bits 0–7 pass over the Write Data Bus 1106 and are applied to the Address Modifier Register 1122. Assuming for the moment that the cache store has previously been selected, the latch 5638 will still be set and applies a true signal to the data input of latch 5600. When +TAG GATE goes true latch 5600 is set to initiate the delay line 5642 and generate +LOAD TAG REGISTER and its complement. −LOAD TAG REGISTER clears the Jump Address Register 1128 and resets the latch 5716. +LOAD TAG REGISTER gates the output of the tag decoder into the Tag Register 1130 which then produces the signal −TAG 10 on one of the leads 1109. In FIG. 57, −TAG 10 passes through OR 5742 to the bit 6 addressing input of PROM 5750. This selects the control word at address 40 which then generates the signal ENABLE ADDRESS MODIFIER and the jump address 8.

At TD 50 delay line 5642 produces a signal on one of the leads 5646 to gate the modifiers from Write Data Bus 1116 into the Address Modifier Register 1122. At TD 120 the delay line produces another signal which passes through AND 5780, OR 5710 and OR 5712 to generate +LOAD JAR on lead 5700. This gates into the Jump Address Register 1128 the jump address 8 from the PROM.

The signal +ENABLE ADDRESS MODIFIER from the PROM enables the data input of latch 5716 so at the time the Jump Address Register is loaded the latch is set. Its QA output enables ANDs 5718, 5722 and 5728 to pass the address modifier to the Address Generator Circuits 1152.

The output of Address Modifier Register 1122 must pass through encoder 1126 before being applied to the Address Generator Circuits 1152. The encoder 1126 converts a single bit input on one of the leads from the Address Modifier Register into a 3-bit coded output representing the bit position on BUS OUT. For example, if BUS OUT BIT 0 is true then encoder 1126 produces the output 000. On the other hand, if BUS OUT BIT 5 is true the encoder 1126 produces 101 at its output.

Assuming for the moment that the TAG 10 being executed is to reserve cache, BUS OUT BIT 0 is true. Thus, the output of Address Modifier Register 1122 causes the encoder 1126 to produce 000 at its output. As a result, in FIG. 57 the addressing inputs applied to PROM 5750 are −TAG 10 and JUMP ADDRESS 8. This causes the PROM to read out the control word at address 48.

The control word at address 48 generates the signals ENABLE STATUS 2, ENABLE NORMAL END SEQUENCE, ENABLE TAG VALID and CACHE RESERVE as well as JUMP ADDRESS 4.

Figure 62A:
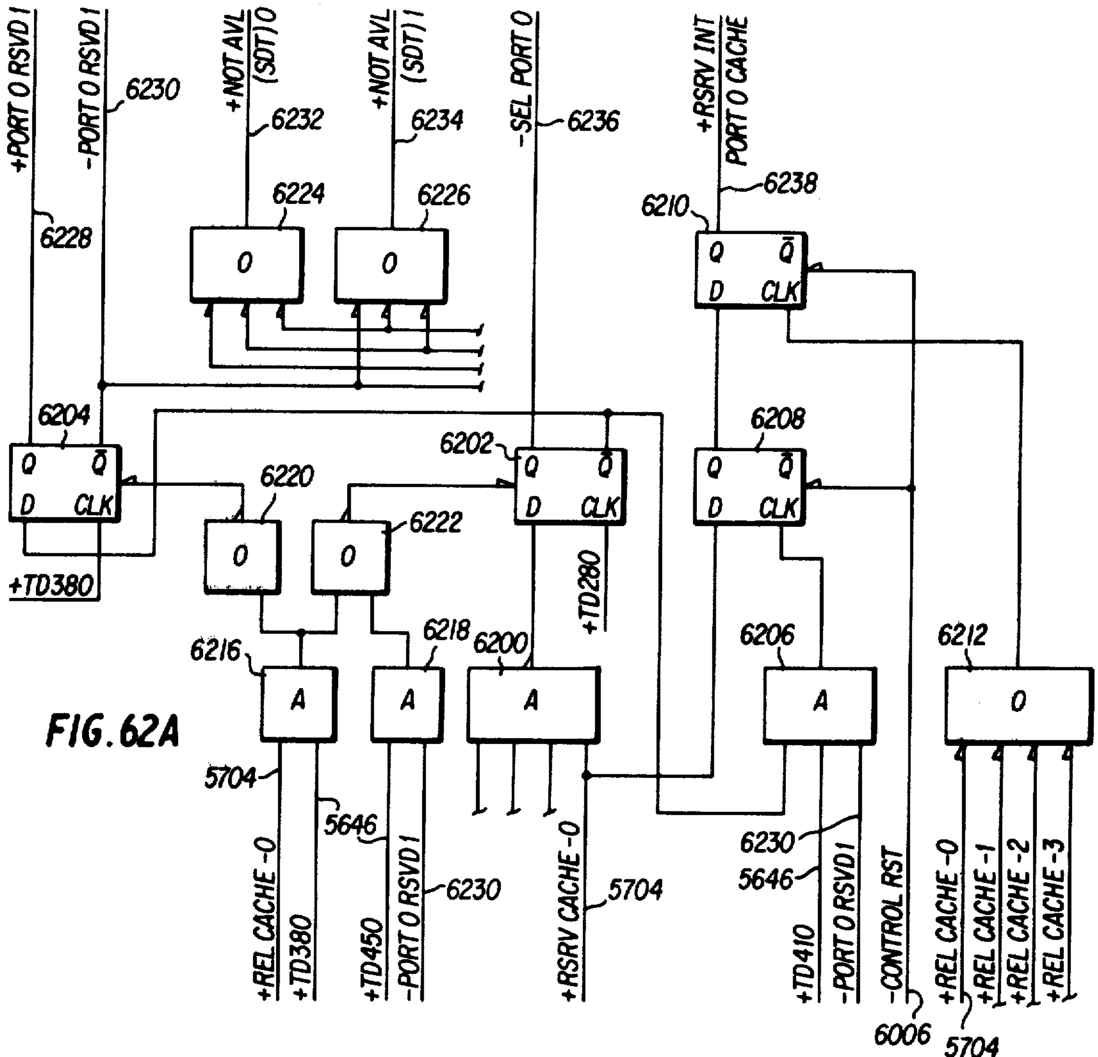
FIGS. 62A, 62B and 63-65 illustrate the logic of the priority circuits for one cache storage unit.
Figure 62B:
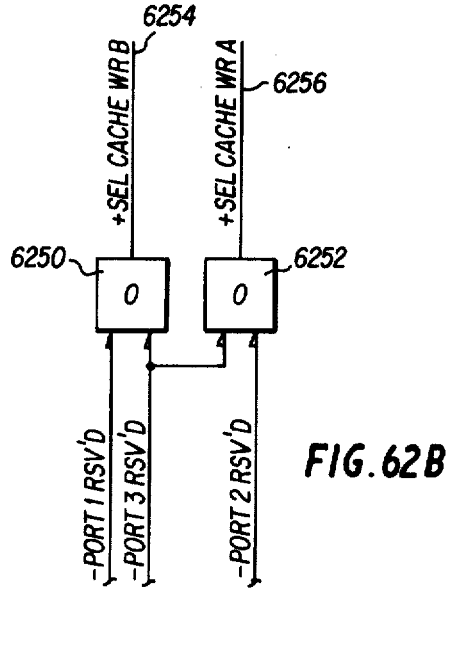

In FIG. 62A, +RESERVE CACHE is applied to an AND 6200 in the cache priority circuits. This AND receives other input signals from latches corresponding to latch 6202 but serving ports 1, 2 and 3. If ports 1, 2 and 3 are not selected +RESERVE CACHE passes through AND 6200 so that the data input of latch 6202 is low. At +TD 280 the delay line 5642 produces an output signal to clock and reset latch 6202. The latch produces the signal −SELECT PORT 0 on lead 6236. This signal is applied to ANDs like the AND 6200 but serving ports 1, 2 and 3.

Figure 63:
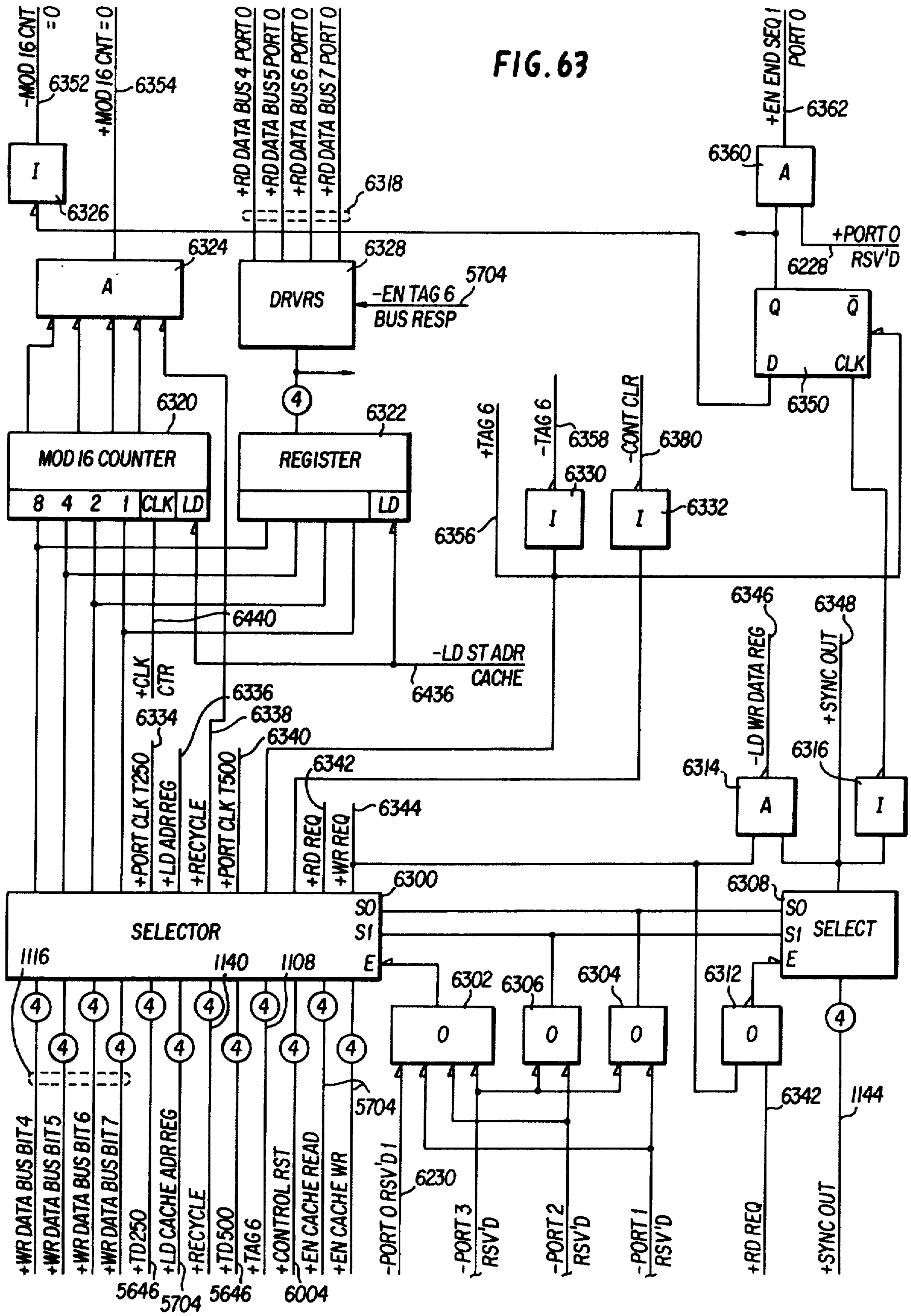

The QB output of latch 6202 is connected to the data input of latch 6204. At +TD 380 the delay line 5642 produces an output signal to clock and set latch 6204 thereby making +PORT 0 RESERVED 1 and −PORT 0 RESERVED 1 true. In FIG. 63, −PORT 0 RESERVED 1 passes through OR 6302 and enables selector 6300 to pass various signals derived from the port 0 controls.

Figure 60:
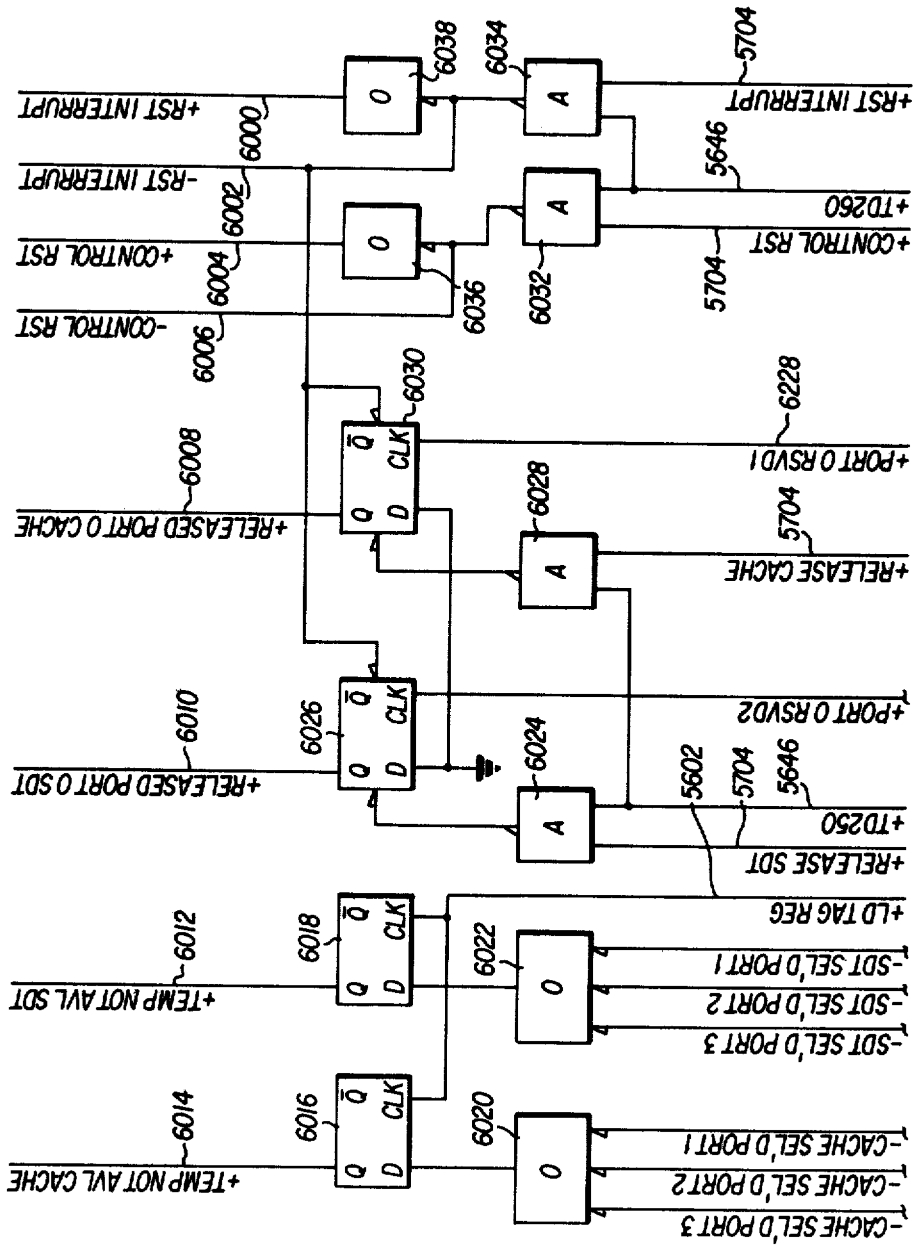

In FIG. 61, +PORT 0 RESERVED 1 enables one input of AND 6138. In FIG. 60, +PORT 0 RESERVED 1 clocks and resets latch 6030.

In the cache priority control circuits, and more particularly in FIG. 63, −PORT 0 RESERVED 1 passes through OR 6302 to enable selector 6300. This selector has twelve sets of input signals, each set including four inputs, one set for each port control. Depending upon which port (0, 1, 2 or 3) is reserved, the selector passes the signals from the corresponding port control circuit. The signals controlled by the selector are TD 250 and TD 500 from the delay line 5642 of each port, TAG 6 from the Tag Register 1130 of each port, ENABLE CACHE READ, ENABLE CACHE WRITE and LOAD CACHE ADDRESS REGISTER from the PROM 5750 of each port, RECYCLE from the SCU as controlled by each port, CONTROL RESET from the port control of each port and Write Data Bus bits 4–7 from each port. All of these signals are not available at the time a port is reserved and may not become available until TAG 6 is executed. Then only some of them will be true depending on the operation being performed.

It might be noted that the SDT priority selector corresponding to selector 6300 receives the signals LOAD SDT ADDRESS REGISTER, ENABLE SDT READ and ENABLE SDT WRITE rather than the corresponding cache control signals.

Figure 58:
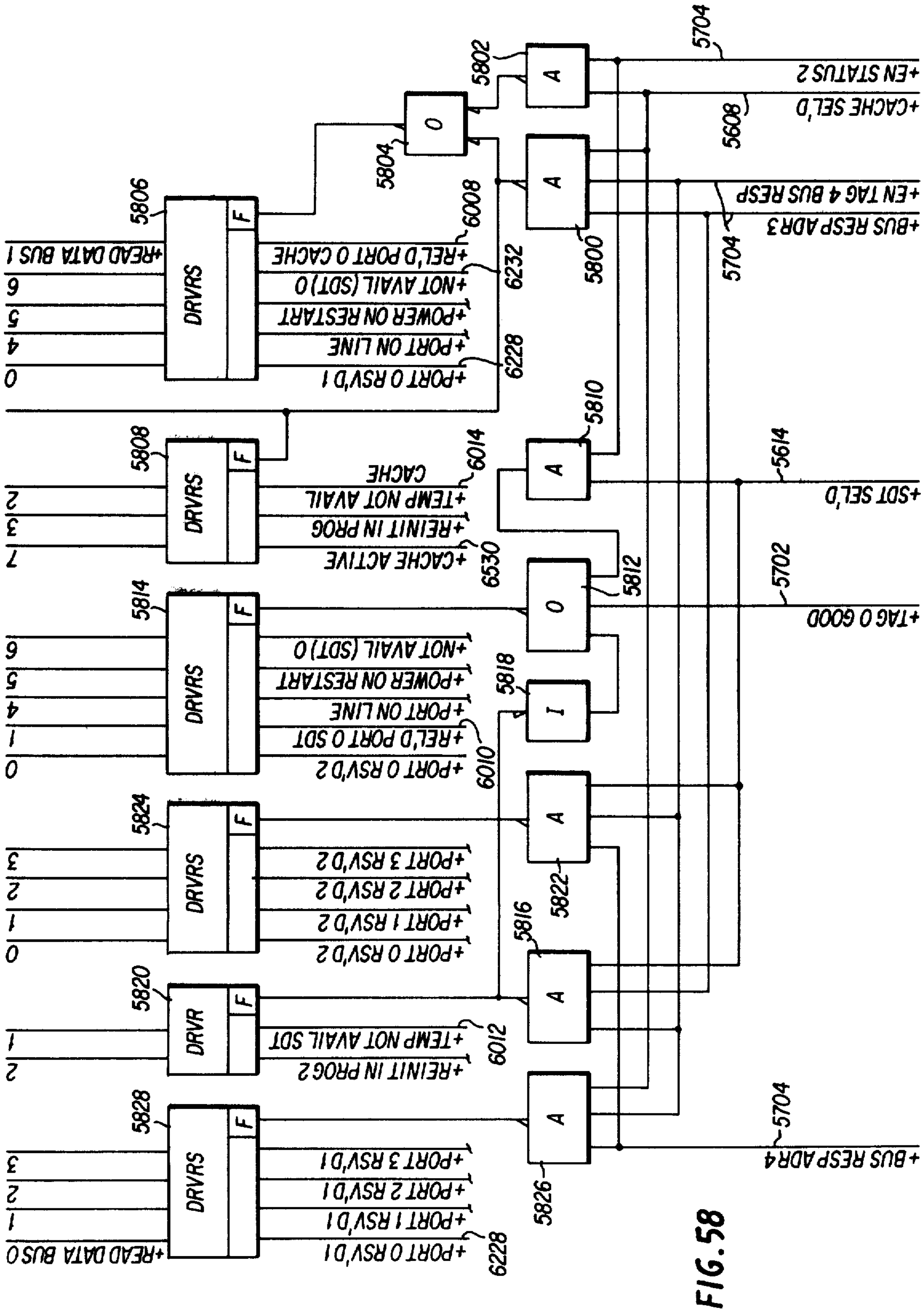

In FIG. 62A, −PORT 0 RESERVED 1 blocks ANDs 6218 and 6206. In addition, this signal is applied to three ORs 6226, one of which is shown in FIG. 62A. The cache priority circuits are provided with four ORs, ORs 6224 and 6226 being two of them. As shown in FIG. 62A, the OR for port 0 receives −PORT (1, 2 or 3) RESERVED 1 from ports 1, 2 and 3, OR 6226 receives −PORT (0, 2 or 3) RESERVED 1 from ports 0, 2 and 3, etc. The ORs 6224 and 6226 produce the signals +NOT AVAILABLE (SDT) 0 and +NOT AVAILABLE (SDT) 1. In FIG. 58, +PORT 0 RESERVED 1 is applied to a driver in each of the sets of drivers 5828 and 5806. +NOT AVAILABLE (SDT) 0 is applied to one input of a driver in each of the sets of drivers 5814 and 5806.

The signal +ENABLE STATUS 2 generated by the control word at the addressed PROM location is applied to AND 5802. Since latch 5638 is set so that +CACHE SELECTED is true on lead 5608, AND 5802 produces an output signal through OR 5804 to gate onto the read data bus (bits 0, 1, and 4-6) signals indicating the status of the CSU.

The ENABLE NORMAL END SEQUENCE and ENABLE TAG VALID signals produced by the PROM are applied to latches 6120 and 6124 in order to generate +NORMAL END and +TAG VALID which are returned to the SCU. These signals are generated when the delay line 5642 produces an output signal to OR 5656 which generates +ENABLE SEQUENCE END to clock the latches. The latches are reset when the SCU drops TAG GATE so that the output of OR 6114 goes false as previously described. In addition, the output of OR 6114 clocks and sets latch 6130 to initiate delay line 6134.

80 ns after the delay line is initiated it produces the signal +TE 80 and in FIG. 57 this signal passes through ORs 5710 and 5712 to again generate LOAD JAR to load the Jump Address Register. This loads into the Jump Address Register the value 4 from the PROM control word. Thus the address applied to PROM 5750 comprises −TAG 10 and JAR 2. This causes selection of the control word at PROM address 44. The word at this address generates no signal hence the cache reservation in response to TAG 10 is completed.

A reservation reserving the SDT is accomplished in much the same manner as the reservation of the cache. Since the SDT has previously been selected by a TAG 3 command the signal +SDT SELECTED on lead 5614 is true. This applies a true input to the bit 7 addressing input of PROM 5750. TAG 10 and +SDT SELECTED thus select address C0 rather than address 40 in the PROM. However, the word stored at address C0 is exactly the same as that stored at address 40 hence the operation of the circuits during this interval is essentially as described above for reserving the cache.

The second word addressed in PROM 5750 is at location C8 rather than location 48. These words differ in that location 48 issues the signal SDT RESERVE rather than the signal CACHE RESERVE. The signal SDT RESERVE is applied to an AND like AND 6200 but located in the SDT priority circuit rather than the cache priority circuit. CHECK END, TAG VALID and STATUS 2 are returned to the SCU in the same manner as described above for reservation of the cache.

When bit 1 of BUS OUT is set to modify a TAG 10 command, it indicates that the SCU wishes to release the SCU or SDT, depending upon which was selected and reserved. Assume first that the cache was selected and reserved. Under these conditions TAG 10 again addresses PROM location 40 and the sequence of operations in response to the first control word is the same as described above for a reservation of the cache store. However, since bit 1 of BUS OUT is set for a release, the second word addressed in the PROM is at location 49. The word stored at location 49 differs form the word stored at location 48 only in that it does not generate CACHE RESERVE but does generate CACHE RELEASE. In FIG. 60, +RELEASE CACHE is applied to AND 6028 which also receives +TD 250 from the delay line 5642. The output of AND 6028 sets latch 6030 which produces +RELEASED PORT 0 CACHE on lead 6008. This signal is applied to one of the drivers 5006 to be included in the status 2 report returned to the SCU.

In FIG. 62A, +RELEASE CACHE is applied to AND 6216 and at +TD 380 an output from delay line 5642 passes through AND 6216 and ORs 6220 and 6222 to reset latch 6204 and set latch 6202. This terminates +PORT 0 RESERVED 1 and −PORT 0 RESERVED 1 as well as −SELECT PORT 0.

When the PROM is addressed for the third time, it addresses a control word having no control signals stored therein. At this time +RELEASE CACHE goes false. In FIG. 62A, +RELEASE CACHE passes through OR 6212 to clock and reset latch 6238. The signal +RESERVE INTERRUPT PORT 0 on lead 6238 enables AND 5932 to request an interrupt the next time the TAG 2 POLL command is issued by an SCU.

A TAG 10 command for releasing the SDT is executed in essentially the same manner as a command for releasing the cache store. The only difference is that the second word retrieved from the control store generates the SDT RELEASE signal rather than the CACHE RELEASE signal. The SDT RELEASE signal is applied to the SDT priority circuits which are essentially identical to the cache store priority circuits illustrated in FIGS. 62-65.

TAG 6.

In order to initiate an extended data transfer the SCU places TAG 6 on control bus 1000, the starting address on Bus Out Bits 9-31 and a modulo-16 count on the Bus Out Bits 4-7. In addition, either Bus Out Bit 0 is set for a write data transfer or Bus Out Bit 1 is set for a read data transfer. The SCU also generates TAG GATE to inform the CSU that this information is on the buses.

Prior to issuing TAG 6, the SCU must have issued a TAG 3 command to select the cache or SDT, and TAG 10 to make the reservation. During the interval between the TAG 3 command and the issuance of TAG 6 the SCU must not drop SELECT HOLD which would otherwise reset the cache selected latch 5638. Therefore, at the time TAG 6 is issued latch 5638, acting through ORs 5632 and 5630, is enabling the data input of latch 5600. When the SCU issues TAG GATE after placing TAG 6 on bus 1000, +TAG GATE sets latch 5600 to initiate delay line 5642 and generate +LOAD TAG REGISTER and −LOAD TAG REGISTER. The signal −LOAD TAG REGISTER clears the Jump Address Register 1128. The signal +LOAD TAG REGISTER on lead 5602 enables TAG 6 to be loaded into Tag Register 1108.

The Tag Register produces the signal −TAG 6 which is applied through ORs 5744 and 5746 to select PROM address 30 or B0 depending upon whether the cache or SDT has been selected. However, both addresses generate the same signals, Jump Address 8 and ENABLE ADDRESS MODIFIER. This causes a checking of the tag sequence as previously noted.

The data on BUS OUT is passed through receivers 1104 to the Write Data Bus 1116 and bits 0 and 1 only entered into Address Modifier Register 1122. The delay line 5642 generates the signal +TD 50 on lead 5616 50 ns after latch 5600 is set. +TD 50 is applied to the Address Modifier Register to load therein bits 0, 1 and 2 from the write data bus.

The delay line 5642 produces the signal +TD 120 on one of the leads 5646, 120 nanoseconds after latch 5600 is set. Assuming no tag sequence errors the signal +TD 120 passes through AND 5780 and ORs 5710 and 5712 to generate +LOAD JAR which loads the Jump Address Register with the jump address 8 from the PROM control word being presently addressed. +ENABLE ADDRESS MODIFIER is being applied to the data input of latch 5716 from the PROM control word. Therefore, this latch is set when +TD 120 goes true. The output of latch 5716 enables one input of ANDs 5718, 5722 and 5728. These ANDs have second inputs connected to the outputs of the encoder 1126. The output of AND 5718 is connected through ORs 5720 and 5740 to the bit 2 addressing input of PROM 5750. The output of AND 5722 is connected through ORs 5724 and 5738 to the bit 1 addressing input while the output of AND 5728 is connected through ORs 5830 and 5732 to the bit 0 addressing input.

At this time the PROM 5750 is receiving an address to select the second control word. The address comprises a combination of TAG 6, Jump Address 8 from the first control word, this value now being stored in the Jump Address Register to generate −JAR 3, the address modifier output from the address encoder Register and +SDT SELECTED if the SDT has in fact been selected. However, address modifier bit 1 may be either false or true depending upon whether a write data transfer or a read data transfer is going to be executed.

Assuming first that an extended write operation is to be performed and the cache has been selected. The encoder 1126 decodes bits 0 and 1 from the Address Modifier Register 1122 and since only bit 0 is true all of the address modifier signals produced by the encoder are false. In FIG. 57, +ADDRESS MODIFIER 0 blocks AND 5728, +ADDRESS MODIFIER 1 blocks AND 5722 and +ADDRESS MODIFIER 2 blocks AND 5718. Thus, the address applied to PROM 5750 is 38 and is determined by −TAG 6 and −JAR 3. The control word at address 38 of the PROM generates the signals ENABLE R/W SEQUENCE, ENABLE TAG VALID, LOAD CACHE ADDRESS REGISTER, ENABLE TAG 6 BUS RESPONSE and ENABLE CACHE WRITE as well as Jump Address C.

Figure 64:
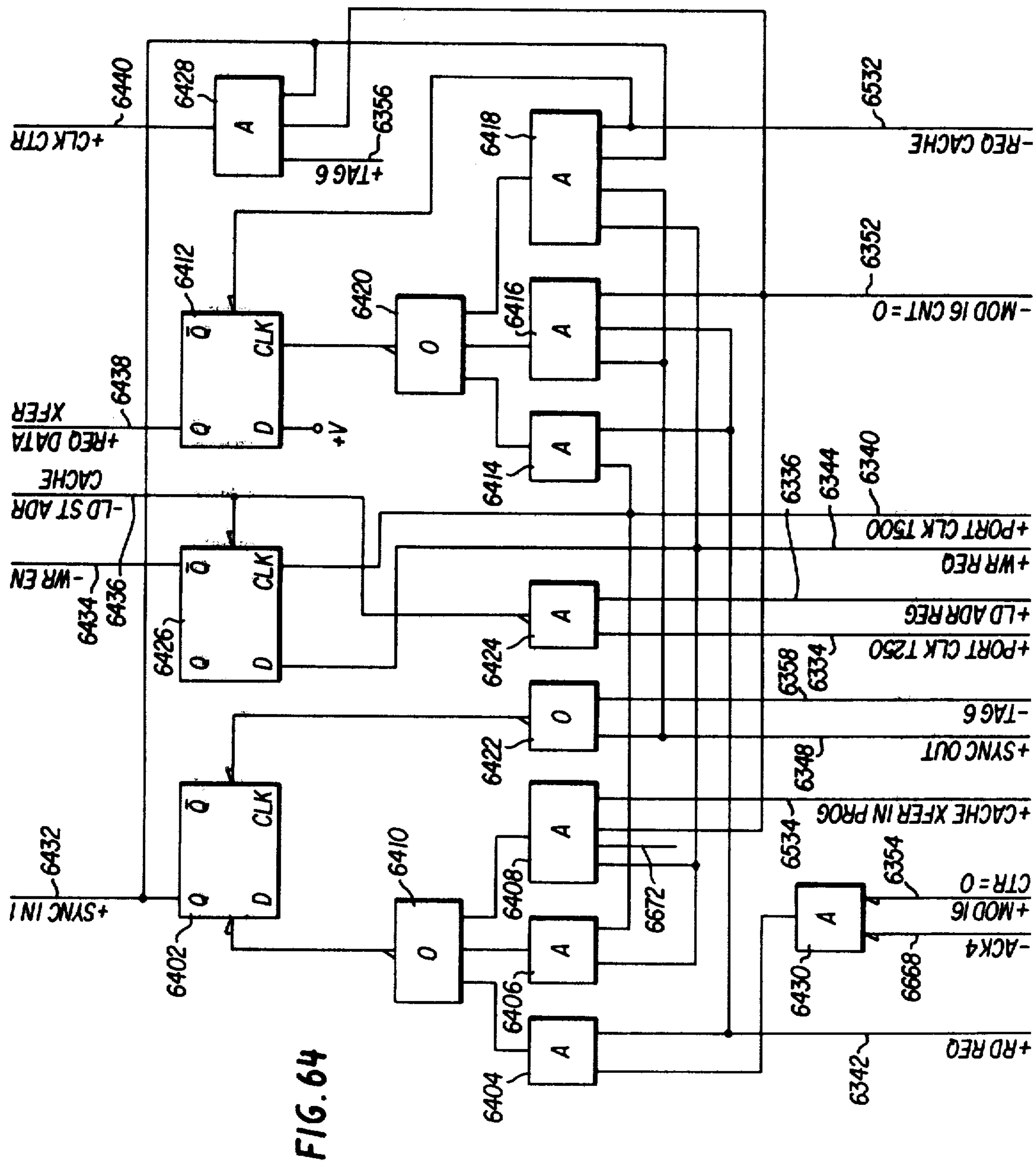

In FIG. 63 +ENABLE CACHE WRITE passes through selector 6300 to generate +WRITE REQUEST. This signal enables AND 6314 and acts through OR 6312 to enable selector 6308, but nothing happens at this time. In FIG. 64, +WRITE REQUEST is applied to ANDs 6406, 6408 and 6418 and the data input of latch 6426.

In FIG. 63, +LOAD CACHE ADDRESS REGISTER is applied to a selector 6300 which is enabled to pass this signal from the PROM in port 0, having been so enabled when port 0 was reserved during execution of the TAG 10 RESERVE command described above. +LOAD CACHE ADDRESS REGISTER passes through selector 6300 to generate +LOAD ADDRESS REGISTER on lead 6336. In FIG. 64 this signal is applied to one input of AND 6424. The delay line 5642 produces the signal +TD 250 at 250 ns after TAG GATE goes true. In FIG. 63 this signal passes through selector 6300 to generate +PORT CLOCK T250. In FIG. 64 +PORT CLOCK T250 passes through AND 6424 to generate −LOAD START ADDRESS--CACHE on lead 6436. This signal is applied to the counter 1308 to load therein the starting address present on Write Data Bus Bits 9–31. When TAG 10 was executed to reserve cache to port 0 the circuit of FIG. 62B made both of the signals +SELECT CACHE WRITE A and +SELECT CACHE WRITE B false. These signal control MUXs 1302 and 1304 to accept information from the port 0 Write Data Bus 1116. MUX 1302 immediately passes any signals on the Write Data Bus to counter 1308. MUX 1304 is still blocked at this time because −WRITE ENABLE on lead 6434 is not yet true.

The modulo-16 count on Bus Out Bits 4–7 passes over the Write Data Bus to selector 6300 and through the selector to a modulo-16 counter 6320 and a register 6322. When the signal −LOAD START ADDRESS-CACHE is generated on lead 6436 it enables the counter 6320 and the register 6322 so that the modulo-16 count is loaded into them. The output of register 6322 is applied to a set of drivers 6328 which is enabled when the PROM produces −ENABLE TAG 6 BUS RESPONSE. The modulo-16 count is thus placed on Read Data Bus Bits 4–7 and returned to the SCU through drivers 1102 and Bus In 1100.

The signal RECYCLE generated by the SCU is applied over one of leads 1140 to selector 6300 and passes through the selector to inhibit AND 6324 until near the end of the extended data transfer. This prevents counter 6320 from generating MODULO 16 COUNT=0 each time it passes through 0 during the extended data transfer.

The signal +ENABLE TAG VALID generated by PROM 5750 is applied to latch 6124. The delay line 5642 produces the signal TD 490 which passes through OR 5656 to become +ENABLE END SEQUENCE on lead 5604. This signal clocks and sets latch 6124 to generate +TAG VALID which is returned to the SCU to inform it that response data on BUS IN is valid. NORMAL END is not returned to the SCU at this time. In response to TAG VALID the SCU again drops TAG GATE.

When the SCU drops TAG GATE, it passes through inverter 6110, AND 6112, OR 6114 and inverter 6132 to clock latch 6130. Since the Check End Latch 6122 is not set, and since PROM 5750 is producing +ENABLE R/W SEQUENCE, the data input of latch 6130 is low so it is reset when it is clocked. This prevents initiation of the delay line 6130.

Ten nanoseconds after TAG VALID is returned to the SCU, delay line 5642 produces the signal +TD 500. This signal is passed through selector 6300 to generate +PORT CLOCK T500 on lead 6340. In FIG. 64, this signal clocks and sets latch 6426 to generate −WRITE ENABLE which is applied over lead 6434 to FIG. 66 where it passes through inverter 6606 and inverter 6634 to generate −ARRAY WRITE on lead 6680. This signal is applied to the cache 1300 to enable it for writing. The output of inverter 6606 is also applied to XOR 6604 having an output connected to latch 6602. However, the latch is not clocked at this time so nothing further happens.

In FIG. 13, −WRITE ENABLE enables MUX 1304 and the data on the WRITE DATA BUS is gated through the MUX to the data register 1318. However, since the data now on the Write Data Bus is address information, the register is not loaded at this time.

When +PORT CLOCK T500 occurs it passes through AND 6406 and OR 6410 to set latch 6402. The output of latch 6402 passes through AND 6428 to generate +CLOCK COUNTER on lead 6440. This signal is applied to the modulo-16 counter 6320 to advance the count therein. The output of latch 6402 is the signal +SYNC IN 1 which is applied over lead 6432, through AND 6138, now enabled because port 1 has been reserved for cache operation, and through OR 6142 to generate +SYNC IN. This signal is applied over lead 6100 through a driver 1105 to request the first data word from the SCU.

The CSU now waits for the SCU to generate SYNC OUT indicating that it has placed the first data word on Bus Out. In FIG. 63, +SYNC OUT passes through selector 6308 to generate +SYNC OUT on lead 6348. The output of selector 6308 also passes through AND 6314 to generate −LOAD WRITE DATA REGISTER, and through inverter 6316 to clock latch 6350, when +SYNC OUT goes false.

−LOAD WRITE DATA REGISTER is applied to the Odd/Even Circuit 1320 and, with the output from the low order of the counter 1308, enables the upper half of the Data Register 1318 to store the first data word from BUS OUT.

The signal +SYNC OUT on lead 6348 is applied to FIG. 64 where it is applied to ANDs 6416 and 6418, AND 6416 being blocked at this time because +READ REQUEST is false. However, AND 6418 is enabled and passes a signal through OR 6420 to drive the clocking input of latch 6412 low. +SYNC OUT is also passed through OR 6422 to reset the Sync In Latch 6402. As this latch is reset it blocks AND 6418 so that a positive-going output from OR 6420 sets latch 6412. The output from latch 6412 is the signal +REQUEST DATA TRANSFER. It is applied to the priority circuits of FIG. 65 where it passes through AND 6510 to set latch 6508.

The QA output of latch 6508 passes through AND 6502 to enable the data input of the Cache Request Latch 6500. The QB output of latch 6508 passes through OR 6516 to initiate a delay line 6518 and enable an AND 6514. The delay line generates output signals on leads 6540, 6542 and 6544 at intervals of 50, 80 and 100 ns, respectively, after it is initiated. +TD50 from the delay line passes through AND 6514 to set latch 6512. This blocks AND 6506 and removes the set signals from latch 6504.

+TD80 from delay line 6518 clocks and sets latch 6500 which produces +REQUEST CACHE and its complement on leads 6536 and 6532. +REQUEST CACHE triggers a single shot multivibrator which generates +CACHE ACTIVE. −REQUEST CACHE sets latch 6520 to generate +CACHE TRANSFER IN PROGRESS. In FIG. 64, −REQUEST CACHE blocks AND 6418 and resets latch 6412. +CACHE TRANSFER IN PROGRESS passes through AND 6408 and OR 6410 to set latch 6402 thereby generating +SYNC IN to request another data word from the SCU.

Figure 66A:
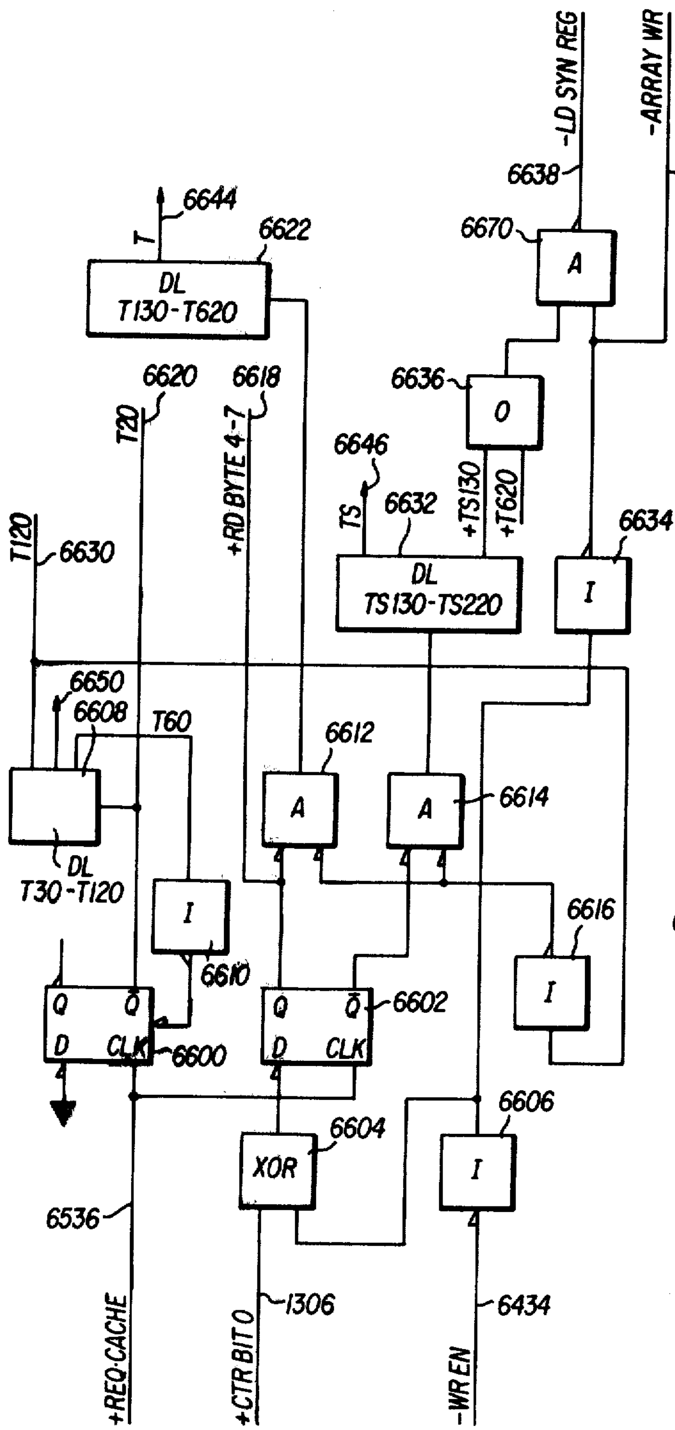
FIGS. 66A and 66B illustrate the logic for sequencing a cache store.

Meanwhile, in FIG. 66A, +REQUEST CACHE clocks latches 6600 and 6602 in the cache address control circuits. Latch 6600 is immediately set. Latch 6602 on the other hand, is set on alternate data word transfers as determined by the output of XOR 6604. On write transfers XOR 6604 enables latch 6602 to be set on alternate word transfers when the count in the Cache Address Counter 1308 is even and on read transfers XOR 6604 enables latch 6602 to be set on alternate word transfers when the count in the cache address counter 1308 is odd. This is done because on a write transfer the cache needs to be cycled as every other word is transferred because two words are written into cache each time it is cycled, and because on each read from cache two words are read out and latch 6602 determines which is selected for passage through selector 6618.

Figure 65:
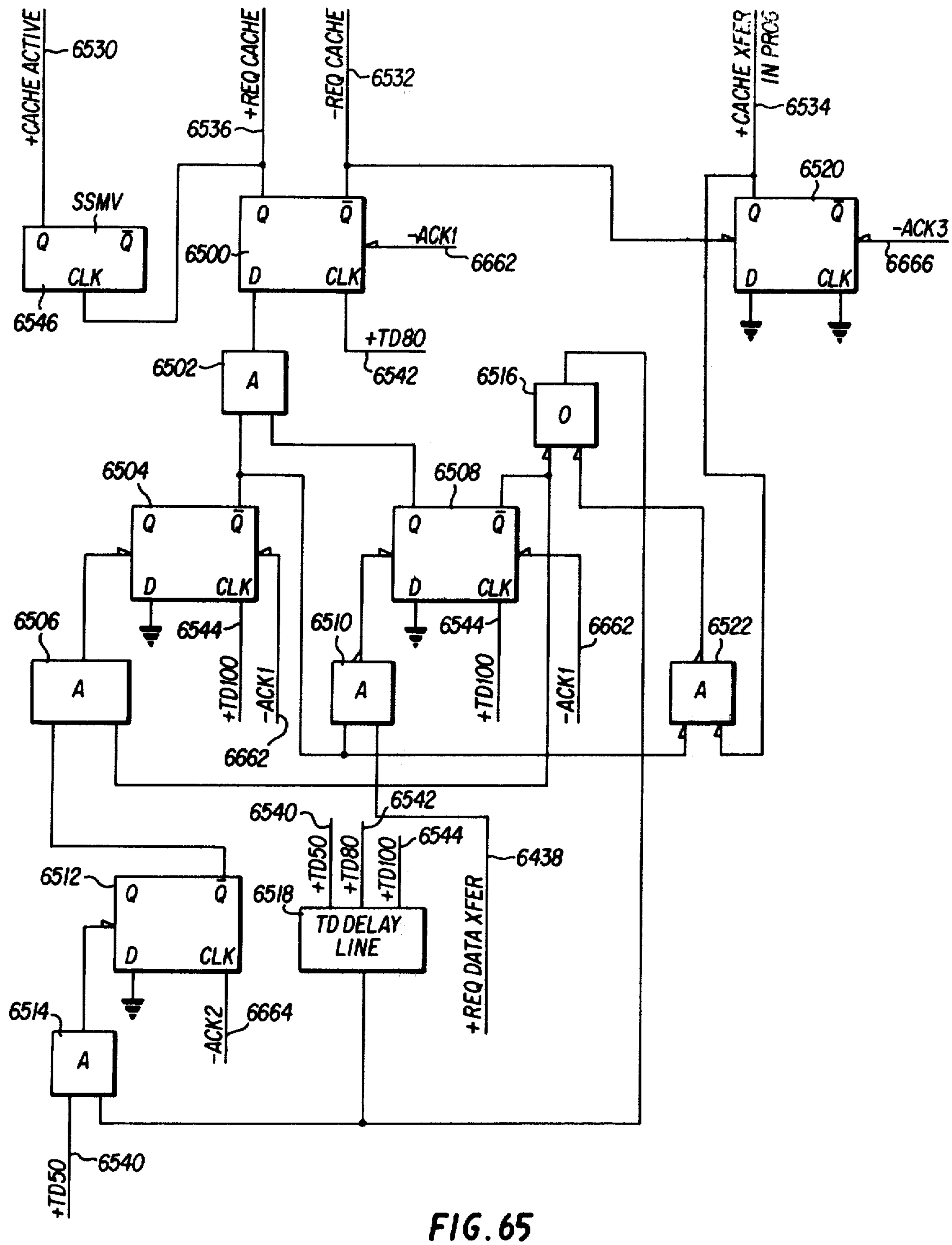

When latch 6600 is set, its QB output initiates delay line 6608 which successively produces pulses +T30, +T60 and +T120. +T30 passes through inverter 6660 (FIG. 66B) to generate −ACK 1. In FIG. 65, −ACK 1 resets latches 6500, 6504 and 6508.

+T60 passes through inverter 6610 to reset latch 6600. +T120 passes through inverter 6616 to enable ANDs 6612 and 6614. At this point, the operation depends upon whether latch 6602 is in the set or reset state.

If latch 6602 is reset, as it should be for the first and alternate transfers, +T120 passes through AND 6614 to initiate a delay line 6632 which produces the signals +TS130 and +TS220. +TS130 passes through OR 6636 but is blocked at AND 6670 because +WRITE ENABLE is true. If this were a read data transfer, +TS130 would pass through AND 6670 to generate a signal on lead 6638 to load two words into the syndrome circuits 1324. +T120 also increments counter 1308.

Figure 66B:
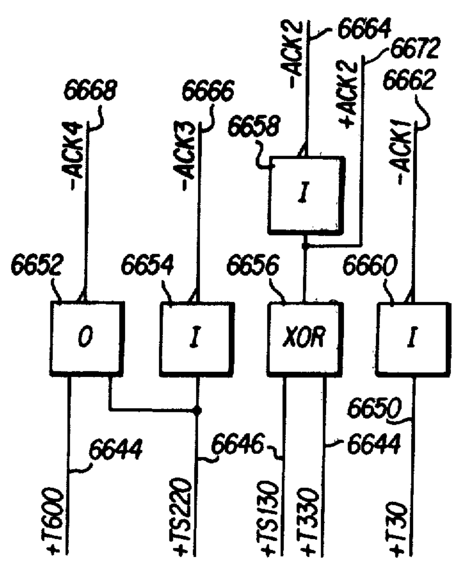

+TS130 is also applied to FIG. 66B where it passes through XOR 6656 and inverter 6658 to generate −ACK2. In FIG. 65 this signal is applied to the clock input of latch 6512 but does nothing until it goes false at approximately TS190. At this time it resets latch 6512. In FIG. 64, +ACK2 passes through AND 6408 and OR 6410 to set the Sync In Latch 6402 to request another word from the SCU.

+TS220 is applied to FIG. 66B where it passes through inverter 6654 and OR 6652 to generate −ACK3 and −ACK4. The signal −ACK3 is applied to latch 6520 to reset the latch and terminate +CACHE TRANSFER IN PROGRESS. In FIG. 64, +CACHE TRANSFER IN PROGRESS blocks AND 6408. The signal −ACK4 is applied to AND 6430 and if a read operation were being performed the signal would act through AND 6430, AND 6404 and OR 6410 to set latch 6402 thereby indicating to the SCU that a word is now present on BUS IN.

If latch 6602 is reset, the operations described above take place but the memory is not cycled because for a write operation only one word is in the data register 1318. The second write data transfer cause the circuits of FIGS. 64, 65 and 66 to go through a similar cycle up to the point where +REQUEST CACHE is generated. This time the output of XOR 6604 causes latch 6602 to be set thereby enabling AND 6612. The output of the AND initiates a memory cycle to write the contents of data register 1318 into the memory, and also initiates a delay line 6622. The delay line produces the signals for controlling the memory, and also generates +T330, +T600 and +T620. +T330 is applied to XOR 6656 (FIG. **66*b*) to generate +ACK2 and −ACK2 which perform the same functions as before. In FIG. 66B, +T600 causes OR 6652 to produce −ACK4 for setting the Sync In Latch 6402** during a read transfer.

−ACK3 is not generated on alternate word transfers so the latch 6520 remains set thereby enabling +ACK2 on lead 6672 to pass through AND 6408 to set latch 6402 and generate +SYNC IN during a write transfer.

When exactly seven words remain to be transferred, the SCU drops +RECYCLE. In FIG. 63, +RECYCLE from selector 6300 enables AND 6324. When the last word is transferred counter 6320 should be at zero so that its outputs enable AND 6324. The AND generates +MODULO 16 COUNT=0 and, through inverter 6326, −MODULO 16 COUNT=0. In FIG. 64, +MODULO 16 COUNT=0 blocks AND 6430 to prevent further SYNC IN signals from being generated by latch 6402 to request more transfer words. In FIG. 64, −MODULO 16 COUNT=0 blocks ANDs 6408, 6416 and 6428. By blocking AND 6428, the counter 6320 can no longer be incremented.

In FIG.63, +MODULO 16 COUNT=0 is applied to the data input of latch 6350. This latch has been clocked each time the SCU generated a SYNC OUT to indicate that another transfer was ready, but each time the latch has been reset because the output of AND 6324 was false. Now, at the end of the data transfer the output of AND 6324 enables latch 6350 to be set. It produces an output signal to four ANDs, one for each port. The AND for port 0 is shown in FIG. 63 as AND 6360. It is enabled by +PORT 0 RESERVED on lead 6228 so when latch 6350 is set it produces the signal +ENABLE END SEQUENCE PORT 0 on lead 6362.

In FIG. 56, the signal on lead 6362 passes through AND 5660, OR 5662, delay 5664 and OR 5656 to generate +ENABLE END SEQUENCE. In FIG. 61, +ENABLE END SEQUENCE clocks latches 6120 and 6122. Also in FIG. 56, the signal on lead 6362 passes through OR 5650 to AND 5652. If the error circuits (not shown) have detected an error condition, +END CHECK ERROR, passes through inverter 5654 to block AND 5652. The false output of AND 5652 is the signal +ENABLE CHECK END on lead 5618.

Throughout the write operation, the word at address 38 of PROM 5750 has been accessed to control the operation. This word included the Jump Address D. When +ENABLE END SEQUENCE 1 PORT 0 is generated by AND 6360, it passes through AND 5706, OR 5710 and OR 5712 to produce +LOAD JAR. This loads the value D into the Jump Address Register 1128. At this point the next step depends upon whether or not an error occurred to generate +ENABLE CHECK END.

Assuming no error, +ENABLE CHECK END is false and passes through OR 5726, OR 5724 and OR 5738 to the bit 1 addressing input of PROM 5750. TAG 6 is still true and enables the bit 5 and 4 addressing inputs. Jump address D enables addressing inputs 0, 2 and 3. Thus, the word at address 3F is read from the PROM. This word generates jump address E and the signals ENABLE R/W SEQUENCE and ENABLE NORMAL CHECK END.

In FIG. 61, +ENABLE NORMAL CHECK END enables latch 6120 which is then set when clocked by +ENABLE END SEQUENCE on lead 5604 to generate NORMAL END which is sent to the SCU. The SCU should respond by generating +RESPONSE OUT. In FIG. 61, ENABLE R/W SEQUENCE enables AND 6116 so when +RESPONSE OUT occurs it passes through AND 6116 and OR 6114 to reset latch 6120 and terminate NORMAL END.

If an error is detected during the data transfer +ENABLE CHECK END on lead 5618 is true so that PROM address 3D rather than 3F is selected. The word at address 3D generates ENABLE R/W SEQUENCE, ENABLE CHECK END SEQUENCE and Jump Address E. +ENABLE CHECK END SEQUENCE cause latch 6122 to be set by +ENABLE END SEQUENCE to generate +CHECK END which is sent to the SCU. The SCU then generates +RESPONSE to reset latch 6122 through AND 6116 and OR 6114.

Regardless of whether a CHECK END or NORMAL END occurs, the Jump Address E is loaded into the Jump Address Register and the output of the register, together with −TAG 6, addresses PROM location 3E. This location is empty so the operation is complete.

The read data transfer involving cache 1300 is executed in essentially the same manner as a write operation. However, at the point where the PROM is addressed to read out the second control word, address 39 rather than 38 is read out because Write Data Bus bit 1 rather than bit 0 is set. The word at location 39 generates the same signals as the word at location 38 except that ENABLE CACHE READ is generated rather than ENABLE CACHE WRITE. In FIG. 63, +ENABLE CACHE READ passes through selector 6300 to generate +READ REQUEST. In FIG. 64, this signal enables ANDs 6404, 6414 and 6416. In FIG. 63, it passes through OR 6312 to enable selector 6308. Latch 6426 is not set so that the memory reads out rather than writing. In FIG. 66A, during the intervals latch 6602 is reset, it produces +RD BYTE 4–7 to select bytes 4–7 for readout through selector 1325.

If the SDT has been selected, then TAG 6 causes a read or a write operation in much the same manner as a cache read or write. Because the SDT is selected, the signal +SDT SELECTED causes a different set of addresses in the PROM 5750 to be selected in sequence. An SDT read selects addresses B0, B9, BD or BF depending upon whether a normal end or check end occurs, and then BE. Addresses BO, BD, BF and BE generate exactly the same control signals as addresses 30, 3D, 3F and 3E. Address B9 generates many of the same signals as address 39 but generates LOAD SDT ADDRESS REGISTER rather than LOAD CACHE ADDRESS REGISTER, ENABLE SDT READ rather than ENABLE CACHE READ and ENABLE TAG 6 BUS RESPONSE (SDT) rather than ENABLE TAG 6 BUS RESPONSE-CACHE. ENABLE TAG 6 BUS RESPONSE (SDT) is applied to a set of drivers like drivers 6328 but located in the SDT priority circuits 1230. LOAD SDT ADDRESS REGISTER and ENABLE SDT READ are applied to a selector like selector 6300 in the SDT priority circuits.

For an SDT write operation the PROM addresses selected are the same as for an SDT read except that the second PROM address selected is B8 rather than B9. The signals stored at these two addresses are the same except that B8 generates +ENABLE SDT WRITE rather than +ENABLE SDT READ. +ENABLE SDT WRITE is applied to a selector like selector 6300 but located in the SDT priority circuits.

Since the SDT read and write operations are so similar to the cache read and write operations, they will not be described in detail. However, it should be remembered that a distinction does exist between cache and SDT operations because SDT operations read or write only one word at a time into the cache 1200 as opposed to the cache 1300 which reads or writes two words at a time.

CACHE COMMAND FORMAT

Cache commands are the normal mode of controlling host to SCU operations. The SCU receives cache commands from a host via the channel in the form of function words. All cache commands require four function words although some commands do not have significant information in all four words. The formats for the four external function (EF) words of a cache command are illustrated in FIGS. 15A-15D.

Bits 35 and 34 differentiate between the four formats of function words. These bits must be 10 for EF 1, 00 for EF 2, 01 for EF 3 and 11 for EF 4.

Bits 28-24 of EF 1 define a device address. The hexadecimal values 0-F identify one of 16 possible disc drives. Hexadecimal addresses 10-1E identify addressable memory units while address 1F specifies the address of the SDT.

Bits 23-18 of EF 1 are the command field and specify the type of operation to be performed. There are 19 different types of control, read, write or sense commands. An explanation of all of the commands is not necessary to an understanding of the present invention.

Bits 15-0 of EF 1 define the number of 36-bit words to be transferred during a read or a write command.

Bits 31-0 of EF 2 define a 32-bit relative word address. This address denotes the disc relative (36 bits) word address where a transfer is to begin.

EF 3 contains a 30-bit file number. The file number is assigned by software to identy files in cache.

Bits 21-18 of EF 4 define a subcommand which is utilized in conjunction with the command specified by EF 1. If the command in EF 1 is a reset command, the various values of the subcommand define the following operations.

| | |
|---|---|
| 0000 | Reset Internal Cache Down (ICD). Resets the ICD indicator and allows caching operations to commence. |
| 0001 | Set ICD. The SCU sets the ICD indicator and halts all caching operations. The SDT and cache can only be referenced as required by the Drain, Reset and Initialize commands. |
| 0010 | Reset Inhibit Trickle. Resets the inhibit trickle indicator and allows trickling (destaging from cache to disk of "written to" segments) to be initialized. |
| 0011 | Set Inhibit Trickle. Sets the inhibit trickle indicator to prevent trickling. |
| 0100 | Reset Segment. Resets the SDT entry associated with the segment which is identified by the device number and relative word address in the EF. The SDT control bits are all set to "0", the segment descriptor relative address is set to all "1's", and the SDT entry is moved to LRU in the SDT age link chain. |

If the command specified in EF 1 is a read or a write tables command, the subcommand field of EF 4 is defined as follows.

| | |
|---|---|
| 0000 | Command Queue |
| 0001 | Roll Table |
| 0010 | Global Variables |
| 0011 | Pointer Table |
| 0100 | SDT |

If the command in EF 1 is a test and delete command, the subcommand of EF 4 is defined as follows:

| | |
|---|---|
| 0000 | Delete One |
| 0001 | Delete All |

Bits 14-12 of EF 4 define the priority of a command. The priority denotes the sequence of execution of the command with reference to other commands issued to the same device. The priority of execution is highest (000) to lowest (111). Within each priority class, the commands are executed on a first-in, first-out basis.

Bits 5 and 4 of EF 4 are mode bits which define the type of operation to be performed if the command in EF 1 is a read or write operation not involving a table read or write. If the mode bits are 00 then the read or write command is executed as a normal read or write. If the mode bits are 01 then the read or write command is treated as a dispersed read or write. If the mode bits are 10 then the read or write command is executed as a store through command.

Bits 2-0 of EF 4 define a request number. This is a software identification number to distinguish between different requests.

CACHE COMMAND FUNCTIONS

WRITE commands are used to store record data either in SDT RAM or on the disk storage media. The WRITE TABLES command transfers data into SDT RAM and the WRITE and AQUIRE WRITE commands transfer data to the disk. The segments for the writes to disk are usually written to cache. The actual WRITE TO DISK usually occurs because of the automatic aging process called trickling which returns the least recently used segments to disk in order to make room for segments which are more likely to be used.

If all of the segments are in cache for the WRITE command, the segments are transferred from the host to cache and normal status (CHANNEL END, DEVICE END) is presented to the host. If any segment is not in cache, the SCU generates a seek which is stored in the command queue. CHANNEL END, STATUS MODIFIER STATUS (along with STATUS ACTION CODE 10) is presented to the host to indicate the segment was not in cache and the host should wait for DEVICE END STATUS. When the seek has been completed, DEVICE END STATUS along with STATUS ACTION CODE 11 is presented to the host to indicate the host should reissue the command.

The WRITE command has the hexadecimal value 29 in the command field of EF 1. The mode field of EF 4 determines whether the WRITE command is either store-through, dispersed or normal. The store-through mode implies that data is so important that it must be updated immediately in cache and on disk. The dispersed mode indicates cache is to be bypassed (unless the segment already exists in cache) and the data is to be written directly to disk. The normal write mode indicates the segment is to be written to cache and is to be "aged" out to disk. If the data transfer is for a full segment or segments (1792 words), the mode is changed to aquire write by the SCU. If not enough empty cache segments are available or if the number of segments to be transferred exceeds two parameters designated bypass 1 and bypass 2, the mode is changed to a dispersed write.

The ACQUIRE WRITE command (2A) indicates that this is an initial write to this data space on the disk. Therefore, a pre-write read is not required from disk if the segments are not in cache. Any available cache segments are used and the data is transferred from the host to cache.

The WRITE TABLES command (3F) transfers data from the host to random access storage (RAM) associated with the SDT Store 1200. The subcommand field in EF 4 specifies the data to be written. The relative word address field specifies the relative entry within a table. Both the relative word address and the word transfer length are expressed in 32-bit words. The definition of the subcommand codes is given above in the section entitled "Cache Command Format."

READ commands are used to transfer data either from the SDT RAM or the disk storage media to the host. The READ TABLES command transfers data from the SDT RAM and the READ command tranfers data from the disk.

If the data for the READ (from disk) command is in cache, it is transferred from cache to the channel. If the data is not in cache, the SCU generates a seek which is stored in a command queue. CHANNEL END, STATUS MODIFIER STATUS along with STATUS ACTION CODE 10 is sent to the host indicating that data is not in cache and the host should wait for DEVICE END STATUS. When the seek has been completed, DEVICE END STATUS is sent to the host with STATUS ACTION CODE 11 which indicates to the host that it should reissue the command. CHANNEL END, DEVICE END is presented at the end of the transfer.

If EF 1 contains the value 28 it identifies a READ command. The mode bits in EF 4 initially determine the type of read, that is, whether it is dispersed or normal. The dispersed read mode indicates the cache is to be bypassed (unless the data already exists in cache), and the data is to be read directly from the disk. The normal read mode indicates that the data is to be transferred from cache if the data already resides in cache, otherwise go to the disk to obtain the data. If not enough empty cache segments are available or if the number of segments to be transferred exceeds the bypass 1 parameter, the mode is changed to a dispersed read.

The READ TABLES command (1C) is essentially the same as the WRITE TABLES COMMAND except that the direction of data transfer is from the RAM to the HOST.

Prior to execution of a READ or WRITE command involving cache, an INITIALIZE command (31) must be provided by a host. The purpose of the INITIALIZE command is to establish the subsystem configuration. After the initial memory load from the floppy disk, each SCU will have its Internal Cache Down (ICD) indicator set and will not perform caching before an INITIALIZE command is received.

When operating in the shared mode (two SCUs sharing the same cache and disk drives), the complete set of initialize parameters need only be sent to one of the SCUs. The alternate SCU needs only to receive the HOST ID, the SDT address, the ICD and the S/P (shared/partitioned) indicators. When operating in the partitioned mode (each SCU has a private cache), the complete set of initialize parameters are sent to each SCU. The SCU that receives a complete set of parameters (indicated by the HOST ID bit=0), will initialize all of the global data objects such as the SDT, Pointer Table, Command Queues, Roll Tables and Variables. Each host must send its HOST ID to each path of each SCU to establish path identification for all I/O paths.

The INITIALIZE command requires one data word. Bits 35-32 are the HOST ID which is stored for the channel interface on which it is received. It is used by the SCU to direct secondary status for SEEK COMPLETE, DEVICE END reporting to the originating host.

Bits 26 and 27 identify the cabinet address for the SDT storage. Bit 23 is the HOST ID ONLY bit and, when set, it indicates that the INITIALIZE command does not have a complete set of parameters. The only valid parameters are HOST ID, SDT address, ICD and S/P. When the HOST ID ONLY bit is reset all parameters are valid.

Bit 21 is the Internal Cache Down (ICD) indicator. When set, the SCU prohibits all cache/SDT references except those which are required by the DRAIN, RESET and INITIALIZE commands. Trickling is also prohibited. The DRAIN, RESET and INITIALIZE commands are accepted by the SCU as well as all the "disk only" commands requiring one- and two-word EFs. In addition, four word cache EFs for NORMAL WRITE, AQUIRE WRITE, DISPERSED WRITE, STORE THROUGH WRITE, NORMAL READ and DISPERSED READ are converted to two-word disk EFs. The request number in the status word for these commands is set to zero by the SCU. All other cache commands are rejected with a unit check status and command reject in the sense bytes. Bit 20 is set when the subsystem is shared which means that plural SCUs share the same cache and disk drives. When the bit is reset the subsystem is partitioned which means both SCUs operate independently with privately used caches. Bits 4-19 are cache up/down indicator bits with each bit representing one quadrant of cache storage starting with quadrant 0 of cabinet 0 (bit 19) to quadrant 3 of cabinet 3 (bit 4). The address associated with bit 4 (device address 1F) is reserved to address the SDT and cannot be used to directly address the cache quadrant.

The PARAMETERIZE command (2F) contains subsystem variables which are related to performance. For a partitioned mode of operation this command must be sent to each SCU. For a shared mode of operation, the command may be sent to any SCU. That SCU then adjusts the global variables which are shared by all SCUs. Two data words are required with the PARAMETERIZE command. Bits 20-35 of the first word comprise a field representing the maximum number of SDT entries which should be searched for trickle. Bits 4-18 of the first data word comprise a field representing the number of locations to move the address of speculative roll-ins (ASRI) in the SDT age link chain. Bit 19 is a direction bit. If it is zero then ASRI is moved toward the most recently used (MRU) address. If bit 19=1, the ASRI is moved toward the least recently used (LRU).

Bits 35-32 of the second data word comprise a field indicating the total number of segments, including speculative segments, that should be rolled in to cache for each normal read or write command.

Bits 29-24 define BYPASS 1. If the number of segments specified in a normal read, normal write or store through command exceeds the value of BYPASS 1, the cache is bypassed and the command is converted to a dispersed read or write.

Bits 23–8 of the second data word specify the number of SDT entries to examine before deciding that there are not enough empty cache segments to handle a data transfer.

Bits 0–5 define BYPASS 2. If the number of segments specified in an ACQUIRE WRITE command exceeds the value of BYPASS 2, the cache is bypassed. This also applies to normal write commands that are converted to aquire writes.

STATUS WORD FORMAT

An SCU may transmit to a host a 36-bit status word having the format shown in FIG. 18A. Bits 35–32 of the word are always zero and thus are not shown.

Bit 31 is a Channel Truncation bit which is set to indicate truncation of data transfer when the channel fails to respond to an input or output data request within two milliseconds. Channel truncation may represent an abnormal condition as a result of a programming error or a hardware malfunction. However, the channel truncation can be an expected condition for certain command usages or when a forced EF is used to terminate data transfer.

Bits 30–26 comprise the Status Action field. This field provides a 5-bit nonzero value which is utilized by the host as an index into a status action branch table in order to directly determine what to do next. The status actions are defined later.

Bits 23–18 of the status word are zero if the unit check status bit (9) is zero. Otherwise, this field provides a 6-bit value to be used by the host as an index into a recovery action branch table.

Bit 15 is the Attention bit and is usually presented alone in the device status field to indicate an attention condition on the current device. Such status may be presented in an unsolicited status word or in a secondary status word in lieu of device end.

Bit 14 is the Status Modifier (SM) bit which may be set in conjunction with busy and with control unit end to indicate that the SCU has terminated the current command prior to execution because an EF-EI collision has occurred on this command. An EF-EI collision occurs when an EF is detected by the SCU microprogram in the instruction cycle immediately following deactivation of the EI control signal on the same SCU channel interface. The SCU rejects the external function by presenting a status word containing status modifier with busy and with control unit end. The status modifier bit may also be set in conjunction with channel end to indicate that the required data is not in cache and that a secondary status word will be presented later for the same device and request number.

Bit 13 is the Control Unit End bit and is set only in conjunction with the Status Modifier and Busy bits to indicate that the SCU has terminated the current command prior to execution because of an EF-EI collision.

Bit 12 is the Busy bit and is set in conjunction with Attention to indicate that the SCU has terminated the current command prior to execution because of an attention condition at the same device as specified in the command. The Busy bit may also be set in conjunction with the Status Modifier bit and with the Control Unit End bit to indicate that the SCU has terminated the current command prior to execution because of an EF-EI collision.

Bit 11 is the Channel End (CE) bit and may be presented alone in the device status field to indicate that the operation initiated by the current command is being processed at the device independent of the SCU, and that a secondary status word will be presented later for the same device. The Channel End bit may also be presented in conjunction with device end and indicates normal completion of a command for which channel end alone has not been previously presented. The Channel End bit may also be presented in conjunction with the Status Modifier bit to indicate that the required data is not in the cache store. A secondary status word is presented later for the same device and request number.

Bit 10 is the Device End (DE) bit and may be presented alone in the device status field of a secondary status word to indicate normal completion of an operation for which channel end alone has previously been presented. The Device End bit may also be presented alone to indicate that the SCU is ready to receive the same command that was previously terminated due to the fact that the required data was not in the cache. Device End may also be presented in conjunction with channel end to indicate normal completion of a command for which channel end alone had been previously presented.

Bit 9 is the unit check bit and is presented alone in the device status field to indicate that an unusual or error condition has occurred on either the current command or the prior command.

Bits 7–5 define the request number which is a software identification number to distinguish between different requests associated with cache commands only. The request number is zero for cache control commands and is one through seven for cache read/write commands.

Bits 4–0 define the device address of the device for which the current status is being presented.

Only certain status actions are necessary for an understanding of the present invention. Status Action 3 (HEX) is presented only in conjunction with status modifier, control unit end, and busy in the device status field, and indicates that the SCU has terminated the current command prior to execution because of an EF-EI collision. It in effect tells the host to restart the current command for the current device.

Status Action 4 tells the host to start the next command for any other available device. This action is presented only for control commands in conjunction with channel end alone and the device status field and indicates that the operation initiated by the current command is being processed at the device (independent of the SCU) and that a secondary status word will be presented later for the same device.

Status Action 5 tells the host to start the next command for the current device. This value is presented only for control commands in conjunction with device end alone, or with channel end and device end in the device status field and usually means that device positioning has been completed.

Status Action 6 tells the host to start the next command for any available device. This action value is presented in conjunction with channel end and device end in the device status field and indicates normal command completion with channel truncation.

Status Action 10 tells the host to await device end. This action value is presented only in conjunction with status modifier and channel end in the device status field and indicates that the required data is not in the cache store and the SCU must read the data from disk. Upon receipt of device end and status action value 11 the host must reissue the external function command.

Status Action value 11 tells the host that device end has been received from the disk and the host should reissue the current command. This value is presented only after status action value 10 and indicates that the SCU is ready to execute the command. The original command is reissued by the host to complete the transfer of data.

COMMAND QUEUES

There is one command queue per disk drive and each command queue holds up to seven commands. If an attempt is made to load an eighth command into the queue it causes a unit check and command reject to the host. Each queue has a two-word header which contains information pertinent to the operation of the entire queue such as, number of commands in the queue and the active command request number. Each command queue entry contains information pertinent to the execution of that command such as HOST ID and request number. The command queue is stored in the SDT RAM and is fetched into the Staging Buffer 800 for use.

The format of the command queue header is illustrated in FIG. 19A. Word one includes a device busy bit (bit 0) indicating the device is busy either seeking or transferring data for a command in the queue. Bits 4–7 indicate the number of commands presently in the queue. Bits 11–15 define a device number which identifies the device associated with the queue. The next sequence number field (bits 24–31) contains the sequence number that is inserted in the next command queue entry. The number starts at 0, is incremented until it reaches 255, and then wraps back to 0.

The active command request number (bits 0–15 of word 2) is the request number of the command currently being executed. The seek in progress request number (bits 17–31 of word 2) is used in association with an invalid entry (IV) bit in position 16. When IV=1 it indicates no seek is in progress. When IV=0 the request number is the number of the command with a seek in progress.

One command queue slot is reserved for each request number (0–7). A slot stores a two-word command queue entry having the format illustrated in FIG. 19B. If a command is issued by the host with the same request number as a command already in the queue, the command is rejected. In the command queue entry, HOST ID (bits 0–3) is the identification of the host that issued the command (EF). Full (FL-bit 4) indicates that the slot contains a command. Bits 5–7 of the first word of the command queue entry store the priority of the command as received from the host in the EF. The priority is used to determine the order of execution, with 0 being the highest priority and 7 the lowest. The commands are executed on a first-in, first-out (FIFO) basis within a priority group. The sequence number (bits 8–15) indicates the relative sequence in which the command was received from the host. It is used together with the priority to find the oldest command with the highest priority. The service command queue (SCQ) bit 16 is required for internal logic in the microprogram. It indicates that the command has been queued and was selected for execution by the idle loop (service command queue) routine. The channel end status modifier (CSM) bit 17 indicates that channel end/status modifier status has been presented to the host to thereby indicate that the command cannot be executed at this time. Device end status is sent later to signal the host to reissue the command. The device end (DE) bit 18 is set when device end status has been presented to the host indicating the SCU is ready to execute the command. The host must reissue the command. The seek in progress (SIP) bit 19 indicates that a seek is in progress for this command. The first and last hit (FLHIT) bit 20 is set to indicate that the first and last segments of a transfer are resident in cache. This bit is used when executing a DISPERSE WRITE command to determine if a pre-write read is required. The EF 2 bit 21 indicates that a second EF has been received for this command. Bits 22 and 23 are diagnostic mode bits. The acquire write (ACWT) bit 24 is set to indicate that this command is an acquire write command. The read (RD) bit 25 is set if the command is a read command. When reset it designates that the command is a write command. Bits 26 and 27 denote special read and write commands. When the bits are 00, 01 and 10, they specify normal, dispersed and store through modes, respectively. The trickle (TRK) bit 28 identifies the command as a trickle command. The request number (bits 29–31) is assigned by the host and is received in the EF. It is used to identify separate commands. The request number is returned with all status presented to the host.

In word 2, the number of segments (NSEG) field (bits 2–7) represents the number of segments to be transferred for this command. The number is derived from the relative word address and the transfer length fields of the EF. The segment device relative address (SDRA) field identifies the starting segment address of the first word of the transfer. This address is derived from the relative word address field in the EF.

ROLL TABLE ENTRY FORMAT

FIG. 18 illustrates the format of a roll table entry. There is a roll table for each disk drive. Each table contains up to 37 entries corresponding to the maximum number of segments that can be transferred with one EF. The table is built prior to data transfer and indicates the cache location of the segment and whether the segment data is valid in cache (hit or miss). The table is used during data transfer and eliminates the need to re-search the SDT. The roll table is located in the SDT RAM and is brought into the SCU control store for execution or data transfer. Each roll table entry includes a segment valid bit, a roll in bit, an occupied bit, and an SDT entry relative address. The segment valid bit indicates whether the data in cache is valid or not. The roll-in bit indicates that the segment should be transferred to cache. It is used to identify the segments (first and last only) that must be pre-read from the disk into cache for a DISPERSED WRITE command. The occupied bit indicates that the roll table entry has valid data. When the table is examined this bit is checked to find the valid entries. The SDT entry relative address describes the segment. The format of the address is the same as the SDT address in the pointer table described below.

SDT POINTER TABLE ENTRY FORMAT

The Pointer Table is designed to eliminate the need for a one-to-one correspondence between the cache locations (and SDT entries) and the mass storage addresses. A hashed data address indicates a Pointer Table entry which points to an SDT entry. Duplicate hash conflicts are resolved by chaining the SDT entries together with SDT hash links. The Pointer Table is located in the SDT RAM and contains either 4096 or 16,384 entries depending upon the system configuration.

Two Pointer Table entries are stored in a single word location as illustrated in FIG. 17. Each pointer table entry includes an SDT address defining the address of the entry in the SDT for the hashed address. Since more than one data address may hash to the same entry in the Pointer Table, the SDT entry must be checked to see if there is a hash link chain. Associated with the SDT address is a single bit indicator which indicates whether the SDT address field of the entry contains a valid address.

SDT ENTRY FORMAT

The SDT has entries on a one-to-one basis with 8k cache segments. Each entry comprises four words as illustrated in FIG. 16. The index to the proper entry in the SDT is obtained by "hashing" the original data address to an item in the pointer table. The Pointer Table entry in turn points to one entry in the SDT. Duplicate resolution of hashed pointers is resolved by a hash link field in the SDT entry. All link relative addresses have the same format as the Pointer Table SDT address shown in FIG. 17.

Considering the SDT entry shown in FIG. 16, the HOST ID field (bits 0–3 of word 1) identifies the host that last issued a command to this cache segment. The Device Number (bits 4–7) identifies one of the disk drive addresses. The Segment Device Relative Address (SDRA) bits 12–31 is a number which represents the segment offset (relative number from the first segment) of the data on the disk.

VLD (bit 0 of word 2) is the valid data bit which indicates whether or not the segment in cache associated with this entry contains valid data. The TACK bit 1 indicates that the cache segment is reserved for the data that will be transferred either from the host or from a disk. The "written to" (WT) bit 2 indicates that the cache segment has been updated by the host and the disk copy has not yet been rewritten. The RIBS bit 12 indicates that the segment was read into cache on speculation that it might be needed later. The OLD bit 13 indicates that the corresponding entry is in the SDT age between the ASRI and LRU entries, but does not include the ASRI entry. It is set whenever an entry ages beyond ASRI or is moved there because it is a speculative roll-in. It is cleared whenever an entry is moved to MRU. ASRI is a pointer to a location in the SDT age chain where segments that are rolled in by speculation are inserted, and is defined by the first data word asssociated with the PARAMETERIZE command.

The bad cache bit 14 indicates a permanent cache error has occurred in the cache storage location associated with the SDT entry. This 8k segment of the cache is not used again until the SCU receives an initialization command from the host. The bad disk bit 15, when set, indicates a permanent disk error has occurred which has prevented the writing of the updated segment during a cache-to-disk transfer. The only valid copy of the segment is in cache. The data remains in cache until the host issues either the INITIALIZE command or a RESET SEGMENT command.

The last hash link (bit 16 of word 2) indicates that the entry is the last entry in a chain of duplicate hashed entries. Duplicate hashed addresses are chained together. The Pointer Table entry points to the first entry in the chain and any additional segments in the hash class are chained together with the hash link relative address in bits 17–31.

The Last Backward Age Link (bit 0 of word 3) indicates the last entry in the backward age link. The Backward Age Link Address (bits 1–15) comprises a link of all segments from MRU to the LRU. The Last Forward Age Link bit 16 indicates the last entry in the forward age link. The Forward Age Link Relative Address (bits 17–31) is a link of all segments from LRU to MRU.

The User File Number is generated by the host to indicate related segments and occupies bits 2–31 of word 4 in the SDT entry. Bits 0 and 1 must both be zero.

MAIN IDLE LOOP

As previously indicated, an SCU returns to a main idle loop when it completes a task. The main idle loop is a sequence of instructions which look for more work to do. As illustrated in FIG. 67, the main idle loop first enables the channel interface. It then checks to see if a channel is transmitting an EF. If there is a channel transmitting an EF, the main idle loop branches to an Initial Selection routine. If there is no EF then the main idle loop branches to a subroutine to check for interrupts. At the end of this routine a return is made to the idle loop where another check is made for an EF. If there is an EF at this time then a branch is taken to the Initial Selection routine. If not, the results of the check for interrupts subroutine is examined to see if an interrupt was found. If an interrupt was found a branch is taken to the Process Interrupt routine for the processing of the interrupt.

If no interrupt is found at this time then the ICD indicator is checked. If it is set it means that cache is unavailable so a return is made to the beginning of the idle loop. If ICD is not set a branch is taken to a subroutine to check for queued commands. At the end of the subroutine a return is made to the idle loop where the results of the subroutine are checked to see if there is a command queue requiring service. If there is, a branch is taken to the Service Command Queue routine. If there is no queued command the idle loop branches again to the check for interrupts subroutine, returns, and checks for an EF. If there is now an EF present a branch is taken to the Initial Selection routine. If there is no EF then the result of the check for external interrupts is examined to see if an interrupt was found. If there was an interrupt a branch is taken to the Process Interrupt routine to process the interrupt. On the other hand, if no interrupt was found the idle loop branches to a Check For Trickle routine as described in the aforementioned concurrently filed application, and after this routine is completed the idle loop returns to its starting point.

INITIAL SELECTION ROUTINE

The Initial Selection routine (FIG. 68) accepts the first function word from a channel and determines which command decode section is required based on device address and subsystem state. The first step in theInitial Selection routine is to drop the tag gate or module select signal after which the channel switches are frozen. A branch is then taken to a Transfer EF subroutine which first drops the output data request, isolates bits 35–32 of EF 1 in a general purpose register, and stores bits 31–0 in the control store 300 as CEF1.

After the Transfer EF subroutine is completed a return is made to the Initial Selection routine where CEF1 is checked to see if it contains a valid device address or the address of the SDT. A jump is then taken from the Initial Selection routine to the Cache Command Decode routine.

CACHE COMMAND DECODE ROUTINE

The Cache Command Decode routine accepts the four function words required for cache operations and stores the function words in the control store. If the cache is down, the first two function words are transferred to the disk function word buffer, caching commands are converted to corresponding disk commands, the disk is selected and control is passed to disk only code. Unless the command is an INITIALIZE, PARAMETERIZE, RESET, READ STATISTICS, READ TABLES, or WRITE TABLES, a command queue entry is generated and saved in the control store for later use. The channel read/write controls are raised. A divide by 1792 routine is invoked to translate the EF Relative Word Address to a Segment Device Relative Address (SDRA).

As shown in FIG. 69, the Cache Command Decode routine first adds the command field from CEF1 to the base address of a command decode table. This table stores two half-words at each location. The first half word defines the starting address of the routine for the specified cache command. The second half-word defines the address of the location branched to in order to get more function words, or the address at which the disk command interface routine begins if it is a one-function word command.

Assuming either a Read, Write or Acquire Write command, the SCU raises ODR to request another EF word. A timer is set for a wait interval. At the end of the interval the SCU checks for the presence of an EF signal and if one is present it reverts to the Transfer EF routine to load EF 2 into Control Store 300 at a location as CEF2. After the external function word is loaded at CEF2, bits 35-32 are checked for 0000 to make sure it is EF 2 and if it is the routine then loops back to raise ODR and request another EF word. After this EF word is loaded it is checked to see if it is EF 2, which it is not, and then checked to see if it is EF 3. Since it is, bits 35-32 are checked for the value 0100 and the routine loops back again to raise ODR and request EF 4. After EF 4 is loaded it is checked to see if it is EF 2 or EF 3 and since it isn't the Internal Cache Down bit is checked.

If ICD=1, a check is then made to determine if the command is a PARAMETERIZE command. If it is, a jump is made to the Parameterize routine, the execution of which is not necessary for an understanding of the present invention. If the check shows that the command is not a PARAMETERIZE command then the system reverts to disk only logic and addresses the disk directly thereby completely bypassing cache.

If, at the time ICD is tested, it is not set, it means that the cache may be utilized. The base address of the command table is summed with the value of the command and entered into IX in order to get the first address of the routine for handling the command. This address is the same for either a READ, WRITE or ACQUIRE WRITE command and contains a control word which fetches CEF4 from its location in the control store.

Next, the command field of CEF1, previously stored in one of the general purpose registers, is compared with the value 29 to determine if it is a CACHE WRITE command. If it is, the priority bits of CEF4 are checked to generate the priority bits for CMDQ1, the first word of the command queue entry for the specified device. If the command is not a WRITE command then the command field of CEF1 is compared with the value 2A to determine if it is an ACQUIRE WRITE command. If it is, the ACQUIRE WRITE bit of CMDQ1 is set and the command checked to insure that it is not a DISPERSED WRITE or a STORE THRU command. After this check the priority bits for CMDQ1 are generated.

If the command is neither a WRITE command or an ACQUIRE WRITE command then the read bit for CMDQ1 is set and the priority bits then generated.

After the priority bits are generated, the assembled portion of CMDQ1 is stored in the Control Store (CS) 300. The program then fetches CEF2 and divides the relative word address by 1792 to develop SDRA which is stored in CS. The routine the computes the number of segments involved in the transfer, adds one, and stores CMDQ2, the second word of the command queue entry, in CS. The program then jumps to the Cache Command Breakout routine

CACHE COMMAND BREAKOUT ROUTINE

This routine selects the cache and determines whether the cache is bad, checks for commands already queued and selects the disk if nothing is queued and it is not an acquire write command. Implicit inputs for this routine include CMDQ1 and CMDQ2 which are the first and second words of a command queue entry that has been built up and stored in CS, CEF1, CEF2, CEF3 and CEF4 stored in CS and derived from EF 1-EF 4, global variables stored in the SDT RAM, and CQRTXL which is a table stored in CS and utilized to translate the device number to a displacement into the command queue table or the roll table. The high order half-word of CQRTXL is the displacement into the command queue table and the low order half-word is the displacement into the roll table.

Figure 70A:
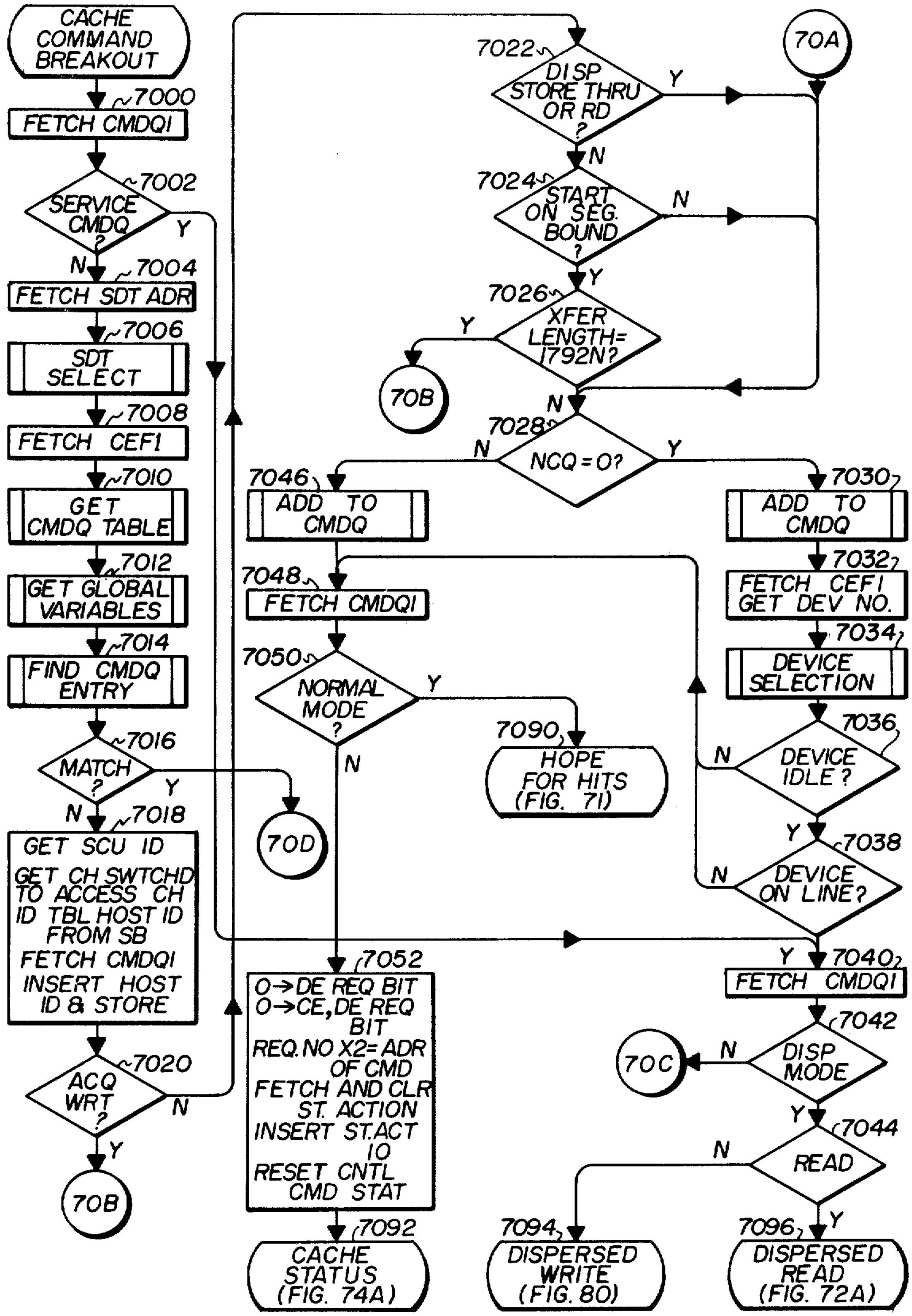
FIGS. 70A-70D—CACHE COMMAND BREAKOUT

Referring to FIG. 70A, the Cache Command Breakout routine begins by fetching CMDQ1 and checking bit 16 to see if the command queue requires service. Assuming it does not, a word is retrieved from CS which defines the SDT cabinet address and whether or not the large SDT feature is installed. A call is then made to the SDT Select routine in order to select the SDT. CEF1 is fetched from CS to obtain the device number. Next, a Put/Get CMDQ subroutine is executed to fetch the command queue table for the specified device from the SDT Ram to the Staging Buffer (SB) 800. Next, a subroutine is executed to fetch the global variables from the SDT RAM into SB 800. These global variables include the addresses of the MRU and LRU segments, ASRI, NSRI, NTRIK, STOPMTSRH, NRIBS, NUSED, CACHE BAD, MOVED, SUBSYSTEM STATE, the SDT address used for trickle, number of empty segments available, number of segments that have been written to, next priority device to check command queue, BSDA for cache seeks in progress, a bit significant command queue entry word, the relative SDT address of the first written to segment skipped by trickle because the device was busy, the SDT select address, a HOST ID table and a Channel ID table. All of the global variables are not utilized in the Cache Command Breakout routine but all are obtained frm the SDT RAM by the Get/Put Global Variables routine.

Next, the Find Command Queue Entry routine is executed which searches the command queue copy in SB 800 to see if there is a command with the same request number as the current command. It then compares the command with the same request number with the command in CMDQ1 and CMDQ2 stored in CS 300 and sets a match/no match indicator.

At the conclusion of the Find Command Queue Entry routine, the Cache Command Breakout routine checks at point 7016 to see if the indicator indicates a match or a no match condition. If there is a match, a branch is taken to the Second EF routine (FIG. 700). If no match is found, the SCU ID is obtained from the control store, and an instruction with CA=CC executed to find out which channel the SCU is presently switched to. This indicator is obtained through Gated Buffers 582. Using the SCU ID and the "channel switched to" indication, the Channel ID table in SB 800 is accessed to obtain the HOST ID. CMDQ1 is fetched from CS 300, the HOST ID inserted therein, and CMDQ1 returned to CS.

A check is then made at step 7020 to see if the command specified by CMDQ1 is an ACQUIRE WRITE command. If it is, it means that the host knows that this is the first time that this disk space has been written into hence there is no need to preread from the disk if the segments are not already in cache. However, any available cache segments are used and the data is transferred from the host to cache.

Figure 70B:
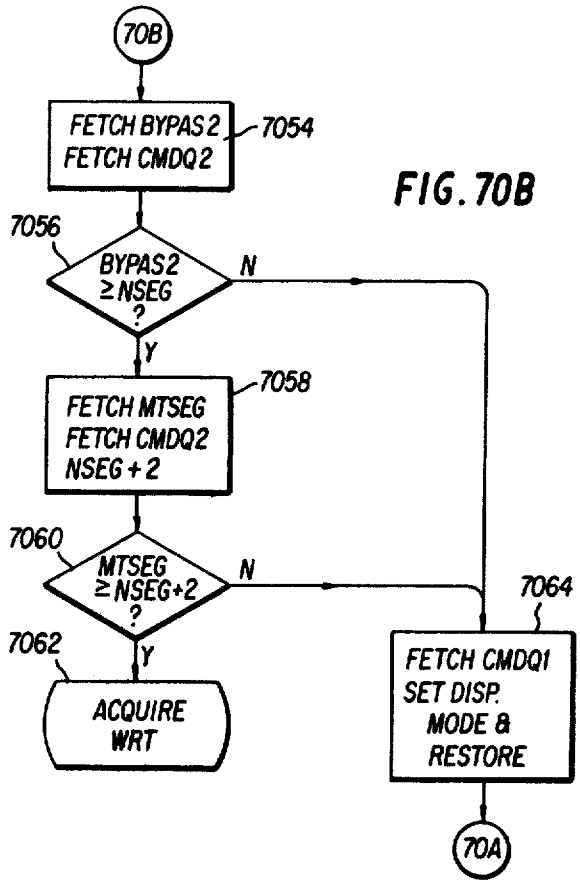

For an ACQUIRE WRITE command the Cache Command Breakout routine continues in FIG. 70B by first fetching BYPASS 2 and CMDQ2 from CS 300. BYPASS 2 is compared with NSEG from CMDQ2 to see if the cache may be bypassed. If BYPASS 2 is equal to or greater than NSEG, MTSEG (the number of empty segments available in cache) is fetched from SB 800 and CMDQ2 is fetched from CS 300. The value 2 is added to NSEG to reserve two segments in case of a preread, and MTSEG is checked to see if it is equal to or greater than NSEG+2. If it is, the Cache Command Breakout routine branches to the Acquire Write routine.

Returning to decision point 7020, if the command in CMDQ1 is tested and found to be something other than an ACQUIRE WRITE command, it is next tested to see if it is a DISPERSED, STORE THRU or READ command. If it is none of these then it must be a normal WRITE command. The WRITE command is then tested for a zero segment offset to see if it starts on a segment boundary. If it does, the command is then tested to see if the transfer length is exactly one or more segments (1792 words) in length. If it is, the WRITE command is treated as an ACQUIRE WRITE command and the routine continues through the steps shown in FIG. 70B as described above.

If the command is a DISPERSED, STORE THRU or READ command, or is a WRITE command that does not start on a segment boundary and have a transfer length exactly equal to an integral number of segments, the command queue must be serviced. The first word of the command queue header (CMDQH1) is fetched from SB 800 and the NCQ field checked at step 7028 to see if it is zero indicating no queued commands. If NCQ=0 an add to CMDQ subroutine is executed to inert CMDQ1 and CMDQ2 into the slot reserved for the request number of the command. The sequence number from CMDQH1 is inserted into CMDQ1 and the FULL bit (4) is set prior to the time CMDQ1 is inserted into the slot. The routine also places the request number of the command in the Active Command Request Number field of CMDQH2.

After the Add to CMDQ subroutine is executed, the copy of CEF1 retained in CS 300 is retrieved in order to obtain the device number. The device number is entered into GA and identifies the disk drive device to be selected. A device selection subroutine is then executed at step 7034 to select the drive indicated by GA. The device returns its status which is loaded into GA. GA is then tested at step 7036 to see if the device is idle, and if it is a test is made at step 7038 if the device is on line.

Assuming that the device is idle and on line, CMDQ1 is again fetched from CS 300 and checked at step 7042 to see if the dispersed mode bit is set. If it is, the read bit of CMDQ1 is checked to see if it is set. If it is a branch is taken at step 7044 to the Dispersed Read routine. If the read bit is not set then a branch is taken to the Dispersed Write routine.

Returning for the moment to FIG. 70B, an ACQUIRE WRITE command is converted to a DISPERSED WRITE command if it does not meet the test specified at decision points 7056 and 7060. That is, if NSEG is greater than BYAPSS 2 or NSEG+2 is greater than MTSEG (the number of empty segments available in cache) the ACQUIRE WRITE command is converted to a dispersed mode write by fetching from CS 300, setting the dispersed mode bit, and returning CMDQ1 to CS 300. After the operations shown in block 7064 are completed the program advances to decision point 7028 (FIG. 70A) and is treated as any other command. The same holds true for a normal WRITE command which is treated as an acquire write because it starts on a segment boundary and has a transfer length equal to an integral number of segments.

If, at decision point 7028, the test indicates that NCQ is not equal to zero then the command must be added as the last entry in the command queue associated with the device specified by the command CMDQ. This is done by executing the Add To Command routine.

After executing the Add to CMDQ routine the program advances to step 7048. This step may also be entered if, at decision point 7028, NCQ=0 but the desired device was either busy or not on line. Thus, the system advances to step 7048 for all commands where the requested data cannot be immediately obtained from the disk either because the disk is busy or not on line, or there is already another command queued and waiting for service by the device. Thus, the only hope of completing the transfer of the requested data to from the host at this time is if the data resides in the cache store. Step 7048 fetches CMDQ1 from CS 300 and checks the mode bit to see if a normal mode is specified. If it is, a branch is taken to the Hope For Hits routine to see if the information is available in cache.

If it is not a normal mode command then it means that the disk must be involved in the data transfer and thus the tranfer cannot take place at this time. The Device End (DE) and Channel End, Device End (CE,DE) request bits are reset, the request number is fetched from CS 300, the CE,SM (status modifier) bit is set. The request number is multiplied by 2 in order to form the relative address of the command which is then added to the base address of the command queue entry to fetch the status action field. The field is cleared and Status Action 10 (wait for device end) is inserted therein. The control command status bit in stage B of the ST Register is reset and an exit is made to the Cache Status routine. The Cache Status routine sets up the status word in ST and transmits it to the host with Ce.

At decision point 7002, if the test shows that the SCQ bit of CMDQ1 is set the device immediately proceeds to step 7040 and continues as described above.

Figure 70C:
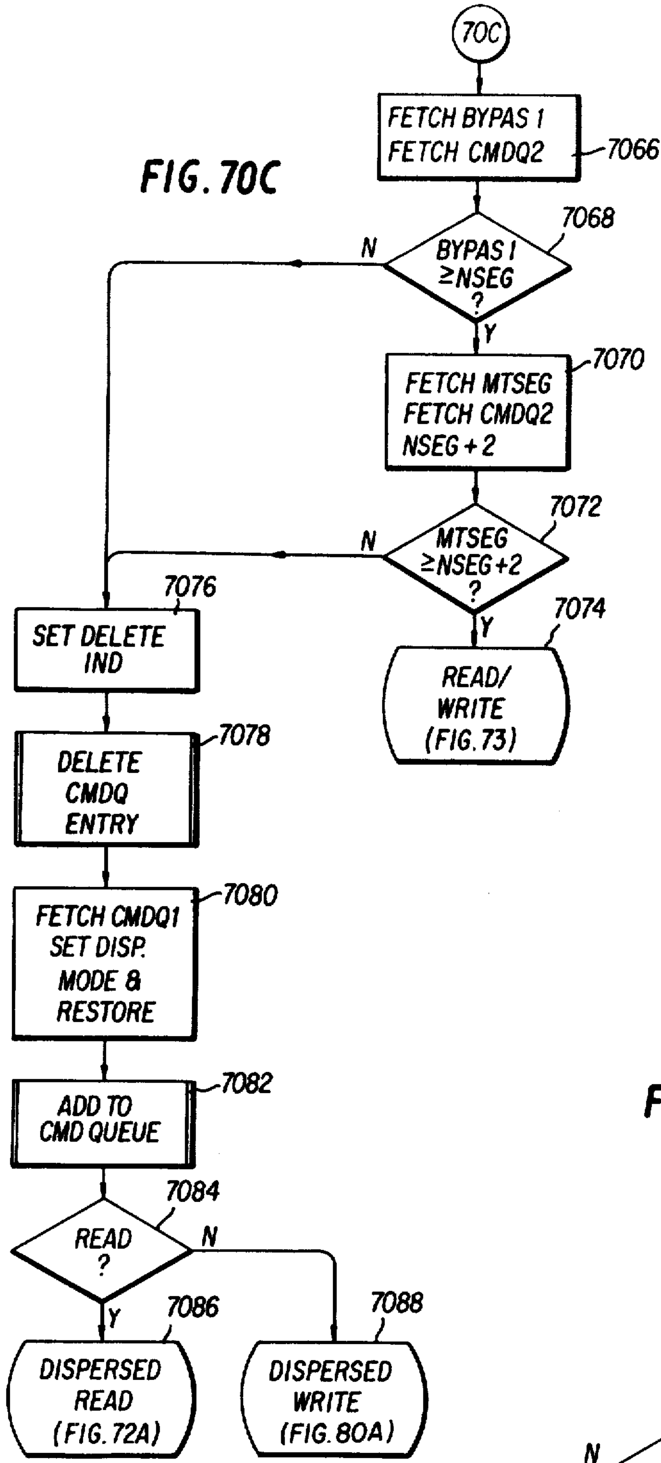

At decision point 7042, if the test shows that the dispersed mode bit of CMDQ1 is not set the device proceeds to the steps shown in FIG. 70C where it first fetches BYPASS 1 and CMDQ2 from the control store. BYPASS 1 is set by the PARAMETERIZE command and specifies a transfer length threshold above which the cache is bypassed. This is done to save cache space under the assumption that very large reads or writes are unlikely to be reused.

NSEG from CMDQ2 is compared with BYPASS 1 at step 7068 and if BYPASS 1 is equal to or greater than NSEG a check is then made to determine if there are enough empty segments in cache. This is done by fetching MTSEG and CMDQ2 from the control store, adding 2 to NSEG to provide for the case of a preread, and testing at step 7072 to see if MTSEG is equal to or greater than NSEG+2. If MTSEG is equal to or greater than NSEG+2 the device proceeds to the Read/Write routine.

If BYPASS 1 is less than NSEG or MTSEG is less than NSEG+2, the command is converted to a dispersed mode command. At step 7076 delete indicator is set in general purpose register GA and after which the Delete Command Queue Entry routine is called to delete the newest CMDQ entry. Next, CMDQ1 is fetched from the control store, the dispersed mode bit set, and CMDQ1 returned to the control store. Now that the command has been modified to a dispersed command, the Add To Command Queue routine is called at step 7082 to enter CMDQ1 and CMDQ2 into the command queue determined by the device number. CMDQ1 is then checked to see if the read bit is set and if it is a branch is taken to the dispersed read routine. If the read bit is not set a branch is taken to the dispersed write routine.

Figure 70D:
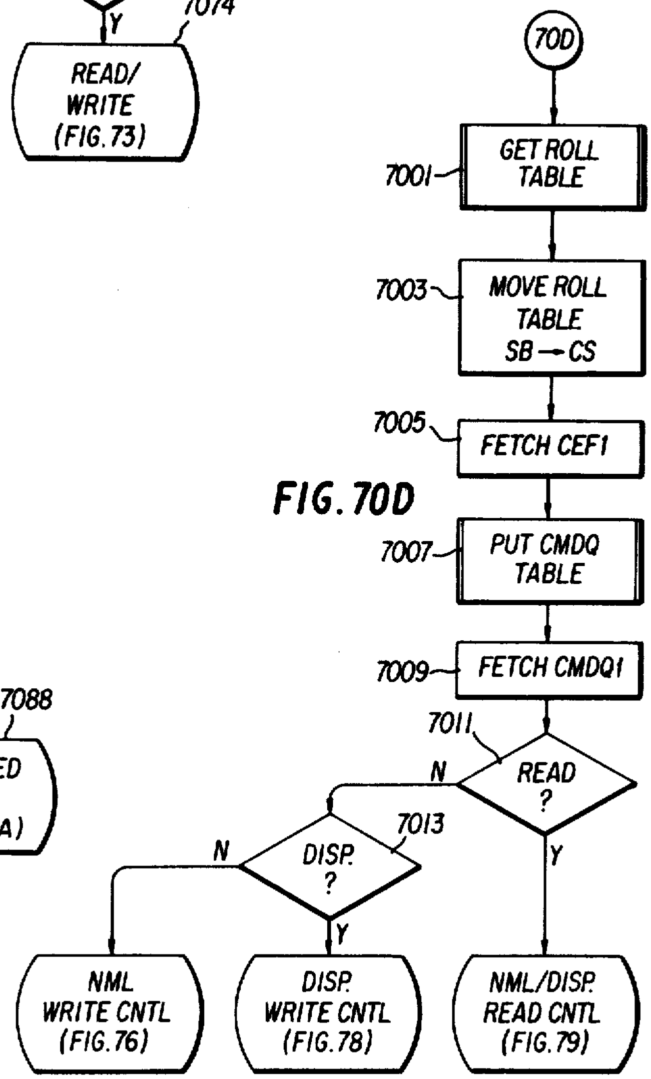

If, at decision point 7016 (FIG. 70A) a match is found is means that this is the second EF. That is, the first time the host presented the command CE status was returned to the host to indicate that the command was being processed and that the host should again present the command upon receiving DE. Thus, when the second EF occurs it means that the SCU has selected the required device disk and the device is ready to begin the required data transfer. In FIG. 70D, the Get/Put Roll Table subroutine is executed in order to bring the roll table from the SDT RAM to the Staging Buffer 800. A sequence of instructions is then executed in order to move the roll table from the staging buffer to the control store. CEF1 is fetched in order to obtain the device address and a call is made to the Get/Put CMDQ Table routine in order to put the command queue table back in the SDT RAM.

The copy of CMDQ1 in the control store is fetched and bit 25 tested at step 7011 to see if it is a READ command. If it is, an exit is taken to the Normal/Dispersed Read Control routine. If it is not a read command then bit 27 is tested at step 7013 to see if the command calls for a DISPERSED WRITE. If it does, an exit is taken to the Dispersed Write Control routine and if it does not, and exit is taken to the Normal Write Control Routine.

DISPERSED READ ROUTINE

The Dispersed Read routine is invoked after the Cache Command Breakout routine has determined that the request is a DISPERSED READ command or a NORMAL READ request with insufficient empty segments available in cache. The routine determines for each requested segment whether it is a hit or a miss. In the case of a miss a dummy roll table entry is formed since no staging will take place. If the segment is a hit then the TACK bit in the SDT entry is set. The age links in the SDT entry are left unchanged. A valid roll table entry is made and the RIBS information updated if applicable. A disk seek is then started, CE status presented to the host, and the routine exits to the idle loop.

The routine starts by fetching the temporary status bit word (SBITS). This word is stored in the control store and contains temporary status indicators valid during each command only. The First Miss bit is cleared at step 7200 and SBITS returned to the control store. ROLLSG is read from the control store. Next, the first of 38 words of the roll table for the active device is read from the control store and concatenated with ROLLSG to set ROLLSG, a copy of which is returned to the control store. Next, CMDQ2 is fetched from the control store to get NSEG and SDRA. Copies of SDRA and NSEG are returned to the control store as SVSDRA and SVNSEG for use during building of the roll table. NROLL, which is the control store address for temporarily storing the number of segments in the roll table, is cleared.

There is one roll table containing up to 38 entries corresponding to a given operation. The roll table size is 42 words, including 38 words of table for the active device, ROLLSAR which is the seek address for the first miss, ROLREC which is the record number for the first missed segment, and ROLLNR which is the number of valid entries in the roll table.

After clearing NROLL, a constant representing the roll table size is entered into a register while ROLTAB is entered into 342. Zeros are successively stored at the control store addresses on each cycle as IX is incremented and GA is decremented. This is continued until all words of the roll table are cleared.

At step 7204 the Dispersed Read routine fetches the device address STSXDA and the next SDRA value SVSDRA and at step 7206 calls a Search SDT subroutine. If the search of the SDT reveals a hit, an indicator is set. On return to the Dispersed Read routine a test is made at 7208 to see if a hit or a miss occurred. Assuming that a hit occurred it means that the segment is in cache. In this case the Roll In indicator to be loaded into the roll table entry is cleared, the valid bit to be entered into the roll table entry is set to one and the current SDT entry pointer is set up in preparation for calling a Link ROLTAB to SDT routine. This routine puts the current SDT entry address in the roll table entry pointed to by ROLLSG so that the roll table will point to the segment involved. The subroutine also sets the VLD bit and clears the Roll In and Occupied bits of the roll table entry in accordance with the previously set indicators.

On return to the Dispersed Read routine, the SDT entry pointer is again fetched and an indicator set to indicate tack and update SDT. A subroutine is then called at step 7212 to update the TACK and Written To (WT) bits of the SDT table. Before returning to the Dispersed Read routine, the Update Tack/WT routine calls the Get/Put RAM routine in order to store the updated global variables.

Upon return to the Dispersed Read routine SVNSEG is fetched and NSEG decremented. NSEG is then tested at step 7216 and if it is not zero then at step 7218 SDRA, ROLLSG and NROLL are incremented and a return is made to step 7204 to begin another search of the SDT.

At decision point 7208, if a miss (no hit) is detected the SBITS are fetched from the control store and the Miss bit tested to see if it is set. If it is, the routine proceeds from decision point 7236 directly to step 7240. However, if the Miss bit is not set then it is set and the SBITS restored in the control store. SVSDRA is fetched, an indicator set therein to indicate that is is the first missed segment, and the result (FMSDRA) is returned to the control store.

Next, ROLLSG is fetched at step 7240 and set into IX. The roll table entry is cleared in HH, an OCCUPIED indicator is set in HL, and the result returned to the control store. When these operations are completed the program proceeds to step 7214 in preparation for checking to see if NSEG=0.

At decision point 7216, when NSEG is tested and found equal to zero the SBITS are fetched from the control store and the First Miss bit tested at step 7222 to see if it is set. If it is not set, it means that all of the desired segments reside in the cache store. CMDQ1 is fetched from the control store and the SCQ bit tested. If SCQ $\neq$1 the Dispersed Read routine proceeds to step 7228 where the Get/Put Command Queue routine is executed to store the command queue back in the SDT RAM. The base address of the roll table is then entered into the address reserved for ROLLSG and a branch is taken to the Normal/Dispersed Read Control routine.

At decision point 7222, if the First Miss bit is set it indicates that at least one segment must be read from the disk. CEF1 is fetched to obtain the device number which is entered in GA. The Select Cache Drive subroutine is called to select the drive indicated by GA. The status of the drive is left in GA when the Select Cache Drive subroutine is completed. This status is then tested at step 7246 and if the device is busy a loop is taken back to again try to select the device.

When the status is tested and shows that the device is no longer busy, the Dispersed Read routine calls the Cache Seek Start subroutine. This subroutine issues a SEEK START and a SET SECTOR to the selected device. It also checks the HOST ID table in the staging buffer to see if there are multiple controller paths available between the disk device and the host. If so, the seek is issued untagged. If only one SCU path to the host exists, a Reserved Seek is issued to the disk device.

When the Cache Seek Start routine is completed a return is taken to the Dispersed Read routine which then calls the Get/Put RAM subroutine at step 7250 in order to transfer the roll table from the staging buffer to the SDT RAM.

Figure 72B:
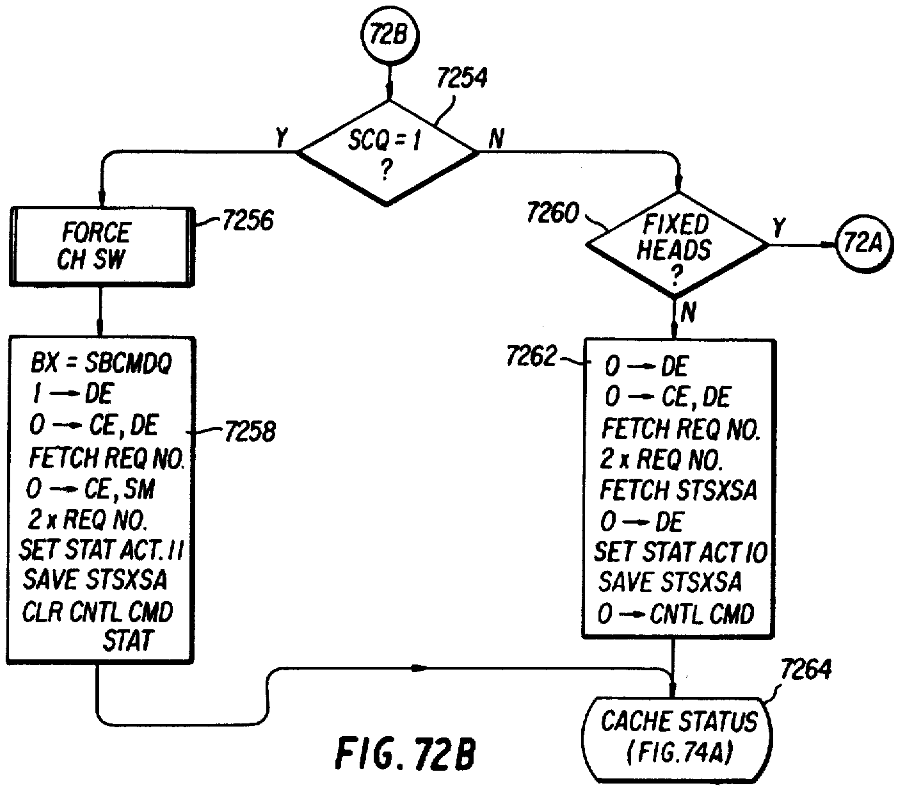
FIGS. 72A and 72B—DISPERSED READ

Next, CMDQ1 is fetched and the SCQ bit tested (FIG. 72B) to see if it is set. If it is, a branch is taken to the Force Channel Switch subroutine which uses the HOST ID in the CMDQ entry to index into the HOST ID table to find out which channel is connected to this host. The SCU is then forced to switch to that channel.

Upon return to the Dispersed Read routine, DE must be sent to the host. This is accomplished at step 7258 by setting the DE Request bit (ST 9), resetting the CE,DE Status Request bit (STA), fetching the request number and multiplying it by two, resetting the CE,SM Request bit (ST 9), setting Status Action 11 and storing the status action (SDSXSA) in the staging buffer at the address which is equal to the base address of the command queue (SBCMDQ) plus twice the request number. The Control Command Status bit (STB) is reset and an exit taken to the Cache Status routine.

At decision points 7222 and 7226, if the First Miss but is not set and SCQ=1, a branch is taken directly to the Get/Put RAM routine at 7250. This path bypasses the Select Cache Drive and Cache Seek Start routines since it is known that all of the required segments are present in cache.

Figure 72A:
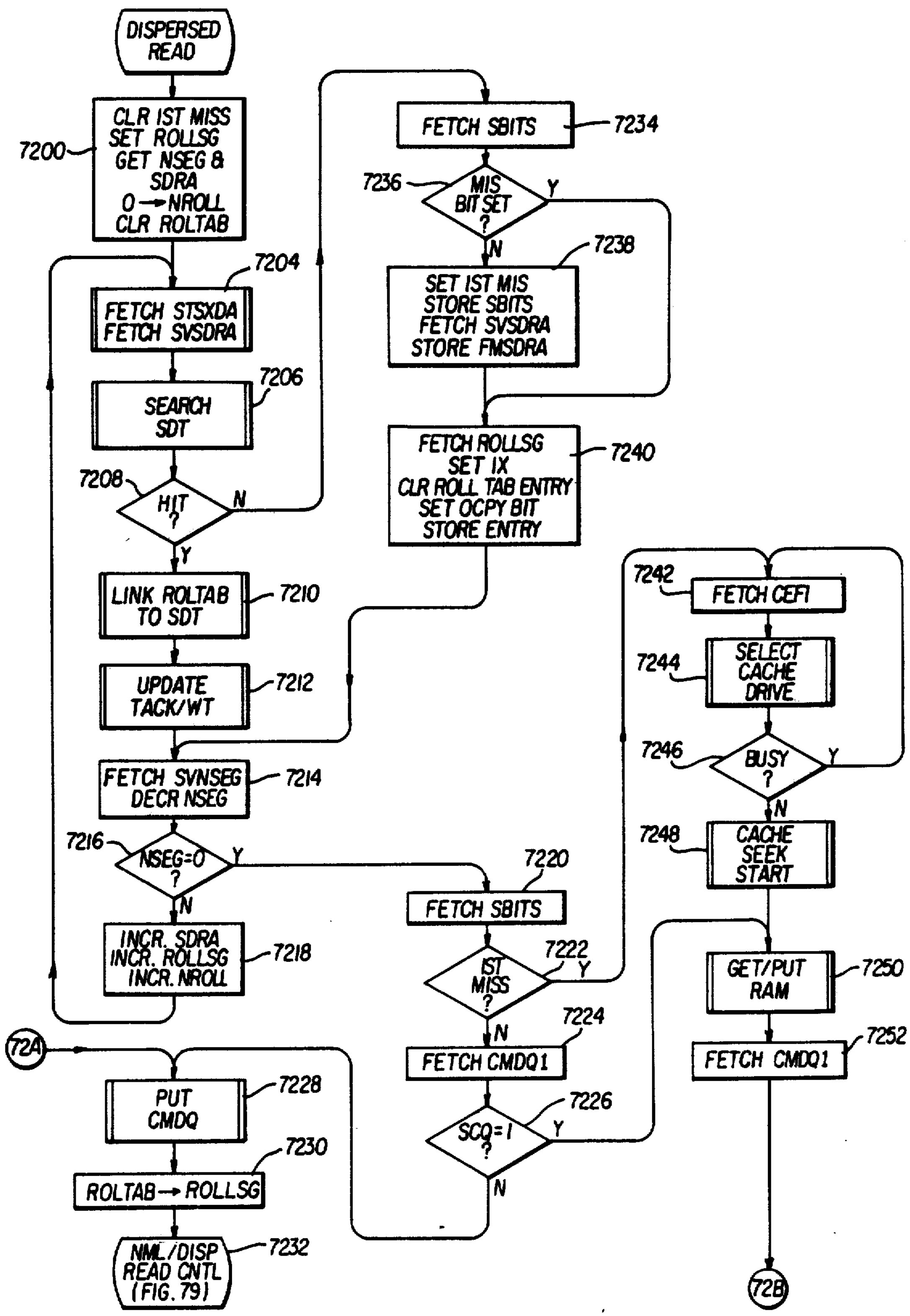

At decision point 7254 (FIG. 72B) if SCQ$\neq$1, then bit 5 of the ST Register is tested for fixed heads. If the device has fixed heads then no motion seek is required. Thus, from decision point 7260 a return is made to FIG. 72A where the Get/Put Command Queue subroutine is executed, ROLLSG is set to the ROLTAB value and an exit taken to the Normal/Dispersed Read Control routine.

At decision point 7260, if the device does not have fixed heads the DE Request bit and the CE,DE Status Request bits are reset, and SBCMDQ is read from storage as is the active command request number. The request number is multiplied by two and added to SBCMDQ to get the active command absolute address to fetch STSXSA from the staging buffer. DE is reset, Status Action 10 set (STA), and STSXSA returned to the staging buffer. The Control Command bit STB is reset, ST8 (CE,SM) is set, and the Cache Status routine called.

HOPE FOR HITS ROUTINE

This routine is entered if the disk and/or the command queue is busy (locked) and the cache operation is a normal read or write. The Cache Command Breakout routine has already added the command to the quee. If all segments referenced are not in cache, CE,SM is presented to the host so that it will later reissue the command after SEEK COMPLETE. If all segments are in cache the read or write transfer is performed by invoking the appropriate subroutine. The Hope For Hits routine builds a dummy roll table for use in the normal read or write routines and exits to one of these routines.

In FIG. 71, the Hope For Hits routine initially sets ROLLSG equal to ROLTAB, the base address of the roll table. CMDQ2 is fetched and NSEG entered into GA. The SDRA bits are saved at the address reserved for SVSDRA while NSEG is saved at the address reserved for SVNSEG. NROLL, the number of segments in the roll table is set to zero. The base address of the roll table is entered into IX and a value equal to the roll table size is loaded into GA. IX and GA are then utilized to clear the roll table.

At step 7102 STSXDA is fetched and the device address entered into GA. SVSDRA is fetched to obtain the next SDRA value. A call is then made to the Search SDT subroutine to check for a hit or a miss. At the completion of the Search SDT subroutine a test is made to see if the search produced a hit or a miss. If it produced a miss, it means that the command cannot be executed without first referencing the disk device so the host should be informed that the current command is being processed at the device independent of the SCU and that a secondary status word will be presented later for the same device.

At step 7108 the base address of the command queue is loaded into BX, DE and CE,DE are cleared, and CE,SM set in the ST Register. The active command request number is multiplied by two and added to BX in order to address STSXSA and fetch the status action field. Status Action 10—WAIT FOR DEVICE END—is inserted in the status action field and it is returned to STSXSA. The Control Command Status bit (STB) is reset and the routine exits to the Cache Status routine.

If the search of the SDT produces a hit, the base address of the second word of the SDT entry (SBSDT2) is loaded into BX at step 7110 in order to access the second word of the SDT entry. The Tack bit is tested at step 7112 and if it it set it is treated as a miss. The operations specified in module 7108 are executed and the routine exits to the Cache Status routine.

If the TACK bit is not set the SDT entry pointer returned by the Search SDT routine is entered into GA and the value 2 is entered into GB as a link to ROLTAB without the roll In bit being set. A call is then made to the MAKE AGE MRU subroutine which handles the age links for all involved segments to make the entry pointed to the most recently used. If the old bit is one it is reset and ASRI is adjusted. TACK is also set if the RIBS bit is set.

Upon return from the MAKE AGE MRU subroutine, the saved number of segments is fetched and decremented by one after which NSEG is tested at step 7120 to see if it is zero. If it is not, the operations in module 7122 take place in order to prepare for processing the next segment. These operations include storing NSEG at SVNSEG, fetching the saved SDRA, ROLLSG and NROLL, incrementing them, and returning them to their locations in the control store. After these operations are completed the program returns to module 7102.

If, at decision point 7120, NSEG=0, the Get/Put CMDQ routine is called to store the command queue back in the SDT RAM. The RAM status word (RAMST) is fetched and the ROLTCS bit set to indicate that the roll table is in the control store. RAMST is then returned to the control store and ROLLSG is set to the roll table base address. The current CMDQ1 word is fetched from control store and the command tested at step 7128. If the Read bit is set an exit is taken to the Normal/Dispersed Read Control routine. If the Read bit is not set an exit is taken to the Normal Write Control routine.

READ/WRITE ROUTINE

The Read/Write routine is invoked after the Cache Breakout routine has determined that the request is a normal read or write operation, or a STORE THRU operation and enough empty segments are available in cache. The routine determines for each requested segment whether it is a hit or a miss. If it is a hit, it is made MRU. If it is a miss, a new SDT entry is formed. In both cases a roll table entry is formed in the control store. If the request is a STORE THRU request then the Read/Write routine is complete at this point and exits to the Store Thru routine. For all other cases, if all segments are hits the data is read/written from/to cache and transferred to/from the host using the appropriate subroutine. Cache status is invoked with a request to present CE,DE. In the case of one or more misses, speculative entries are added to the roll table. Subsequently, the Device Seek is started and the Cache Status routine invoked to present CE,SM for disconnection.

Figure 73A:
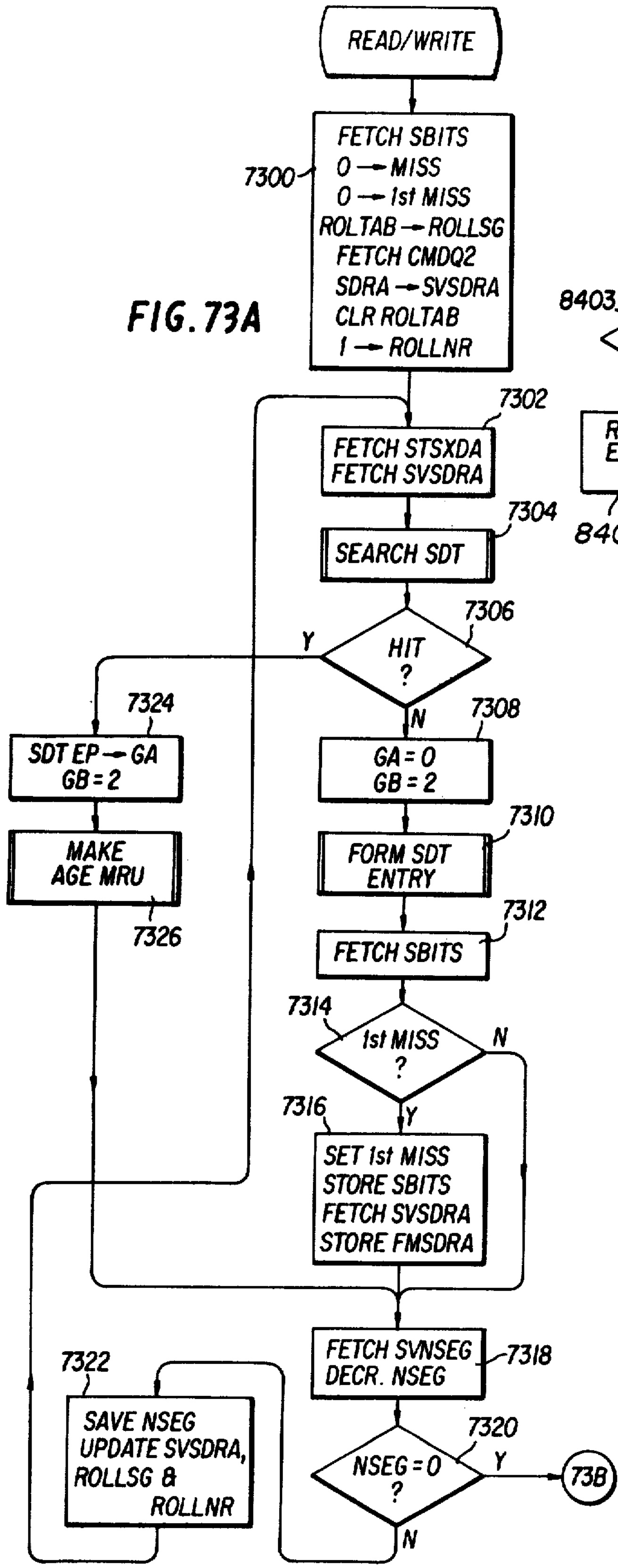
FIGS. 73A-73E—READ/WRITE

In FIG. 73A, routine starts by clearing the miss and first miss bits of SBITS and returning SBITS to the control store. The base address of the roll table is set into ROLLSG and CMDQ2 is fetched in order to obtain NSEG and SDRA. These latter values are then stored at the locations for SVSDRA and SVNSEG. Next, ROLTAB is cleared, the roll table size loaded into GA, and a loop of instructions executed to clear the roll table. The value one is then entered into ROLLNR, the address for storing the number of valid entries in the roll table.

STSXDA is fetched to obtain the Device Address which is placed in GA. SVSDRA is fetched in order to obtain the next SDRA value. The Search SDT routine is then called at step 7304 to search the SDT. After the search is completed a test is made at step 7306 to see if the search produced a hit or a miss. If it produced a miss then the segment is not in cache and it is necessary to form and add a normal entry to the SDT, make it the most recently used, and link it to the roll table. In addition, the miss bit and SBITS must be set. These operations are performed by modules 7306, 7308, 7310, 7312, 7314 and 7316. At module 7308, GA is set to zero to request a normal entry in the SDT Table. GB2 is set to request that it be linked to the roll table with no Roll In bit being set. A call is then made to the Form SDT Entry routine. Upon return from the Form SDT Entry routine the SBITS are fetched from the control store and the first miss bit tested to see if this is the first miss. If it is, the first miss bit is set and the SBITS returned to the control store. SVSDRA is fetched to obtain the SDRA of the first missed segment. It is stored at FMSDRA to save it for the Cache Seek operation. SVNSEG is fetched, decremented, and tested at 7320 to see if the decremented value is zero. If it is not, the routine prepares to process the next segment. This preparation involves saving the decremented NSEG and incrementing and saving the incremented SDRA, ROLLSG and ROLLNR.

At decision point 7314, if the miss is not the first miss, then the operations within module 7316 are bypassed and the program proceeds directly from module 7314 to module 7318.

In the case of a hit, it means the segment is in cache. Thus, a call must be made to move the SDT entry to the most recently used in the SDT linkage and the entry must be linked to the roll table.

From decision point 7306 the SDT entry pointer is loaded into GA from GB where it was placed by the Search SDT routine. GB is set to the value 2 to request the link to the roll table with no Roll In. The Make Age MRU subroutine is then called and after this subroutine is completed the program proceeds to module 7318, the operation of which has been described above.

Figure 73B:
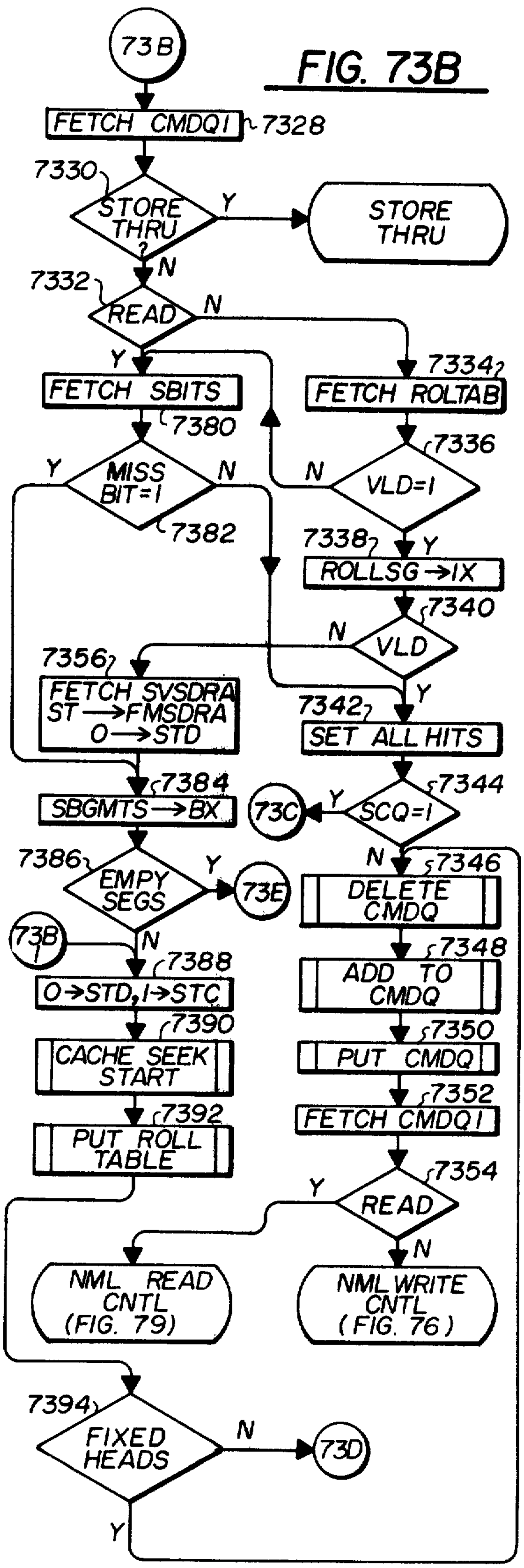

At decision point 7320, if NSEG=0 it means that the entire SDT has been searched. The program proceeds to FIG. 73B where it fetches CMDQ1 to test if the STORE THRU Mode bit 26 is set. If it is then the Read/Write routine exits to the STORE THRU routine.

If the STORE THRU bit is not set then the READ bit of CMDQ1 is tested. If it is not set it must be a write operation so ROLTAB is fetched to get the first roll table entry. The valid bit of the roll table entry is tested at 2336 to see if is set. If it is, ROLLSG, the last entry pointer, is loaded into IX in order to get the last entry. The valid bit is tested 7340 to see if the last entry was a hit. If it was, the All Hits indicator (bit 22 of CMDQ1)

is set. This is done by fetching SBCMQH, the pointer to the second word of the command queue header and using it to access CMDQH2 to get the Active Request Number. The Active Request Number is doubled and used as an index to the command queue entry. The entry is fetched to HL and ANDed wtih 0200 to set the All Hits Bit.

CMDQ1 is then fetched and bit 16 tested at 7344 to see if this is a Command Queue Service. If it is not, GA is reset to indicate the newest entry should be deleted and the Delete Command Queue subroutine is called.

Upon the return, CMDQ1 is fetched, the All Hits indicator set, and CMDQ1 returned to CS. The Add To Command Queue routine is called at 7348. Next, the Put Status bit STF is set and the Get/Put Command Queue routine called at 7350 in order to store the command queue in the SDT RAM.

CMDQ1 is again fetched and the read bit 25 tested at 7354. If it is set the routine exits to the Normal Read Control routine and if the bit is not set an exit is taken to the Normal Write Control routine.

At decision point 7332, if the test reveals a read operation the SBITS are fetched, the Seek Wait Status bit STD reset and the miss bit of SBITS tested to see if it is set. If it is not, it means that all hits were found during the SDT searches and all of the data is present in the cache memory. The routine branches to module 7342 and proceeds as described above.

At decision point 7336, if the valid bit is not set it means that FMSDRA is correct and the program proceeds directly to module 7380.

Figure 73C:
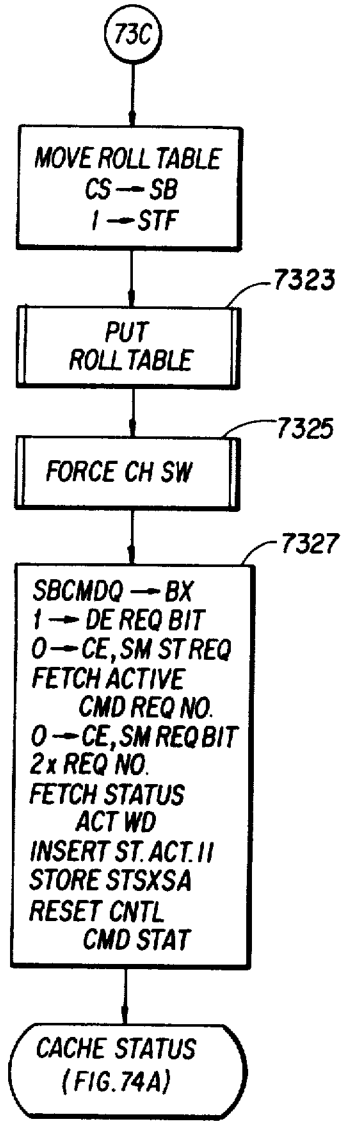

At decision point 7344, if the SCQ bit in CMDQ1 is set the program proceeds to FIG. 73C where ROLTAB is entered into IX and SBGROL is entered into BX while the roll table size is entered into Ga. A loop of instructions is then executed which fetches a roll table entry from the control store at the address specified by IX and stores it in the staging buffer at the address specified by BX. The roll table size in GA is decremented on each passage through the loop. This sequence of instructions moves the roll table from the control store to the staging buffer.

Next, STF is set and the Get/Put Roll Table subroutine called to store the roll table in the SDT RAM. The routine now prepares to exit to the Cache Status routine. The Force Channel Switch routine is called and upon completion of this routine SBCMDQ is fetched to BX as the DE Request bit is set. BX is incremented and the CE,DE Status Request bit STA is reset. BX is incremented again in order to fetch the Active Command Request Number in CMDQH2 from the staging buffer. The CE,SM Request bit in ST8 is reset, the request number multiplied by 2 to form the relative address of the command, and this value added to BX in order to obtain the active command absolute address. Status Action 11 is set in HL and HR stored in STSXSA. The control command status bit STB is reset and the routine exits to the Cache Status routine.

Figure 73D:
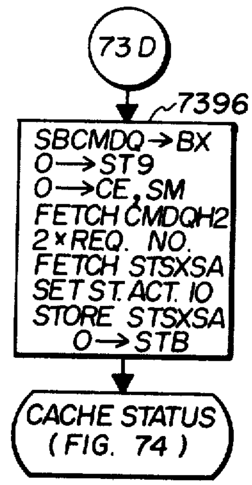

At decision point 7382 if the miss bit is set, or if the valid bit is not set at decision point 7340, then speculative segments may be added when the transfer from the disk drive device to the cache takes place. If the test at decision point 7340 shows that the last entry was not a hit, SVSDRA is fetched and stored at FMSDRA and STD reset before loading BX with SBGMTS. On the other hand, if the miss bit is set at decision point 7382 the next step is to load BX with SBGMTS. In either event, the value indicating the number of empty segments in cache is fetched at step 7384 and tested at 7386 to see if it is zero. If it is, no empty segments are available for speculative roll-in and the program proceeds to 7388 where STD is reset, STC set, and the Cache Seek Start subroutine called. At the end of the Cache Seek Start subroutine, STF is set and the Get/Put Roll Table subroutine called to store the roll table back in SDT RAM. ST5 is tested at 7394 to see if the disk drive device has fixed heads. If so, GA is cleared and the Delete Command Queue routine called because no motion seek is required. If the test at decision point 7394 shows that the disk drive device is not a fixed heads device, a motion seek is required so the routine proceeds to the steps shown in FIG. 73D. There, SBCMDQ is set into BX, the DE request bit (ST9) reset, the CE,SM status request bit reset and the CMDQH2 fetched to obtain the active request number. The active request number is multiplied by two to form the relative address of the command. STSXSA is fetched, Status Action 10, wait for device end is inserted, and STSXSA restored. The control command status bit STB is reset and the routine exits to the Cache Status routine.

Figure 73E:
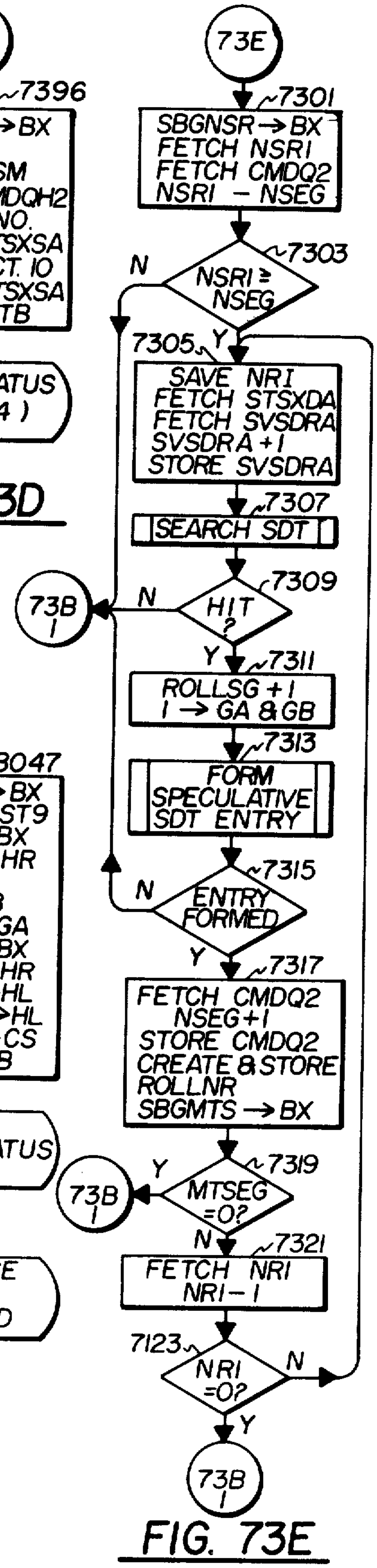

If the test at decision point 7386 shows that there are empty segments available in cache, the program proceeds to FIG. 73E where SBGNSR is loaded into BX to point to the stored value NSRI which is then fetched. NSRI is the number of segments, including speculative segments, that should be rolled into cache for each normal read or write command, and is a global variable loaded into the system by the PARAMETERIZE command. Next, CMDQ2 is fetched to obtain NSEG, the number of segments, to be transferred in accordance with the command in the command queue. NSEG is subtracted from NSRI to find out if there are any segments available in cache into which speculative segments may be rolled in. If there are, the difference between NSRI and NSEG (NRI) indicates the number of segments which can be rolled in on speculation and this difference value is saved at step 7305 in the control store.

The saved SDRA is fetched, incremented, and restored and a call made to search the SDT. Upon return from the Search SDT routine, ROLLSG is incremented and bit 0 in GA and GB set to set the speculative roll in parameter and the link to roll table with roll in indicator in preparation for calling the Form SDT Entry subroutine for forming a speculative entry therein. If an entry is formed, then at 7317 the Read/Write routine fetches CMDQ2 to obtain NSEG which is then incremented. CMDQ2 is then stored. The upper half of CMDQ2, still in HH, is ANDed with 003F to create ROLLNR which is then stored. SBGMTS is loaded into BX to fetch MTSEGS. This value is tested at 7319 and if it is not zero, NRI is fetched, decremented, and tested to see if it has been decremented to zero. If it has not, the routine loops back from decision point 7323 to module 7305 to form another speculative entry. If NRI is decremented to zero then the routine proceeds to module 7388 in FIG. 73B, and proceeds as described above.

Module 7388 is also entered if decision point 7303 indicates that NSEG is greater than or equal to NSRI, that is, the segments to be rolled in without speculation is so large that no speculative roll-ins will be permitted. Module 7388 is also entered from decision points 7309, 7315 and 7319 if a search of the SDT fails to produce a hit, no entry is formed by the subroutine at 7313, or if MTSEG=0. In this regard MTSEG is decremented each time an entry is formed in the SDT.

CACHE STATUS ROUTINE

The Cache Status routine sets up the status word and sends it to the host. The routine handles status for both cache and control commands. In the case of cache status it fetches the request number from the CMDQ and other parameters from the control store. In the case of control command status all parameters are fetched from the control store. The CMDQ entry is stored in the staging buffer at a location to be passed by the calling routine in register BX.

In the case of cache status, the routine updates the CMDQ entry after sending status to the host and then exits to the idle loop. If the caller of the routine requests channel end/status modifier status, and if this status has already been sent to the host earlier (CE/SM bit set in CMDQ) no status is presented to the host and an exit is taken to the idle loop. In the case of an EF/EI collision, the high order 16 bits at location EFEIXX (XX represents device number) are set to one's. On entry into the routine the device status byte in the control store should have all but the CE/SM/DE bits reset. In all cases, CMDQ and the global variables are transferred to the SDT RAM by calling the Get/Put Command Queue and Get/Put Global Variables subroutines. The Cache Status routine causes the SDT to be released and both the SDT and drive (if any) to be deselected before exiting to the idle loop. When only DE is pending and FORCED EF has been sent to the SCU, FORCED EF has priority and a branch is taken to the Initial Selection routine. An SIP bit is cleared after presenting DE status.

Explicit inputs include the Active Command Queue Entry Address in BX and the type of status to be presented in ST8, 9, A and B. Implicit inputs include the command queue header in the staging buffer at address SBCMDQ, the command queue entry in SB at the address passed in BX, the recovery action in the control store at STSXRA, the status action in the control store at address STSXSA, the device address in the control store at STSXDA and, for control commands only, the request number in the control store at STSXRN. The channel to which status is to be presented should already be initialized, that is, selected and locked.

Figure 74B:
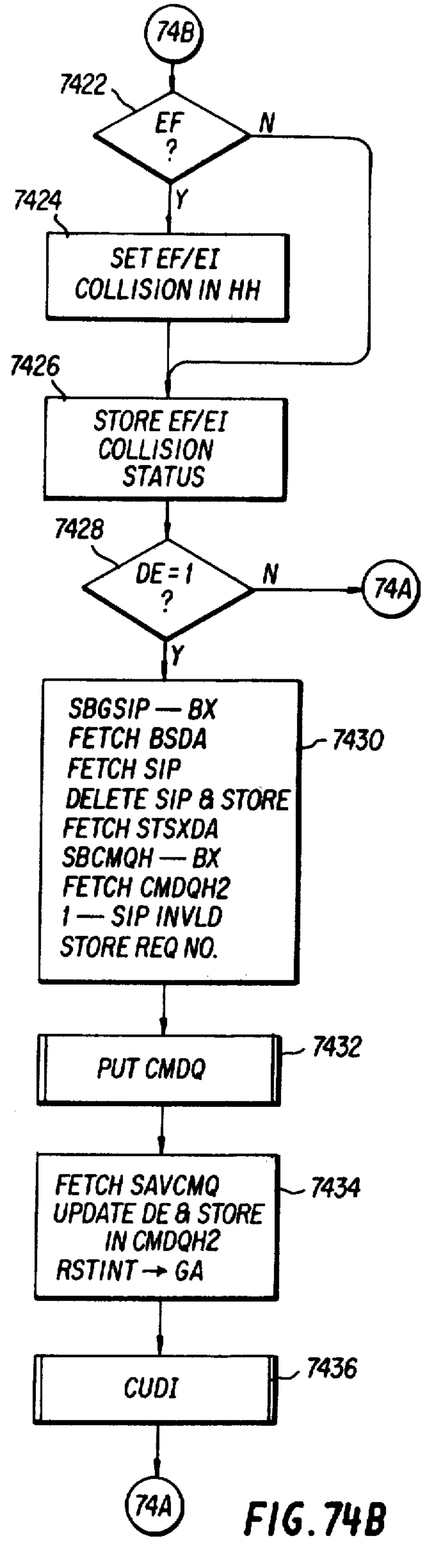
FIGS. 74A-74C—CACHE STATUS
Figure 74A:
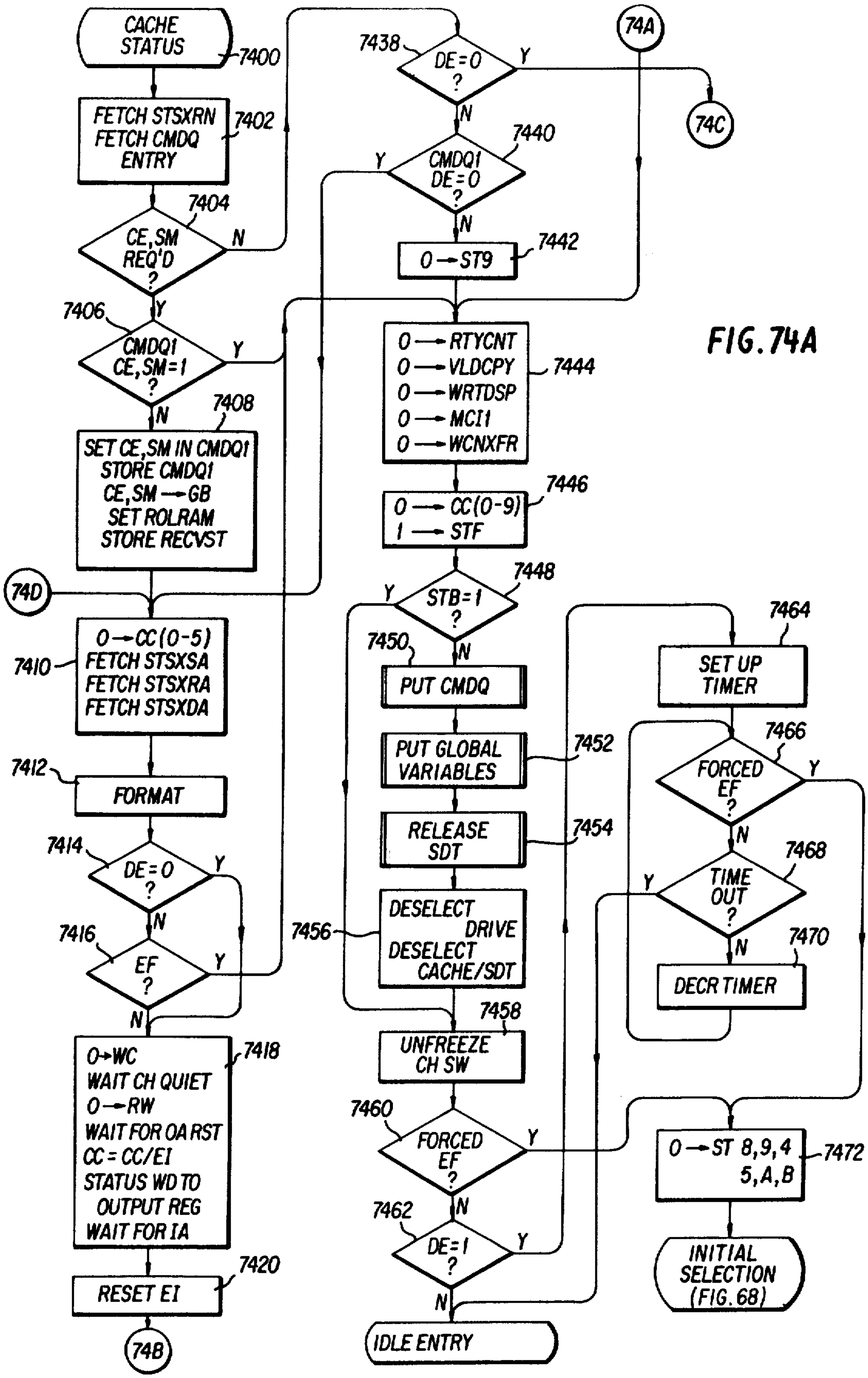

On entry into the Cache Status routine (FIG. 74A) the request number is fetched from STSXRN and the command queue entry fetched from the staging buffer. ST8 is checked to see if CE/SM status should be presented to the host. If it should, the CE/SM bit in CMDQ1 is checked to see if it is set. If it is, the routine proceeds from decision point 7406 to the module 7444 in order to prepare for an exit to the idle loop.

At decision point 7404, if CE/SM status is not to be presented to the host, bit 9 of the ST register is checked at 7438 to see if a request has been made to present DE. If it has, the DE bit of CMDQ1 is checked at 7440 to see if it has been set. If it has, ST9 is reset at 7442 because DE has already been presented, and the routine proceeds to module 7444 in preparation for returning to the idle loop.

If the test at decision point 7406 indicates that the CE,SM bit in CMDQ1 is not set, the bit is updated and CMDQ1 returned to the staging buffer. The CE,SM bit is set up in GB, the ROLRAM flag is set in HH and the recovery flag RECVST is returned to the control store. The routine then proceeds to module 7410 in order to form the status word. Module 7410 is also entered from decision point 7440 if the test of the DE bit in CMDQ1 shows that the bit is reset.

In module 7410, the bits 0–5 of the CC register are cleared in order to reset the Channel Read/Write Controls. STSXSA, STSXRA and STSXDA are fetched from the control store and the Status Action, Recovery Action, Device Status and Device Address are formed into a status word having the format illustrated in FIG. 18A.

Next, ST9 is checked to see if the DE bit is set. If it is not, the program skips from 7414 to module 7418. If it is, a check is made for a Forced EF and if EF is not present then the program proceeds to module 7418. On the other hand, if the Forced EF is present a branch is made to module 7444 in order to prepare for an exit to the idle loop.

Module 7418 transmits the status word to the channel. WC is set to zero and a test is made for OA. The routine repeats this instruction until there is no OA from the host. RW is reset and a test made for IA. This instruction is repeated as long as an IA is received from the host. When IA is false, the EI Control bit is set in CC and the status word is loaded into the Output Register 606. An instruction is then executed repeatedly waiting for an IA from the host. When it is received, the EI Control bit in CC is reset and, in FIG. 74B, if EF is set, an EF/EI collision indication is set into HH at 7424. The EF/EI collision status EFFIXX is then stored in the control store at 7426.

ST9 is then checked to see if the DE bit is set. If it is not, the program branches from decision point 7428 back to the module 7444 in FIG. 74A. If ST9 is set then in FIG. 74B the SIP bit in SBGSIP is deleted and the DE bit in the command queue is updated. These operations are accomplished by the steps shown in modules 7430, 7432 and 7434. After the updated CMDQH2 has been returned to the staging buffer, the value 0901 is loaded into GA in preparation for resetting the drive interrupt. The CUDI (control unit-device interface) subroutine is called in order to reset the interrupt from the Disk Drive Device. At completion of the CUDI subroutine the program returns to module 7444 in FIG. 74A.

In module 7444, the status presentation is cleared by entering zeros into the Retry Count, the Valid Prewrite/Read Information, the Miscellaneous Control Information, the Write Dispersed Value and the Word Transfer Information locations in the control store. The CC register is cleared to drop the channel controls and STF is set to indicate Put Command Queue. STB is checked to see if this is a control command. If it is not the subroutine is called to put the command queue back in SDT RAM. A routine is then called to put the global variables back into SDT RAM. Next, a subroutine is called to release the SDT. After the SDT is released the FC register is cleared to deslect the drive. The CT register is ANDed with 7FFF to deselect the Cache/SDT. A special operation is then performed to unfreeze the channel switch. At this time a check is made at 7460 to see if there is a Forced EF. If there is not, ST9 is checked at 7462 to see if DE is set. If it is not then the routine exits to Idle Entry.

At decision point 7460, if a Forced EF is found the program proceeds to module 7472 to reset stages 4, 5, 8, 9, A and B of the ST register and then exits to the Initial Selection routine.

At decision point 7462, if DEVICE END is present a timer is set up and a test made for a Forced EF. If there is no Forced EF the timer is tested to see if it has timed out and if it has, an exit is taken to Idle Entry. If the timer has not timed out it is decremented and the program loops back to decision point 7466 to again check for a Forced EF. These operations in effect check for an EF-EI collision.

If, at decision point 7466 a Forced EF is found, the stages of the ST register indicated in module 7472 are reset and an exit is taken to the Initial Selection routine.

Figure 74C:
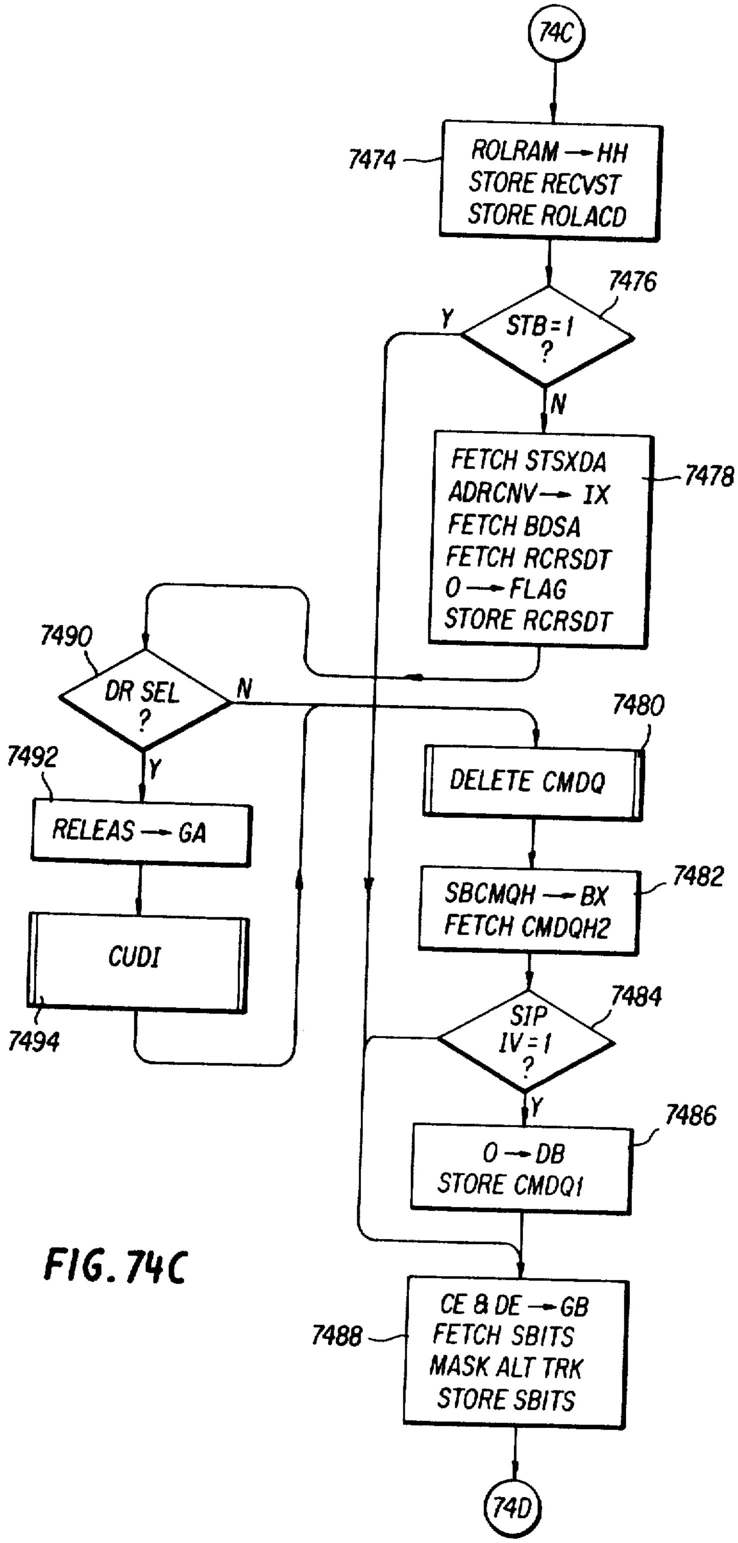

At decision point 7438 (FIG. 74A), if the test indicates DE=0 a branch is taken to FIG. 74C where ROLRAM is set into HH and recovery status returned to the control store. The Roll Table Active Device is set to a "don't care value" and ROLACD stored in the control store. Next, STB is checked at 7476 to see if we have a control command. If not, the device address STSXDA is brought from the control store and saved in GA. The starting address of an Address Conversion Table is brought to IX and IX added to GA to index to the appropriate device entry in the table in order to fetch BSDA. BSDA is inverted and saved in GA. The flag indicating if SDT should be restored is fetched from memory, reset, and returned to the control store.

The FC register is then checked at 7480 to test if the drive is selected. If not, the Delete Command Queue subroutine is called at 7480 to delete the command from the queue. Next, SBCMQH is fetched from the control store, decremented and loaded into BX in order to fetch the Command Queue Header. The SIP Invalid bit is checked and if it is set, the DEVICE BUSY bit in the Command Queue Header is reset. The CE and DE Status bit indications are set into GB, the SBITS brought from store and masked to mask off the alternative track indication, and the SBITS returned to the control store. After the steps in module 7488 are completed the routine returns to FIG. 74A, module 7410, in order to begin formation of the status word.

At decision point 7476, if STB is set indicating a control command then there is no need to reset the flag associated with this particular device indicating that the SDT should be restored. Thus, under these conditions the program proceeds from decision point 7476 directly to the module 7488.

At decision point 7490, if the test indicates the drive is selected, the Release tag value is set into GA and the CUDI routine called in order to release the device. After this is done the program then proceeds to the Delete Command Queue routine at 7480.

PROCESS INTERRUPT ROUTINE

Figures 75A, 75C:
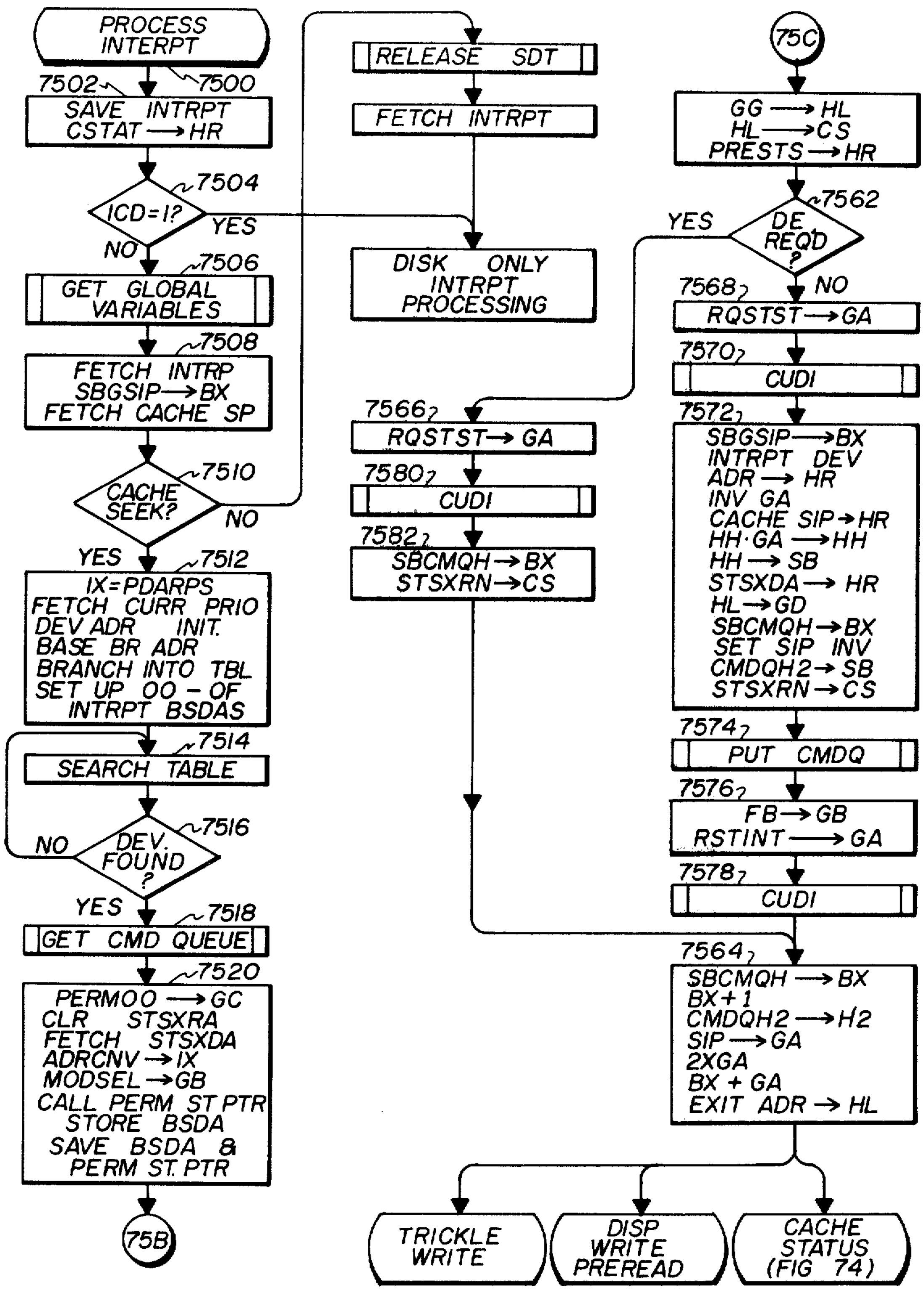
FIGS. 75A-75D—INTERRUPT PROCESSING

The Process Interrupt Routine selects the next priority device with an interrupt and determines which channel, if any, should get the Device End Interrupt status. If ICD flag is not set, an additional check is made for the cache related function "trickle". If a Seek Complete Interrupt is for a trickle, the routine exits to the Trickle Write routine which is described in the aforementioned concurrently filed application. In FIG. 75A, when the Process Interrupt routine is entered from the idle loop, the Interrupt bits are transferred from GA to HH and saved in the control store for later use. CSTAT is then fetched to HR. CSTAT contains indicators in the upper half word, and in the lower half word the lowest order bit is either zero or one to indicate SCU0 or SCU1. The ICD bit is tested to see if the cache is down. If it is not, STF is reset and a call is made to the Get/Put Global Variables subroutine to fetch the global variables from the SDT RAM to the staging buffer. The Interrupt bits are fetched and saved in GA. SBGSIP is loaded into BX to fetch the BSDA for a Cache Seek In Progress. GA is then ANDed with HH at 7510 to see if the interrupt is for a Cache Seek. If it is, PDARPS is loaded into IX in order to fetch the current priority device address. HH is decremented by one and entered into GA. The undecremented HH is entered into GE. The base address of a branch table is entered into OP and GB is set to one. OP and GE are summed and entered into PC in order to branch into the table, GC is loaded into OP. The table is then searched step by step. On each step, GA and GB are summed and the result entered into GA. On each succeeding step one stage of the OP register is tested to see if it is set. That is, OPO is tested and if the interrupt is for device 00 then a branch is taken. If not, then OP1 is tested to see if the interrupt is for device 01, and so forth.

When the device causing the interrupt has been found by searching the table, the four low order bits of GA contain the device address. GA is ANDed with 000F to obtain the device address which is entered into HL and saved at STSXDA. STF is reset and a call is made to the Get/Put Command Queue subroutine in order to bring into the staging buffer the command queue for the interrupting device.

At step 7522 GC is loaded with PERM00 which is the base address of a permanent storage area. This permanent storage area includes five control store locations or twenty 8-bit bytes of permanent storage area for each device. The information contained in the permanent storage area is as follows.

| | |
|---|---|
| Byte 0 | CAR |
| Byte 1 | HAR |
| Bytes 2-3 | PREP LENGTH |
| Bytes 4-7 | BYTES READ COUNTER |
| Bytes 8-9 | CORRECTABLE DATA CHECK COUNTER |
| Bytes 10-11 | UNCORRECTABLE DATA CHECK COUNTER |
| Bytes 12-13 | SEEK USAGE COUNTER |
| Byte 14 | SEEK ERROR COUNTER |
| Byte 15 | DEVICE PHYSICAL ID |
| Byte 16 | CAR HIGH (8450) |
| Byte 17 | CAR LOW (8450) |
| Byte 18 | HAR (8450) |
| Byte 19 | NOT USED |

HL is set to zero and HR stored at STSXRA to initialize Zero Recovery Action. STSXDA is fetched in order to obtain the device address which is entered into GD. ADRCNV is entered into IX. ADRCNV is the base address of a table for converting a four-bit binary (HEX) address to a bit significant device address (BSDA). The table also provides a permanent storage index.

GD is added to IX and the result returned to IX in order to fetch the Permanent Pointer Index and BSDA. MODSEL (8340) is entered into GB. The Permanent Storage Pointer is entered into GB. The Permanent Storage Pointer is calculated by adding GC to HH. The current BSDA word in HR is now stored in the control store at BSDA. GD is ORed with GB and the result entered into GA so that GA now contains the Long Module Select Constant. The Permanent Storage Pointer is transferred from HH to GC and BSDA is entered into GE. GE is then complemented and entered into GD. HR is then stored at GCGESV in order to save the Permanent Storage Pointer and BSDA.

Figure 75D:
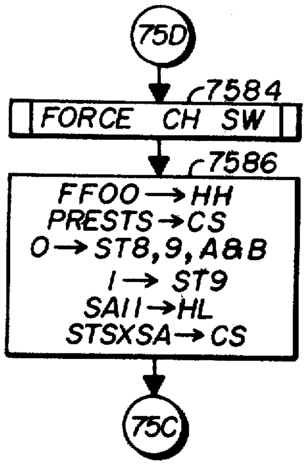
Figure 75B:
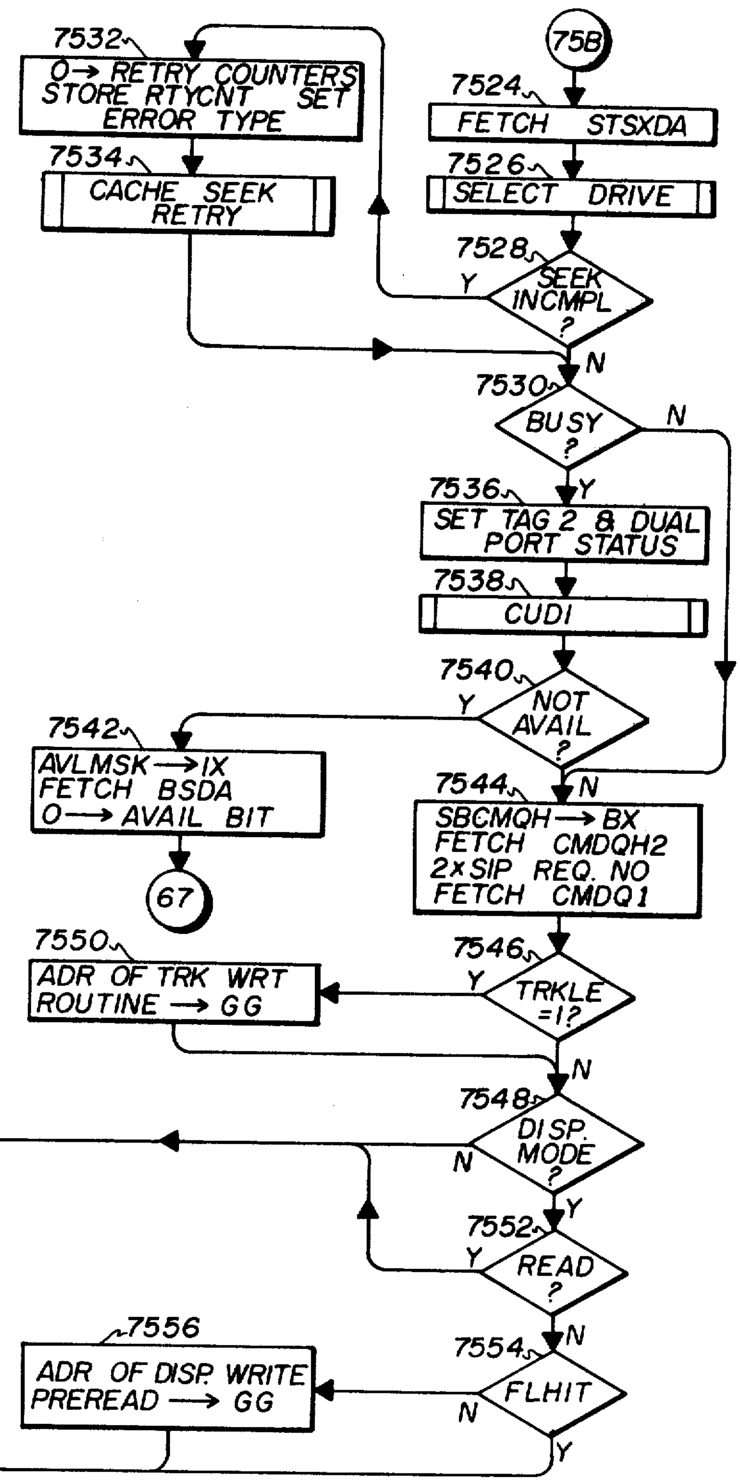

The routine then proceeds to FIG. 75B where STSXDA is fetched to obtain the Binary Device Address. HL is entered into GA and the Select Drive routine is then called. At the completion of this routine GA contains an indication of whether or not the seek was complete.

GA is ANDed with SKICPT (2000) to see if the seek is incomplete. If it is, the program proceeds to 7532 where HR is cleared and entered into the retry count location in the control store. GA is set to indicate the type of error and a call is made to the Cache Seek Retry routine to again try for a seek. If the cache seek retry is successful, or if the test at decision point 7528 shows that the seek is complete, the Process Interrupt routine next checks GA to find out if the device is busy. If it is, the routine proceeds immediately to module 7536. If it is not, GG is set to zero and BX is loaded with SBCMQH to point to the command queue header. BX is incremented in order to fetch the second word in the command queue header. The Seek In Progress Request Number from the CMDQ header is multiplied by two and added to BX with the result being returned to BX. The command queue entry is then fetched from this address and ANDed with 0008 to find out if the Trickle bit is set.

If the Trickle bit is set the program moves to step 7550 where the address of the Trickle Write routine is entered into GG after which the Process Interrupt routine proceeds to decision point 7548. If the Trickle bit is not set then the routine proceeds directly from decision point 7546 to decision point 7548.

At decision point 7548 the Dispersed Mode bit of CMDQ1 is tested to see if it is set. If it is not the routine proceeds to decision point 7558. If the Dispersed Mode bit is set then the Read bit of CMDQ1 is tested to see if it is set. If the command calls for a read operation a branch is taken to decision point 7558. If the Read bit is not set then the routine proceeds to decision point 7554 where it tests to see if the First/Last Hit is set. If it is not then the starting address of the Dispersed Write Preread routine is entered into GG at step 7556 after which the Process Interrupt routine proceeds to decision point 7558. If the test reveals that the First/Last Hit bit is set then the Process Interrupt routine proceeds directly from decision point 7554 to decision point 7558. At decision point 7558, GG is tested to see if it contains a zero value. If it does, the starting address of the Cache Status routine is entered into GG and the Process Interrupt routine continues in FIG. 75D where it calls the Force Channel Switch subroutine. This subroutine uses the HOST ID in the CMDQ entry to index into the HOST ID table to find out which channel (A,B, C or D) is connected to this host. The SCU is then forced to switch to that channel.

Upon return from the Force Channel Switch subrutine HH is set to FFOO and HR stored at PRESTS. ST8, ST9, STA and STB are cleared and ST9 is set for DE status. HH is cleared and Status Action 11 entered into HL after which HR is stored at STSXSA. The routine then proceeds to FIG. 75C.

The Process Interrupt routine also proceeds directly to FIG. 75C from decision point 7558 (FIG. 75B) if GG contains a zero value. This bypasses the steps in FIG. 75D so that DE status will not be presented.

In FIG. 75C, the exit address in GG is loaded into HL. This may be either the address of the Trickle Write routine, the Dispersed Write Preread routine or the Cache Status routine as described above. The exit address in HL is then saved in the control store. PRESTS is fetched and XORed with FFOO to see if DE status has to be presented. If it does not, RQSTST is entered into GA to set up the tag and bus for read status. The CUDI routine is then called to obtain the status information from the disk drive device. BX is loaded with SBGGSIP, the pointer to the seek in progress word in the staging buffer. The interrupt device address BSDA is fetched from the control store to HR, complemented, and entered into GA. The cache seek in progress is then brought to HR under the control of BX. HH is ANDed with GA to clear the SIP for this device. The result is then returned to the buffer store under the control of BX.

STSXDA is fetched in order to obtain the device address which is entered into GD. BX is set to SBCMQH and CMDQH2 is fetched. The SIP Invalid bit in CMDQHB2 is set and HR is returned to the staging buffer. The Seek In Progress Request Number in CMDQH2 is separated from the rest of the word and stored at STSXRN. STF is then set and a call is made to the Get/Put CMDQ routine in order to put the command queue for the device back in the SDT RAM.

Preparations are then made for resetting the interrupt from the drive. FB is entered into GB and RSTINT (0901) is loaded into GA. The CUDI routine is then called in order to reset the interrupt. The routine then proceeds to module 7564.

If DE status must be presented the program branches from decision point 7562 to module 7566. RQSTST is entered into GA and the CUDI subroutine called to obtain the device status. SBCMQH is set into BX in order to fetch the command queue header. The request number is obtained from the command queue header and stored at the location reserved for STSXRN. The routine then proceeds to module 7564.

In module 7564, SBCMQH is loaded into BX and BX is incremented to fetch the second header word. The SIP request number is isolated, multiplied by two, and entered into GA. GA is then added to BX after which the exit address which has been saved in the control store is brought to HL and entered into PC. The routine then exits to either the Trickle Write, Dispersed Write Preread or Cache Status routine.

At decision point 7530 (FIG. 75B) if the device is busy GA is loaded with RDDPST (0240) to set up TAG 2 and Read Dual Port Status. The CUDI routine is then called and upon return from this routine the contents of FB are ANDed with 0200 to see if the Not Available bit is set. If it is not set, the routine proceeds to module 7544 and continues as described above.

If the Not Available bit is found to be set, the Process Interrupt routine branches to module 7542 where the Device Available BSD Mask for devices 00–1F (AVLMSK) is fetched to HR. The mask in HH is saved in GE after which GCGESV is fetched to obtain the BSDA. HH is XORed with the mask to clear the Available bit and the result returned to AVLMSK. The routine then exits to the idle loop in FIG. 67 and enters the idle loop at module 6702.

In FIG. 75A, if the test at decision point 7504 shows that the ICD bit is set then the cache cannot be utilized and the routine branches to the disk only interrupt processing sequence. An explanation of this sequence is not necessary for an understanding of the present invention.

At decision point 7510, if the test shows that this is not a cache seek then the Release SDT subroutine is called to release the SDT after which the Interrupt bits are fetched and the routine continues by processing the disk only interrupts.

NORMAL WRITE CONTROL ROUTINE

The Normal Write Control routine transfers data segments from the host to the cache under the control of the roll table. The SVLD bit in the roll table indicates whether the cache segment is valid (hit) or not (miss). For transfers that involve full segments, that is intermediate segments or first/last segments on boundary, the SVLD indicator is meaningless. For non-full segment transfers, if SVLD equals zero, the segment is read from the disk into the staging buffer prior to a partial update from the host. If SVLD=1 the segment is read from cache. In either case the complete segment is written back to cache. All segments involved are marked VLD. All segments not read in by speculation are marked WT. TACK is reset on all segments. For a STORE THRU command, the routine exits to do the DISK WRITE routine. For all other commands, the command queue entry is deleted.

Figure 76D:
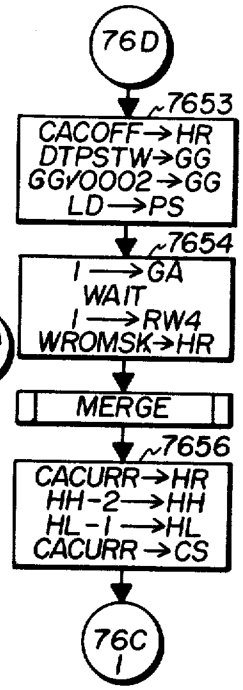
FIGS. 76A-76G—NORMAL WRITE CONTROL
Figure 76A:
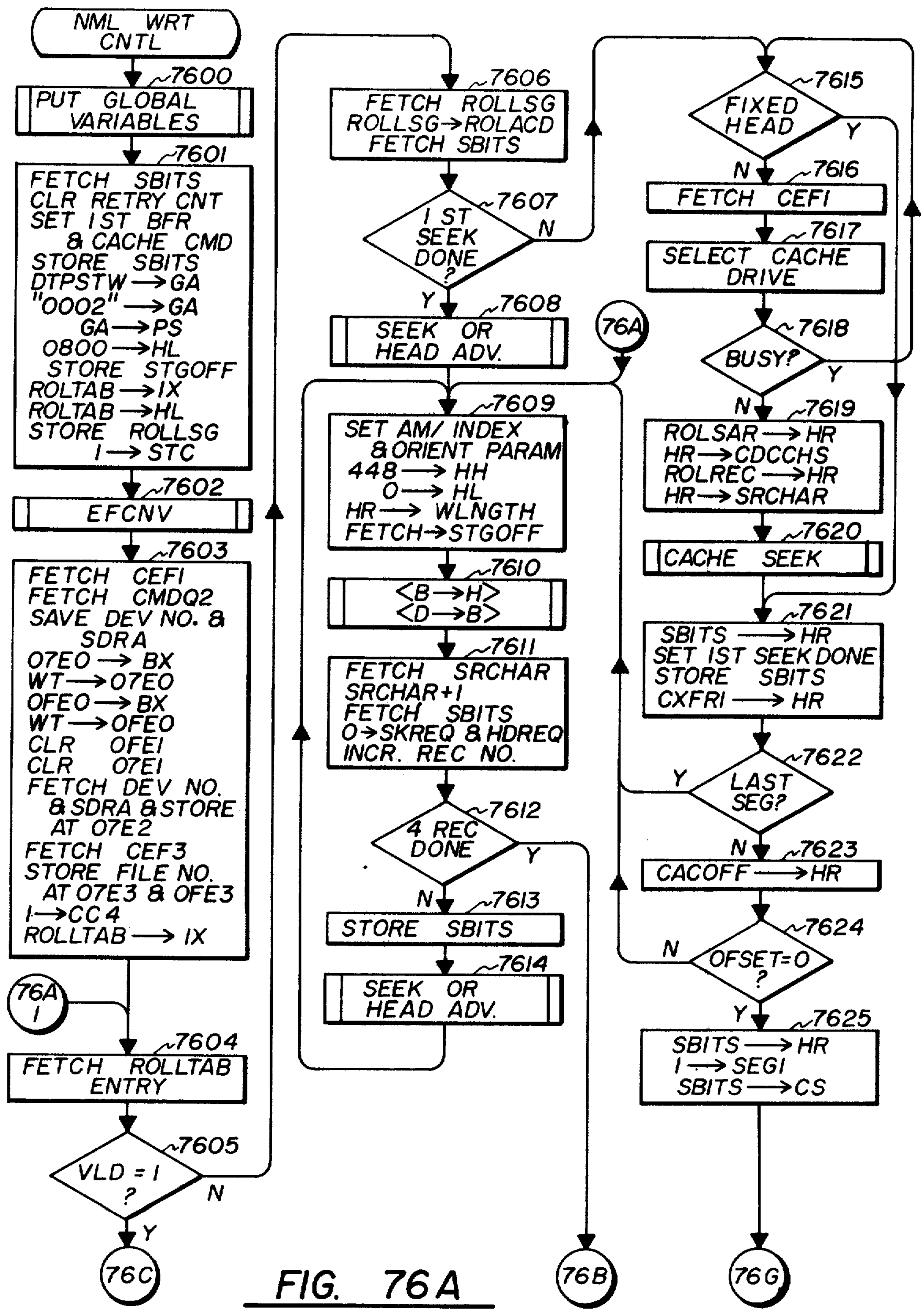

The Normal Write Control routine begins in FIG. 76A by setting STF and calling the Get 1 Put Global Variables routine in order to store the global variables back in the SDT RAM. The SBITS are fetched and the value 0420 entered in the upper half thereof to indicate a first buffer and cache command. The record count for a segment in the lower half of the SBITS is cleared and the SBITS returned to the control store. Next, the data field base preset for a write operation (DTPSTW=0804) is set into GA, this value ORed with 0002 and the result entered inthe the PS Register 630.

The starting address (0800) of the second buffer area in the Staging Buffer 800 is entered into HL and stored in the control store at a location reserved for STGOFF. HH is zeroed prior to this last operation so that a zero value is entered into the high order half of STGOFF. Bytes 0 and 1 of STGOFF contain a value which is entered into BX for use in storing data from the disk into the staging buffer. Bytes 2 and 3 represent the displacement into the other staging buffer area. This displacement always has the value 800X or its complement. For timed loop data transfers to the channel, 800X is added to the value in BX to get to the second staging buffer area.

ROLTAB is loaded into IX and HL. The Roll Table Pointer ROLLSG is saved and bit C of the ST register is set. A call is then made to an EF Conversion routine (EFCNV) which converts extended transfer commands from the host 36-bit word format to the 32-bit SCU format. The first two EF's (of four) utilized on cache data transfers, and the only two EF's used on addressable data contain a 16-bit word transfer length (FIG. 15A) and a 32-bit Relative Word Address (FIG. 15B) that require manipulation before the disk drive device can use the data.

No input parameters are passed to EFCNV via the registers. The Command Decode routine has previously accepted EF 1 and EF 2 from the channel and they are saved at CEF1 and CEF2 in the control store. At the conclusion of the EFCNV routine it has stored in the control store several values as follows:

CAC32L which contains the 32 and 36-bit transfer lengths, the 32-bit length being equal to the 36-bit length plus 7 divided by 8. The length may be increased due to the requirement for even starting addresses and lengths.

CACOFF contains the 32 and 36-bit offsets from location 0 in the staging buffer 800. CAC32A contains the 32-bit starting address and is always even. CACURR contains the current 32 and 36-bit transfer lengths for this buffer's worth of transfer. The total transfer may be many 8k segments while an area of the Staging Buffer 800 is limited to one 8k segment. CACWRT contains the 32 and 36-bit lengths to write on the current transfer.

CXFRI contains indicators in the low byte of the high half word. These indicators are as follows:

| | |
|---|---|
| 01 | Starting Address is odd |
| 02 | Requires preread and merge if write |
| 04 | Requires postread and merge if write |
| 08 | Ending data is in first word of last two |
| 10 | Ending data is on even 36-bit 8 (not 16) boundary |
| 20 | Single even starting address transfer |
| 40 | Multi-segment transfer |
| 80 | Single 36-bit word transfer length |

The low half word of CXFRI contains a value which is one less than the number of segments to be transferred.

CBUFND is the last 32-bit word relative address in the staging buffer. CACADR contains in its low orders the high orders of a 32-bit word transfer length. The high order contains TAG 3-SELECT CACHE BUS OUT data.

Upon return from the conversion routine, the Normal Write Control routine loads certain information regarding the SDT into the staging buffer so that it may be written at the end of the segment. In this regard, the system attaches the newest copy of a segment descriptor table entry at the end of each outbound data segment as it is written to the disk to create a duplicate segment descriptor entry. Subsequently, if a failure of the Segment Descriptor Store 1200 occurs, the duplicate segment descriptor entry at the end of the segment in the cache store may be utilized to destage the cache segment to the disk.

In FIG. 76A, the module 7603 loads certain information regarding the SDT entry into the staging buffer. CEF1 is fetched and saved in GA. CMDQ2 is fetched, the four low order SDRA bits saved, and loaded into GA with the device number. The device number and SDRA are then saved in the control store. BX is loaded with an address for addressing the staging buffer. HH is reset and the value 1 is entered into HL. HR is then stored at the address specified by BX in order to set the Written To bit at that location. BX is then loaded with a pointer to a second staging buffer address in order to also set the Written To bit at that location. HL is cleared, BX is incremented, and the location in the staging buffer specified by BX is cleared. BX is then set to the value 07E1 in order to clear this location in the staging buffer. BX is incremented and the device number and SDRA fetched from the control store and stored in the staging buffer at location 07E2. BX is again incremented, CEF3 fetched from the control store to get the file number, and the file number is stored in the staging buffer at location 07E3. BX is then set to the value 0FE3 and the file number also stored at this location. BX is cleared, the Write Latch CC4 is set, and IX is set to ROLTAB.

The first roll table entry is fetched to HR and tested to see if the valid bit is set. If it is, then the routine proceeds to FIG. 76C to read the first segment from cache. CXFRI is fetched to HR to get the indicators and HH is ANDed with 0023 to test if this is a single even, first merge or odd starting address. If it is not, CACOFF is fetched to HR to get the 32-bit offset. HH is loaded into BX and DTPSTW is loaded into GA. GA is then ORed with 0002 and the result entered into PS630. The Host To Buffer Transfer routine is then called to transfer the first segment of data from the host to the staging buffer.

After the first segment has been loaded into the staging buffer, ROLLSG is fetched and loaded into IX. The first roll table entry is fetched from the control store and the valid bit tested. If there is a valid roll table entry the routine proceeds from decision point 7637 to module 7643 where the cache write length (CACWRT) is fetched from the control store and entered into CACURR, the current I/O length.

Figure 76B:
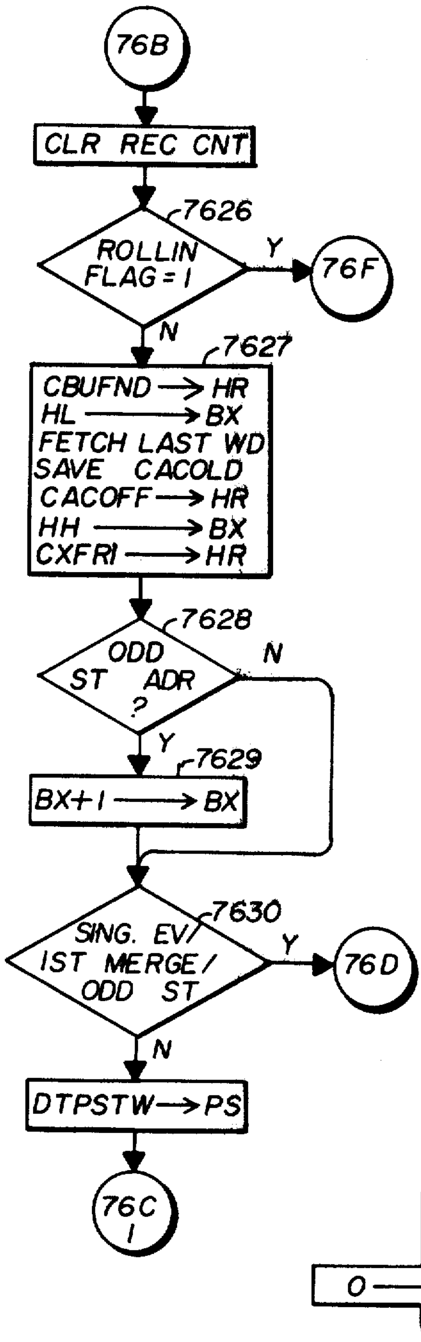
Figure 76C:
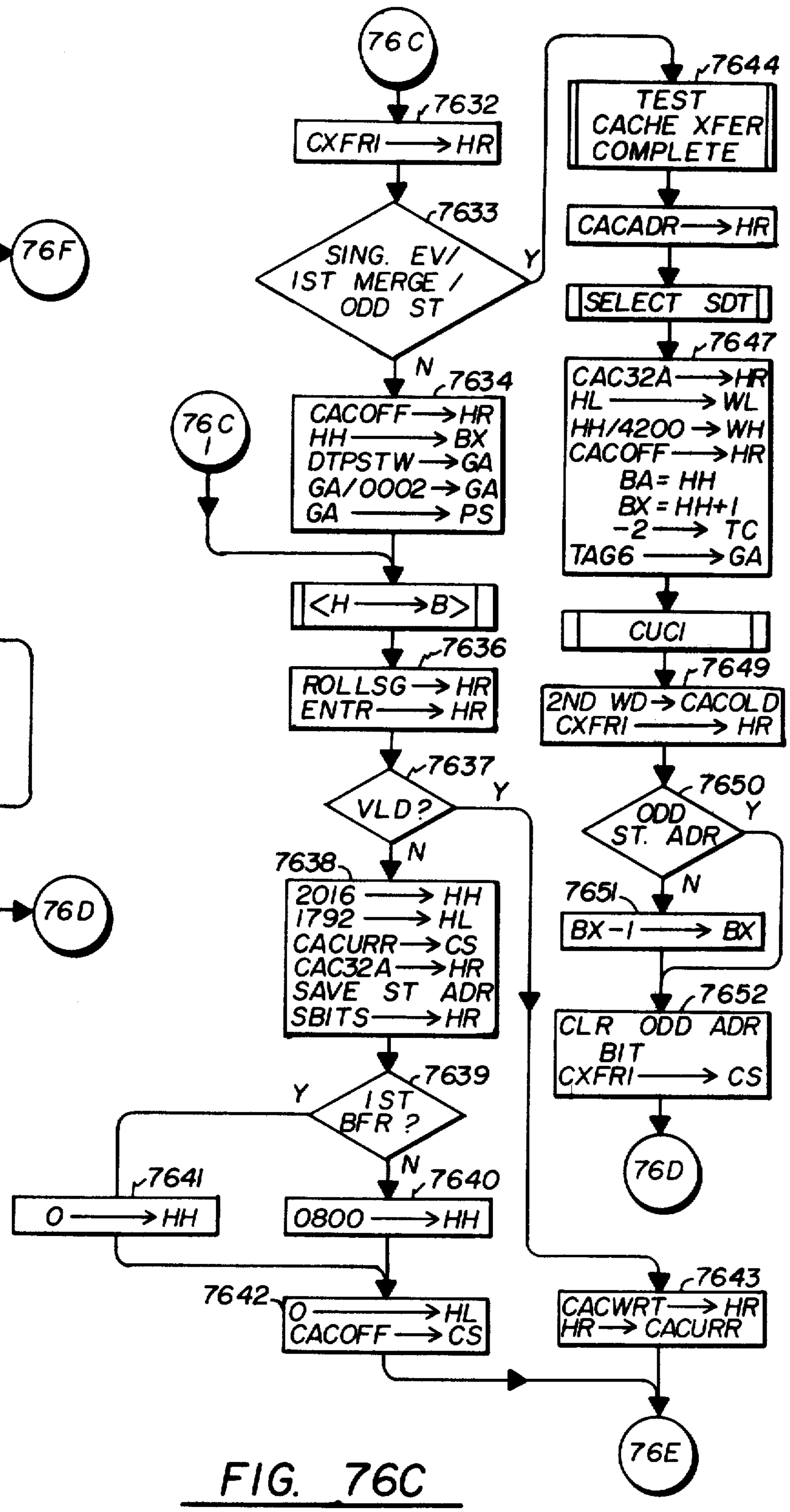
Figure 76E:
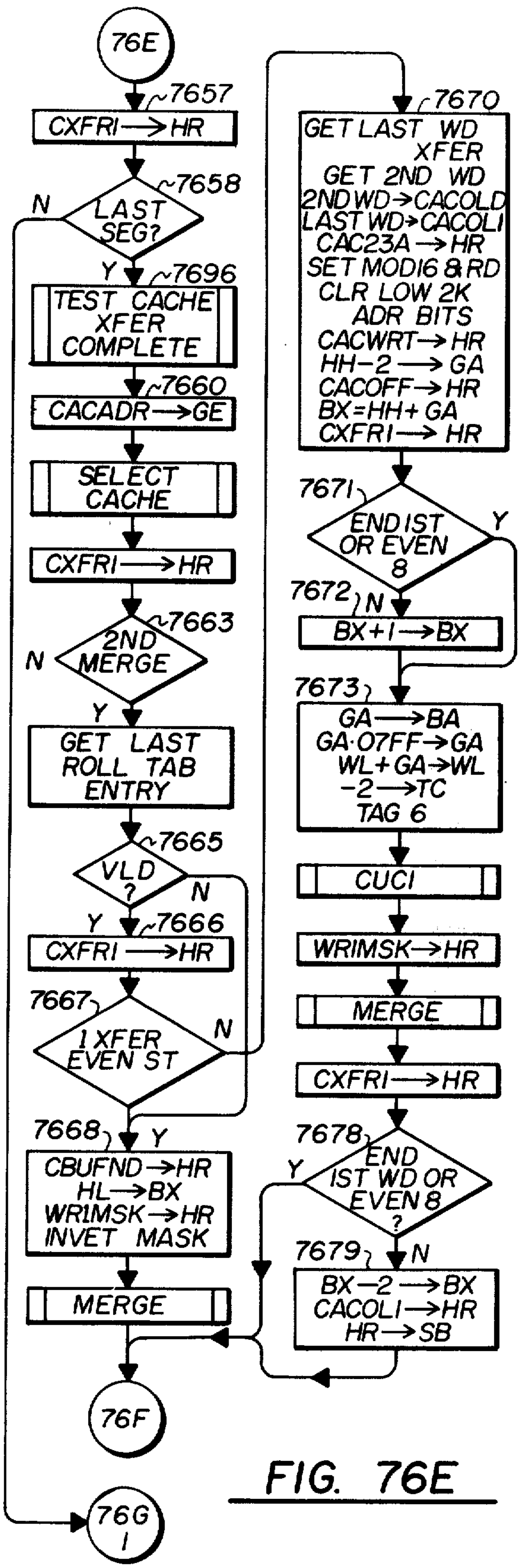
Figure 78C:
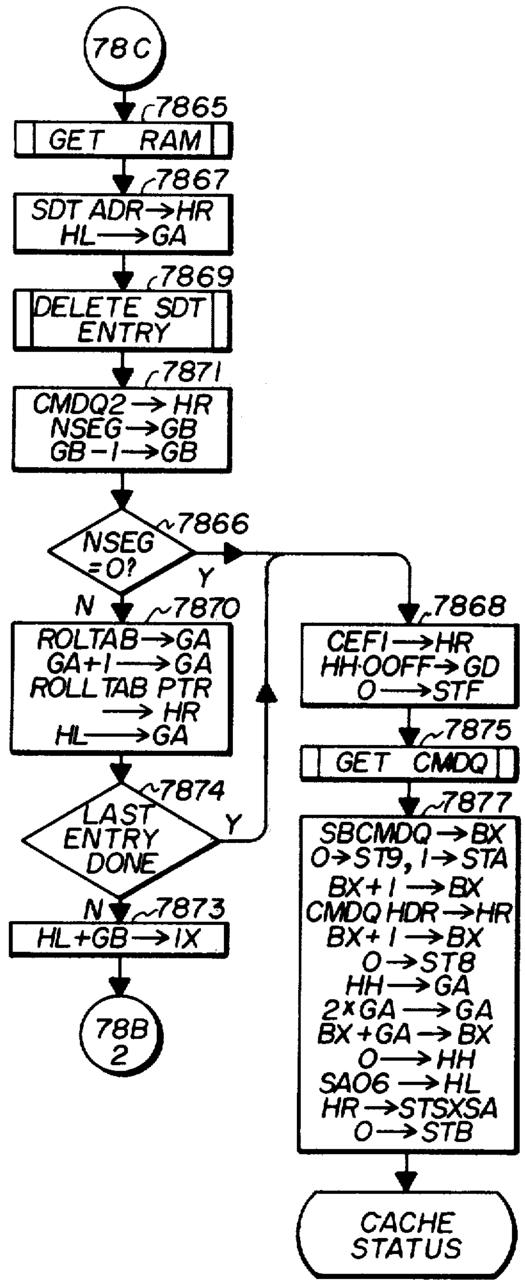
FIGS. 78A-78D—DISPERSED WRITE CONTROL

The routine then proceeds to FIG. 76E where CXFRI is fetched to HR and the lower half word tested to see if it is zero, that is, if this is the last segment left to the transferred. If this is the last segment to be transferred, the routine proceeds to module 7696 which calls the Test Cache Transfer Complete subroutine.

The Normal Write and Normal/Dispersed Read Control routine utilize the two logical 8k staging buffer areas in the Staging Buffer 800 to allow overlap of other types of transfers. These routines merely start the cache transfer and only check for the end of the transfer before starting the next cache transfer. The Test Cache Transfer Complete routine actually performs the testing for completion of the transfer and at the completion executes SPOP 83 to reset the ADT branch, reset the Transfer In Progress Indicator bit in the SBITS and enters zero into GA to show that no error occurred during the transfer.

At the completion of the Test Cache Transfer Complete subroutine, the Normal Write Control routine fetches CACADR, the current cache address from the roll table entry, and loads it into GE in preparation for transferring the last segment. The Select SDT/Cache subroutine is called to select and reserve the cache for the transfer of the last segment. CXFRI is fetched and ANDed with 000C to find out if a second merge is indicated. If it is, the routine prepares for a post-read and merge by fetching the last roll table entry and testing the valid bit. If the valid bit is set CXFRI is fetched and ANDed with 0020 to test if this is a single transfer with an even starting address. If it is, there is no need to post-read from cache. The routine proceeds to module 7668 where it fetches the buffer ending address and enters the last word transferred into BX. The merge mask WR1MSK is fetched to HR and inverted. STC is set and the Merge subroutine is called to merge the preread and channel data in the staging buffer. After the merge operation the routine proceeds to FIG. 76F where preparations are made for transferring the merged data to cache. ROLLSG is fetched and stored at ROLACC to update the Cache Transfer Pointer. GA is set to 07E0 to point to this location in the staging buffer. The SBITS are fetched and ANDed with 0020 to test to see if this is the first buffer. If it is, GA is reset to 0FE0 and if it is not GA is left unchanged. GA is then loaded into the BA counter and GA is loaded with 07E0 and preparations are made for writing the four word SDT copy at the end of the cache segment.

The cache starting address (CAC32A) is fetched, the lower eleven orders of the address masked off, and the result entered into WL. The buffer offset in GA is added to WL and the result returned to WL. HH is ORed with 8400 to provide an indication to write four words. The value $-4$ is entered into TC, TAG 6 is entered into GA and STC is set. Next, STD is set and the Control Unit-Cache Interface (CUCI) subroutine is called to set up the interface for the transfer. After the CUCI subroutine, the Normal Write Control routine resets STE and enters 8000 into GA to indicate a write operation. STC is reset and a call is made to the Buffer To Cache Transfer subroutine to transfer the four word SDT copy to the cache.

After the four words have been transferred, the SBITS are fetched, the ADT Transfer Started bit is set, and the SBITS returned to the control store. The Roll Table Pointer is fetched to HL, incremented, and returned to the control store. The incremented roll table pointer is also loaded into IX in order to fetch the roll table entry. The Occupied bit is tested to see if it has been set. If it has not, the Test Cache Transfer Complete subroutine is again called and at the completion of this routine SDTINF, the SDT select information, is fetched from the control store and entered into GW. STF is reset and the Get/Put Global Variables subroutine called to fetch the global variables from the SDT RAM to the staging buffer. GA is set to A800 as an indication that the Written To and Valid bits should be set and the TACK bit reset when the SDT is updated. A call is then made to the Update SDT routine to update the SDT entry.

CMDQ1 is then fetched from HR, and the Mode bits masked and tested to see if this is a STORE THRU command. If it is, an exit is taken to the Store Thru Normal Write Control routine illustrated in FIG. 85.

If a STORE THRU command is not being executed, CEF1 is fetched from the control store into HR, STF is reset and a call is made to get the command queue. SBCMDQ is loaded into BX as ST9 is reset, BX is incremented as STA is set, and BX is incremented again as the command queue header is fetched to HR. HH is loaded into GA as ST8 is reset, and GA is multiplied by two with the result being returned to GA. The contents of GA are then added to BX to obtain the command queue entry address. HH is set to sero and Status Action 6 is loaded into HL after which HR is stored at STSXSA. STB is reset and the routine exits to the Cache Status routine in FIG. 74A in preparation for sending CE,DE to the host.

Returning to FIG. 76A, at decision point 7605, if the valid bit is not set it indicates a miss so preparations are made to read a full segment from the disk. ROLLSG is fetched from the control store and stored at ROLACD to update the pointer to the roll table entry involved in a disk transfer. The SBITS are fetched and ANDed with 1000 to test to see if a First Seek has been done. If it has, the Check And Execute Seek Or Head Advance subroutine is called. This subroutine uses the SBITS, SRCHAR and CDCCHS to determine if a Seek or a Head Switch is required. If a Head Advance is required the routine advances the head to the correct position. If a Seek is required the subroutine initiates the Cache Seek Start subroutine which issues a Seek Start and a Set Sector to the selected disk drive device.

At the conclusion of the Cache Disk Head Advance Or Seek subroutine, the Normal Write Control routine prepares to read from the disk. The OP register is ORed with 0002 to set the Address Mark/Index Search bit. OP is then ORed with D600 to set the orientation parameters. HH is set to 448 which is the word prep length for a type 8450 disk drive device. HL is set to zero and HR is then stored at WLNGTH. STGOFF, the previous offset, is fetched and HH is set to BX and saved at STGOFF. A call is then made to the Buffer To Host/Disk To Buffer Transfer subroutine. This subroutine searches for a starting record on a particular cylinder and head and reads all of the data into the staging buffer. Optionally, all or a part of a segment may be transferred from another part of the staging buffer concurrently.

After the data transfer has taken place, a check is made to see if multi-disk records are involved, and CDCCHS and SRCHAR are updated. The current record number SRCHAR is fetched from the control store, incremented, and returned to the control store. The SBITS are fetched and the Seek Request and Head Request bit is reset. HL is incremented to keep track of the number of records in the segments. HL is then ANDed with the value 4 to see if four records (one segment) have been transferred.

Assuming four records have not been transferred, the SBITS are stored to save the record count. The Check And Execute Seek Or Head Advance subroutine is again called and at the completion of this subroutine the program loops back to module 7609. After four records have been transferred, the test at decision point 7612 directs the program to FIG. 76B where the record count is cleared and the SBITS fetched for ANDing with 0100 to see if the ROLL IN flag is set. If it is not set, CBFUND is fetched and entered into BX to point to the end of the transfer. The word at the address pointed to is fetched and stored at CACOLD, the save area for data to merge. CACOFF is then fetched to obtain the 32-bit offset which is entered into BX to point to the first word of this transfer. CXFRI is fetched and ANDed with 0001 to find out if there is an odd starting address set. If there is an odd starting address then BX is incremented and the routine proceeds to decision point 7630. If the starting address is not odd then the routine proceeds from decision point 7628 to decision point 7630.

At decision point 7630, HH is ANDed with 0023 to test for a single even/first merge/odd starting address. Assuming for the moment that the test proves false, PS is set to DTPSTW and the routine proceeds to FIG. 76C where it calls the Host To Buffer Transfer subroutine. From this point on the operations are as described above.

Returning again to FIG. 76A, if the test at decision point 7607 indicates that a first seek has not already been done, the routine proceeds to decision point 7615 where ST5 is tested to see if we are dealing with a disk drive device with fixed heads. If we are, the routine proceeds directly to module 7621. If we are not, it is necessary to issue a seek to the disk drive device.

CEF1 is fetched to obtain the disk drive device address which is loaded into GA. The Select Cache Drive subroutine is then called. This subroutine selects the drive indicated in GA. The status of the drive is left in GA when the subroutine returns to the caller. Upon completion of the subroutine GA is tested to see if the device called is busy. If it is, the program loops back to decision point 7615 to again try to select the drive. If it is not busy ROLSAR, the first seek argument, if fetched and stored at the address reserved for the cylinder, head, sector argument for cache seek (CDCCHS). Next, ROLREC is fetched and stored at the location reserved for SRCHAR, the search argument. In SRCHAR, bytes 0 and 1 hold the record number for non-cache codes and bytes 2 and 3 hold the record number for cache code.

The Cache Seek Start subroutine is then called to issue a Seek Start and a Set Sector to the selected device.

Upon return from the Cache Seek Start subroutine, the SBITS are fetched and ORed with 1000 to set the First Seek Done bit. The SBITS are then returned to the control store and CXFRI is fetched to get the segment count. HL is then tested to see if this is the last segment. If it is not, CACOFF is fetched and tested for a zero offset. If the offset is not zero then a preread is required and the program branches to module 7609 and proceeds as previously described. At decision point 7622, if the test shows that this is the last segment then the program also branches to the module 7609.

At decision point 7624, if the offset is equal to zero the SBITS are fetched and the Segment 1 bit set. The SBITS are then returned to the control store and the program proceeds to FIG. 76G where the Host To Buffer Transfer subroutine is called. The Wait For Cache Transfer Complete subroutine is then called to wait for the completion of the host to buffer transfer.

After the transfer is complete ROLLSG is fetched and the cache transfer pointer ROLACC updated ad returned to the control store. The cache bus out address CACADR is fetched and entered into GE after which the SDT/Cache Select and Reserve subroutine is caled to select and reserve the SDT in preparation for writing the four word SDT copy at the end of the cache segment.

GA is loaded with the address 07E0. The SBITS are fetched and ANDed with 0020 to see if this is the first buffer area of the Staging Buffer 800. If it is, GA is left unchanged. If it is not, the value 0FE0 is entered into GA. GA is then loaded into the BA register and GA set to 07E0. CAC32A is fetched to get the cache starting address. The eleven low order address bits are cleared and the resulting address entered into WL. The buffer offset from GA is then added to WL and the result retained in WL. WH is ORed with 8400 to indicate a cache write operation. The complement of the value -4 is entered into the TC register, STC is set and TAG 6 is entered into the GA register. STD is set and a call is made to the CUCI subroutine to set up the interface for a data transfer. STE is reset and GA is set to 8000 to indicate a write operation.

Next, STC is reset and a call is made to the Buffer To Cache/Cache To Buffer Transfer routine. Since the write indicator in GA is set this routine writes data from the staging buffer to the cache.

As soon as the transfer routine is completed the SBITS are fetched and the ADT Transfer In Progress Indicator is set before the SBITS are returned to the control store. The copy of the SBITS in HR is then tested to see if the first seek has been completed. If it has not, the program branches immediately to module 7648. On the other hand, if the first seek is completed then the SBITS in HH are ANDed with 2000 to see if the Segment 1 Done bit is set. If it is not, it is set and the SBITS stored in the control store before proceeding to module 7648. In module 7648, ROLLSG is fetched to HR, incremented and returned to the control store. The SBITS are fetched to get the staging buffer indicators which are ORed with the contents of GB to set up a Head Advance or Seek Request. HH is XORed with 0020 in order to change the indicator to the alternate staging buffer area. The SBITS are stored and HH ANDed with 0020 to see if the First Buffer bit is now set. If it is, BX is loaded with the value 07E2 to point to the address for storage of SDT information in the staging buffer. GG and HH are cleared and HL is set to 0800 after which the contents of HR are stored at the location reserved for STGOFF.

The device number and SDRA are retrieved from the control store, SDRA is incremented, and the values are returned to the control store. The device number and SDRA in HR are stored in the staging buffer at the address 07E2. GG is entered into BX after which the transfer length CACWRT is fetched from the control store and stored in the address reserved for CACURR. STC is set and The Create Transfer Parameters subroutine called to calculate the parameters for the next data transfer. This subroutine uses the roll table entry to create a new cache starting address, and modifies the transfer parameters in CS according to the previous transfer. The parameters are also saved for each of the two logical buffers or staging buffer areas in Staging Buffer 800. The transfer parameters are the new cache cabinet selectable address in CACADR, the new cache starting address in CAC32A, the remaining total length in CAC32L, the current transfer length in CACURR and CACWRT, the current ending staging buffer address in CBUFND, indicators in CXFRI, and duplicate sets of these variables for either the first or second logical staging buffers. The variables are subsequently used for cache transfers.

After the Create Transfer Parameters subroutine is completed ROLLSG is fetched and entered into IX. CXFRI is fetched and tested to see if the last segment has been transferred. If it has not, the routine, returns to module 7661 to begin the next host to buffer transfer.

On alternate segment transfers, when the routine reaches decision point 7659, it will alternately find the first buffer SBIT Set or reset. If the bit is reset it means that the second logical buffer in Staging Buffer 800 is to be utilized. The value 0FE2 is entered into BX, GG and HH are both set to 0800 and HL is set to F7FF. The routine then proceeds to module 7676 as decribed above.

At decision point 7669, if the test shows that the next segment to be transferred is the last segment the routine branches back to FIG. 76A where it executes the instruction in module 7604 and proceeds from that point as described above.

Figure 76F:
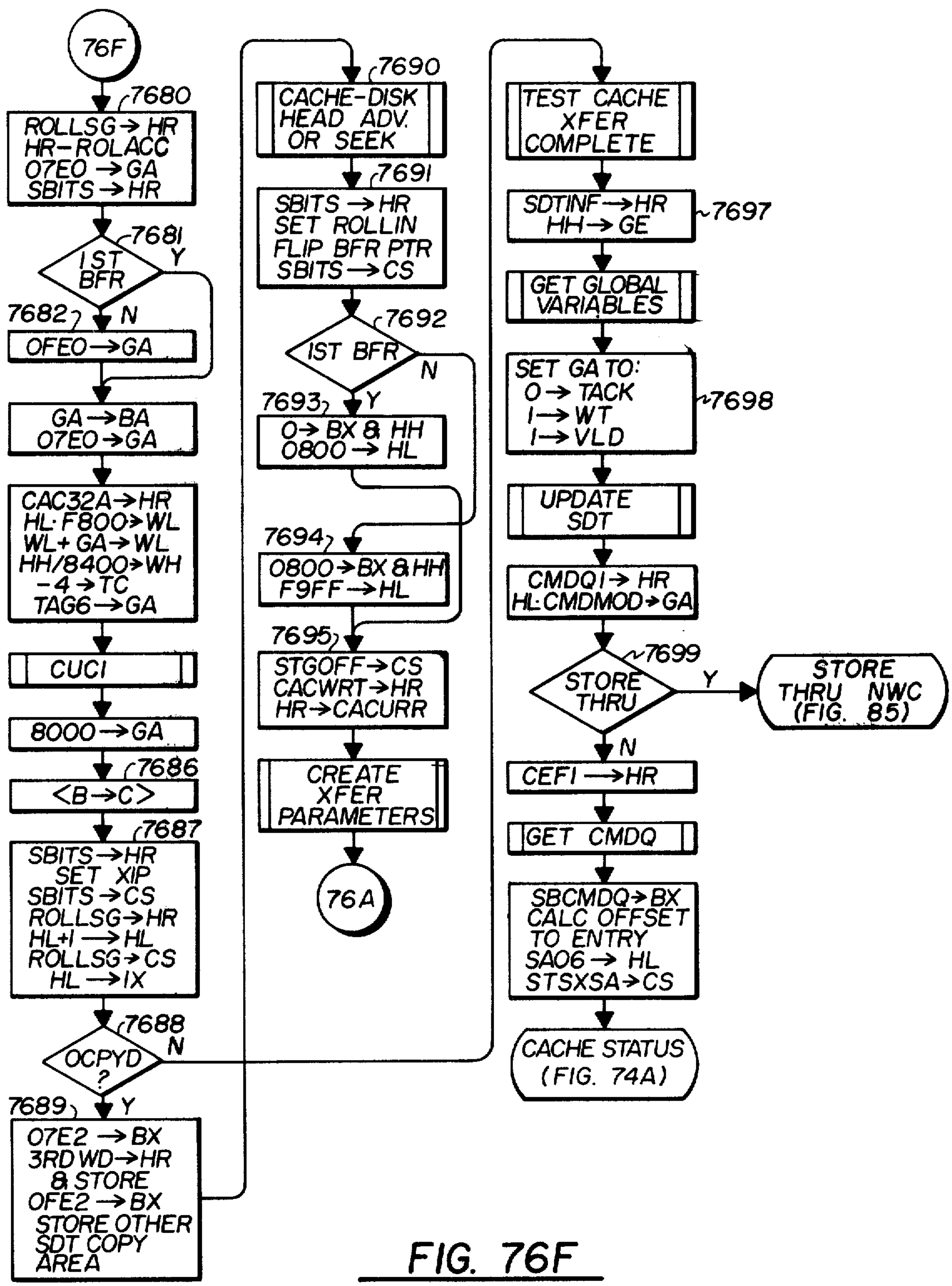

In FIG. 76B, at decision point 7626, if the test reveals that the ROLL IN flag is set the routine branches to module 7680 in FIG. 76F and proceeds as described above.

At decision point 7630 (FIG. 76B), if the test shows that the single even/first merge/odd starting address indicator is set the routine branches to FIG. 76D to initiate the first merge operation. The PS register is set up using CACOFF. CACOFF is fetched to HR to get the 36-bit offset and the three least significant bits are saved in GB 4-7. DTPSTW, the base PS value for a write operation, is loaded into GG and ORed with 0002. GG is summed with GB and the result entered into PS.

Next, one word is obtained from the host before the merge operation. GA is set to one and a Wait routine is called to wait for the first word. RW4 is set to turn on the SERDES Write Shift Enable and STE is set. The pre-read mask WROMSK is fetched, STC is set, and the Merge routine called.

CACURR is fetched to HR, HH is decremented by two and HL is decremented by one. CACURR is then returned to the control store.

At this point the routine branches to FIG. 76C where the Host To Buffer Transfer routine is called after which the Normal Write Control routine proceeds as described above.

At decision point 7633 (FIG. 76C) if the test indicates that the Single Even, First Merge or Odd Starting Address Indicator is set then a pre-read is required. The Test Cache Transfer Complete subroutine is called after which the cache address CACADR is fetched and entered into GE. The Select SDT/Cache subroutine is then called. The cache starting address CAC32A is fetch to HR, HL entered into WL, and HH ORed with 4200 (to set modulo 16 and read) and loaded into WH. The 32-bit even offset CACOFF is then fetched to HR, HH loaded into BX to set the buffer address for the ADT, and HH is incremented and entered into BX. Minus 2 is entered into TC in order to read two words, TAG 6 is set into GA, and STC is set to indicate a Wait For Completion.

The CUCI subroutine is called and STD set to indicate a Wait For Transfer Complete. The second word is fetched and stored at CACOLD. Next, CXFRI is fetched to get the indicators and a test is made to see if the Odd Starting Address bit is set. If it is, the program proceeds immediately to module 7652. If its is not, BX is decremented before proceeding to module 7652.

HH is ANDed with 00FE to clear the Odd Address bit and CXFRI is returned to the control store. The routine then proceeds to FIG. 76D and from that point continues as described above.

In FIG. 76C, if the test at decision point 7637 shows that the valid bit is not set, HH is set to the value 2016 (decimal) while HL is set to the value 1792 (decimal) to change the transfer length to a full segment. HR is then stored at CACURR.

The cache starting address CAC32A is fetched, ANDed with F800, and returned to the control store. The SBITS are then fetched and tested to see if this is the first or second logical buffer area of the staging buffer. If it is, from decision point 7639 the routine branches to module 7641 where HH is set to zero after which the routine proceeds to module 7642. On the other hand, if the test at decision point 7639 shows that this is not the first buffer then the base address 0800 of the second logical buffer is entered into HH before the program proceeds to module 7642. In module 7642, HL is cleared and the contents of the HR register stored at CACOFF. The routine then continues in FIG. 76E as described above.

At decision point 7667 (FIG. 76E) if the test shows that we do not have a single transfer and even starting address then the program branches to module 7670 to read two words from cache before merging. BX is decremented to point to the last word transferred from the host. The last word is fetched to HR as BX is again decremented. The word is then saved at CACOLD as the next word is fetched under the control of BX. It is saved at CACOL1.

The cache address CAC32A is fetched to HR, HH ORed with 4200 to set the modulo 16 and read indications, and the result entered into WH. HL is ANDed with F800 to clear the eleven low order bits of the address and the result is entered into WL. CACWRT, the current transfer length, if fetched from CS, decremented by two for the pre-read, and entered into GA. The offset CACOFF is then fetched, ANDed to the transfer length in GA, and the result entered into BX. Bx now holds a value which is two less than the ending buffer address.

CXFRI is fetched and HH ANDed with 0018 to test for an ending first word or an even eight words. If the condition is true the routine proceeds directly to module 7673. If these conditions are not true then BX is incremented by one before proceeding to module 7673.

GA is loaded into BA to set the ADT pointer. GA is then ANDed with 07FF to get the offset within the segment. GA is added to WL and the resulting value, the actual starting address, is entered into WL. The value -2 is entered into TC in order to read two words. TAG 6 is entered into GA, STC is set to indicate a wait, and STD is set to indicate an extended operation. The CUCI routine is then called.

After the CUCI routine is complete the second merge mask WR1MSK is fetched from the control store to HR. STC is set and the merge routine is called. CXFRI is fetched to get the indicators and HH is ANDed with 0018 to again test to see if it is an ending first word or an even eight. If it is, the routine then proceeds to FIG. 76F and continues as described above.

If the test at decision point 7678 produces a negative result then BX is decremented by two, CACOLI is fetched and stored in the staging buffer at the address specified by BX before proceeding to the steps shown in FIG. 76F.

Figure 76G:
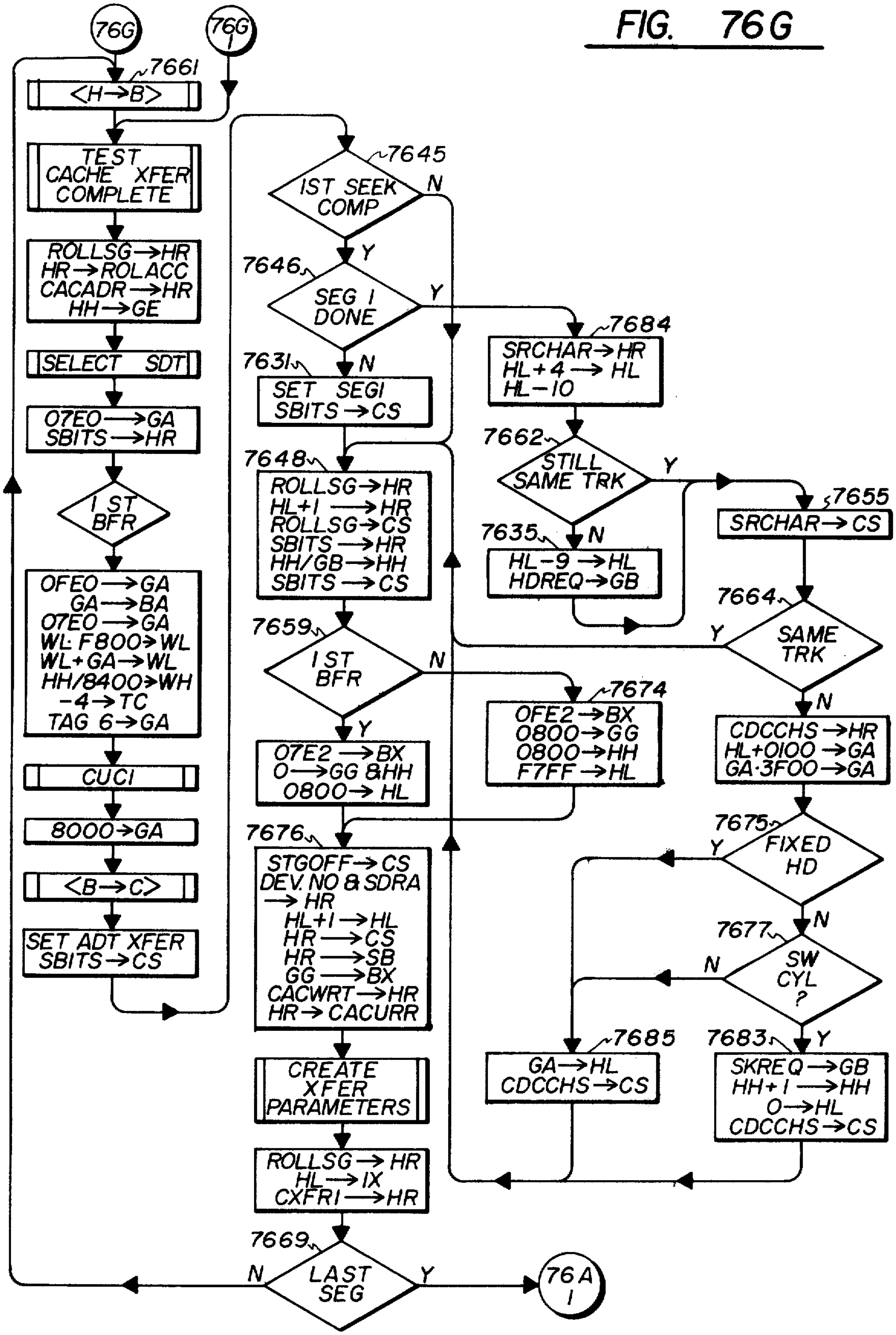

In FIG. 76G, if the test at decision point 7646 shows that the first segment is done, then SRCHAR and CDCCHS must be updated. The previous record number SRCHAR is fetched and incremented by four, the number of records in a segment. The value ten, the maximum number of records still on the same track, is subtracted from HL and the result tested to see if the next record goes on the same track. If it does not, the value nine is subtracted from HL in order to set the value to record on the next track. The value 0080 is entered into GB to indicate that a head advance is needed. The program then proceeds to module 7655.

If the test at decision point 7662 shows that the next record goes on the same track, then the routine proceeds directly to module 7655. The contents of HL are stored at the location reserved for SRCHAR in the control store. GB is then tested to see if the next record goes on the same track. If it does, the routine branches to module 7648 and continues as described above. If it does not go on the same track the current cylinder, head and sector value CDCCHS is fetched to HR. The value 0100 is added to HL to increment it to the next head number. The result is entered into GA and ANDed with 3F00 to isolate the head identification. At this point ST5 is tested to see if we are dealing with a fixed head disk drive device. If we are, then the routine proceeds directly from decision point 7675 to module 7685. If we are not, then a test is made to see if it is time to switch cylinders. If it is not, the routine branches to module 7685. If it is, the program proceeds to module 7683 where GB is loaded with the value 0040 to indicate that a seek is required. HH is incremented thereby incrementing the cylinder number. HL is cleared to reset the head and sector values. HR is then stored at the location reserved for CDCCHS after which the routine branches to module 7648 and continues as described above.

If the test at decision points 7675 and 7677 show a fixed head device, or a movable head device but no cylinder switching necessary, the operations in module 7685 are performed. The head count is updated by transferring GA to HL after which HR is stored at CDCCHS. The routine then proceeds to module 7648 and continues as described above.

ACQUIRE WRITE ROUTINE

The Acquire Write Routine is invoked after cache breakout has determined that the request is an ACQUIRE WRITE or a 1792 word boundary write and enough empty segments are available in cache. The routine determines for each requested segment whether it is valid or not. If any invalid segment is encountered then the command code is changed to a normal write and the request is queued. Subsequently, CE status is presented to the host and the routine exits to the idle loop.

Following the tests of the preceding paragraph, all requested segments are checked for hits. If a hit is found the segment age is made most recently used. If a miss is found then an SDT entry is formed. Subsequently, all segments are transferred from host to cache and the SDT entries marked with Valid=1, Written To=1 and TACK=0. After all segments have been processed, CE,DE status is presented to the host and the routine then returns to the idle loop.

Figure 77:
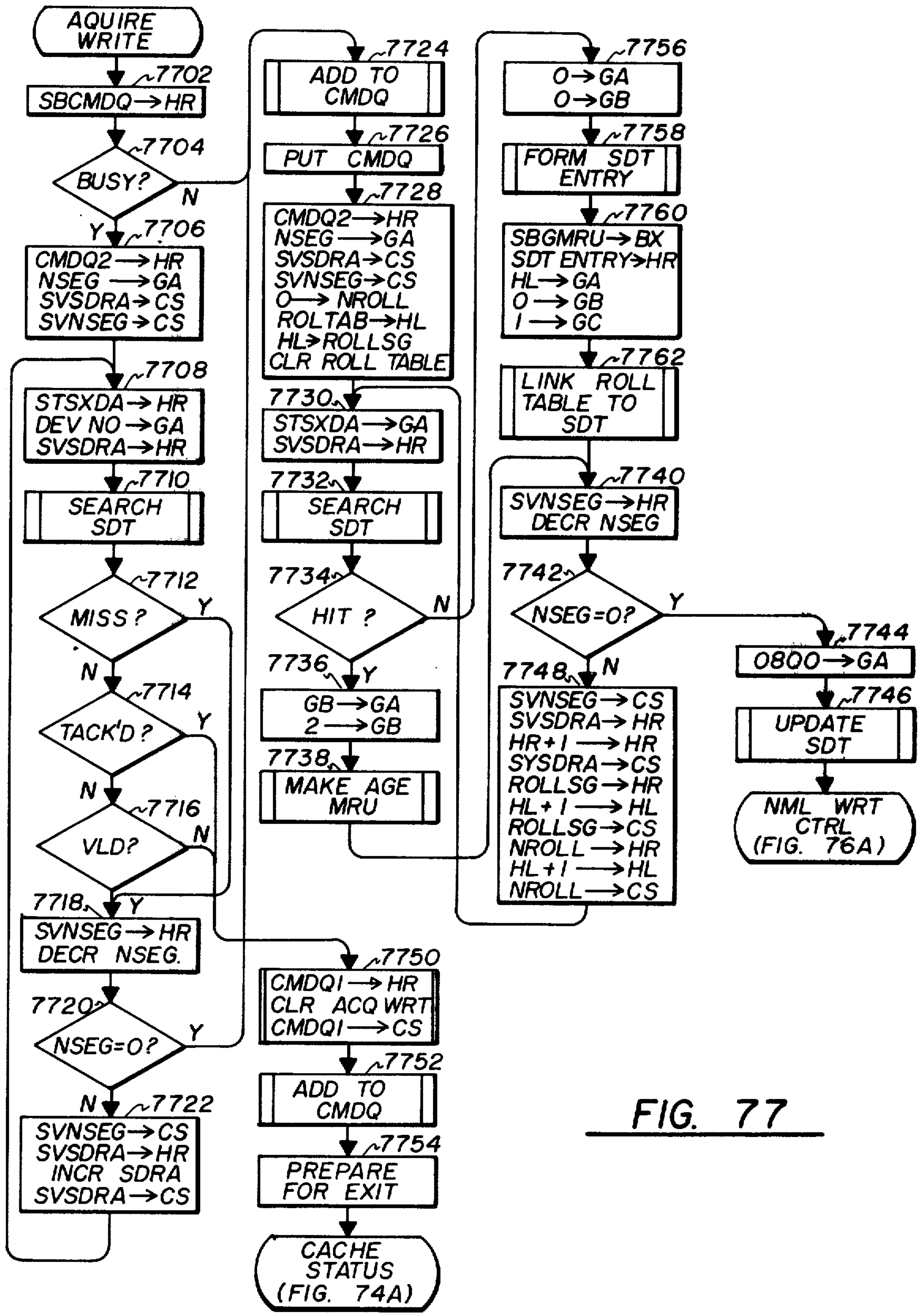

The Acquire Write routine is illustrated in FIG. 77. It begins by loading the address of SBCMDQ into BX and fetching the first command queue header word. The header word is tested to see if the command queue is busy. If it is not, the Add To Command Queue subroutine is called. If there is a good return from the subroutine then the Get/Put Command Queue subroutine is called to put the command queue back in SDT RAM.

CMDQ2 is fetched and NSEG entered into GA. The four lower order bits of SDRA are saved in HH and stored at SVSDRA. NSEG is then transferred from GA to HH and saved at SVNSEG. HL is cleared and stored at NROLL to reset this value. ROLTAB is fetched to HL and then stored at ROLLSG to set ROLLSG to the first of the roll Table. ROLTAB is then entered into IX, HR cleared, the roll table size entered into GA, and a sequence of instructions executed to clear the roll table.

The device address at STSXDA is fetched and loaded into GA. The next SDRA value SVSDRA is fetched to HR and a call is made to search the SDT.

If the Search SDT subroutine produces a hit the SDT Entry Pointer in GB is transferred to GA and the value two is entered into GB to indicate a link to roll table without ROLL IN. The subroutine is then called to make the age of the entry MRU.

The routine then proceeds to module 7740 to check for more segments. SVSNSEG is fetched, NSEG decremented and tested to see if it is zero. If it is zero, then the valid indicator 0800 is loaded into GA and the Update SDT subroutine called. After this subroutine is completed an exit is taken to the Normal Write Control routine.

At decision point 7742, if the test of NSEG shows that it is not zero then the routine proceeds to process the next segment. SVNSEG is stored. SVSDRA is fetched, SDRA incremented, and returned to the control store. ROLLSG is fetched, incremented and returned to the control store as is NROLL. After these parameters have been updated the routine branches back to module 7730 and proceeds to process the next segment.

At decision point 7734, if the SDT search produced a miss indication an SDT entry is formed and the roll table is linked to the SDT. GA and GB are both set to zero to request a normal entry while skipping the linking of the roll table to SDT. The Form SDT Entry subroutine is then executed.

Upon completion of the Form SDT Entry subroutine SBGMRU is entered into BX in order to fetch the SDT entry formed by the Form SDT Entry subroutine. GA is set to HL as an input parameter for the Link Roll Table subroutine about to be called. GB is set to zero to indicate no roll in. GC is set to one to indicate valid. The Link Roll Table To SDT subroutine is then called. Upon completion of the Link Roll Table To SDT subroutine, the Acquire Write routine proceeds to module 7740 and continues as described above.

At decision point 7704, if the test shows that the command queue is busy then CMDQ2 is fetched and NSEG saved in GA. The SDRA bits are saved at SVSDRA and GA is transferred to HH and saved at SVNSEG. The circuits are then set up for a search of the SDT to check for a hit or a miss. STSXDA is fetched to get the device address which is placed in GA. SVSDRA is fetched to HR and the Search SDT subroutine is called. Upon completion of the SDT search routine a check is made to see if it produced a hit or miss. If it produced a miss, we wish to keep checking segments. The routine jumps to module 7718 where SVNSEG is fetched and NSEG decremented and tested to see if it is zero. If it is zero, the routine proceeds to the Add to Command Queue module 7724 and from there it proceeds as described above.

If NSEG is not equal to zero, NSEG is saved as SVNSEG, SVSDRA fetched and SDRA incremented and returned to SVSDRA. The routine then loops back to module 7708 to begin another search of the SDT.

At decision point 7712, if the SDT search produced a hit then BX is loaded with SBSDT2, the pointer to the SDT entry word 2 in the staging buffer. This word is fetched to HR and ANDed with 4000 to see if the SDT segment is tacked. If it is not, then the contents of HH are ANDed with 8000 to see if the valid bit is set. If it is, the routine proceeds to module 7718 and from there proceed as described above.

If the test at decision point 7714 shows that the segment is tacked, or if the test at decision point 7716 shows that the segment is not valid, the routine proceeds to module 7750 where CMDQ1 is fetched and ANDed with FF7F to turn off the Acquire Write indicator. CMDQ1 is then returned to the control store and the Add To Command Queue subroutine called. After completion of the subroutine preparation is made at module 7754 to exit to the Cache Status routine. The preparation for exit includes resetting ST9, STA and STB and setting ST8 to indicate CE,SM status. Status Action 10 (Wait For Device End) is stored at STSXSA for use by the Cache Status routine.

STORE THRU

Figure 83:
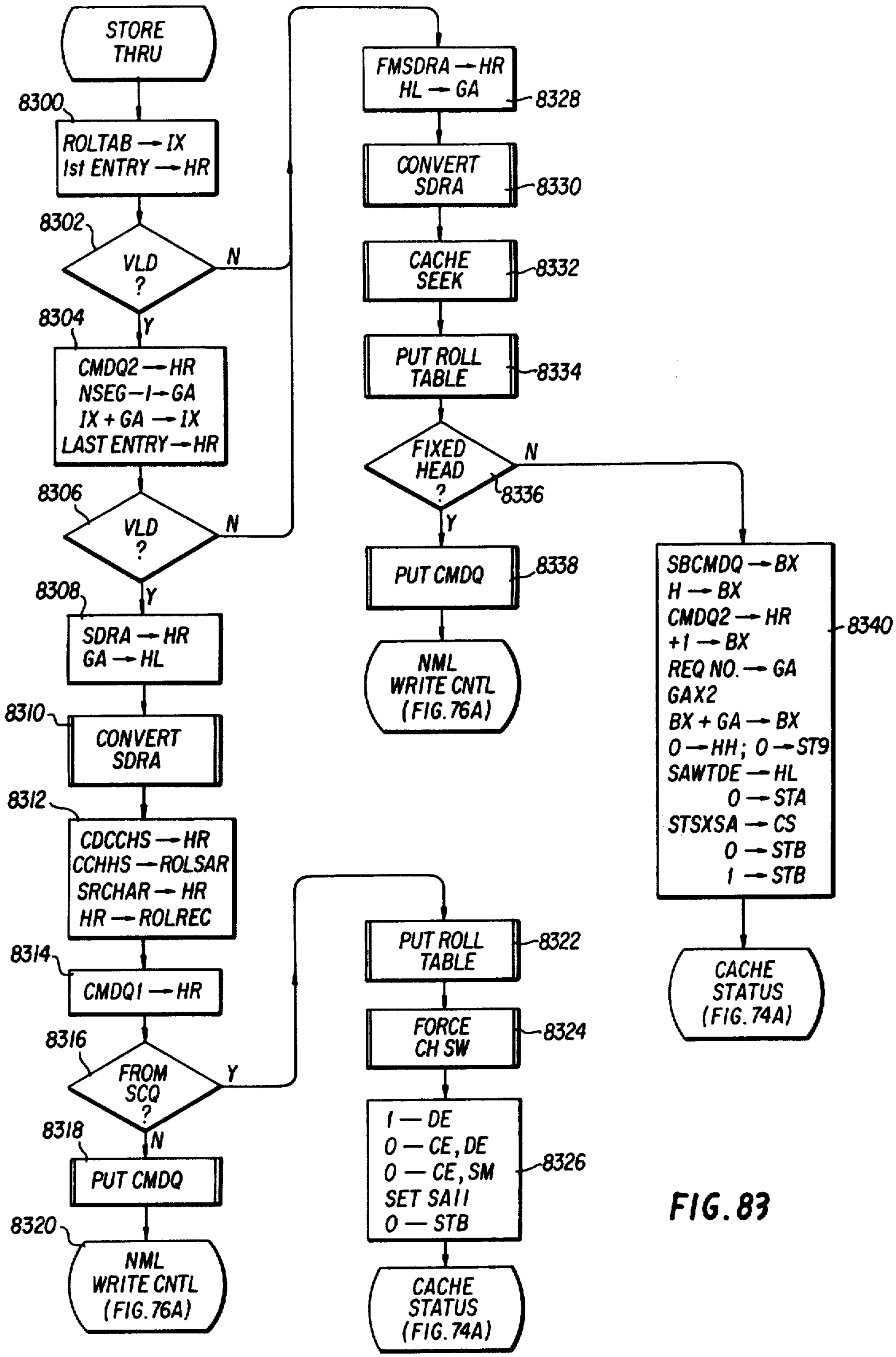

The Store Thru routine illustrated in FIG. 83 is invoked from the Read/Write routine after the SDT and roll table entries have been formed. If the first and last segments are not available in cache, a preread is required. A Device Seek is started and disconnection status is presented to the host.

If the first and last segments are valid then all segments are transferred from host to cache under the control of the NormaL Write Control routine in response to the first EF.

Implicit inputs for the Store Thru routine include the SDT with all segments formed, and a valid roll table. Implicit outputs include Device Seek started if not FLHIT, and data transferred from host to cache.

The routine begins by bringing the pointer to the first entry in the roll table into IX in order to obtain the first entry. The Valid bit is checked and if it is set (a hit) CMDQ2 is fetched from the control store. NSEG is isolated, the value 1 subtracted therefrom and the result entered into GA. IX is then added to GA and the result entered into IX in order to get the last entry in the roll table. If the last roll table entry is valid the SDRA value saved from the Cache Command Decode routine is fetched from the control store to HR and GA is entered into HL. A call is then made to the Convert SDRA routine which converts the SDRA to a Cylinder-Head-Record-Sector Address which is needed for the Disk Seek operation. The conversion is done by a series of division operations and, for one known type of disk drive device, the parameters include 67.5 segments per cylinder, nine records per track, four records per segment, and 30 tracks per cylinder. When the Conversion routine is completed the cylinder, head, sector is stored in CS at CDCCHS and the record number is in CS at SRCHAR.

Upon return from the conversion routine CDCCHS is fetched to HR and then saved in the roll table at ROLSAR. SRCHAR is fetched and the record number saved in the roll table at ROLREC. A test is then made to see if this is a service of the command queue. CMDQ1 is fetched and bit 16 tested. If bit 16 is not set then it is not a service CMDQ so the Get/Put Command Queue subroutine is called to return the command queue to the SDT RAM after which an exit is taken to the Normal Write Control routine.

At decision point 8316, if the SCQ bit in CMDQ1 is set, STF is set and the Get/Put Roll Table subroutine called to transfer the roll table from the staging buffer to the SDT RAM. Next, the Force Channel Switch subroutine is called which uses the HOST ID in the CMDQ entry to index into the HOST ID Table to find out which channel is connected to this host. The SCU is then force switched to that channel.

After the Force Channel Switch subroutine, preparation is made for exiting to the Cache Status routine. The DE Request bit (ST9) is set, the CE,DE bit (STA) is reset and the CE,SM Request bit (ST8) is reset. SBCMDQ, the base address of the command queue table, is entered into BX and incremented in order to fetch the Active Command Request Number. The request number is multiplied by two to form the relative address of the command and this value is then added to SBCMDQ+2 to fetch from SB the Active Command Absolute Address. Status Action 11 is entered into HL and stored at STSXSA to save it for the Cache Status routine. The Control Command Status Bit (STB) is reset and an exit made to the Cache Status routine.

If the Valid bit for the first roll table entry is not set when tested at decision point 8302, or if the Valid bit for the last roll table entry is not set when tested at decision point 8306, the routine branches to module 8328 in order to convert SDRA and start a Seek operation. FMSDRA is fetched from the control store where it was stored during the Read/Write routine. The SDRA is loaded into GA and the Convert SDRA subroutine called to perform the operations as described above. At the conclusion of the Convert SDRA subroutine, the Cache Seek subroutine is called with STD being reset thereby indicating that a Wait should not be made for a Seek Complete. The Get/Put Roll Table subroutine is called with STF set in order to put the roll table back in the SDT RAM.

ST5 is tested to see if we are dealing with fixed heads. If we are, the Get/Put Command Queue routine is called to put the command queue back in the SDT RAM. The Normal Write Control routine is then invoked.

At decision point 8336, if ST5 is not set, that is we do not have fixed heads, the routine proceeds to module 8340 to prepare to send CE,SM Status Action 10. SBCMDQ is entered into BX in order to point to the CMDQ in the staging buffer. BX is incremented and then incrementrd again as CMDQ2 is fetched to HR. The Request Number is entered into GA, multiplied by 2, and added to BX to obtain the Active Command Absolute Address in the staging buffer. HH is set to zero as ST9 is reset. The value 0040 is entered into HL as STA is reset. HR, which now contains Status Action 10, is stored at STSXSA. STB is reset, ST8 is set and an exit taken to the Cache Status routine in order to present CE,SM status to the host.

SERVICE COMMAND QUEUE ROUTINE

Figure 84:
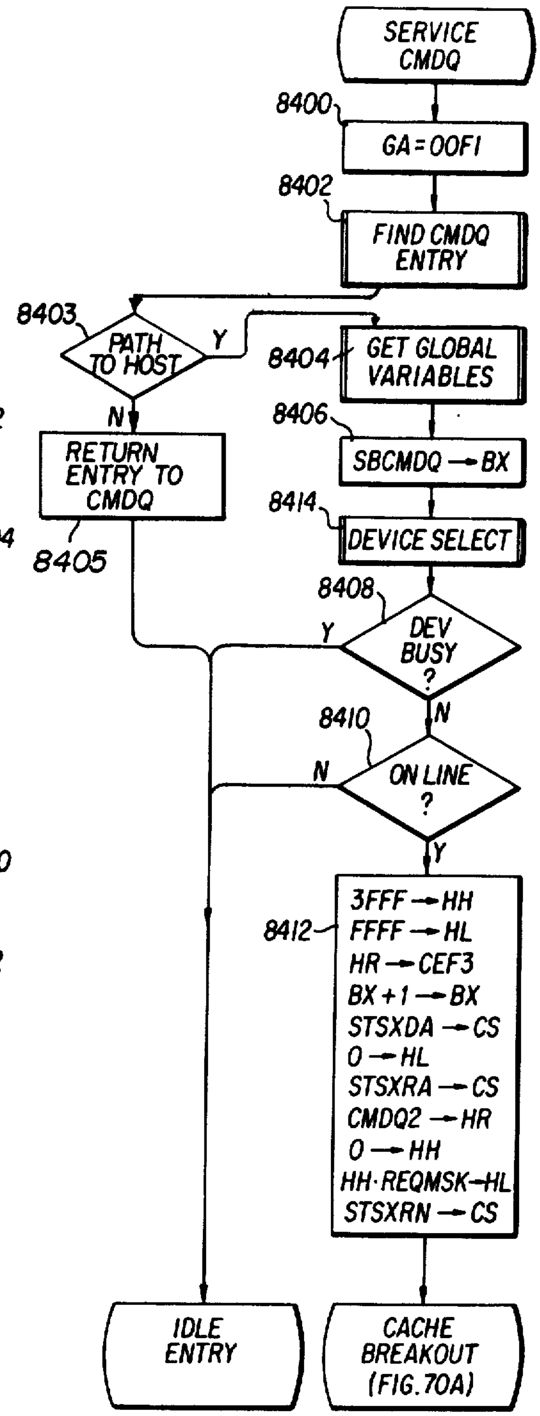

FIG. 84 illustrates the Service CMDQ routine. This routine calls the Find Command Queue Entry to get the next command queue entry in priority from the command queue in the staging buffer. The entry is checked to find out if the SCU which is about to process the entry has a path back to the host. If it does, the routine then selects the disk and transfers control to the Cache Breakout routine if the device is on line and not busy.

At the conclusion of the routine, CMDQ1 and CMDQ2 are in the control store, the device is selected, the global variables are loaded at the location SBGLOB in the staging buffer and CEF3 is set to 3FFF,FFFF.

The routine begins at step 8400 by entering 00F1 into GA in order to set the indicator for finding the next command queue entry. The Find Command Queue Entry subroutine is then called at step 8402 to find the command queue entry. The HOST ID table is checked at step 8403 to see if this SCU has a path back to the host specified in the first word of the command queue entry. If it does not, the entry is returned to the command queue at step 8405 and an exit taken to the Idle Entry routine. The Idle Entry routine is not shown but, generally speaking, checks to see if any attention is owed a disk drive device before proceeding to the Idle routine.

If the SCU has a path back to the host then at step 8404, STF is reset and a call is made to a subroutine to get the global variables from the SDT RAM and place them in the staging buffer. SBCMDQ is set into BX at step 8406 in order to fetch the Command Queue Header. The device number from the Command Queue Header is stored in GA and a call is made at step 8414 to the Device Selection routine. Upon return from this routine GA contains indications as to whether or not the device is busy and/or on line. If the device is not busy (step 8408) and is on line (step 8410) then at step 8412 3FFF is entered into HH and FFFF entered into HL and HR stored at CEF3.

The Command Queue Header is fetched and the Device Address isolated and saved at STSXDA for use in the Cache Status routine. HL is cleared and HR stored at STSXRA as the recovery action. CMDQ2 is fetched to HR, HH is cleared and HH ANDed with the Request Mask 0007 with the result being saved at STSXRN. An exit is then taken to the Cache Command Breakout routine.

If the device is busy at decision point 8408 or is not on line at decision point 8410 an exit is made to the Idle Entry routine.

STORE THRU NORMAL WRITE COMPLETE ROUTINE

The Store Thru NWC routine is called from the Normal Write Control routine after the host to cache transfer has been completed. The Store Thru NWC routine is invoked after the Disk Seek has been started and loops to wait for Seek Complete. Subsequently, the routine transfers the segments from cache to disk. After updating the SDT, the current CMDQ entry is deleted. CE,DE status is presented to the host.

Implicit inputs for the routine include the SDT and a valid roll table as formed in the Read/Write routine. During the routine the SDT is updated and data is transferred from cache to disk.

Figure 85:
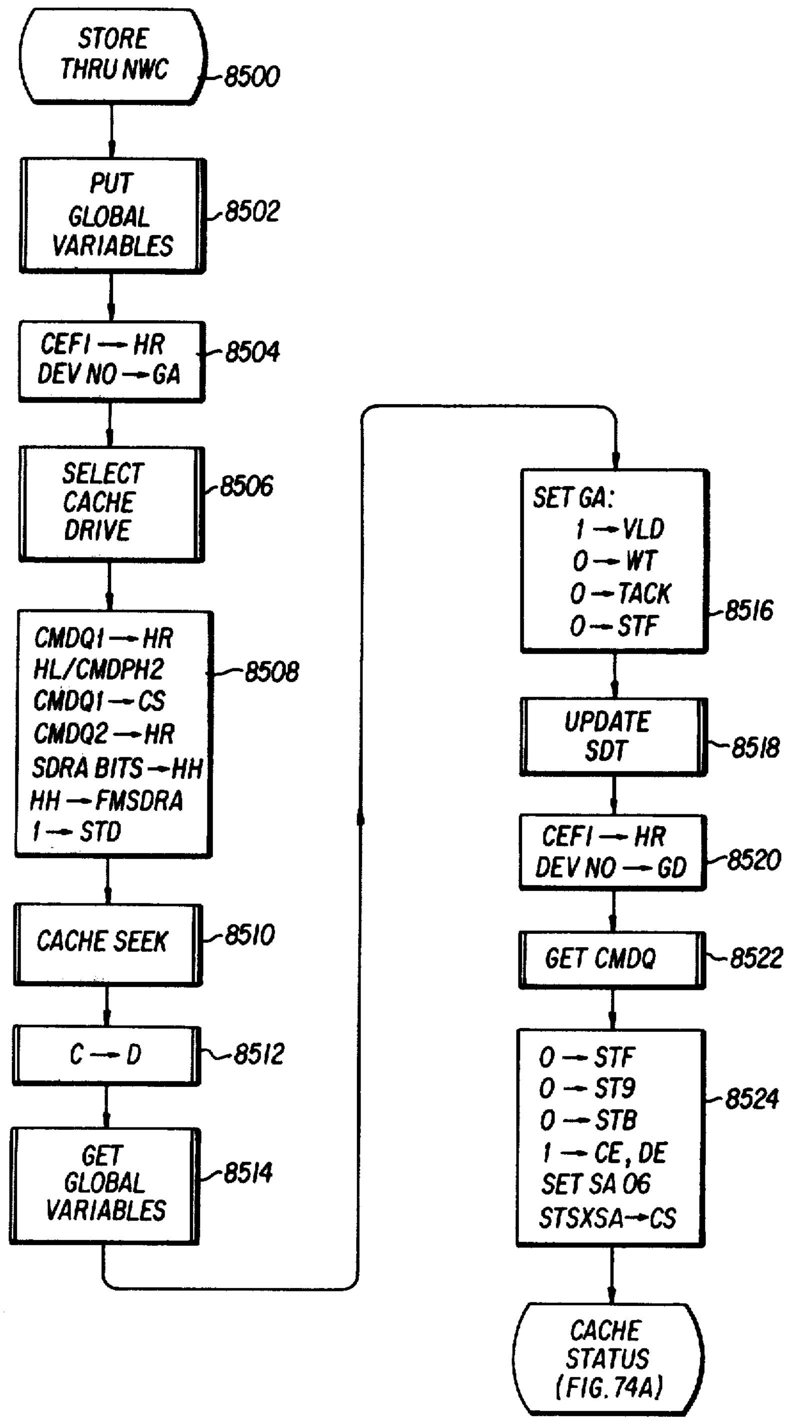

As shown in FIG. 85, the subroutine begins at step 8502 by setting STF and calling the Get/Put Global Variables subroutine to store the global variables in the SDT RAM. At step 8504 CEF1 is fetched from the control store and masked to obtain the device number. A call is then made at step 8506 to the Device Selection subroutine. Upon return from this routine step 8508 is executed wherein CMDQ1 is fetched to HR and bit 19 is set to indicate PHASE 2 of the Store Thru operation. CMDQ1 is then returned to the control store and CMDQ2 fetched to get SDRA. The four low orders of SDRA are masked and returned to the control store at FMSDRA. The Seek Wait bit STD is set and at step 8510 the Cache Seek subroutine called.

After the Cache Seek subroutine, a call is made at step 8512 to the Cache to Disk Control subroutine which manages the data transfer of whole segment transfers between cache and disk. The segments are transferred from cache to the Staging Buffer 800, and then from the Staging Buffer 800 to the disk.

Upon completion of the Cache to Disk Control subroutine, the global variables are fetched from SDT RAM (step 8514) and at step 8516, STF reset, the valid indicator in GA set, and the Written To and TACK indicators in GA reset. STF is reset and a call is made at step 8518 to the Update SDT subroutine to update the SDT.

The routine then begins preparation of the final status—CE,DE which is to be presented to the host by the Cache Status routine. At step 8520 CEF1 is fetched to HR and the device number saved in GD. STF is reset and at step 8522 a call is made to get the command queue from SDT RAM. Upon return from the subroutine, ST9 and STB are reset, Status Action 06 set into HL and stored at STSXSA, STA is set for CE,DE status indication, and an exit is made to the Cache Status routine.

WRITE BAD ECC WITH FIXED DATA PATTERN

The present system utilizes the post store concept. That is, segments are not written from cache to disk except when aged, this being done by the Trickle Write routine described in the aforementioned copending application to make room for more segments in cache. Errors may be detected during the trickle. However, at this time the program conditions needed to recover from the error may no longer be present. Therefore, some means is required to record an unrecoverable error indication on the disk. The Write Bad ECC With Fixed Data Pattern subroutine generates a fixed message "ISS GENERATED BAD ECC" which is recorded in the data field on the disk track. The routine then writes four bytes of all F's in the ECC field which is recorded at the end of the data field for the record. Thus, when the record is subsequently read from disk back to the SCU error detecting means in the SCU may detect the fixed data pattern and the intentional bad ECC and transmit error status to the host. This is accomplished during a buffer to host and disk to buffer transfer subroutine when that subroutine calls a Force Bad ECC subroutine if an unrecoverable error is detected during the data transmission. The Force Bad ECC subroutine compares the record having the bad ECC with the fixed message stored in a table in the control store to verify that it is the fixed message. If the fixed message is verified as being in the record, a Bad ECC Record indication is entered into the Output Register and the error status is reported to the host.

Figure 86:
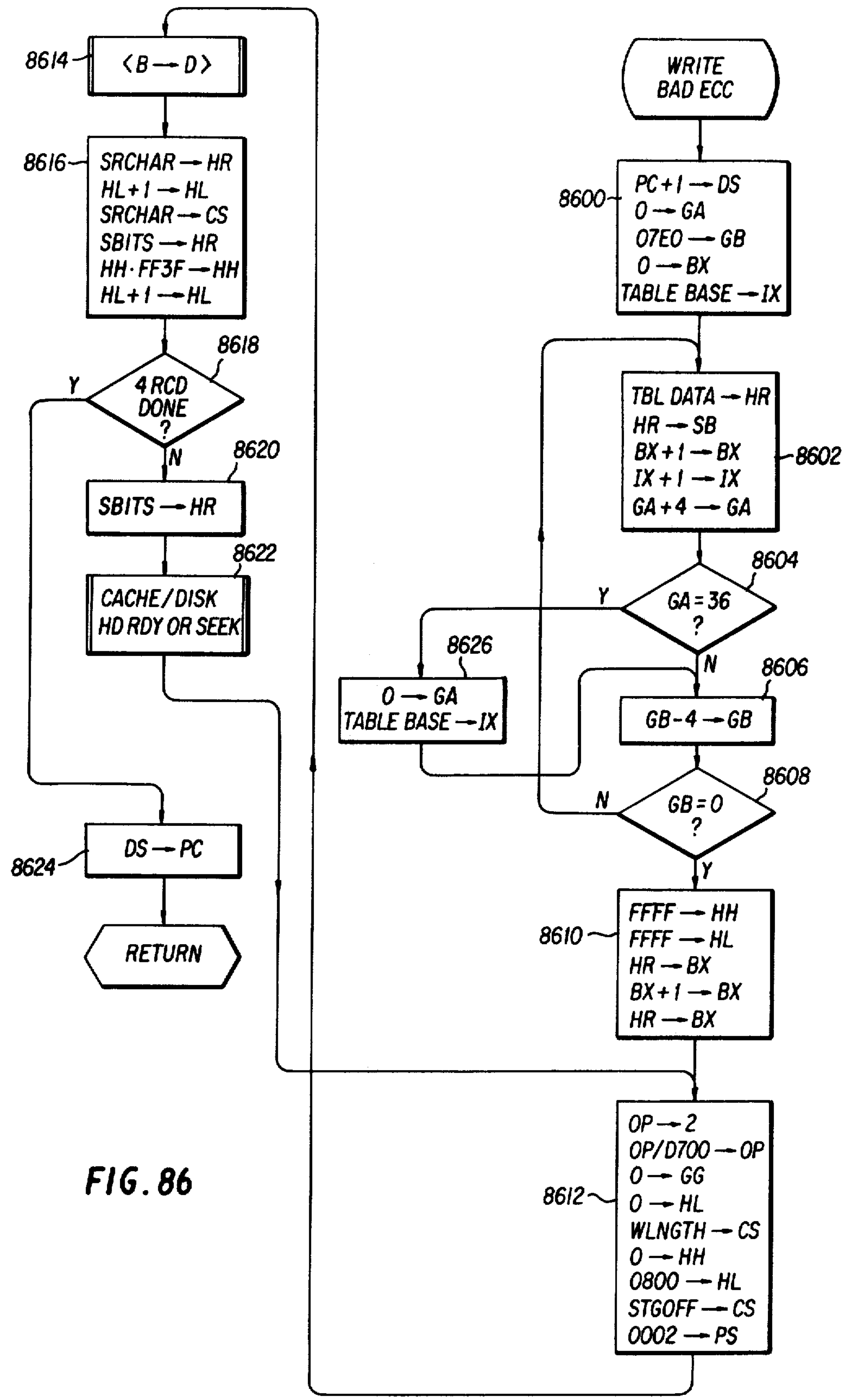

If an error is detected during a "trickle", a branch is taken to an error recovery routine. If the error is uncorrectable the error routine calls Write Bad ECC (FIG. 86) to write the fixed data pattern with the intentionally bad ECC. The error recovery routine prepares error status which includes the file number and transmits it to the host. The routine also sets the bad cache bit in word two of the SDT entry associated with the segment. When the Write Bad ECC subroutine is called at step 8600, Ga is reset and GB set to the length of the data field. The routine sets BX=0 as a pointer to the staging buffer, and sets IX with the pointer to the base of the table containing the fixed data pattern.

At step 8602 the first word of data is fetched from the table, stored in SB, and BX and IX incremented. The value 4 is added to GA and GA is checked at step 8604 to see if it has reached a count of 36 bytes. If it has not, the value 4 is substracted from GB (step 8606) and it is checked at step 8608 to see if the end of the buffer has been reached. If it has not, a loop is taken back to fetch the next word of data from the table.

The loop of instructions within modulus 8602, 8604, 8606 and 8608 is executed nine times in order to transmit 36 bytes of the fixed data pattern from the table in the control store to the staging buffer. At the end of 36 bytes the message is repeated. At decision point 8604 the test will show GA=36. The routine proceeds to module 8626 where it resets GA and again sets IX to the Base Address of the table.

After a complete record of the repeating fixed data pattern has been assembled in the staging buffer, the test at decision point 8608 shows GB=0. HH and HL are loaded with all F's (step 8610) to represent an Intentionally Bad Error Correction Code. HR is stored in BX following the repeating fixed data pattern.

After the complete record with the bad ECC has been assembled in the buffer store, the set up is made to write four records with bad ECC. At step 8612 the constant 2 is entered in OP to set the AM/IND Orient Request. OP is then ORed with D700 to set the Write Bad ECC Record Indication. GG and HL are both reset and the word length in HR saved in CS. HH is cleared to set the buffer pointer while HL is set to 0800 to provide the dummy offset to the other buffer. HR is then saved at STGOFF. The value 0002 is loaded into PS and a call is made to the Buffer to Disk Transfer subroutine (step 8614). Upon return from this routine SRCHAR is fetched from the CS, incremented and returned to the CS. The SBITS in the CS are fetched and the SKREQ and HDREQ bit is reset. HL is incremented by one to keep track of the number of records in the segment. HL is then tested at step 8618 to see if four records have been done. If four records have been done then at decision point 8618 the routine continues at module 8624 by setting the top value in the data stack into PC and returning to the calling routine.

If four records have not been transferred then at decision point 8618 the program proceeds to module 8620 where the SBITS are stored and then to module 8622 where the subroutine Check and Execute a Seek or Head Advance is called. From module 8622 the routine returns to module 8612 to prepare for transferring another record.

HOST TO BUFFER TRANSFER SUBROUTINE

The Host to Buffer Transfer subroutine writes one segment or one partial segment of data from the host to the staging buffer. Prior to the calling of this routine, the EFCNV subroutine must have been called to set the input parameters CBUFND and CXFRI. WCNXFR has also been set to the 36-bit word transfer length required by the Write Wait subroutine which is called by the Host To Buffer Transfer subroutine. For a normal transfer a return is made to the caller. In case of an error an exit is taken to a routine for reporting the error. Explicit inputs to the routine include the starting address for the staging buffer which is entered in BX, the 36-bit word transfer length which is set in WC, the complement 36-bit word transfer length set in RC, and PS must have been preset to the 8 count write value. If the transfer is accomplished without error the indicator register GA will contain zeros.

Figure 87:
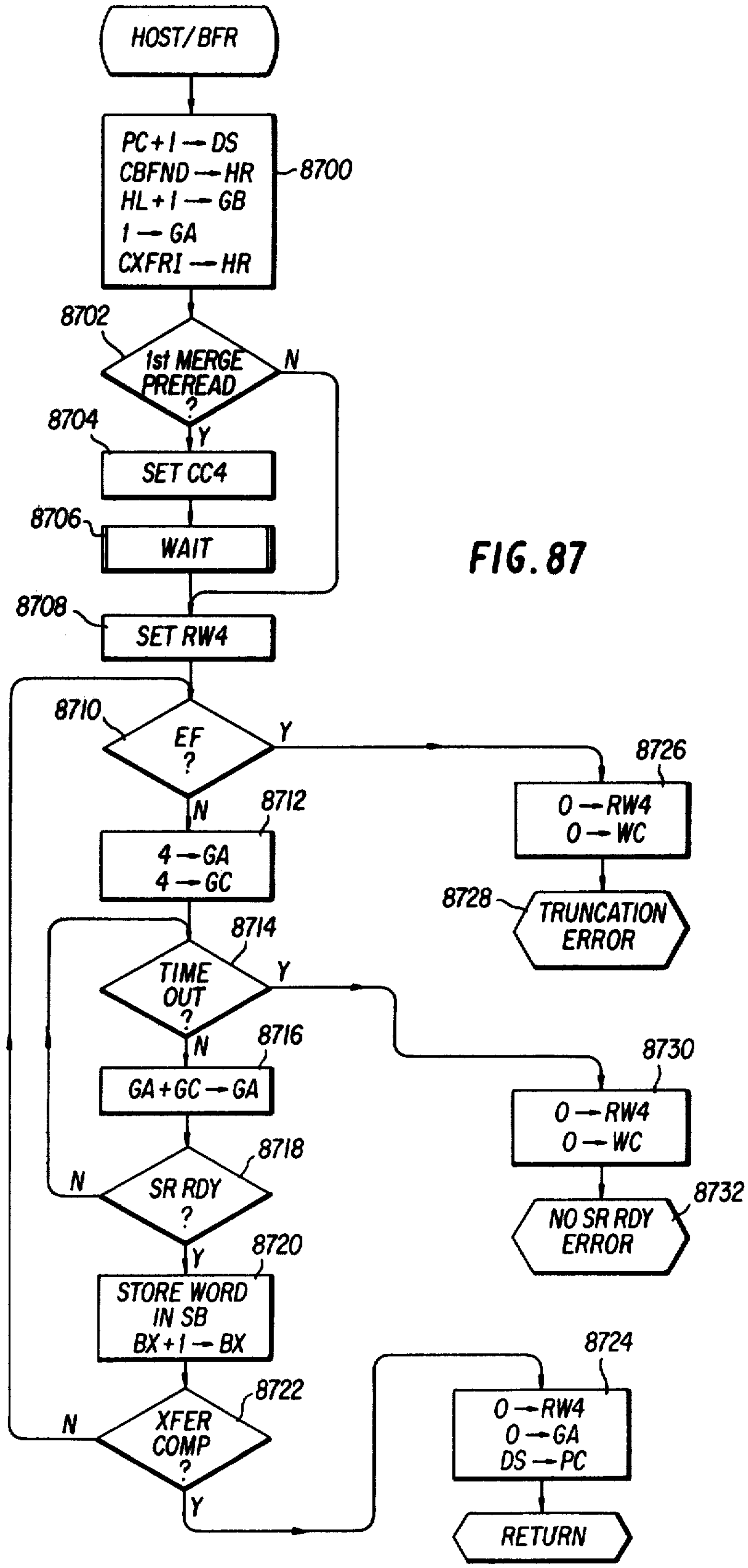

As shown in FIG. 87, the host to buffer transfer begins at step 8700 by fetching the transfer end point CBUFND to HR. HL is incremented by one and entered into GB as the 32-bit end address for the shift register wait loop. GA is set to one as a wait for the first word only. The indicators CXFRI are then fetched to HR and HH ANDed with the value 0042 at step 8702 to see if the first merge/preread indication is set. If it is set, the Channel Write Latch bit CC4 is set at step 8704 and the Write Wait subroutine is called at step 8706 to wait for the Channel Buffer 608 to fill. Next, the Write Shift Enable bit RW4 is set after which a test is made at step 8710 for an EF. Assuming for the moment that there is no EF, GA and GC are set at step 8712 to 4 as time out constants.

Next, a test is made at step 8714 to see if the time out interval of 3.2 us has been exceeded. Assuming that it has not, GA is added to GC and the result returned to GA. Bit 7 of the Channel Branch Register is checked at decision point 8718 and if it is not set the routine loops back to decision point 8714. If stage 7 of the Channel Branch Register is set it means that a data word is in the Shift Register (FIG. 6) ready for transfer over the BD Bus to the staging buffer. At step 8720 the word is transferred to the staging buffer and BX is incremented to address the next location in the staging buffer to receive the next word. After each data word is transferred to the staging buffer the count in BX is checked at step 8722 to see if it is equal to 2. If it is not, the routine loops back to decision point 8710 and prepares for the transfer of another word.

If the transfer is complete then at step 8724 RW4 is reset, GA is zeroed to indicate a good return (no error on the data transfer) and DS is loaded into PC in order to return to the calling routine.

At decision point 8702, if the test shows that it is not a first merge/preread, steps 8704 and 8706 are bypassed and the routine proceeds directly from decision point 8702 to the module 8708.

At decision point 8710, if an EF is sensed it means that a channel truncation error has occurred. RW4 and WC are reset at step 8726 and an exit is taken to report the truncation error.

At decision point 8714, if the time out does occur, that is the shift register is not ready within the specified interval, then at step 8730 RW4 is reset, WC is reset and an exit taken to report the shift register ready error.

BUFFER TO HOST TRANSFER SUBROUTINE

The Buffer To Host Transfer subroutine reads one segment or partial segment of data from the staging buffer 800 into the channel buffer 608. Upon a successful completion of the transfer with no errors, a return is made to the calling routine with GA set to zero to indicate a good transfer. Explicit inputs for the subroutine include the starting address in the staging buffer, set in BX, the transfer length in 36-bit words in HL, the transfer length in 36-bit words in WC, the complement transfer length in 36-bit words in RC and PS contains the nine counts preset read value.

Figure 88:
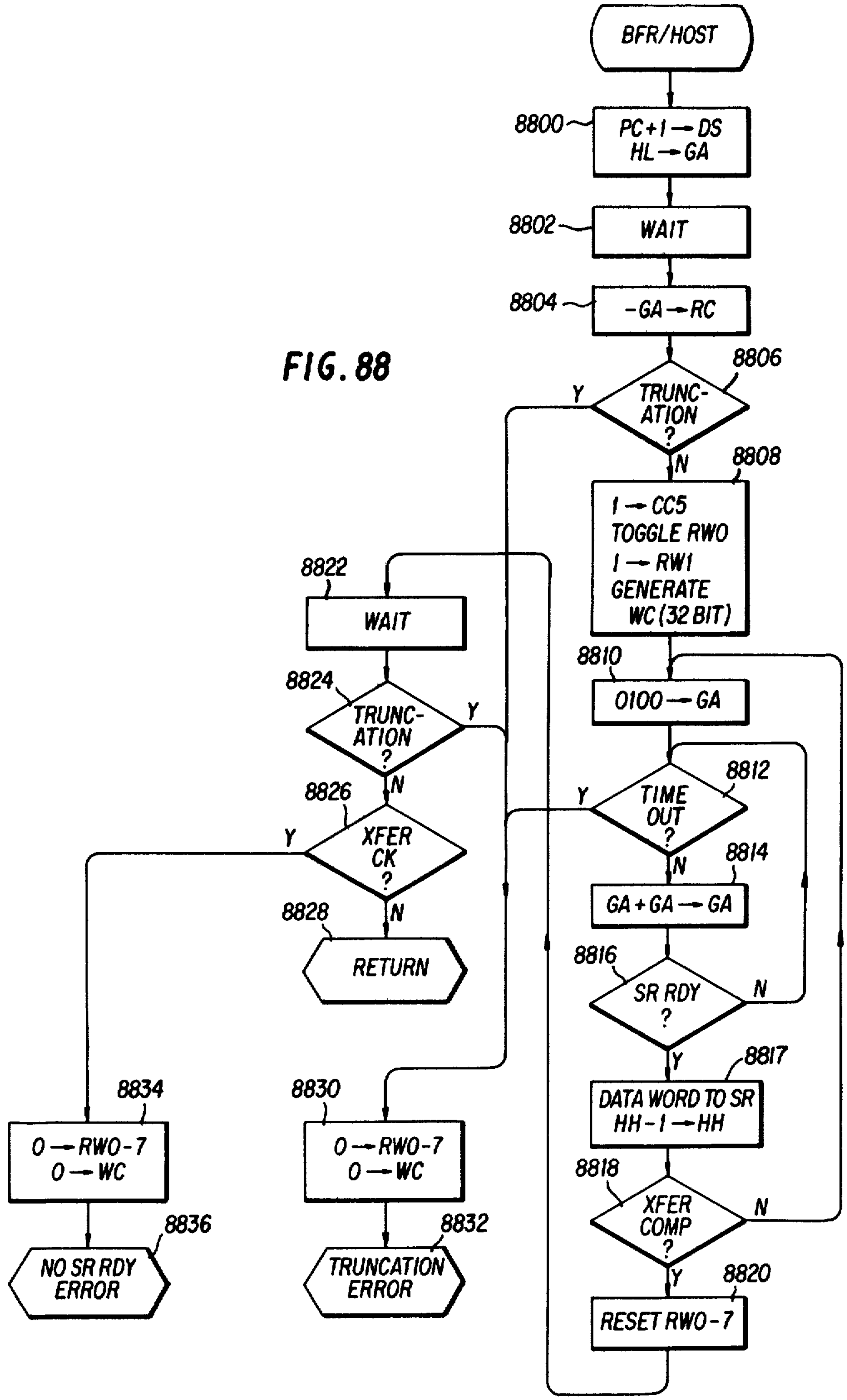

As shown in FIG. 88, the routine begins at step 8800 by saving the 36-bit transfer length in GA. A call is then made step 8802 to the Wait For Buffer Empty subroutine. Next, at the step 8804 the complement of the transfer length is entered into RC and at step 8806 a test is made for channel trucation. If there has been no truncation, then at step 8808 the Read Latch CC5 is set; RW0 is first set and then reset; and the Read Transfer bit RW1 is set. The routine then generates the 32-bit word count which is saved in HH.

At step 8810 the constant 0100 is entered into GA and a check is made at step 8812 to see if there has been a time out of over 3.2 us. Assuming that there has not been such a time out, GA is added to GA at step 8814 and the result returned to GA. A check is made on bit 7 of the Channel Branch Register at step 8816 to see if it is set. If it is not, the program loops back to decision point 8812. On the other hand, if bit 7 of the Channel Branch Register is set it means that the Shift Register 602 is ready to receive a data word from the BD Bus. The first data word is transferred from the staging buffer over the BD Bus to shift register. HH is decremented and returned to HH. The address in BX is incremented. A check is then made at step 8818 to see if the transfer is complete. If it is not, the routine loops back from decision point 8818 to module 8810 in order to transfer the next data word. This continues until all of the data words have been transferred. This time, when the test is made at decision point 8818 the program proceeds to module 8820 where it resets the read/write controls and then calls, at step 8822 the Buffer Empty Wait routine. Upon return from the routine another check is made at step 8824 for trucation. Assuming that there is no truncation HH is incremented by 1 and the result checked at step 8826 for a zero value. If it is zero, the routine then returns to the caller.

If the test at decision point 8826 reveals a transfer check, the read/write controls are reset at step 8834 as is the WC register. The routine then exits to report the Shift Register Ready Error. If the test at decision point 8806, 8812 or 8824 produces a positive or yes response, then at step 8830 the read/write controls are cleared, the WC register reset, and the routine exits to report the truncation error.

CACHE TO BUFFER/BUFFER TO CACHE TRANSFER ROUTINE

The Cache To Buffer/Buffer To Cache Transfer routine either reads data from cache into the staging buffer or transfers data from the staging buffer into the cache depending upon the contents of the GA register at the time the subroutine is called.

The routine begins at step 8900 by transferring the current 32 and 36-bit transfer lengths in this buffer's worth of transfer to the HR register. The total transfer, of which this may be one, may be many 8k segments. The 32-bit transfer length is transferred from HH to GC and then its complement entered into TC.

Next, at step 8902 GC is ANDed with 0F00 in order to set the module 16 count into the high byte of GC. GC is then ORed with GA to turn on the Read or Write bit depending upon what was passed on to the subroutine from the caller.

GA is entered into HH and saved and CAC32A is fetched in order to obtain the 32-bit starting address. This starting address is transferred from HR to the Write Register with HL going into WL and HH going into WH. Next, GC is added to WH to place the sum of the high orders of the starting address and the modulo 16 count in WH.

The 32 and 36-bit offsets (CACOFF) are fetched to HR and HH is entered into GB. The contents of GB are then entered into the BX counter. The indicator bits CXFRI are fetched to HR and HH and ANDed with one at step 8904 to see if the starting address is odd. If it is odd, GB is incremented by one and the result returned to GB. At step 8908 GB is transferred to BX and TAG 6 is entered into GA. The routine then calls the Control Unit—Cache Interface (CUCI) subroutine at step 8910 and sets STD to indicate to the subroutine that an extended operation is being called. Upon completion of the CUCI routine Cache To Buffer/Buffer to Cache Transfer routine returns to the caller after setting GA to 0 at step 8912.

At decision point 8904, if the starting address is even as it should be, the program proceeds directly to module 8908 and does not perform the incrementing shown in module 8906.

FIND COMMAND QUEUE ENTRY

The Find Command Queue Entry subroutine searches the command queue copy in the staging buffer for the current entry (search for EF2) or the next highest priority entry for execution. For a current command, the subroutine finds the command with the same request number and compares it with the command in CMDQ1 and CMDQ2. For a next entry search, the CMDQ is searched for the oldest command (lowest request number) with the highest priority. If an entry is found the command is moved to CMDQ1 and CMDQ2.

In either case, a return code is set in GA. If a match is found on a current command search or an entry is found on a next entry search, GA is set to 0000. However, if no match is found on a current command search or no entry is found on a next entry search then the value 0001 is entered into GA. In either case, at the conclusion of the subroutine CMDQ1 and CMDQ2 contain the next command.

Figure 90:
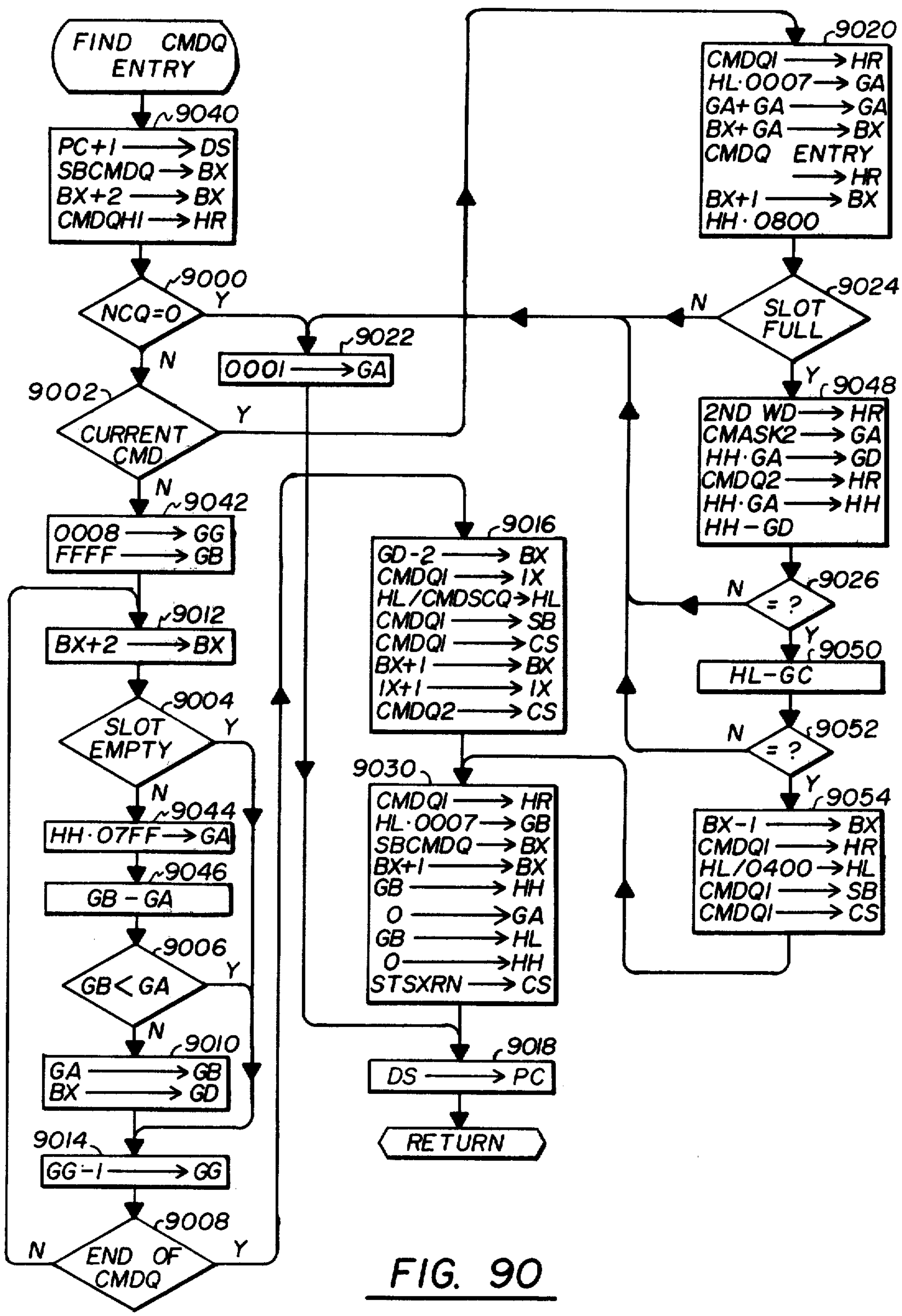

The Find Command Queue Entry subroutine is illustrated in FIG. 90. The routine begins at step 9040 by entering the base address of the command queue into BX. The first command queue header word is fetched in order to obtain NCQ. BX is incremented by two to get the address of the first word of the first command queue entry.

The first word of the command queue header is then ANDed with 0F00 of step 9000 to find out if NCQ=0, that is, whether or not there are any queued commands. If there are queued commands the routine proceeds to module 9002 where GA is XORed with 00F1. The calling routine has placed in GA a request code which is 00F0 if the request is for the subroutine to find the current command and 00F1 if the request is for the subroutine to find the next command. If the test at step 9002 shows that the request is for the next command, then at step 9042 the value 8 is entered into GG. This represents the maximum number of commands which may be queued. GB is loaded with FFFF for use as a comparison constant. At step 9012 the next command is fetched under the control of BX and BX is incremented by two. HH is ANDed with 0800 at step 9004 to see if the Full bit of the command queue entry is set. If it is, HH is ANDed with 07FF at step 9044 and the priority and sequence numbers saved in GA.

Next, GA is subtracted from GB at step 9046 and the result tested at step 9006 to find out if GB is less than GA. On the first of such tests GB cannot be less than GA because of the value of the constant loaded into GB. Therefore, the routine proceeds to module 9010 where GA is entered into GB and GD, the address of the first word of the first command queue entry, is entered into BX. GG is decremented at step 9014 and is tested at step 9008 to see if it has been decremented to zero. If it has not, the routine branches back to module 9012, this time comparing the priority and request number of the first command queue entry with the priority and request number of the second command queue entry. At module 9010 the priority and request number which is lowest (highest priority) is entered into GB and the address of that command is entered into GD.

At decision point 9006, if the comparison of the priority and request number saved from a previous comparison is less than the priority and request number of the latest command to be compared, then module 9010 is skipped by the routine and it proceeds directly from decision point 9006 to module 9014.

At decision point 9004, if the test should show that the slot is empty then there is no need to make a comparison of its priority and sequence number with the priority and sequence number of the other commands. Therefore, the routine branches from decision point 9004 directly to module 9014 if a command is tested and the Full bit 4 is reset.

As soon as GG has been decremented to zero, all of the commands in the queue have been compared and GD holds the address of the oldest command with the highest priority.

In module 9016, the value 2 is subtracted from GD and entered into BX. The command is fetched from SB to HR. IX is set to the address reserved for the first word of the current command queue entry. HL is ORed with the value 8000 to set the Service Command Queue bit. The command is then stored in the control store at CMDQ1. Also, the updated command is returned to the command queue in the staging buffer.

BX is incremented in order to fetch the second word of the command. IX is incremented and the second word of the command is stored at CMDQ2.

At step 9030 CMDQ1 is then fetched from the control store and the request number saved in GB. SBCMDQ is loaded into BX and BX incremented to get the active command address. The active command is fetched to HR to get the Active Command Request Number field. GB is transferred to HH to set the Active Command Request Number and the command is returned to the staging buffer. GA is set to zero to indicate a good return. GB is transferred to HL and HH is set to zero. The request number for status presentation now in HR is stored at STSXRN. The routine then loads the program counter from the data stack and returns to the calling routine.

At decision point 9000, if the test shows that there are no commands queued, the value 0001 is entered into GA at step 9022 to indicate a no match or no entry condition. The routine then loads the program counter from the data stack and returns to the calling routine.

At decision point 9002, if the test indicates that the caller was requesting the command queue to find the current command, a branch is taken to module 9020. CMDQ1 is fetched, the request number isolated, entered into GA, and multiplied by two since there are two words per CMDQ entry. GA is then added to BX to get the command entry for the request number. The CMDQ entry is fetched to HR and BX is incremented. HH is ANDed with 0800 to find out if the CMDQ slot is full. If it is not, the routine branches from decision point 9024 to module 9022 to set the no match indicator in GA after which a return is made to the caller.

At decision point 9024, if the test shows that the slot is full the second word of the command is fetched to HR at step 9048 and the value 3F00 enterd into GA. HL is entered into GC to save the segment address. HH is ANDed with GA to get the NSEG field which is saved in GD. CMDQ2 is then fetched from the control store and HH ANDed with GA to get the NSEG field. GD is then subtracted from HH to see if the two NSEG fields are equal. If they are not, the routine branches from decision point 9026 to module 9022 to set the no match indicator in GA after which the routine returns to the caller.

If the two NSEG fields are equal then at step 9050 the starting segment addresses are compared by subtracting GC from HL. If the starting segment addresses are not equal than the routine branches from decision point 9052 to module 9022, sets the no match indicator, and returns to the caller. If the starting segment addresses are equal then the command is equal to the command in CMDQ1 and CMDQ2. Therefore, it must be the second EF i.e. a command issued a second time by the host after it has received DE and Status Action 11. At step 9054 BX is decremented to fetch the first word of the command queue entry to HR. HL is ORed with 0400 to set the EF2 bit. The first word of the command queue entry is then returned to SB and CMDQ1. After this is done the routine proceeds to module 9030, the operation of which has previously been described, and then returns to the caller.

CACHE SEEK START

The Cache Seek Start subroutine issues a Seek Start and a Set Sector to a selected disk drive device. The HOST ID table in the staging buffer is checked to see if multiple SCU paths exist between the selected device and the host. The reason for this may best be understood by considering FIG. 93 which shows four host CPUs 9300–9303, four input/output channel control units 9304–9308, two SCUs 9309 and 9310 and a plurality of disk drive devices 9311 and 9312. A Cache Storage Unit 9314 serves both SCU 9309 and SCU 9310.

I/O Channel Unit 9304 is connected to channel interface A of SCU 9309 and may receive data from, or transfer data to, host 9300 or 9301. I/O Channel Unit 9305 is connected to the channel B interface of SCU 9309 and may receive data from or transmit data to host 9300 or 9302.

I/O Channel Unit 9306 is connected to the channel C interface of SCU 1 and may receive data from or send data to host 9303 only. Input/Output Channel Unit 9308 is connected to the channel D interface of SCU 9310 and may send data to or receive data from either host 9302 or 9303.

The disk drive devices may have a single port for connection to a single SCU or dual ports for connection to both SCUs. In addition, if dual ports are provided a switch is also provided to select the first, the second, or both ports. In the present arrangement, this switch should be set so that both ports of the disk drive devices are active.

Assume for purposes of illustration that host 9301 issues a command through I/O Channel Unit 9304 to the SCU 9309 requesting a data transfer. As previously described, if the data to be involved in the transfer is not resident in cache then SCU 9309 checks the command queue header for the disk drive device holding the requested information. If it is busy, the command is queued in the command queue and stored in the SDT RAM associated with the CSU 9314. Subsequently, when the command is removed from the command queue for execution by either one of the SCUs 9309 or 9310, the SCU checks a HOST ID table to see if it has a path back to the specified host, in this case host 9301. If SCU 9310 attempts to execute the command, it finds out from the HOST ID table that there is no path for the data back to host 9301 through SCU 9310. Therefore, SCU 9310 returns the command to the queue where it may subsequently be removed and executed by SCU 9309.

When SCU 9309 removes the command from the command queue and prepares to issue a Seek Request to the disk drive device, it must know if SCU 9309 is the only path back to host 9301 from the disk or if a path is also available from the disk through SCU 9310.

If a path exists from the disk through both SCUs to the host then the SCU 9309 issues an Untagged Seek Request to the disk. When the seek is completed the disk drive unit sends a Seek Complete to both SCUs 9309 and 9310 and either of them may prepare the status for reporting back to the host. However, in the case assumed above where host 9301 originally issued the command, the only path back to the host 9301 from the disk drive unit is through SCU 9309. Therefore, when SCU 9309 issues the seek request to the disk drive unit the seek is tagged, that is, the disk drive unit is reserved to SCU 9309 only. When the seek is completed the Seek Complete is returned by the disk drive unit only to SCU 9309. The SCU 9309 then prepares the status word with Device End, checks the HOST ID Table to see which of its interfaces provide a route back to the Host 9301, and sets up the interface to send the status word with Device End back to the host. Upon receiving the status word with Device End, the Host 9301 reissues its original command since the requested data has been transferred from the disk through SCU 9309 to the CSU 9314 and is resident therein.

Figure 91A:
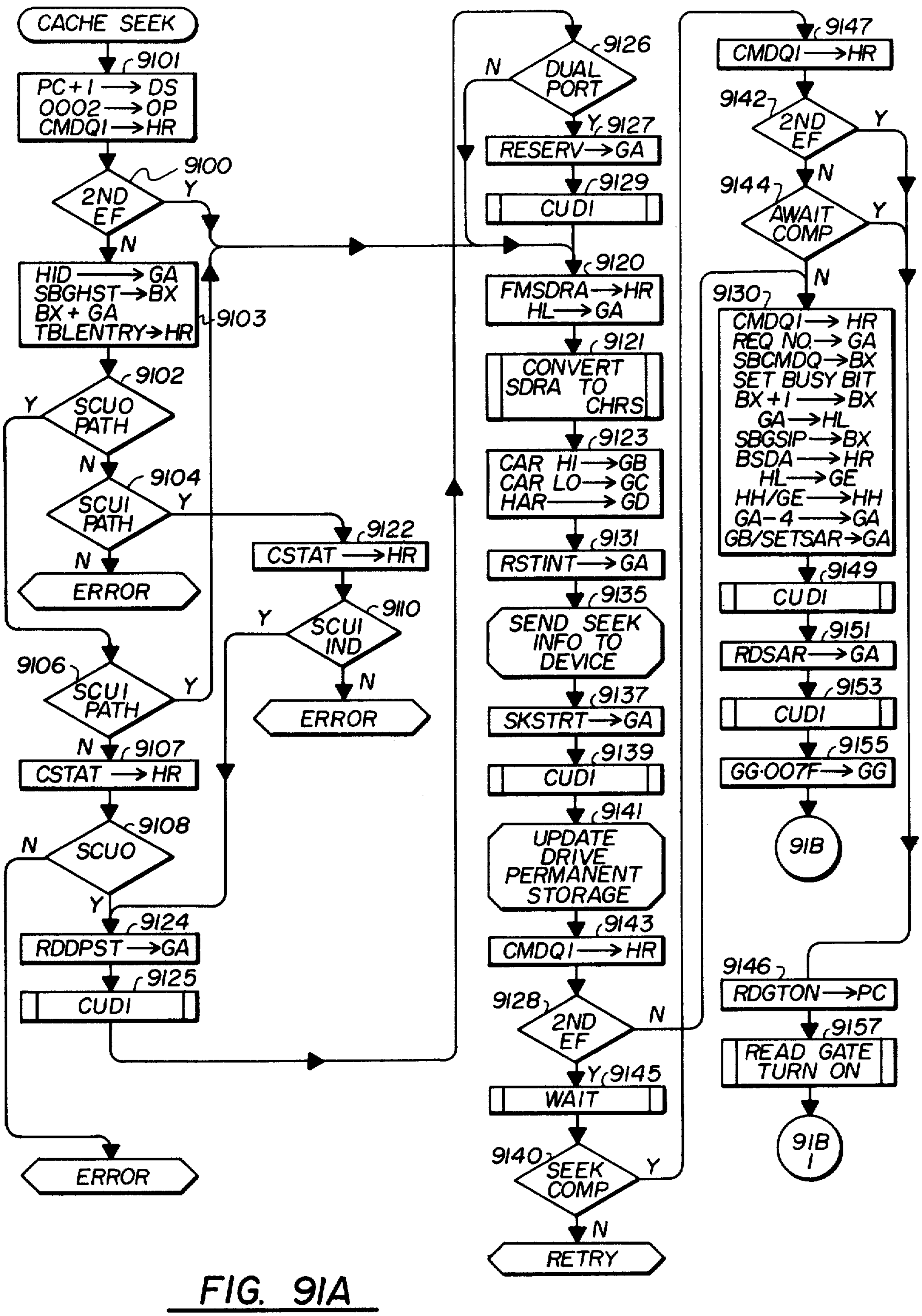

Turning now to FIG. 91A, the Cache Seek subroutine first determines whether to issue a tagged or an untagged seek and if a tagged seek is required it reserves the disk drive unit. Subsequently, the Cache Seek subroutine issues the seek to the disk drive device and then returns to the calling routine.

The Cache Seek Start subroutine begins at step 9101 by loading the constant 0002 into OP and fetching CMDQ1. Bit 21 is tested at step 9100 to see if this is the second EF, that is, this command has been issued a second time by the host. If it is, there is no need to check for paths through the SCUs and the routine proceeds to module 9120. If this is not a second EF command, then at step 9103 the HOST ID contained in CMDQ1 is transferred from HH to GA. SBGHST, the pointer to the base of the HOST ID table is loaded into BX and GA is added to BX to fetch the entry for this host. The entry is tested at step 9102 to see if SC0 (9309) has a path back to the host. If it does, the routine proceeds from decision point 9102 to decision point 9106 and checks the HOST ID table entry present in HR to see if SCU 1 (9310) also has a path back to the host. If it does, then an Untagged Seek Start may be issued to the disk drive device so the routine branches to module 9120.

At decision point 9102, if there is no path to the host from SCU 0 then at step 9104 the table entry in HR is checked to see if there is a path through SCU 1 to the host. If there is not, then there is an error because there is no path back to the host.

At decision point 9104, if the test shows that there is a path back to the host through SCU 1 the routine proceeds to module 9122 where CSTAT is fetched to HR. CSTAT is a word which is loaded into the control store of an SCU at the time of initialization and indicates to the SCU whether it is SCU 0 or SCU 1. At decision point 9110 CSTAT is tested to see if this is SCU 1 which is handling the Cache Seek. If it is not SCU 1 then an exit is taken to the error routine because the only path available is through SCU 1 and this is not SCU 1 which is preparing to issue the seek. On the other hand, if the test at decision point 9110 shows that this is SCU 1 then the routine proceeds to module 9124.

At decision point 9106, if the test shows that SCU 1 does not have a path back to the host CSTAT is fetched to HR at step 9107 and at decision point 9108 it is checked to see if this is SCU 0 which is preparing to issue the Cache Seek. If it is not, an exit is taken to the error routines because the only path back to the host is through SCU 0 and this is not SCU 0 which is preparing to issue the seek. If the test at decision point 9108 shows that this is SCU 0 then the routine proceeds to module 9124.

To summarize the above operations, if a path exists through both SCUs then the routine proceeds from decision point 9106 to module 9120 because an untagged seek may be issued. If a path exists through only one SCU and that SCU is the one which is processing the present cache seek, the program reaches module 9124 through decision point 9108 if this is SCU 0 and through decision point 9110 if this is SCU 1.

At module 9124 RDDPST (0240) is loaded into GA to set up the tag for reading dual port status from the disk drive device. At step 9125 the CUDI routine is called which makes the status request to the disk drive device and returns with dual port status to the SCU. At the end of the CUDI subroutine this status is contained in GG and it is ANDed with 0020 at step 9126 to find out if the disk drive device has dual port status. If it does not, then this is the only SCU to which it can respond hence there is no need to issue a tagged seek. Therefore, from decision point 9126 the routine proceeds immediately to module 9120.

If the disk drive device does have dual port status then it is necessary to issue a tagged seek. This involves reserving the disk drive device to this SCU. RESERV (0A80) is loaded into GA at step 9127 to set up the reserve tag after which the CUDI subroutine is called at step 9129 in order to make the reservation. After the CUDI subroutine is completed the program proceeds to module 9120.

At step 9120 First Miss SDRA (FMSDRA) is brought to HR and HL is entered into GA to prepare for the Convert SDRA To CHRS routine. This routine is then called at step 9121 in order to convert the SDRA to a cylinder-head-record-sector address as required by the disk drive device. At the conclusion of the conversion subroutine the high order bits of the cylinder address are entered into GB, the low orders of the cylinder address in GC, and the head address in GD. At step 9131 GA is loaded with RSTINT (0901) to set up the tag and bus for a reset interrupt. The CUDI routine is called to reset any possible interrupts and then the seek information is transmitted to the disk device at step 9135. This involves loading a portion only of the addressing information into the GA register at a given time and then calling the CUDI routine to transmit the information to the disk drive device.

After all of the addressing information has been transmitted to the disk, SKSTRT (0910) is loaded into GA at step 9137 to set up the tag and bus to issue the seek request. The CUDI subroutine is again called at step 9139 to transmit the seek to the disk drive device.

The program then executes a series of instructions as indicated at 9141 to update the drive information in an area of the control store permanently reserved for this information. After this has been done CMDQ1 is fetched to HR and tested at step 9143 to see if the EF 2 bit is set. If it is, there is no need to wait and the program branches from decision point 9128 to the module 9130.

At module 9130, CMDQ1 is fetched and the Current Request Number isolated and saved in GA for later use. SBCMDQ is loaded into BX in order to fetch the first header word of the command queue. The Device Busy bit of the header word is set and the header word returned to the buffer store. BX is incremented in order to fetch the second header word to HR. GA is entered into HL in order to set the request number for the seek in progress. The second header word is then returned to SB.

SBGSIP is loaded into BX. The BSDA bits are fetched from the control store to HR and HL is saved in GE. The previous SIPs are fetched from SBGSIP and entered into HR. HH is ORed with GE and the result returned to HH in order to add the present SIP address. HR is then stored in SB for later rewriting to the SDT by the Read/Write routine.

The sector value in GA is decremented by four, the seven low order bits saved in GB and GB ORed wth SETSAR (0100) to set up the Set Sector tag. The CUDI routine is then called at step 9149 to transmit this tag to the disk drive device. RDSAR is entered into GA at step 9151 and the CUDI subroutine again called at step 9153 to read the Sector Tag from the disk drive device. At step 9155 the high order bits are masked off and the seven low order bits saved in GG. The subroutine then moves to FIG. 91B where, at step 9132, GB is compared to GG for a Sector Check. If the two values are not equal then an exit is taken to the error controls. If the two values are equal then a Check 2 Error test is made at decision point 9134. If there is a Check 2 Error then the routine branches to a subroutine for analyzing the Check 2 Error. If there is no Check 2 Error the record number SRCHAR is fetched from the control store at step 9159 and tested at step 9136 to see if this is record one. If it is not the routine proceeds immediately to module 9138. If this is record one then the constant 0001 is entered into OP at step 9161 to set an orientation parameter for a routine which searches records in the disk track and locates the correct record.

In module 9138, HH is set to zero as another orientation parameter and SRCHAR is transferred from HL back to the control store. GA is set to zero to indicate a good or normal return and the routine returns to the caller.

In FIG. 91A, if the test at decision point 9128 shows that this is the second EF a wait routine is called at step 9145 to wait for the Seek Completion. After the wait interval has elapsed a test is made at step 9140 to see if a Seek Complete has been received from the disk drive device. If it has not the program exits to a retry routine which, if unsuccessful then exits to an error routine.

If the test at decision point 9140 shows that a Seek Complete has been received from the disk drive device CMDQ1 is fetched to HR at step 9147 and the second EF bit again tested at step 9142. If it is not set STD is tested at step 9144 to see if it is set to indicate that a completion should be awaited. If it is not, then the routine proceeds from decision point 9144 to the module 9130 and from there proceeds as described above.

If decision point 9142 reveals that this is the second EF, or if the test at decision point 9144 shows that we are awaiting completion, the routine proceeds to module 9146 where the program counter is loaded with RDGTON, the address of the Read Gate Turn On subroutine which is then executed at step 9157. Upon completion of the Read Gate Turn On subroutine the Cache Seek subroutine proceeds to module 9134 in FIG. 91B and from there proceeds as described above.

READ GATE TURN ON ROUTINE

Figures 91B, 92, 94:
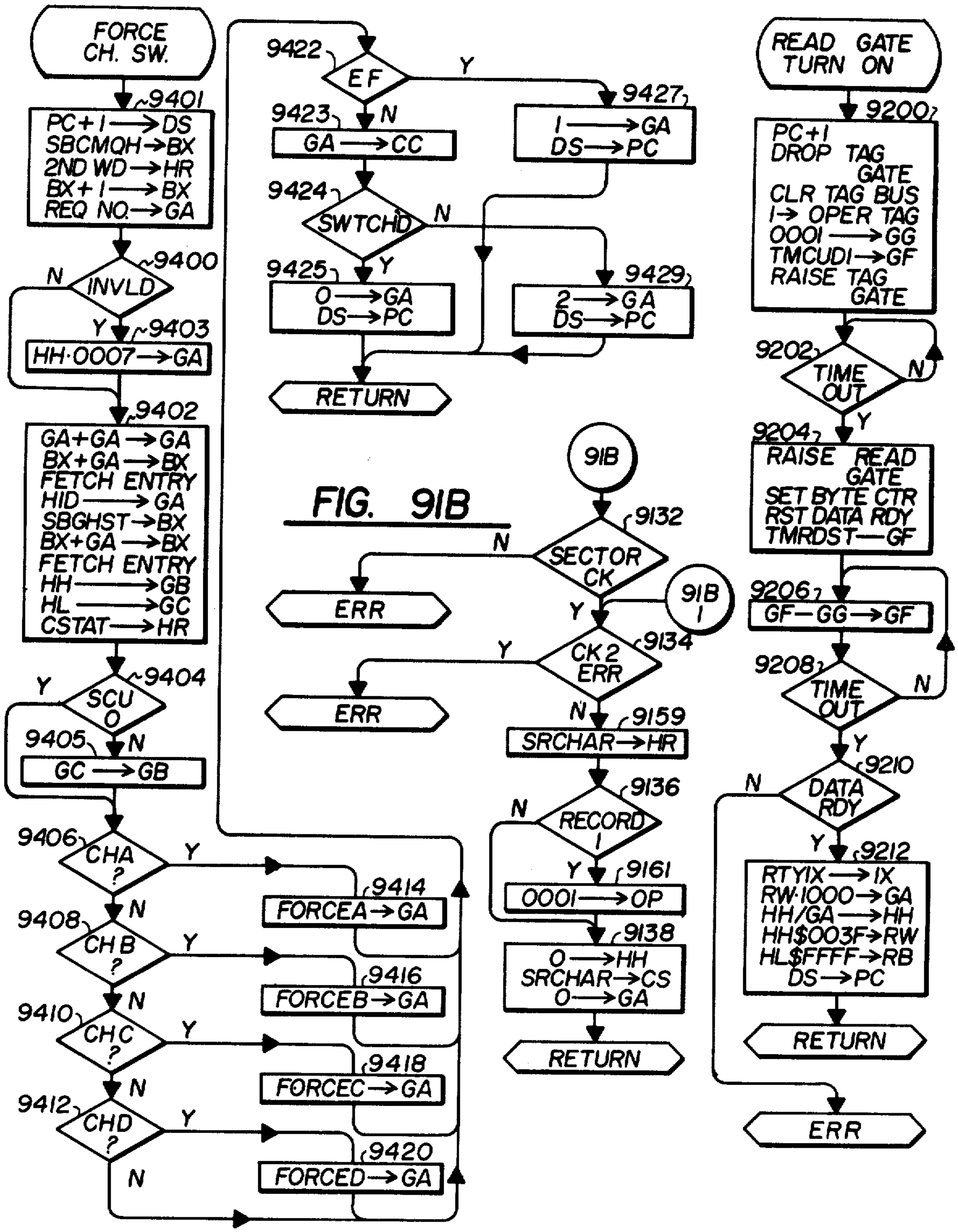

The Read Gate Turn On routine is illustrated in FIG. 92. As the name implies, this routine turns on the read gate in the control unit—device interface so that the data may be transferred between the disk and the SCU. The routine begins at step 9200 where it first saves PC+1 on the data stack so that a return may be made to the caller. FC is ANDed with 9FFF to drop the tag gate. The result is returned to FC and is then ANDed with 9000 to clear the tag bus. This result is entered into FC which is then ORed with 0B00 to raise the OPERATE tag.

The value 0001 is entered into GG and GF is set to the value 7 as a timing constant. FC is ORed with 4000 to raise the tag gate. An instruction is then repeatedly executed to subtract the contents of GG from GF with the result being returned to GF. On each subtraction a test is made at step 9202 to see if the value in GF has been reduced to zero. When it has, FC is ORed with 2000 to raise the Tag Valid Check. The result is returned to FC which is then ORed with 0010 to raise the HEAD SELECT signal.

GF is again loaded with the value 0007, GG subtracted from GF and the result returned to GF with a test being made each time to see if GF has been reduced to zero. If it has not, GG is again subtracted from GF. If it has, FC is ORed with 0002 at step 9204 in order to raise the read gate. The byte counter BC is then loaded with the retry byte count 00E6.

Next, an instruction with SPOP 84 is executed to reset the Data Ready Latch. A timing constant is loaded into GF and GG subtracted from GF at step 9206. The result is tested at step 9208 and if it is not zero then GG is subtracted again. If it is zero the Data Ready Latch is tested at step 9210 to see if it has been set. If it has not, an exit is taken to the error circuits.

If the Data Ready Latch has been set then RTYIX, a set up pointer to the retry constant, is entered into IX at step 9212. RW is ANDed with 1000 and the result entered into GA. The Retry Byte Count Constant is fetched from the control store to HR and HH ORed with GA to save the state of write truncation. HH is then ZORed with 003F to initialize the Retry Byte Count. HL is complemented and entered into RB as the Retry Byte Count Backup. DS is then loaded into PC and the return made to the calling routine.

FORCE CHANNEL SWITCH ROUTINE

The Force Channel Switch subroutine uses the HOST ID and the command queue entry to index into the HOST ID table to find out which channel (A, B, C or D) is connected to this host. The SCU then forces a switch to that channel if an EF for that channel is not pending.

The Force Switch Channel routine is illustrated in FIG. 94 and begins at step 9401 by fetching SBCMQH to BX. The second command queue header word is fetched to HR and the Seek In Progress Request Number masked off and entered into GA. HL is ANDed with 8000 at step 9400 to see if the seek entry is invalid. If it is not, the program proceeds from decision point 9400 to the module 9402. If the seek entry is invalid then at step 9403 HH is ANDed with 0007 to obtain the Active Command Request Number which is entered into GA after which the program continues to module 9402.

In module 9402 the value of GA is doubled and returned to GA. GA is then added to BX and the result returned to BX. The CMDQ entry is fetched to HR, the HOST ID isolated, and the HOST ID entered in GA.

SBGHST is loaded into BX to point to the HOST ID table. GA is added to BX to index into the HOST ID table and the table entry is fetched to HR. The SCU 0 bits are transferred from HH to GB while the SCU 1 bits are transferred from HL to GC. CSTAT is fetched to obtain the SCU Port Indicator. HH is ANDed with 0001 at step 9404 to find out if this is SCU 0. If it is, the program proceeds from decision point 9404 to decision point 9406.

If the test at decision point 9404 shows that this is not SCU 0 then GC is transferred to GB at step 9405 to use the HL portion from the HOST ID table. Next follows a series of tests at decision points 9406, 9408, 9410 and 9412.

The test at decision point 9406 ANDs GB with 0001 to find out if there is a connection to Channel A. If there is, the value 0101 is entered into GA to be used as a value for forcing the switch to Channel A. If the test at decision point 9406 indicates that there is no path from the SCU back to the host over Channel A then Channel B is tested in the same manner by ANDing GB with 0002. If this test reveals a path back to the host then the value 0202 is entered into GA. On the other hand, if the test at 9408 shows no path then Channel C is tested by ANDing GB with 0004 and if the test shows that Channel C is connected to the host then the value 0044 is entered into GA. Finally, if the test at decision point 9410 shows that there is no path back to the host through Channel C then Channel D is tested by ANDing GB with 0008. If a path exists from the SCU to the host over Channel D then the value 0088 is entered into the GA register.

Regardless of which channel path, if any, is found, the routine then proceeds to check for an EF at step 9422. If there is an EF then the value one is entered into GA at step 9427, DS is transferred to PC and a return is made to the caller with the one in GA indicating that the channel was not switched because of a pending EF.

If the test at decision point 9422 shows no pending EF, the value in GA is entered into CC at step 9423. CC is then ANDed with GA at step 9424 to test to see if the channel switched. If it did not, the value 2 is entered into GA at step 9429, DS is entered into PC and a return is taken to the caller with the value 2 in GA indicating that the channel switch failed.

If the test at decision point 9424 shows that the switching was accomplished successfully, then at step 9425 zero is entered into GA and DS is entered into PC so that a return is taken to the caller with the value zero in GA indicating that the channel switching was successful.

DISPERSED WRITE CONTROL

The dispersed Write Control routine transfers data segments from the host to the disk under the control of the roll table. First/last segments that do not start/end on a segment boundary obtain the original segment information from the cache.

The Dispersed Write Control routine is illustrated in FIGS. 78A-78D. The routine begins at step 7801 by setting STF and calling the Get/Put Global Variables subroutine in order to put the global variables back in the SDT RAM. At step 7803 CMDQ1 is fetched and ORed with 1000 to set the Phase 2 indicator. CMDQ1 is then returned to the control store and ROLTAB is loaded into IX and transferred to HL. HR is then stored at ROLLSG to save the roll table pointer. The routine then sets STC and calls the EFCNV subroutine at step 7805 to calculate the transfer parameters.

Next, ST5 is checked at decision point 7800 to see if we are dealing with a fixed head disk drive device. If we are, the routine branches from decision point 7800 to the module 7802. If we are not then a seek must be issued first so the routine proceeds to module 7804 where (CEF1 is fetched to HR, HH ANDed with 00FF, and the result entered into GA. STD is set and a call is made at step 7807 to the Select Cache Drive subroutine to select the drive. After the subroutine has been completed then at step 7809 ROLSAR is fetched from its storage location to HR and then returned to the location reserved for CDCCHS. ROLREC is fetched from its control store location to HR and HR is stored at SRCHAR. These operations get CDCCHS and SRCHAR for the seek operation. STC is reset and a call is made at step 7811 to the Cache Seek subroutine.

At step 7802 the SBITS, BX, STGOFF, PS and ROLLSG are initialized. 0420 is entered into HH and HL is cleared. HR is then stored at the location reserved for SBITS to indicate a First Buffer and Cache command. BX and HH are cleared and 0800, the base address of one buffer area in the staging buffer, is entered into HL. HR is then stored at STGOFF. The offset CACOFF is then fetched and stored at a reserved location in the control store. HL is ANDed with 0007 and entered into GB after which GB is ANDed with 0700 with the result being returned to GB. DPSTW (0804) is loaded into GG, ORed with 0002 to set up the preset constant, and the result entered into GG. GG and GB are then summed and entered into PS to set up the PS register. ROLTAB is entered into IX and transferred to HL. HL is then stored at ROLLSG to save the roll table pointer.

The roll table entry is fetched and tested at decision point 7806 to see if the valid bit is set. If it is not, the routine branches from decision point 7806 to FIG. 78D where preparations are made for an exit to a cache error status routine (not described).

If the test of the valid bit shows that the roll table entry is valid, then at step 7813 CC is ANDed with 0800 to set the Write Latch. CXFRI, the cache transfer indicators, are fetched to HR and HL tested at step 7808 to see if this is the first and last segment, that is, a single segment transfer. If it is, the routine proceeds from decision point 7808 directly to module 7810. If it is not a single segment transfer then CACOFF is fetched to HR and HL is tested at step 7812 to see if the offset is zero. If it is, the routine proceeds directly from decision point 7812 to module 7814 to initiate the host to buffer transfer.

If the offset is not zero then a full segment must first be transferred from cache to the staging buffer. At step 7810 HR is cleared and stored at CACOFF to clear the offset for a full segment transfer. At step 7890 the cache starting address CAC32A is fetched to HR and then saved at a specified location in the control store. HL is ANDed with 0800 to provide a zero offset within the segment. HR is then stored at CAC32A. The values 2016 and 1792 are entered into HH and HL and stored at CACURR. This provides the setup for a full segment transfer length.

The cache is then selected and reserved. CACADR, the current cache address from the roll table entry, is fetched to HR at step 7891 and HH entered into GE. A call is then made at step 7892 to the Select Cache subroutine to select the cache. ROLLSG is fetched to HR at step 7893 and stored at ROLACC to update the cache transfer pointer. GA is set to 4000 to indicate a read and STE is reset. STC is set and a call is made at step 7894 to the Cache To Buffer Transfer routine with a Wait for Transfer completion.

After the last word has been transferred from cache to the staging buffer the Dispersed Write Control routine calls the Release Cache subroutine at step 7895 to release the cache. At step 7896 CBUFND, the ending address for this transfer, is fetched to HR and HL loaded into BX to fetch the last word of this transfer. HR is then stored at CACOLD to save the last word of the transfer.

CACWRT is fetched to HR to retrieve the transfer length after which it is stored at CACURR. The SBITS are fetched and ANDed with 2000 at step 7816 to see if the SEG1 bit is set. If it is, there is no need for a first merge. The routine proceeds directly from decision point 7816 to module 7818.

If SEG1 indicates a first merge is necessary, then at step 7817 CACOFF is fetched from the special location in the control store and HH entered into BX. CXFRI is fetched to HR and HH ANDed with 0001 at step 7820 to find out if we have an odd starting address. If we do not, the routine proceeds from decision point 7820 directly to module 7822. On the other hand, if we do have an odd starting address then BX is incremented at step 7819 before the program proceeds to module 7822 where HH is then ANDed with 0023 to find out if the single even/first merge indicators are set. If they are not, the merge is bypassed and the routine proceeds from decision point 7824 to the module 7814.

If the single even/first merge indicators are set then the routine proceeds to get one word from the host and then merges. GA is set to 0001 at step 7821 and the Write Wait subroutine is called at step 7823 to wait for the first word. RW is ORed with 0800 at step 7825 to turn on the SERDES Write Shift Enable, and STE is set. The pre-read mask WROMSK is fetched to HR, STC is reset and then the Merge subroutine is called at step 7827.

The Host To Buffer Transfer routine is then called at step 7814 to initiate transfer of the first segment from the host to the staging buffer 800. After the segment is transferred the SBITS are fetched at step 7829 and HH ORed with 2000 to set the SEG1 indicator. The SBITS are then returned to the control store and CXFRI fetched to HR. HL is then tested at step 7831 to see if this is the last segment. If it is, the routine jumps to module 7826 in FIG. 78B. If this is not the last segment then BX, STGOFF and WLNGTH are set up for a Host to Buffer/Buffer to Disk transfer. The SBITS are fetched at step 7818 to get the buffer pointer which is ANDed with 0020 at step 7828 to find out if it is pointing to the first buffer area of SB. If it is not, the routine proceeds directly from decision point 7828 to module 7830 where BX is set to 0800 and HL is set to F800 before proceeding to module 7832. On the other hand, if the pointer is pointing to the first buffer then the routine proceeds from decision point 7828 to module 7834 where BX is set to zero and 0800 is loaded into HL before the routine proceeds to module 7832.

In module 7832, the resulting offset in HL is saved at STGOFF. ROLLSG is fetched and then stored at ROLACD to update the disk transfer pointer. CXFRI is fetched and the routine proceeds to FIG. 78B where the SBITS are tested at 7834 to see if this is the last segment. If it is, the routine branches from decision point 7834 to module 7836. If this is not the last segment, ROLLSG is fetched at step 7833, incremented by one, and returned to ROLLSG.

The routine then calculates the next segment transfer parameters. STC is set and the Calculate Parameters subroutine is called at step 7835 to make the calculation. CXFRI is fetched at step 7837 and HL tested at step 7880 to see if the next segment is the last segment. If it is, the routine branches to FIG. 78D. If it is not the last segment 01C0 (decimal 448) is entered into HL at step 7839 and stored at WLNGTH. OP is ANDed with 0003 and the result returned to OP to allow Orient 1/2. OP is then ORed with D500 at step 7852 to set OP High.

At step 7844 STGOFF is fetched to HR and BX entered into HH. The result is returned to STGOFF. The disk transfer length WLNGTH is fetched to HR and HL tested at step 7838 to see if this is a non-overlapped mode. If it is, the routine branches from decision point 7838 to module 7840 to call the Disk To Buffer Transfer subroutine.

If this is an overlapped mode the value 1 is subtracted from HL at step 7841 and entered into GA so that GA contains the disk transfer length minus one. GA is then subtracted from BW and the result tested at step 7842 to find out if the channel buffer is available. If it is not, the routine loops back from decision point 7842 to the module 7844 and repeats this loop until the channel buffer is available.

When the channel buffer is available then the Host To Buffer/Buffer To Disk Transfer subroutine is called at step 7840 to transfer the segment from the buffer to the disk. After the transfer is complete, the current record number SRCHAR is fetched at step 7843, incremented and returned to the control store.

The Cache-Disk Head Advance Or Seek subroutine is called at step 7845 for a seek or head advance. After the subroutine is completed the SBITS are fetched to HR at step 7847, the record count incremented by one and the incremented count tested at step 7846 to see if it is record count 4. If it is, the routine branches from decision point 7846 to module 7848. If it is not, the SBITS are returned to the control store at step 7849 to save the record count and CXFRI fetched and tested at step 7850 to see if this is the last segment. If it is not, there is no need to recalculate WLNGTH so the routine loops back from decision point 7850 to the module 7852.

If the test at decision point 7850 shows that this is the last segment then a new WLNGTH must be calculated. At step 7836 CACURR is fetched to HR. The constant 448 is entered into GB and GB subtracted from HL. A test is then made at step 7854 to see if CACURR is equal to or greater than 448. If it is, GB is subtracted from HL at stop 7851 to decrement CACURR by the length of one record and CACURR is returned to the control store. The value 448 is entered into HL and stored at WLNGTH as the next transfer length. The routine then branches back to module 7852 to initiate the transfer of the next record.

If the test at decision point 7854 shows that CACURR is not equal to or greater than 448, another full record cannot be transferred. At step 7863 CACURR is transferred from HR to WLNGTH as the transfer length for the last record. HL is set to zero and stored at CACURR to clear this value. The routine then proceeds to module 7852 to initiate the transfer of the last (partial) record for the segment.

After four records have been transferred the test at decision point 7846 causes the routine to branch to module 7848 where HL is ANDed with FFF0 to clear the record count because one segment has been transferred. HH is XORed with BUFX in order to change the state of the buffer pointer bit. The SBITS are then stored and CXFRI fetched. CXFRI is then tested at step 7856 to see if this is the last segment. If it is not, the routine branches back to module 7818 in FIG. 78A in order to initiate the transfer of another segment.

If the test at decision point 7856 shows that this is the last segment, the SBITS are fetched at step 7853 and ANDed with 0200 to see if the SEGL bit is set. If it is not, preparations are made for obtaining the last segment. CXFRI is fetched at step 7826 and ANDed with 000C to test if a second merge is required. If it is not, the routine branches from decision point 7858 to module 7860.

If the test at decision point 7858 shows that a second merge is required, the buffer ending address is fetched to HR at step 7855 and loaded into BX to point to the last word to be transferred. The merge mask WR1MSK is fetched to HR and inverted. The Merge subroutine is then called at step 7857 to accomplish the merge operation. The Dispersed Write Control routine then proceeds to module 7860 where HL is cleared and stored at CACURR to clear this value. The SBITS are fetched and HH ORed with SEGL to set the Last Segment bit. The routine then branches back to module 7818 in FIG. 78A in order to transfer the last segment.

At decision point 7862, if the test of SEGL shows that it is set then the transfer is complete. STF is reset and the Get/Put Global Variables subroutine called at step 7859. After completion of this subroutine ROLTAB is entered into IX at step 7861 to point to the first entry in the roll table. IX at step 7872 is also transferred to HL and saved at a special location in the control store. The first entry in the roll table is fetched and ANDed with 7FFF to mask off the valid bit. The result is entered into GA and transferred to HL. The SDT address is then saved at a special location in the control store and CDCSDT, the SDT base address in the control store, is fetched to HR. HH is added to GA to obtain the SDT entry address and this address is stored in GE. SBSDT, the base address for the SDT in the staging buffer is entered into GB. The transfer length 4 is entered into GC and GD is set to zero. The routine then continues in FIG. 78C where STF is reset and a call is made at step 7865 to the Get/Put RAM subroutine to get the SDT entry.

At step 7867 the SDT address saved in the control store is fetched and entered into GA and the Delete SDT Entry subroutine is called at step 7869 in order to delete the SDT entry.

Next, CMDQ2 is fetched at step 7871 and HH ANDed with 003F to isolate NSEG which is stored in GB., GB is decremented by one and returned to GB with the result being tested at step 7866 to see if it is zero. If it is, the routine proceeds from decision point 7866 to module 7668. If it is not, the routine goes to module 7870 where ROLTAB is entered into GA and incremented by one. The roll table pointer is fetched from the special location in the control store to HL and the value in GA is subtracted therefrom. The result is tested at step 7874 to find out if the last entry has been done. If it has not, GB is added to HL at step 7873 and entered into IX to point to the last entry. The routine then loops back to module 7872 (FIG. 78B) and proceeds as described above.

If the test at decision point 7866 shows that NSEG=0 or the test at decision point 7874 shows that the last entry has been done, the routine proceeds to module 7868 where CEF1 is fetched to HR and ANDed with 00FF. The result is entered into GD and STF is reset. A call is then issued at step 7875 to the Get Command Queue subroutine to fetch the command queue into the staging buffer. At step 7877 SBCMDQ is entered into BX and ST9 reset. BX is incremented as STA is set. The command queue header is then fetched to HR as BX is again incremented. HH is transferred to GA as ST8 is reset. GA is added to GA and the result returned to GA after which GA is added to BX in order to obtain the offset into the entry. HH is cleared and HL is loaded with Status Action 06 after which HR is stored at STSXSA. STB is reset and the routine exits to the Cache Status routine.

Figure 78A:
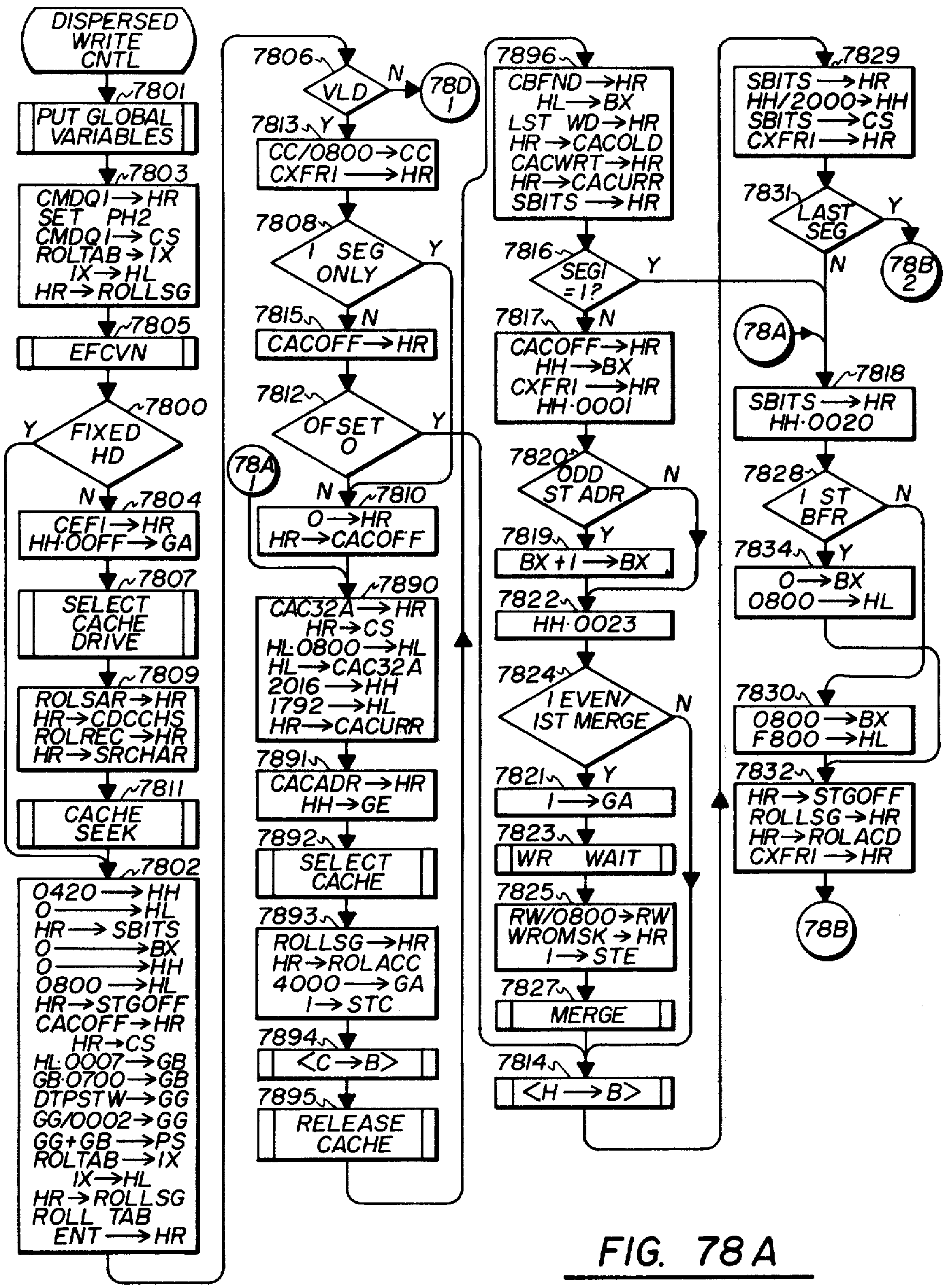
Figure 78B:
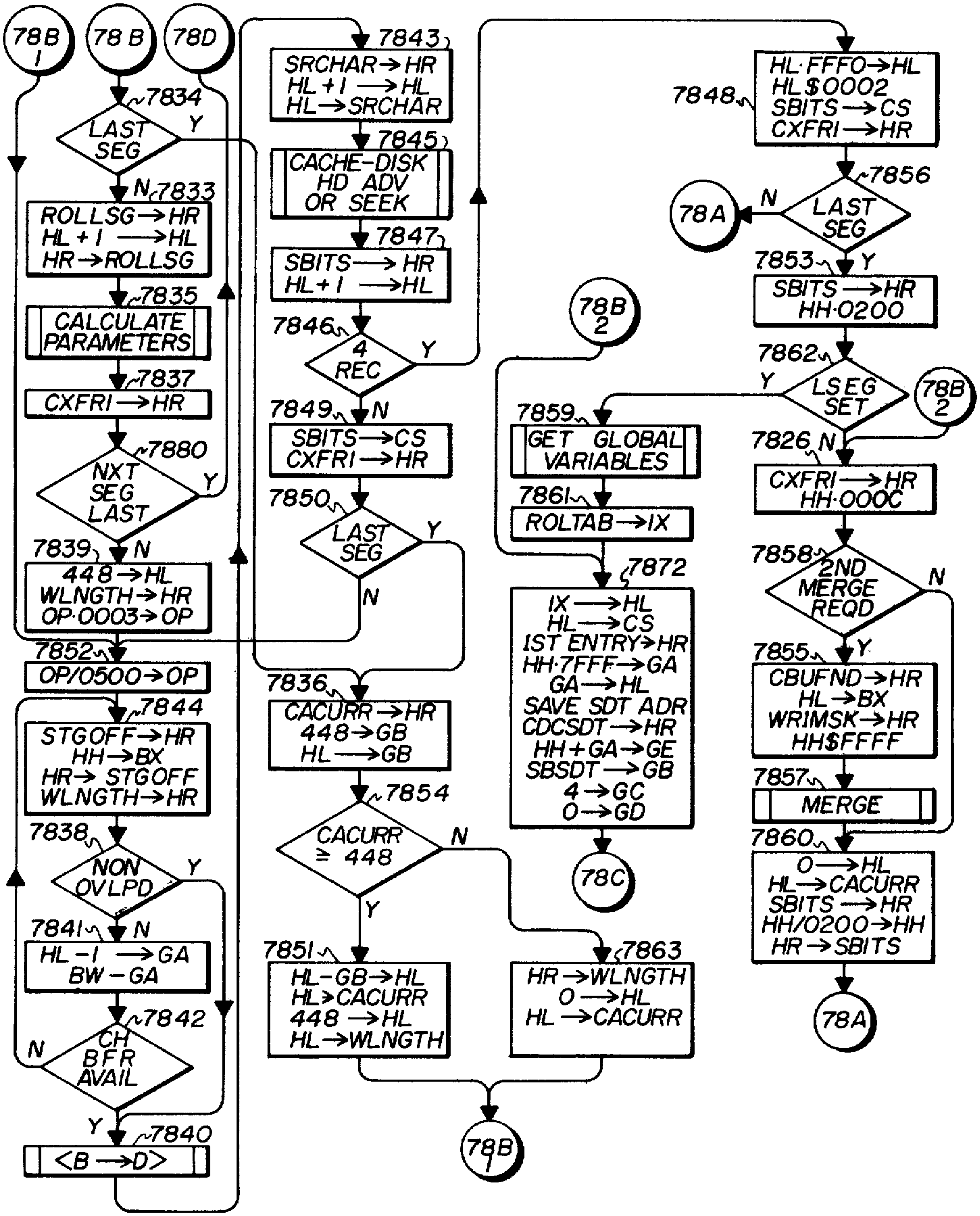
Figure 78D:
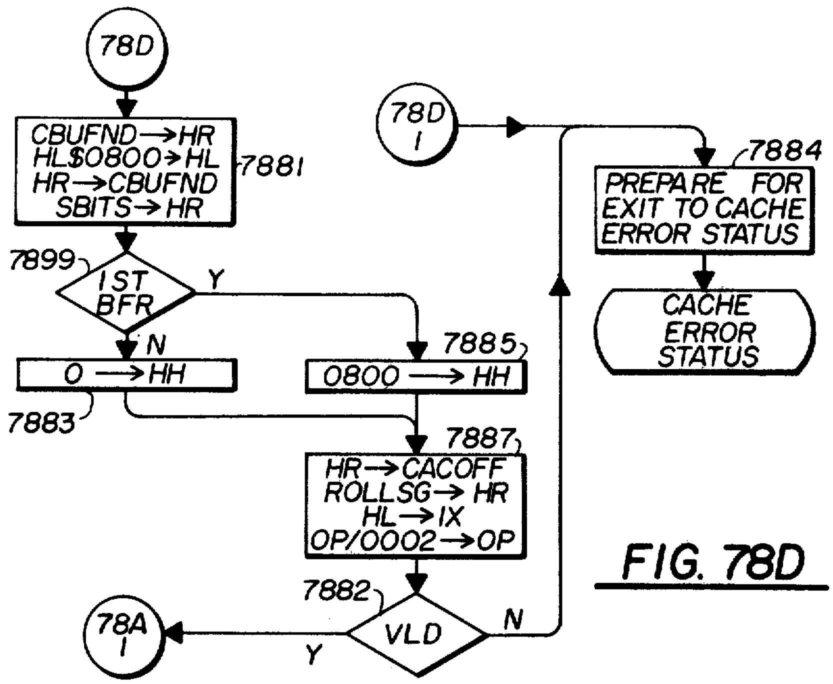

If the test at decision point 7880 (FIG. 78B) shows that the next segment to be transferred is to be the last segment, the routine branches to FIG. 78D where CBUFND is fetched at step 7881 and XORed with 0800 to reverse the buffer pointer. CBUFND is then returned to the control store and the SBITS fetched. The SBITS are ANDed with 0020 at step 7899 to test if the BUFX pointer is pointing to the first or second buffer. If it is pointing to the first buffer then 0800 is entered into HH at step 7885. If it is pointing to the second buffer then HH is cleared at step 7883. Whichever value is entered into HH is then stored at CACOFF at step 7887.

ROLLSG is fetched and entered into IX. OP is ORed with 0002 as the roll table entry is fetched. The valid bit in the roll table entry is tested at step 7882 and if it is not set the routine branches from decision point 7882 to the module 7884 where it prepares for an exit to the Cache Error Status routine. If the valid bit is set then the routine branches back to module 7890 (FIG. 78A) in order to read from the cache.

DISPERSED WRITE ROUTINE

The Dispersed Write routine is invoked after Cache command Breakout has determined that the request is either a Dispersed Write command or a modified Write request with insufficient segments available in cache. The routine determines if the first segment is a hit or a miss. In the case of a miss a preread is set up by creating an SDT and roll table entry. If it is a hit then the SDT entry is updated with the TACK bit being set to one, the RIBS information updated if required, and all age links left unchanged. A roll table entry is made with ROLLIN=0 to indicate no preread is required since the first segment is in cache.

Subsequent internal segments (segments between the first and last segments) are invalidated if hits. In the case of misses, dummy roll table entries are made so that no roll ins occur.

When the last segment is encountered the same actions are taken as for the first segment. A preread is made for the miss case.

Subsequently, the FLHIT bit in the command queue entry is set if the first and last segments are hits. The Disk Seek is initiated and CE status presented to the host for disconnection. The Dispersed Write routine then exits to the idle loop.

Figure 80C:
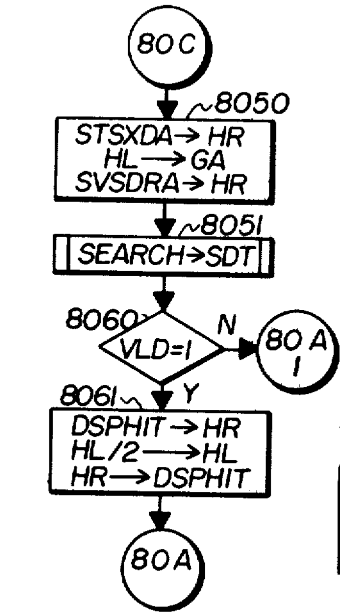
FIGS. 80A-80C—DISPERSED WRITE
Figure 80B:
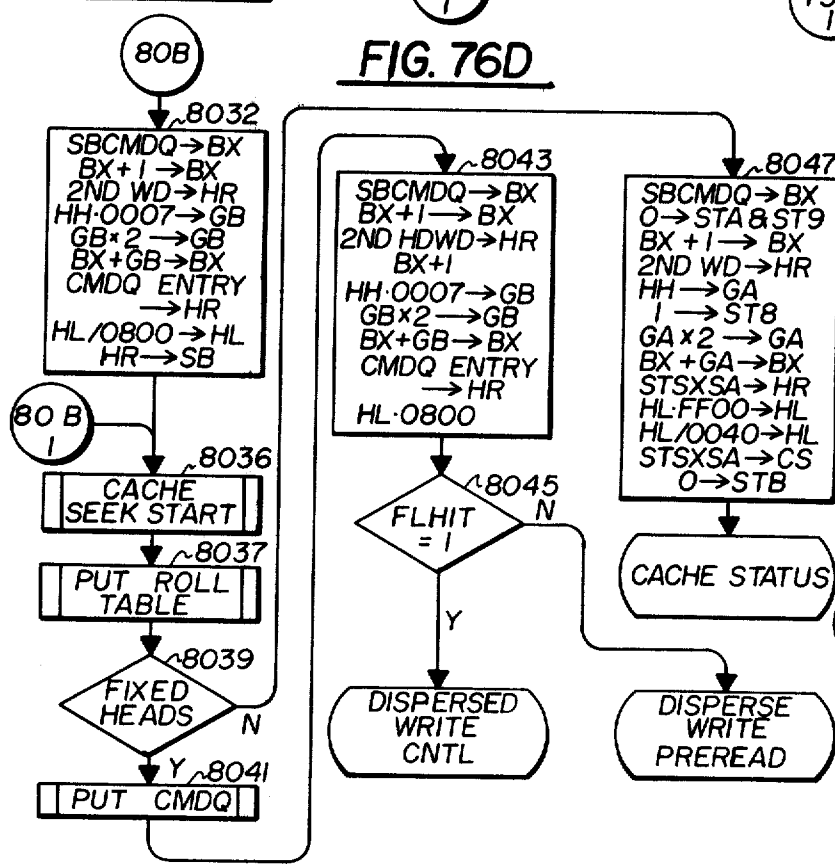
Figure 80A:
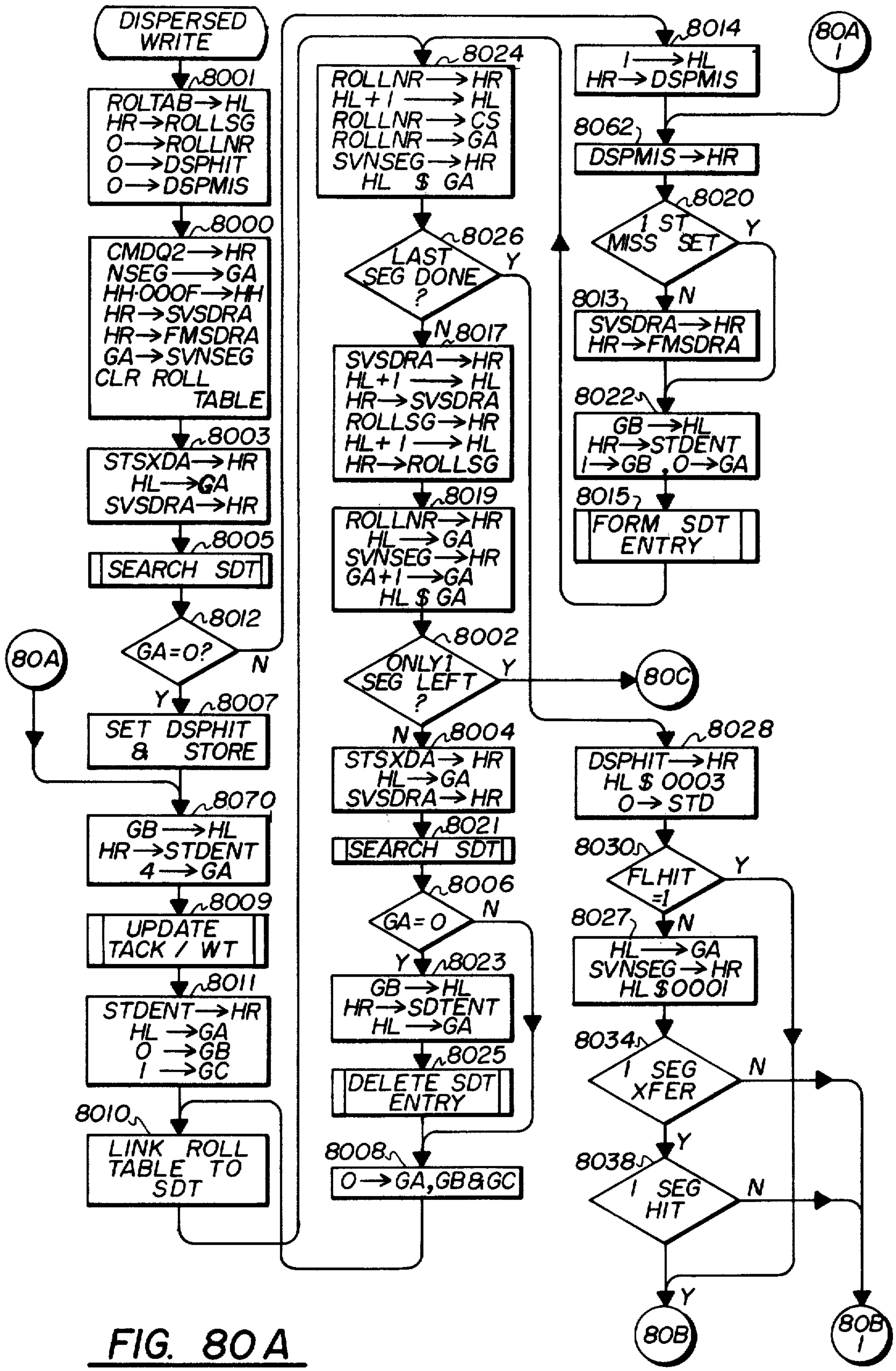

The Dispersed Write routine is illustrated in FIGS. 80A-80C and begins at step 8001 by entering ROLTAB into HL. HL is then stored at ROLLSG. HR is set to zero and transferred to ROLLNR to clear this value. HR is also transferred to DSPHIT and DSPMIS to clear these locations. DSPMIS indicates that the first missed segment was encountered while DSPHIT indicates that the first and last segments were hits.

After these operations are completed the operations in module 8000 are executed in order to isolate NSEG and SDRA from CMDQ2 and save these values at SVSDRA, FMSDRA and SVNSEG. A sequence of instructions is also executed to clear the roll table.

Next, preparations are made at step 8003 for accessing the SDT entry. The device address STSXDA is fetched and entered into GA. SVSDRA is then fetched to HR and a call is made at step 8005 to the Search SDT subroutine. If the search produces a hit then GA contains a zero value at the end of the subroutine. GA is tested at step 8012 to see if it is zero and if it is the value one is entered into HL at step 8007 and stored at DSPHIT.

AT step 8070 GB is transferred to HL and stored at SDTENT to save the SDT entry pointer. GA is set to four in preparation for calling the Update TACK/WT subroutine. At this point GB still contains the SDT entry pointer. The Update TACK/WT subroutine is called at step 8009 and after this subroutine is executed SDTENT is fetched to HL at step 8011 and the pointer placed in GA. GB is set to zero to indicate that ROLLIN should be zero and GC is set to one to indicate that the valid bit should be set to one. The Link Roll Table To SDT subroutine is then called at step 8010 in order to set the valid bit and reset the ROLLIN bit.

At step 8024 ROLLNR is fetched, incremented and returned to ROLLNR. The incremented ROLLNR is saved in GA and SVNSEG is fetched. HL is then XORed with GA to find out if the last segment has been done, the test being made at decision point 8026. If it has not then at step 8017 SVSDRA is fetched, incremented and returned to the control store. ROLLSG is also fetched, incremented and returned to the control store.

At step 8019 ROLLNR is fetched and entered into GA. SVNSEG is fetched to HR and GA is incremented for test purposes. HL is then XORed with GA to find out if there is only one more segment to do. If there is more than one more segment to do then the routine proceeds from decision point 8002 to module 8004. At this point the first segment has been tested for a hit or a miss. The tests have also shown that there is a middle segment, or possibly plural middle segments, that need to be cleared before the last segment is checked. At step 8004 STSXDA is fetched to HR and the device address entered into GA. SVSDRA is then fetched to HR and a call made at step 8021 to the Search SDT subroutine. Upon return from the subroutine GA is tested at step 8006 to see if it is zero. If it is, GB is entered into HL at step 8023 and the SDT entry pointer saved at SDTENT. HL is entered into GA and a call is made at step 8025 to the Delete SDT Entry subroutine. Upon completion of the subroutine GA, GB and GC are all set to zero at step 8008 with GA holding the dummy SDT entry pointer, GB indicating that the Link Roll Table To SDT subroutine about to be called should set ROLLIN to zero and GC indicating that the subroutine is to set SVLD to zero. The routine then branches back from module 8008 to module 8010 to link the roll table to the dummy SDT entry.

At decision point 8006, if the test shows GA is not equal to zero then there is no need to delete the SDT entry. The routine branches from decision point 8006 directly to module 8008 and proceeds as described above.

At decision point 8012, if the first search of the SDT produced a miss then GA will not be equal to zero and the routine branches from decision point 8012 to module 8014. The constant 0001 is set into HL as the First Miss flag and HL is stored at DSPMIS. DSPMISis again fetched to HR at step 8062 and tested at step 8020 to see if the Miss flag is set. If it is, the routine branches from decision point 8020 to module 8022. If the first Miss flag is not set then SVSDRA is fetched to HR at step 8013 and stored at FMSDRA as the First Missed Segment Seek Address. The routine then proceeds to module 8022 where GB is loaded into HL and stored at SDTENT to save the SDT entry pointer. GB is set to one to indicate that ROLLIN should be one in the SDT entry about to be formed. GA is set to zero to indicate that the RIBS bit should not be set since this is a normal entry. The Form SDT Entry subroutine is then called at step 8015 to form the SDT entry. After the subroutine has been completed the Dispersed Write routine branches back to module 8024 and proceeds as described above.

At decision point 8026, if the test shows that the last segment has been done the routine branches to module 8028 where the segment hit flags DSPHIT are fetched. STD is reset as HL is XORed with 0003 to find out if the first and last hit flag has been set. If it has, the routine branches from decision point 8030 to module 8032 in FIG. 80B.

If the test at decision point 8030 shows that the first and last hit flag is not set GA is entered into HL at step 8027. SVNSEG is fetched to get NSEG which is XORed with 0001 to find out if this is a one-segment transfer. If it is not, the routine branches from decision point 8034 to the module 8036 in FIG. 80B.

If the test at decision point 8034 shows that this is a one segment transfer then HL is XORed with GA at step 8038 to find out if this is a one-segment hit. If it is not, then the routine branches from decision point 8038 to the module 8036 in FIG. 80B. However, if the test at decision point 8038 shows that this is a one segment hit then the routine branches to the module 8032 in FIG. 80B.

In FIG. 80B, the module 8032 performs the functions necessary to set the FLHIT flag if there are first and last segment hits or one segment only with a hit. SBCMDQ is entered into BX to point to the staging buffer. BX is then incremented to point to the second word in the command queue header. This second word is fetched to HR as BX is again incremented. HH is ANDed with 0007 to isolate the Active Command Request Number which is stored in GB. The Active Command Request Number is then shifted left and returned to GB. GB is added to BX in order to point to the command queue entry which is then fetched to HR. HL is ORed with 0800 to set the FLHIT bit (20) in the first word of the command queue entry. The command queue entry is then returned to SB.

Next, STC is set and a call is made at step 8036 to the Cache Seek Start subroutine to start the cache seek operation. At the conclusion of the Cache Seek Start subroutine STF is set and a call is made at step 8037 to the Get/Put Roll Table subroutine to put the roll table back in the SDT RAM. At step 8039 this point ST5 is checked to see if we are dealing with a fixed head disk drive device. If we are, STF is set and a call is made at step 8041 to the Get/Put CMDQ subroutine to put the command queue back in the SDT RAM. At step 8043 SBCMDQ is fetched to HR and incremented to point to the second word in the command queue header. This word is fetched to HR as BX is again incremented. HH is ANDed with 0007 to isolate the Active Command Request Number which is entered in GB. GB is added to GB and the result entered into GB. GB is then added to BX to obtain the offset pointer to the command queue entry. The command queue entry is fetched to HR where it is tested at step 8045 to see if the FLHIT bit is set. If it is set then the routine branches to the Dispersed Write Control routine. If FLHIT is not set then a preread operation is necessary and the routine branches to the Dispersed Write Pre-Read routine.

In FIG. 80A, if the test at decision point 8002 shows that there is only one segment left to be transferred the routine branches to module 8050 in FIG. 80C. STSXDA is fetched in order to obtain the device address which is loaded into GA. SVSDRA is then fetched to HR and the Search SDT subroutine called at step 8051. If the search finds no entry (VLD=0) a branch is taken from decision point 8060 back to the module 8062 in FIG. 80A and proceeds as described above.

If the test at decision point 8060 finds an entry then the Last Segment Hit flag is set. DSPHIT is fetched to HR at step 8061 and HL ORed with 0002 to set the Last Segment Hit flag. HR is then stored at DSPHIT after which the routine branches back to FIG. 80A at module 8070 to begin preparing to update the TACK/WT bits.

DISPERSED WRITE PRE-READ ROUTINE

Figure 82A:
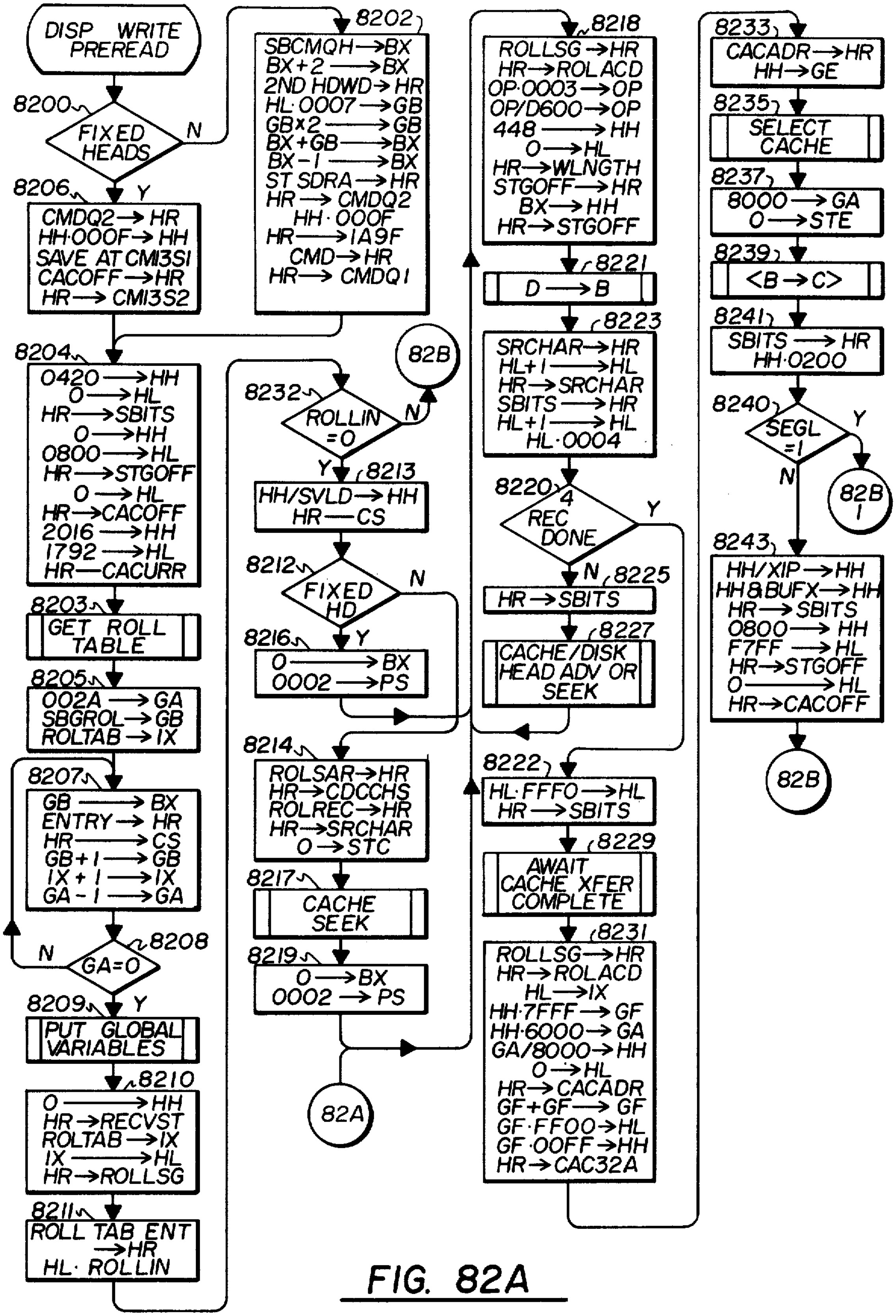
FIGS. 82A-82B—DISPERSED WRITE PREREAD
Figure 82B:
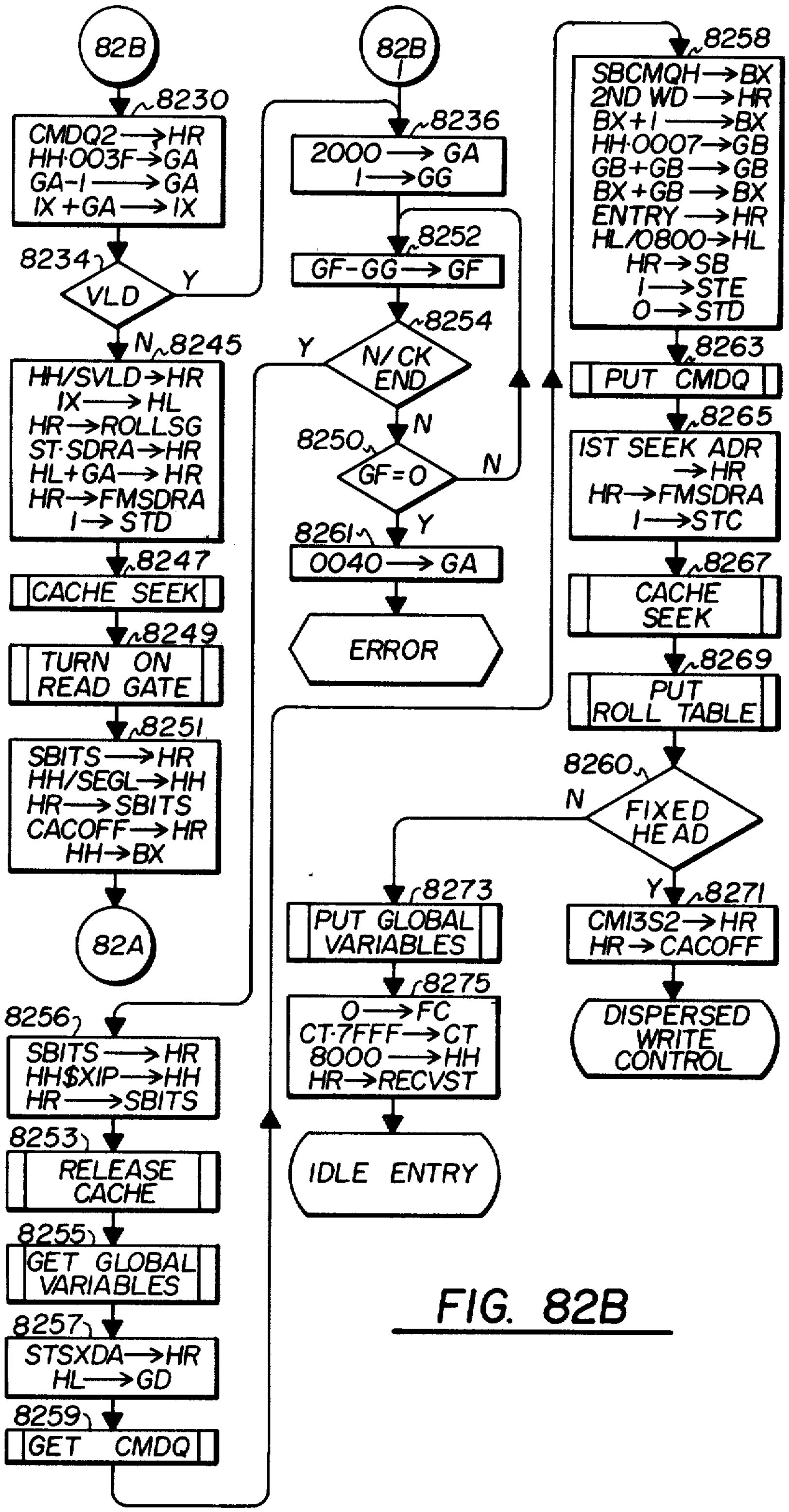
Figure 89:
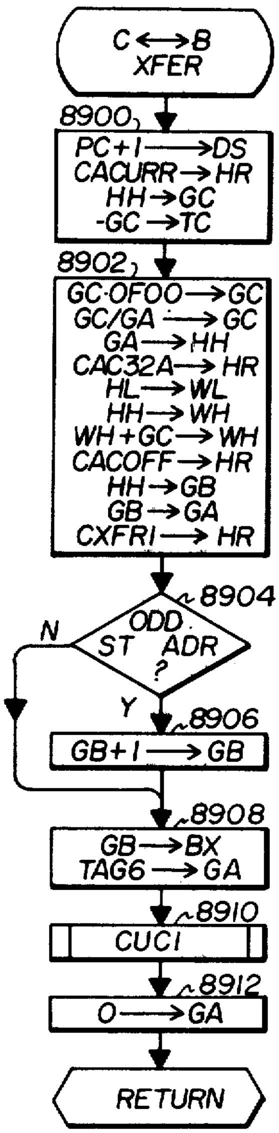

The Dispersed Write Pre-Read Routine is illustrated in FIGS. 82A and 82B. This routine upstages the first and last segments into cache on behalf of a Dispersed Write operation. The routine is invoked by the Interrupt Processing routine after that routine has determined that the interrupt belongs to a cache operation initiated by a Dispersed Write request. The routine transfers segments from disk to cache based on the roll table (ROLLIN=1). After both segments have been processed the roll table is updated with SVLD=1 on the first and last entries. The command queue is updated with the FLHIT bits. Subsequently, the Disk Seek is started for the write operation which is to follow. The routine then exits to the Idle Entry routine. Before calling the data transfer routine the global variables are saved in the SDT RAM. Before the Cache Seek subroutine is called the global variables are brought back into to the staging buffer, and before the routine exits they are returned to the SDT RAM.

The Dispersed Write Pre-Read operation begins in FIG. 82A at step 8200 by testing ST5 to see if the disk drive device has fixed heads. If it does not, the routine proceeds from decision point 8200 to module 8202 where SBCMQH is fetched to BX and used to access the second command queue header word. The Active Command Request Number is ANDed with 0007 and saved in GB and BX incremented by two. GB is added to GB and the result added to BX to fetch the second word of the command queue entry to thereby obtain the starting SDRA. BX is decremented by one.

Next, SDRA is stored at CMDQ2. The contents of HH are also ANDed with 000F and the result saved at an address in CS 300 so that the starting SDRA will be available later. The first word of the command queue entry is then fetched to HR and stored at CMDQ1.

The routine then proceeds from module 8202 to module 8204.

If the test at decision point 8200 shows that the disk drive device has fixed heads then CMDQ1 and CMDQ2 are already valid. CMDQ2 is fetched at step 8206 to get the starting SDRA and it is ANDed with 000F to obtain the Address bits which are then stored at CM13S1. CACOFF is then fetched and stored at CM13S2 after which the routine proceeds to module 8204.

In module 8204 the SBITS, STGOFF, CACOFF and CACURR are initialized. The constant 0420 is entered into HH and HL is cleared to indicate a First Buffer and Cache command. The contents of HR are then stored at SBITS. HH is set to zero and 0800 is loaded into HL and HR is stored at STGOFF. HL is then cleared so that zero is stored at CACOFF. The value 2016 is entered into HH while the value 1792 is entered into HL. HR is then stored at CACURR.

Next, STF is reset and a call is made at step 8203 to the Get/Put Roll Table subroutine to get the roll table. At step 8205 GA is loaded with a value representing the roll table size and SBGROL, the starting address in the staging buffer of the area reserved for the roll table, is entered into GB. ROLTAB, the base address of the roll table in the control store is entered into IX.

The operations in module 8207 are repeatedly carried out in order to transfer the roll table from the staging buffer to the control store. When the operation is complete the test at decision point 8208 will show that GA=0. Next, STF is set and the Get/Put Global Variables subroutine is called at step 8209 to put the global variables back in the SDT RAM.

The operations in module 8210 initialize ROLLSG. HH is set to zero and stored at RECVST to reset the recovery status. ROLTAB is entered into IX and IX is entered into HL as STD is set. The contents of HR are then stored at ROLLSG to save the current pointer in the control store. The first roll table entry is fetched to HR at step 8211 and HL ANDed with ROLLIN to see if the ROLLIN bit is set. If it is not set, the test at decision point 8232 proves true and HH is ORed with SVLD at step 8213 to set the SVLD bit. The updated entry is then returned to the control store.

At step 8212 a test is again made for fixed heads. If there are no fixed heads then another seek must be made. The routine branches from decision point 8212 to the module 8214 where ROLSAR is fetched to obtain the first seek argument which is then stored at CDCCHS to set this value for the seek. The record number ROLREC is fetched to HR and stored at SRCHAR to set up the record number for the write operation. STC is reset and a call is made at step 8217 to the Cache Seek subroutine. After the subroutine is completed BX is cleared at step 8219 and 0002 is entered into the PS register in preparation for calling a disk to buffer transfer.

At decision point 8212, if the test shows that we are dealing with a fixed head device then another seek is not required. BX is reset at step 8216 and the value 0002 entered into PS after which the routine proceeds from module 8216 to module 8218.

In module 8218, ROLLSG is fetched to HR and stored at ROLACD to set up the disk pointer. OP is ANDed with 0003 and the result ORed with D600 with this result being returned to OP. HH and HL are loaded with the values 448 and 0 for an overlapped transfer. HR is then saved at WLNGTH.

STGOFF is fetched to HR and HH entered into BX. HR is then returned to STGOFF and a call is made at step 8221 to the Buffer To Host/Disk To Buffer Transfer subroutine.

After the record is transferred, CDCCHS and SRCHAR are updated at step 8223 and a check is made for multi-disk records. SRCHAR is fetched to HR to get the current record number which is then incremented and returned to the control store. The SBITS are fetched to HR and the number of records in segment in HL is incremented. HL is then tested at step 8220 to see if four records have been done. If they have not, the SBITS are returned to the control store at step 8225 and the Cache/Disk Head Advance or Seek subroutine is called at step 8227 after which the Dispersed Write Pre-Read routine returns to module 8218 to transfer another record.

After four records have been transferred, the test at decision point 8220 causes the routine to proceed to module 8222 where HL is ANDed with FFF0 to clear the record ount. The SBITS are then returned to the control store after which the Wait for Cache Transfer Complete subroutine is called at step 8229.

When the transfer is completed it is necessary to calculate the CACADR and CAC32A. ROLLSG is fetched to HR at step 8231 and stored at ROLACD to update the cache pointer. HL is entered into IX in order to fetch the roll table entry. HH is ANDed with 7FFF and the result placed in GF. HH is then ANDed with 6000 and this result placed in GA. GA is ORed with 8000 and the result placed in HH after which HL is cleared. The contents of HR are then stored at CACADR.

GF is added to GF and the result returned to GF. GF is ANDed with FF00 and the result entered into HL. GF is then ANDed with 00FF and this result entered into HH. The contents of HR are then stored at CAC32A.

At step 8233 CACADR is fetched to HR and entered into GE after which the Select Cache subroutine is called at step 8235.

At step 8237 GA is loaded with 8000 to indicate a write operation and STE is reset. STC is reset and a call is made at step 8239 to the Cache To Buffer/Buffer To Cache Transfer subroutine.

At step 8241 the SBITS are fetched to HR and tested at 8240 to see if the Last Segment bit is set. If it is not, HH is ORed with 8000 to step 8243 to set the Transfer In Progress indicator and the result is returned to HH. HH is then XORed with 0020 to change the state of the Buffer Pointer bit. The SBITS are then returned to the control store.

HH is loaded with 0800 and HL is loaded with F7FF after which HR is stored at STGOFF. HL is cleared and HR then stored at CACOFF. The routine then proceeds to module 8230 in FIG. 82B. This module is also entered directly from decision point 8232 (FIG. 82A) if the test shows that ROLLIN=0.

Module 8230 tests to see if the last segment is valid, and if not, saves its SDRA. CMDQ2 is fetched to obtain NSEG which is stored in GA. GA is decremented by one and returned to GA. GA is then added to IX to point to the last entry in the roll table. The entry is fetched to HR and ANDed with 8000 to see if the valid bit is set. If it is, the work of the routine is done and it proceeds from decision point 8234 to module 8236 to prepare for an exit.

If the test at decision point 8234 shows that the valid bit is not set then HH is ORed with 8000 at step 8245 to set the sense valid bit. The entry is then returned to the roll table.

IX is entered into HL and stored at ROLLSG to save the last entry pointer. The starting SDRA is fetched from CM13S1 where it has been saved. The SDRA is then added to the contents of GA (NSEG-1) and the result stored in HR. STD is set to indicate a Wait for Seek Complete and the SDRA of the last segment, now present in HR is saved at FMSDRA. STD is set and a call is made at step 8247 to the Cache Seek subroutine. After the Cache Seek subroutine, the Turn On Read Gate subroutine is called at step 8249 to turn on the read gate. The SBITS are fetched at step 8251 and ORed with SEGL to set the Last Segment bit. The SBITS are then returned to the control store and CACOFF fetched to HR. HH is entered into BX after which the routine loops back to FIG. 82A where, at module 8218, it begins the operations to initiate the roll-in of another segment.

In FIG. 82A, if the test at decision point 8240 shows that the Last Segment bit is set the routine proceeds to module 8236 in FIG. 82B. This module is also entered from decision point 8234 if the valid bit is set. In module 8236, the value 2000 is entered into GA as a time out constant and the value one is entered into GG for use as a decrement value for a timing loop. GG is subtracted from GF while at the same time a check is made at step 8254 to see if a Normal/Check End has been received. If it has not, a test is made at step 8250 to see if GF has been decremented to zero and if it has not, then the program loops back from decision point 8250 to the module 8252. If GF should be decremented to zero before a Normal/Check End is received, the routine enters the value 0040 into GA at step 8261 to represent a time-out status condition and the routine exits to the Error Control routines (not shown).

At decision point 8254, when the Normal/Check End is received the routine proceeds to module 8256 where the SBITS are fetched and XORed with 8000 to reset the Transfer In Progress bit. The SBITS are then returned to the control store and a call is made at step 8253 to the Release Cache subroutine.

Next, STF is reset and the Get/Put Global Variables subroutine called at step 8255 to get the global variables. At step 8257 STSXDA is fetched to HR to get the first EF word. HL is entered into GD to set up the device address. STF is reset and a call is made at step 8259 to the Get/Put Command Queue subroutine to fetch the command queue from the SDT RAM to the staging buffer.

The operations performed in module 8258 update the FLHIT bit in the command queue entry. SBCMQH is entered into BX to fetch the second word of the command queue header. BX is incremented by one and returned to BX.

The upper half of the second word of the command queue header is ANDed with 0007 to isolate the Active Command Request Number which is placed in GB. GB is added to itself with the result being entered into GB. GB is then added to BX and the result used to fetch the command queue entry. The lower half of the command queue entry word is ORed with 0800 to set the FLHIT bit. The updated command queue entry is then returned to the command queue in the staging buffer. STF is set and a call is made at step 8263 to the Get/Put Command Queue subroutine to restore the updated command queue to the STD RAM.

STD is reset to indicate "don't wait" on the following cache seek, and the first seek argument previously stored at CM13S1 is fetched to HR. The seek address in HR is then saved at FMSDRA. STC is set and a call is made to the Cache Seek subroutine.

After the Cache Seek subroutine is initiated STF is set and the Get/Put Roll Table subroutine is called to put the roll table back in the SDT RAM. At this point a test is again made to see if the device has fixed heads. If it does, the saved CACOFF value at CM13S2 is fetched to HR and then stored in CACOFF. The routine then exits to the Dispersed Write Control routine.

At decision point 8260, if the test shows that the disk drive device does not have fixed heads then STF is set and the Get/Put Global Variables subroutine called to put the global variables back in the SDT RAM. The FC register is set to zero to deselect the disk drive device and CT is ANDed with 7FFF with the result being returned to CT to deselect the SDT. ROLRAM (8000) is set into HH and HR stored at RECVST to save the recovery status. The routine then exits to the Idle Entry routine.

NORMAL OR DISPERSED READ CONTROL

The Normal or Dispersed Read Control routine is illustrated in FIGS. 79A–79D. This routine is called by the Cache Command Breakout routine if the EF is already in CMDQ. Normal Read Control transfers the data segments to the host under the control of the roll table. The valid bit in the roll table indicates whether the cache segment is valid (hit) or not (miss). If the valid bit is one then the segment is transferred from cache at the location specified by the roll table to the staging buffer and then the host. If the valid bit is not set the segment is read from the disk into the staging buffer and then transferred to the host and the cache at the address specified in the roll table. Consecutive misses overlap transfers of previous segments to host and current segments from disk in a synchronous manner under microprogram control.

The valid bit in the SDT is set for all segments involved. The 16k Staging Buffer 800 allows overlapped transfers with odd segments in the first 8k of storage and even segments in the second. The hardware ADT transfers are started and Disk to Buffer or Buffer to Host may proceed simultaneously.

The routine begins at step 7901 (FIG. 78A) by setting STF and calling the Get/Put Global Variables subroutine to put the global variables back in the SDT RAM. ROLTAB is entered into IX at step 7903 and transferred to HL. HL is then stored at ROLLSG. The first roll table entry is fetched to HR under control of IX and the Occupied bit tested to see if it is set. This step is not shown since an error condition exists if it is not set.

The EF Conversion routine is then called at step 7905 to convert the extended transfer commands from the host 36-bit format to the SCU 32-bit format. STC is set as this routine is called.

At step 7907 CACCMD (0400) is entered into HH and HH ORed with BUFX (0020) to indicate Cache command and First Buffer. HL is set to zero and HR is stored at SBITS. CACOFF is fetched to HR and SBUF2 (0800) is entered into HL. HR is then stored at STGOFF. BX is then set to SBUF1 (0000) to initialize the buffer pointer.

The first cache box is then selected. CACADR is fetched to HR at step 7911 and HH entered into GE after which the Cache Select And Reserve subroutine is called at step 7913.

At step 7915 0400 is entered into GA and GA ORed with CC with the result being returned to CC to raise the read latch indicator.

At step 7917 a test is made for a hit or a miss. ROLLSG is fetched to HR and the current roll table pointer entered into IX. The roll table entry is then fetched to HR and ANDed with 8000 at step 7972 to see if the valid indicator is set. If it is, the Test Cache Transfer Complete subroutine is called at step 7922 because the segment is already in cache. At step 7909 ROLLSG is fetched to HR and HR transferred to ROLACC to save the current cache segment pointer. The TAG 6 Read indicator 4000 is entered into GA, STC is reset and a call is made at step 7976 to the Cache To Buffer Transfer routine.

At step 7919 SEG1 (2000) is entered into GB and the SBITS fetched to HR. HH is ORed with XIP to set the ADT Transfer In Progress indicator. HH is then ANDed with RCALCD (FFFE) to reset this indicator. HR is then stored at SBITS. Next, HH is ANDed with SEG1 at step 7966 to see if this is the first transfer. If it is not, HH is ANDed with BUFX at step 7962 to see if we are dealing with the first buffer. If we are, C1OFF is fetched to HR at step 7921 to get the first buffer offset. HH is transferred to BX and HL is transferred to GB. CXFRI is fetched to HR to get the indicators and HH is ANDed with one to see if we have an odd address set. If there is not an odd address, the routine branches from decision point 7900 directly to module 7902. If there is an odd address then BX is incremented at step 7904 before proceeding to module 7902.

At step 7902 C1URR is fetched to HR to get the length for the Buffer to Host Transfer routine which is about to be called. GB is then ANDed with 0700 at step 7964 with a swap of bytes and the result entered into GB to obtain the high orders for the preset. GB is then ORed with 2000 after which GB at step 7925 is added to GB and the result returned to GB. This last instruction is executed four times in order to shift the contents of GB. DTPST (7008) is entered into GA at step 7927 and GB is subtracted from GA with the result being entered into the preset register PS. The Buffer To Host Transfer routine is then called at step 7978.

At step 7929 HR is cleared and transferred to C1OFF to insure that this value is always zero after the first transfer. A test is then made to see if the first seek is done. Zero is entered into GB at step 7931 and the SBITS fetched to HR and ANDed with Seek 1 (1000) to test to see if the first seek is completed. If it is, the test at decision point 7968 proves true the previous record number (SRCHAR) is fetched to HR at step 7933 and HL incremented by four, the number of records in a segment. The value 9 is then entered into GC, this value representing the maximum number of records in each track. The constant 10 is then subtracted from HL and the result tested at step 7906 for a carry to see if we are still on the same track. If we are, the routine branches from decision point 7906 to module 7908. If we are not still on the same track then the value 9 is subtracted from HL at step 7935 and the result returned to HL to reset for recording on the next track. GB is ORed with HDREQ (0080) to indicate that a head advance is needed. At step 7908 HR is stored at SRCHAR to save this value.

GB is then tested at step 7970 to see if this is the same track. If it is not, CDCCHS is fetched to HR at step 7937 and 0100 added to HL with the result being placed in GA to increment the head address. ST5 is then tested at step 7980 to see if we are dealing with a fixed head disk drive. If we are, then no cylinder switch is necessary. The routine jumps to FIG. 79B, module 7912 where GA is entered into HL to increment the head count and HR is stored at CDCCHS. At step 7938 the current roll table entry pointer is fetched to HR and the address for ROLLSG is entered into IX. HL is incremented by one and returned to HL. The result is then stored under the control of IX. The roll table entry is fetched under the control of IX and HL ANDed with 4000 at step 7950 to find out if the Occupied bit is set. If it is, the address of SBITS is entered into IX at step 7941 and the SBITS fetched. HH is ORed with GB and the result entered into HH to set the Head Advance or Seek request. HH is XORed with BUFX to change the state of the buffer indicator. HL is set to zero to clear the record count. BX is then set to SBUF1 as HR is stored under the control of IX to initialize the default buffer pointer and ST bits. SBUF2 (0800) is loaded into HL as the default to the second buffer offset.

BUFX (0020) is ANDed with HH at step 7914 and the result tested for zero to find out if this is the first buffer. If it is the routine proceeds directly from decision point 7914 to module 7916. If it is not, F800 is entered into HL at step 7943 and BX is set to SBUF2 before proceeding to module 7916.

At step 7916 BX is transferred to HH and HR saved at STGOFF. STC is set and the Create Transfer Parameters subroutine is called at step 7945 to create the parameters for the next segment.

At step 7947 ROLLSG is fetched to HR and the roll table pointer in HL entered into IX. The roll table entry is fetched to HR under the control of IX and HH is ANDed with SVLD (8000) at step 7920 to find out if there is a hit. If there is, the routine loops back from decision point 7920 to the module 7922 (FIG. 79A) to repeat the loop.

Returning to decision point 7920, if the test produces a no hit indication then at step 7974 the current segment pointer is transferred from IX to HL and HR and saved at ROLACD. The SBITS are then fetched to HR under the control of IX. HH is ANDed with RCALCD and then HH is ANDed with Seek 1 at step 7984 to see if this is the first seek. If it is, a test is again made at step 7990 for fixed heads. Assuming we have fixed heads the SBITS are fetched to HR at step 7986 and HH ORed with Seek 1 to set the first seek processed indicator. The SBITS are then returned to the control store.

At step 7988 the SBITs are again fetched to get the indicators. OP is ORed with D600 to set the parameters for the Buffer To Host/Disk To Buffer Transfer routine. 01C0, the segment length for a type 8450 disk drive, is entered into HL. HH is ANDed with SEG1 at step 7851 to see if this is the first segment. If it is, HL is transferred to GB at step 7853 and WLNGTH is entered into IX. C1OFF is fetched to get the first buffer offsets. HL is then tested at step 7955 to see if the 36-bit offset is zero. If it is, GB is subtracted from HL at step 7957 and the result tested at step 7927 for an offset in the record. If there is an offset then the routine proceeds from decision point 7922 to FIG. 79C where at step 7977 HL is transferred to GC and GC subtracted from GB with the result being entered into HL as the calculated transfer length. GB is ANDed with 0700 with a byte swap to enter the low bits of the 36-bit offset into GB. GB is then ORed with 2000 as HR is stored using IX. GB is then added to GB with the result being returned to GB. This operation is repeated four times in order to shift GB. GA is then set to 700A which is the base preset for a read channel and disk operation. GB is subtracted from GA and entered into the preset register PS. HL is set to zero to clear the 36-bit offset and HR is stored at C1OFF.

STGOFF is then fetched and BX entered into HH. The Disk To Buffer/Buffer To Host Transfer routine is then called at step 7967.

At step 7969 a check is made for multi-disk records. SRCHAR is entered into IX to fetch the current record number. HL is incremented by one and the updated SRCHAR returned to the control store. The SBITS are fetched under the control of IX and the record count in HL incremented by one. HH is ANDed with FF3F to reset the head advance or seek request after which the SBITS are returned to the control store.

At step 7928 a test is made to see if four records have been transferred. If they have not, the routine branches from decision point 7928 back to module 7930 in FIG. 79B.

If four records have been done then at step 7932 HH is ANDed with XIP to see if the Cache Transfer In Progress bit is set. If it is, the routine proceeds from decision point 7932 to the module 7934 which calls the Test Cache Transfer Complete subroutine. After this subroutine a return is taken to module 7936. If the test at decision point 7932 shows that the XIP bit is not set then the routine proceeds directly to module 7936 where SEG1 is entered into GB and CMD01 is fetched to HR. HL is ANDed with 0010 and the result tested at step 7940 if this is a Dispersed Mode command. If it is, the routine branches back to the module 7938 in FIG. 79B thereby passing the updating of the cache.

If the test at decision point 7940 shows that the command is not a Dispersed Mode command then the cache must be updated. At step 7971 ROLLSG is fetched to HR and HR then stored at ROLACC. CAC32A is fetched to HR to get the cache starting address. HL is ANDed with F800 and the result entered into WL. HH is ORed with 8000 and the result entered into WH to set the Write bit and the high order of the address. CACOFF is fetched to HR to get the buffer address and HH is ANDed with SBUF2 with the result being entered into the BA counter to set the ADT pointer. GA is set to the full segment value F820 and transferred to TC in order to set the Transfer Count Register. STD is set as CUCI16 is loaded into GA. These operations will indicate to the next routine that this is a TAG 6 extended transfer operation. STC is reset and at step 7973 CUCI is called.

At step 7975 the SBITS are fetched to HR under the control of IX and HH ORed with XIP to set the ADT Transfer In Progress indicator. The SBITS are then returned to the control store and SEG1 set into GB. STA is set and the routine returns to module 7938 in FIG. 79B.

Figure 79A:
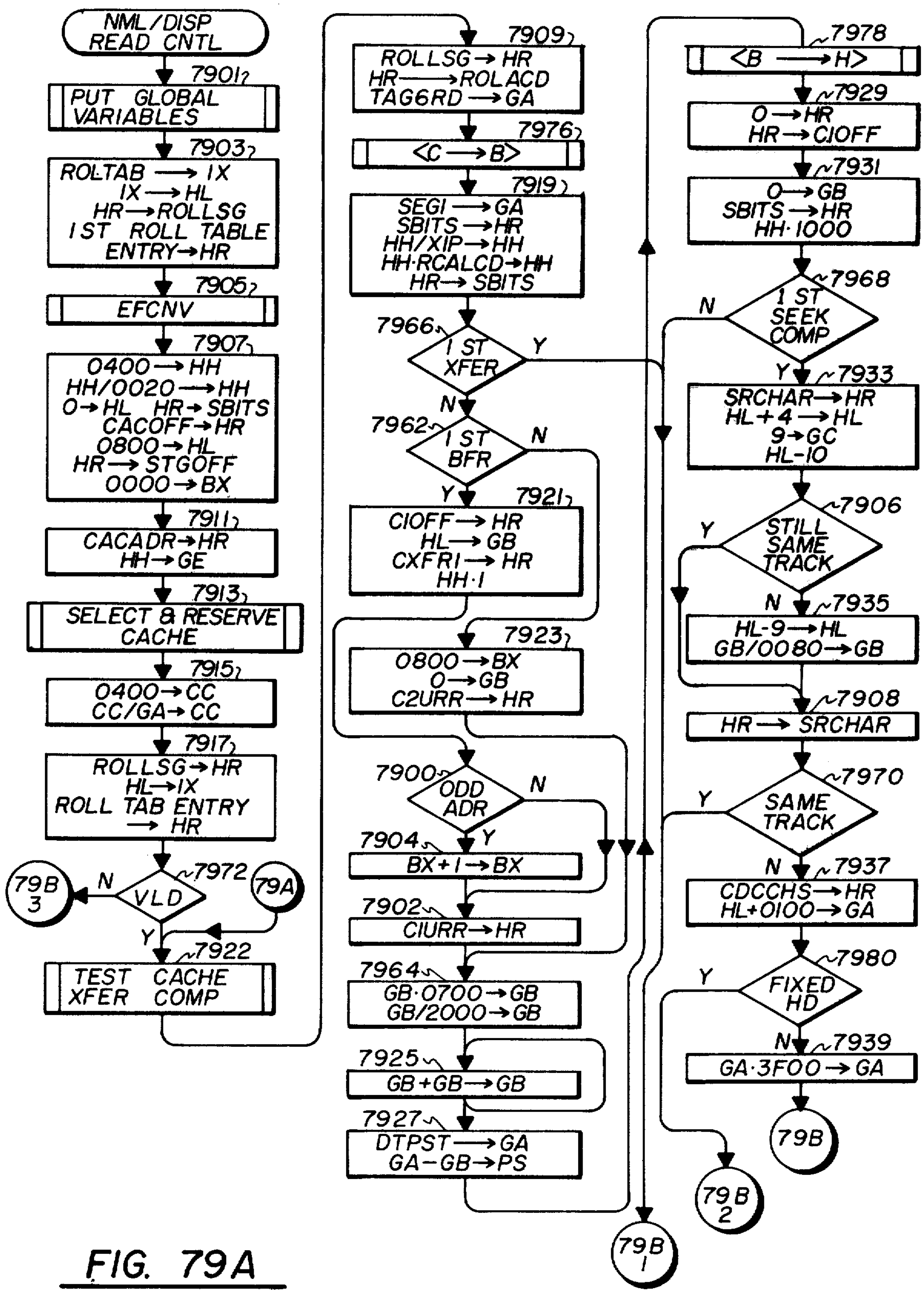
FIGS. 79A-79D—NORMAL/DISPERSED READ CONTROL
Figure 79B:
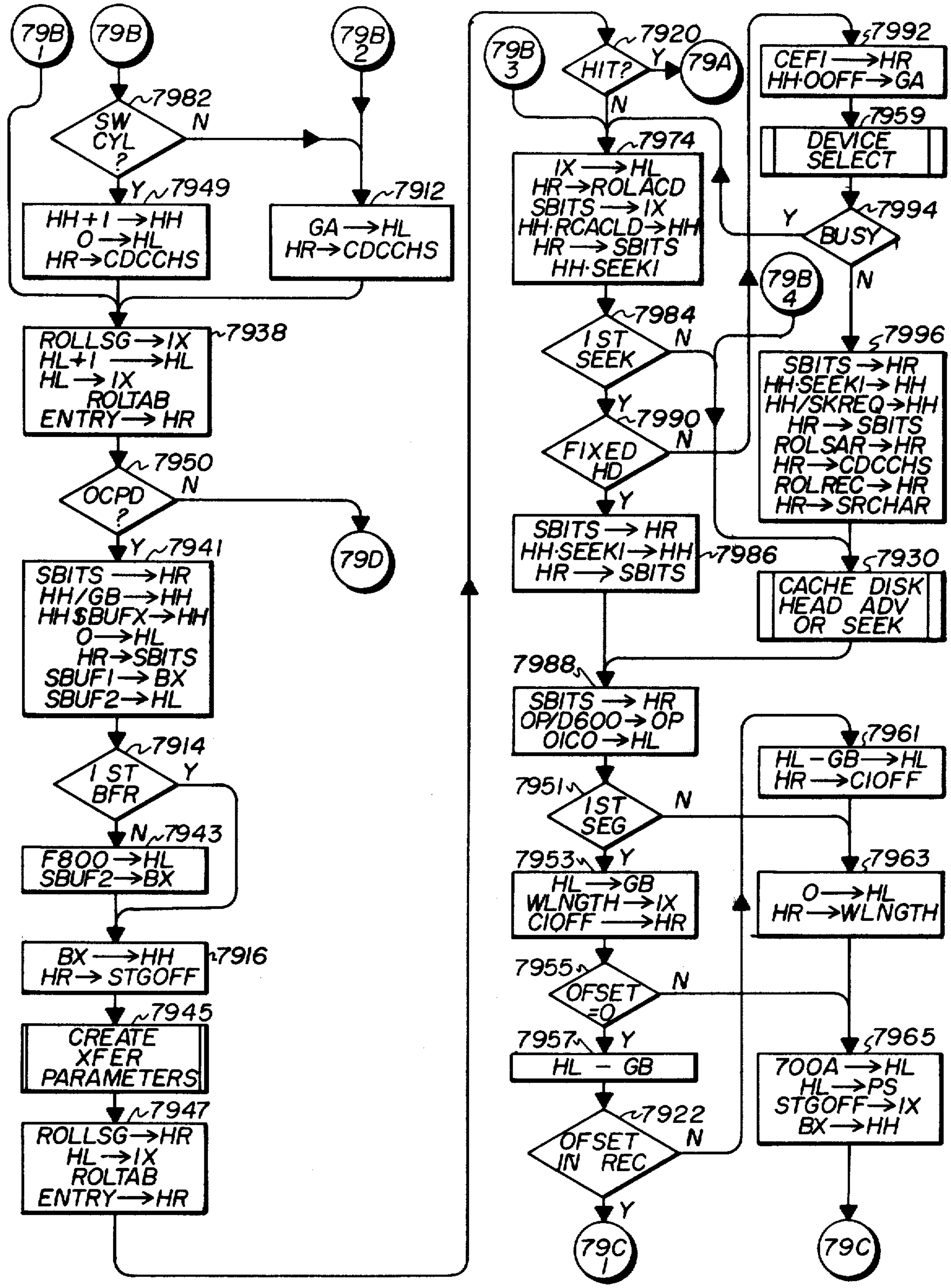
Figure 79C:
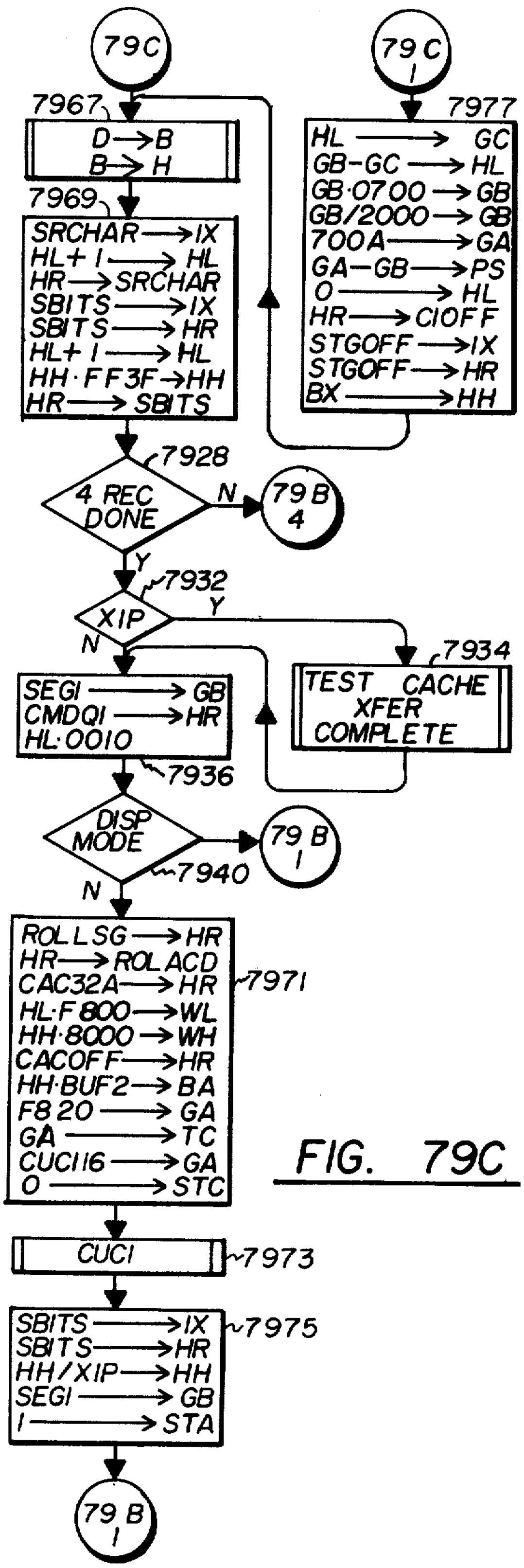
Figure 79D:
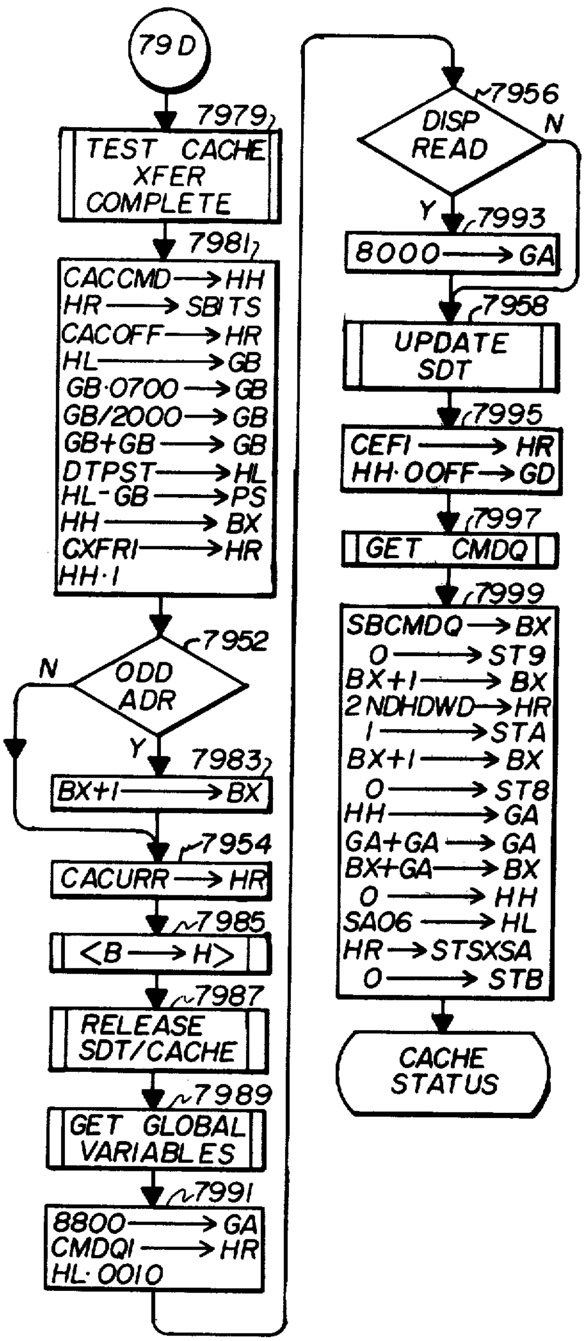

At decision point 7950 (FIG. 79B), if the Occupied bit is not set the routine branches to FIG. 79D where the Test Cache Transfer Complete subroutine is called at step 7979. At step 7981 CACCMD (0400) is entered into HH to reset all but the cache command indicator. HR is then stored at SBITS. CACOFF is fetched to get the offsets and the 36-bit offset is entered into GB. GB is ANDed with 0700 with a swap and the result entered into GB. GB is then ORed with 2000 after which GB is added to GB with the result being returned to GB. Four additions take place in order to shift four times. DTPST is then entered into HL and GB subtracted from HL and the result entered into the PS register. HH is transferred to BX and the CXFRI indicators fetched to HR. HH is ANDed with 0001 and the result tested at step 7952 to find out if there is an odd address set. If there is not, the routine branches from decision point 7952 to the module 7954. If the odd address is set BX is incremented at step 7983 before proceeding to module 7954.

At step 7954 CACURR is then fetched to HR to get the links for the transfer, and the Buffer To Host Transfer routine is then called at step 7985. After this routine is completed a call is made at step 7987 to the Release SDT/Cache subroutine. At step 7989 STF is reset and a call is made to the Get/Put Global Variables subroutine to get the global variables. GA is set at step 7991 to 8800 to indicate that TACK should be set to zero and VLD to one. CMDQ1 is fetched to HR and HL ANDed with 0010. The result is tested at step 7956 for a Dispersed Read mode. If it is not, the routine proceeds from decision point 7956 directly to module 7958. If there is a Dispersed Read then the value 8000 is entered into GA at step 7993 to indicate that the TACK bit only should be updated by clearing. The Update SDT routine is then called at step 7958 to update the TACK and Valid bits as required.

At step 7995 CEF1 is fetched to HR to get the device address. HH is ANDed with 00FF with a swap to put the address in the low order bits of GD. STF is reset and a call is made at step 7997 to the Get/Put Command Queue routine to get the command queue.

Preparation is then made at step 7999 to exit to the Cache Status routine. SBCMDQ is set in BX as the DE Request bit ST9 is reset. BX is incremented and the CE,DE Status Request bit STA is set. The Active Command Relative Address Pointer is then fetched as BX is again incremented. HH is transferred to GA as the CE,SM Request bit ST8 is reset. GA is added to GA with the result being returned to GA. GA is then added to BX to provide the Active Command Absolute Address. Zero is entered into HH and HL is set to Status Action 06. HR is then saved at STSXSA. The Control Command Status bit STB is reset and the routine exits to the Cache Status routine.

At decision point 7962 (FIG. 79A) if the test indicates that the first buffer is not involved in a transfer, then at step 7923 the base address of the second buffer area is entered into BX, zero is entered into GB and C2URR is entered into HR after which the routine proceeds to module 7964 and then proceeds as described above.

If the test at decision point 7966 indicates a first transfer, the test at decision point 7968 indicates that there is not a first seek complete, or the test at decision point 7970 indicates that the next record is on the same track, then the routine branches directly to module 7938 (FIG. 79B) and proceeds as described above.

In FIG. 79A, if the test at decision point 7972 indicates that the Valid bit is not set then the routine branches to module 7974 in FIG. 79B. This bypasses the Cache To Buffer And Buffer To Host transfers executed at modules 7976 and 7978 in FIG. 79A.

If the test at decision point 7980 (FIG. 79A) indicates that the disk drive device does not have fixed heads then at step 7939 GA is ANDed with 3F00 and the result entered into GA. The routine proceeds in FIG. 79B where a test is made at decision point 7982 to find out if a switch of cylinders is necessary. If it is not then the routine branches to module 7912 and proceeds as described above. If a switch of cylinders is required then at step 7998 HH is incremented, zero is entered in HL and the updated address stored at CDCCHS. The routine then proceeds to module 7938 and operates as described above.

In FIG. 79B, if the test at decision point 7984 indicates that the First Seek bit is not set then the routine branches to module 7930 to execute the Cache Disk Head Advance Or Seek subroutine before proceeding to module 7988. On the other hand, if the First Seek bit is set then a test is made at step 7990 for fixed heads and if there are fixed heads then the operations in module 7986 are executed before proceeding to module 7988.

If the test at decision point 7990 shows that the disk drive device does not have fixed heads then the routine branches to module 7992 in preparation for calling the Device Select subroutine. After completion of the subroutine at step 7959 a check is made at decision point 7994 to find out if the device is busy. If it is not then the operations in module 7996 are executed in preparation for calling the Cache-Disk Head Advance Or Seek subroutine at module 7930.

If the test at decision point 7994 indicates that the device is busy then the program branches to module 7974 and proceeds as described above.

MAKE AGE ASRI ROUTINE

The Make Age ASRI routine provides the cache/-disk subsystem with a dual aging process for segments residing in cache. Typically, when a cache miss occurs it is advantageous to stage (read in) more than one segment to cache since the probability that segments adjacent to the one referenced will be needed is high; and, the time required to stage (i.e. roll into cache) multiple segments is not crucially longer than the time required to stage one. These adjacent segments which are staged along with the referenced segment are typically called "speculative roll-ins."

In the dual aging process, the referenced segment is read into cache at the youngest aged or most recently used (MRU) segment position and the speculative roll-ins are read into somewhat older aged positions. Consequently, a pointer containing the SDT address of the Speculative Roll In (ASRI) is a parameterized value corresponding to an age (or position) in SDT where segments read in by speculation should be inserted.

In the case of MAKE AGE ASRI, the routine is used to adjust the age links within the SDT during the formation of an SDT entry for segments rolled in by speculation. In particular, the routine adjusts the age link for all SDT entries involved to make the new entry pointed to by the ASRI. In the case where the new entry is already destined to be placed at the ASRI (a function of the availability of cache space), the routine returns to the caller.

The routine will also adjust ASRI and set the OLD bit in the SDT entry to one (OLD=1) if that bit was previously zero (OLD=0). When set, this bit denotes that this entry is in the age bracket between and including the ASRI and LRU entries. It is set whenever a speculative roll-in entry is made, or whenever an entry above ASRI ages to ASRI. It is cleared whenever an entry is moved to the MRU position. Additionally, it sets the RIBS (rolled in by speculation) bit to one.

Explicit inputs from the calling routine include the address of the SDT entry (in SDT RAM) in the GA register and a value of 0, 1 or 2 in the GB register. A GB value of zero implies no linking of the roll table to the SDT (i.e. the current SDT entry address is *not* put into the current roll table entry). A GB value of one tells the routine to link the roll table to the SDT with the ROLL IN bit of the roll table set; and, a GB value of two informs the routine to link the roll table to the SDT without the ROLL IN bit set.

Implicit inputs to the routine include that the SDT entry to be made ASRI be located at SBSDT in the staging buffer and that the global variables reside in the staging buffer beginning at SBGLOB.

Figure 81A:
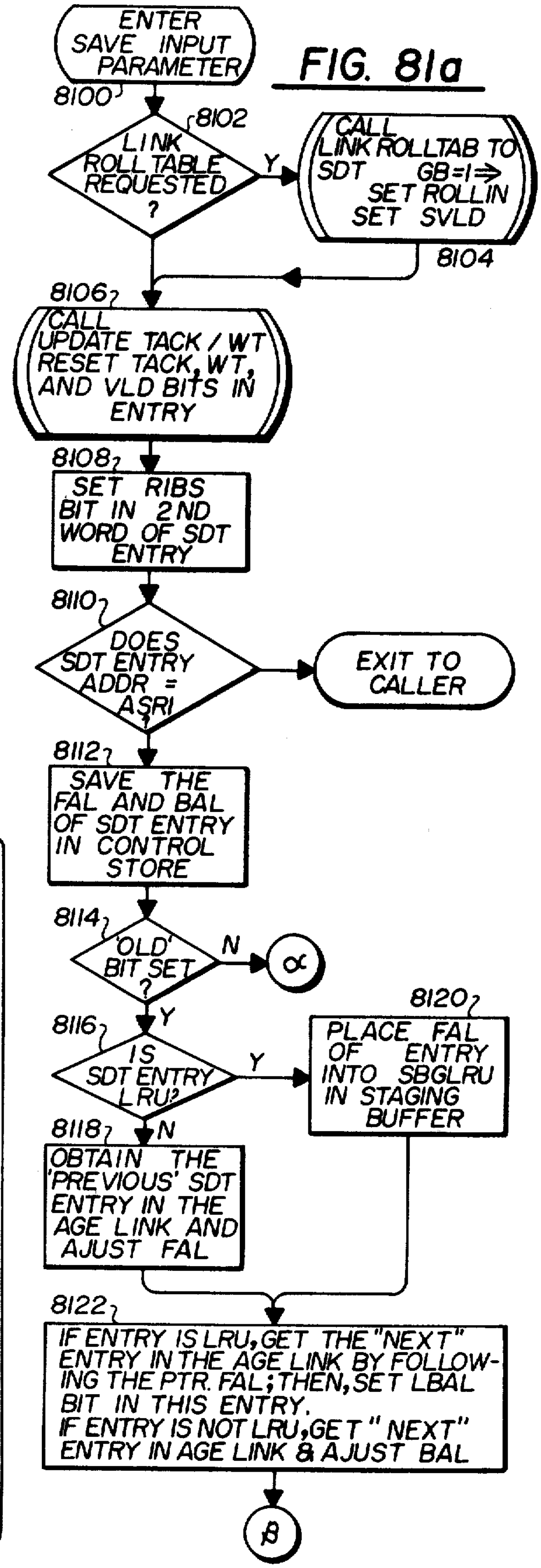

On entry into the MAKE AGE ASRI routine 8100 (FIG. 81A) an input parameter in the GA register, which serves as pointer to the SDT entry currently being formed, is saved in the control store for later use. The GB register is checked at decision point 8102 to determine if the calling routine requested the roll table be linked to the SDT. If so, a branch to a LINK ROLTAB routine at module 8104 is made and the proper parameters are passed to set the SVLD bit and to set the ROLL IN bit if requested.

Next, the TACK, WT and VLD bits are reset by a call to an Update TACK/WT routine at module 8106, and upon returning, the RIBS bit in the second word of the SDT entry is set as indicated in module 8108.

The SDT entry address, from the input parameter, is then compared at decision point 8110 to determine if it is the same as the ASRI. If it is, nothing need be changed and the Make Age ASRI routine exits to the caller. If not, the forward and backward age links (FAL and BAL) of the SDT entry are saved as depicted in module 8112.

Figures 81B, 81C:
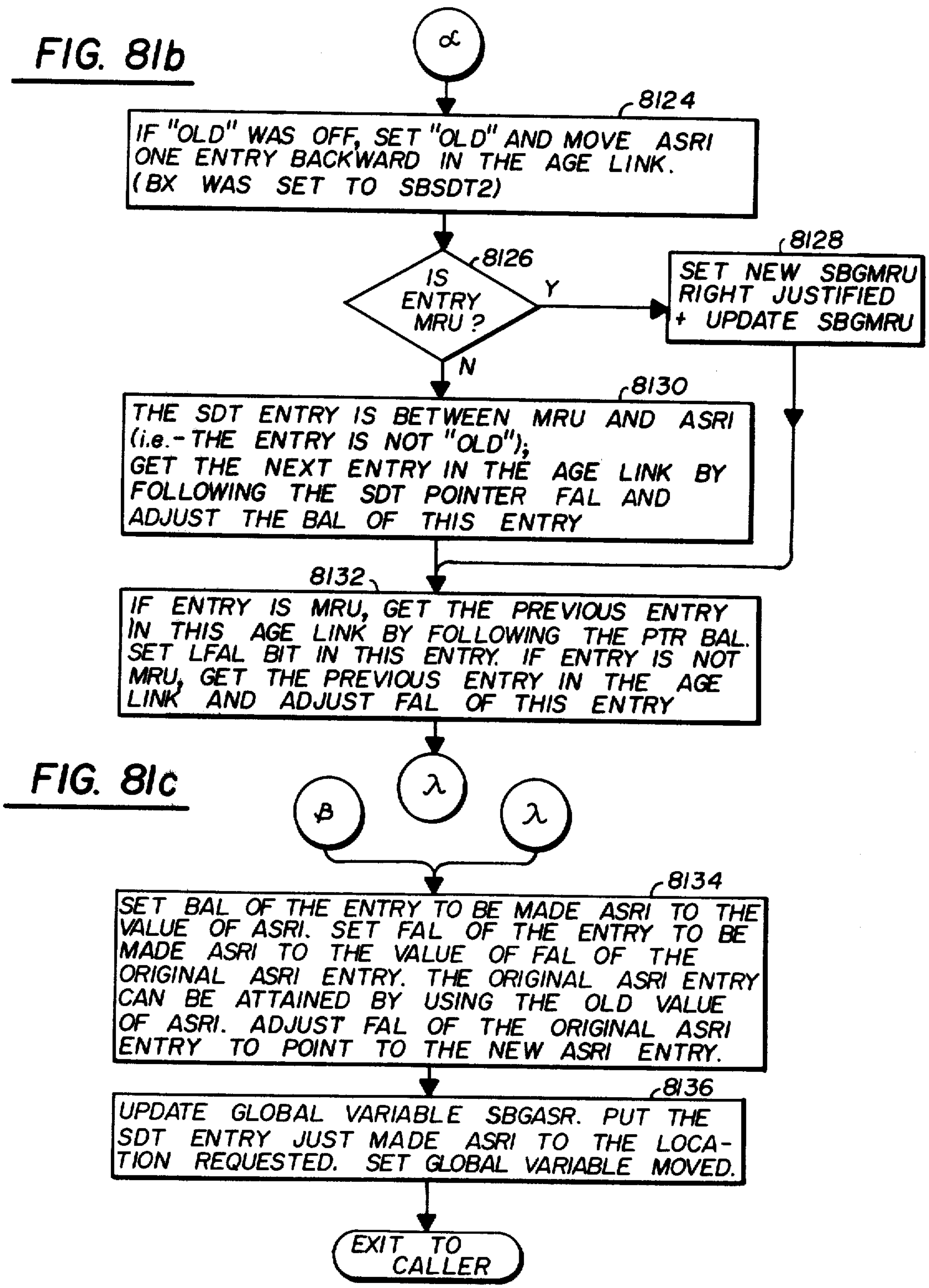

Next, the OLD bit in the second word of the SDT entry is checked at decision point 8114 to determine if the entry is of an age between ASRI and LRU. If the bit is set, the entry is old and will next be checked at decision point 8116 to see if it happens to be the LRU. If the OLD bit is not set, a branch is taken to module 8124 (FIG.81B) which is subsequently discussed.

Assuming the entry proved to be old, the LBAL (last backward age link) bit is tested to see if the entry is the LRU. If it is not set, a branch is taken at decision point 8116 to module 8118 wherein the "PREVIOUS" SDT entry in the age link (i.e. the adjacent one which is closer to the LRU) is obtained by following the backward age link (BAL) in the SDT pointer word previously saved in control store.

Once this "PREVIOUS" (or older) entry is obtained, its forward age link (FAL) is adjusted to point to the new entry.

If on the other hand, the LBAL bit tested at decision point 8116 was found to be set, indicating that the SDT entry is the LRU, the FAL of the SDT pointer is first used to update the global variable SBGLRU in the staging buffer as indicated in module 8120.

Subsequently in module 8124, the FAL is used also to obtain the "NEXT" entry in the age link (i.e. the adjacent one which is closer to the MRU). Additionally, if the LBAL bit is set (indicating the SDT entry is the LRU) then the LBAL in this new entry is set since it must now become the LRU. However, if the LBAL bit is not set (indicating the SDT entry is not the LRU), the backward age link (BAL) of the"NEXT" entry is adjusted.

Referring again to decision point 8114, if the OLD bit in the second word of the SDT entry is not set (indicating the new SDT entry age is "younger" than ASRI) a branching to module 8124 (FIG. 81B) occurs. At this point the OLD bit is set and the ASRI is revised so as to point one entry closer to the LRU. Additionally, the second word of the SDT entry is updated.

Next, at decision point 8126, the SDT entry is tested to determine if it is the MRU by checking to see if the LFAL bit is set. If it is set, the entry is the MRU and a branch to module 8128 occurs. In this module, the global variable SBGMRU is updated with the BAL and then is right justified.

If, the entry was not the MRU, a branch to module 8130 occurs. At this point the next entry in the age link is obtained by using the SDT pointer's FAL and the BAL of this entry is then adjusted as before.

In the next module, 8132, the "PREVIOUS" entry in the age link is obtained by using the SDT pointer's BAL; and, if the new SDT entry is the MRU, then the LFAL (last forward age link) bit is set in this entry. If, however, the new SDT entry is not the MRU, the "PREVIOUS" entry in the age link is obtained by using the SDT pointer's BAL and the FAL of this entry is adjusted.

Next, in module 8134, the BAL of the entry to be made ASRI is set to the value of ASRI; and, the FAL of the entry to be made ASRI is set to the value of the FAL of the original ASRI entry. Additionally, the FAL of the original ASRI entry is adjusted so as to point to the new ASRI entry.

Finally, in module 8136, the global variable SBGASR is updated with the new ASRI, the SDT entry just made ASRI is put in the location requested, and the global variable MOVED is set to indicate to other routines (especially CHECK TRICKLE) that various age links in the SDT have changed.

At this point the MAKE AGE ASRI operations are completed and the routine exits by returning to the calling routine.

BUFFER TO HOST/DISK TO BUFFER TRANSFER ROUTINE

The Buffer To Host/Disk To Buffer Transfer routine is not illustrated. The routine searches for a starting record on a particular cylinder and head and reads all of the data into the staging buffer. Optionally, all or a part of a segment may be transferred from another part of the staging buffer concurrently. The routine sets up the channel interface controls and transfers the data from the staging buffer through SR1 to the Channel Buffer 608 from whence it is transferred under the control of the channel interface to the host.

HOST TO BUFFER/BUFFER TO DISK TRANSFER ROUTINE

The Host To Buffer/Buffer To Disk Transfer routine is not illustrated. It is called by either the Trickle Write or the Dispersed Write Control routine. The routine searches for a starting record on a particular cyclinder and head and transfers the data from the staging buffer to the disk. Optionally, all or part of a record of data may be transferred from the host to the other staging buffer concurrently.

ALTERNATIVE DELAYED STATUS ROUTING

Figure 93:
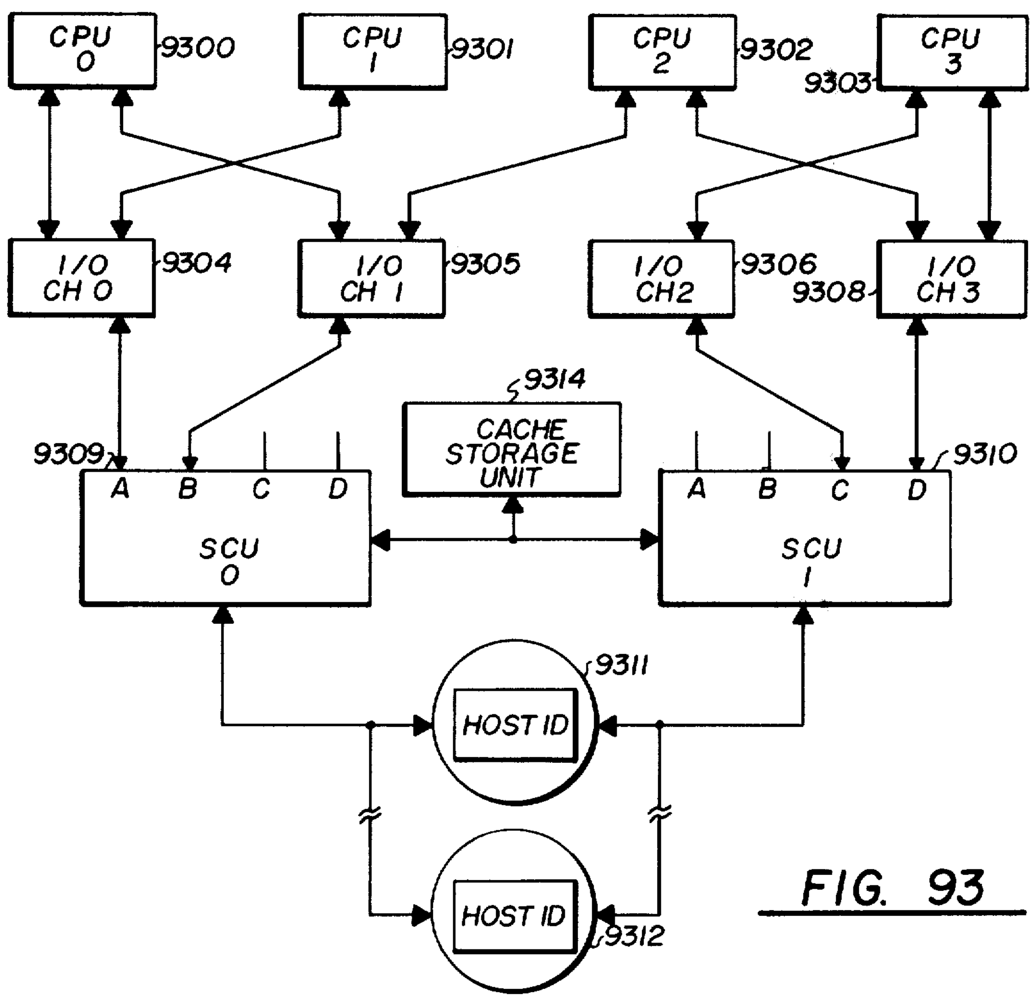
FIG. 93 illustrates the use and purpose of the HOST ID table for status routing; and, FIG. 94 is a flow diagram of the Force Channel Switch subroutine.

As previously explained with respect to the Cache Seek subroutine of FIG. 91 and the block diagram of FIG. 93, one means of insuring a path back to a host from a disk is to issue a tagged seek if only one path exists or an untagged seek if a path exists back to the host through all SCUs. In an alternative arrangement the issuance of a tagged seek is not required. In this embodiment the HOST ID table in each SCU defines the paths from that SCU to the host or hosts connected thereto. When an SCU services the command queue it fetches the command queue entry and then searches the HOST ID table until it finds a channel interface leading back to the host defined by the command queue entry. The SCU then attempts to establish communication with the I/O control unit attached to that interface. A timing arrangement is provided such that if the I/O control unit does not respond within a predetermined interval of time then the SCU continues the search of the HOST ID table looking for another channel interface that leads back to the defined host. If it finds another channel interface which leads back to the host it then seeks to establish communication with the I/O control unit in the path. If the SCU is unable to find a path back to the defined host it then returns the command queue entry to the command queue so that it may be executed by the other SCU.

While the invention has been particularly shown and described with reference to preferred embodiments thereof, it will be understood by those skilled in the art that various changes in form and detail may be made therein without departing from the spirit and scope of the invention as defined by the appended claims.

The embodiments of the invention in which an exclusive property or privilege are claimed are defined as follows:

1. A data processing system comprising:

a plurality of host processors for issuing host processor commands;

a plurality of disk drive devices for driving data storage disks, each of said disk drive devices including means responsive to a seek signal for locating data on a disk and producing an interrupt signal;

first and second storage control units connected to said disk drive devices;

connecting paths extending between said storage control units and said host processors;

means for storing a host processor identification table, said table containing values indicating the connection paths between said storage control units and said host processors;

each of said storage control units including, first means responsive to each host processor command for generating a host identification value specifying the host processor which issued the command, and storing said host identification value with said host processor command;

second means for accessing a stored host processor command and issuing a seek signal to a given one of said disk drive devices;

third means responsive to said first means and an interrupt signal from said given one of said disk drive devices for accessing said host processor identification table to read therefrom a value which defines a connection path between the storage control unit which responds to said interrupt signal and the host processor which issued said given host processor command;

fourth means for generating a status indication; and, fifth means responsive to said third means and said fourth means for applying said status indication over said defined connection path to the host processor which issued said given command.

2. A data processing system as claimed in claim 1 wherein:

each of said storage control units has a plurality of ports, said system further including a plurality of channel units connected in said defined connection paths between said host processors and said storage control units, there being at least one channel unit connected between each host processor and a port of at least one of said storage control units.

3. A data processing system as claimed in claim 2 wherein at least one of said host processors is connected through more than one of said channel units to ports of said first and said second storage contorl units.

4. A data processing system as claimed in claim 2 wherein at least one of said host processors is connected through more than one of said channel units to plural ports of at least one of said first and said second storage control units.

5. A data processing system as claimed in claim 1 wherein said fourth means is each storage control unit includes a timer initiated when said status indication is applied over said defined connection path;

said second means being responsive to said timer for resuming the accessing of said table if a predetermined interval of time elapses and an acknowledge signal is not returned over said defined path to the storage control unit which applied said status indication to said defined path.

6. A data processing system as claimed in claim 1 wherein a given storage control unit responding to an interrupt signal from said given disk drive device returns to an idle condition if no available connection path exists between said given storage control unit and the host processor which issued said given host processor command, whereby the second means of the other of said storage control units may respond to said interrupt signal.

7. In a data processing system of the type having a plurality of processors for issuing processor commands defining an operation to be performed and specifying a disk device at which said operation is to be performed to transfer data between the processor issuing the command and the disk device specified in the command, first and second storage control units, a plurality of connection paths extending between said processors and said first and second storage control units, a plurality of disk devices connected to said first and second storage control units, and command queue storage means connected to said first and said second storage control units for storing queues of processor commands waiting to be executed by said disk devices, the improvement wherein said first and said second storage control means each include:

means for locating the highest priority command in said command queue storage means that is waiting to be executed, means responsive to said highest priority command for determining if the disk device specified by said highest priority command is idle;

means responsive to said determining means for issuing a seek command to the disk device specified by said highest priority command if said disk device is idle, host identification storage means for storing a table of indicators defining said connection paths;

and search means in each of said first and second storage control units responsive to said host identification storage means and said means issuing a seek signal for searching said host identification storage means to locate an indicator therein defining a connection path between the storage control unit issuing said seek command and the processor which issued said highest priority command; and, means in said first and said second storage control units responsive to said search means for applying a status indication to the connection path located by said search means.

8. A data processing system as claimed in claim 7 wherein at leats one of said processors is connected by a first and a second of said connection paths to said first and said second storage control units, respectively.

9. A data processing system as claimed in claim 7 wherein at least one of said host processors is connected by a first of said connection paths to said first storage control unit only.

10. A data processing system as claimed in claim 7 and further comprising means responsive to each command issued by a processor for generating said host a host identification value identifying the processor issuing the command, and storing said host identification with its associated processor command in said command queue storage means, said search means being responsive to said command queue storage means for accessing said host identification storage means at a location determined by the host processor identification value in said highest priority command.

11. In a data processing system having a plurality of host processors for issuing host processor commands, each specifying the disk space at which an operation is to be performed, each including a disk drive device number specifying a disk drive device, a plurality of disk drive devices, first and second storage control units connected to said disk drive devices, and a plurality of connection paths connecting said host processors and said storage control units, a method of status routing whereby status may be reported by either of said storage control units to any host processor to which it is connected, said method comprising:

providing a host identification table for storing values specifying the connection paths between said host processors and said storage control units;

generating a host identification value in response to each of said host processor commands;

storing a given host processor command and said host identification value for later execution if the disk drive device specified by said disk drive device number is busy;

subsequently issuing from either of said storage control units a seek command to the disk drive device whose number is specified by said given host processor command, generating a seek complete at the disk drive device to which said seek command was issued when said disk drive device has located data specified by said given host processor command and applying said seek complete signal to at least one of said storage control units, accessing said host identification table with said host identification value to determine a connection path between the storage control unit to which said seek complete signal was applied and the host processor which issued said given host processor command; and, returning a status indication over said determined connection path to the host processor which issued said given host processor command.

* * * * *